US012368946B2

(12) United States Patent
O'Leary et al.

(10) Patent No.: US 12,368,946 B2
(45) Date of Patent: Jul. 22, 2025

(54) WIDE ANGLE VIDEO CONFERENCE

(71) Applicant: Apple Inc., Cupertino, CA (US)

(72) Inventors: Fiona P. O'Leary, Palo Alto, CA (US); Sean Z. Amadio, San Francisco, CA (US); Johnnie B. Manzari, San Francisco, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 18/499,848

(22) Filed: Nov. 1, 2023

(65) Prior Publication Data

US 2024/0064395 A1 Feb. 22, 2024

Related U.S. Application Data

(63) Continuation of application No. 17/950,922, filed on Sep. 22, 2022, now Pat. No. 11,812,135.

(60) Provisional application No. 63/392,096, filed on Jul. 25, 2022, provisional application No. 63/357,605, filed on Jun. 30, 2022, provisional application No. 63/349,134, filed on Jun. 5, 2022, provisional application No. 63/307,780, filed on Feb. 8, 2022, provisional application No. 63/248,137, filed on Sep. 24, 2021.

(51) Int. Cl.

| | |
|---|---|
| ***H04N 23/62*** | (2023.01) |
| ***H04L 12/18*** | (2006.01) |
| ***H04N 5/262*** | (2006.01) |
| ***H04N 23/63*** | (2023.01) |
| ***H04N 23/69*** | (2023.01) |
| ***H04N 23/698*** | (2023.01) |

(52) U.S. Cl.

CPC ......... *H04N 23/62* (2023.01); *H04L 12/1813* (2013.01); *H04N 5/2621* (2013.01); *H04N 5/2624* (2013.01); *H04N 5/2628* (2013.01); *H04N 23/63* (2023.01); *H04N 23/635* (2023.01); *H04N 23/69* (2023.01); *H04N 23/698* (2023.01)

(58) Field of Classification Search

CPC ...... H04N 23/62; H04N 23/635; H04N 23/69; H04N 23/63; H04N 23/698; H04N 5/2621; H04N 5/2624; H04N 5/2628; H04L 12/1813

USPC ........................................... 348/14.02–14.09

See application file for complete search history.

(56) References Cited

U.S. PATENT DOCUMENTS

| | | | |
|---|---|---|---|
| 102,663 | A | 5/1870 | Lamp |
| 5,617,526 | A | 4/1997 | Oran et al. |
| 5,910,882 | A | 6/1999 | Burrell |
| 6,025,871 | A | 2/2000 | Kantor et al. |

(Continued)

FOREIGN PATENT DOCUMENTS

| | | | |
|---|---|---|---|
| AU | 2015100713 | A4 | 6/2015 |
| CA | 2845537 | A1 | 9/2014 |

(Continued)

OTHER PUBLICATIONS

Avery et al., "Kinect", Wikipedia, Feb. 26, 2015, 14 pages.

(Continued)

*Primary Examiner* — Maria El-Zoobi

(74) *Attorney, Agent, or Firm* — DLA Piper LLP (US)

(57) ABSTRACT

The present disclosure generally relates to embodiments for video communication interface for managing content that is shared during a video communication session.

41 Claims, 140 Drawing Sheets

(56) References Cited

U.S. PATENT DOCUMENTS 6,219,047 B1 * 4/2001 Bell ........................ G06F 9/453 715/705
6,346,962 B1 2/2002 Goodridge
6,726,094 B1 4/2004 Rantze et al.
6,728,784 B1 4/2004 Mattaway
6,731,308 B1 5/2004 Tang et al.
7,102,663 B2 9/2006 Crook
7,148,911 B1 12/2006 Mitsui et al.
7,185,054 B1 2/2007 Ludwig et al.
7,571,014 B1 8/2009 Lambourne et al.
7,801,971 B1 9/2010 Amidon et al.
7,876,996 B1 1/2011 Herz
7,903,171 B2 3/2011 Takabatake et al.
7,982,762 B2 7/2011 Chatting et al.
8,169,463 B2 5/2012 Enstad et al.
RE43,462 E 6/2012 Washino et al.
8,274,544 B2 9/2012 Kurtz et al.
8,370,448 B2 2/2013 Galchev
8,462,961 B1 6/2013 Bywaters et al.
8,502,856 B2 8/2013 Jeong et al.
8,542,265 B1 * 9/2013 Dodd ..................... H04N 23/85 348/14.08
8,624,952 B2 1/2014 Currivan et al.
8,698,845 B2 4/2014 Lemay et al.
8,725,880 B2 5/2014 Santamaria et al.
8,856,105 B2 10/2014 Gargi
8,914,752 B1 12/2014 Spiegel
9,080,736 B1 7/2015 Salzinger et al.
9,185,062 B1 11/2015 Yang et al.
9,253,531 B2 2/2016 Relyea et al.
9,380,264 B1 6/2016 Vakalapudi
9,445,048 B1 9/2016 Nariyawala et al.
9,462,017 B1 10/2016 Siracusano, Jr.
9,635,314 B2 4/2017 Barkley et al.
9,787,938 B2 10/2017 Cranfill et al.
9,800,951 B1 10/2017 Carlson et al.
9,819,877 B1 11/2017 Faulkner et al.
9,992,450 B1 6/2018 Yuan et al.
10,157,040 B2 12/2018 Ballinger et al.
10,194,189 B1 1/2019 Goetz et al.
10,270,983 B1 4/2019 Van Os et al.
10,284,812 B1 5/2019 Van Os et al.
10,300,394 B1 5/2019 Evans et al.
10,339,769 B2 7/2019 Mixter et al.
10,353,532 B1 7/2019 Holz et al.
10,362,272 B1 7/2019 Van Os et al.
10,386,994 B2 8/2019 Singal et al.
10,389,977 B1 8/2019 Van Os et al.
10,410,426 B2 9/2019 Kamini et al.
10,523,625 B1 12/2019 Allen et al.
10,523,976 B2 12/2019 Hemmati et al.
10,645,294 B1 5/2020 Manzari et al.
10,757,366 B1 8/2020 Kwatra et al.
10,771,740 B1 9/2020 Reynolds et al.
10,771,741 B1 9/2020 Reynolds et al.
10,783,883 B2 9/2020 Mixter et al.
10,909,586 B2 2/2021 Avedissian et al.
10,924,446 B1 2/2021 Paul
10,929,099 B2 2/2021 Querze et al.
10,963,145 B1 3/2021 Voss et al.
10,972,655 B1 4/2021 Ostap et al.
11,012,575 B1 5/2021 Leblang et al.
11,024,303 B1 6/2021 Devaraj et al.
11,064,256 B1 7/2021 Voss et al.
11,079,913 B1 8/2021 Kim et al.
11,144,885 B2 10/2021 Rosenberg
11,164,113 B2 11/2021 Howard
11,164,580 B2 11/2021 Kraker
11,176,940 B1 11/2021 Zhong et al.
11,212,449 B1 12/2021 Manzari et al.
11,258,619 B2 2/2022 Libin
11,283,916 B2 3/2022 Coffman et al.
11,290,687 B1 3/2022 Becchetti
11,316,709 B2 4/2022 Brown et al.
11,343,613 B2 5/2022 Gordon et al.
11,360,634 B1 6/2022 Chang et al.
11,449,188 B1 9/2022 Chang et al.
11,523,166 B1 12/2022 Tu et al.
11,621,979 B1 4/2023 Slotznick
11,671,697 B2 6/2023 O'Leary et al.
11,726,647 B2 8/2023 Kim
11,770,600 B2 9/2023 O'Leary et al.
11,955,025 B2 * 4/2024 Aoki ........................ G09B 5/06
12,014,118 B2 6/2024 Gruber et al.
12,085,421 B2 9/2024 Yedid et al.
2001/0030597 A1 10/2001 Inoue et al.
2001/0041007 A1 11/2001 Aoki
2002/0093531 A1 7/2002 Barile
2002/0101446 A1 8/2002 Tang et al.
2003/0112938 A1 6/2003 Kanakubo et al.
2003/0158886 A1 8/2003 Walls et al.
2003/0160861 A1 8/2003 Barlow et al.
2003/0225836 A1 12/2003 Lee et al.
2004/0003040 A1 1/2004 Beavers et al.
2004/0048601 A1 3/2004 Lee et al.
2004/0048612 A1 3/2004 Virtanen et al.
2004/0102225 A1 5/2004 Furuta et al.
2004/0218035 A1 11/2004 Crook
2004/0239763 A1 12/2004 Notea et al.
2005/0015286 A1 1/2005 Rudnik et al.
2005/0099492 A1 5/2005 Orr
2005/0124365 A1 6/2005 Balasuriya et al.
2005/0144247 A1 6/2005 Christensen et al.
2005/0177798 A1 8/2005 Thomson et al.
2005/0183035 A1 8/2005 Ringel et al.
2005/0233780 A1 10/2005 Jani et al.
2006/0002315 A1 1/2006 Theurer et al.
2006/0002523 A1 1/2006 Bettis et al.
2006/0056837 A1 3/2006 Vapaakoski
2006/0098085 A1 5/2006 Nichols et al.
2006/0098634 A1 5/2006 Umemoto et al.
2006/0149399 A1 7/2006 Norhammar et al.
2006/0158730 A1 7/2006 Kira
2006/0256188 A1 11/2006 Mock et al.
2007/0004389 A1 1/2007 Wallace et al.
2007/0004451 A1 1/2007 Anderson
2007/0040898 A1 2/2007 Lee et al.
2007/0064112 A1 3/2007 Chatting et al.
2007/0115349 A1 5/2007 Currivan et al.
2007/0124783 A1 5/2007 Ahiska et al.
2007/0177025 A1 8/2007 Kopet et al.
2007/0211141 A1 9/2007 Christiansen
2007/0226327 A1 9/2007 Redpath
2007/0245249 A1 10/2007 Weisberg et al.
2007/0264977 A1 11/2007 Zinn et al.
2007/0279482 A1 12/2007 Oswald et al.
2007/0291736 A1 12/2007 Furlong et al.
2008/0032704 A1 2/2008 Oneil et al.
2008/0036849 A1 2/2008 Oh et al.
2008/0063389 A1 3/2008 Fang et al.
2008/0068447 A1 3/2008 Mattila et al.
2008/0074049 A1 3/2008 Kitai et al.
2008/0074550 A1 3/2008 Park
2008/0084482 A1 4/2008 Hansson et al.
2008/0117876 A1 5/2008 Hidaka et al.
2008/0122796 A1 5/2008 Jobs et al.
2008/0129816 A1 6/2008 Mattila et al.
2008/0129844 A1 6/2008 Cusack et al.
2008/0165144 A1 7/2008 Forstall et al.
2008/0165388 A1 7/2008 Serlet
2008/0246778 A1 10/2008 Ham et al.
2008/0313278 A1 12/2008 Hochberg
2008/0316295 A1 12/2008 King et al.
2009/0005011 A1 1/2009 Christie et al.
2009/0007017 A1 1/2009 Anzures et al.
2009/0046075 A1 2/2009 Kim et al.
2009/0049446 A1 2/2009 Merten et al.
2009/0109276 A1 4/2009 Kim
2009/0117936 A1 5/2009 Maeng
2009/0164322 A1 6/2009 Khan et al.
2009/0164587 A1 6/2009 Gavita et al.
2009/0174763 A1 7/2009 Bengtsson et al.
2009/0183125 A1 7/2009 Magal et al.
2009/0228820 A1 9/2009 Kim et al.

(56) References Cited

U.S. PATENT DOCUMENTS

| | | | |
|---|---|---|---|
| 2009/0228825 | A1 | 9/2009 | Van Os et al. |
| 2009/0228938 | A1 | 9/2009 | White et al. |
| 2009/0232129 | A1 | 9/2009 | Wong et al. |
| 2009/0249244 | A1 | 10/2009 | Robinson et al. |
| 2009/0256780 | A1 | 10/2009 | Small et al. |
| 2009/0262200 | A1 | 10/2009 | Takabatake et al. |
| 2009/0262206 | A1 | 10/2009 | Park |
| 2009/0287790 | A1 | 11/2009 | Upton et al. |
| 2009/0305679 | A1 | 12/2009 | Kim |
| 2009/0309897 | A1 | 12/2009 | Morita et al. |
| 2010/0009719 | A1 | 1/2010 | Oh et al. |
| 2010/0011065 | A1 | 1/2010 | Scherpa et al. |
| 2010/0039498 | A1 | 2/2010 | Liu et al. |
| 2010/0040292 | A1 | 2/2010 | Clarkson |
| 2010/0053212 | A1 | 3/2010 | Kang et al. |
| 2010/0073454 | A1 | 3/2010 | Lovhaugen et al. |
| 2010/0073455 | A1 | 3/2010 | Iwabuchi et al. |
| 2010/0085416 | A1 | 4/2010 | Hegde et al. |
| 2010/0087230 | A1 | 4/2010 | Peh et al. |
| 2010/0097438 | A1 | 4/2010 | Ujii |
| 2010/0121636 | A1 | 5/2010 | Burke et al. |
| 2010/0125816 | A1 | 5/2010 | Bezos |
| 2010/0162171 | A1 | 6/2010 | Felt et al. |
| 2010/0169435 | A1 | 7/2010 | Osullivan et al. |
| 2010/0177156 | A1 | 7/2010 | Kim et al. |
| 2010/0189096 | A1 | 7/2010 | Flynn et al. |
| 2010/0246571 | A1 | 9/2010 | Geppert et al. |
| 2010/0247077 | A1 | 9/2010 | Yamamoto et al. |
| 2010/0251119 | A1 | 9/2010 | Geppert et al. |
| 2010/0251158 | A1 | 9/2010 | Geppert et al. |
| 2010/0262714 | A1 | 10/2010 | Hiie |
| 2010/0309284 | A1 | 12/2010 | Samadani et al. |
| 2010/0318928 | A1 | 12/2010 | Neuman et al. |
| 2010/0318939 | A1 | 12/2010 | Moon |
| 2011/0030324 | A1 | 2/2011 | Higgins |
| 2011/0032324 | A1 | 2/2011 | George et al. |
| 2011/0035662 | A1 | 2/2011 | King et al. |
| 2011/0043652 | A1 | 2/2011 | King et al. |
| 2011/0085017 | A1 | 4/2011 | Robinson et al. |
| 2011/0096174 | A1 | 4/2011 | King et al. |
| 2011/0107216 | A1 | 5/2011 | Bi |
| 2011/0115875 | A1 | 5/2011 | Sadwick et al. |
| 2011/0115876 | A1 | 5/2011 | Khot et al. |
| 2011/0115945 | A1 | 5/2011 | Takano et al. |
| 2011/0117898 | A1 | 5/2011 | Pereira et al. |
| 2011/0126148 | A1 | 5/2011 | Krishnaraj et al. |
| 2011/0145068 | A1 | 6/2011 | King et al. |
| 2011/0161836 | A1 | 6/2011 | Mu et al. |
| 2011/0164032 | A1 | 7/2011 | Shadmi |
| 2011/0164042 | A1 | 7/2011 | Chaudhri |
| 2011/0164058 | A1 | 7/2011 | Lemay |
| 2011/0167058 | A1 | 7/2011 | Van Os |
| 2011/0167339 | A1 | 7/2011 | Lemay |
| 2011/0167382 | A1 | 7/2011 | Van Os |
| 2011/0193995 | A1 | 8/2011 | Goh et al. |
| 2011/0205333 | A1 | 8/2011 | Wu et al. |
| 2011/0234746 | A1 | 9/2011 | Saleh et al. |
| 2011/0235549 | A1 | 9/2011 | Ahlers et al. |
| 2011/0242356 | A1 | 10/2011 | Aleksic et al. |
| 2011/0249073 | A1 | 10/2011 | Cranfill et al. |
| 2011/0249074 | A1 | 10/2011 | Cranfill et al. |
| 2011/0249086 | A1 | 10/2011 | Guo et al. |
| 2011/0252146 | A1 | 10/2011 | Santamaria et al. |
| 2011/0273526 | A1 | 11/2011 | Mehin et al. |
| 2011/0296163 | A1 | 12/2011 | Abernethy et al. |
| 2012/0002001 | A1 | 1/2012 | Prentice |
| 2012/0019610 | A1 | 1/2012 | Hornyak et al. |
| 2012/0033028 | A1 | 2/2012 | Murphy et al. |
| 2012/0054278 | A1 | 3/2012 | Taleb et al. |
| 2012/0062784 | A1 | 3/2012 | Van et al. |
| 2012/0092436 | A1 | 4/2012 | Pahud et al. |
| 2012/0114108 | A1 | 5/2012 | Katis et al. |
| 2012/0173383 | A1 | 7/2012 | Badawiyeh et al. |
| 2012/0182381 | A1 | 7/2012 | Abate et al. |
| 2012/0185355 | A1 | 7/2012 | Kilroy |
| 2012/0185542 | A1 | 7/2012 | Vyrros et al. |
| 2012/0188394 | A1 | 7/2012 | Park et al. |
| 2012/0201479 | A1 | 8/2012 | Zhang et al. |
| 2012/0216139 | A1 | 8/2012 | Ording et al. |
| 2012/0218304 | A1 | 8/2012 | Anzures et al. |
| 2012/0229591 | A1 | 9/2012 | Lee |
| 2012/0257095 | A1 | 10/2012 | Velazquez |
| 2012/0290950 | A1 | 11/2012 | Rapaport et al. |
| 2012/0293605 | A1 | 11/2012 | Seferian et al. |
| 2012/0296972 | A1 | 11/2012 | Backer |
| 2012/0304079 | A1 | 11/2012 | Rideout et al. |
| 2012/0320141 | A1 | 12/2012 | Bowen et al. |
| 2013/0055113 | A1 | 2/2013 | Chazin et al. |
| 2013/0061155 | A1 | 3/2013 | Hon |
| 2013/0070046 | A1 | 3/2013 | Wolf et al. |
| 2013/0080923 | A1 | 3/2013 | Anzures et al. |
| 2013/0088413 | A1 | 4/2013 | Raffle et al. |
| 2013/0111603 | A1 | 5/2013 | Sakai et al. |
| 2013/0124207 | A1 | 5/2013 | Sarin et al. |
| 2013/0132865 | A1 | 5/2013 | Li |
| 2013/0151623 | A1 | 6/2013 | Weiser et al. |
| 2013/0162781 | A1 | 6/2013 | Hubner et al. |
| 2013/0166580 | A1 | 6/2013 | Maharajh et al. |
| 2013/0169742 | A1 | 7/2013 | Wu et al. |
| 2013/0216206 | A1 | 8/2013 | Dubin et al. |
| 2013/0219276 | A1 | 8/2013 | Shan |
| 2013/0225140 | A1 | 8/2013 | Greisson |
| 2013/0230293 | A1 | 9/2013 | Boyle et al. |
| 2013/0282180 | A1 | 10/2013 | Layton |
| 2013/0325949 | A1 | 12/2013 | Virani et al. |
| 2013/0328770 | A1 | 12/2013 | Parham |
| 2013/0328997 | A1 | 12/2013 | Desai |
| 2013/0332856 | A1 | 12/2013 | Sanders et al. |
| 2014/0018053 | A1 | 1/2014 | Cho et al. |
| 2014/0024340 | A1 | 1/2014 | Raleigh |
| 2014/0026074 | A1 | 1/2014 | Cortes et al. |
| 2014/0043424 | A1 | 2/2014 | Gava et al. |
| 2014/0063176 | A1 | 3/2014 | Modai et al. |
| 2014/0099004 | A1 | 4/2014 | Dibona et al. |
| 2014/0105372 | A1 | 4/2014 | Nowack et al. |
| 2014/0108084 | A1 | 4/2014 | Bargetzi et al. |
| 2014/0108568 | A1 | 4/2014 | Lee |
| 2014/0119531 | A1* | 5/2014 | Tuchman .............. H04M 7/003 379/265.09 |
| 2014/0201126 | A1 | 7/2014 | Zadeh et al. |
| 2014/0201632 | A1 | 7/2014 | Kunigita et al. |
| 2014/0215356 | A1 | 7/2014 | Brander et al. |
| 2014/0215404 | A1 | 7/2014 | Kong et al. |
| 2014/0218371 | A1 | 8/2014 | Du et al. |
| 2014/0218461 | A1 | 8/2014 | Deland |
| 2014/0229835 | A1 | 8/2014 | Ravine |
| 2014/0247368 | A1 | 9/2014 | Chinn |
| 2014/0280812 | A1 | 9/2014 | Bealkowski et al. |
| 2014/0317532 | A1 | 10/2014 | Ma et al. |
| 2014/0331149 | A1 | 11/2014 | Labey |
| 2014/0340332 | A1 | 11/2014 | Lemay et al. |
| 2014/0349754 | A1 | 11/2014 | Kaneoka et al. |
| 2014/0354759 | A1 | 12/2014 | Cranfill et al. |
| 2014/0368547 | A1 | 12/2014 | Elings |
| 2014/0368600 | A1 | 12/2014 | Do et al. |
| 2014/0368719 | A1 | 12/2014 | Kaneko et al. |
| 2014/0373081 | A1 | 12/2014 | Dodson et al. |
| 2014/0375747 | A1 | 12/2014 | Martinez et al. |
| 2015/0033149 | A1 | 1/2015 | Kuchoor |
| 2015/0040012 | A1 | 2/2015 | Faaborg et al. |
| 2015/0058413 | A1 | 2/2015 | Ge |
| 2015/0062158 | A1 | 3/2015 | Hildreth et al. |
| 2015/0067541 | A1 | 3/2015 | Owens et al. |
| 2015/0070272 | A1 | 3/2015 | Kim et al. |
| 2015/0078680 | A1 | 3/2015 | Shakib et al. |
| 2015/0085057 | A1 | 3/2015 | Ouyang et al. |
| 2015/0095804 | A1 | 4/2015 | Grossman et al. |
| 2015/0106720 | A1 | 4/2015 | Backer |
| 2015/0116353 | A1 | 4/2015 | Miura et al. |
| 2015/0116363 | A1 | 4/2015 | Monte et al. |
| 2015/0116464 | A1 | 4/2015 | Tanaka |
| 2015/0130892 | A1 | 5/2015 | Whynot et al. |
| 2015/0135098 | A1 | 5/2015 | Geppert et al. |
| 2015/0172552 | A1 | 6/2015 | Kim |

(56) References Cited

U.S. PATENT DOCUMENTS

| | | | |
|---|---|---|---|
| 2015/0177914 | A1 | 6/2015 | Coyner et al. |
| 2015/0193196 | A1 | 7/2015 | Lin et al. |
| 2015/0206529 | A1 | 7/2015 | Kwon et al. |
| 2015/0248167 | A1 | 9/2015 | Turbell et al. |
| 2015/0256796 | A1 | 9/2015 | Ma |
| 2015/0264304 | A1 | 9/2015 | Chastney et al. |
| 2015/0288868 | A1 | 10/2015 | Slavin et al. |
| 2015/0296077 | A1 | 10/2015 | Wakeyama et al. |
| 2015/0301338 | A1 | 10/2015 | Van Heugten |
| 2015/0304366 | A1 | 10/2015 | Bader-Natal et al. |
| 2015/0304413 | A1 | 10/2015 | Park |
| 2015/0319006 | A1 | 11/2015 | Plummer et al. |
| 2015/0319144 | A1 | 11/2015 | Barton et al. |
| 2015/0334140 | A1 | 11/2015 | Singh et al. |
| 2015/0334313 | A1 | 11/2015 | Chougle et al. |
| 2015/0350143 | A1 | 12/2015 | Lemay et al. |
| 2015/0350533 | A1 | 12/2015 | Harris et al. |
| 2015/0358484 | A1 | 12/2015 | Permude |
| 2015/0358584 | A1 | 12/2015 | Mattson |
| 2015/0365306 | A1 | 12/2015 | Chaudhri et al. |
| 2015/0370426 | A1 | 12/2015 | Carrigan et al. |
| 2015/0373065 | A1 | 12/2015 | Holmquist et al. |
| 2015/0373178 | A1 | 12/2015 | Felt et al. |
| 2016/0014059 | A1 | 1/2016 | Rathod |
| 2016/0014477 | A1 | 1/2016 | Siders |
| 2016/0021155 | A1 | 1/2016 | Sawato |
| 2016/0029004 | A1 | 1/2016 | Campbell et al. |
| 2016/0057173 | A1 | 2/2016 | Singman et al. |
| 2016/0065832 | A1 | 3/2016 | Kim et al. |
| 2016/0072861 | A1 | 3/2016 | Woolsey et al. |
| 2016/0073185 | A1 | 3/2016 | Kannappan et al. |
| 2016/0099901 | A1 | 4/2016 | Allen et al. |
| 2016/0099987 | A1 | 4/2016 | Shamma |
| 2016/0127636 | A1 | 5/2016 | Ito et al. |
| 2016/0139785 | A1 | 5/2016 | Griffin et al. |
| 2016/0142450 | A1 | 5/2016 | Paul et al. |
| 2016/0180259 | A1 | 6/2016 | Marianko et al. |
| 2016/0210602 | A1 | 7/2016 | Siddique et al. |
| 2016/0212374 | A1 | 7/2016 | Usbergo et al. |
| 2016/0227095 | A1 | 8/2016 | Yoshizawa et al. |
| 2016/0231902 | A1 | 8/2016 | Sirpal et al. |
| 2016/0259528 | A1 | 9/2016 | Foss et al. |
| 2016/0261653 | A1 | 9/2016 | Kim |
| 2016/0277708 | A1 | 9/2016 | Rintel et al. |
| 2016/0277903 | A1 | 9/2016 | Poosala et al. |
| 2016/0291824 | A1 | 10/2016 | Grossman et al. |
| 2016/0306422 | A1 | 10/2016 | Parham et al. |
| 2016/0306504 | A1 | 10/2016 | Brunsch et al. |
| 2016/0308920 | A1 | 10/2016 | Brunsch et al. |
| 2016/0316038 | A1 | 10/2016 | Jolfaei |
| 2016/0320849 | A1 | 11/2016 | Koo |
| 2016/0335041 | A1 | 11/2016 | Wachter et al. |
| 2016/0352661 | A1 | 12/2016 | Yang et al. |
| 2016/0364106 | A1 | 12/2016 | Koum et al. |
| 2016/0380780 | A1 | 12/2016 | Stephenson et al. |
| 2017/0006162 | A1 | 1/2017 | Bargetzi et al. |
| 2017/0024100 | A1 | 1/2017 | Pieper et al. |
| 2017/0031557 | A1 | 2/2017 | Xiangli et al. |
| 2017/0034583 | A1 | 2/2017 | Long et al. |
| 2017/0048817 | A1 | 2/2017 | Yang et al. |
| 2017/0064184 | A1 | 3/2017 | Tsai |
| 2017/0083189 | A1 | 3/2017 | Yang et al. |
| 2017/0094019 | A1 | 3/2017 | Ahmed et al. |
| 2017/0097621 | A1 | 4/2017 | Ackmann et al. |
| 2017/0111587 | A1 | 4/2017 | Herbst et al. |
| 2017/0111595 | A1 | 4/2017 | Soni et al. |
| 2017/0126592 | A1 | 5/2017 | El |
| 2017/0150904 | A1 | 6/2017 | Park et al. |
| 2017/0206779 | A1 | 7/2017 | Lee et al. |
| 2017/0220212 | A1 | 8/2017 | Yang et al. |
| 2017/0230585 | A1 | 8/2017 | Nash et al. |
| 2017/0230705 | A1 | 8/2017 | Pardue et al. |
| 2017/0244932 | A1 | 8/2017 | Pistilli et al. |
| 2017/0280098 | A1 | 9/2017 | Sethuraman et al. |
| 2017/0280494 | A1 | 9/2017 | Jung et al. |
| 2017/0309174 | A1 | 10/2017 | Gonzales et al. |
| 2017/0324784 | A1 | 11/2017 | Taine et al. |
| 2017/0336960 | A1 | 11/2017 | Chaudhri et al. |
| 2017/0344253 | A1 | 11/2017 | Zhang |
| 2017/0353508 | A1 | 12/2017 | Yoakum |
| 2017/0357382 | A1 | 12/2017 | Miura et al. |
| 2017/0357425 | A1 | 12/2017 | Smith et al. |
| 2017/0357434 | A1 | 12/2017 | Coffman et al. |
| 2017/0357917 | A1 | 12/2017 | Holmes et al. |
| 2017/0359191 | A1 | 12/2017 | Smith et al. |
| 2017/0359285 | A1 | 12/2017 | Weinig et al. |
| 2017/0367484 | A1 | 12/2017 | Salvoni et al. |
| 2017/0371496 | A1 | 12/2017 | Denoue et al. |
| 2017/0373868 | A1 | 12/2017 | Deets, Jr. |
| 2018/0013799 | A1 | 1/2018 | Davies |
| 2018/0020530 | A1 | 1/2018 | Scordato et al. |
| 2018/0047200 | A1 | 2/2018 | O'hara et al. |
| 2018/0048820 | A1 | 2/2018 | Hinkel et al. |
| 2018/0061158 | A1 | 3/2018 | Greene |
| 2018/0070144 | A1 | 3/2018 | Tang et al. |
| 2018/0081522 | A1 | 3/2018 | Greenberg et al. |
| 2018/0091732 | A1 | 3/2018 | Wilson et al. |
| 2018/0095616 | A1 | 4/2018 | Valdivia et al. |
| 2018/0101297 | A1 | 4/2018 | Yang et al. |
| 2018/0103074 | A1 | 4/2018 | Rosenberg |
| 2018/0121074 | A1* | 5/2018 | Peron .................... G06F 40/177 |
| 2018/0122378 | A1 | 5/2018 | Mixter et al. |
| 2018/0123986 | A1 | 5/2018 | Faulkner et al. |
| 2018/0124128 | A1 | 5/2018 | Faulkner et al. |
| 2018/0124359 | A1 | 5/2018 | Faulkner |
| 2018/0131732 | A1 | 5/2018 | Aronoff et al. |
| 2018/0131907 | A1* | 5/2018 | Schmirler .......... G05B 23/0216 |
| 2018/0139374 | A1 | 5/2018 | Yu |
| 2018/0150433 | A1 | 5/2018 | Sowden et al. |
| 2018/0157455 | A1 | 6/2018 | Troy et al. |
| 2018/0160072 | A1 | 6/2018 | Cranfill et al. |
| 2018/0183849 | A1 | 6/2018 | Shin et al. |
| 2018/0191965 | A1 | 7/2018 | Faulkner et al. |
| 2018/0199164 | A1 | 7/2018 | Bargetzi et al. |
| 2018/0203577 | A1 | 7/2018 | Astavans et al. |
| 2018/0204111 | A1 | 7/2018 | Zadeh et al. |
| 2018/0205797 | A1 | 7/2018 | Faulkner |
| 2018/0213144 | A1 | 7/2018 | Kim et al. |
| 2018/0213396 | A1 | 7/2018 | Segal et al. |
| 2018/0227341 | A1 | 8/2018 | Rizzi |
| 2018/0228003 | A1 | 8/2018 | O'driscoll et al. |
| 2018/0228006 | A1 | 8/2018 | Baker et al. |
| 2018/0249047 | A1 | 8/2018 | Marlatt |
| 2018/0253152 | A1 | 9/2018 | Forsblom et al. |
| 2018/0267774 | A1 | 9/2018 | Williams et al. |
| 2018/0286395 | A1 | 10/2018 | Li et al. |
| 2018/0288104 | A1 | 10/2018 | Padilla et al. |
| 2018/0293959 | A1 | 10/2018 | Monga et al. |
| 2018/0295079 | A1 | 10/2018 | Longo |
| 2018/0308480 | A1 | 10/2018 | Jang et al. |
| 2018/0309801 | A1 | 10/2018 | Rathod |
| 2018/0332559 | A1 | 11/2018 | Gudivada et al. |
| 2018/0338038 | A1 | 11/2018 | Ly et al. |
| 2018/0341448 | A1 | 11/2018 | Behzadi et al. |
| 2018/0348764 | A1 | 12/2018 | Zhang et al. |
| 2018/0359293 | A1 | 12/2018 | Faulkner et al. |
| 2018/0364665 | A1 | 12/2018 | Clymer et al. |
| 2018/0367483 | A1 | 12/2018 | Rodriguez et al. |
| 2018/0367484 | A1 | 12/2018 | Rodriguez et al. |
| 2018/0375676 | A1 | 12/2018 | Bader-Natal et al. |
| 2019/0005419 | A1 | 1/2019 | Howard |
| 2019/0025943 | A1 | 1/2019 | Jobs et al. |
| 2019/0028419 | A1 | 1/2019 | Sullivan |
| 2019/0034849 | A1 | 1/2019 | Romaine et al. |
| 2019/0037173 | A1 | 1/2019 | Lee et al. |
| 2019/0065027 | A1 | 2/2019 | Hauenstein et al. |
| 2019/0068670 | A1 | 2/2019 | Adam et al. |
| 2019/0102049 | A1 | 4/2019 | Anzures et al. |
| 2019/0102145 | A1 | 4/2019 | Wilberding et al. |
| 2019/0110087 | A1 | 4/2019 | Parasseeri et al. |
| 2019/0124021 | A1 | 4/2019 | Demattei |
| 2019/0138951 | A1 | 5/2019 | Brownhill et al. |
| 2019/0149768 | A1 | 5/2019 | Mcardle |
| 2019/0149887 | A1 | 5/2019 | Williams et al. |

(56) References Cited

U.S. PATENT DOCUMENTS

| | | | |
|---|---|---|---|
| 2019/0173939 | A1 | 6/2019 | Lewis et al. |
| 2019/0199963 | A1 | 6/2019 | Ahn et al. |
| 2019/0199993 | A1 | 6/2019 | Babu et al. |
| 2019/0205861 | A1 | 7/2019 | Bace |
| 2019/0222775 | A1 | 7/2019 | Ahn |
| 2019/0228495 | A1 | 7/2019 | Tremblay et al. |
| 2019/0236142 | A1 | 8/2019 | Balakrishnan et al. |
| 2019/0246238 | A1 | 8/2019 | Crutchfield et al. |
| 2019/0279634 | A1 | 9/2019 | Tak et al. |
| 2019/0297039 | A1 | 9/2019 | Rodriguez et al. |
| 2019/0303861 | A1 | 10/2019 | Mathias et al. |
| 2019/0332400 | A1 | 10/2019 | Spoor et al. |
| 2019/0339769 | A1 | 11/2019 | Cox et al. |
| 2019/0339825 | A1 | 11/2019 | Anzures et al. |
| 2019/0342507 | A1 | 11/2019 | Dye et al. |
| 2019/0342519 | A1 | 11/2019 | Van Os et al. |
| 2019/0342621 | A1 | 11/2019 | Carrigan et al. |
| 2019/0347181 | A1 | 11/2019 | Cranfill et al. |
| 2019/0354252 | A1 | 11/2019 | Badr |
| 2019/0361575 | A1 | 11/2019 | Ni et al. |
| 2019/0361694 | A1 | 11/2019 | Gordon et al. |
| 2019/0362555 | A1 | 11/2019 | Chen et al. |
| 2019/0369862 | A1 | 12/2019 | De Vries |
| 2019/0370805 | A1 | 12/2019 | Van Os et al. |
| 2020/0005539 | A1 | 1/2020 | Hwang et al. |
| 2020/0034033 | A1 | 1/2020 | Chaudhri et al. |
| 2020/0050502 | A1 | 2/2020 | Ghafourifar et al. |
| 2020/0055515 | A1 | 2/2020 | Herman et al. |
| 2020/0059628 | A1 | 2/2020 | Cranfill et al. |
| 2020/0106952 | A1 | 4/2020 | Missig et al. |
| 2020/0106965 | A1 | 4/2020 | Malia et al. |
| 2020/0112690 | A1 | 4/2020 | Harrison et al. |
| 2020/0127988 | A1 | 4/2020 | Bradley et al. |
| 2020/0135191 | A1 | 4/2020 | Nourbakhsh |
| 2020/0142667 | A1 | 5/2020 | Querze et al. |
| 2020/0143593 | A1 | 5/2020 | Rudman et al. |
| 2020/0152186 | A1 | 5/2020 | Koh et al. |
| 2020/0183548 | A1 | 6/2020 | Anzures et al. |
| 2020/0186378 | A1 | 6/2020 | Six et al. |
| 2020/0186576 | A1 | 6/2020 | Gopal et al. |
| 2020/0195887 | A1 | 6/2020 | Van Os et al. |
| 2020/0213530 | A1 | 7/2020 | Ahn |
| 2020/0226896 | A1 | 7/2020 | Robertson et al. |
| 2020/0242788 | A1 | 7/2020 | Jacobs et al. |
| 2020/0274726 | A1 | 8/2020 | Setteboun et al. |
| 2020/0279279 | A1 | 9/2020 | Chaudhuri |
| 2020/0296329 | A1 | 9/2020 | Tang et al. |
| 2020/0302913 | A1 | 9/2020 | Marcinkiewicz |
| 2020/0312318 | A1 | 10/2020 | Olson et al. |
| 2020/0335187 | A1 | 10/2020 | Lefkofsky et al. |
| 2020/0383157 | A1 | 12/2020 | Lee et al. |
| 2020/0385116 | A1 | 12/2020 | Sabripour et al. |
| 2020/0395012 | A1 | 12/2020 | Kim et al. |
| 2020/0400957 | A1 | 12/2020 | Van Heugten |
| 2021/0043189 | A1 | 2/2021 | Pyun |
| 2021/0064317 | A1 | 3/2021 | Juenger et al. |
| 2021/0065134 | A1 | 3/2021 | Chhabra et al. |
| 2021/0096703 | A1 | 4/2021 | Anzures et al. |
| 2021/0097768 | A1 | 4/2021 | Malia et al. |
| 2021/0099829 | A1 | 4/2021 | Soto et al. |
| 2021/0136129 | A1 | 5/2021 | Ponnusamy et al. |
| 2021/0144336 | A1 | 5/2021 | Van Os et al. |
| 2021/0152503 | A1 | 5/2021 | Rodriguez et al. |
| 2021/0158622 | A1 | 5/2021 | Leelaphattarakij et al. |
| 2021/0158830 | A1 | 5/2021 | Boehlke |
| 2021/0176204 | A1 | 6/2021 | Geppert et al. |
| 2021/0182169 | A1 | 6/2021 | Mardente et al. |
| 2021/0195084 | A1 | 6/2021 | Olajos et al. |
| 2021/0203878 | A1 | 7/2021 | Lee et al. |
| 2021/0217106 | A1 | 7/2021 | Hauser et al. |
| 2021/0265032 | A1 | 8/2021 | Burgess et al. |
| 2021/0266274 | A1 | 8/2021 | Liu et al. |
| 2021/0306288 | A1 | 9/2021 | Boyd et al. |
| 2021/0321197 | A1 | 10/2021 | Annamraju |
| 2021/0323406 | A1 | 10/2021 | So et al. |
| 2021/0333864 | A1* | 10/2021 | Harvey ................ G06T 19/006 |
| 2021/0349680 | A1 | 11/2021 | Kim et al. |
| 2021/0352172 | A1 | 11/2021 | Kim et al. |
| 2021/0360192 | A1 | 11/2021 | Cranfill et al. |
| 2021/0360199 | A1 | 11/2021 | Oz et al. |
| 2021/0373672 | A1 | 12/2021 | Schwarz et al. |
| 2021/0409359 | A1 | 12/2021 | Eirinberg et al. |
| 2022/0004356 | A1 | 1/2022 | Kim et al. |
| 2022/0006946 | A1 | 1/2022 | Missig et al. |
| 2022/0014715 | A1 | 1/2022 | Tamura et al. |
| 2022/0021680 | A1 | 1/2022 | Roedel et al. |
| 2022/0046186 | A1 | 2/2022 | Fayad et al. |
| 2022/0046222 | A1 | 2/2022 | Meier |
| 2022/0050578 | A1 | 2/2022 | Waldman et al. |
| 2022/0053142 | A1 | 2/2022 | Manzari et al. |
| 2022/0086203 | A1 | 3/2022 | Morris et al. |
| 2022/0100362 | A1 | 3/2022 | Kim |
| 2022/0103784 | A1 | 3/2022 | Pollefeys |
| 2022/0122089 | A1 | 4/2022 | Kuhlmann et al. |
| 2022/0180862 | A1 | 6/2022 | Sharifi et al. |
| 2022/0199267 | A1 | 6/2022 | Subramanian et al. |
| 2022/0244836 | A1 | 8/2022 | O'leary et al. |
| 2022/0247587 | A1 | 8/2022 | Rolin et al. |
| 2022/0247918 | A1 | 8/2022 | O'leary et al. |
| 2022/0247919 | A1 | 8/2022 | O'leary et al. |
| 2022/0253136 | A1 | 8/2022 | Holder et al. |
| 2022/0254074 | A1 | 8/2022 | Berliner et al. |
| 2022/0269882 | A1 | 8/2022 | Proschowsky et al. |
| 2022/0278992 | A1 | 9/2022 | Baker et al. |
| 2022/0286314 | A1 | 9/2022 | Meyer et al. |
| 2022/0303150 | A1 | 9/2022 | Jensen et al. |
| 2022/0343569 | A1 | 10/2022 | Karri et al. |
| 2022/0365643 | A1 | 11/2022 | Triverio et al. |
| 2022/0365739 | A1 | 11/2022 | Chang et al. |
| 2022/0365740 | A1 | 11/2022 | Chang et al. |
| 2022/0368548 | A1 | 11/2022 | Chang et al. |
| 2022/0368659 | A1 | 11/2022 | Chang et al. |
| 2022/0368742 | A1 | 11/2022 | Chang et al. |
| 2022/0374136 | A1 | 11/2022 | Chang et al. |
| 2022/0375358 | A1* | 11/2022 | Shimomura ........... G06F 3/011 |
| 2023/0004264 | A1 | 1/2023 | Anzures et al. |
| 2023/0041125 | A1 | 2/2023 | Kim et al. |
| 2023/0094453 | A1 | 3/2023 | O'leary et al. |
| 2023/0098395 | A1 | 3/2023 | O'leary et al. |
| 2023/0109787 | A1 | 4/2023 | O'leary et al. |
| 2023/0143275 | A1 | 5/2023 | Opara et al. |
| 2023/0188674 | A1 | 6/2023 | Van Os et al. |
| 2023/0213764 | A1 | 7/2023 | Arngren et al. |
| 2023/0246857 | A1 | 8/2023 | Boucheron et al. |
| 2023/0262196 | A1 | 8/2023 | Cranfill et al. |
| 2023/0262317 | A1 | 8/2023 | O'leary et al. |
| 2023/0319413 | A1 | 10/2023 | Manzari et al. |
| 2023/0370507 | A1 | 11/2023 | Chang et al. |
| 2023/0386145 | A1 | 11/2023 | Faulkner |
| 2023/0388357 | A1 | 11/2023 | Faulkner et al. |
| 2024/0036804 | A1 | 2/2024 | Chang et al. |
| 2024/0064270 | A1 | 2/2024 | Van Os et al. |
| 2024/0103677 | A1 | 3/2024 | McKenzie et al. |
| 2024/0104819 | A1 | 3/2024 | Chand et al. |
| 2024/0118793 | A1 | 4/2024 | Triverio et al. |
| 2024/0259669 | A1 | 8/2024 | Missig et al. |
| 2024/0377922 | A1 | 11/2024 | Rajam et al. |
| 2025/0039011 | A1 | 1/2025 | Meyer et al. |
| 2025/0138697 | A1 | 5/2025 | Smith et al. |
| 2025/0165123 | A1 | 5/2025 | Anzures et al. |

FOREIGN PATENT DOCUMENTS

| | | | |
|---|---|---|---|
| CN | 1473430 | A | 2/2004 |
| CN | 1658150 | A | 8/2005 |
| CN | 1689327 | A | 10/2005 |
| CN | 1801926 | A | 7/2006 |
| CN | 1890996 | A | 1/2007 |
| CN | 1985319 | A | 6/2007 |
| CN | 101075173 | A | 11/2007 |
| CN | 101296356 | A | 10/2008 |
| CN | 101431564 | A | 5/2009 |
| CN | 101566866 | A | 10/2009 |
| CN | 101682622 | A | 3/2010 |

(56) References Cited

FOREIGN PATENT DOCUMENTS

CN 101853132 A 10/2010
CN 101854247 A 10/2010
CN 101854261 A 10/2010
CN 101917529 A 12/2010
CN 102215217 A 10/2011
CN 102572369 A 7/2012
CN 102651731 A 8/2012
CN 103039064 A 4/2013
CN 103222247 A 7/2013
CN 103237191 A 8/2013
CN 103384235 A 11/2013
CN 103442774 A 12/2013
CN 103458215 A 12/2013
CN 103649985 A 3/2014
CN 103718152 A 4/2014
CN 103748610 A 4/2014
CN 104010158 A 8/2014
CN 104081335 A 10/2014
CN 104270597 A 1/2015
CN 104427288 A 3/2015
CN 104469143 A 3/2015
CN 104602133 A 5/2015
CN 104869046 A 8/2015
CN 104980578 A 10/2015
CN 105094957 A 11/2015
CN 105141498 A 12/2015
CN 105204846 A 12/2015
CN 105264473 A 1/2016
CN 105308634 A 2/2016
CN 105389173 A 3/2016
CN 105391778 A 3/2016
CN 105554429 A 5/2016
CN 105578111 A 5/2016
CN 105900376 A 8/2016
CN 106210855 A 12/2016
CN 106303648 A 1/2017
CN 106471793 A 3/2017
CN 106664389 A 5/2017
CN 106713946 A 5/2017
CN 106843626 A 6/2017
CN 107066523 A 8/2017
CN 107122049 A 9/2017
CN 107491257 A 12/2017
CN 107533417 A 1/2018
CN 107534656 A 1/2018
CN 107704177 A 2/2018
CN 107728876 A 2/2018
CN 104025538 B 4/2018
CN 107992248 A 5/2018
CN 108933965 A 12/2018
CN 109196825 A 1/2019
CN 110456971 A 11/2019
CN 111095165 A 5/2020
CN 111108740 A 5/2020
CN 111601065 A 8/2020
CN 111913630 A 11/2020
CN 112088530 A 12/2020
CN 112214275 A 1/2021
CN 112261338 A 1/2021
CN 112416223 A 2/2021
EP 1562105 A2 8/2005
EP 1568966 A2 8/2005
EP 1903791 A2 3/2008
EP 1986431 A2 10/2008
EP 2056568 A1 5/2009
EP 2237534 A1 10/2010
EP 2237536 A1 10/2010
EP 2600584 A1 6/2013
EP 2446619 B1 10/2015
EP 3038427 A1 6/2016
EP 2761582 B1 3/2017
EP 2258103 B1 5/2018
EP 3163866 B1 5/2020
EP 4109891 A1 12/2022
IN 1038MUM2005 A 6/2007
JP 6-113297 A 4/1994
JP 6-276335 A 9/1994
JP 6-276515 A 9/1994
JP 6-282405 A 10/1994
JP 7-135594 A 5/1995
JP 8-279998 A 10/1996
JP 9-182046 A 7/1997
JP 9-233384 A 9/1997
JP 9-247655 A 9/1997
JP 9-265457 A 10/1997
JP 2001-67099 A 3/2001
JP 2001-169166 A 6/2001
JP 2002-251365 A 9/2002
JP 2002-320140 A 10/2002
JP 2002-351802 A 12/2002
JP 2003-101981 A 4/2003
JP 2003-134382 A 5/2003
JP 2003-189168 A 7/2003
JP 2003-274376 A 9/2003
JP 2003-299050 A 10/2003
JP 2003-348444 A 12/2003
JP 2004-187273 A 7/2004
JP 2004-193860 A 7/2004
JP 2004-221738 A 8/2004
JP 2005-94696 A 4/2005
JP 2005-159567 A 6/2005
JP 2005-222553 A 8/2005
JP 2005-260289 A 9/2005
JP 2005-286445 A 10/2005
JP 2005-303736 A 10/2005
JP 2006-135495 A 5/2006
JP 2006-166414 A 6/2006
JP 2006-222822 A 8/2006
JP 2006-245732 A 9/2006
JP 2006-246019 A 9/2006
JP 2006-254350 A 9/2006
JP 2006-319742 A 11/2006
JP 2007-88630 A 4/2007
JP 2007-140060 A 6/2007
JP 2007-150877 A 6/2007
JP 2007-150917 A 6/2007
JP 2007-150921 A 6/2007
JP 2007-517462 A 6/2007
JP 2007-200329 A 8/2007
JP 2007-201727 A 8/2007
JP 2007-274034 A 10/2007
JP 2007-282263 A 10/2007
JP 2007-300452 A 11/2007
JP 2008-17373 A 1/2008
JP 2008-28586 A 2/2008
JP 2008-76818 A 4/2008
JP 2008-76853 A 4/2008
JP 2008-99330 A 4/2008
JP 2008-125105 A 5/2008
JP 2008-136119 A 6/2008
JP 2008-533838 A 8/2008
JP 2008-289014 A 11/2008
JP 2009-502048 A 1/2009
JP 2009-159253 A 7/2009
JP 2009-188975 A 8/2009
JP 2009-217815 A 9/2009
JP 2009-232290 A 10/2009
JP 2009-265692 A 11/2009
JP 2009-296583 A 12/2009
JP 2010-15239 A 1/2010
JP 2010-206745 A 9/2010
JP 2010-541398 A 12/2010
JP 2012-244340 A 12/2012
JP 2013-524683 A 6/2013
JP 2014-71835 A 4/2014
JP 2014-87126 A 5/2014
JP 2014-170982 A 9/2014
JP 2015-11507 A 1/2015
JP 2015-170234 A 9/2015
JP 2015-201087 A 11/2015
JP 2016-1446 A 1/2016
JP 2016-24557 A 2/2016
JP 2016-38615 A 3/2016
JP 2016-53929 A 4/2016

(56) References Cited

FOREIGN PATENT DOCUMENTS

| | | | |
|---|---|---|---|
| JP | 2016-157292 | A | 9/2016 |
| JP | 2016-167806 | A | 9/2016 |
| JP | 2016-174282 | A | 9/2016 |
| JP | 2017-532645 | A | 11/2017 |
| JP | 2017-228843 | A | 12/2017 |
| JP | 2017-229060 | A | 12/2017 |
| JP | 2018-7158 | A | 1/2018 |
| JP | 2018-56719 | A | 4/2018 |
| JP | 2018-136828 | A | 8/2018 |
| JP | 2018-200624 | A | 12/2018 |
| JP | 2019-114282 | A | 7/2019 |
| JP | 2020-510929 | A | 4/2020 |
| JP | 2021-40300 | A | 3/2021 |
| KR | 1997-0031883 | A | 6/1997 |
| KR | 1999-0044201 | A | 6/1999 |
| KR | 10-2003-0016405 | A | 2/2003 |
| KR | 10-2004-0016688 | A | 2/2004 |
| KR | 10-2004-0045338 | A | 6/2004 |
| KR | 10-2005-0054684 | A | 6/2005 |
| KR | 10-2006-0031959 | A | 4/2006 |
| KR | 10-2006-0064326 | A | 6/2006 |
| KR | 10-2006-0116902 | A | 11/2006 |
| KR | 10-2007-0111270 | A | 11/2007 |
| KR | 10-2008-0096042 | A | 10/2008 |
| KR | 10-2009-0002641 | A | 1/2009 |
| KR | 10-2009-0004176 | A | 1/2009 |
| KR | 10-2009-0017901 | A | 2/2009 |
| KR | 10-2009-0017906 | A | 2/2009 |
| KR | 10-2009-0036226 | A | 4/2009 |
| KR | 10-2009-0042499 | A | 4/2009 |
| KR | 10-0891449 | A | 4/2009 |
| KR | 10-2009-0122805 | | 12/2009 |
| KR | 10-2009-0126516 | A | 12/2009 |
| KR | 10-2013-0090244 | A | 8/2013 |
| KR | 10-2013-0138150 | A | 12/2013 |
| KR | 10-2016-0092820 | A | 8/2016 |
| KR | 10-2017-0128498 | A | 11/2017 |
| KR | 10-2018-0085931 | A | 7/2018 |
| KR | 10-2019-0033082 | A | 3/2019 |
| KR | 10-1989433 | B1 | 6/2019 |
| KR | 10-2020-0039030 | A | 4/2020 |
| TW | I321955 | B | 3/2010 |
| WO | 01/18665 | A1 | 3/2001 |
| WO | 02/37848 | A1 | 5/2002 |
| WO | 02/093344 | A1 | 11/2002 |
| WO | 03/077553 | A1 | 9/2003 |
| WO | 2004/032507 | A1 | 4/2004 |
| WO | 2005/060501 | A2 | 7/2005 |
| WO | 2005/086159 | A2 | 9/2005 |
| WO | 2006/063343 | A2 | 6/2006 |
| WO | 2006/073020 | A1 | 7/2006 |
| WO | 2007/008321 | A2 | 1/2007 |
| WO | 2007/063922 | A1 | 6/2007 |
| WO | 2008/040566 | A1 | 4/2008 |
| WO | 2009/005914 | A1 | 1/2009 |
| WO | 2009/042579 | A1 | 4/2009 |
| WO | 2009/148781 | A1 | 12/2009 |
| WO | 2010/001672 | A1 | 1/2010 |
| WO | 2010/137513 | A1 | 12/2010 |
| WO | 2011/126505 | A1 | 10/2011 |
| WO | 2011/146605 | A1 | 11/2011 |
| WO | 2011/146839 | A1 | 11/2011 |
| WO | 2011/161145 | A1 | 12/2011 |
| WO | 2012/037170 | A1 | 3/2012 |
| WO | 2012/170118 | A1 | 12/2012 |
| WO | 2013/114821 | A1 | 8/2013 |
| WO | 2014/052871 | A1 | 4/2014 |
| WO | 2014/058937 | A1 | 4/2014 |
| WO | 2014/077987 | A1 | 5/2014 |
| WO | 2014/168616 | A1 | 10/2014 |
| WO | 2014/200730 | A1 | 12/2014 |
| WO | 2016/046589 | A1 | 3/2016 |
| WO | 2016/168154 | A1 | 10/2016 |
| WO | 2017/038261 | A1 | 3/2017 |
| WO | 2017/218143 | A1 | 12/2017 |
| WO | 2017/218153 | A1 | 12/2017 |
| WO | 2018/057272 | A1 | 3/2018 |
| WO | 2018/213401 | A1 | 11/2018 |
| WO | 2018/213415 | A1 | 11/2018 |
| WO | 2018/213844 | A1 | 11/2018 |
| WO | 2018/232333 | A1 | 12/2018 |
| WO | 2019/067131 | A1 | 4/2019 |
| WO | 2019/217009 | A1 | 11/2019 |
| WO | 2019/217477 | A1 | 11/2019 |
| WO | 2021/112983 | A1 | 6/2021 |

OTHER PUBLICATIONS

Extended European Search Report received for European Patent Application No. 24160234.1, mailed on May 28, 2024, 6 pages.

Notice of Acceptance received for Australian Patent Application No. 2024202768, mailed on Jun. 4, 2024, 3 pages.

Notice of Allowance received for U.S. Appl. No. 17/684,843, mailed on Jun. 5, 2024, 5 pages.

Office Action received for European Patent Application No. 22705232.1, mailed on May 27, 2024, 7 pages.

Office Action received for Japanese Patent Application No. 2023-571161, mailed on May 28, 2024, 4 pages (2 pages of English Translation and 2 pages of Official Copy).

Applicant-Initiated Interview Summary received for U.S. Appl. No. 17/484,899, mailed on Jun. 24, 2024, 4 pages.

Notice of Allowance received for Korean Patent Application No. 10-2023-0001668, mailed on May 22, 2024, 6 pages (2 pages of English Translation and 4 pages of Official Copy).

Office Action received for Chinese Patent Application No. 201910704856.X, mailed on Jun. 11, 2024, 33 pages (1 page of English Translation and 32 pages of Official Copy).

Non-Final Office Action received for U.S. Appl. No. 18/067,350, mailed on May 28, 2024, 43 pages.

Notice of Allowance received for Chinese Patent Application No. 202311042451.7, mailed on May 15, 2024, 4 pages (1 page of English Translation and 3 pages of Official Copy).

Applicant-Initiated Interview Summary received for U.S. Appl. No. 17/483,679, mailed on Dec. 18, 2023, 2 pages.

Corrected Notice of Allowance received for U.S. Appl. No. 17/732,204, mailed on Dec. 4, 2023, 5 pages.

Corrected Notice of Allowance received for U.S. Appl. No. 17/740,104, mailed on Jan. 2, 2024, 2 pages.

Final Office Action received for U.S. Appl. No. 18/067,350, mailed on Dec. 13, 2023, 44 pages.

Intention to Grant received for European Patent Application No. 21728781.2, mailed on Dec. 12, 2023, 9 pages.

International Preliminary Report on Patentability received for PCT Patent Application No. PCT/US2022/029261, mailed on Nov. 30, 2023, 12 pages.

International Preliminary Report on Patentability received for PCT Patent Application No. PCT/US2022/029273, mailed on Nov. 30, 2023, 14 pages.

International Preliminary Report on Patentability received for PCT Patent Application No. PCT/US2022/029580, mailed on Nov. 30, 2023, 14 pages.

International Search Report and Written Opinion received for PCT Patent Application No. PCT/US2023/020569, mailed on Nov. 13, 2023, 23 pages.

Notice of Allowance received for U.S. Appl. No. 17/483,542, mailed on Dec. 20, 2023, 6 pages.

Corrected Notice of Allowance received for U.S. Appl. No. 17/684,843, mailed on Mar. 4, 2024, 2 pages.

Notice of Allowance received for Korean Patent Application No. 10-2023-7039382, mailed on Feb. 13, 2024, 6 pages (2 pages of English Translation and 4 pages of Official Copy).

Notice of Allowance received for Korean Patent Application No. 10-2024-7000870, mailed on Feb. 13, 2024, 5 pages (2 pages of English Translation and 3 pages of Official Copy).

Corrected Notice of Allowance received for U.S. Appl. No. 17/903,946, mailed on Apr. 22, 2024, 2 pages.

Non-Final Office Action received for U.S. Appl. No. 17/950,868, mailed on Apr. 24, 2024, 16 pages.

(56) References Cited

OTHER PUBLICATIONS

Non-Final Office Action received for U.S. Appl. No. 18/138,348, mailed on Apr. 30, 2024, 16 pages.
Notice of Acceptance received for Australian Patent Application No. 2023204396, mailed on Apr. 15, 2024, 3 pages.
Applicant-Initiated Interview Summary received for U.S. Appl. No. 17/950,868, mailed on Sep. 10, 2024, 3 pages.
Corrected Notice of Allowance received for U.S. Appl. No. 17/903,946, mailed on Sep. 3, 2024, 2 pages.
Decision to Grant received for Japanese Patent Application No. 2023-571312, mailed on Aug. 29, 2024, 3 pages (1 page of English Translation and 2 pages of Official Copy).
Decision to Grant received for Japanese Patent Application No. 2024-003876, mailed on Sep. 2, 2024, 3 pages (1 page of English Translation and 2 pages of Official Copy).
Extended European Search Report received for European Patent Application No. 24159026.4, mailed on Jul. 10, 2024, 9 pages.
Final Office Action received for U.S. Appl. No. 17/950,868, mailed on Aug. 29, 2024, 13 pages.
International Search Report and Written Opinion received for PCT Patent Application No. PCT/US2024/017017, mailed on Aug. 2, 2024, 27 pages.
Invitation to Pay Additional Fees received for PCT Patent Application No. PCT/US2024/017017, mailed on May 15, 2024, 3 pages.
Non-Final Office Action received for U.S. Appl. No. 18/389,655, mailed on Aug. 23, 2024, 23 pages.
Notice of Allowance received for U.S. Appl. No. 17/484,899, mailed on Aug. 26, 2024, 21 pages.
Notice of Allowance received for U.S. Appl. No. 17/903,946, mailed on Aug. 27, 2024, 5 pages.
Office Action received for Chinese Patent Application No. 202410030102.1, mailed on Jul. 23, 2024, 18 pages (9 pages of English Translation and 9 pages of Official Copy).
Office Action received for Japanese Patent Application No. 2023-028786, mailed on Aug. 23, 2024, 10 pages (5 pages of English Translation and 5 pages of Official Copy).
"6. Voice chat with friends through QQ", Online available at: https://v.qq.com/x/page/a0166p7xrt0.html, Sep. 22, 2015, 1 page.
Abdulezer et al., "Skype For Dummies", Available Online at: https://ixn.es/Skype%20For%20Dummies.pdf, 2007, 361 pages.
Advisory Action received for U.S. Appl. No. 17/483,679, mailed on Sep. 20, 2022, 8 pages.
Androidcentral, "How do i respond to group messages from notification bar?", Available online at: https://forums.androidcentral.com/ask-question/952030-how-do-i-respond-group-messages-notification-bar.html, Mar. 25, 2019, 3 pages.
Applicant-Initiated Interview Summary received for U.S. Appl. No. 16/790,619, mailed on Jul. 28, 2020, 3 pages.
Applicant-Initiated Interview Summary received for U.S. Appl. No. 16/528,941, mailed on Jun. 19, 2020, 3 pages.
Applicant-Initiated Interview Summary received for U.S. Appl. No. 16/528,941, mailed on Nov. 10, 2020, 2 pages.
Applicant-Initiated Interview Summary received for U.S. Appl. No. 16/799,481, mailed on Jul. 24, 2020, 3 pages.
Applicant-Initiated Interview Summary received for U.S. Appl. No. 17/026,818, mailed on Dec. 15, 2020, 7 pages.
Applicant-Initiated Interview Summary received for U.S. Appl. No. 17/026,818, mailed on Mar. 8, 2021, 4 pages.
Applicant-Initiated Interview Summary received for U.S. Appl. No. 17/121,610, mailed on Oct. 29, 2021, 2 pages.
Applicant-Initiated Interview Summary received for U.S. Appl. No. 17/223,794, mailed on Sep. 7, 2021, 3 pages.
Applicant-Initiated Interview Summary received for U.S. Appl. No. 17/476,404, mailed on Dec. 20, 2022, 2 pages.
Applicant-Initiated Interview Summary received for U.S. Appl. No. 17/476,404, mailed on Jul. 27, 2022, 6 pages.
Applicant-Initiated Interview Summary received for U.S. Appl. No. 17/476,404, mailed on Jun. 2, 2023, 2 pages.
Applicant-Initiated Interview Summary received for U.S. Appl. No. 17/476,404, mailed on Mar. 18, 2022, 2 pages.
Applicant-Initiated Interview Summary received for U.S. Appl. No. 17/479,897, mailed on Jun. 12, 2023, 2 pages.
Applicant-Initiated Interview Summary received for U.S. Appl. No. 17/479,897, mailed on Oct. 31, 2022, 3 pages.
Applicant-Initiated Interview Summary received for U.S. Appl. No. 17/482,977, mailed on Dec. 5, 2022, 2 pages.
Applicant-Initiated Interview Summary received for U.S. Appl. No. 17/482,987, mailed on Apr. 11, 2022, 4 pages.
Applicant-Initiated Interview Summary received for U.S. Appl. No. 17/483,542, mailed on May 22, 2023, 3 pages.
Applicant-Initiated Interview Summary received for U.S. Appl. No. 17/483,542, mailed on Nov. 23, 2022, 4 pages.
Applicant-Initiated Interview Summary received for U.S. Appl. No. 17/483,564, mailed on Apr. 21, 2023, 5 pages.
Applicant-Initiated Interview Summary received for U.S. Appl. No. 17/483,564, mailed on Jul. 21, 2022, 5 pages.
Applicant-Initiated Interview Summary received for U.S. Appl. No. 17/483,564, mailed on Jun. 21, 2023, 4 pages.
Applicant-Initiated Interview Summary received for U.S. Appl. No. 17/483,564, mailed on Mar. 14, 2022, 2 pages.
Applicant-Initiated Interview Summary received for U.S. Appl. No. 17/483,679, mailed on Apr. 29, 2022, 2 pages.
Applicant-Initiated Interview Summary received for U.S. Appl. No. 17/483,679, mailed on Aug. 18, 2023, 2 pages.
Applicant-Initiated Interview Summary received for U.S. Appl. No. 17/483,679, mailed on Aug. 23, 2022, 3 pages.
Applicant-Initiated Interview Summary received for U.S. Appl. No. 17/483,679, mailed on May 19, 2023, 3 pages.
Applicant-Initiated Interview Summary received for U.S. Appl. No. 17/484,899, mailed on Apr. 27, 2022, 5 pages.
Applicant-Initiated Interview Summary received for U.S. Appl. No. 17/484,899, mailed on Sep. 1, 2022, 5 pages.
Applicant-Initiated Interview Summary received for U.S. Appl. No. 17/484,907, mailed on Jan. 10, 2022, 2 pages.
Applicant-Initiated Interview Summary received for U.S. Appl. No. 17/872,736, mailed on Jul. 25, 2023, 2 pages.
Applicant-Initiated Interview Summary received for U.S. Appl. No. 17/950,900, mailed on Jan. 26, 2023, 5 pages.
Brief Communication Regarding Oral Proceedings received for European Patent Application No. 20205496.1, mailed on Apr. 19, 2023, 1 page.
Certificate of Examination received for Australian Patent Application No. 2019100499, mailed on Aug. 15, 2019, 2 pages.
Certificate of Examination received for Australian Patent Application No. 2019101062, mailed on Jun. 2, 2020, 2 pages.
Certificate of Examination received for Australian Patent Application No. 2020101324, mailed on Sep. 7, 2020, 2 pages.
Corrected Notice of Allowance received for U.S. Appl. No. 16/109,552, mailed on Jun. 13, 2019, 2 pages.
Corrected Notice of Allowance received for U.S. Appl. No. 16/144,572, mailed on Mar. 21, 2019, 3 pages.
Corrected Notice of Allowance received for U.S. Appl. No. 16/147,432, mailed on Jan. 18, 2019, 3 pages.
Corrected Notice of Allowance received for U.S. Appl. No. 16/147,432, mailed on Jul. 16, 2019, 3 pages.
Corrected Notice of Allowance received for U.S. Appl. No. 16/511,578, mailed on Feb. 13, 2020, 3 pages.
Corrected Notice of Allowance received for U.S. Appl. No. 16/790,619, mailed on Oct. 13, 2020, 3 pages.
Corrected Notice of Allowance received for U.S. Appl. No. 16/799,481, mailed on Oct. 27, 2020, 3 pages.
Corrected Notice of Allowance received for U.S. Appl. No. 17/027,373, mailed on Jul. 12, 2022, 2 pages.
Corrected Notice of Allowance received for U.S. Appl. No. 17/027,373, mailed on Oct. 26, 2022, 2 pages.
Corrected Notice of Allowance received for U.S. Appl. No. 17/121,610, mailed on Jun. 7, 2022, 4 pages.
Corrected Notice of Allowance received for U.S. Appl. No. 17/121,610, mailed on Mar. 31, 2022, 3 pages.
Corrected Notice of Allowance received for U.S. Appl. No. 17/121,610, mailed on May 20, 2022, 4 pages.
Corrected Notice of Allowance received for U.S. Appl. No. 17/157,166, mailed on Apr. 13, 2022, 4 pages.

(56) References Cited

OTHER PUBLICATIONS

Corrected Notice of Allowance received for U.S. Appl. No. 17/157,166, mailed on Apr. 25, 2022, 4 pages.
Corrected Notice of Allowance received for U.S. Appl. No. 17/157,166, mailed on Dec. 9, 2021, 4 pages.
Corrected Notice of Allowance received for U.S. Appl. No. 17/157,166, mailed on Dec. 15, 2021, 4 pages.
Corrected Notice of Allowance received for U.S. Appl. No. 17/157,166, mailed on Jan. 5, 2022, 4 pages.
Corrected Notice of Allowance received for U.S. Appl. No. 17/157,166, mailed on Jun. 29, 2022, 4 pages.
Corrected Notice of Allowance received for U.S. Appl. No. 17/479,897, mailed on Aug. 17, 2023, 2 pages.
Corrected Notice of Allowance received for U.S. Appl. No. 17/482,977, mailed on Apr. 24, 2023, 3 pages.
Corrected Notice of Allowance received for U.S. Appl. No. 17/483,542, mailed on Aug. 25, 2023, 3 pages.
Corrected Notice of Allowance received for U.S. Appl. No. 17/483,549, mailed on Aug. 24, 2022, 3 pages.
Corrected Notice of Allowance received for U.S. Appl. No. 17/483,582, mailed on Feb. 15, 2022, 2 pages.
Corrected Notice of Allowance received for U.S. Appl. No. 17/484,907, mailed on Aug. 26, 2022, 2 pages.
Corrected Notice of Allowance received for U.S. Appl. No. 17/484,907, mailed on Jun. 15, 2022, 2 pages.
Corrected Notice of Allowance received for U.S. Appl. No. 17/484,907, mailed on Mar. 18, 2022, 2 pages.
Corrected Notice of Allowance received for U.S. Appl. No. 17/950,900, mailed on Apr. 14, 2023, 2 pages.
Corrected Notice of Allowance received for U.S. Appl. No. 17/950,900, mailed on Jun. 30, 2023, 2 pages.
Corrected Notice of Allowance received for U.S. Appl. No. 17/950,922, mailed on Apr. 14, 2023, 2 pages.
Corrected Notice of Allowance received for U.S. Appl. No. 17/950,922, mailed on Oct. 2, 2023, 3 pages.
Corrected Search Report and Opinion received for Danish Patent Application No. PA201870364, mailed on Sep. 5, 2018, 13 pages.
Decision to Grant received for Danish Patent Application No. PA201870362, mailed on May 15, 2020, 2 pages.
Decision to Grant received for European Patent Application No. 11150223.3, mailed on Aug. 1, 2013, 2 pages.
Decision to Grant received for European Patent Application No. 13175232.1, mailed on Feb. 18, 2016, 2 pages.
Decision to Grant received for European Patent Application No. 19729395.4, mailed on Dec. 9, 2021, 2 pages.
Decision to Grant received for Japanese Patent Application No. 2013-262976, mailed on Nov. 16, 2015, 6 pages.
Decision to Refuse received for European Patent Application No. 20205496.1, mailed on May 12, 2023, 16 pages.
Dolan, Tim, "How To Make a Laptop Webcam into a Document Camera—IPEVO Mirror—Cam Review", Retrieved from the Internet: URL: https://www.youtube.com/watch?v=-K8jyZ1hbbg, Aug. 29, 2020, 1 page.
Examiner-Initiated Interview Summary received for U.S. Appl. No. 16/528,941, mailed on Dec. 1, 2020, 2 pages.
Examiner-Initiated Interview Summary received for U.S. Appl. No. 17/903,946, mailed on Jun. 28, 2023, 2 pages.
Examiner-Initiated Interview Summary received for U.S. Appl. No. 17/027,373, mailed on Mar. 31, 2022, 4 pages.
Ex-Parte Quayle Action received for U.S. Appl. No. 17/121,610, mailed on Dec. 9, 2021, 7 pages.
Ex-Parte Quayle Action received for U.S. Appl. No. 17/903,946, mailed on Aug. 4, 2023, 4 pages.
Extended European Search Report (includes Partial European Search Report and European Search Opinion) received for European Patent Application No. 11150223.3, mailed on May 16, 2011, 7 pages.
Extended European Search Report (includes Partial European Search Report and European Search Opinion) received for European Patent Application No. 13175232.1 mailed on Oct. 21, 2013, 7 pages.
Extended European Search Report received for European Patent Application No. 20166552.8, mailed on Jun. 12, 2020, 9 pages.
Extended European Search Report received for European Patent Application No. 20205496.1, mailed on Mar. 11, 2021, 11 pages.
Final Office Action received for U.S. Appl. No. 12/789,426, mailed on Oct. 10, 2013, 9 pages.
Final Office Action received for U.S. Appl. No. 16/528,941, mailed on Jul. 13, 2020, 15 pages.
Final Office Action received for U.S. Appl. No. 17/026,818, mailed on Jan. 29, 2021, 21 pages.
Final Office Action received for U.S. Appl. No. 17/476,404, mailed on May 5, 2022, 30 pages.
Final Office Action received for U.S. Appl. No. 17/479,897, mailed on Jan. 10, 2023, 15 pages.
Final Office Action received for U.S. Appl. No. 17/483,564, mailed on Apr. 18, 2022, 23 pages.
Final Office Action received for U.S. Appl. No. 17/483,564, mailed on May 25, 2023, 26 pages.
Final Office Action received for U.S. Appl. No. 17/483,679, mailed on Jun. 13, 2023, 33 pages.
Final Office Action received for U.S. Appl. No. 17/483,679, mailed on May 24, 2022, 21 pages.
Final Office Action received for U.S. Appl. No. 17/484,899, mailed on May 12, 2022, 29 pages.
Final Office Action received for U.S. Appl. No. 17/950,900, mailed on Jan. 23, 2023, 14 pages.
Garrison, D. R., "An Analysis and Evaluation of Audio Teleconferencing to Facilitate Education at a Distance", Online Available at: https://doi.org/10.1080/08923649009526713, American journal of distance education, Jol. 4, No. 3, Sep. 24, 2009, 14 pages.
"HuddleCamHD SimplTrack2 Auto Tracking Camera Installation & Operation Manual", Available Online at: https://huddlecamhd.com/wp-content/uploads/2021/01/SimplTrack2-User-Manual-v1_2-6-20.pdf, Jun. 2020, 41 pages.
Intention to Grant received for Danish Patent Application No. PA201870362, mailed on Feb. 14, 2020, 2 pages.
Intention to Grant received for Danish Patent Application No. PA202070617, mailed on Nov. 15, 2021, 2 pages.
Intention to Grant received for European Patent Application No. 13175232.1, mailed on Sep. 8, 2015, 7 pages.
Intention to Grant received for European Patent Application No. 19729395.4, mailed on Jul. 23, 2021, 10 pages.
Intention to Grant received for European Patent Application No. 20166552.8, mailed on Jun. 29, 2023, 8 pages.
Intention to Grant received for European Patent Application No. 21728781.2, mailed on Jul. 28, 2023, 9 pages.
International Preliminary Report on Patentability received for PCT Patent Application No. PCT/US2010/062306, mailed on Jul. 19, 2012, 13 pages.
International Preliminary Report on Patentability received for PCT Patent Application No. PCT/US2018/048151, mailed on Apr. 9, 2020, 14 pages.
International Preliminary Report on Patentability received for PCT Patent Application No. PCT/US2019/031202, mailed on Nov. 19, 2020, 13 pages.
International Preliminary Report on Patentability received for PCT Patent Application No. PCT/US2021/031760, mailed on Nov. 24, 2022, 11 pages.
International Preliminary Report on Patentability received for PCT Patent Application No. PCT/US2022/014271, mailed on Aug. 10, 2023, 17 pages.
International Search Report and Written Opinion received for PCT Patent Application No. PCT/US2010/062306, mailed on May 17, 2011, 18 pages.
International Search Report and Written Opinion received for PCT Patent Application No. PCT/US2018/048151, mailed on Jan. 10, 2019, 23 pages.
International Search Report and Written Opinion received for PCT Patent Application No. PCT/US2019/031202, mailed on Oct. 4, 2019, 19 pages.
International Search Report and Written Opinion received for PCT Patent Application No. PCT/US2021/031760, mailed on Sep. 16, 2021, 18 pages.

(56) References Cited

OTHER PUBLICATIONS

International Search Report and Written Opinion received for PCT Patent Application No. PCT/US2022/014271, mailed on Jul. 4, 2022, 23 pages.
International Search Report and Written Opinion received for PCT Patent Application No. PCT/US2022/029261, mailed on Oct. 20, 2022, 18 pages.
International Search Report and Written Opinion received for PCT Patent Application No. PCT/US2022/029273, mailed on Oct. 27, 2022, 19 pages.
International Search Report and Written Opinion received for PCT Patent Application No. PCT/US2022/029580, mailed on Nov. 7, 2022, 20 pages.
International Search Report and Written Opinion received for PCT Patent Application No. PCT/US2022/044592, mailed on Mar. 14, 2023, 22 pages.
Invitation to Pay Additional Fees and Partial International Search Report received for PCT Patent Application No. PCT/US2022/014271, mailed on May 12, 2022, 20 pages.
Invitation to Pay Additional Fees and Partial International Search Report received for PCT Patent Application No. PCT/US2022/029261, mailed on Aug. 29, 2022, 16 pages.
Invitation to Pay Additional Fees and Partial International Search Report received for PCT Patent Application No. PCT/US2022/029580, mailed on Sep. 5, 2022, 13 pages.
Invitation to Pay Additional Fees received for PCT Patent Application No. PCT/US2018/048151, mailed on Nov. 6, 2018, 18 pages.
Invitation to Pay Additional Fees received for PCT Patent Application No. PCT/US2019/031202, mailed on Aug. 8, 2019, 12 pages.
Invitation to Pay Additional Fees received for PCT Patent Application No. PCT/US2022/029273, mailed on Sep. 2, 2022, 13 pages.
Invitation to Pay Additional Fees received for PCT Patent Application No. PCT/US2022/044592, mailed on Jan. 16, 2023, 21 pages.
Invitation to Pay Search Fees received for European Patent Application No. 21728781.2, mailed on Dec. 2, 2022, 3 pages.
Jiutian Technology, "Windows 8 Chinese version from entry to proficiency", Jan. 1, 2014, 5 pages.
Larson, Tom, "How to Turn your Webcam into a Document Camera", Retrieved from the Internet: URL: https://www.youtube.com/watchv=UlaW22FxRZM, Nov. 7, 2020, 1 page.
Minutes of the Oral Proceedings received for European Patent Application No. 19729395.4, mailed on Jul. 21, 2021, 6 pages.
Minutes of the Oral Proceedings received for European Patent Application No. 20205496.1, mailed on May 9, 2023, 7 pages.
Moth D., "Share Code—Write Code Once for Both Mobile and Desktop Apps", MSDN Magazine, http://msdn.microsoft.com/en-us/magazine/cc163387.aspx, Jul. 2007, 11 pages.
Non-Final Office Action received for U.S. Appl. No. 16/035,422, mailed on Nov. 30, 2018, 13 pages.
Non-Final Office Action received for U.S. Appl. No. 17/157,166, mailed on Jul. 9, 2021, 12 pages.
Non-Final Office Action received for U.S. Appl. No. 12/789,426, mailed on Apr. 4, 2013, 8 pages.
Non-Final Office Action received for U.S. Appl. No. 16/109,552, mailed on Oct. 17, 2018, 16 pages.
Non-Final Office Action received for U.S. Appl. No. 16/144,572, mailed on Nov. 30, 2018, 8 pages.
Non-Final Office Action received for U.S. Appl. No. 16/383,403, mailed on Aug. 23, 2019, 10 pages.
Non-Final Office Action received for U.S. Appl. No. 16/528,941, mailed on Dec. 7, 2020, 15 pages.
Non-Final Office Action received for U.S. Appl. No. 16/528,941, mailed on Jan. 30, 2020, 14 pages.
Non-Final Office Action received for U.S. Appl. No. 16/790,619, mailed on May 4, 2020, 13 pages.
Non-Final Office Action received for U.S. Appl. No. 16/799,481, mailed on May 1, 2020, 13 pages.
Non-Final Office Action received for U.S. Appl. No. 17/026,818, mailed on Nov. 25, 2020, 20 pages.
Non-Final Office Action received for U.S. Appl. No. 17/027,373, mailed on Feb. 2, 2022, 17 pages.
Non-Final Office Action received for U.S. Appl. No. 17/121,610, mailed on May 13, 2021, 17 pages.
Non-Final Office Action received for U.S. Appl. No. 17/223,794, mailed on Jun. 16, 2021, 32 pages.
Non-Final Office Action received for U.S. Appl. No. 17/476,404, mailed on Feb. 8, 2022, 26 pages.
Non-Final Office Action received for U.S. Appl. No. 17/476,404, mailed on Mar. 30, 2023, 29 pages.
Non-Final Office Action received for U.S. Appl. No. 17/476,404, mailed on Sep. 14, 2022, 31 pages.
Non-Final Office Action received for U.S. Appl. No. 17/479,897, mailed on Apr. 25, 2023, 14 pages.
Non-Final Office Action received for U.S. Appl. No. 17/479,897, mailed on Aug. 30, 2022, 10 pages.
Non-Final Office Action received for U.S. Appl. No. 17/482,977, mailed on Oct. 13, 2022, 20 pages.
Non-Final Office Action received for U.S. Appl. No. 17/482,987, mailed on Jan. 18, 2022, 25 pages.
Non-Final Office Action received for U.S. Appl. No. 17/483,542, mailed on Jan. 31, 2023, 14 pages.
Non-Final Office Action received for U.S. Appl. No. 17/483,542, mailed on Sep. 22, 2022, 18 pages.
Non-Final Office Action received for U.S. Appl. No. 17/483,549, mailed on Jan. 11, 2022, 5 pages.
Non-Final Office Action received for U.S. Appl. No. 17/483,564, mailed on Jan. 6, 2022, 23 pages.
Non-Final Office Action received for U.S. Appl. No. 17/483,564, mailed on Nov. 28, 2022, 24 pages.
Non-Final Office Action received for U.S. Appl. No. 17/483,679, mailed on Dec. 9, 2022, 31 pages.
Non-Final Office Action received for U.S. Appl. No. 17/483,679, mailed on Feb. 1, 2022, 19 pages.
Non-Final Office Action received for U.S. Appl. No. 17/484,899, mailed on Jan. 24, 2022, 24 pages.
Non-Final Office Action received for U.S. Appl. No. 17/484,899, mailed on Jun. 14, 2023, 41 pages.
Non-Final Office Action received for U.S. Appl. No. 17/484,907, mailed on Nov. 19, 2021, 24 pages.
Non-Final Office Action received for U.S. Appl. No. 17/684,843, mailed on Aug. 11, 2023, 23 pages.
Non-Final Office Action received for U.S. Appl. No. 17/732,204, mailed on Aug. 4, 2023, 18 pages.
Non-Final Office Action received for U.S. Appl. No. 17/740,104, mailed on Aug. 2, 2023, 15 pages.
Non-Final Office Action received for U.S. Appl. No. 17/872,736, mailed on May 11, 2023, 17 pages.
Non-Final Office Action received for U.S. Appl. No. 17/903,946, mailed on Apr. 14, 2023, 17 pages.
Non-Final Office Action received for U.S. Appl. No. 17/950,900, mailed on Dec. 1, 2022, 14 pages.
Non-Final Office Action received for U.S. Appl. No. 14/253,494, mailed on Dec. 30, 2015, 14 pages.
Notice of Acceptance received for Australian Patent Application No. 2010339698, mailed on Dec. 8, 2014, 2 pages.
Notice of Acceptance received for Australian Patent Application No. 2019266225, mailed on Dec. 23, 2020, 3 pages.
Notice of Acceptance received for Australian Patent Application No. 2020239711, mailed on Dec. 16, 2021, 3 pages.
Notice of Acceptance received for Australian Patent Application No. 2021200789, mailed on Feb. 26, 2021, 3 pages.
Notice of Acceptance received for Australian Patent Application No. 2021203903, mailed on May 25, 2022, 3 pages.
Notice of Acceptance received for Australian Patent Application No. 2022201532, mailed on May 22, 2023, 3 pages.
Notice of Allowance received for Australian Patent Application No. 2022228207, mailed on Jul. 3, 2023, 3 pages.
Notice of Allowance received for Chinese Patent Application No. 201910400179.2, mailed on Oct. 9, 2022, 4 pages.
Notice of Allowance received for Chinese Patent Application No. 201080063864.8, mailed on Jan. 15, 2016, 4 pages.

(56) References Cited

OTHER PUBLICATIONS

Notice of Allowance received for Chinese Patent Application No. 201880056514.5, mailed on Jan. 11, 2021, 2 pages.
Notice of Allowance received for Chinese Patent Application No. 201910400180.5, mailed on Nov. 5, 2020, 2 pages.
Notice of Allowance received for Chinese Patent Application No. 202011243876.0, mailed on Sep. 8, 2021, 4 pages.
Notice of Allowance received for Chinese Patent Application No. 202110328601.5, mailed on Jul. 5, 2023, 5 pages.
Notice of Allowance received for Japanese Patent Application No. 2018-183504, mailed on Sep. 27, 2019, 4 pages.
Notice of Allowance received for Japanese Patent Application No. 2019-194597, mailed on Nov. 19, 2021, 4 pages.
Notice of Allowance received for Japanese Patent Application No. 2020-159840, mailed on Jul. 8, 2022, 4 pages.
Notice of Allowance received for Japanese Patent Application No. 2021-206121, mailed on May 15, 2023, 4 pages.
Notice of Allowance received for Japanese Patent Application No. 2022-125792, mailed on Jan. 27, 2023, 4 pages.
Notice of Allowance received for Korean Patent Application No. 10-2020-0123805, mailed on Jun. 19, 2022, 5 pages.
Notice of Allowance received for Korean Patent Application No. 10-2020-7032110, mailed on Mar. 8, 2021, 4 pages.
Notice of Allowance received for Korean Patent Application No. 10-2021-7017731, mailed on Feb. 28, 2023, 5 pages.
Notice of Allowance received for Korean Patent Application No. 10-2022-0091730, mailed on Oct. 4, 2022, 5 pages.
Notice of Allowance received for U.S. Appl. No. 16/035,422, mailed on Apr. 10, 2019, 6 pages.
Notice of Allowance received for U.S. Appl. No. 16/528,941, mailed on Aug. 10, 2021, 5 pages.
Notice of Allowance received for U.S. Appl. No. 16/528,941, mailed on May 19, 2021, 5 pages.
Notice of Allowance received for U.S. Appl. No. 17/157,166, mailed on Nov. 16, 2021, 6 pages.
Notice of Allowance received for U.S. Appl. No. 12/789,426, mailed on Feb. 20, 2014, 7 pages.
Notice of Allowance received for U.S. Appl. No. 14/253,494, mailed on Jan. 18, 2017, 4 pages.
Notice of Allowance received for U.S. Appl. No. 14/253,494, mailed on Oct. 4, 2016, 12 pages.
Notice of Allowance received for U.S. Appl. No. 16/109,552, mailed on Mar. 13, 2019, 25 pages.
Notice of Allowance received for U.S. Appl. No. 16/109,552, mailed on May 13, 2019, 2 pages.
Notice of Allowance received for U.S. Appl. No. 16/144,572, mailed on Feb. 28, 2019, 7 pages.
Notice of Allowance received for U.S. Appl. No. 16/147,432, mailed on Dec. 18, 2018, 13 pages.
Notice of Allowance received for U.S. Appl. No. 16/147,432, mailed on May 20, 2019, 6 pages.
Notice of Allowance received for U.S. Appl. No. 16/383,403, mailed on Jan. 10, 2020, 11 pages.
Notice of Allowance received for U.S. Appl. No. 16/511,578, mailed on Nov. 18, 2019, 12 pages.
Notice of Allowance received for U.S. Appl. No. 16/790,619, mailed on Sep. 8, 2020, 6 pages.
Notice of Allowance received for U.S. Appl. No. 16/799,481, mailed on Sep. 8, 2020, 6 pages.
Notice of Allowance received for U.S. Appl. No. 17/026,818, mailed on May 13, 2021, 10 pages.
Notice of Allowance received for U.S. Appl. No. 17/027,373, mailed on Aug. 2, 2022, 2 pages.
Notice of Allowance received for U.S. Appl. No. 17/027,373, mailed on Jun. 3, 2022, 8 pages.
Notice of Allowance received for U.S. Appl. No. 17/027,373, mailed on Oct. 3, 2022, 5 pages.
Notice of Allowance received for U.S. Appl. No. 17/121,610, mailed on Jul. 7, 2022, 5 pages.
Notice of Allowance received for U.S. Appl. No. 17/121,610, mailed on Jul. 13, 2022, 4 pages.
Notice of Allowance received for U.S. Appl. No. 17/121,610, mailed on Mar. 11, 2022, 5 pages.
Notice of Allowance received for U.S. Appl. No. 17/157,166, mailed on Mar. 30, 2022, 6 pages.
Notice of Allowance received for U.S. Appl. No. 17/479,897, mailed on Jul. 26, 2023, 7 pages.
Notice of Allowance received for U.S. Appl. No. 17/482,977, mailed on Jan. 24, 2023, 10 pages.
Notice of Allowance received for U.S. Appl. No. 17/482,987, mailed on Jun. 23, 2022, 9 pages.
Notice of Allowance received for U.S. Appl. No. 17/482,987, mailed on May 11, 2022, 10 pages.
Notice of Allowance received for U.S. Appl. No. 17/483,542, mailed on Aug. 11, 2023, 9 pages.
Notice of Allowance received for U.S. Appl. No. 17/483,549, mailed on Apr. 15, 2022, 10 pages.
Notice of Allowance received for U.S. Appl. No. 17/483,564, mailed on Jul. 17, 2023, 46 pages.
Notice of Allowance received for U.S. Appl. No. 17/483,582, mailed on Apr. 19, 2022, 5 pages.
Notice of Allowance received for U.S. Appl. No. 17/483,582, mailed on Jan. 20, 2022, 10 pages.
Notice of Allowance received for U.S. Appl. No. 17/484,907, mailed on Jul. 25, 2022, 10 pages.
Notice of Allowance received for U.S. Appl. No. 17/484,907, mailed on Mar. 2, 2022, 13 pages.
Notice of Allowance received for U.S. Appl. No. 17/484,907, mailed on May 20, 2022, 13 pages.
Notice of Allowance received for U.S. Appl. No. 17/872,736, mailed on Aug. 21, 2023, 6 pages.
Notice of Allowance received for U.S. Appl. No. 17/950,900, mailed on Jun. 16, 2023, 6 pages.
Notice of Allowance received for U.S. Appl. No. 17/950,900, mailed on Mar. 7, 2023, 10 pages.
Notice of Allowance received for U.S. Appl. No. 17/950,922, mailed on Apr. 5, 2023, 10 pages.
Notice of Allowance received for U.S. Appl. No. 17/950,922, mailed on Sep. 20, 2023, 6 pages.
Office Action Received for Australian Patent Application No. 2010339698, issued on Aug. 8, 2014, 3 pages.
Office Action Received for Australian Patent Application No. 2010339698, mailed on Jun. 14, 2013, 3 pages.
Office Action received for Australian Patent Application No. 2019100499, mailed on Jun. 28, 2019, 4 pages.
Office Action received for Australian Patent Application No. 2019101062, mailed on Apr. 22, 2020, 2 pages.
Office Action received for Australian Patent Application No. 2019101062, mailed on Dec. 5, 2019, 3 pages.
Office Action received for Australian Patent Application No. 2019266225, mailed on Nov. 23, 2020, 4 pages.
Office Action received for Australian Patent Application No. 2020239711, mailed on Sep. 13, 2021, 5 pages.
Office Action received for Australian Patent Application No. 2021203903, mailed on Feb. 24, 2022, 3 pages.
Office Action received for Australian Patent Application No. 2022201532, mailed on Dec. 19, 2022, 5 pages.
Office Action received for Australian Patent Application No. 2022228207, mailed on Apr. 28, 2023, 3 pages.
Office Action received for Chinese Patent Application No. 201080063864.8, mailed on Jul. 14, 2015, 8 pages.
Office Action received for Chinese Patent Application No. 201080063864.8, mailed on Sep. 2, 2014, 31 pages.
Office Action received for Chinese Patent Application No. 201880056514.5, mailed on Sep. 2, 2020, 7 pages.
Office Action received for Chinese Patent Application No. 201910400179.2, mailed on Dec. 27, 2021, 32 pages.
Office Action received for Chinese Patent Application No. 201910400180.5, mailed on Jun. 1, 2020, 11 pages.
Office Action received for Chinese Patent Application No. 201910704856.X, mailed on Apr. 6, 2021, 13 pages.

(56) References Cited

OTHER PUBLICATIONS

Office Action received for Chinese Patent Application No. 201910704856.X, mailed on Dec. 9, 2020, 23 pages.
Office Action received for Chinese Patent Application No. 201910704856.X, mailed on May 27, 2020, 26 pages.
Office Action received for Chinese Patent Application No. 202010126661.4, mailed on Feb. 3, 2021, 16 pages.
Office Action received for Chinese Patent Application No. 202010126661.4, mailed on Jun. 2, 2022, 11 pages.
Office Action received for Chinese Patent Application No. 202010126661.4, mailed on Mar. 4, 2022, 13 pages.
Office Action received for Chinese Patent Application No. 202011243876.0, mailed on Apr. 6, 2021, 11 pages.
Office Action received for Chinese Patent Application No. 202110327012.5, mailed on Apr. 29, 2022, 17 pages.
Office Action received for Chinese Patent Application No. 202110327012.5, mailed on Mar. 16, 2023, 12 pages.
Office Action received for Chinese Patent Application No. 202110327012.5, mailed on Nov. 28, 2022, 16 pages.
Office Action received for Chinese Patent Application No. 202110328597.2, mailed on Apr. 15, 2022, 18 pages.
Office Action received for Chinese Patent Application No. 202110328597.2, mailed on Jul. 18, 2023, 21 pages.
Office Action received for Chinese Patent Application No. 202110328597.2, mailed on May 15, 2023, 13 pages.
Office Action received for Chinese Patent Application No. 202110328597.2, mailed on Oct. 10, 2022, 13 pages.
Office Action received for Chinese Patent Application No. 202110328601.5, mailed on Apr. 27, 2022, 25 pages.
Office Action received for Chinese Patent Application No. 202110328601.5, mailed on Mar. 24, 2023, 25 pages.
Office Action received for Chinese Patent Application No. 202110328601.5, mailed on Nov. 2, 2022, 29 pages.
Office Action received for Chinese Patent Application No. 202110328602.X, mailed on Dec. 1, 2022, 28 pages.
Office Action received for Chinese Patent Application No. 202110328602.X, mailed on Jun. 29, 2023, 27 pages.
Office Action received for Chinese Patent Application No. 202110328602.X, mailed on Mar. 24, 2022, 6 pages.
Office Action received for Chinese Patent Application No. 202111652452.4, mailed on Aug. 29, 2022, 23 pages.
Office Action received for Chinese Patent Application No. 202111652452.4, mailed on Feb. 11, 2023, 28 pages.
Office Action received for Chinese Patent Application No. 202111652452.4, mailed on May 19, 2023, 15 pages.
Office Action received for Danish Patent Application No. PA201870362, mailed on Aug. 22, 2019, 4 pages.
Office Action received for Danish Patent Application No. PA201870362, mailed on Dec. 18, 2018, 2 pages.
Office Action received for Danish Patent Application No. PA201870363, mailed on Mar. 26, 2019, 3 pages.
Office Action received for Danish Patent Application No. PA201870364, mailed on Jan. 28, 2019, 8 pages.
Office Action received for Danish Patent Application No. PA201870364, mailed on Jun. 11, 2019, 11 pages.
Office Action received for Danish Patent Application No. PA202070617, mailed on Sep. 24, 2021, 4 pages.
Office Action Received for European Patent Application No. 11150223.3, mailed on Mar. 29, 2012, 3 pages.
Office Action received for European Patent Application No. 13175232.1, mailed on Nov. 21, 2014, 5 pages.
Office Action received for European Patent Application No. 18779093.6, mailed on Dec. 11, 2020, 4 pages.
Office Action received for European Patent Application No. 18779093.6, mailed on Jun. 28, 2023, 4 pages.
Office Action received for European Patent Application No. 18779093.6, mailed on Mar. 17, 2022, 4 pages.
Office Action received for European Patent Application No. 19729395.4, mailed on Jul. 15, 2020, 4 pages.
Office Action received for European Patent Application No. 19729395.4, mailed on Sep. 29, 2020, 10 pages.
Office Action received for European Patent Application No. 20166552.8, mailed on Mar. 24, 2021, 8 pages.
Office Action received for European Patent Application No. 20205496.1, mailed on Nov. 10, 2021, 5 pages.
Office Action received for European Patent Application No. 21728781.2, mailed on Mar. 1, 2023, 13 pages.
Office Action received for Indian Patent Application No. 201814036860, mailed on Jul. 29, 2021, 8 pages.
Office Action received for Indian Patent Application No. 202014041529, mailed on Dec. 6, 2021, 6 pages.
Office Action received for Indian Patent Application No. 202015013360, mailed on Mar. 17, 2023, 7 pages.
Office Action received for Indian Patent Application No. 202215025360, mailed on Mar. 29, 2023, 6 pages.
Office Action received for Indian Patent Application No. 202215025361, mailed on Mar. 29, 2023, 6 pages.
Office Action received for Indian Patent Application No. 202215025363, mailed on Mar. 29, 2023, 6 pages.
Office Action received for Indian Patent Application No. 202215025364, mailed on Mar. 29, 2023, 6 pages.
Office Action received for Japanese Patent Application No. 2013-262976, mailed on Feb. 20, 2015, 2 pages.
Office Action received for Japanese Patent Application No. 2019-194597, mailed on Jan. 18, 2021, 10 pages.
Office Action received for Japanese Patent Application No. 2020-159840, mailed on Dec. 10, 2021, 13 pages.
Office Action received for Japanese Patent Application No. 2020-159840, mailed on Mar. 28, 2022, 6 pages.
Office Action received for Japanese Patent Application No. 2021-206121, mailed on Feb. 20, 2023, 7 pages.
Office Action received for Korean Patent Application No. 10-2020-7032110, mailed on Dec. 15, 2020, 6 pages.
Office Action received for Korean Patent Application No. 10-2021-7017731, mailed on May 30, 2022, 5 pages.
QQ, "Method of QQ voice chat", Online Available at: https://www.taodocs.com/p-47909082.html, May 25, 2016, 3 pages.
Result of Consultation received for European Patent Application No. 19729395.4, mailed on Jun. 22, 2021, 3 pages.
Result of Consultation received for European Patent Application No. 19729395.4, mailed on Jun. 23, 2021, 3 pages.
Result of Consultation received for European Patent Application No. 20205496.1, mailed on Apr. 18, 2023, 3 pages.
Rossignol, Joe, "iOS 10 Concept Simplifies Lock Screen With Collapsed Notifications", Available online at: https://www.macrumors.com/2016/06/16/ios-10-collapsed-notifications-concept/, Jun. 16, 2016, 10 pages.
Search Report and Opinion received for Danish Patent Application No. PA201870362, mailed on Sep. 7, 2018, 9 pages.
Search Report and Opinion received for Danish Patent Application No. PA201870363, mailed on Sep. 11, 2018, 12 pages.
Search Report and Opinion received for Danish Patent Application No. PA201870364, mailed on Sep. 4, 2018, 12 pages.
Search Report and Opinion received for Danish Patent Application No. PA202070617, mailed on Dec. 23, 2020, 8 pages.
Senicar et al., "User-Centred Design and Development of an Intelligent Light Switch for Sensor Systems", Technical Gazette, vol. 26, No. 2, Available online at: https://hrcak.srce.hr/file/320403, 2019, pp. 339-345.
Shangmeng, Li, "The Design and Implementation of Mobile Terminal System of Multimedia Conference Based on Symbian Operating System", China Academic Journal Electronic Publishing House, Online available at: http://www.cnki.net, 2011, 66 pages.
Song, Jianhua, "Guidelines for Network", Feb. 29, 2008, 11 pages.
Summons to Attend Oral Proceedings received for European Patent Application No. 19729395.4, mailed on Mar. 11, 2021, 7 pages.
Summons to Attend Oral Proceedings received for European Patent Application No. 19729395.4, mailed on Mar. 19, 2021, 9 pages.
Summons to Attend Oral Proceedings received for European Patent Application No. 20205496.1, mailed on Sep. 8, 2022, 9 pages.
Applicant-Initiated Interview Summary received for U.S. Appl. No. 17/476,404, mailed on Oct. 31, 2023, 4 pages.

(56) References Cited

OTHER PUBLICATIONS

Applicant-Initiated Interview Summary received for U.S. Appl. No. 17/484,899, mailed on Sep. 12, 2023, 6 pages.
Applicant-Initiated Interview Summary received for U.S. Appl. No. 17/684,843, mailed on Oct. 5, 2023, 4 pages.
Applicant-Initiated Interview Summary received for U.S. Appl. No. 18/067,350, mailed on Sep. 11, 2023, 4 pages.
Corrected Notice of Allowance received for U.S. Appl. No. 17/732,204, mailed on Nov. 16, 2023, 6 pages.
Corrected Notice of Allowance received for U.S. Appl. No. 17/872,736, mailed on Oct. 13, 2023, 4 pages.
Extended European Search Report received for European Patent Application No. 23172038.4, mailed on Oct. 11, 2023, 10 pages.
Final Office Action received for U.S. Appl. No. 17/476,404, mailed on Sep. 12, 2023, 30 pages.
Final Office Action received for U.S. Appl. No. 17/484,899, mailed on Nov. 6, 2023, 39 pages.
International Search Report and Written Opinion received for PCT Patent Application No. PCT/US2023/017280, mailed on Jun. 26, 2023, 20 pages.
Invitation to Pay Additional Fees and Partial International Search Report received for PCT Patent Application No. PCT/US2023/020569, mailed on Sep. 21, 2023, 14 pages.
Non-Final Office Action received for U.S. Appl. No. 17/483,679, mailed on Sep. 13, 2023, 32 pages.
Non-Final Office Action received for U.S. Appl. No. 18/067,350, mailed on Aug. 3, 2023, 41 pages.
Notice of Allowance received for Korean Patent Application No. 10-2023-7024157, mailed on Sep. 19, 2023, 7 pages (2 pages of English Translation and 5 pages of Official Copy).
Notice of Allowance received for U.S. Appl. No. 17/479,897, mailed on Oct. 3, 2023, 5 pages.
Notice of Allowance received for U.S. Appl. No. 17/732,204, mailed on Oct. 12, 2023, 8 pages.
Notice of Allowance received for U.S. Appl. No. 17/740,104, mailed on Oct. 4, 2023, 5 pages.
Notice of Allowance received for U.S. Appl. No. 17/872,736, mailed on Aug. 30, 2023, 4 pages.
Notice of Hearing received for Indian Patent Application No. 201814036860, mailed on Sep. 8, 2023, 2 pages.
Office Action received for Australian Patent Application No. 2023248185, mailed on Nov. 22, 2023, 2 pages.
Office Action received for Australian Patent Application No. 2023248185, mailed on Oct. 20, 2023, 3 pages.
Office Action received for European Patent Application No. 20166552.8, mailed on Nov. 3, 2023, 3 pages.
Office Action received for Korean Patent Application No. 10-2023-0001668, mailed on Nov. 3, 2023, 5 pages (2 pages of English Translation and 3 pages of Official Copy).
Non-Final Office Action received for U.S. Appl. No. 18/380,116, mailed on Jul. 18, 2024, 16 pages.
Notice of Allowance received for Korean Patent Application No. 10-2023-7040599, mailed on Jun. 26, 2024, 7 pages (2 pages of English Translation and 5 pages of Official Copy).
Office Action received for Chinese Patent Application No. 201910704856.X, mailed on Jun. 23, 2024, 12 pages (6 pages of English Translation and 6 pages of Official Copy).
Office Action received for Chinese Patent Application No. 202311185909.4, mailed on Jun. 12, 2024, 18 pages (10 pages of English Translation and 8 pages of Official Copy).
Applicant-Initiated Interview Summary received for U.S. Appl. No. 17/484,899, mailed on Feb. 14, 2024, 8 pages.
Corrected Notice of Allowance received for U.S. Appl. No. 17/483,542, mailed on Feb. 5, 2024, 3 pages.
Decision to Grant received for European Patent Application No. 21728781.2, mailed on Feb. 8, 2024, 3 pages.
Final Office Action received for U.S. Appl. No. 17/483,679, mailed on Feb. 6, 2024, 45 pages.
Notice of Allowance received for U.S. Appl. No. 17/684,843, mailed on Feb. 14, 2024, 8 pages.
That Guy who Loves METV, "Kinect Party Gameplay", Available online at: https://youtu.be/bkbOlzfyLzc?si=QAAKh_V4aqY0iegL, Oct. 20, 2021, 2 pages.
XBOX, "Kinect Tips, Part 3: Gesture Controls", Available online at: https://youtu.be/VXhhE-I96qQ?si=gLmHbp9jOm-w0fNW, May 7, 2014, 3 pages.
Advisory Action received for U.S. Appl. No. 17/950,868, mailed on Sep. 24, 2024, 3 pages.
Applicant-Initiated Interview Summary received for U.S. Appl. No. 18/389,655, mailed on Sep. 20, 2024, 6 pages.
Final Office Action received for U.S. Appl. No. 17/970,417, mailed on Sep. 18, 2024, 24 pages.
Intention to Grant received for European Patent Application No. 22734711.9, mailed on Sep. 13, 2024, 7 pages.
Notice of Allowance received for U.S. Appl. No. 17/684,843, mailed on Sep. 17, 2024, 5 pages.
Office Action received for Chinese Patent Application No. 202311753064.4, mailed on Aug. 23, 2024, 18 pages (11 pages of English Translation and 7 pages of Official Copy).
Office Action received for Chinese Patent Application No. 202311831154.0, mailed on Aug. 30, 2024, 13 pages (7 pages of English Translation and 6 pages of Official Copy).
Office Action received for Chinese Patent Application No. 202311835200.4, mailed on Aug. 29, 2024, 16 pages (7 pages of English Translation and 9 pages of Official Copy).
Office Action received for Japanese Patent Application No. 2023-572748, mailed on Jul. 29, 2024, 4 pages (2 pages of English Translation and 2 pages of Official Copy).
Supplemental Notice of Allowance received for U.S. Appl. No. 17/484,899, mailed on Sep. 30, 2024, 5 pages.
International Preliminary Report on Patentability received for PCT Patent Application No. PCT/US2022/044592, mailed on Apr. 4, 2024, 21 pages.
Non-Final Office Action received for U.S. Appl. No. 17/970,417, mailed on Apr. 10, 2024, 16 pages.
Notice of Allowance received for Korean Patent Application No. 10-2023-7044044, mailed on Mar. 14, 2024, 7 pages (2 pages of English Translation and 5 pages of Official Copy).
Notice of Allowance received for U.S. Appl. No. 17/903,946, mailed on Apr. 10, 2024, 7 pages.
Anonymous, "Split Your Screen with IPEVO Visualizer Software", On IPEVO, Available online at: https://medium.com/ipevo/split-your-screen-with-ipevo-visualizer-software-e9641024d24f, Feb. 24, 2020, 10 pages.
Applicant-Initiated Interview Summary received for U.S. Appl. No. 17/970,417, mailed on Jun. 26, 2024, 2 pages.
Cosmic Mook, "Line laboratory, New function Exhaustive Coverage! Line 120% Application Guide, Inc.", Jan. 24, 2018, 7 pages (Official Copy Only) {See Communication Under Rule 37 CFR § 1.98(a) (3)}.
Examiner Initiated Interview Summary received for U.S. Appl. No. 17/950,868, mailed on Jul. 5, 2024, 2 pages.
Myoko, Mori, "Line Perfect Guidebook [Revised Version]", Sotec Co. Ltd., Dec. 31, 2013, 5 pages (Official Copy Only) {See Communication Under Rule 37 CFR § 1.98(a) (3)}.
Octoba, "Enjoy free calls with Line! Part 2", retrieved from: https://web.archive.org/web/20170923013859/https://octoba.net/archives/line-call2.html, Sep. 23, 2017, 13 pages (Official Copy Only) {See Communication Under Rule 37 CFR § 1.98(a) (3)}.
Office Action received for European Patent Application No. 22792995.7, mailed on Jun. 24, 2024, 6 pages.
Office Action received for Japanese Patent Application No. 2023-097196, mailed on Jun. 7, 2024, 7 pages (3 pages of English Translation and 4 pages of Official Copy).
Office Action received for Japanese Patent Application No. 2024-003876, mailed on Jul. 2, 2024, 3 pages (1 page of English Translation and 2 pages of Official Copy).
International Search Report and Written Opinion received for PCT Patent Application No. PCT/US2023/032792, mailed on Jan. 19, 2024, 15 pages.
International Search Report and Written Opinion received for PCT Patent Application No. PCT/US2023/032911, mailed on Jan. 4, 2024, 18 pages.

(56) References Cited

OTHER PUBLICATIONS

Non-Final Office Action received for U.S. Appl. No. 17/484,899, mailed on Mar. 21, 2024, 42 pages.
Office Action received for Japanese Patent Application No. 2023-028786, mailed on Mar. 22, 2024, 10 pages (5 pages of English Translation and 5 pages of Official Copy).
Office Action received for Korean Patent Application No. 10-2023-7040599, mailed on Mar. 12, 2024, 6 pages (2 pages of English Translation and 4 pages of Official Copy).
Applicant-Initiated Interview Summary received for U.S. Appl. No. 17/950,868, mailed on Jul. 19, 2024, 2 pages.
Office Action received for Australian Patent Application No. 2023204396, mailed on Jan. 8, 2024, 5 pages.
Corrected Notice of Allowance received for U.S. Appl. No. 17/732,204, mailed on Jan. 18, 2024, 5 pages.
Extended European Search Report received for European Patent Application No. 23203414.0, mailed on Jan. 26, 2024, 10 pages.
Notice of Acceptance received for Australian Patent Application No. 2023248185, mailed on Jan. 23, 2024, 3 pages.
Applicant-Initiated Interview Summary received for U.S. Appl. No. 18/067,350, mailed on Mar. 13, 2024, 4 pages.
Office Action received for Chinese Patent Application No. 201910704856.X, mailed on Mar. 8, 2024, 13 pages (7 pages of English Translation and 6 pages of Official Copy).
Office Action received for Korean Patent Application No. 10-2023-7018775, mailed on Feb. 28, 2024, 9 pages (4 pages of English Translation and 5 pages of Official Copy).
Advisory Action received for U.S. Appl. No. 17/970,417, mailed on Dec. 12, 2024, 7 pages.
Decision to Grant received for European Patent Application No. 22734711.9, mailed on Jan. 7, 2025, 2 pages.
Decision to Grant received for Japanese Patent Application No. 2024-173274, mailed on Feb. 10, 2025, 3 pages (1 page of English Translation and 2 pages of Official Copy).
Extended European Search Report received for European Patent Application No. 24215184.3, mailed on Jan. 24, 2025, 11 pages.
Final Office Action received for U.S. Appl. No. 18/380,116, mailed on Jan. 30, 2025, 17 pages.
Notice of Allowance received for Chinese Patent Application No. 202311831154.0, mailed on Jan. 17, 2025, 4 pages (1 page of English Translation and 3 pages of Official Copy).
Notice of Allowance received for Korean Patent Application No. 10-2024-0112016, mailed on Dec. 2, 2024, 6 pages (2 pages of English Translation and 4 pages of Official Copy).
Notice of Allowance received for U.S. Appl. No. 17/483,679, mailed on Jan. 29, 2025, 5 pages.
Notice of Allowance received for U.S. Appl. No. 17/484,899, mailed on Jan. 16, 2025, 16 pages.
Notice of Allowance received for U.S. Appl. No. 17/745,680, mailed on Dec. 12, 2024, 2 pages.
Notice of Allowance received for U.S. Appl. No. 17/950,868, mailed on Feb. 12, 2025, 6 pages.
Notice of Allowance received for U.S. Appl. No. 17/970,417, mailed on Feb. 5, 2025, 6 pages.
Notice of Allowance received for U.S. Appl. No. 18/140,449, mailed on Jan. 21, 2025, 10 pages.
Notice of Hearing received for Indian Patent Application No. 202015013360, mailed on Dec. 26, 2024, 2 pages.
Office Action received for Chinese Patent Application No. 202311835200.4, mailed on Dec. 26, 2024, 11 pages (6 pages of English Translation and 5 pages of Official Copy).
Office Action received for European Patent Application No. 22705232.1, mailed on Feb. 4, 2025, 10 pages.
Office Action received for Japanese Patent Application No. 2023-572748, mailed on Nov. 21, 2024, 31 pages (28 pages of English Translation and 3 pages of Official Copy).
Office Action received for Japanese Patent Application No. 2024-146741, mailed on Nov. 25, 2024, 12 pages (6 pages of English Translation and 6 pages of Official Copy).
Office Action received for Japanese Patent Application No. 2024-173274, mailed on Jan. 6, 2025, 3 pages (2 pages of English Translation and 1 page of Official Copy).
Supplemental Notice of Allowance received for U.S. Appl. No. 17/484,899, mailed on Feb. 3, 2025, 5 pages.
Corrected Notice of Allowance received for U.S. Appl. No. 17/970,417, mailed on Feb. 20, 2025, 2 pages.
Corrected Notice of Allowance received for U.S. Appl. No. 18/389,655, mailed on Feb. 24, 2025, 2 pages.
Intention to Grant received for European Patent Application No. 22792995.7, mailed on Feb. 17, 2025, 9 pages.
Non-Final Office Action received for U.S. Appl. No. 17/745,680, mailed on Feb. 20, 2025, 28 pages.
Office Action received for Chinese Patent Application No. 202110327012.5, mailed on Feb. 10, 2025, 22 pages (13 pages of English Translation and 9 pages of Official Copy).
Office Action received for Chinese Patent Application No. 202410030102.1, mailed on Jan. 22, 2025, 14 pages (8 pages of English Translation and 6 pages of Official Copy).
Office Action received for European Patent Application No. 22733778.9, mailed on Feb. 20, 2025, 4 pages.
Office Action received for European Patent Application No. 24160234.1, mailed on Feb. 20, 2025, 3 pages.
Pre-Appeal Review Report received for Japanese Patent Application No. 2023-572748, mailed on Apr. 1, 2025, 4 pages (2 pages of English Translation and 2 pages of Official Copy).
Advisory Action received for U.S. Appl. No. 18/380,116, mailed on May 21, 2025, 4 pages.
Notice of Allowance received for Chinese Patent Application No. 202311753064.4, mailed on May 12, 2025, 6 pages (2 pages of English Translation and 4 pages of Official Copy).
Office Action received for European Patent Application No. 23172038.4, mailed on May 22, 2025, 6 pages.
Advisory Action received for U.S. Appl. No. 14/263,889, mailed on May 26, 2016, 4 pages.
Advisory Action received for U.S. Appl. No. 15/725,868, mailed on Dec. 10, 2018, 5 pages.
Advisory Action received for U.S. Appl. No. 16/666,073, mailed on Jul. 7, 2020, 5 pages.
Applicant-Initiated Interview Summary received for U.S. Appl. No. 14/263,889, mailed on Apr. 15, 2016, 3 pages.
Applicant-Initiated Interview Summary received for U.S. Appl. No. 15/725,868, mailed on Jul. 25, 2018, 3 pages.
Applicant-Initiated Interview Summary received for U.S. Appl. No. 15/725,868, mailed on May 13, 2019, 3 pages.
Applicant-Initiated Interview Summary received for U.S. Appl. No. 15/725,868, mailed on Nov. 20, 2018, 3 pages.
Applicant-Initiated Interview Summary received for U.S. Appl. No. 17/745,680, mailed on Apr. 24, 2025, 2 pages.
Applicant-Initiated Interview Summary received for U.S. Appl. No. 17/970,417, mailed on Nov. 4, 2024, 2 pages.
Applicant-Initiated Interview Summary received for U.S. Appl. No. 18/067,350, mailed on Jul. 29, 2024, 3 pages.
Applicant-Initiated Interview Summary received for U.S. Appl. No. 18/067,350, mailed on Nov. 26, 2024, 3 pages.
Applicant-Initiated Interview Summary received for U.S. Appl. No. 18/140,449, mailed on Aug. 27, 2024, 2 pages.
Applicant-Initiated Interview Summary received for U.S. Appl. No. 18/140,449, mailed on Nov. 26, 2024, 2 pages.
Baudisch et al., "Back-of-device interaction allows creating very small touch devices", Chi 2009—Digital Life, New World: Conference Proceedings And Extended Abstracts; The 27th Annual Chi Conference On Human Factors In Computing Systems Available online at <http://dx.doi.org/10.1145/1518701.1518995>, Apr. 9, 2009, pp. 1923-1932.
Corrected Notice of Allowance received for U.S. Appl. No. 15/725,868, mailed on Aug. 23, 2019, 2 pages.
Corrected Notice of Allowance received for U.S. Appl. No. 15/725,868, mailed on Sep. 30, 2019, 3 pages.
Corrected Notice of Allowance received for U.S. Appl. No. 16/666,073, mailed on Apr. 6, 2021, 3 pages.
Corrected Notice of Allowance received for U.S. Appl. No. 16/666,073, mailed on Apr. 26, 2021, 4 pages.

(56) References Cited

OTHER PUBLICATIONS

Corrected Notice of Allowance received for U.S. Appl. No. 16/666,073, mailed on Feb. 22, 2021, 3 pages.
Corrected Notice of Allowance received for U.S. Appl. No. 16/666,073 mailed on Mar. 11, 2021, 3 pages.
Corrected Notice of Allowance received for U.S. Appl. No. 17/684,843, mailed on Oct. 7, 2024, 2 pages.
Corrected Notice of Allowance received for U.S. Appl. No. 17/745,680, mailed on Nov. 20, 2024, 2 pages.
Corrected Notice of Allowance received for U.S. Appl. No. 17/950,868, mailed on Nov. 27, 2024, 3 pages.
Corrected Notice of Allowance received for U.S. Appl. No. 18/138,348, mailed on Apr. 16, 2025, 2 pages.
Corrected Notice of Allowance received for U.S. Appl. No. 18/138,348, mailed on Mar. 26, 2025, 2 pages.
Corrected Notice of Allowance received for U.S. Appl. No. 18/138,348, mailed on Nov. 27, 2024, 2 pages.
Decision on Appeal received for Korean Patent Application No. 10-2020-7034959, mailed on Jul. 25, 2022, 28 pages (5 pages of English Translation and 23 pages of Official Copy).
Decision to Grant received for European Patent Application No. 10763539.3, mailed on Jul. 19, 2018, 3 pages.
Decision to Grant received for European Patent Application No. 18188433.9, mailed on Aug. 13, 2020, 3 pages.
Decision to Refuse received for Japanese Patent Application No. 2013-503731, mailed on Jun. 23, 2014, 4 pages (2 pages of English Translation and 2 pages of Official Copy).
Examiner's Pre-Review Report received for Japanese Patent Application No. 2014-212867, mailed on Nov. 4, 2016, 5 pages (2 pages of English Translation and 3 pages of Official Copy).
Extended European Search Report received for European Patent Application No. 18188433.9, mailed on Oct. 29, 2018, 8 pages.
Office Action received for U.S. Appl. No. 12/794,766, mailed on Nov. 26, 2012, 23 pages.
Office Action received for U.S. Appl. No. 14/263,889, mailed on Jan. 4, 2016, 9 pages.
Final Office Action received for U.S. Appl. No. 15/725,868, mailed on Sep. 27, 2018, 25 pages.
Office Action received for U.S. Appl. No. 16/666,073, mailed on Apr. 17, 2020, 18 pages.
Office Action received for U.S. Appl. No. 17/332,829, mailed on Feb. 6, 2023, 19 pages.
Final Office Action received for U.S. Appl. No. 18/067,350, mailed on Oct. 31, 2024, 44 pages.
Final Office Action received for U.S. Appl. No. 18/138,348, mailed on Oct. 18, 2024, 10 pages.
Final Office Action received for U.S. Appl. No. 18/140,449, mailed on Oct. 18, 2024, 11 pages.
Intention to Grant received for European Patent Application No. 10763539.3, mailed on Mar. 15, 2018, 6 pages.
Intention to Grant received for European Patent Application No. 18188433.9, mailed on Apr. 6, 2020, 9 pages.
Intention to Grant received for European Patent Application No. 18779093.6, mailed on May 9, 2025, 9 pages.
To Grant received for European Patent Application No. 20166552.8, mailed on Apr. 30, 2025, 9 pages.
To Grant received for European Patent Application No. 24160234.1, mailed on Nov. 4, 2024, 9 pages.
International Preliminary Report on Patentability received for PCT Patent Application No. PCT/US2010/050311, mailed on Oct. 18, 2012, 11 pages.
Preliminary Report on Patentability received for PCT Patent Application No. PCT/US2023/017280, mailed on Oct. 17, 2024, 15 pages.
Preliminary Report on Patentability received for PCT Patent Application No. PCT/US2023/020569, mailed on Nov. 21, 2024, 16 pages.
Preliminary Report on Patentability received for PCT Patent Application No. PCT/US2023/032792, mailed on Apr. 3, 2025, 10 pages.
Preliminary Report on Patentability received for PCT Patent Application No. PCT/US2023/032911, mailed on Apr. 3, 2025, 13 pages.
Search Report and Written Opinion received for PCT Patent Application No. PCT/US2010/050311, mailed on Aug. 24, 2011, 15 pages.
Search Report and Written Opinion received for PCT Patent Application No. PCT/US2024/023231, mailed on Oct. 23, 2024, 24 pages.
Search Report and Written Opinion received for PCT Patent Application No. PCT/US2024/053247, mailed on Jan. 28, 2025, 13 pages.
To Pay Additional Fees and Partial International Search Report received for PCT Patent Application No. PCT/US2010/050311, mailed on Dec. 21, 2010, 6 pages.
To Pay Additional Fees and Partial International Search Report received for PCT Patent Application No. PCT/US2024/023231, mailed on Aug. 29, 2024, 17 pages.
Koyama Kaori, "Mac Fan Macintosh Master Book Mac Os X v10.4 "Tiger" & iLife", '06 version, Mainichi Communications Inc. Nobuyuki NAKAGAWA, Jul. 9, 2007, 4 pages (Official Copy Only). {See Communication under Rule 37 CFR § 1.98(a) (3)}.
Non-Final Office Action received for U.S. Appl. No. 12/794,766, mailed on Aug. 5, 2013, 9 pages.
Non-Final Office Action received for U.S. Appl. No. 12/794,766, mailed on Jun. 25, 2012, 18 pages.
Non-Final Office Action received for U.S. Appl. No. 12/794,768, mailed on Oct. 10, 2012, 14 pages.
Non-Final Office Action received for U.S. Appl. No. 14/263,889, mailed on Jul. 2, 2015, 9 pages.
Non-Final Office Action received for U.S. Appl. No. 14/263,889, mailed on Jul. 26, 2016, 11 pages.
Non-Final Office Action received for U.S. Appl. No. 15/725,868, mailed on Apr. 27, 2018, 17 pages.
Non-Final Office Action received for U.S. Appl. No. 15/725,868, mailed on Feb. 12, 2019, 26 pages.
Non-Final Office Action received for U.S. Appl. No. 16/666,073, mailed on Dec. 10, 2019, 16 pages.
Non-Final Office Action received for U.S. Appl. No. 17/332,829, mailed on Aug. 1, 2022, 17 pages.
Non-Final Office Action received for U.S. Appl. No. 17/745,680, mailed on May 2, 2025, 27 pages.
Non-Final Office Action received for U.S. Appl. No. 18/067,350, mailed on Apr. 17, 2025, 49 pages.
Non-Final Office Action received for U.S. Appl. No. 18/077,154, mailed on Apr. 10, 2025, 27 pages.
Non-Final Office Action received for U.S. Appl. No. 18/140,449, mailed on May 24, 2024, 19 pages.
Non-Final Office Action received for U.S. Appl. No. 18/242,363, mailed on May 13, 2025, 29 pages.
Notice of Acceptance received for Australian Patent Application No. 2010350749, mailed on Jan. 13, 2015, 3 pages.
Notice of Acceptance received for Australian Patent Application No. 2015201127, mailed on Feb. 14, 2017, 3 pages.
Notice of Allowance received for Brazilian Patent Application No. BR112012025746-3, mailed on Jul. 6, 2021, 3 pages (1 page of English Translation and 2 pages of Official Copy).
Notice of Allowance received for Chinese Patent Application No. 201010602653.9, mailed on Nov. 15, 2014, 2 pages (1 page of English Translation and 1 page of Official Copy).
Notice of Allowance received for Chinese Patent Application No. 2010106600623.4, mailed on Aug. 11, 2014, 4 pages (1 page of English Translation and 3 pages of Official Copy).
Notice of Allowance received for Chinese Patent Application No. 201410575145.4, mailed on May 10, 2018, 3 pages (1 page of English Translation and 2 pages of Official Copy).
Notice of Allowance received for Chinese Patent Application No. 201910704856.X, mailed on Sep. 30, 2024, 4 pages (1 page of English Translation and 3 pages of Official Copy).
Notice of Allowance received for Chinese Patent Application No. 202311185909.4, mailed on Apr. 30, 2025, 3 pages (2 pages of English Translation and 1 page of Official Copy).
Notice of Allowance received for Japanese Patent Application No. 2014-212867, mailed on Mar. 30, 2018, 3 pages (1 page of English Translation and 2 pages of Official Copy).

(56) References Cited

OTHER PUBLICATIONS

Notice of Allowance received for Japanese Patent Application No. 2016-151497, mailed on Jun. 4, 2018, 4 pages (1 page of English Translation and 3 pages of Official Copy).
Notice of Allowance received for Japanese Patent Application No. 2019-182484, mailed on Aug. 30, 2021, 4 pages (1 page of English Translation and 3 pages of Official Copy).
Notice of Allowance received for Japanese Patent Application No. 2021-154573, mailed on Nov. 11, 2022, 4 pages (1 page of English Translation and 3 pages of Official Copy).
Notice of Allowance received for Japanese Patent Application No. 2022-197327, mailed on May 31, 2024, 4 pages (1 page of English Translation and 3 pages of Official Copy).
Notice of Allowance received for Japanese Patent Application No. 2023-028786, mailed on Dec. 2, 2024, 4 pages (1 page of English Translation and 3 pages of Official Copy).
Notice of Allowance received for Japanese Patent Application No. 2023-097196, mailed on Jul. 29, 2024, 4 pages (1 page of English Translation and 3 pages of Official Copy).
Notice of Allowance received for Japanese Patent Application No. 2023-571161, mailed on Jul. 30, 2024, 3 pages (1 page of English Translation and 2 pages of Official Copy).
Notice of Allowance received for Korean Patent Application No. 10-2012-7028535, mailed on Jul. 16, 2014, 5 pages (1 page of English Translation and 4 pages of Official Copy).
Notice of Allowance received for Korean Patent Application No. 10-2014-7005164, mailed on Dec. 21, 2014, 4 pages (1 page of English Translation and 3 pages of Official Copy).
Notice of Allowance received for Korean Patent Application No. 10-2014-7029838, mailed on Jul. 28, 2015, 4 pages (1 page of English Translation and 3 pages of Official Copy).
Notice of Allowance received for Korean Patent Application No. 10-2015-7007050, mailed on Feb. 26, 2016, 4 pages (1 page of English Translation and 3 pages of Official Copy).
Notice of Allowance received for Korean Patent Application No. 10-2016-7014580, mailed on Dec. 17, 2019, 6 pages (2 pages of English Translation and 4 pages of Official Copy).
Notice of Allowance received for Korean Patent Application No. 10-2018-7036975, mailed on Sep. 18, 2019, 6 pages (2 pages of English Translation and 4 pages of Official Copy).
Notice of Allowance received for Korean Patent Application No. 10-2020-7002845, mailed on Sep. 24, 2020, 5 pages (1 page of English Translation and 4 pages of Official Copy).
Notice of Allowance received for Korean Patent Application No. 10-2023-7005442, mailed on Jan. 22, 2024, 8 pages (2 pages of English Translation and 6 pages of Official Copy).
Notice of Allowance received for Korean Patent Application No. 10-2023-7018775, mailed on Sep. 30, 2024, 7 pages (2 pages of English Translation and 5 pages of Official Copy).
Notice of Allowance received for Korean Patent Application No. 10-2023-7040599, mailed on Oct. 18, 2024, 7 pages (2 pages of English Translation and 5 pages of Official Copy).
Notice of Allowance received for Mexican Patent Application No. MX/a/2012/011623, mailed on Jan. 16, 2014, 2 pages (1 page of English Translation and 1 page of Official Copy).
Notice of Allowance received for Mexican Patent Application No. MX/a/2014/004295, mailed on May 21, 2015, 2 pages (1 page of English Translation and 1 page of Official Copy).
Notice of Allowance received for Mexican Patent Application No. MX/a/2015/010523, mailed on May 25, 2016, 2 pages (1 page of English Translation and 1 page of Official Copy).
Notice of Allowance received for Mexican Patent Application No. MX/a/2016/012174, mailed on Jan. 17, 2020, 3 pages (1 page of English Translation and 2 pages of Official Copy).
Notice of Allowance received for Mexican Patent Application No. MX/a/2020/003290, mailed on Feb. 9, 2023, 4 pages (1 page of English Translation and 3 pages of Official Copy).
Notice of Allowance received for Taiwanese Patent Application No. 099132253, mailed on Apr. 27, 2016, 3 pages (1 page of English Translation and 2 pages of Official Copy).
Notice of Allowance received for Taiwanese Patent Application No. 099132254, mailed on Feb. 18, 2014, 3 pages (1 page of English Translation and 2 pages of Official Copy).
Notice of Allowance received for U.S. Appl. No. 12/794,766, mailed on Jan. 17, 2014, 6 pages.
Notice of Allowance received for U.S. Appl. No. 12/794,768, mailed on Mar. 22, 2013, 6 pages.
Notice of Allowance received for U.S. Appl. No. 14/263,889, mailed on Feb. 1, 2017, 10 pages.
Notice of allowance received for U.S. Appl. No. 14/263,889, mailed on Jun. 16, 2017, 6 pages.
Notice of allowance received for U.S. Appl. No. 15/725,868, mailed on Jun. 12, 2019, 9 pages.
Notice of allowance received for U.S. Appl. No. 16/666,073, mailed on Jan. 21, 2021, 11 pages.
Notice of allowance received for U.S. Appl. No. 17/483,679, mailed on Nov. 21, 2024, 8 pages.
Notice of allowance received for U.S. Appl. No. 17/745,680, mailed on Nov. 12, 2024, 8 pages.
Notice of allowance received for U.S. Appl. No. 17/950,868, mailed on Oct. 23, 2024, 10 pages.
Notice of allowance received for U.S. Appl. No. 18/138,348, mailed on Mar. 12, 2025, 10 pages.
Notice of allowance received for U.S. Appl. No. 18/138,348, mailed on Nov. 13, 2024, 10 pages.
Notice of allowance received for U.S. Appl. No. 18/140,449, mailed on Mar. 26, 2025, 10 pages.
Notice of allowance for received for U.S. Appl. No. 18/389,655, mailed on Nov. 27, 2024, 8 pages.
Office Action received for Australian Patent Application No. 2010350749, mailed on Oct. 16, 2013, 3 pages.
Office Action received for Australian Patent Application No. 2015201127, mailed on Mar. 21, 2016, 3 pages.
Office Action for Brazilian Patent Application No. BR112012025746-3, mailed on Jun. 2, 2020, 7 pages (4 pages of English Translation and 3 pages of Official Copy).
Office Action received for Chinese Patent Application No. 201010602653.9, mailed on Apr. 1, 2013, 21 pages (13 pages of English Translation and 8 pages of Official Copy).
Office Action received for Chinese Patent Application No. 201010602653.9, mailed on Dec. 9, 2013, 10 pages (6 pages of English Translation and 4 pages of Official Copy).
Office Action received for Chinese Patent Application No. 201010602653.9, mailed on May 15, 2014, 6 pages (3 pages of English Translation and 3 pages of Official Copy).
Office Action received for Chinese Patent Application No. 2010106600623.4, mailed on Apr. 28, 2014, 7 pages (4 pages of English Translation and 3 pages of Official Copy).
Office Action received for Chinese Patent Application No. 2010106600623.4, mailed on Jan. 24, 2014, 7 pages (4 pages of English Translation and 3 pages of Official Copy).
Office Action received for Chinese Patent Application No. 2010106600623.4, mailed on May 2, 2013, 27 pages (15 pages of English Translation and 12 pages of Official Copy).
Office Action received for Chinese Patent Application No. 201410575145.4, mailed on Feb. 13, 2017, 18 pages (11 pages of English Translation and 7 pages of Official Copy).
Office Action received for Chinese Patent Application No. 201410575145.4, mailed on Nov. 30, 2017, 17 pages (11 pages of English Translation and 6 pages of Official Copy).
Office Action received for Chinese Patent Application No. 202110327012.5, mailed on Mar. 31, 2025, 19 pages (1 page of English Translation and 18 pages of Official Copy).
Office Action received for Chinese Patent Application No. 202311185909.4, mailed on Feb. 13, 2025, 16 pages (10 pages of English Translation and 6 pages of Official Copy).
Office Action received for Chinese Patent Application No. 202410924550.6, mailed on Mar. 1, 2025, 12 pages (5 pages of English Translation and 7 pages of Official Copy).
Office Action received for Chinese Patent Application No. 202410924556.3, mailed on Feb. 28, 2025, 11 pages (5 pages of English Translation and 6 pages of Official Copy).

(56) References Cited

OTHER PUBLICATIONS

Office Action received for European Patent Application No. 10763539.3, mailed on Jun. 13, 2016, 5 pages.
Office Action received for European Patent Application No. 22705232.1, mailed on Sep. 26, 2024, 8 pages.
Office Action received for European Patent Application No. 22729921.1, mailed on Mar. 13, 2025, 8 pages.
Office Action received for European Patent Application No. 22733778.9, mailed on Oct. 22, 2024, 6 pages.
Office Action received for European Patent Application No. 22792995.7, mailed on Oct. 15, 2024, 8 pages.
Office Action received for Japanese Patent Application No. 2013-503731, mailed on Mar. 3, 2014, 8 pages (2 pages of English Translation and 6 pages of Official Copy).
Office Action received for Japanese Patent Application No. 2013-503731, mailed on Sep. 24, 2013, 3 pages (1 page of English Translation and 2 pages of Official Copy).
Office Action received for Japanese Patent Application No. 2014-212867, mailed on Aug. 18, 2017, 4 pages (1 page of English Translation and 3 pages of Official Copy).
Office Action received for Japanese Patent Application No. 2014-212867, mailed on Jun. 29, 2015, 8 pages (4 pages of English Translation and 4 pages of Official Copy).
Office Action received for Japanese Patent Application No. 2016-151497, mailed on Sep. 25, 2017, 7 pages (2 pages of English Translation and 5 pages of Official Copy).
Office Action received for Japanese Patent Application No. 2018-127760, mailed on Feb. 22, 2019, 10 pages (5 pages of English Translation and 5 pages of Official Copy).
Office Action received for Japanese Patent Application No. 2018-127760, mailed on Jul. 5, 2019, 4 pages (1 page of English Translation and 3 pages of Official Copy).
Office Action received for Japanese Patent Application No. 2019-182484, mailed on Dec. 4, 2020, 6 pages (1 page of English Translation and 5 pages of Official Copy).
Office Action received for Japanese Patent Application No. 2022-197327, mailed on Mar. 1, 2024, 14 pages (7 pages of English Translation and 7 pages of Official Copy).
Office Action received for Japanese Patent Application No. 2023-571312, mailed on Jul. 16, 2024, 4 pages (2 pages of English Translation and 2 pages of Official Copy).
Office Action received for Japanese Patent Application No. 2024-146741, mailed on Mar. 28, 2025, 10 pages (5 pages of English Translation and 5 pages of Official Copy).
Office Action received for Korean Patent Application No. 10-2012-7028535, mailed on Nov. 26, 2013, 10 pages (4 pages of English Translation and 6 pages of Official Copy).
Office Action received for Korean Patent Application No. 10-2014-7005164, mailed on May 23, 2014, 15 pages (6 pages of English Translation and 9 pages of Official Copy).
Office Action received for Korean Patent Application No. 10-2014-7029838, mailed on Dec. 20, 2014, 13 pages (5 pages of English Translation and 8 pages of Official Copy).
Office Action received for Korean Patent Application No. 10-2015-7007050, mailed on Apr. 16, 2015, 14 pages (6 pages of English Translation and 8 pages of Official Copy).
Office Action received for Korean Patent Application No. 10-2015-7007050, mailed on Oct. 23, 2015, 7 pages (3 pages of English Translation and 4 pages of Official Copy).
Office Action received for Korean Patent Application No. 10-2016-7014580, mailed on Jan. 30, 2018, 10 pages (4 pages of English Translation and 6 pages of Official Copy).
Office Action received for Korean Patent Application No. 10-2016-7014580, mailed on Jul. 30, 2018, 7 pages (3 pages of English Translation and 4 pages of Official Copy).
Office Action received for Korean Patent Application No. 10-2016-7014580, mailed on Jun. 29, 2017, 7 pages (1 page of English Translation and 6 pages of Official Copy).
Office Action received for Korean Patent Application No. 10-2016-7014580, mailed on Sep. 19, 2018, 7 pages (3 pages of English Translation and 4 pages of Official Copy).
Office Action received for Korean Patent Application No. 10-2016-7014580, mailed on Sep. 27, 2016, 9 pages (4 pages of English Translation and 5 pages of Official Copy).
Office Action received for Korean Patent Application No. 10-2017-7002774, mailed on Apr. 18, 2017, 10 pages (4 pages of English Translation and 6 pages of Official Copy).
Office Action received for Korean Patent Application No. 10-2017-7002774, mailed on Jul. 30, 2018, 6 pages (3 pages of English Translation and 3 pages of Official Copy).
Office Action received for Korean Patent Application No. 10-2017-7002774, mailed on Sep. 20, 2018, 12 pages (6 pages of English Translation and 6 pages of Official Copy).
Office Action received for Korean Patent Application No. 10-2018-7036975, mailed on Mar. 22, 2019, 11 pages (5 pages of English Translation and 6 pages of Official Copy).
Office Action received for Korean Patent Application No. 10-2020-7002845, mailed on Feb. 17, 2020, 14 pages (6 pages of English Translation and 8 pages of Official Copy).
Office Action received for Korean Patent Application No. 10-2020-7034959, mailed on Jan. 27, 2022, 7 pages (3 pages of English Translation and 4 pages of Official Copy).
Office Action received for Korean Patent Application No. 10-2020-7034959, mailed on Mar. 2, 2021, 12 pages (5 pages of English Translation and 7 pages of Official Copy).
Office Action received for Korean Patent Application No. 10-2020-7034959, mailed on Oct. 27, 2021, 8 pages (4 pages of English Translation and 4 pages of Official Copy).
Office Action received for Korean Patent Application No. 10-2022-7006973, mailed on May 19, 2022, 10 pages (4 pages of English Translation and 6 pages of Official Copy).
Office Action received for Korean Patent Application No. 10-2022-7006973, mailed on Nov. 24, 2022, 6 pages (3 pages of English Translation and 3 pages of Official Copy).
Office Action received for Korean Patent Application No. 10-2023-7005442, mailed on Jul. 25, 2023, 10 pages (4 pages of English Translation and 6 pages of Official Copy).
Office Action received for Korean Patent Application No. 10-2024-7019962, mailed on Jul. 16, 2024, 6 pages (2 pages of English Translation and 4 pages of Official Copy).
Office Action received for Korean Patent Application No. 10-2024-7019962, mailed on Sep. 25, 2024, 7 pages (2 pages of English Translation and 5 pages of Official Copy).
Office Action received for Korean Patent Application No. 10-2024-7043493, mailed on Mar. 19, 2025, 11 pages (4 pages of English Translation and 7 pages of Official Copy).
Office Action received for Mexican Patent Application No. MX/a/2014/004295, mailed on Aug. 21, 2014, 4 pages (2 pages of English Translation and 2 pages of Official Copy).
Office Action received for Mexican Patent Application No. MX/a/2014/004295, mailed on Jan. 20, 2015, 4 pages (1 page of English Translation and 3 pages of Official Copy).
Office Action received for Mexican Patent Application No. MX/a/2015/010523, mailed on Jan. 26, 2016, 4 pages (2 pages of English Translation and 2 pages of Official Copy).
Office Action received for Mexican Patent Application No. MX/a/2016/012174, mailed on Apr. 10, 2019, 7 pages (4 pages of English Translation and 3 pages of Official Copy).
Office Action received for Mexican Patent Application No. MX/a/2016/012174, mailed on Aug. 8, 2019, 7 pages (2 pages of English Translation and 5 pages of Official Copy).
Office Action received for Mexican Patent Application No. MX/a/2020/003290, mailed on Nov. 11, 2022, 7 pages (2 pages of English Translation and 5 pages of Official Copy).
Office Action received for Mexican Patent Application No. MX/a/2020/003290, mailed on Oct. 26, 2022, 8 pages (3 pages of English Translation and 5 pages of Official Copy).
Office Action received for Mexican Patent Application No. MX/a/2023/005388, mailed on Dec. 15, 2023, 18 pages (9 pages of English Translation and 9 pages of Official Copy).

(56) References Cited

OTHER PUBLICATIONS

Office Action received for Mexican Patent Application No. MX/a/2023/005388, mailed on Jun. 2, 2023, 24 pages (12 pages of English Translation and 12 pages of Official Copy).
Office Action received for Taiwanese Patent Application No. 099132253, mailed on Jun. 24, 2013, 16 pages (8 pages of English Translation and 8 pages of Official Copy).
Office Action received for Taiwanese Patent Application No. 099132253, mailed on Mar. 27, 2014, 10 pages (4 pages of English Translation and 6 pages of Official Copy).
Office Action received for Taiwanese Patent Application No. 099132254, mailed on May 27, 2013, 24 pages (12 pages of English Translation and 12 pages of Official Copy).
Result of Consultation received for European Patent Application No. 22705232.1, mailed on Mar. 26, 2025, 3 pages.
Sharf et al., "SnapPaste an interactive technique for easy mesh composition", The Visual Computer; International Journal Of Computer Graphics, Springer, Berlin, De, vol. 22, No. 9-11 Available Online at <http://dx.doi.org/10.1007/s00371-006-0068-5>, Aug. 25, 2006, pp. 835-844.
Supplemental Notice of Allowance received for U.S. Appl. No. 17/484,899, mailed on Oct. 29, 2024, 5 pages.

* cited by examiner

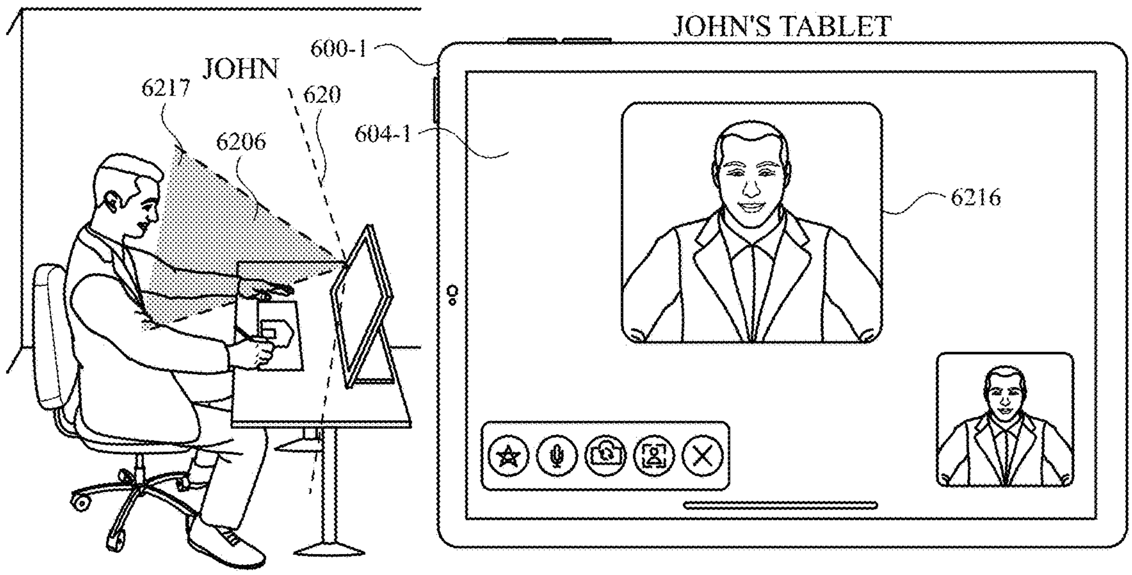
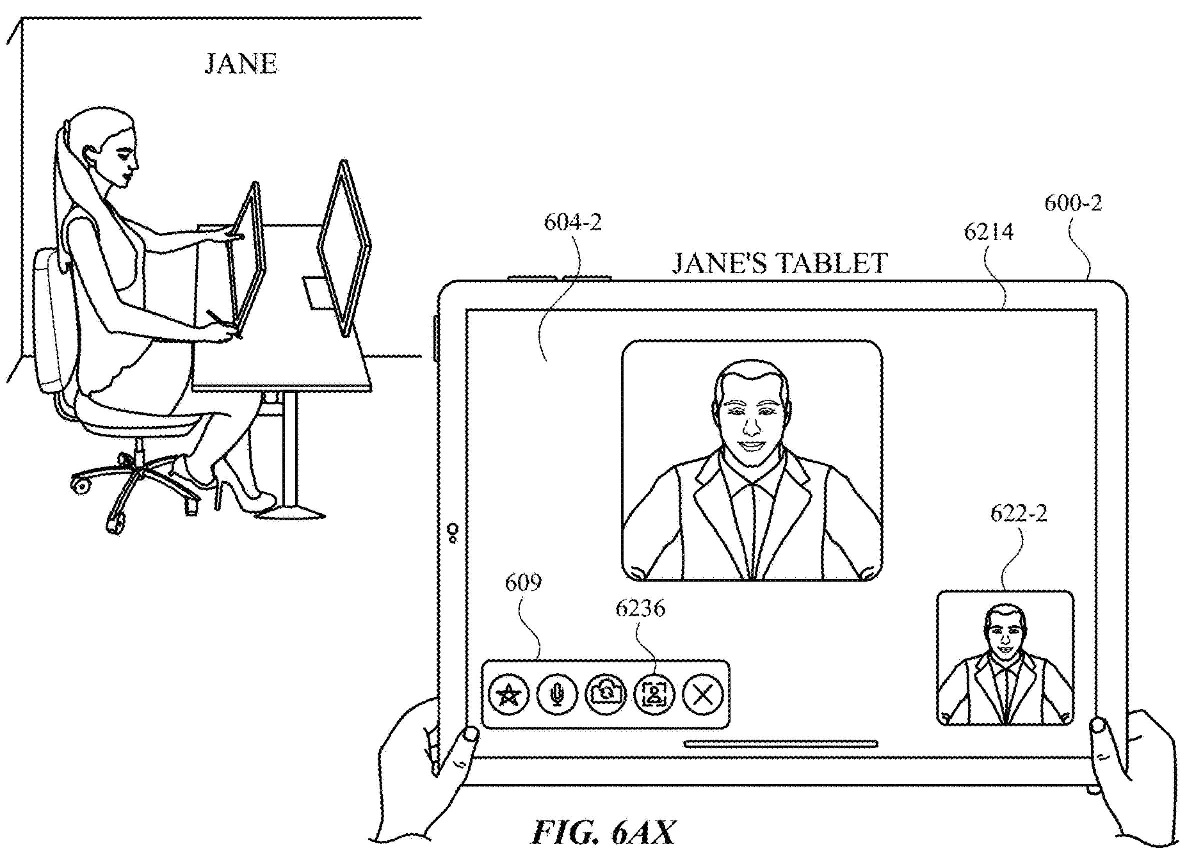
FIG. 6AX

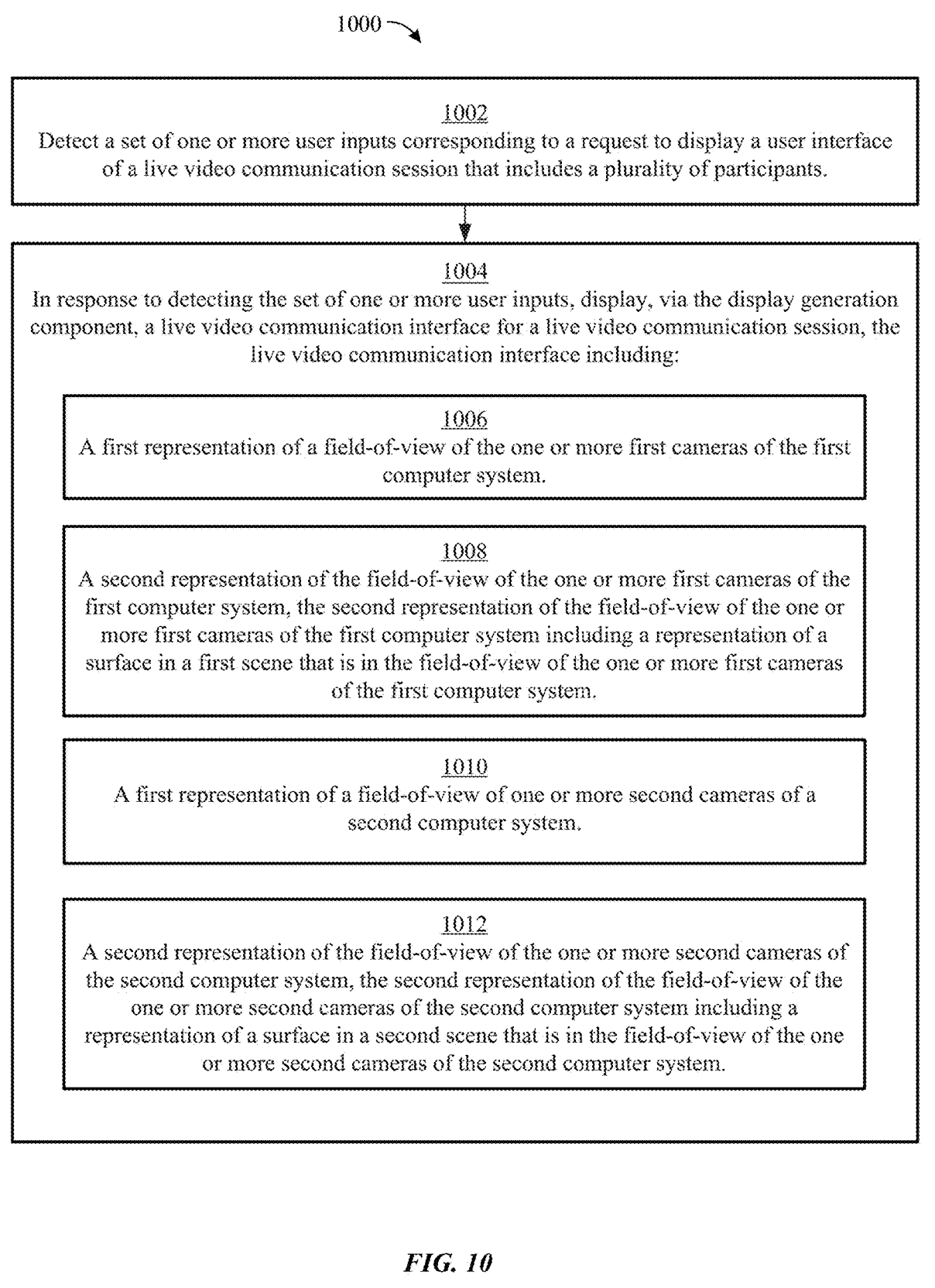

1000

1002
Detect a set of one or more user inputs corresponding to a request to display a user interface of a live video communication session that includes a plurality of participants.

1004
In response to detecting the set of one or more user inputs, display, via the display generation component, a live video communication interface for a live video communication session, the live video communication interface including:

1006
A first representation of a field-of-view of the one or more first cameras of the first computer system.

1008
A second representation of the field-of-view of the one or more first cameras of the first computer system, the second representation of the field-of-view of the one or more first cameras of the first computer system including a representation of a surface in a first scene that is in the field-of-view of the one or more first cameras of the first computer system.

1010
A first representation of a field-of-view of one or more second cameras of a second computer system.

1012
A second representation of the field-of-view of the one or more second cameras of the second computer system, the second representation of the field-of-view of the one or more second cameras of the second computer system including a representation of a surface in a second scene that is in the field-of-view of the one or more second cameras of the second computer system.

*FIG. 10*

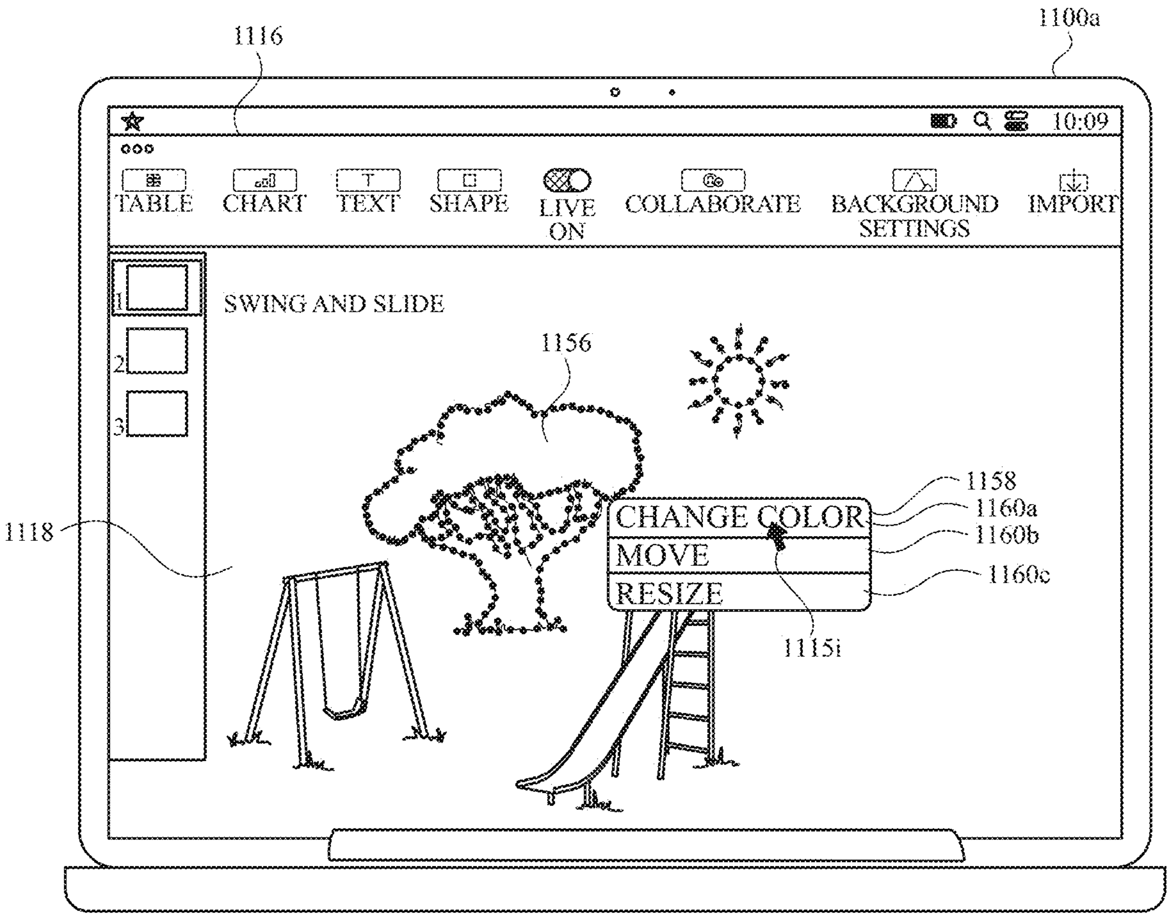
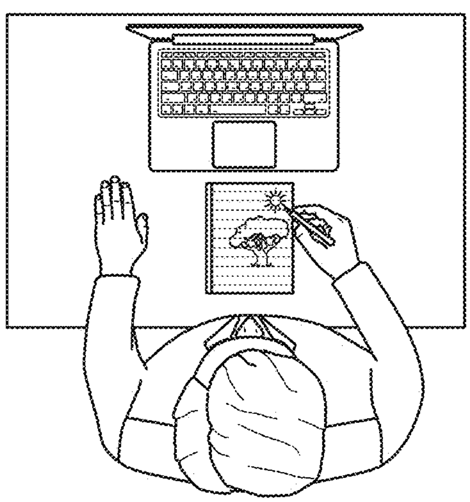
*FIG. 11I*

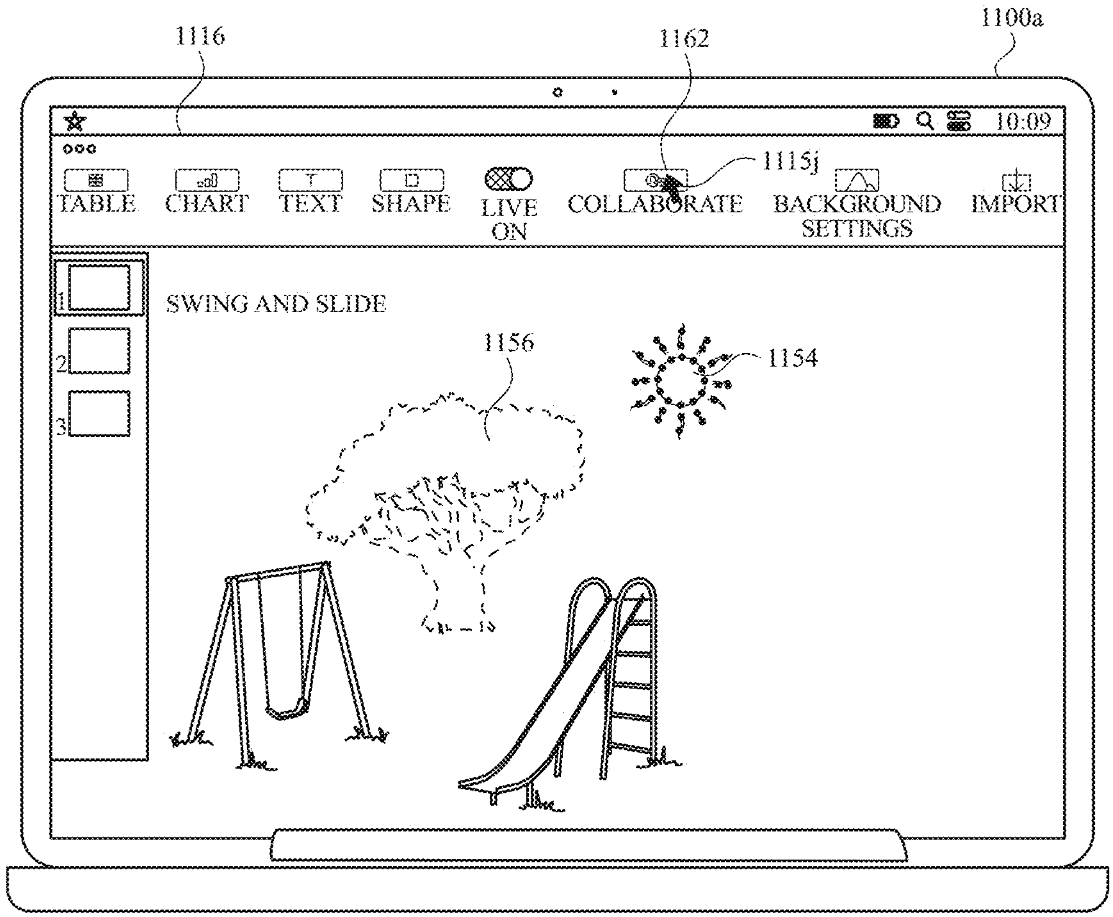
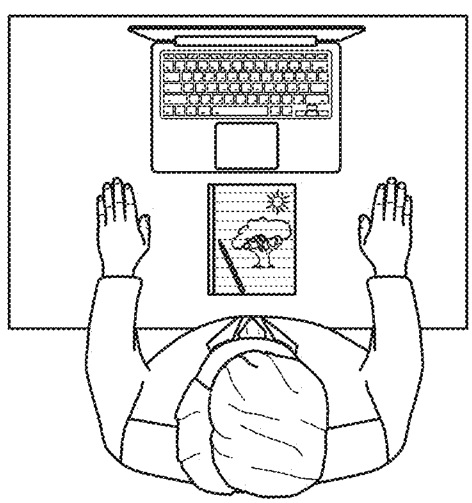
*FIG. 11J*

Figure 12:
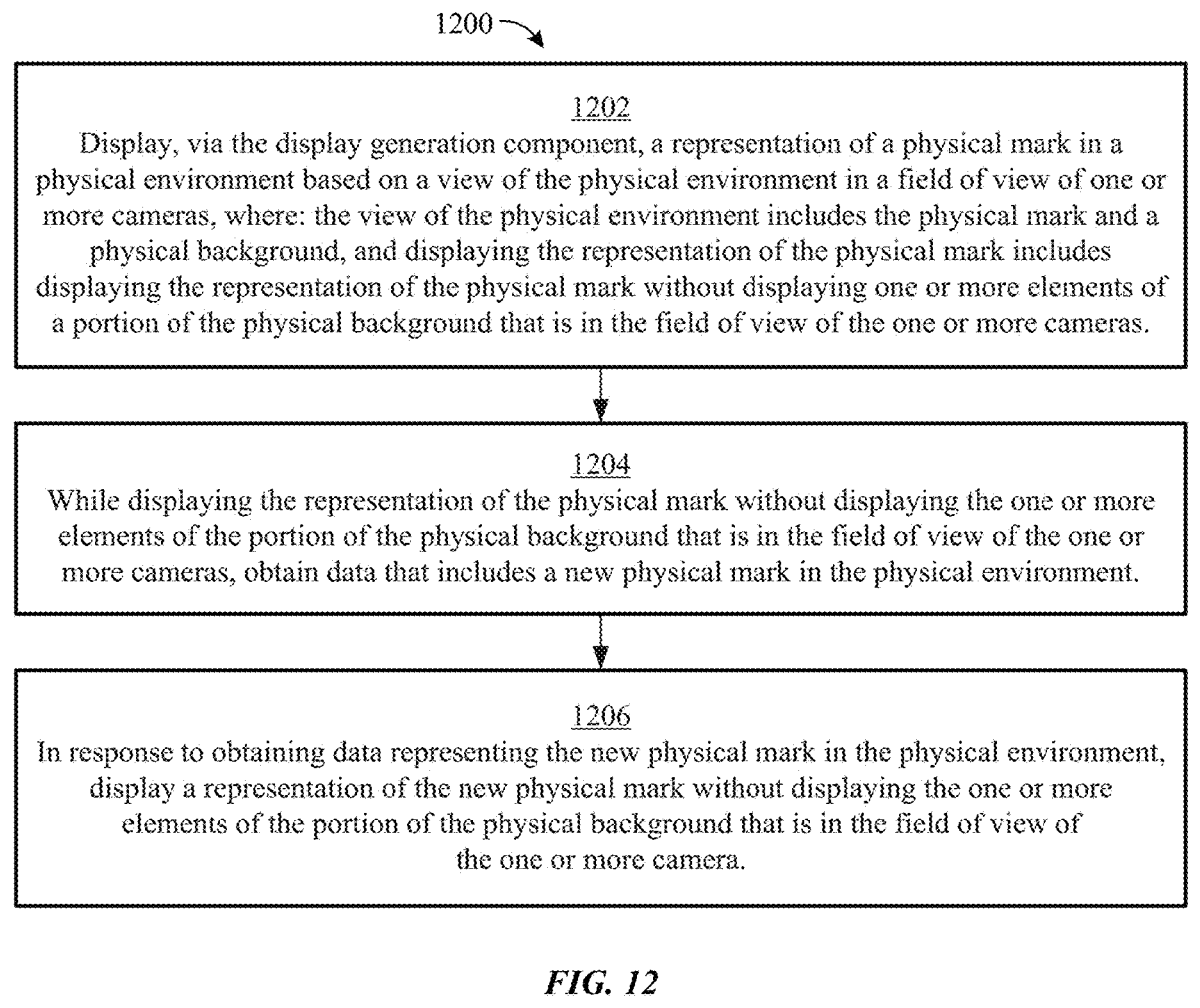

1200

1202
Display, via the display generation component, a representation of a physical mark in a physical environment based on a view of the physical environment in a field of view of one or more cameras, where: the view of the physical environment includes the physical mark and a physical background, and displaying the representation of the physical mark includes displaying the representation of the physical mark without displaying one or more elements of a portion of the physical background that is in the field of view of the one or more cameras.

1204
While displaying the representation of the physical mark without displaying the one or more elements of the portion of the physical background that is in the field of view of the one or more cameras, obtain data that includes a new physical mark in the physical environment.

1206
In response to obtaining data representing the new physical mark in the physical environment, display a representation of the new physical mark without displaying the one or more elements of the portion of the physical background that is in the field of view of the one or more camera.

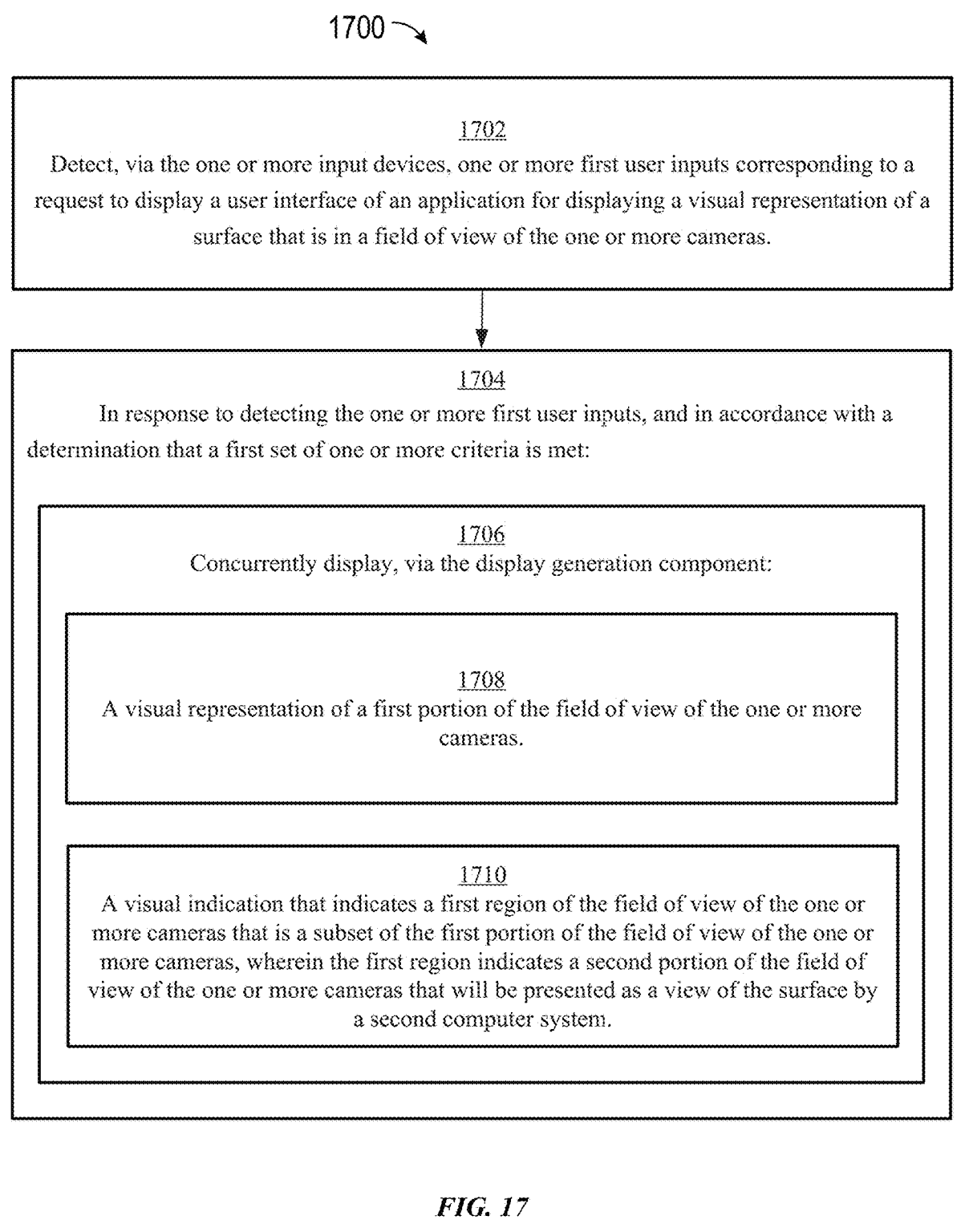

1702
Detect, via the one or more input devices, one or more first user inputs corresponding to a request to display a user interface of an application for displaying a visual representation of a surface that is in a field of view of the one or more cameras.

1704
In response to detecting the one or more first user inputs, and in accordance with a determination that a first set of one or more criteria is met:

1706
Concurrently display, via the display generation component:

1708
A visual representation of a first portion of the field of view of the one or more cameras.

1710
A visual indication that indicates a first region of the field of view of the one or more cameras that is a subset of the first portion of the field of view of the one or more cameras, wherein the first region indicates a second portion of the field of view of the one or more cameras that will be presented as a view of the surface by a second computer system.

*FIG. 17*

WIDE ANGLE VIDEO CONFERENCE

CROSS-REFERENCE TO RELATED APPLICATION

This application is a continuation of U.S. patent application Ser. No. 17/950,922, entitled "WIDE ANGLE VIDEO CONFERENCE," filed on Sep. 22, 2022, which claims priority to U.S. Provisional Patent Application No. 63/392,096, entitled "WIDE ANGLE VIDEO CONFERENCE," filed on Jul. 25, 2022; and claims priority to U.S. Provisional Patent Application No. 63/357,605, entitled "WIDE ANGLE VIDEO CONFERENCE," filed on Jun. 30, 2022; and claims priority to U.S. Provisional Patent Application No. 63/349,134, entitled "WIDE ANGLE VIDEO CONFERENCE," filed on Jun. 5, 2022; and claims priority to U.S. Provisional Patent Application No. 63/307,780, entitled "WIDE ANGLE VIDEO CONFERENCE," filed on Feb. 8, 2022; and claims priority to U.S. Provisional Patent Application No. 63/248,137, entitled "WIDE ANGLE VIDEO CONFERENCE," filed on Sep. 24, 2021. The contents of each of these applications are hereby incorporated by reference in their entireties.

FIELD

The present disclosure relates generally to computer user interfaces, and more specifically to techniques for managing a live video communication session and/or managing digital content.

BACKGROUND

Computer systems can include hardware and/or software for displaying an interface for a live video communication session.

BRIEF SUMMARY

Some techniques for managing a live video communication session using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for managing a live video communication session and/or managing digital content. Such methods and interfaces optionally complement or replace other methods for managing a live video communication session and/or managing digital content. Such methods and interfaces reduce the cognitive burden on a user and produce a more efficient human-machine interface. For battery-operated computing devices, such methods and interfaces conserve power and increase the time between battery charges.

In accordance with some embodiments, a method performed at a computer system that is in communication with a display generation component, one or more cameras, and one or more input devices is described. The method comprises: displaying, via the display generation component, a live video communication interface for a live video communication session, the live video communication interface including a representation of at least a portion of a field-of-view of the one or more cameras; while displaying the live video communication interface, detecting, via the one or more input devices, one or more user inputs including a user input directed to a surface in a scene that is in the field-of-view of the one or more cameras; and in response to detecting the one or more user inputs, displaying, via the display generation component, a representation of the surface, wherein the representation of the surface includes an image of the surface captured by the one or more cameras that is modified based on a position of the surface relative to the one or more cameras.

In accordance with some embodiments, a non-transitory computer-readable storage medium is described. The non-transitory computer-readable storage medium stores one or more programs configured to be executed by one or more processors of a computer system that is in communication with a display generation component, one or more cameras, and one or more input devices, the one or more programs including instructions for: displaying, via the display generation component, a live video communication interface for a live video communication session, the live video communication interface including a representation of at least a portion of a field-of-view of the one or more cameras; while displaying the live video communication interface, detecting, via the one or more input devices, one or more user inputs including a user input directed to a surface in a scene that is in the field-of-view of the one or more cameras; and in response to detecting the one or more user inputs, displaying, via the display generation component, a representation of the surface, wherein the representation of the surface includes an image of the surface captured by the one or more cameras that is modified based on a position of the surface relative to the one or more cameras.

In accordance with some embodiments, a transitory computer-readable storage medium is described. The transitory computer-readable storage medium stores one or more programs configured to be executed by one or more processors of a computer system that is in communication with a display generation component, one or more cameras, and one or more input devices, the one or more programs including instructions for: displaying, via the display generation component, a live video communication interface for a live video communication session, the live video communication interface including a representation of at least a portion of a field-of-view of the one or more cameras; while displaying the live video communication interface, detecting, via the one or more input devices, one or more user inputs including a user input directed to a surface in a scene that is in the field-of-view of the one or more cameras; and in response to detecting the one or more user inputs, displaying, via the display generation component, a representation of the surface, wherein the representation of the surface includes an image of the surface captured by the one or more cameras that is modified based on a position of the surface relative to the one or more cameras.

In accordance with some embodiments, a computer system that is configured to communicate with a display generation component, one or more cameras, and one or more input devices is described. The computer system comprises: one or more processors; and memory storing one or more programs configured to be executed by the one or more processors, the one or more programs including instructions for: displaying, via the display generation component, a live video communication interface for a live video communication session, the live video communication interface including a representation of at least a portion of a field-of-view of the one or more cameras; while displaying the live video communication interface, detecting, via the one or more input devices, one or more user inputs including a user input directed to a surface in a scene that is in the field-of-view of the one or more cameras; and in response to detecting the one or more user inputs, displaying, via the display generation component, a representation of the surface, wherein the representation of the surface includes an image of the surface captured by the one or more cameras that is modified based on a position of the surface relative to the one or more cameras.

In accordance with some embodiments, a computer system that is configured to communicate with a display generation component, one or more cameras, and one or more input devices is described. The computer system comprises: means for displaying, via the display generation component, a live video communication interface for a live video communication session, the live video communication interface including a representation of a first portion of a scene that is in a field-of-view captured by the one or more cameras; and means, while displaying the live video communication interface, for obtaining, via the one or more cameras, image data for the field-of-view of the one or more cameras, the image data including a first gesture; and means, responsive to obtaining the image data for the field-of-view of the one or more cameras, for: in accordance with a determination that the first gesture satisfies a first set of criteria, displaying, via the display generation component, a representation of a second portion of the scene that is in the field-of-view of the one or more cameras, the representation of the second portion of the scene including different visual content from the representation of the first portion of the scene; and in accordance with a determination that the first gesture satisfies a second set of criteria different from the first set of criteria, continuing to display, via the display generation component, the representation of the first portion of the scene.

In accordance with some embodiments, a computer program product is described. The computer program product comprises one or more programs configured to be executed by one or more processors of a computer system that is in communication with a display generation component, one or more cameras, and one or more input devices. The one or more programs include instructions for: displaying, via the display generation component, a live video communication interface for a live video communication session, the live video communication interface including a representation of a first portion of a scene that is in a field-of-view captured by the one or more cameras; and while displaying the live video communication interface, obtaining, via the one or more cameras, image data for the field-of-view of the one or more cameras, the image data including a first gesture; and in response to obtaining the image data for the field-of-view of the one or more cameras: in accordance with a determination that the first gesture satisfies a first set of criteria, displaying, via the display generation component, a representation of a second portion of the scene that is in the field-of-view of the one or more cameras, the representation of the second portion of the scene including different visual content from the representation of the first portion of the scene; and in accordance with a determination that the first gesture satisfies a second set of criteria different from the first set of criteria, continuing to display, via the display generation component, the representation of the first portion of the scene.

In accordance with some embodiments, a method performed at a computer system that is in communication with a display generation component, one or more first cameras, and one or more input devices is described. The method comprises: detecting a set of one or more user inputs corresponding to a request to display a user interface of a live video communication session that includes a plurality of participants; in response to detecting the set of one or more user inputs, displaying, via the display generation component, a live video communication interface for a live video communication session, the live video communication interface including: a first representation of a field-of-view of the one or more first cameras of the first computer system; a second representation of the field-of-view of the one or more first cameras of the first computer system, the second representation of the field-of-view of the one or more first cameras of the first computer system including a representation of a surface in a first scene that is in the field-of-view of the one or more first cameras of the first computer system; a first representation of a field-of-view of one or more second cameras of a second computer system; and a second representation of the field-of-view of the one or more second cameras of the second computer system, the second representation of the field-of-view of the one or more second cameras of the second computer system including a representation of a surface in a second scene that is in the field-of-view of the one or more second cameras of the second computer system.

In accordance with some embodiments, a non-transitory computer-readable storage medium is described. The non-transitory computer-readable storage medium stores one or more programs configured to be executed by one or more processors of a computer system that is in communication a display generation component, one or more first cameras, and one or more input devices, the one or more programs including instructions for: detecting a set of one or more user inputs corresponding to a request to display a user interface of a live video communication session that includes a plurality of participants; in response to detecting the set of one or more user inputs, displaying, via the display generation component, a live video communication interface for a live video communication session, the live video communication interface including: a first representation of a field-of-view of the one or more first cameras of the first computer system; a second representation of the field-of-view of the one or more first cameras of the first computer system, the second representation of the field-of-view of the one or more first cameras of the first computer system including a representation of a surface in a first scene that is in the field-of-view of the one or more first cameras of the first computer system; a first representation of a field-of-view of one or more second cameras of a second computer system; and a second representation of the field-of-view of the one or more second cameras of the second computer system, the second representation of the field-of-view of the one or more second cameras of the second computer system including a representation of a surface in a second scene that is in the field-of-view of the one or more second cameras of the second computer system.

In accordance with some embodiments, a transitory computer-readable storage medium is described. The transitory computer-readable storage medium stores one or more programs configured to be executed by one or more processors of a computer system that is in communication with a display generation component, one or more first cameras, and one or more input devices, the one or more programs including instructions for: detecting a set of one or more user inputs corresponding to a request to display a user interface of a live video communication session that includes a plurality of participants; in response to detecting the set of one or more user inputs, displaying, via the display generation component, a live video communication interface for a live video communication session, the live video communication interface including: a first representation of a field-of-view of the one or more first cameras of the first computer system; a second representation of the field-of-view of the one or more first cameras of the first computer system, the second representation of the field-of-view of the one or more first cameras of the first computer system including a representation of a surface in a first scene that is in the field-of-view of the one or more first cameras of the first computer system; a first representation of a field-of-view of one or more second cameras of a second computer system; and a second representation of the field-of-view of the one or more second cameras of the second computer system, the second representation of the field-of-view of the one or more second cameras of the second computer system including a representation of a surface in a second scene that is in the field-of-view of the one or more second cameras of the second computer system.

In accordance with some embodiments, a computer system that is configured to communicate with a display generation component, one or more first cameras, and one or more input devices is described. The computer system comprises: one or more processors; and memory storing one or more programs configured to be executed by the one or more processors, the one or more programs including instructions for: detecting a set of one or more user inputs corresponding to a request to display a user interface of a live video communication session that includes a plurality of participants; in response to detecting the set of one or more user inputs, displaying, via the display generation component, a live video communication interface for a live video communication session, the live video communication interface including: a first representation of a field-of-view of the one or more first cameras of the first computer system; a second representation of the field-of-view of the one or more first cameras of the first computer system, the second representation of the field-of-view of the one or more first cameras of the first computer system including a representation of a surface in a first scene that is in the field-of-view of the one or more first cameras of the first computer system; a first representation of a field-of-view of one or more second cameras of a second computer system; and a second representation of the field-of-view of the one or more second cameras of the second computer system, the second representation of the field-of-view of the one or more second cameras of the second computer system including a representation of a surface in a second scene that is in the field-of-view of the one or more second cameras of the second computer system.

In accordance with some embodiments, a computer system that is configured to communicate with a display generation component, one or more first cameras, and one or more input devices is described. The computer system comprises: means for detecting a set of one or more user inputs corresponding to a request to display a user interface of a live video communication session that includes a plurality of participants; means, responsive to detecting the set of one or more user inputs, for displaying, via the display generation component, a live video communication interface for a live video communication session, the live video communication interface including: a first representation of a field-of-view of the one or more first cameras of the first computer system; a second representation of the field-of-view of the one or more first cameras of the first computer system, the second representation of the field-of-view of the one or more first cameras of the first computer system including a representation of a surface in a first scene that is in the field-of-view of the one or more first cameras of the first computer system; a first representation of a field-of-view of one or more second cameras of a second computer system; and a second representation of the field-of-view of the one or more second cameras of the second computer system, the second representation of the field-of-view of the one or more second cameras of the second computer system including a representation of a surface in a second scene that is in the field-of-view of the one or more second cameras of the second computer system.

In accordance with some embodiments, a computer program product is described. The computer program product comprises one or more programs configured to be executed by one or more processors of a computer system that is in communication with a display generation component, one or more first cameras, and one or more input devices. The one or more programs include instructions for: detecting a set of one or more user inputs corresponding to a request to display a user interface of a live video communication session that includes a plurality of participants; in response to detecting the set of one or more user inputs, displaying, via the display generation component, a live video communication interface for a live video communication session, the live video communication interface including: a first representation of a field-of-view of the one or more first cameras of the first computer system; a second representation of the field-of-view of the one or more first cameras of the first computer system, the second representation of the field-of-view of the one or more first cameras of the first computer system including a representation of a surface in a first scene that is in the field-of-view of the one or more first cameras of the first computer system; a first representation of a field-of-view of one or more second cameras of a second computer system; and a second representation of the field-of-view of the one or more second cameras of the second computer system, the second representation of the field-of-view of the one or more second cameras of the second computer system including a representation of a surface in a second scene that is in the field-of-view of the one or more second cameras of the second computer system.

In accordance with some embodiments, a method performed at a computer system that is in communication with a display generation component, one or more first cameras, and one or more input devices is described. The method comprises: detecting a set of one or more user inputs corresponding to a request to display a user interface of a live video communication session that includes a plurality of participants; in response to detecting the set of one or more user inputs, displaying, via the display generation component, a live video communication interface for a live video communication session, the live video communication interface including: a first representation of a field-of-view of the one or more first cameras of the first computer system; a second representation of the field-of-view of the one or more first cameras of the first computer system, the second representation of the field-of-view of the one or more first cameras of the first computer system including a representation of a surface in a first scene that is in the field-of-view of the one or more first cameras of the first computer system; a first representation of a field-of-view of one or more second cameras of a second computer system; and a second representation of the field-of-view of the one or more second cameras of the second computer system, the second representation of the field-of-view of the one or more second cameras of the second computer system including a representation of a surface in a second scene that is in the field-of-view of the one or more second cameras of the second computer system.

In accordance with some embodiments, a non-transitory computer-readable storage medium is described. The non-transitory computer-readable storage medium stores one or more programs configured to be executed by one or more processors of a computer system that is in communication with a display generation component, one or more first cameras, and one or more input devices, the one or more programs including instructions for: detecting a set of one or more user inputs corresponding to a request to display a user interface of a live video communication session that includes a plurality of participants; in response to detecting the set of one or more user inputs, displaying, via the display generation component, a live video communication interface for a live video communication session, the live video communication interface including: a first representation of a field-of-view of the one or more first cameras of the first computer system; a second representation of the field-of-view of the one or more first cameras of the first computer system, the second representation of the field-of-view of the one or more first cameras of the first computer system including a representation of a surface in a first scene that is in the field-of-view of the one or more first cameras of the first computer system; a first representation of a field-of-view of one or more second cameras of a second computer system; and a second representation of the field-of-view of the one or more second cameras of the second computer system, the second representation of the field-of-view of the one or more second cameras of the second computer system including a representation of a surface in a second scene that is in the field-of-view of the one or more second cameras of the second computer system.

In accordance with some embodiments, a transitory computer-readable storage medium is described. The transitory computer-readable storage medium stores one or more programs configured to be executed by one or more processors of a computer system that is in communication with a display generation component, one or more first cameras, and one or more input devices, the one or more programs including instructions for: detecting a set of one or more user inputs corresponding to a request to display a user interface of a live video communication session that includes a plurality of participants; in response to detecting the set of one or more user inputs, displaying, via the display generation component, a live video communication interface for a live video communication session, the live video communication interface including: a first representation of a field-of-view of the one or more first cameras of the first computer system; a second representation of the field-of-view of the one or more first cameras of the first computer system, the second representation of the field-of-view of the one or more first cameras of the first computer system including a representation of a surface in a first scene that is in the field-of-view of the one or more first cameras of the first computer system; a first representation of a field-of-view of one or more second cameras of a second computer system; and a second representation of the field-of-view of the one or more second cameras of the second computer system, the second representation of the field-of-view of the one or more second cameras of the second computer system including a representation of a surface in a second scene that is in the field-of-view of the one or more second cameras of the second computer system.

In accordance with some embodiments, a computer system that is configured to communicate with a display generation component, one or more first cameras, and one or more input devices is described. The computer system comprises: one or more processors; and memory storing one or more programs configured to be executed by the one or more processors, the one or more programs including instructions for: detecting a set of one or more user inputs corresponding to a request to display a user interface of a live video communication session that includes a plurality of participants; in response to detecting the set of one or more user inputs, displaying, via the display generation component, a live video communication interface for a live video communication session, the live video communication interface including: a first representation of a field-of-view of the one or more first cameras of the first computer system; a second representation of the field-of-view of the one or more first cameras of the first computer system, the second representation of the field-of-view of the one or more first cameras of the first computer system including a representation of a surface in a first scene that is in the field-of-view of the one or more first cameras of the first computer system; a first representation of a field-of-view of one or more second cameras of a second computer system; and a second representation of the field-of-view of the one or more second cameras of the second computer system, the second representation of the field-of-view of the one or more second cameras of the second computer system including a representation of a surface in a second scene that is in the field-of-view of the one or more second cameras of the second computer system.

In accordance with some embodiments, a computer system that is configured to communicate with a display generation component, one or more first cameras, and one or more input devices is described. The computer system comprises: means for detecting a set of one or more user inputs corresponding to a request to display a user interface of a live video communication session that includes a plurality of participants; means, responsive to detecting the set of one or more user inputs, for displaying, via the display generation component, a live video communication interface for a live video communication session, the live video communication interface including: a first representation of a field-of-view of the one or more first cameras of the first computer system; a second representation of the field-of-view of the one or more first cameras of the first computer system, the second representation of the field-of-view of the one or more first cameras of the first computer system including a representation of a surface in a first scene that is in the field-of-view of the one or more first cameras of the first computer system; a first representation of a field-of-view of one or more second cameras of a second computer system; and a second representation of the field-of-view of the one or more second cameras of the second computer system, the second representation of the field-of-view of the one or more second cameras of the second computer system including a representation of a surface in a second scene that is in the field-of-view of the one or more second cameras of the second computer system.

In accordance with some embodiments, a computer program product is described. The computer program product comprises one or more programs configured to be executed by one or more processors of a computer system that is in communication with a display generation component, one or more first cameras, and one or more input devices. The one or more programs include instructions for: detecting a set of one or more user inputs corresponding to a request to display a user interface of a live video communication session that includes a plurality of participants; in response to detecting the set of one or more user inputs, displaying, via the display generation component, a live video communication interface for a live video communication session, the live video communication interface including: a first representation of a field-of-view of the one or more first cameras of the first computer system; a second representation of the field-of-view of the one or more first cameras of the first computer system, the second representation of the field-of-view of the one or more first cameras of the first computer system including a representation of a surface in a first scene that is in the field-of-view of the one or more first cameras of the first computer system; a first representation of a field-of-view of one or more second cameras of a second computer system; and a second representation of the field-of-view of the one or more second cameras of the second computer system, the second representation of the field-of-view of the one or more second cameras of the second computer system including a representation of a surface in a second scene that is in the field-of-view of the one or more second cameras of the second computer system.

In accordance with some embodiments, a method is described. The method comprises: at a first computer system that is in communication with a first display generation component and one or more sensors: while the first computer system is in a live video communication session with a second computer system: displaying, via the first display generation component, a representation of a first view of a physical environment that is in a field of view of one or more cameras of the second computer system; while displaying the representation of the first view of the physical environment, detecting, via the one or more sensors, a change in a position of the first computer system; and in response to detecting the change in the position of the first computer system, displaying, via the first display generation component, a representation of a second view of the physical environment in the field of view of the one or more cameras of the second computer system that is different from the first view of the physical environment in the field of view of the one or more cameras of the second computer system.

In accordance with some embodiments, a non-transitory computer-readable storage medium is described. The non-transitory computer-readable storage medium stores one or more programs configured to be executed by one or more processors of a computer system that is in communication with a first display generation component and one or more sensors, the one or more programs including instructions for: while the first computer system is in a live video communication session with a second computer system: displaying, via the first display generation component, a representation of a first view of a physical environment that is in a field of view of one or more cameras of the second computer system; while displaying the representation of the first view of the physical environment, detecting, via the one or more sensors, a change in a position of the first computer system; and in response to detecting the change in the position of the first computer system, displaying, via the first display generation component, a representation of a second view of the physical environment in the field of view of the one or more cameras of the second computer system that is different from the first view of the physical environment in the field of view of the one or more cameras of the second computer system.

In accordance with some embodiments, a transitory computer-readable storage medium is described. The transitory computer-readable storage medium stores one or more programs configured to be executed by one or more processors of a computer system that is in communication with a first display generation component and one or more sensors, the one or more programs including instructions for: while the first computer system is in a live video communication session with a second computer system: displaying, via the first display generation component, a representation of a first view of a physical environment that is in a field of view of one or more cameras of the second computer system; while displaying the representation of the first view of the physical environment, detecting, via the one or more sensors, a change in a position of the first computer system; and in response to detecting the change in the position of the first computer system, displaying, via the first display generation component, a representation of a second view of the physical environment in the field of view of the one or more cameras of the second computer system that is different from the first view of the physical environment in the field of view of the one or more cameras of the second computer system.

In accordance with some embodiments, a computer system configured to communicate with a first display generation component and one or more sensors is described. The computer system comprises: one or more processors; and memory storing one or more programs configured to be executed by the one or more processors, the one or more programs including instructions for: while the first computer system is in a live video communication session with a second computer system: displaying, via the first display generation component, a representation of a first view of a physical environment that is in a field of view of one or more cameras of the second computer system; while displaying the representation of the first view of the physical environment, detecting, via the one or more sensors, a change in a position of the first computer system; and in response to detecting the change in the position of the first computer system, displaying, via the first display generation component, a representation of a second view of the physical environment in the field of view of the one or more cameras of the second computer system that is different from the first view of the physical environment in the field of view of the one or more cameras of the second computer system.

In accordance with some embodiments, a computer system configured to communicate with a first display generation component and one or more sensors is described. The computer system comprises: means for, while the first computer system is in a live video communication session with a second computer system: displaying, via the first display generation component, a representation of a first view of a physical environment that is in a field of view of one or more cameras of the second computer system; while displaying the representation of the first view of the physical environment, detecting, via the one or more sensors, a change in a position of the first computer system; and in response to detecting the change in the position of the first computer system, displaying, via the first display generation component, a representation of a second view of the physical environment in the field of view of the one or more cameras of the second computer system that is different from the first view of the physical environment in the field of view of the one or more cameras of the second computer system.

In accordance with some embodiments, a computer program product is described. The computer program product comprises one or more programs configured to be executed by one or more processors of a computer system that is in communication with a first display generation component and one or more sensors, the one or more programs including instructions for: while the first computer system is in a live video communication session with a second computer system: displaying, via the first display generation component, a representation of a first view of a physical environment that is in a field of view of one or more cameras of the second computer system; while displaying the representation of the first view of the physical environment, detecting, via the one or more sensors, a change in a position of the first computer system; and in response to detecting the change in the position of the first computer system, displaying, via the first display generation component, a representation of a second view of the physical environment in the field of view of the one or more cameras of the second computer system that is different from the first view of the physical environment in the field of view of the one or more cameras of the second computer system.

In accordance with some embodiments, a method is described. The method comprises: at a computer system that is in communication with a display generation component: displaying, via the display generation component, a representation of a physical mark in a physical environment based on a view of the physical environment in a field of view of one or more cameras, wherein: the view of the physical environment includes the physical mark and a physical background, and displaying the representation of the physical mark includes displaying the representation of the physical mark without displaying one or more elements of a portion of the physical background that is in the field of view of the one or more cameras; while displaying the representation of the physical mark without displaying the one or more elements of the portion of the physical background that is in the field of view of the one or more cameras, obtaining data that includes a new physical mark in the physical environment; and in response to obtaining data representing the new physical mark in the physical environment, displaying a representation of the new physical mark without displaying the one or more elements of the portion of the physical background that is in the field of view of the one or more cameras.

In accordance with some embodiments, a non-transitory computer-readable storage medium is described. The non-transitory computer-readable storage medium stores one or more programs configured to be executed by one or more processors of a computer system that is in communication with a display generation component, the one or more programs including instructions for: displaying, via the display generation component, a representation of a physical mark in a physical environment based on a view of the physical environment in a field of view of one or more cameras, wherein: the view of the physical environment includes the physical mark and a physical background, and displaying the representation of the physical mark includes displaying the representation of the physical mark without displaying one or more elements of a portion of the physical background that is in the field of view of the one or more cameras; while displaying the representation of the physical mark without displaying the one or more elements of the portion of the physical background that is in the field of view of the one or more cameras, obtaining data that includes a new physical mark in the physical environment; and in response to obtaining data representing the new physical mark in the physical environment, displaying a representation of the new physical mark without displaying the one or more elements of the portion of the physical background that is in the field of view of the one or more cameras.

In accordance with some embodiments, a transitory computer-readable storage medium is described. The transitory computer-readable storage medium stores one or more programs configured to be executed by one or more processors of a computer system that is in communication with a display generation component, the one or more programs including instructions for: displaying, via the display generation component, a representation of a physical mark in a physical environment based on a view of the physical environment in a field of view of one or more cameras, wherein: the view of the physical environment includes the physical mark and a physical background, and displaying the representation of the physical mark includes displaying the representation of the physical mark without displaying one or more elements of a portion of the physical background that is in the field of view of the one or more cameras; while displaying the representation of the physical mark without displaying the one or more elements of the portion of the physical background that is in the field of view of the one or more cameras, obtaining data that includes a new physical mark in the physical environment; and in response to obtaining data representing the new physical mark in the physical environment, displaying a representation of the new physical mark without displaying the one or more elements of the portion of the physical background that is in the field of view of the one or more cameras.

In accordance with some embodiments, a computer system configured to communicate with a display generation component is described. The computer system comprises: one or more processors; and memory storing one or more programs configured to be executed by the one or more processors, the one or more programs including instructions for: displaying, via the display generation component, a representation of a physical mark in a physical environment based on a view of the physical environment in a field of view of one or more cameras, wherein: the view of the physical environment includes the physical mark and a physical background, and displaying the representation of the physical mark includes displaying the representation of the physical mark without displaying one or more elements of a portion of the physical background that is in the field of view of the one or more cameras; while displaying the representation of the physical mark without displaying the one or more elements of the portion of the physical background that is in the field of view of the one or more cameras, obtaining data that includes a new physical mark in the physical environment; and in response to obtaining data representing the new physical mark in the physical environment, displaying a representation of the new physical mark without displaying the one or more elements of the portion of the physical background that is in the field of view of the one or more cameras.

In accordance with some embodiments, a computer system configured to communicate with a display generation component is described. The computer system comprises: means for displaying, via the display generation component, a representation of a physical mark in a physical environment based on a view of the physical environment in a field of view of one or more cameras, wherein: the view of the physical environment includes the physical mark and a physical background, and displaying the representation of the physical mark includes displaying the representation of the physical mark without displaying one or more elements of a portion of the physical background that is in the field of view of the one or more cameras; means for, while displaying the representation of the physical mark without displaying the one or more elements of the portion of the physical background that is in the field of view of the one or more cameras, obtaining data that includes a new physical mark in the physical environment; and means for, in response to obtaining data representing the new physical mark in the physical environment, displaying a representation of the new physical mark without displaying the one or more elements of the portion of the physical background that is in the field of view of the one or more cameras.

In accordance with some embodiments, a computer program product is described. The computer program product comprises one or more programs configured to be executed by one or more processors of a computer system that is in communication with a display generation component, the one or more programs including instructions for: displaying, via the display generation component, a representation of a physical mark in a physical environment based on a view of the physical environment in a field of view of one or more cameras, wherein: the view of the physical environment includes the physical mark and a physical background, and displaying the representation of the physical mark includes displaying the representation of the physical mark without displaying one or more elements of a portion of the physical background that is in the field of view of the one or more cameras; while displaying the representation of the physical mark without displaying the one or more elements of the portion of the physical background that is in the field of view of the one or more cameras, obtaining data that includes a new physical mark in the physical environment; and in response to obtaining data representing the new physical mark in the physical environment, displaying a representation of the new physical mark without displaying the one or more elements of the portion of the physical background that is in the field of view of the one or more cameras.

In accordance with some embodiments, a method is described. The method comprises: at a computer system that is in communication with a display generation component and one or more cameras: displaying, via the display generation component, an electronic document; detecting, via the one or more cameras, handwriting that includes physical marks on a physical surface that is in a field of view of the one or more cameras and is separate from the computer system; and in response to detecting the handwriting that includes physical marks on the physical surface that is in the field of view of the one or more cameras and is separate from the computer system, displaying, in the electronic document, digital text corresponding to the handwriting that is in the field of view of the one or more cameras.

In accordance with some embodiments, a non-transitory computer-readable storage medium is described. The non-transitory computer-readable storage medium stores one or more programs configured to be executed by one or more processors of a computer system that is in communication with a display generation component and one or more cameras, the one or more programs including instructions for: displaying, via the display generation component, an electronic document; detecting, via the one or more cameras, handwriting that includes physical marks on a physical surface that is in a field of view of the one or more cameras and is separate from the computer system; and in response to detecting the handwriting that includes physical marks on the physical surface that is in the field of view of the one or more cameras and is separate from the computer system, displaying, in the electronic document, digital text corresponding to the handwriting that is in the field of view of the one or more cameras.

In accordance with some embodiments, a transitory computer-readable storage medium is described. The transitory computer-readable storage medium stores one or more programs configured to be executed by one or more processors of a computer system that is in communication with a display generation component and one or more cameras, the one or more programs including instructions for: displaying, via the display generation component, an electronic document; detecting, via the one or more cameras, handwriting that includes physical marks on a physical surface that is in a field of view of the one or more cameras and is separate from the computer system; and in response to detecting the handwriting that includes physical marks on the physical surface that is in the field of view of the one or more cameras and is separate from the computer system, displaying, in the electronic document, digital text corresponding to the handwriting that is in the field of view of the one or more cameras.

In accordance with some embodiments, a computer system configured to communicate with a display generation component and one or more cameras is described. The computer system comprises: one or more processors; and memory storing one or more programs configured to be executed by the one or more processors, the one or more programs including instructions for: displaying, via the display generation component, an electronic document; detecting, via the one or more cameras, handwriting that includes physical marks on a physical surface that is in a field of view of the one or more cameras and is separate from the computer system; and in response to detecting the handwriting that includes physical marks on the physical surface that is in the field of view of the one or more cameras and is separate from the computer system, displaying, in the electronic document, digital text corresponding to the handwriting that is in the field of view of the one or more cameras.

In accordance with some embodiments, a computer system configured to communicate with a display generation component and one or more cameras is described. The computer system comprises: means for displaying, via the display generation component, an electronic document; means for detecting, via the one or more cameras, handwriting that includes physical marks on a physical surface that is in a field of view of the one or more cameras and is separate from the computer system; and means for, in response to detecting the handwriting that includes physical marks on the physical surface that is in the field of view of the one or more cameras and is separate from the computer system, displaying, in the electronic document, digital text corresponding to the handwriting that is in the field of view of the one or more cameras.

In accordance with some embodiments, a computer program product is described. The computer program product comprises one or more programs configured to be executed by one or more processors of a computer system that is in communication with a display generation component and one or more cameras, the one or more programs including instructions for: displaying, via the display generation component, an electronic document; detecting, via the one or more cameras, handwriting that includes physical marks on a physical surface that is in a field of view of the one or more cameras and is separate from the computer system; and in response to detecting the handwriting that includes physical marks on the physical surface that is in the field of view of the one or more cameras and is separate from the computer system, displaying, in the electronic document, digital text corresponding to the handwriting that is in the field of view of the one or more cameras.

In accordance with some embodiments, a method performed at a first computer system that is in communication with a display generation component, one or more cameras, and one or more input devices is described. The method comprises: detecting, via the one or more input devices, one or more first user inputs corresponding to a request to display a user interface of an application for displaying a visual representation of a surface that is in a field of view of the one or more cameras; and in response to detecting the one or more first user inputs: in accordance with a determination that a first set of one or more criteria is met, concurrently displaying, via the display generation component: a visual representation of a first portion of the field of view of the one or more cameras; and a visual indication that indicates a first region of the field of view of the one or more cameras that is a subset of the first portion of the field of view of the one or more cameras, wherein the first region indicates a second portion of the field of view of the one or more cameras that will be presented as a view of the surface by a second computer system.

In accordance with some embodiments, a non-transitory computer-readable storage medium is described. The non-transitory computer-readable storage medium stores one or more programs configured to be executed by one or more processors of a first computer system that is in communication with a display generation component, one or more cameras, and one or more input devices, the one or more programs including instructions for: detecting, via the one or more input devices, one or more first user inputs corresponding to a request to display a user interface of an application for displaying a visual representation of a surface that is in a field of view of the one or more cameras; and in response to detecting the one or more first user inputs: in accordance with a determination that a first set of one or more criteria is met, concurrently displaying, via the display generation component: a visual representation of a first portion of the field of view of the one or more cameras; and a visual indication that indicates a first region of the field of view of the one or more cameras that is a subset of the first portion of the field of view of the one or more cameras, wherein the first region indicates a second portion of the field of view of the one or more cameras that will be presented as a view of the surface by a second computer system.

In accordance with some embodiments, a transitory computer-readable storage medium is described. The transitory computer-readable storage medium stores one or more programs configured to be executed by one or more processors of a first computer system that is configured to communicate with a display generation component, one or more cameras, and one or more input devices, the one or more programs including instructions for: detecting, via the one or more input devices, one or more first user inputs corresponding to a request to display a user interface of an application for displaying a visual representation of a surface that is in a field of view of the one or more cameras; and in response to detecting the one or more first user inputs: in accordance with a determination that a first set of one or more criteria is met, concurrently displaying, via the display generation component: a visual representation of a first portion of the field of view of the one or more cameras; and a visual indication that indicates a first region of the field of view of the one or more cameras that is a subset of the first portion of the field of view of the one or more cameras, wherein the first region indicates a second portion of the field of view of the one or more cameras that will be presented as a view of the surface by a second computer system.

In accordance with some embodiments, a first computer system that is configured to communicate with a display generation component, one or more cameras, and one or more input devices is described. The computer system comprises: one or more processors; and memory storing one or more programs configured to be executed by the one or more processors, the one or more programs including instructions for: detecting, via the one or more input devices, one or more first user inputs corresponding to a request to display a user interface of an application for displaying a visual representation of a surface that is in a field of view of the one or more cameras; and in response to detecting the one or more first user inputs: in accordance with a determination that a first set of one or more criteria is met, concurrently displaying, via the display generation component: a visual representation of a first portion of the field of view of the one or more cameras; and a visual indication that indicates a first region of the field of view of the one or more cameras that is a subset of the first portion of the field of view of the one or more cameras, wherein the first region indicates a second portion of the field of view of the one or more cameras that will be presented as a view of the surface by a second computer system.

In accordance with some embodiments, a first computer system that is configured to communicate with a display generation component, one or more cameras, and one or more input devices is described. The computer system comprises: means for detecting, via the one or more input devices, one or more first user inputs corresponding to a request to display a user interface of an application for displaying a visual representation of a surface that is in a field of view of the one or more cameras; and means, responsive to detecting the one or more first user inputs, for: in accordance with a determination that a first set of one or more criteria is met, concurrently displaying, via the display generation component: a visual representation of a first portion of the field of view of the one or more cameras; and a visual indication that indicates a first region of the field of view of the one or more cameras that is a subset of the first portion of the field of view of the one or more cameras, wherein the first region indicates a second portion of the field of view of the one or more cameras that will be presented as a view of the surface by a second computer system.

In accordance with some embodiments, a computer program product is described. The computer program product comprises one or more programs configured to be executed by one or more processors of a first computer system that is in communication with a display generation component, one or more cameras, and one or more input devices. The one or more programs include instructions for: detecting, via the one or more input devices, one or more first user inputs corresponding to a request to display a user interface of an application for displaying a visual representation of a surface that is in a field of view of the one or more cameras; and in response to detecting the one or more first user inputs: in accordance with a determination that a first set of one or more criteria is met, concurrently displaying, via the display generation component: a visual representation of a first portion of the field of view of the one or more cameras; and a visual indication that indicates a first region of the field of view of the one or more cameras that is a subset of the first portion of the field of view of the one or more cameras, wherein the first region indicates a second portion of the field of view of the one or more cameras that will be presented as a view of the surface by a second computer system.

In accordance with some embodiments, a method is described. The method comprises: at a computer system that is in communication with a display generation component and one or more input devices: detecting, via the one or more input devices, a request to use a feature on the computer system; and in response to detecting the request to use the feature on the computer system, displaying, via the display generation component, a tutorial for using the feature that includes a virtual demonstration of the feature, including: in accordance with a determination that a property of the computer system has a first value, displaying the virtual demonstration having a first appearance; and in accordance with a determination that the property of the computer system has a second value, displaying the virtual demonstration having a second appearance that is different from the first appearance.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: detecting, via the one or more input devices, a request to use a feature on the computer system; and in response to detecting the request to use the feature on the computer system, displaying, via the display generation component, a tutorial for using the feature that includes a virtual demonstration of the feature, including: in accordance with a determination that a property of the computer system has a first value, displaying the virtual demonstration having a first appearance; and in accordance with a determination that the property of the computer system has a second value, displaying the virtual demonstration having a second appearance that is different from the first appearance.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: detecting, via the one or more input devices, a request to use a feature on the computer system; and in response to detecting the request to use the feature on the computer system, displaying, via the display generation component, a tutorial for using the feature that includes a virtual demonstration of the feature, including: in accordance with a determination that a property of the computer system has a first value, displaying the virtual demonstration having a first appearance; and in accordance with a determination that the property of the computer system has a second value, displaying the virtual demonstration having a second appearance that is different from the first appearance.

In accordance with some embodiments, a computer system configured to communicate with a display generation component and one or more input devices is described. The computer system comprises: one or more processors; and memory storing one or more programs configured to be executed by the one or more processors, the one or more programs including instructions for: detecting, via the one or more input devices, a request to use a feature on the computer system; and in response to detecting the request to use the feature on the computer system, displaying, via the display generation component, a tutorial for using the feature that includes a virtual demonstration of the feature, including: in accordance with a determination that a property of the computer system has a first value, displaying the virtual demonstration having a first appearance; and in accordance with a determination that the property of the computer system has a second value, displaying the virtual demonstration having a second appearance that is different from the first appearance.

In accordance with some embodiments, a computer system configured to communicate with a display generation component and one or more input devices is described. The computer system comprises: means for detecting, via the one or more input devices, a request to use a feature on the computer system; and means for, in response to detecting the request to use the feature on the computer system, displaying, via the display generation component, a tutorial for using the feature that includes a virtual demonstration of the feature, including: means for, in accordance with a determination that a property of the computer system has a first value, displaying the virtual demonstration having a first appearance; and means for, in accordance with a determination that the property of the computer system has a second value, displaying the virtual demonstration having a second appearance that is different from the first appearance.

In accordance with some embodiments, a computer program product is described. The computer program product comprises one or more programs configured to be executed by one or more processors of a computer system that is in communication with a display generation component and one or more input devices, the one or more programs including instructions for: detecting, via the one or more input devices, a request to use a feature on the computer system; and in response to detecting the request to use the feature on the computer system, displaying, via the display generation component, a tutorial for using the feature that includes a virtual demonstration of the feature, including: in accordance with a determination that a property of the computer system has a first value, displaying the virtual demonstration having a first appearance; and in accordance with a determination that the property of the computer system has a second value, displaying the virtual demonstration having a second appearance that is different from the first appearance.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing a live video communication session, thereby increasing the effectiveness, efficiency, and user satisfaction with such devices. Such methods and interfaces may complement or replace other methods for managing a live video communication session.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 10 depicts a flow diagram illustrating a method for managing a live video communication session, in accordance with some embodiments.

FIG. 12 is a flow diagram illustrating a method of managing digital content, in accordance with some embodiments.

FIG. 17 is a flow diagram illustrating a method for managing a live video communication session, in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing a live video communication session and/or managing digital content. For example, there is a need for electronic devices to improve the sharing of content. Such techniques can reduce the cognitive burden on a user who shares content during live video communication session and/or manages digital content in an electronic document, thereby enhancing productivity. Further, such techniques can reduce processor and battery power otherwise wasted on redundant user inputs.

Figure 6A:
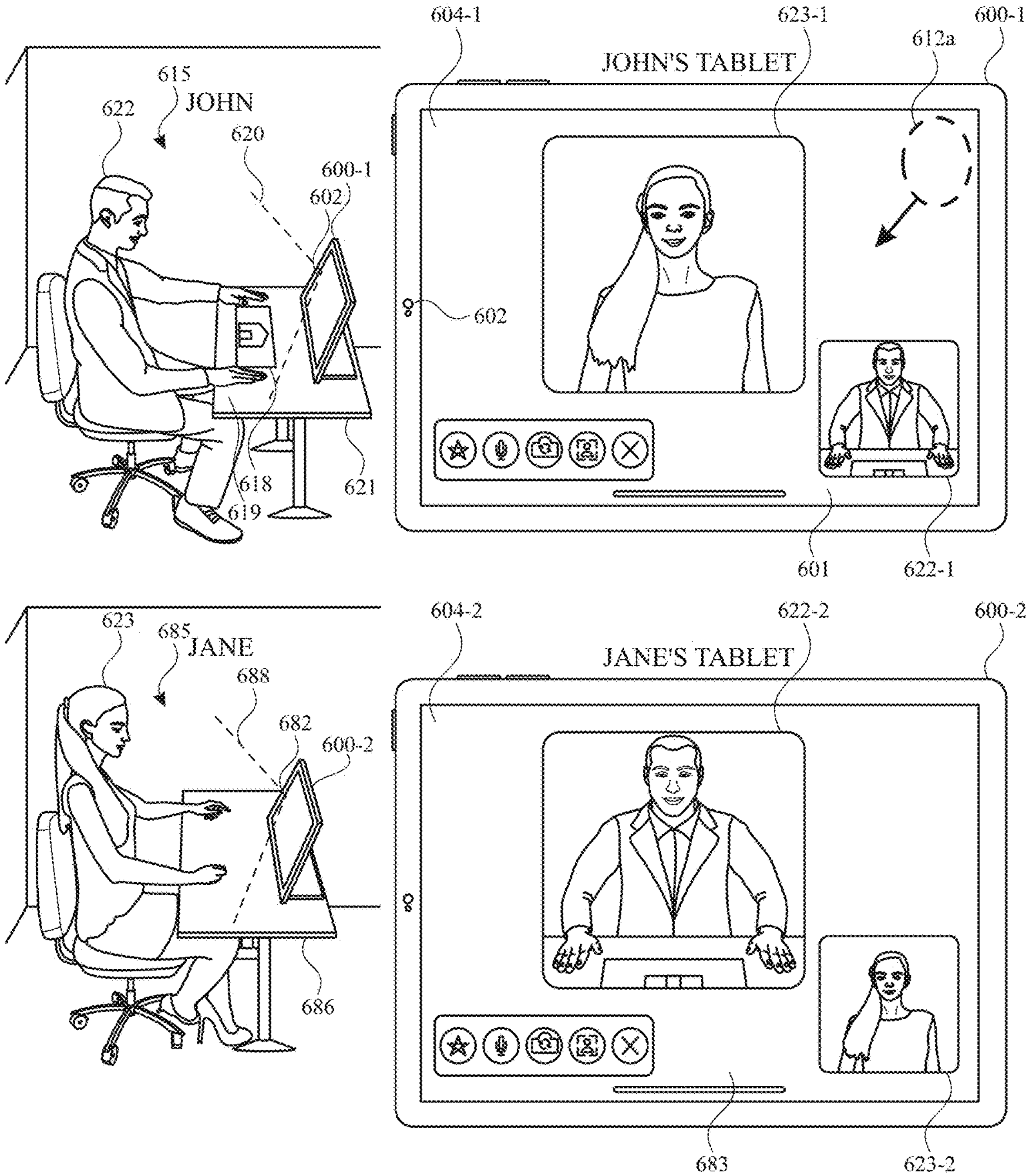
FIGS. 6A-6AY illustrate exemplary user interfaces for managing a live video communication session, in accordance with some embodiments.
Figure 7:
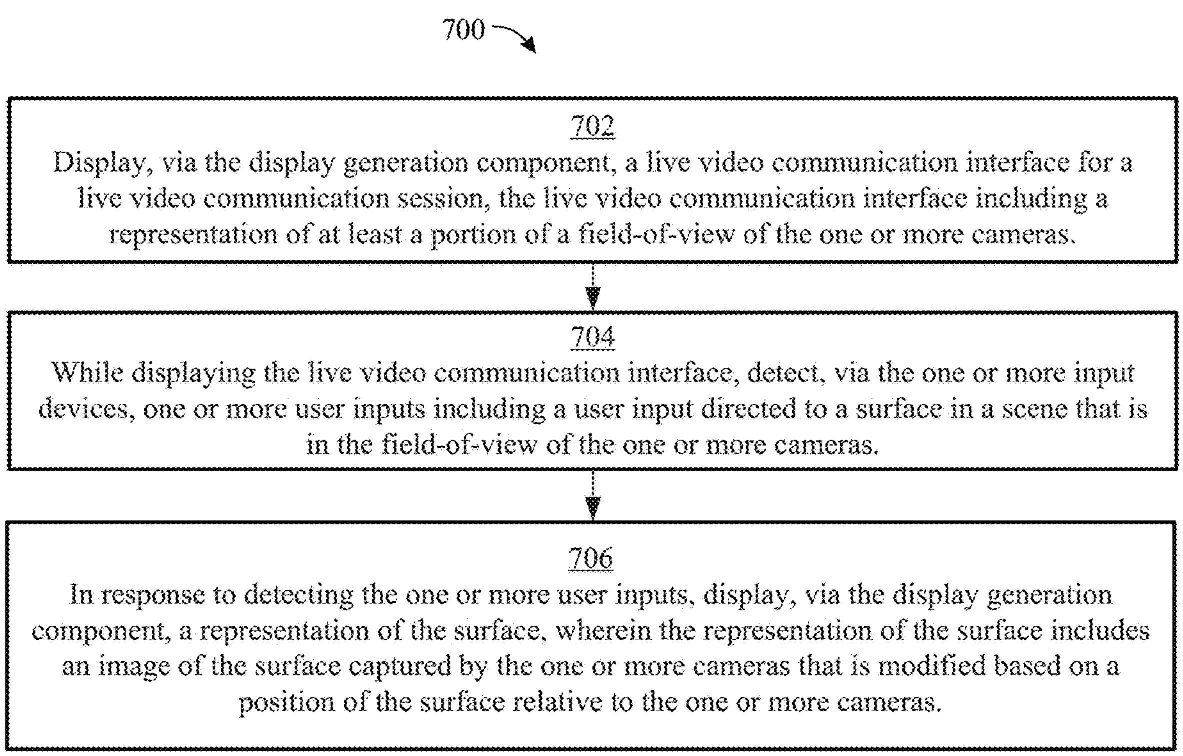
FIG. 7 depicts a flow diagram illustrating a method for managing a live video communication session, in accordance with some embodiments.
Figure 8:
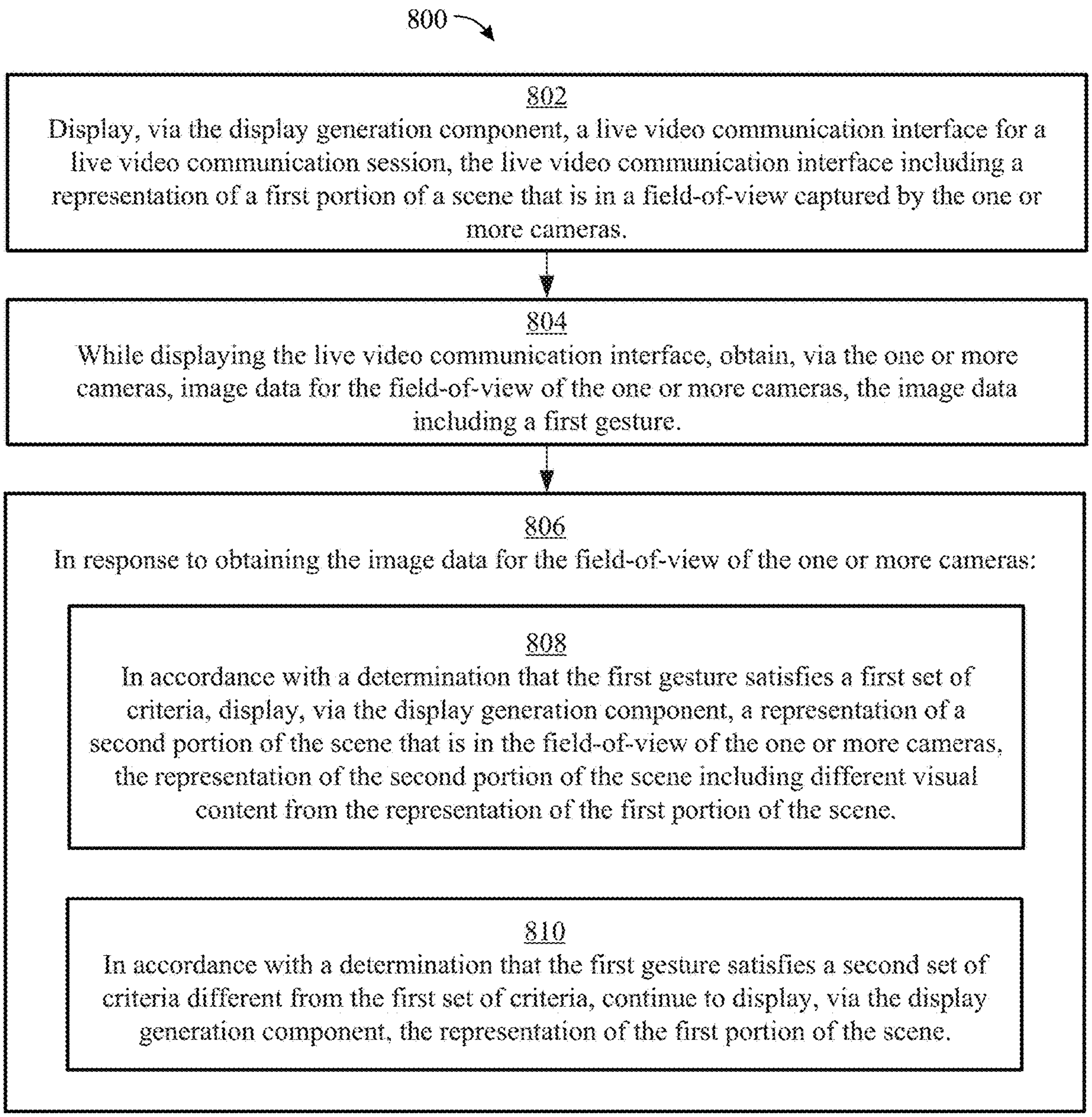
FIG. 8 depicts a flow diagram illustrating a method for managing a live video communication session, in accordance with some embodiments.
Figure 9A:
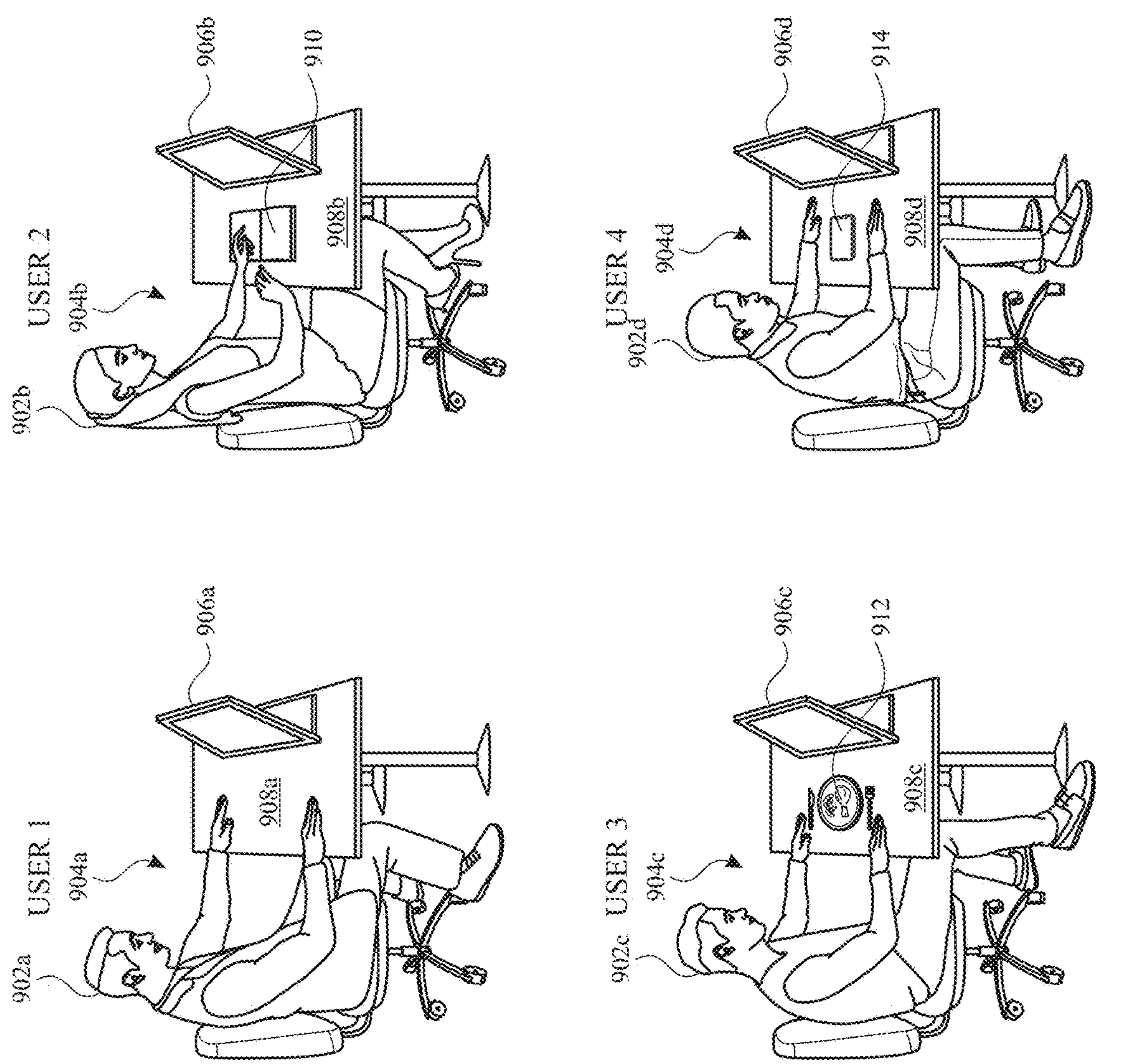
FIGS. 9A-9T illustrate exemplary user interfaces for managing a live video communication session, in accordance with some embodiments.
Figure 11A:
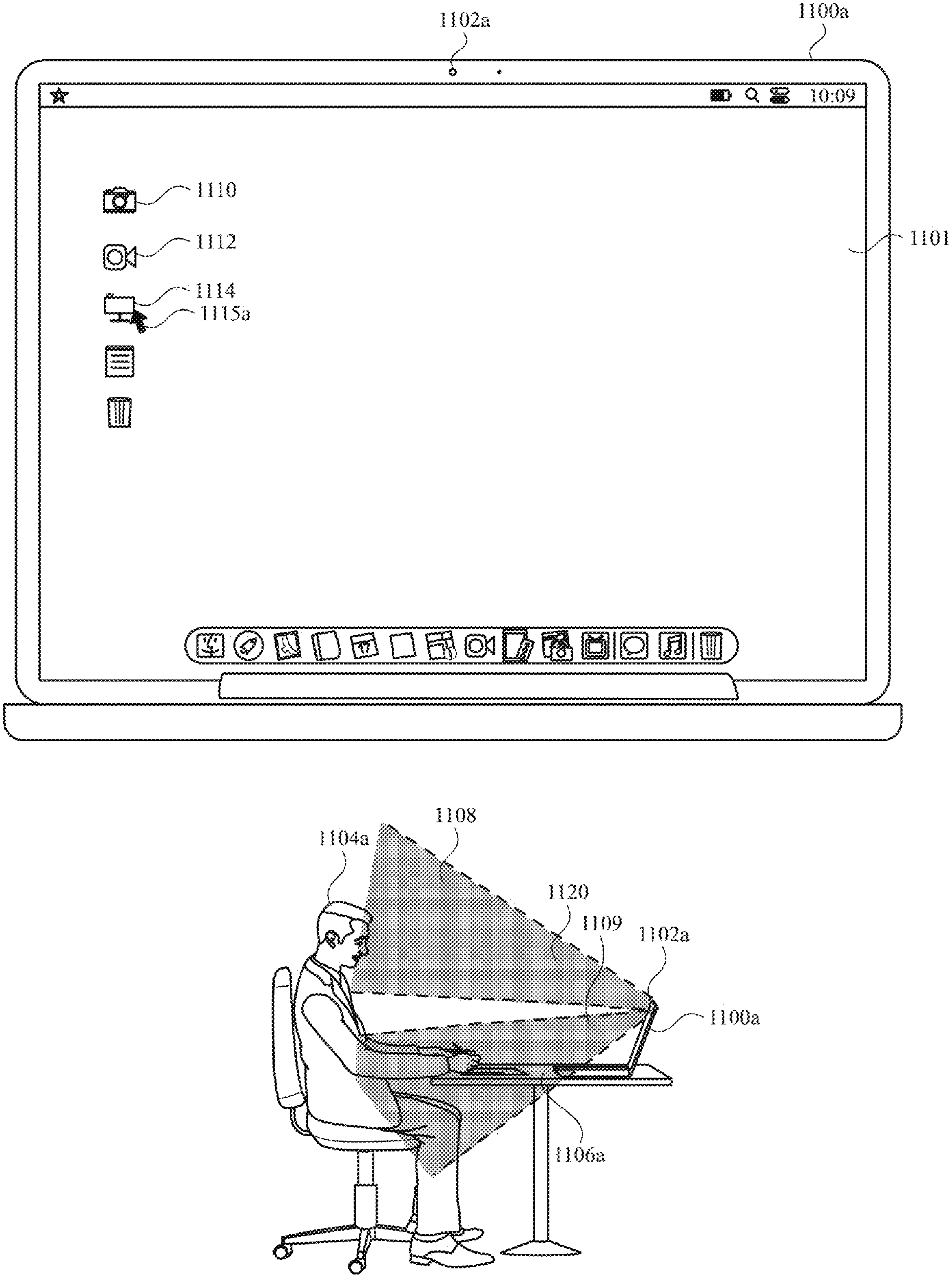
FIGS. 11A-11P illustrate exemplary user interfaces for managing digital content, in accordance with some embodiments.
Figure 14:
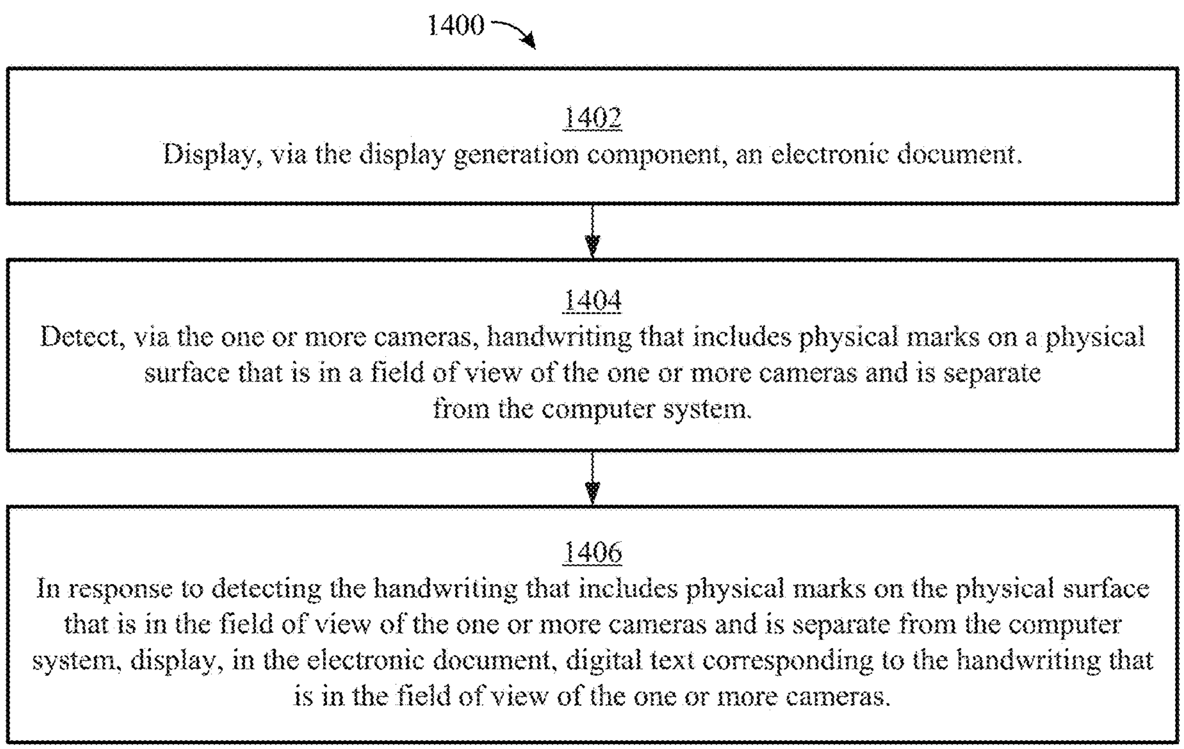
FIG. 14 is a flow diagram illustrating a method of managing digital content, in accordance with some embodiments.
Figure 15:
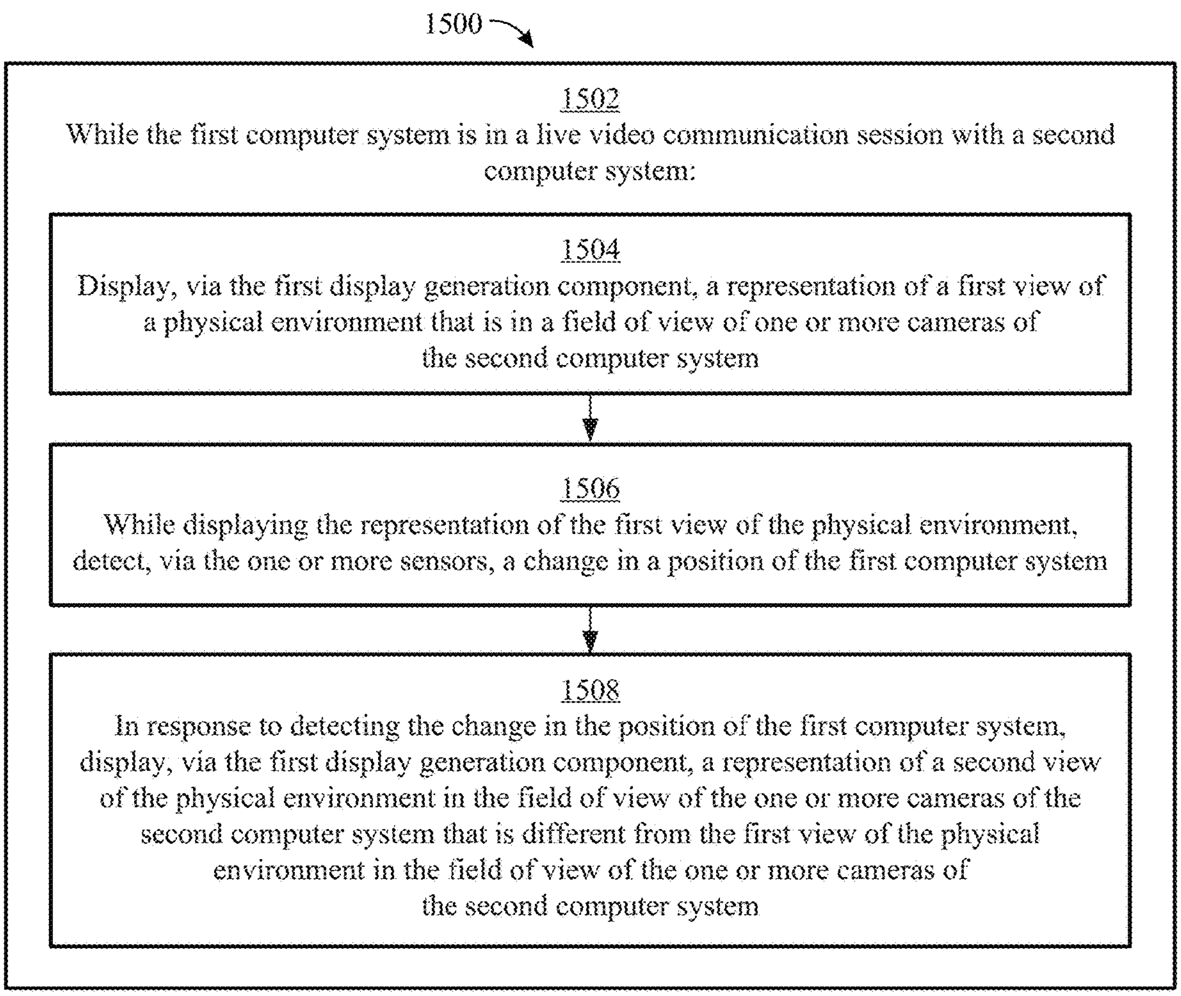
FIG. 15 depicts a flow diagram illustrating a method for managing a live video communication session, in accordance with some embodiments.
Figure 16A:
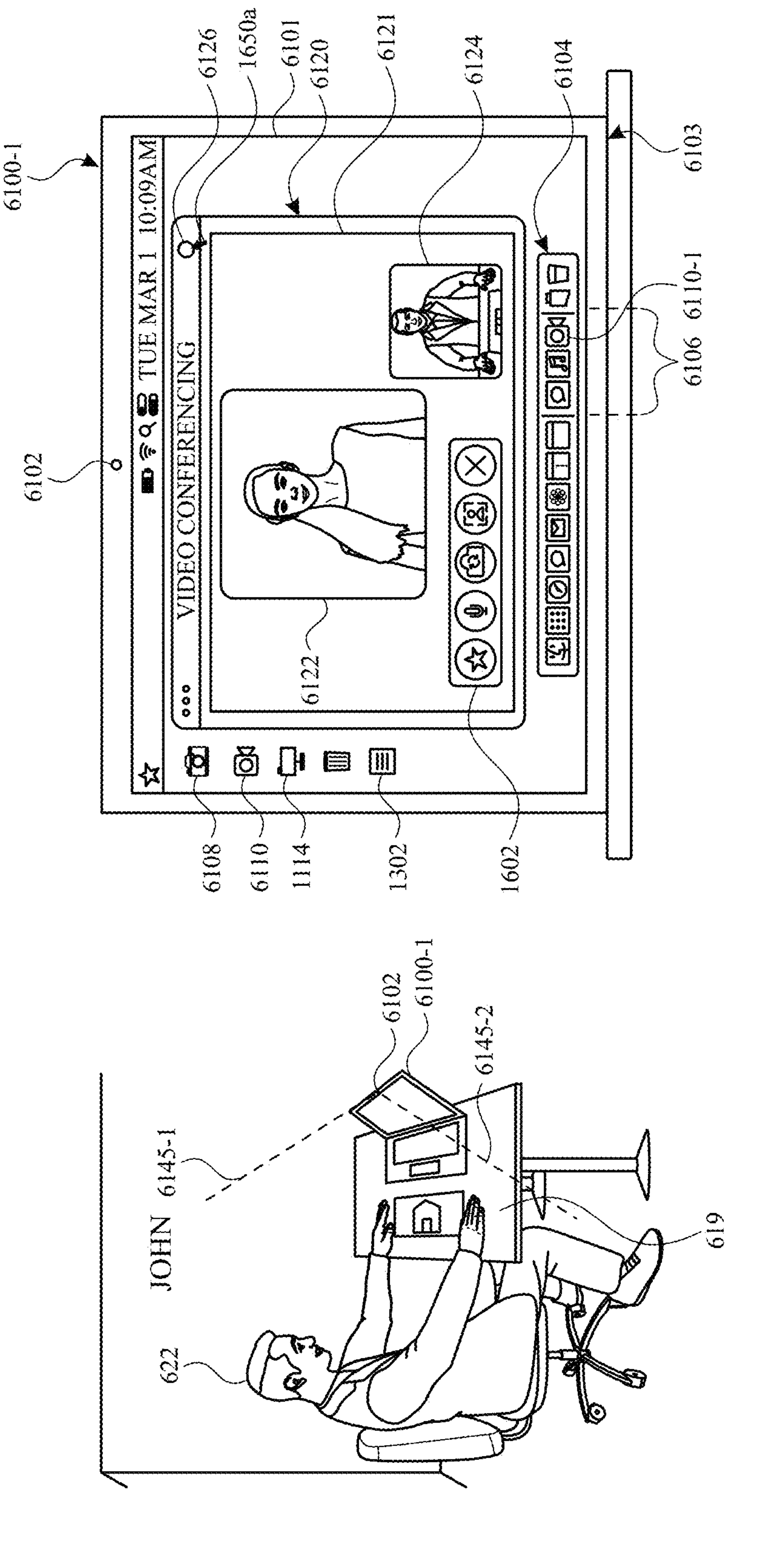
FIGS. 16A-16Q illustrate exemplary user interfaces for managing a live video communication session, in accordance with some embodiments.
Figure 16B:
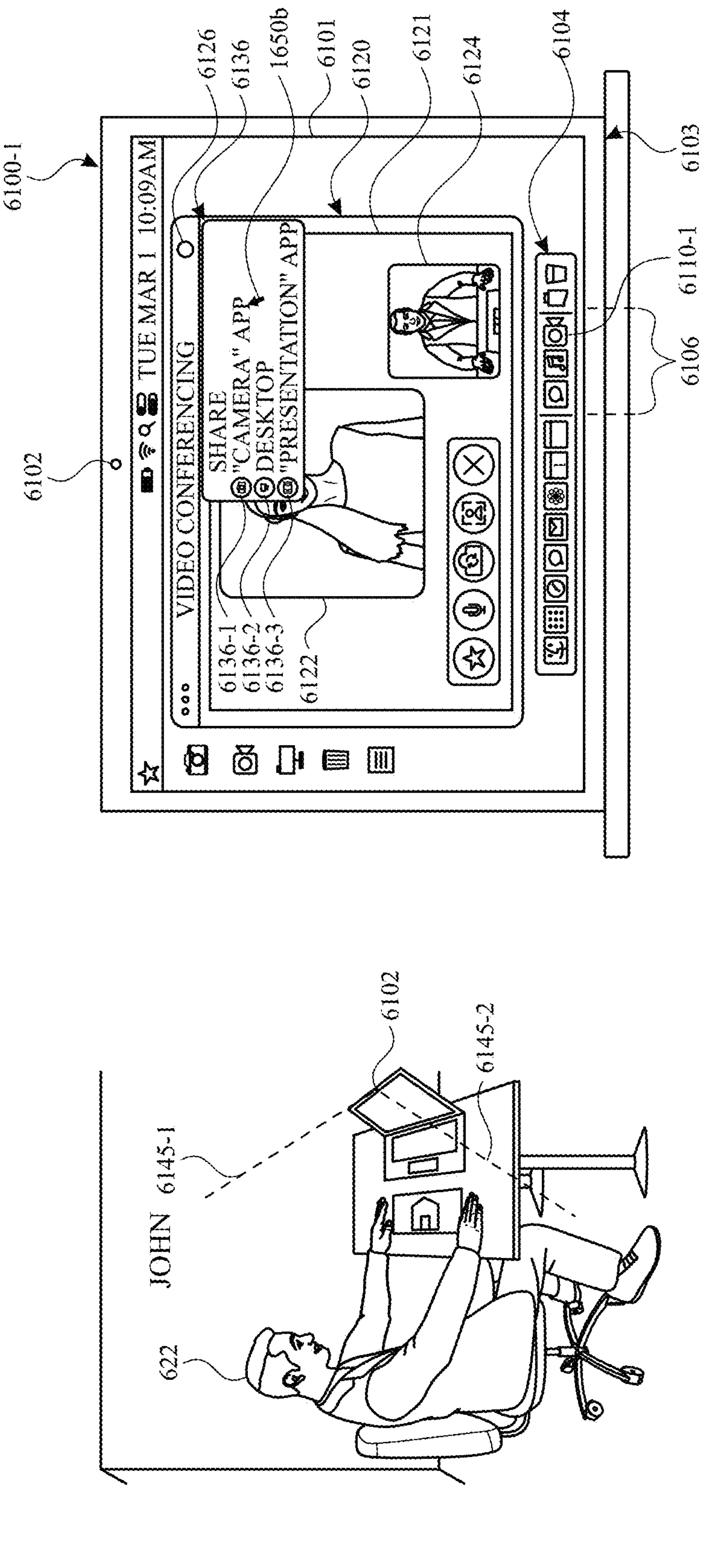
Figure 16C:
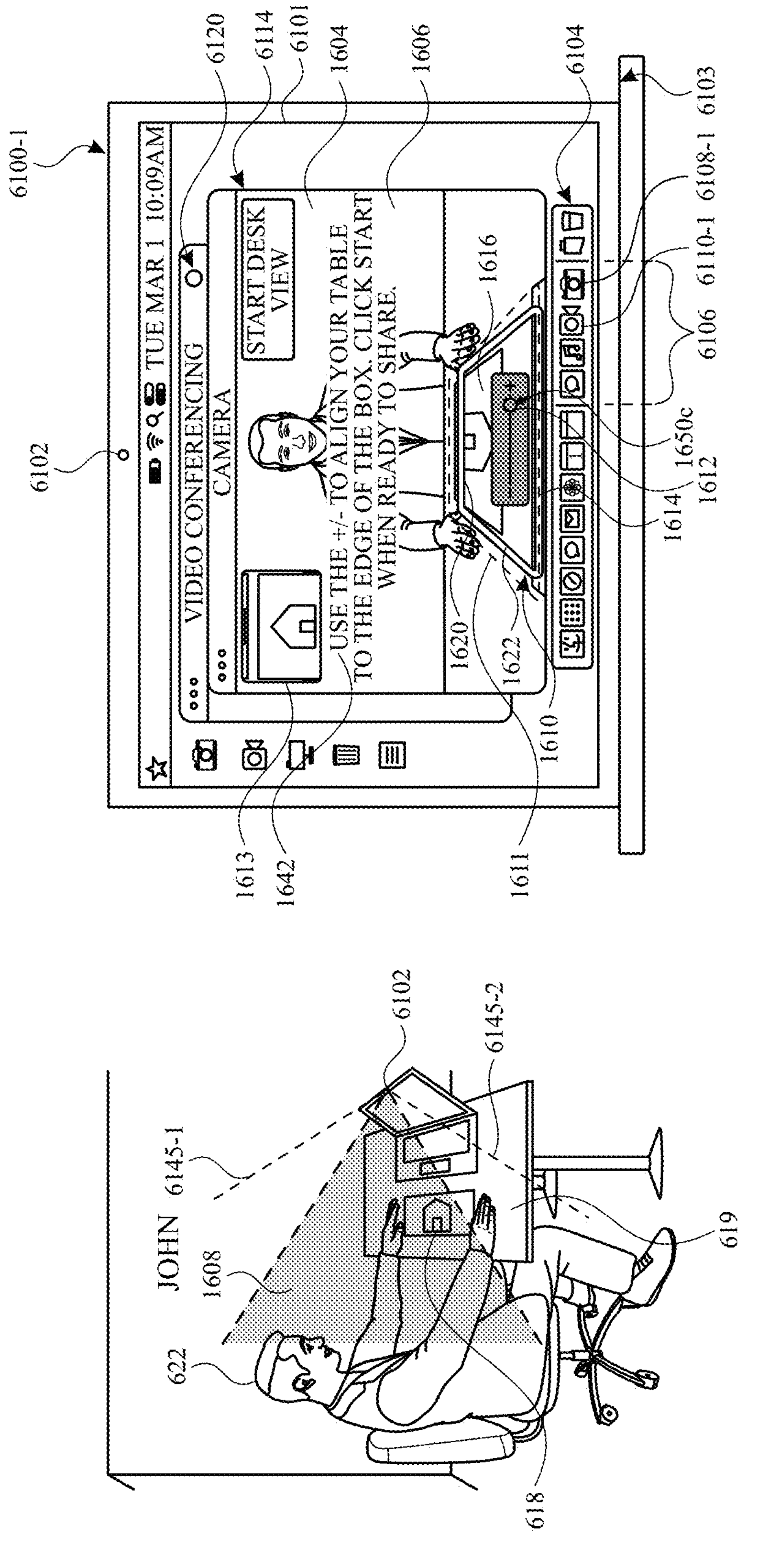
Figure 16D:
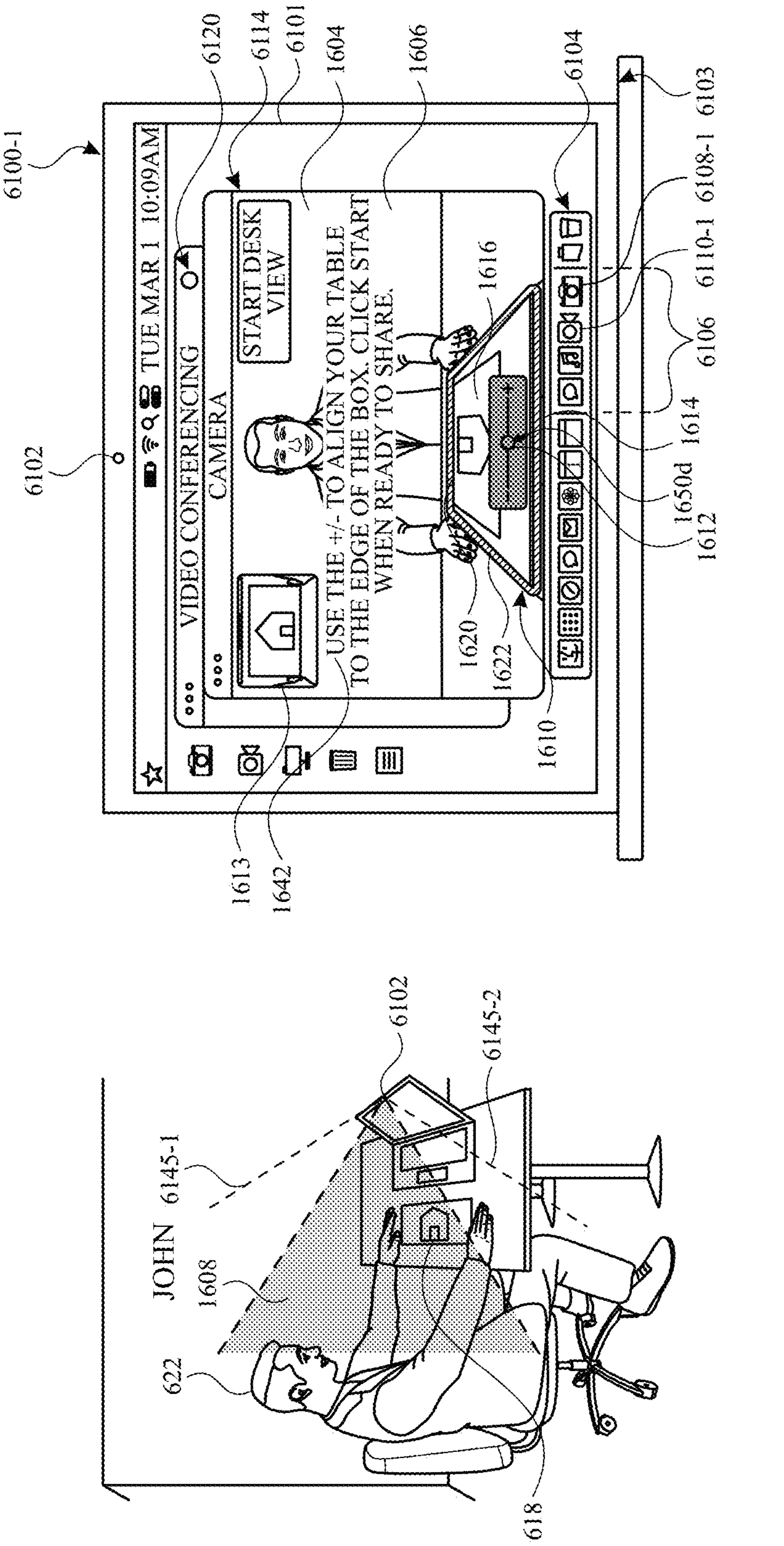
Figure 16E:
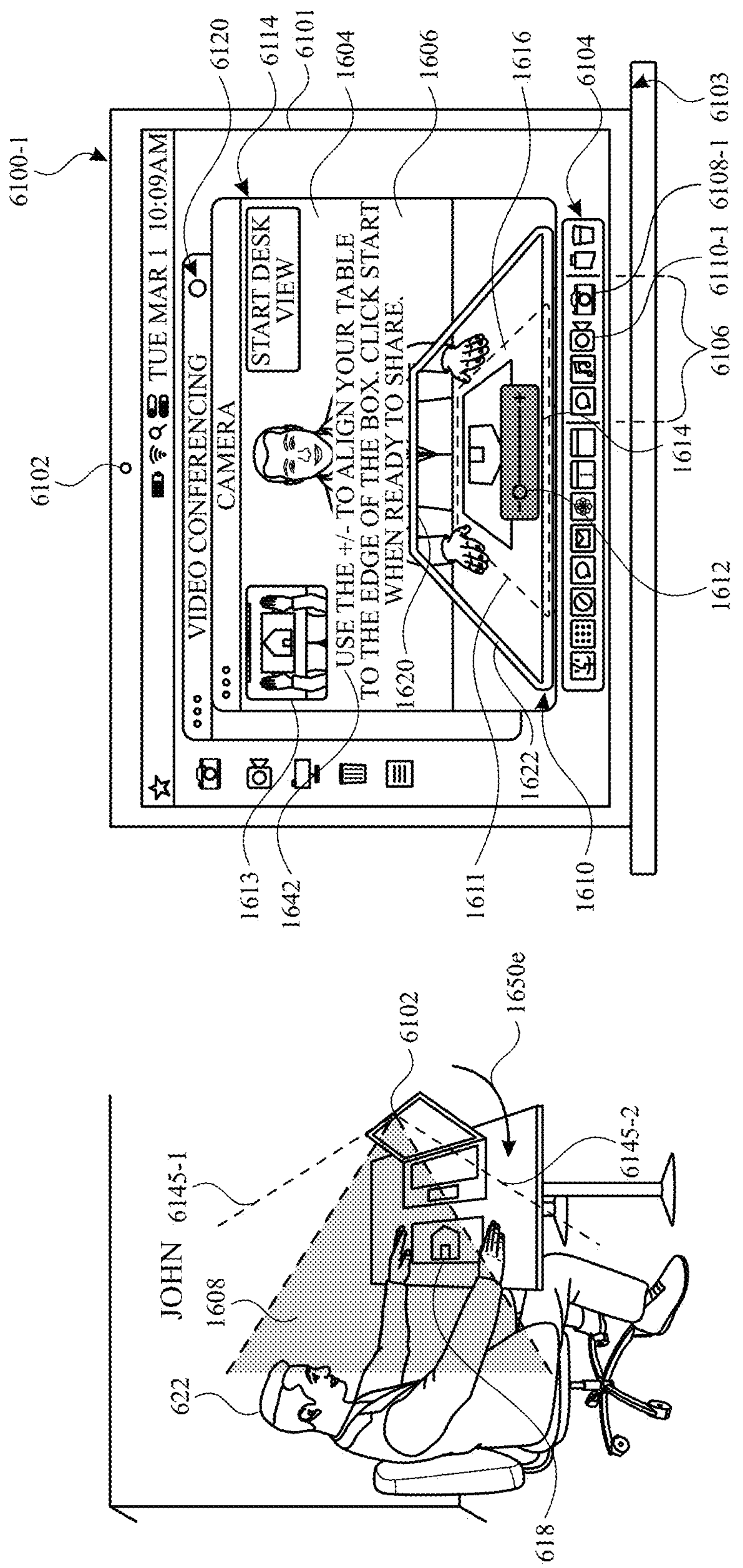
Figure 16F:
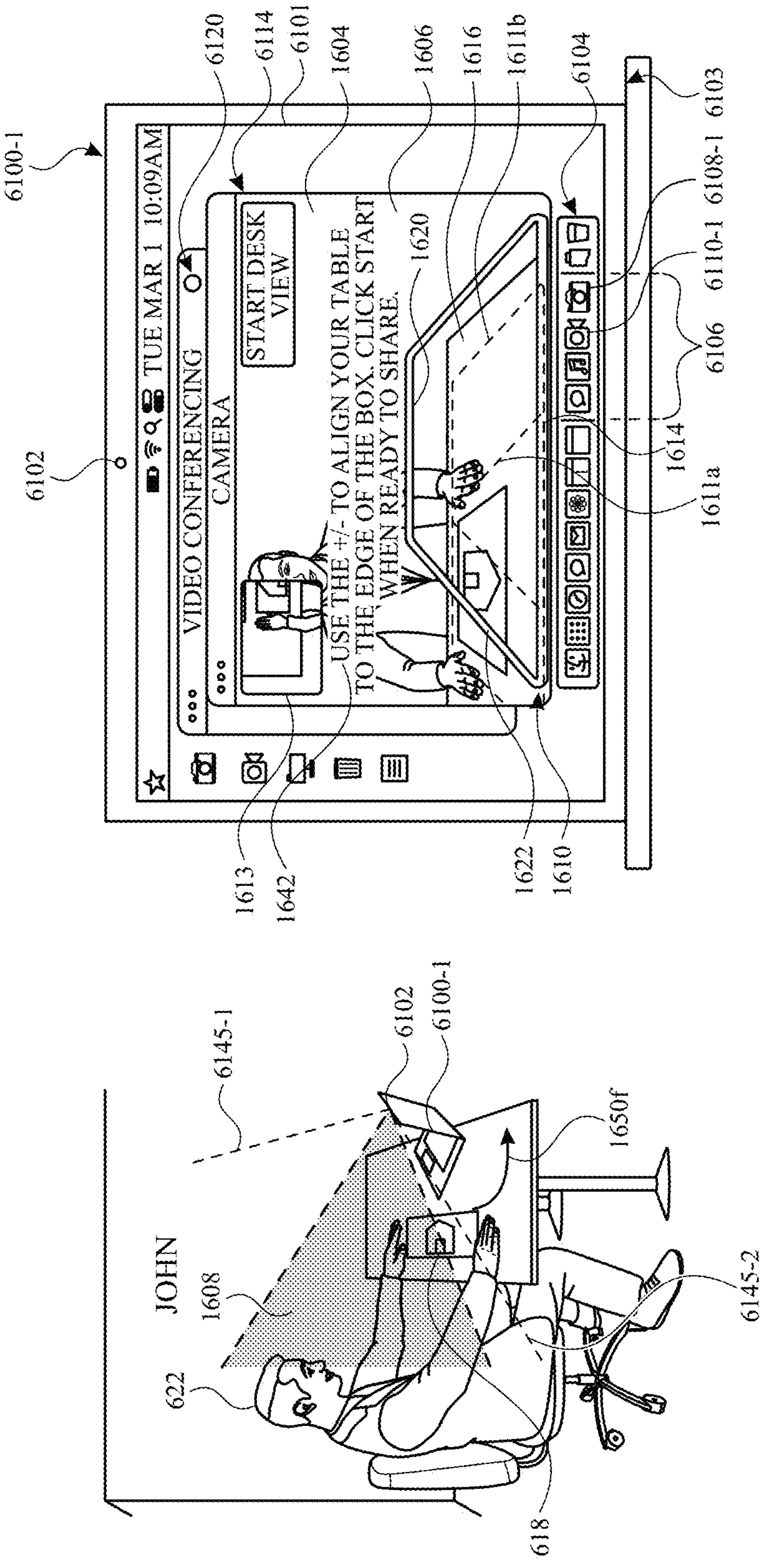
Figure 16G:
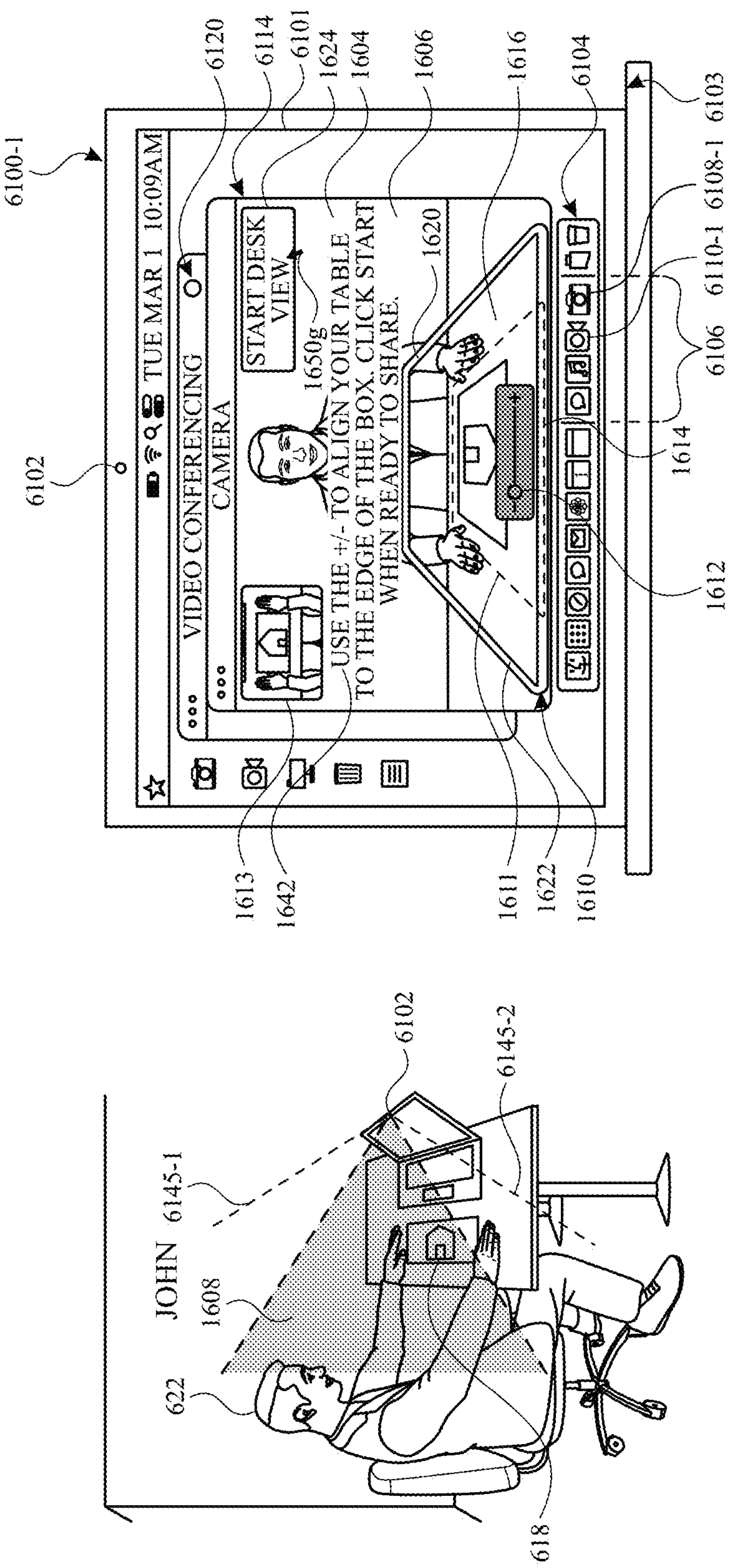
Figure 18A:
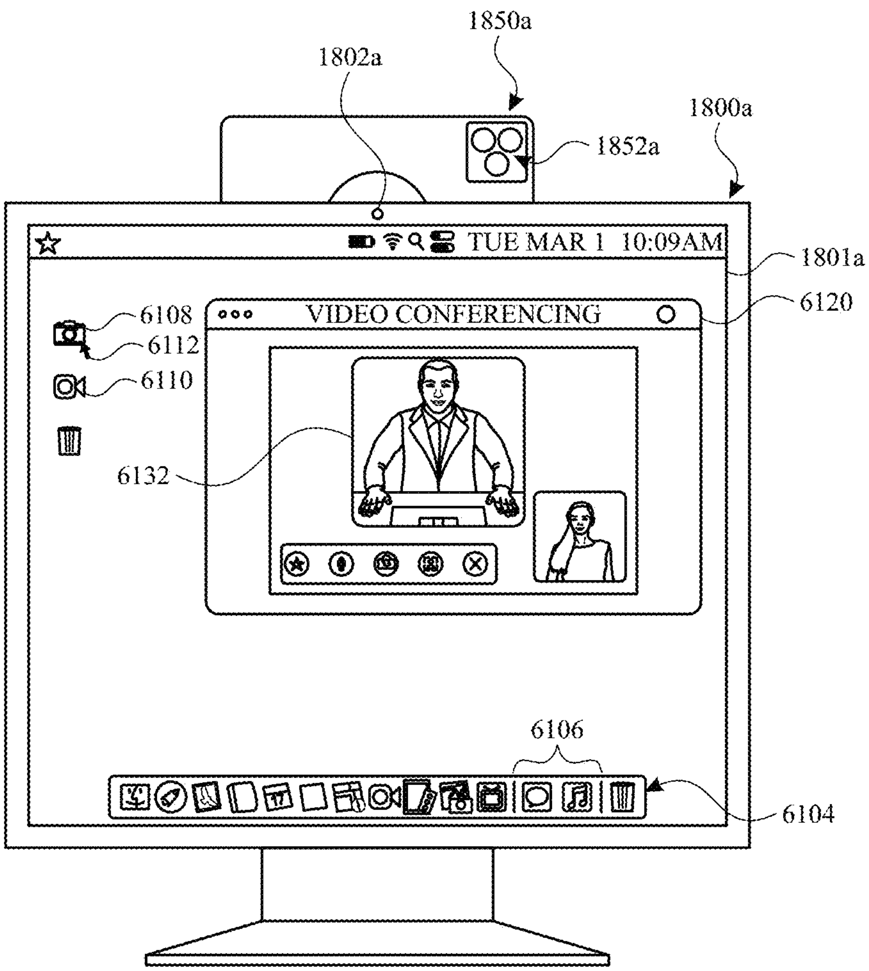
FIGS. 18A-18N illustrate exemplary user interfaces for displaying a tutorial for a feature on a computer system, in accordance with some embodiments.
Figure 18N:
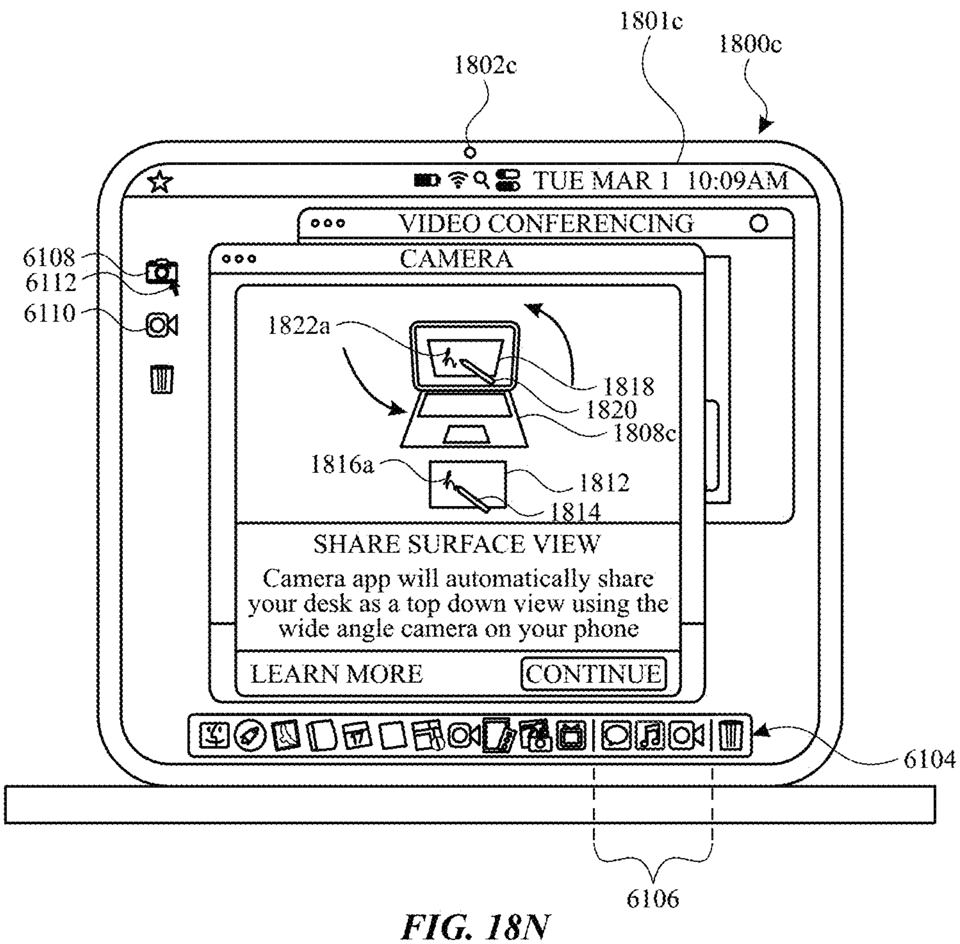
Figure 19:
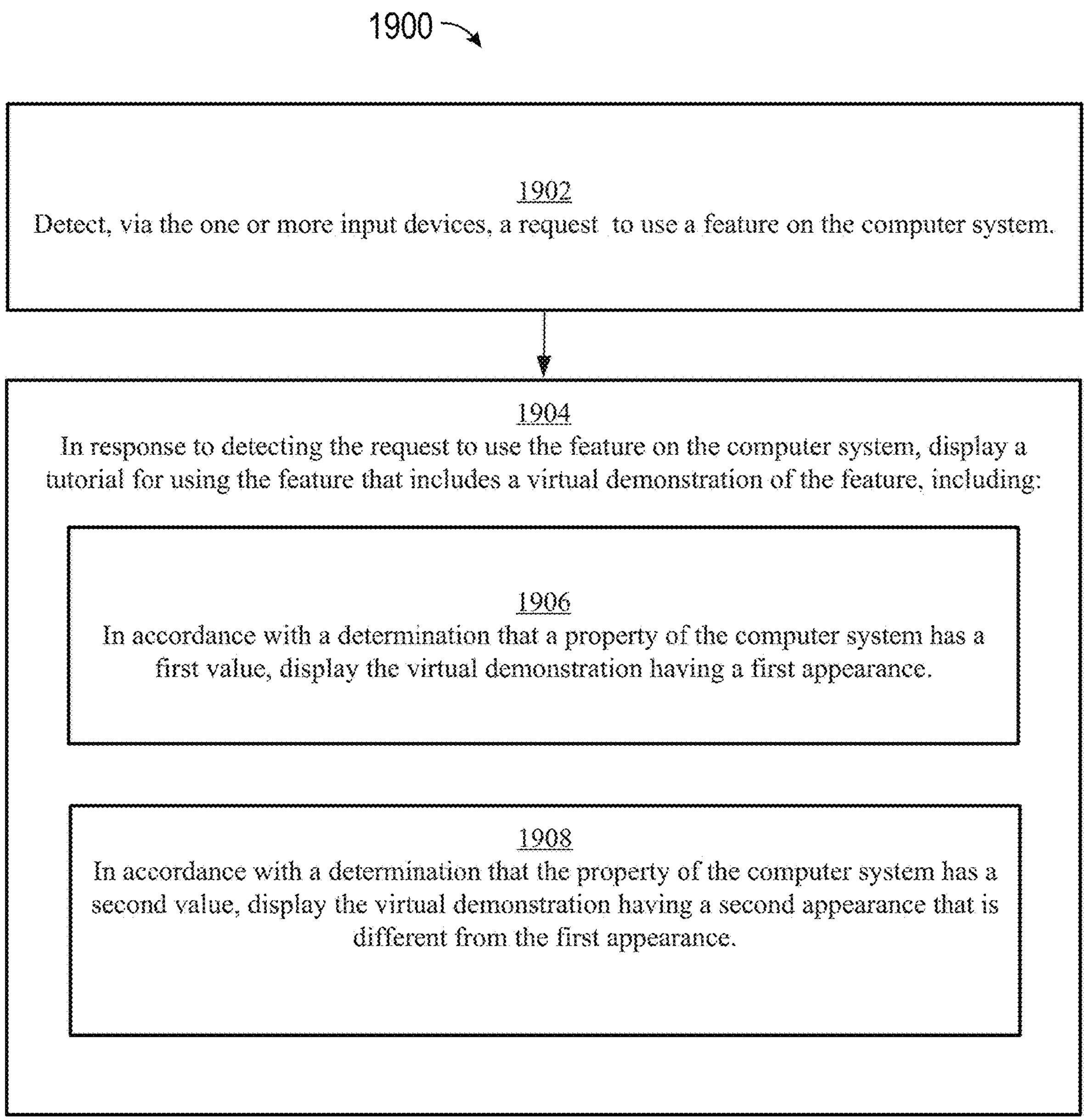
FIG. 19 is a flow diagram illustrating a method for displaying a tutorial for a feature on a computer system, in accordance with some embodiments.

Below, FIGS. 1A-1B, 2, 3, 4A-4B, and 5A-5C provide a description of exemplary devices for performing the techniques for managing a live video communication session and/or managing digital content. FIGS. 6A-6AY illustrate exemplary user interfaces for managing a live video communication session. FIGS. 7-8, and 15 are flow diagrams illustrating methods of managing a live video communication session in accordance with some embodiments. The user interfaces in FIGS. 6A-6AY are used to illustrate the processes described below, including the processes in FIGS. 7-8, and 15. FIGS. 9A-9T illustrate exemplary user interfaces for managing a live video communication. FIG. 10 is a flow diagram illustrating methods of managing a live video communication in accordance with some embodiments. The user interfaces in FIGS. 9A-9T are used to illustrate the processes described below, including the process in FIG. 10. FIGS. 11A-11P illustrate exemplary user interfaces for managing digital content. FIG. 12 is a flow diagram illustrating methods of managing digital content in accordance with some embodiments. The user interfaces in FIGS. 11A-11P are used to illustrate the processes described below, including the process in FIG. 12. FIGS. 13A-13K illustrate exemplary user interfaces for managing digital content in accordance with some embodiments. FIG. 14 is a flow diagram illustrating methods of managing digital content in accordance with some embodiments. The user interfaces in FIGS. 13A-13K are used to illustrate the processes described below, including the process in FIG. 14. FIGS. 16A-16O illustrate exemplary user interfaces for managing a live video communication session in accordance with some embodiments. FIG. 17 is a flow diagram illustrating methods for managing a live video communication session in accordance with some embodiments. The user interfaces in FIGS. 16A-16Q are used to illustrate the processes described below, including the process in FIG. 17. FIGS. 18A-18N illustrate exemplary user interfaces for displaying a tutorial for a feature on a computer system in accordance with some embodiments. FIG. 19 is a flow diagram illustrating methods for displaying a tutorial for a feature on a computer system in accordance with some embodiments. The user interfaces in FIGS. 18A-18N are used to illustrate the processes described below, including the process in FIG. 19.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving efficiency in managing digital content, improving collaboration between users in a live communication session, improving the live communication session experience, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
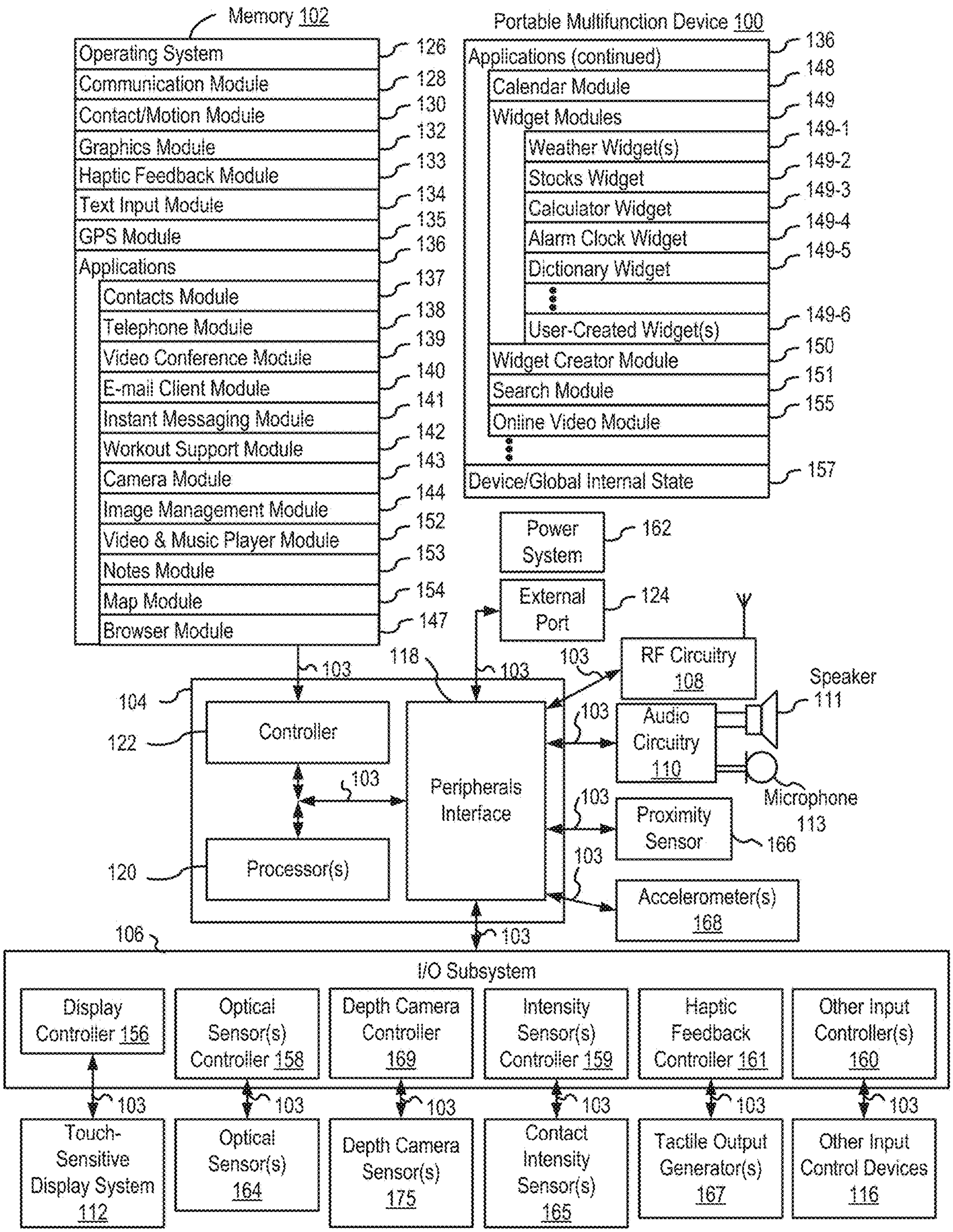
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), 6,570,557 (Westerman et al.), and/or 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

In some embodiments, a depth map (e.g., depth map image) contains information (e.g., values) that relates to the distance of objects in a scene from a viewpoint (e.g., a camera, an optical sensor, a depth camera sensor). In one embodiment of a depth map, each depth pixel defines the position in the viewpoint's Z-axis where its corresponding two-dimensional pixel is located. In some embodiments, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., a camera, an optical sensor, a depth camera sensor) in the "three dimensional" scene. In other embodiments, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
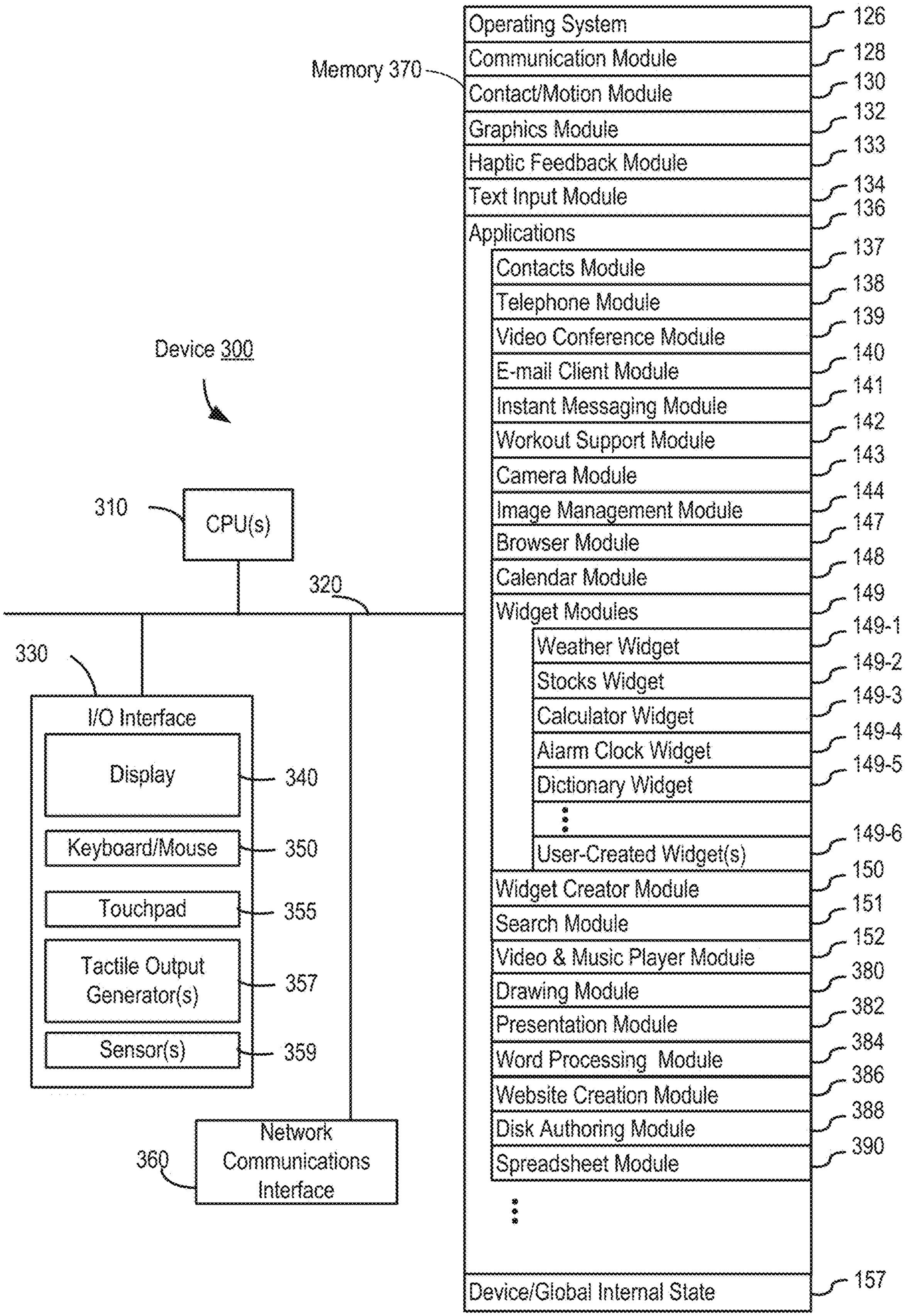
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
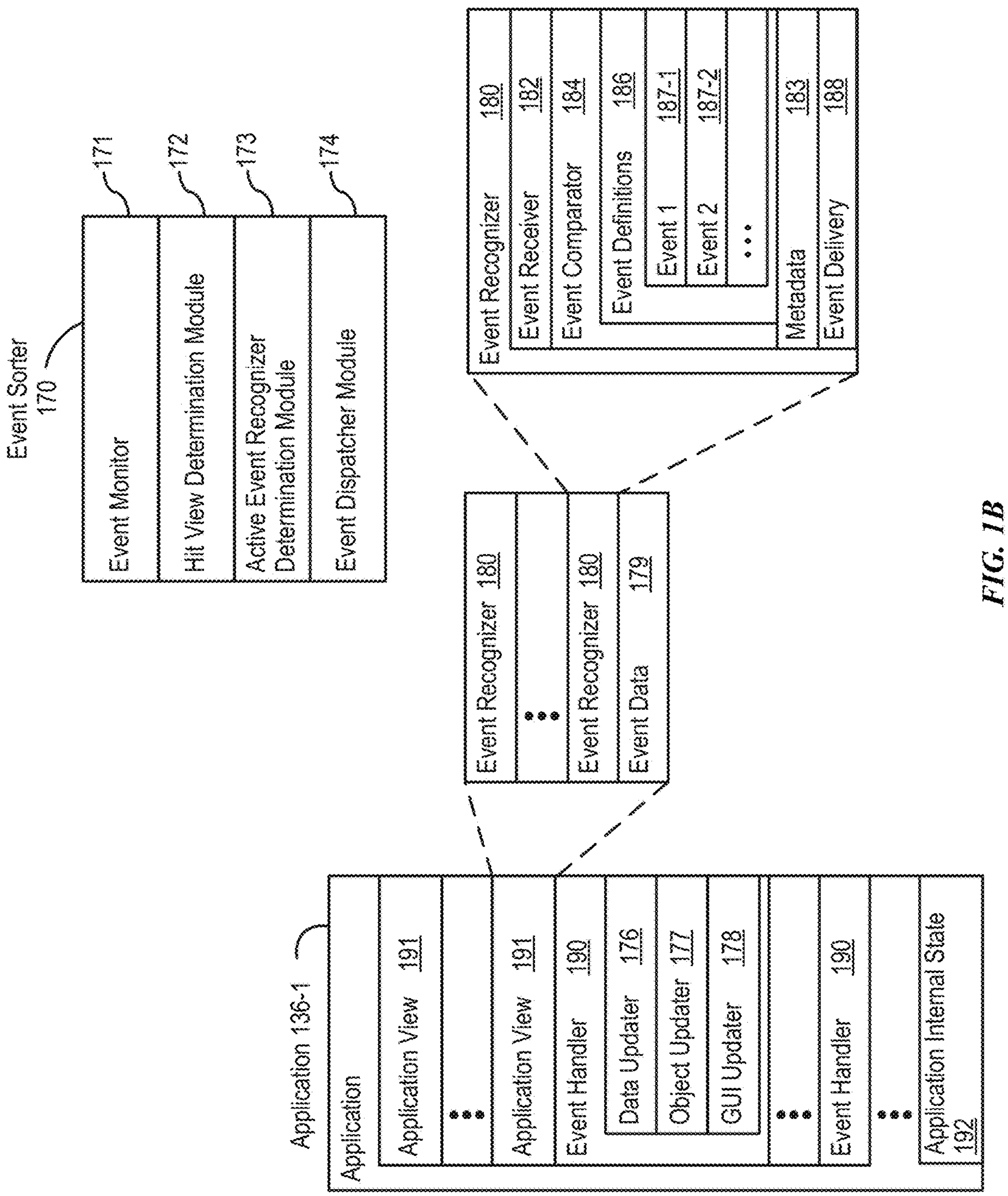
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
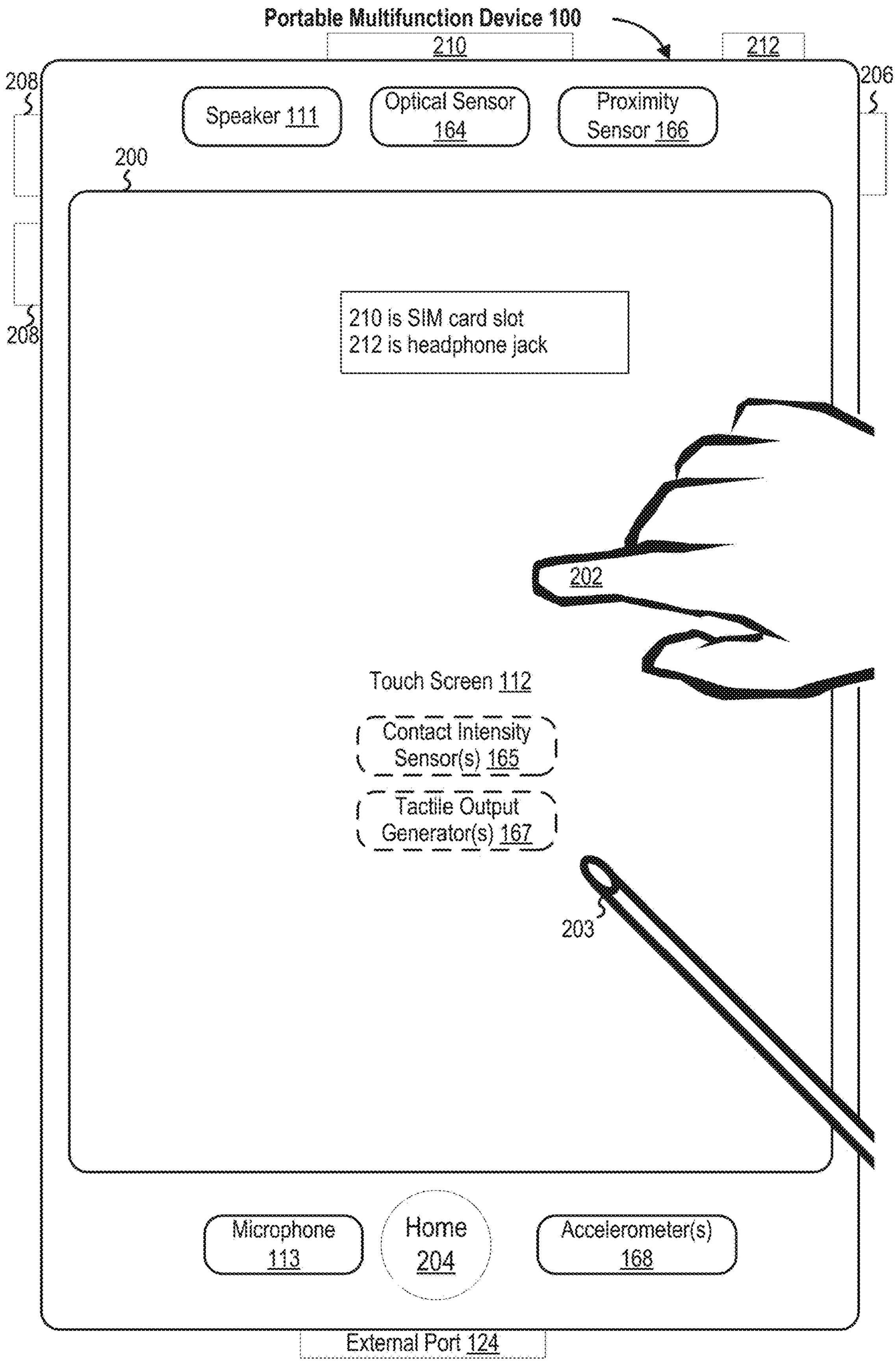
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
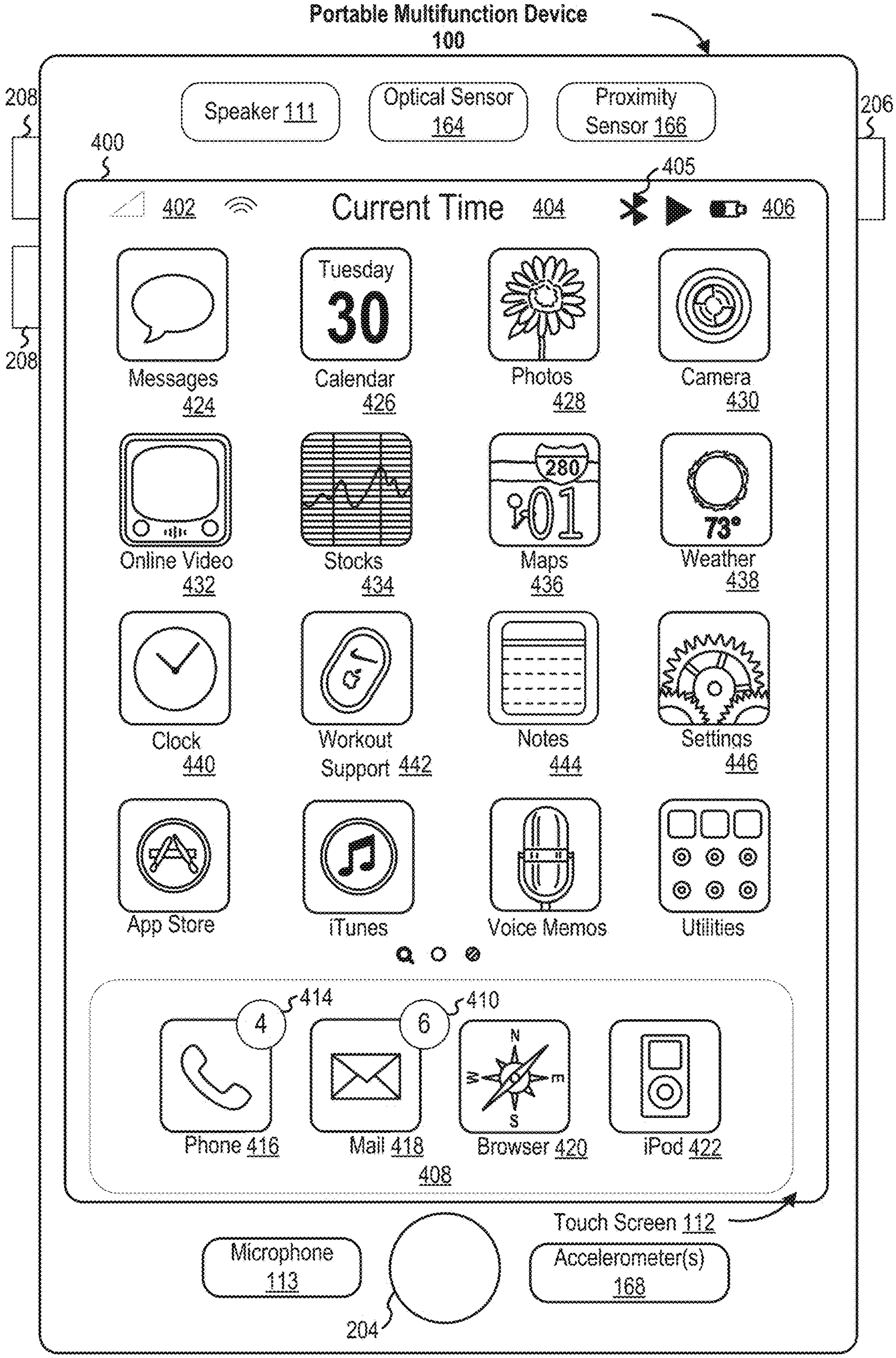
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
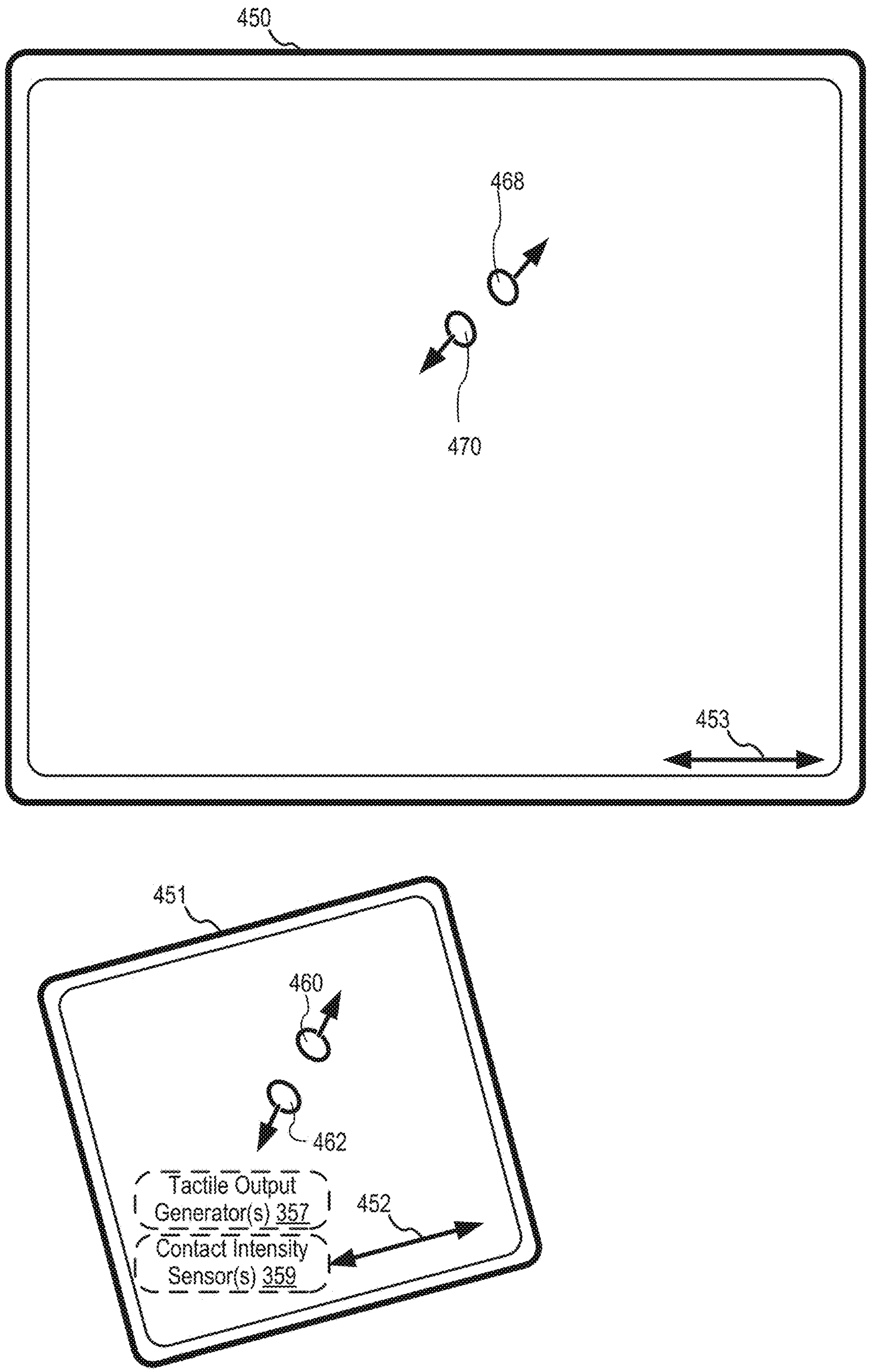
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
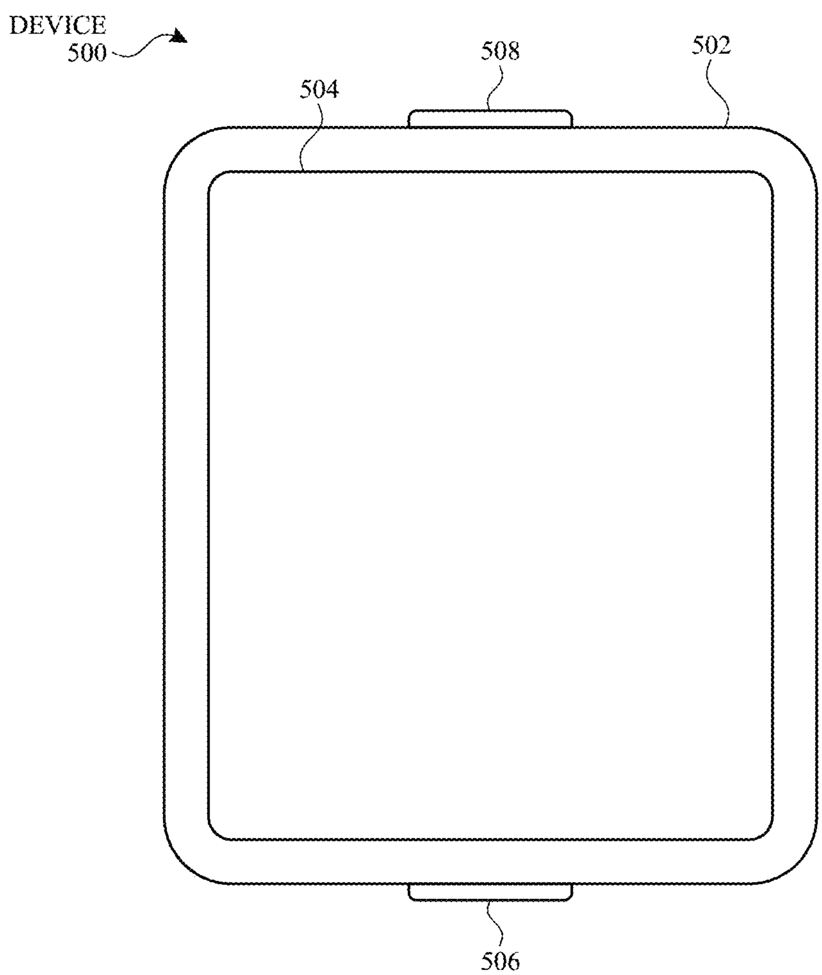
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
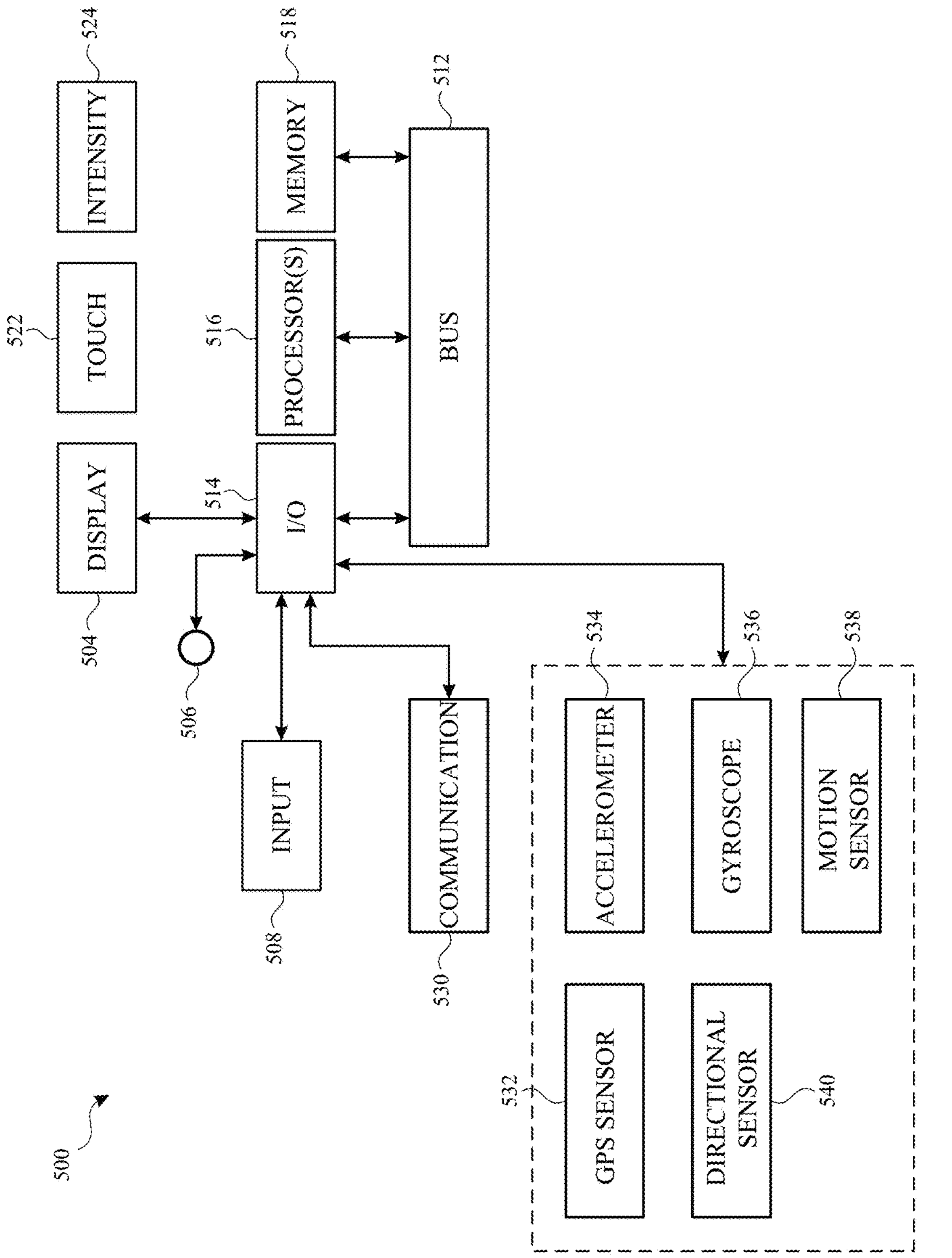
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 800, 1000, 1200, 1400, 1500, 1700, and 1900 (FIGS. 7-8, 10, 12, 14, 15, 17, and 19). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5C). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
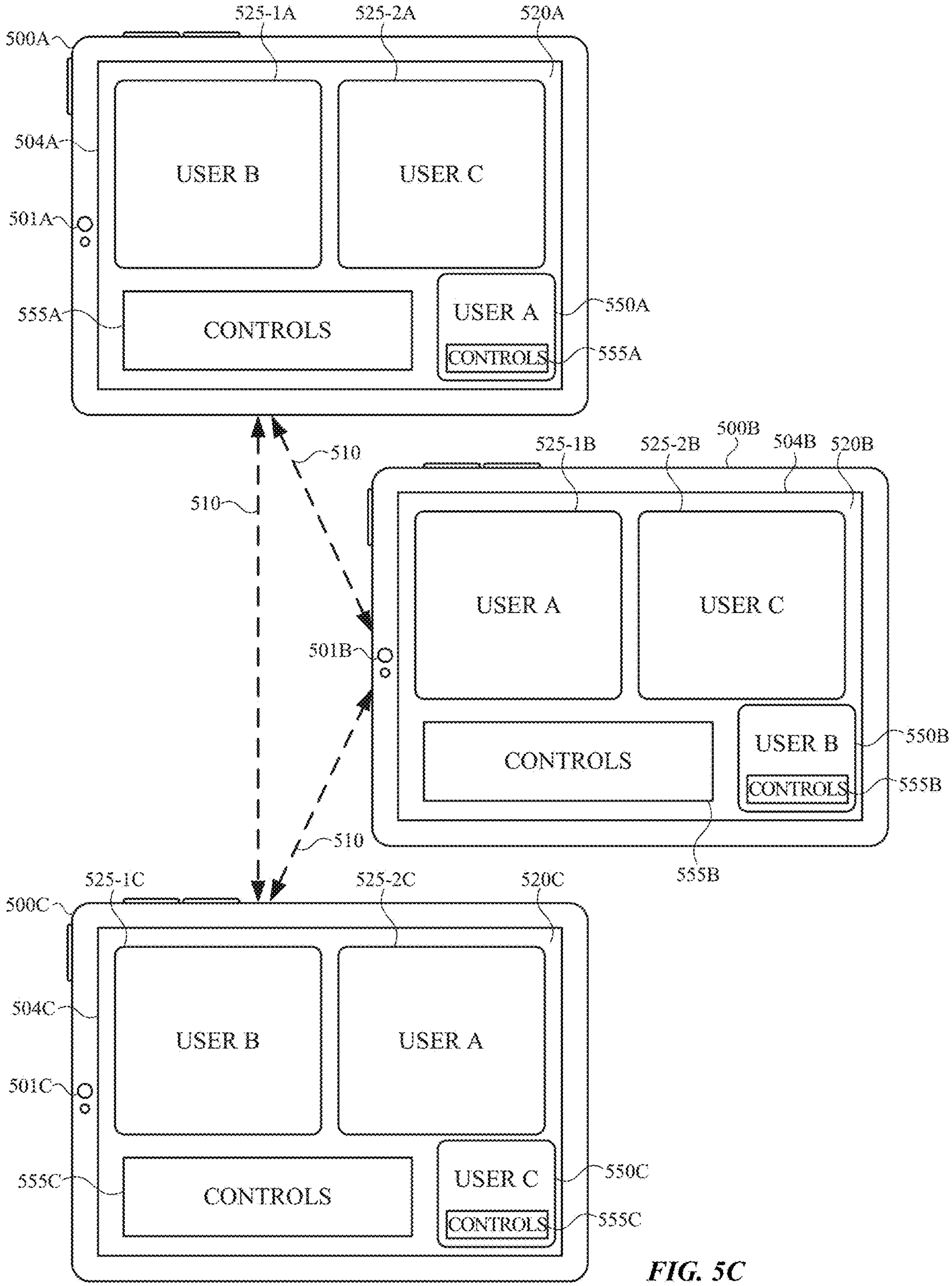
FIG. 5C illustrates an exemplary diagram of a communication session between electronic devices, in accordance with some embodiments.

FIG. 5C depicts an exemplary diagram of a communication session between electronic devices 500A, 500B, and 500C. Devices 500A, 500B, and 500C are similar to electronic device 500, and each share with each other one or more data connections 510 such as an Internet connection, Wi-Fi connection, cellular connection, short-range communication connection, and/or any other such data connection or network so as to facilitate real time communication of audio and/or video data between the respective devices for a duration of time. In some embodiments, an exemplary communication session can include a shared-data session whereby data is communicated from one or more of the electronic devices to the other electronic devices to enable concurrent output of respective content at the electronic devices. In some embodiments, an exemplary communication session can include a video conference session whereby audio and/or video data is communicated between devices 500A, 500B, and 500C such that users of the respective devices can engage in real time communication using the electronic devices.

In FIG. 5C, device 500A represents an electronic device associated with User A. Device 500A is in communication (via data connections 510) with devices 500B and 500C, which are associated with User B and User C, respectively. Device 500A includes camera 501A, which is used to capture video data for the communication session, and display 504A (e.g., a touchscreen), which is used to display content associated with the communication session. Device 500A also includes other components, such as a microphone (e.g., 113) for recording audio for the communication session and a speaker (e.g., 111) for outputting audio for the communication session.

Device 500A displays, via display 504A, communication UI 520A, which is a user interface for facilitating a communication session (e.g., a video conference session) between device 500B and device 500C. Communication UI 520A includes video feed 525-1A and video feed 525-2A. Video feed 525-1A is a representation of video data captured at device 500B (e.g., using camera 501B) and communicated from device 500B to devices 500A and 500C during the communication session. Video feed 525-2A is a representation of video data captured at device 500C (e.g., using camera 501C) and communicated from device 500C to devices 500A and 500B during the communication session.

Communication UI 520A includes camera preview 550A, which is a representation of video data captured at device 500A via camera 501A. Camera preview 550A represents to User A the prospective video feed of User A that is displayed at respective devices 500B and 500C.

Communication UI 520A includes one or more controls 555A for controlling one or more aspects of the communication session. For example, controls 555A can include controls for muting audio for the communication session, changing a camera view for the communication session (e.g., changing which camera is used for capturing video for the communication session, adjusting a zoom value), terminating the communication session, applying visual effects to the camera view for the communication session, activating one or more modes associated with the communication session. In some embodiments, one or more controls 555A are optionally displayed in communication UI 520A. In some embodiments, one or more controls 555A are displayed separate from camera preview 550A. In some embodiments, one or more controls 555A are displayed overlaying at least a portion of camera preview 550A.

In FIG. 5C, device 500B represents an electronic device associated with User B, which is in communication (via data connections 510) with devices 500A and 500C. Device 500B includes camera 501B, which is used to capture video data for the communication session, and display 504B (e.g., a touchscreen), which is used to display content associated with the communication session. Device 500B also includes other components, such as a microphone (e.g., 113) for recording audio for the communication session and a speaker (e.g., 111) for outputting audio for the communication session.

Device 500B displays, via touchscreen 504B, communication UI 520B, which is similar to communication UI 520A of device 500A. Communication UI 520B includes video feed 525-1B and video feed 525-2B. Video feed 525-1B is a representation of video data captured at device 500A (e.g., using camera 501A) and communicated from device 500A to devices 500B and 500C during the communication session. Video feed 525-2B is a representation of video data captured at device 500C (e.g., using camera 501C) and communicated from device 500C to devices 500A and 500B during the communication session. Communication UI 520B also includes camera preview 550B, which is a representation of video data captured at device 500B via camera 501B, and one or more controls 555B for controlling one or more aspects of the communication session, similar to controls 555A. Camera preview 550B represents to User B the prospective video feed of User B that is displayed at respective devices 500A and 500C.

In FIG. 5C, device 500C represents an electronic device associated with User C, which is in communication (via data connections 510) with devices 500A and 500B. Device 500C includes camera 501C, which is used to capture video data for the communication session, and display 504C (e.g., a touchscreen), which is used to display content associated with the communication session. Device 500C also includes other components, such as a microphone (e.g., 113) for recording audio for the communication session and a speaker (e.g., 111) for outputting audio for the communication session.

Device 500C displays, via touchscreen 504C, communication UI 520C, which is similar to communication UI 520A of device 500A and communication UI 520B of device 500B. Communication UI 520C includes video feed 525-1C and video feed 525-2C. Video feed 525-1C is a representation of video data captured at device 500B (e.g., using camera 501B) and communicated from device 500B to devices 500A and 500C during the communication session. Video feed 525-2C is a representation of video data captured at device 500A (e.g., using camera 501A) and communicated from device 500A to devices 500B and 500C during the communication session. Communication UI 520C also includes camera preview 550C, which is a representation of video data captured at device 500C via camera 501C, and one or more controls 555C for controlling one or more aspects of the communication session, similar to controls 555A and 555B. Camera preview 550C represents to User C the prospective video feed of User C that is displayed at respective devices 500A and 500B.

While the diagram depicted in FIG. 5C represents a communication session between three electronic devices, the communication session can be established between two or more electronic devices, and the number of devices participating in the communication session can change as electronic devices join or leave the communication session. For example, if one of the electronic devices leaves the communication session, audio and video data from the device that stopped participating in the communication session is no longer represented on the participating devices. For example, if device 500B stops participating in the communication session, there is no data connection 510 between devices 500A and 500C, and no data connection 510 between devices 500C and 500B. Additionally, device 500A does not include video feed 525-1A and device 500C does not include video feed 525-1C. Similarly, if a device joins the communication session, a connection is established between the joining device and the existing devices, and the video and audio data is shared among all devices such that each device is capable of outputting data communicated from the other devices.

The embodiment depicted in FIG. 5C represents a diagram of a communication session between multiple electronic devices, including the example communication sessions depicted in FIGS. 6A-6AY, 9A-9T, 11A-11P, 13A-13K, and 16A-16Q. In some embodiments, the communication session depicted in FIGS. 6A-6AY, 9A-9T, 13A-13K, and 16A-16Q includes two or more electronic devices, even if the other electronic devices participating in the communication session are not depicted in the figures.

Attention is now directed towards embodiments of user interfaces ("UI") and associated processes that are implemented on an electronic device, such as portable multifunction device 100, device 300, or device 500.

FIGS. 6A-6AY illustrate exemplary user interfaces for managing a live video communication session, in accordance with some embodiments. The user interfaces in these figures are used to illustrate the processes described below, including the processes in FIGS. 7-8 and FIG. 15.

FIGS. 6A-6AY illustrate exemplary user interfaces for managing a live video communication session from the perspective of different users (e.g., users participating in the live video communication session from different devices, different types of devices, devices having different applications installed, and/or devices having different operating system software).

With reference to FIG. 6A, device 600-1 corresponds to user 622 (e.g., "John"), who is a participant of the live video communication session in some embodiments. Device 600-1 includes a display (e.g., touch-sensitive display) 601 and a camera 602 (e.g., front-facing camera) having a field of view 620. In some embodiments, camera 602 is configured to capture image data and/or depth data of a physical environment within field-of-view 620. Field-of-view 620 is sometimes referred to herein as the available field-of-view, entire field-of-view, or the camera field-of-view. In some embodiments, camera 602 is a wide angle camera (e.g., a camera that includes a wide angle lens or a lens that has a relatively short focal length and wide field-of-view). In some embodiments, device 600-1 includes multiple cameras. Accordingly, while description is made herein to device 600-1 using camera 602 to capture image data during a live video communication session, it will be appreciated that device 600-1 can use multiple cameras to capture image data.

With reference to FIG. 6A, device 600-2 corresponds to user 623 (e.g., "Jane"), who is a participant of the live video communication session in some embodiments. Device 600-2 includes a display (e.g., touch-sensitive display) 683 and a camera 682 (e.g., front-facing camera) having a field-of-view 688. In some embodiments, camera 682 is configured to capture image data and/or depth data of a physical environment within field-of-view 688. Field-of-view 688 is sometimes referred to herein as the available field-of-view, entire field-of-view, or the camera field-of-view. In some embodiments, camera 682 is a wide angle camera (e.g., a camera that includes a wide angle lens or a lens that has a relatively short focal length and wide field-of-view). In some embodiments, device 600-2 includes multiple cameras. Accordingly, while description is made herein to device 600-2 using camera 682 to capture image data during a live video communication session, it will be appreciated that device 600-2 can use multiple cameras to capture image data.

As shown, user 622 ("John") is positioned (e.g., seated) in front of desk 621 (and device 600-1) in environment 615. In some examples, user 622 is positioned in front of desk 621 such that user 622 is captured within field-of-view 620 of camera 602. In some embodiments, one or more objects proximate user 622 are positioned such that the objects are captured within field-of-view 620 of camera 602. In some embodiments, both user 622 and objects proximate user 622 are captured within field-of-view 620 simultaneously. For example, as shown, drawing 618 is positioned in front of user 622 (relative to camera 602) on surface 619 such that both user 622 and drawing 618 are captured in field-of-view 620 of camera 602 and displayed in representation 622-1 (displayed by device 600-1) and representation 622-2 (displayed by device 600-2).

Similarly, user 623 ("Jane") is positioned (e.g., seated) in front of desk 686 (and device 600-2) in environment 685. In some examples, user 623 is positioned in front of desk 686 such that user 623 is captured within field-of-view 688 of camera 682. As shown, user 623 is displayed in representation 623-1 (displayed by device 600-1) and representation 623-2 (displayed by device 600-2).

Generally, during operation, devices 600-1, 600-2 capture image data, which is in turn exchanged between devices 600-1, 600-2 and used by devices 600-1, 600-2 to display various representations of content during the live video communication session. While each of devices 600-1, 600-2 are illustrated, described examples are largely directed to the user interfaces displayed on and/or user inputs detected by device 600-1. It should be understood that, in some examples, electronic device 600-2 operates in an analogous manner as electronic device 600-1 during the live video communication session. In some examples devices 600-1, 600-2 display similar user interfaces and/or cause similar operations to be performed as those described below.

As will be described in further detail below, in some examples such representations include images that have been modified during the live video communication session to provide improved perspective of surfaces and/or objects within a field-of-view (also referred to herein as "field of view") of cameras of devices 600-1, 600-2. Images may be modified using any known image processing technique including but not limited to image rotation and/or distortion correction (e.g., image skew). Accordingly, although image data may be captured from a camera having a particular location relative to a user, representations may provide a perspective showing a user (and/or surfaces or objects in an environment of the user) from a perspective different than that of the camera capturing the image data. The embodiments of FIGS. 6A-6AY disclose displaying elements and detecting inputs (including hand gestures) at device 600-1 to control how image data captured by camera 602 is displayed (at device 600-1 and/or device 600-2). In some embodiments, device 600-2 displays similar elements and detects similar inputs (including hand gestures) at device 600-2 to control how image data captured by camera 602 is displayed (at either device 600-1 and/or device 600-2).

With reference to FIG. 6A, device 600-1 displays, on display 601, video conference interface 604-1. Video conference interface 604-1 includes representation 622-1 which in turn includes an image (e.g., frame of a video stream) of a physical environment (e.g., a scene) within the field-of-view 620 of camera 602. In some examples, the image of representation 622-1 includes the entire field-of-view 620. In other examples, the image of representation 622-1 includes a portion (e.g., a cropped portion or subset) of the entire field-of-view 620. As shown, in some examples, the image of representation 622-1 includes user 622 and/or a surface 619 proximate user 622 on which drawing 618 is located.

Video conference interface 604-1 further includes representation 623-1 which in turn includes an image of a physical environment within the field-of-view 688 of camera 682. In some examples, the image of representation 623-1 includes the entire field-of-view 688. In other examples, the image of representation 623-1 includes a portion (e.g., a cropped portion or subset) of the entire field-of-view 688. As shown, in some examples, the image of representation 623-1 includes user 623. As shown, representation 623-1 is displayed at a larger magnitude than representation 622-1. In this manner, user 622 may better observe and/or interact with user 623 during the live communication session.

Device 600-2 displays, on display 683, video conference interface 604-2. Video conference interface 604-2 includes representation 622-2 which in turn includes an image of the physical environment within the field-of-view 620 of camera 602. Video conference interface 604-2 further includes representation 623-2 which in turn includes an image of a physical environment within the field-of-view 688 of camera 682. As shown, representation 622-2 is displayed at a larger magnitude than representation 623-2. In this manner, user 623 may better observe and/or interact with user 622 during the live communication session.

Figure 6B:
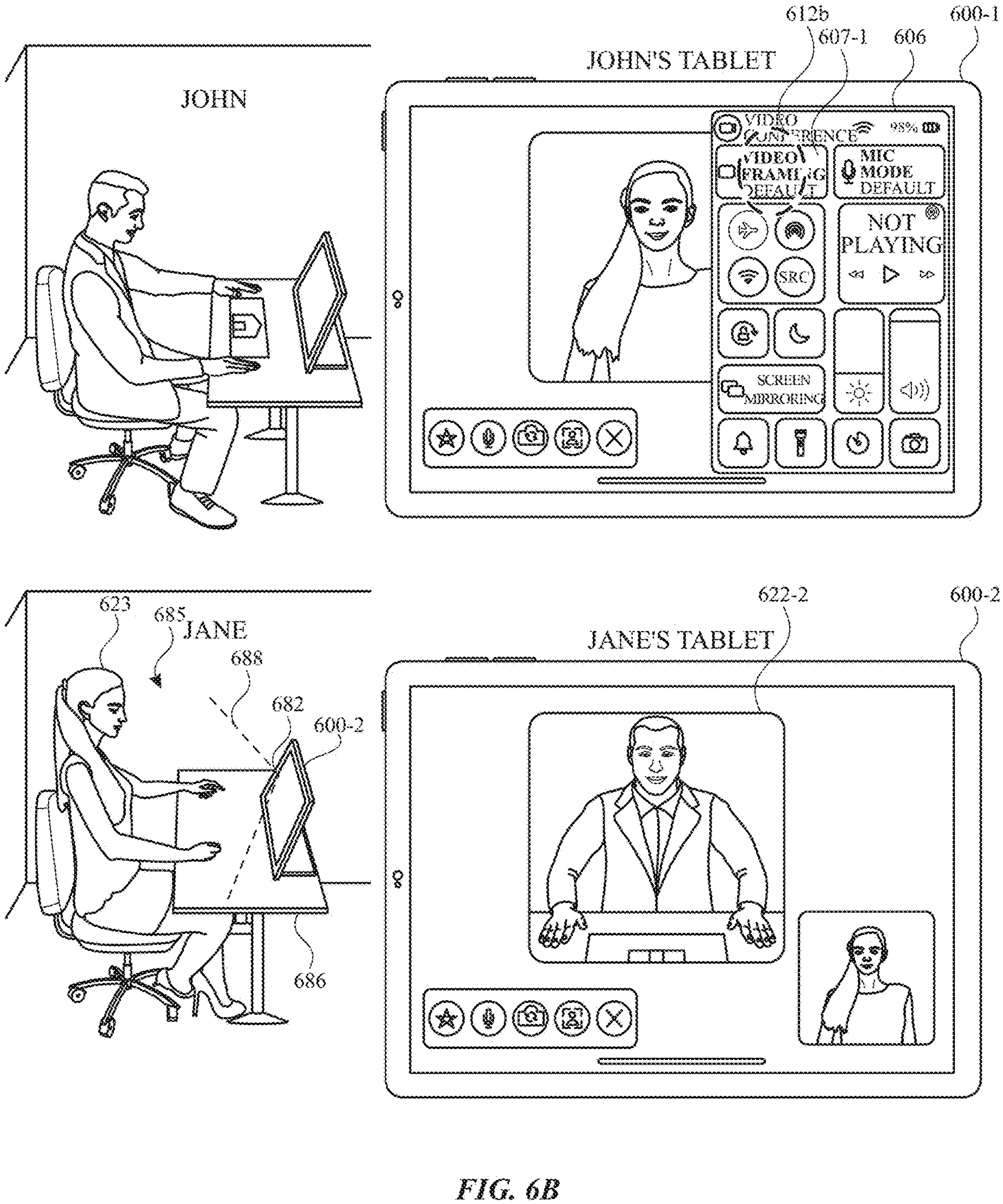

At FIG. 6A, device 600-1 displays interface 604-1. While displaying interface 604-1, device 600-1 detects input 612*a* (e.g., swipe input) corresponding to a request to display a settings interface. In response to detecting input 612*a*, device 600-1 displays settings interface 606, as depicted in FIG. 6B. As shown, settings interface 606 is overlaid on interface 604-1 in some embodiments.

In some embodiments, settings interface 606 includes one or more affordances for controlling settings of device 600-1 (e.g., volume, brightness of display, and/or Wi-Fi settings). For example, settings interface 606 includes a view affordance 607-1, which when selected causes device 600-1 to display a view menu, as shown in FIG. 6B.

Figure 6C:
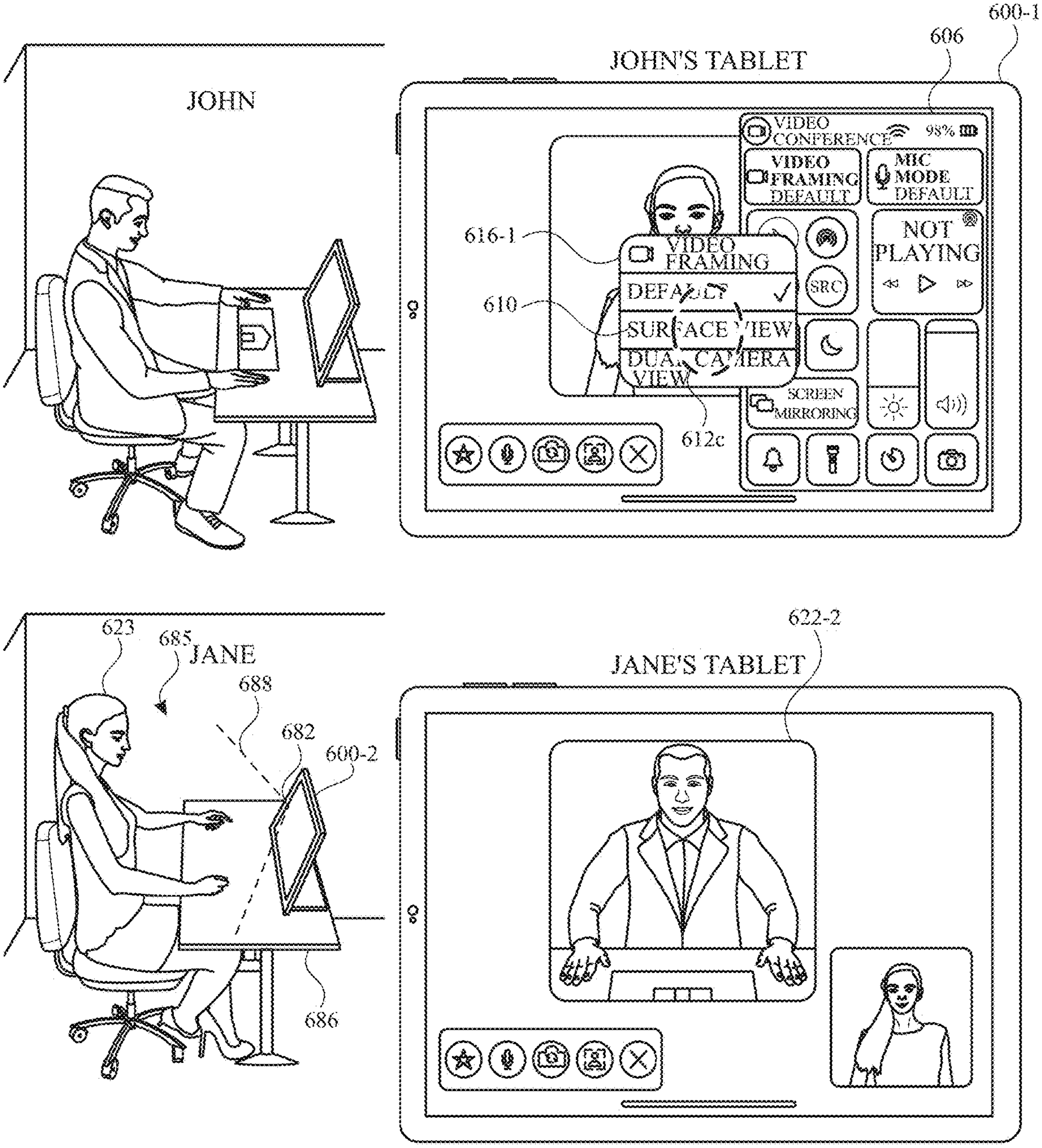

As shown in FIG. 6B, while displaying settings interface 606, device 600-1 detects input 612*b*. Input 612*b* is a tap gesture on view affordance 607-1 in some embodiments. In response to detecting input 612*b*, device 600-1 displays view menu 616-1, as shown in FIG. 6C.

Generally, view menu 616-1 includes one or more affordances which may be used to manage (e.g., control) the manner in which representations are displayed during a live video communication session. By way of example, selection of a particular affordance may cause device 600-1 to display, or cease displaying, representations in an interface (e.g., interface 604-1 or interface 604-2).

View menu 616-1, for instance, includes a surface view affordance 610, which when selected, causes device 600-1 to display a representation including a modified image of a surface. In some embodiments, when surface view affordance 610 is selected, the user interfaces transition directly to the user interfaces of FIG. 6M. Additionally or alternatively, FIGS. 6D-6L (described below) illustrate other user interfaces that can be displayed prior to the user interfaces in FIG. 6M and other inputs to initiate the process of displaying the user interfaces as shown in FIG. 6M. For example, while displaying view menu 616-1, device 600-1 detects input 612*c* corresponding to a selection of surface view affordance 610. In some examples, input 612*c* is a touch input. In response to detecting input 612*c*, device 600-1 displays representation 624-1, as shown in FIG. 6M. Further in response to detecting input 612*c*, device 600-2 displays representation 624-2. As described, in some embodiments, an image is modified during the live video communication session to provide an image having a particular perspective. Accordingly, in some examples, representation 624-1 is provided by generating an image from image data captured by camera 602, modifying the image (or a portion of the image), and displaying representation 624-1 with the modified image. In some embodiments, the image is modified using any known image processing techniques, including but not limited to image rotation and/or distortion correction (e.g., image skewing). The image of representation 624-2 is also provided in this manner in some embodiments.

In some embodiments, the image of representation 624-1 is modified to provide a desired perspective (e.g., a surface view). In some embodiments, the image of representation 624-1 is modified based on a position of surface 619 relative to camera 602. By way of example, device 600-1 can rotate the image of representation 624-1 a predetermined amount (e.g., 45 degrees, 90 degrees, or 180 degrees) such that surface 619 can be more intuitively viewed in representation 624-1. As shown in FIG. 6M, for example, in which camera 602 captures surface 619 from a perspective facing the user 622, the image of representation 624-1 is rotated 180 degrees to provide a perspective of the image from that of user 622. Accordingly, during the live video communication session, devices 600-1, 600-2 display surface 619 (and by extension drawing 618) from the perspective of user 622 during the live communication session. The image of representation 624-2 is also provided in this manner in some examples.

In some embodiments, to ensure that user 623 maintains a view of user 622 while representation 624-2 includes a modified image of surface 619, device 600-2 maintains display of representation 622-2. As shown in FIG. 6M, maintaining display of representation 622-2 in this manner can include adjusting a size and/or position of representation 622-2 in interface 604-2. Optionally, in some embodiments, device 600-2 ceases display of representation 622-2 to provide a larger size of representation 624-2. Optionally, in some embodiments, device 600-1 ceases display of representation 622-1 to provide a larger size of representation 624-1.

Representations 624-1, 624-2 include an image of drawing 618 that is modified with respect to the position (e.g., location and/or orientation) of drawing 618 relative to camera 602. For example, as depicted in FIG. 6A, prior to modification, the image is shown as having a particular orientation (e.g., upside down) in representations 622-1, 622-1. As a result of modifying the image, the image of drawing 618 is rotated and/or skewed such that the perspective of representations 624-1, 624-2 appears to be from the perspective of user 622. In this manner, the modified image of drawing 618 provides a perspective that is different from the perspective of representations 624-1, 624-2, so as to give user 623 (and/or user 622) a more natural and direct view of drawing 618. Accordingly, drawing 618 may be more readily and intuitively viewed by user 623 during the live video communication session.

As described, a representation including a modified image of a surface is provided in response to selection of a surface image affordance (e.g., surface view affordance 610). In some examples, a representation including a modified view of a surface is provided in response to detecting other types of inputs.

Figure 6D:
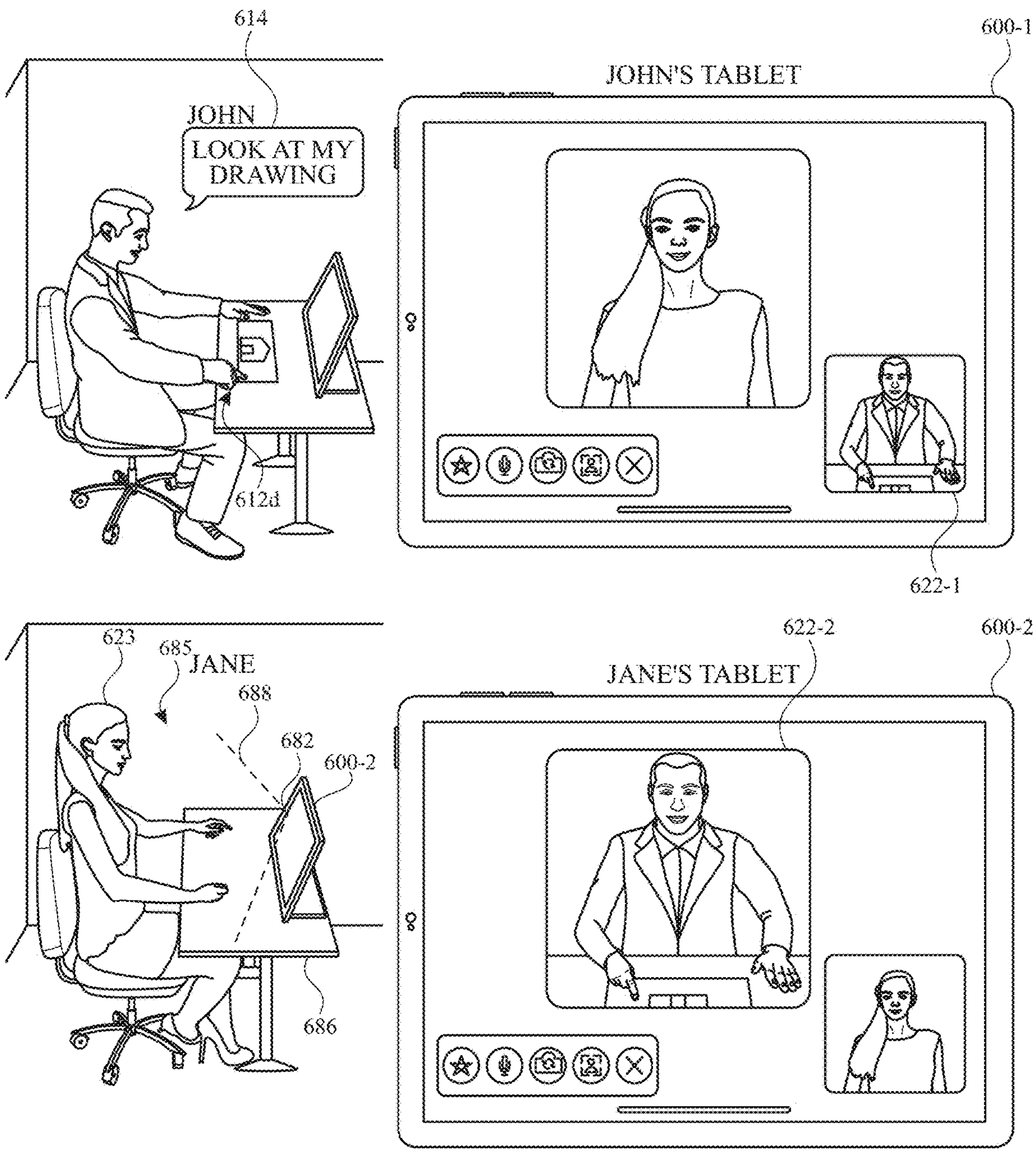
Figure 6E:
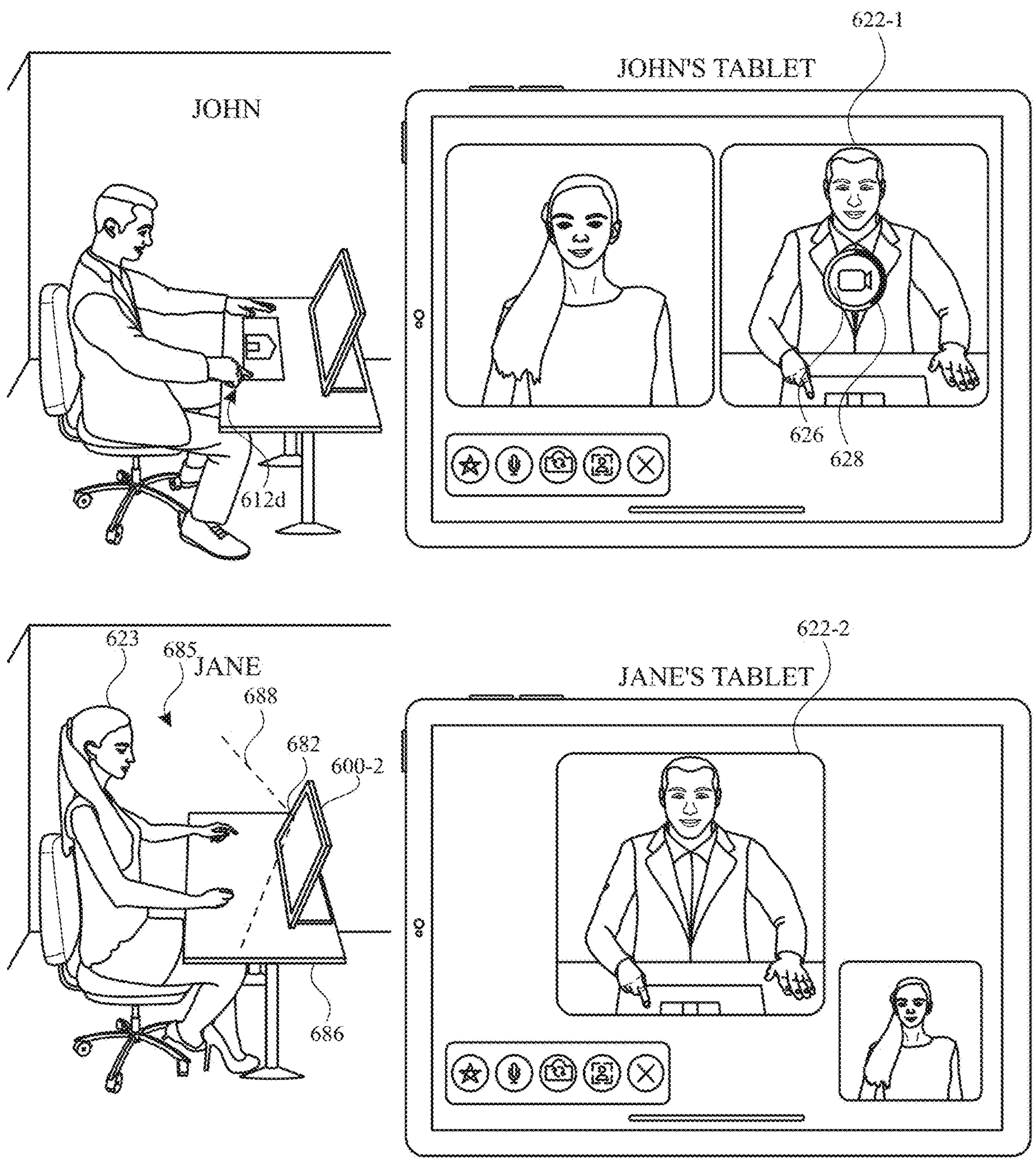
Figure 6F:
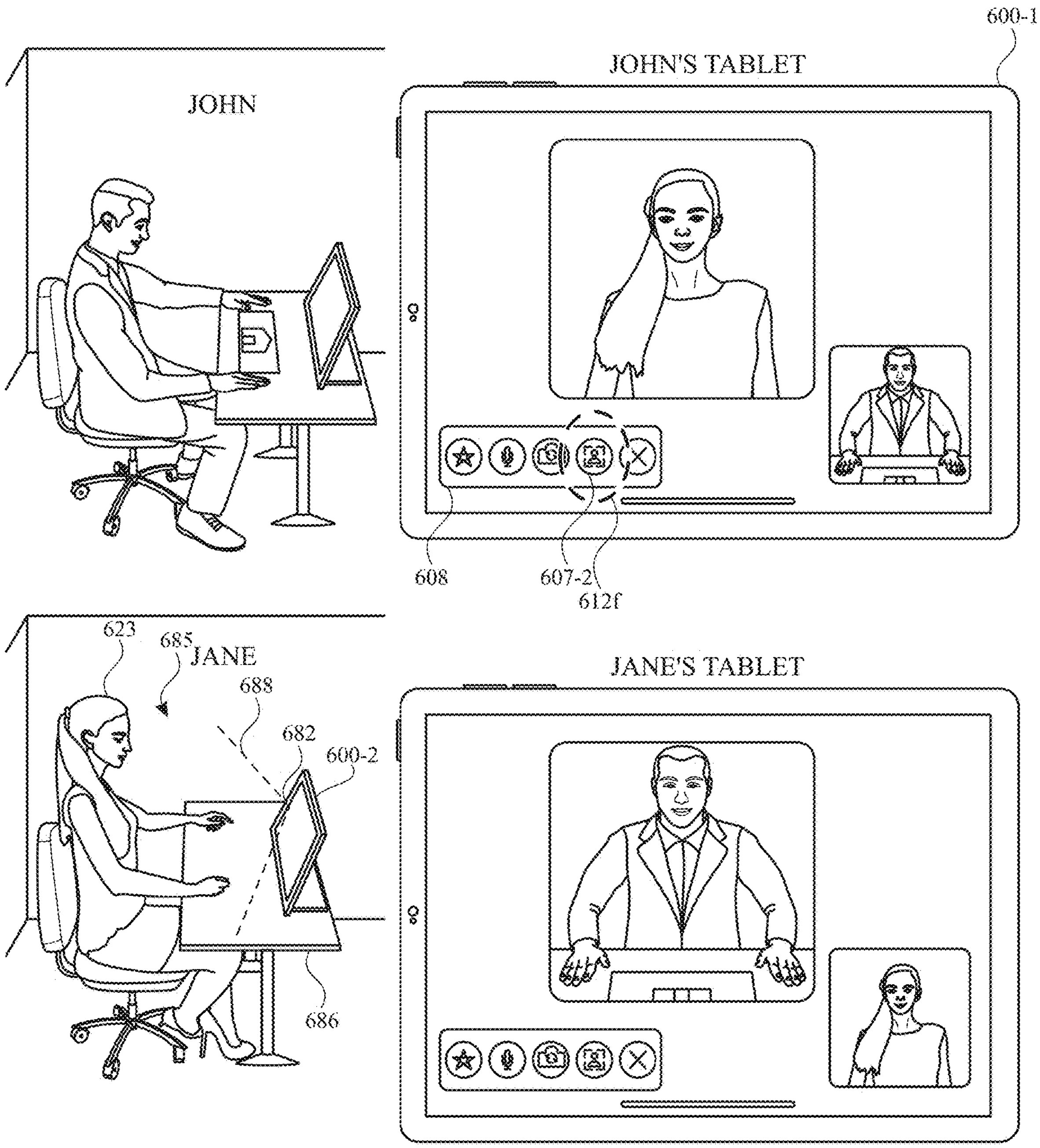
Figure 6G:
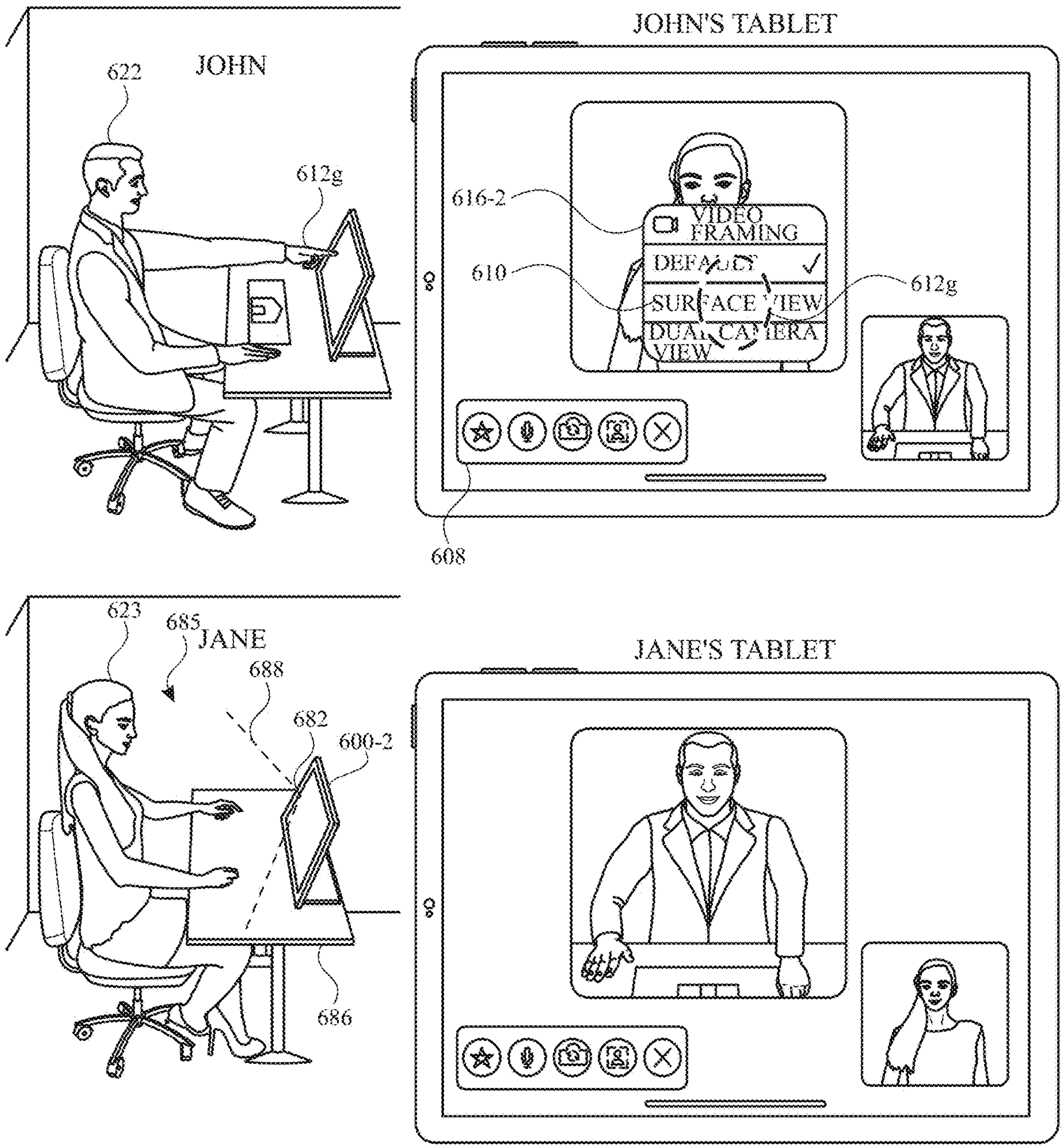

With reference to FIG. 6D, in some examples, a representation including a modified image of a surface is provided in response to one or more gestures. As an example, device 600-1 can detect a gesture using camera 602, and in response to detecting the gesture, determine whether the gesture satisfies a set of criteria (e.g., a set of gesture criteria). In some embodiments, the criteria include a requirement that the gesture is a pointing gesture, and optionally, a requirement that the pointing gesture has a particular orientation and/or is directed at a surface and/or object. For example with reference to FIG. 6D, device 600-1 detects gesture 612*d* and determines that the gesture 612*d* is a pointing gesture directed at drawing 618. In response, device 600-1 displays a representation including a modified image of surface 619, as described with reference to FIG. 6M.

In some embodiments, the set of criteria includes a requirement that a gesture be performed for at least a threshold amount of time. For example, with reference to FIG. 6E, in response to detecting a gesture, device 600-1 overlays graphical object 626 on representation 622-1 indicating that device 600-1 has detected that the user is currently performing a gesture, such as 612*d*. As shown, in some embodiments, device 600-1 enlarges representation 622-1 to assist user 622 in better viewing the detected gesture and/or graphical object 626.

In some embodiments, graphical object 626 includes timer 628 indicating an amount of time gesture 612*d* has been detected (e.g., a numeric timer, a ring that is filled over time, and/or a bar that is filled over time). In some embodiments, timer 628 also (or alternatively) indicates a threshold amount of time gesture 612*d* is to continue to be provided to satisfy the set of criteria. In response to gesture 612 satisfying the threshold amount of time (e.g., 0.5 second, 2 seconds, and/or 5 seconds), device 600-1 displays representation 624-1 including a modified image of a surface (FIG. 6M), as described.

In some examples, graphical object 626 indicates the type of gesture currently detected by device 600-1. In some examples, graphical object 626 is an outline of a hand performing the detected type of gesture and/or an image of the detected type of gesture. Graphical object 626 can, for instance, include a hand performing a pointing gesture in response to device 600-1 detecting that user 622 is performing a pointing gesture. Additionally or alternatively, the graphical object 626 can, optionally, indicate a zoom level (e.g., zoom level at which the representation of the second portion of the scene is or will be displayed).

In some examples, a representation having an image that is modified is provided in response to one or more speech inputs. For example, during the live communication session, device 600-1 receives a speech input, such as speech input 614 ("Look at my drawing.") in FIG. 6D. In response, device 600-1 displays representation 624-1 including a modified image of a surface (FIG. 6M), as described.

In some examples, speech inputs received by device 600-1 can include references to any surface and/or object recognizable by device 600-1, and in response, device 600-1 provides a representation including a modified image of the referenced object or surface. For example, device 600-1 can receive a speech input that references a wall (e.g., a wall behind user 622). In response, device 600-1 provides a representation including a modified image of the wall.

In some embodiments, speech inputs can be used in combination with other types of inputs, such as gestures (e.g., gesture 612*d*). Accordingly, in some embodiments, device 600-1 displays a modified image of a surface (or object) in response to detecting both a gesture and a speech input corresponding to a request to provide a modified image of the surface.

In some embodiments, a surface view affordance is provided in other manners. With reference to FIG. 6F, for instance, video conference interface 604-1 includes options menu 608. Options menu 608 includes a set of affordances that can be used to control device 600-1 during a live video communication session, including view affordance 607-2.

While displaying options menu 608, device 600-1 detects an input 612*f* corresponding to a selection of view affordance 607-2. In response to detecting input 612*f*, device 600-1 displays view menu 616-2, as shown in FIG. 6G. View menu 616-2 can be used to control the manner in which representations are displayed during a live video communication session, as described with respect to FIG. 6C.

While options menu 608 is illustrated as being persistently displayed in video conference interface 604-1 throughout the figures, options menu 608 can be hidden and/or re-displayed at any point during the live video communications session by device 600-1. For example, options menu 608 can be displayed and/or removed from display in response to detecting one or more inputs and/or a period of inactivity by a user.

While detecting an input directed to a surface has been described as causing device 600-1 to display a representation including a modified image of a surface (for example, in response to detecting input 612c of FIG. 6C, device 600-1 displays representation 624-1, as shown in FIG. 6M), in some embodiments, detecting an input directed to a surface can cause device 600-1 to enter a preview mode (e.g., FIGS. 6H-6J), for instance, prior to displaying representation 624-1.

Figure 6H:
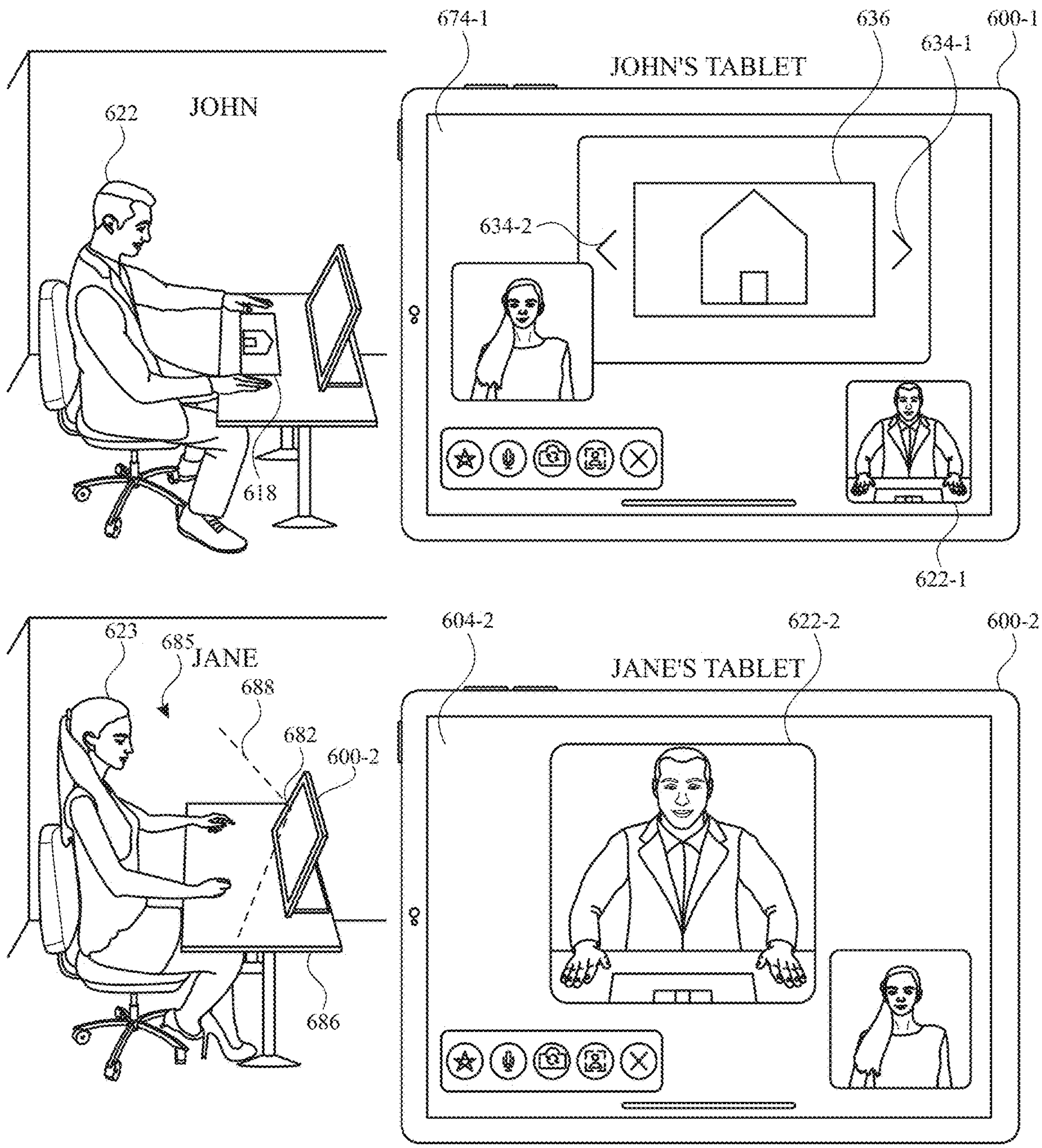

FIG. 6H illustrates an example in which device 600-1 is operating in a preview mode. Generally, the preview mode can be used to selectively provide portions, or regions, of an image of a representation to one or more other users during a live video communications session.

In some embodiments, prior to operating in the preview mode, device 600-1 detects an input (e.g., input 612c) directed to a surface view affordance 610. In response, device 600-1 initiates a preview mode. While operating in a preview mode, device 600-1 displays a preview interface 674-1. Preview interface 647-1 includes a left scroll affordance 634-2, a right scroll affordance 634-1, and preview 636.

In some embodiments, selection of the left scroll affordance causes device 600-1 to change (e.g., replace) preview 636. For example, selection of the left scroll affordance 634-2 or the right scroll affordance 634-1 causes device 600-1 to cycle through various images (image of a user, unmodified image of a surface, and/or modified image of surface 619) such that a user can select a particular perspective to be shared upon exiting the preview mode, for instance, in response to detecting an input directed to preview 636. Additionally or alternatively, these techniques can be used to cycle through and/or select a particular surface (e.g., vertical and/or horizontal surface) and/or particular portion (e.g., cropped portion or subset) in the field-of-view.

As shown, in some embodiments, preview user interface 674-1 is displayed at device 600-1 and is not displayed at device 600-2. For example, device 600-2 displays video conference interface 604-2 (including representation 622-2) while device 600-1 displays preview interface 674-1. As such, preview user interface 674-1 allows user 622 to select a view prior to sharing the view with user 623.

Figure 6I:
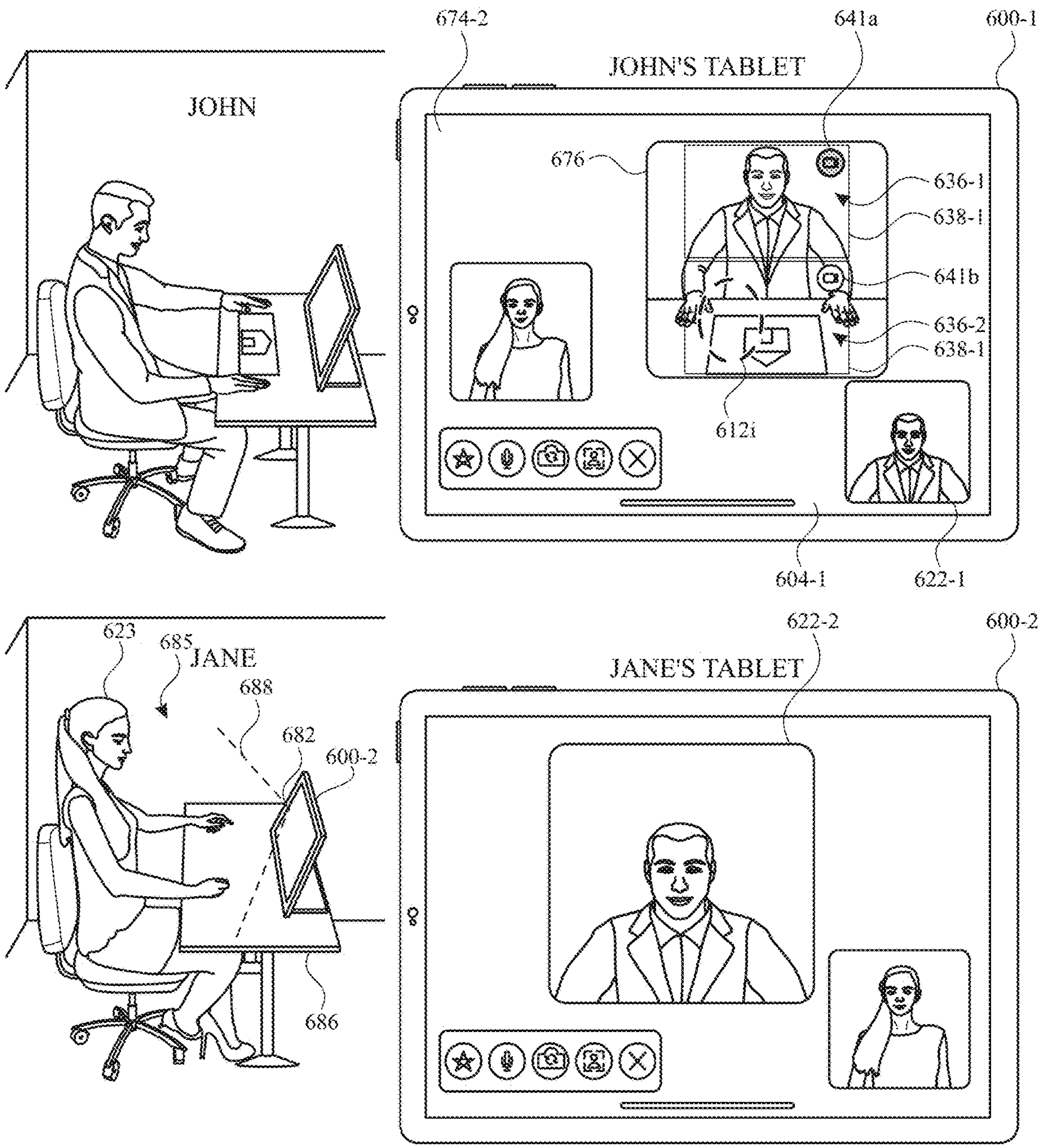
Figure 6J:
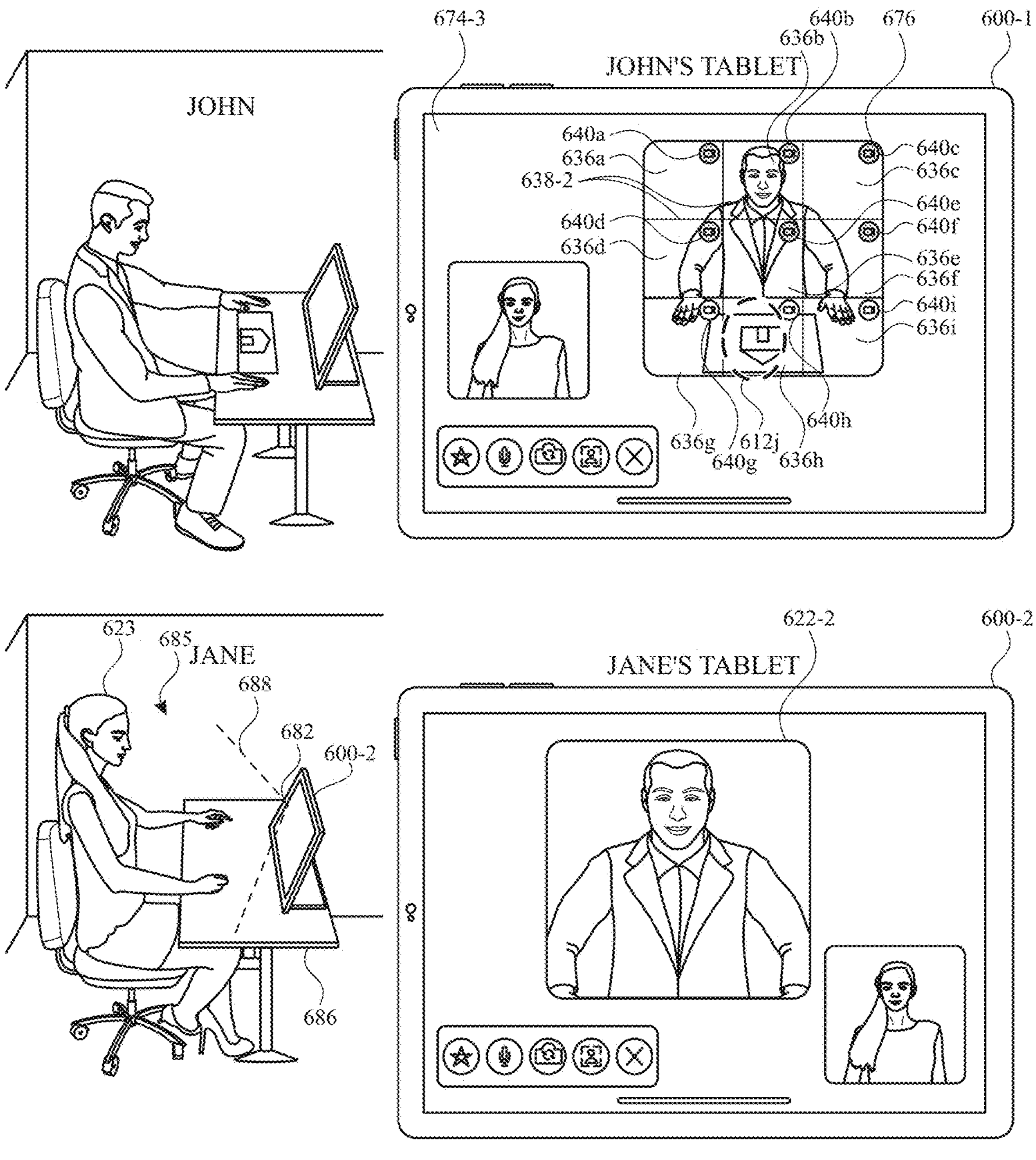

FIG. 6I illustrates an example in which device 600-1 is operating in a preview mode. As depicted, while the device 600-1 is operating in the preview mode, device 600-1 displays preview interface 674-2. In some embodiments, preview interface 674-2 includes representation 676 having regions 636-1, 636-2. In some embodiments, representation 676 includes an image that is the same or substantially similar to an image included in representation 622-1. Optionally, as shown, the size of representation 676 is larger than representation 622-1 of FIG. 6A. The position of representation 676 is different than the position of representation 622-1. Adjusting the size and/or position of a representation in preview interface 674-2 as compared the size and/or position of a representation including a similar or same image in video conference interface 604-1 allows user 622 to better view an image prior sharing that image with user 623.

In some embodiments, region 636-1 and region 636-2 correspond to respective portions of representation 676. For example, as shown, region 636-1 corresponds to an upper portion of representation 676 (e.g., a portion including an upper body of user 622), and region 636-2 corresponds to a lower portion of representation 676 (e.g., a portion including a lower body of user 622 and/or drawing 618).

In some embodiments, region 636-1 and region 636-2 are displayed as distinct regions (e.g., non-overlapping regions). In some embodiments, region 636-1 and region 636-2 overlap. Additionally or alternatively, one or more graphical objects 638-1 (e.g., lines, boxes, and/or dashes) can distinguish (e.g., visually distinguish) region 636-1 from region 636-2.

In some embodiments, preview interface 674-2 includes one or more graphical objects to indicate whether a region is active or inactive. In the example of FIG. 6I, preview interface 674-2 includes graphical objects 641a, 641b. The appearance (e.g., shape, size, and/or color) of graphical objects 641a, 641b indicates whether a respective region is active and/or inactive in some embodiments.

When active, a region is shared with one or more other users of a live video communication session. For example, with reference to FIG. 6I, graphical user interface object 641 indicates that region 636-1 is active. As a result, image data corresponding to region 636-1 is displayed by device 600-2 in representation 622-2. In some examples, device 600-1 shares only image data for active regions. In some embodiments, device 600-1 shares all image data, and instructs device 600-2 to display an image based on only the portion of image data corresponding to the active region 636-1.

While displaying interface 674-2, device 600-1 detects an input 612i at a location corresponding to region 636-2. Input 612i is a touch input in some embodiments. In response to detecting input 612i, device 600-1 activates region 636-2. As a result, device 600-2 displays a representation including a modified image of surface 619, such as representation 624-2. In some embodiments, region 636-1 remains active in response to input 612i (e.g., user 623 can see user 622, for example, in representation 622-2). Optionally, in some embodiments, device 600-1 deactivates region 636-1 in response to input 612i (e.g., user 623 can no longer see user 622, for example, in representation 622-2).

While the example of FIG. 6I is described with respect to a preview mode having a representation including two regions 636-1, 636-2, in some embodiments other numbers of regions can be used. For example, with reference to FIG. 6J, device 600-1 is operating in a preview mode in which preview interface 674-3 includes a representation 676 that includes regions 636a-636i.

In some embodiments, a plurality of regions are active (and/or can be activated). For example, as shown, device 600-1 displays regions 636a-636i, of which regions 636a-f are active. As a result, device 600-2 displays representation 622-2.

In some embodiments, device 600-1 modifies an image of a surface having any type of orientation, including any angle (e.g., between zero to ninety degrees) with respect to gravity. For example, device 600-1 can modify an image of a surface when the surface is a horizontal surface (e.g., a surface that is in a plane that is within the range of 70 to 110 degrees of the direction of gravity). As another example, device 600-1 can modify an image of a surface when the surface is a vertical surface (e.g., a surface that is in a plane that up to 30 degrees of the direction of gravity).

While displaying interface 674-3, device 600-1 detects input 612*j* at a location corresponding to region 636*h*. In response to detecting input 612*j*, device 600-1 activates region 636-2. As a result, device 600-2 displays a representation including a modified image of surface 619, such as representation 624-2. In some embodiments, regions 636*a-f* remain active in response to input 612*j* (e.g., user 623 can see user 622, for example, in representation 622-2). Optionally, in some embodiments, device 600-1 deactivates regions 636*a-f* in response to input 612*j* (e.g., user 623 can no longer see user 622, for example, in representation 622-2).

Figure 6K:
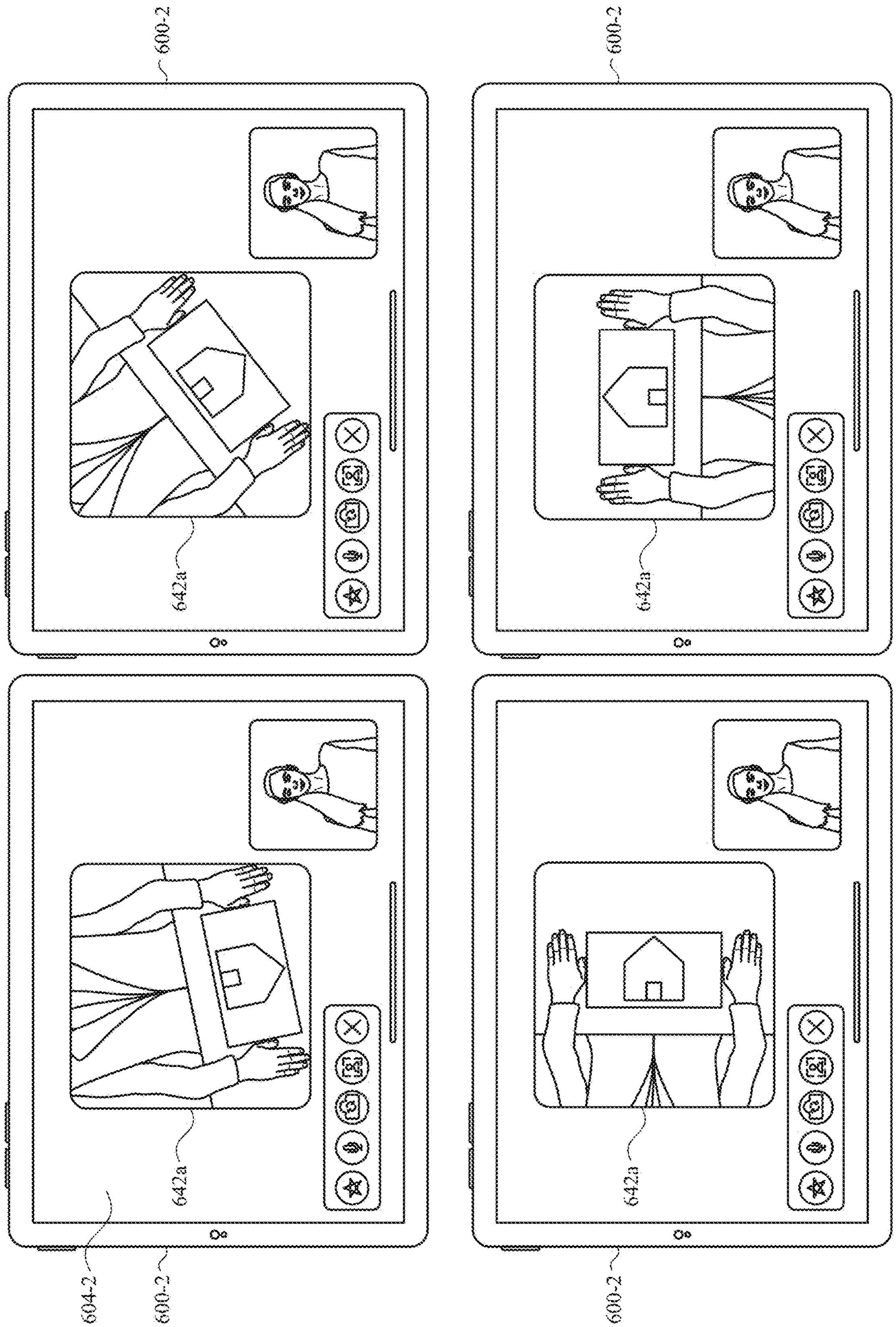
Figure 6L:
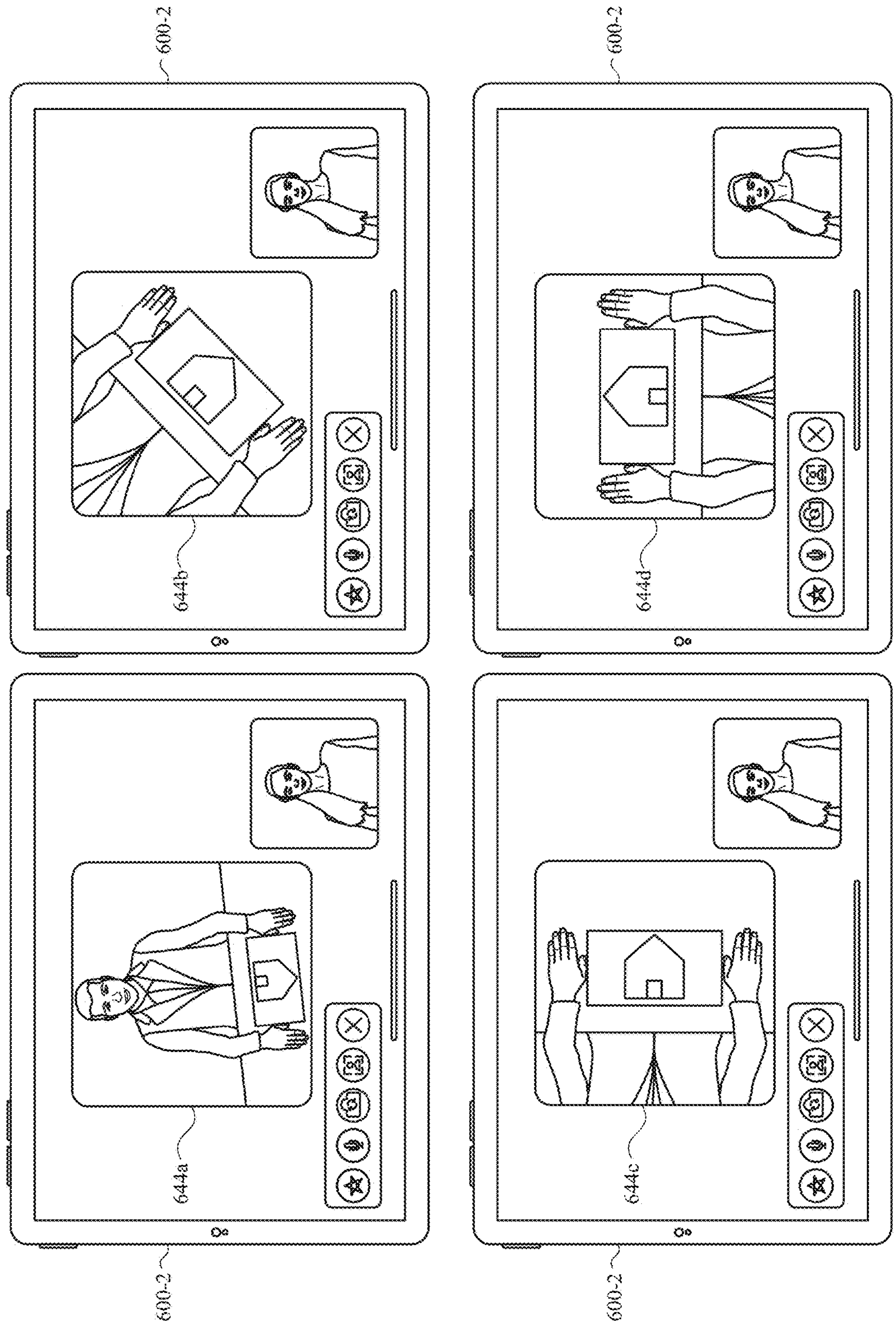
Figure 6M:
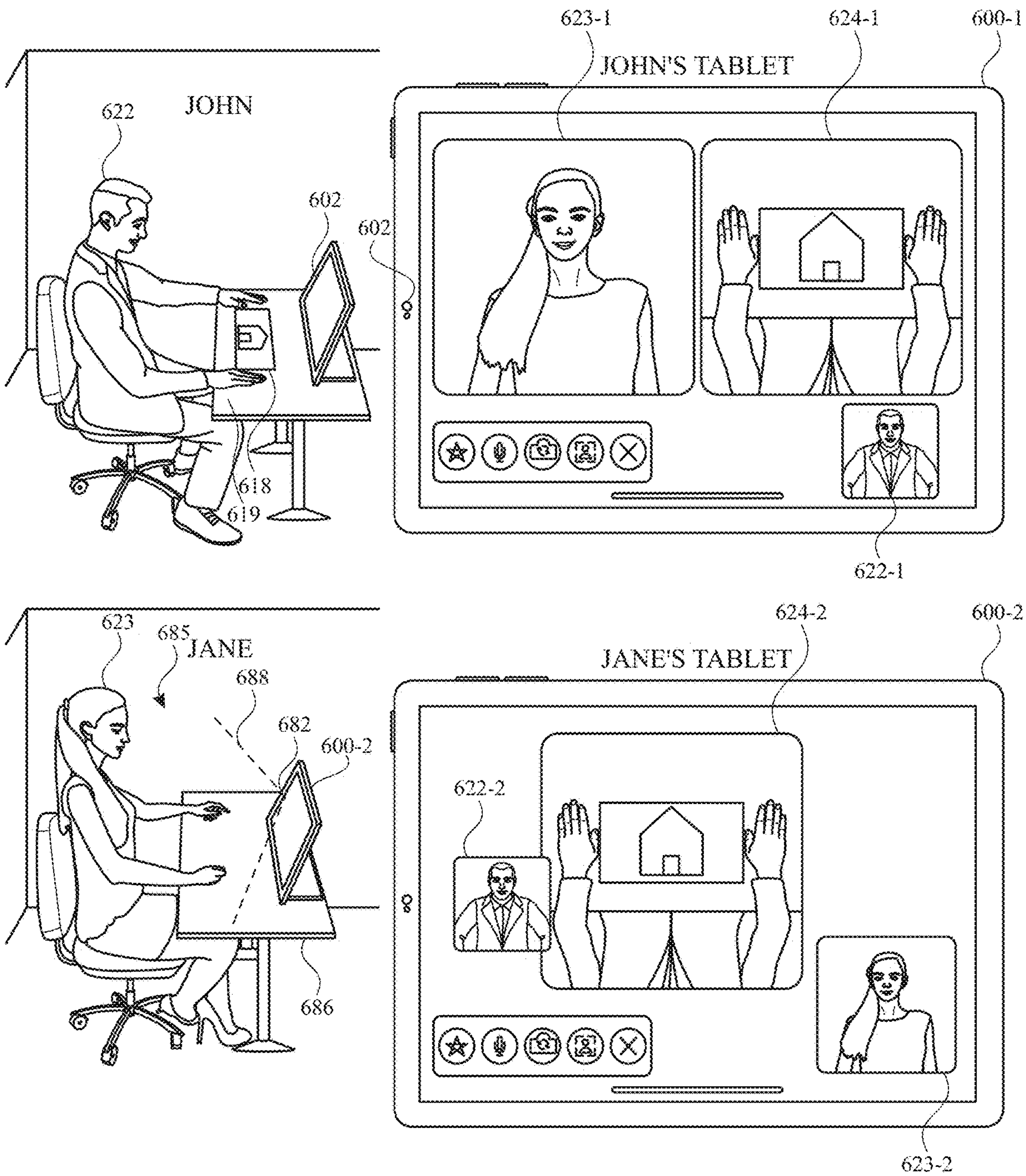

FIGS. 6K-6L illustrate example animations that can be displayed by device 600-1 and/or device 600-2. As discussed in FIGS. 6A-6I, device 600-1 can display representations including modified images. In some embodiments, device 600-1 and/or device 600-2 displays an animation to transition between views and/or show modifications to images over time. The animation can include, for instance, panning, rotating, and/or otherwise modifying an image to provide the modified image. Additionally or alternatively, the animation occurs in response to detecting an input directed at a surface (e.g., a selection of surface view affordance 610, a gesture, and/or a speech input).

FIG. 6K illustrates an example animation in which device 600-2 pans and rotates an image of representation 642*a*. During the animation, the image of representation 642*a* is panned down to view surface 619 at a more "overhead" perspective. The animation also includes rotating the image of representation 642*a* such that surface 619 is viewed from the perspective of user 622. While four frames of the animation are shown, the animation can include any number of frames. Optionally, in some embodiments, device 600-1 pans and rotates an image of a representation (e.g., representation 622-1).

FIG. 6L illustrates an example in which device 600-2 magnifies and rotates an image of representation 642*a*. During the animation, representation 642*a* is magnified until a desired zoom level is attained. The animation also includes rotating the representation 642*a* until an image of drawing 618 is oriented to a perspective of user 622, as described. While four frames of the animation are shown, the animation can include any number of frames. Optionally, in some embodiments, device 600-1 magnifies and rotates an image of a representation (e.g., representation 622-1).

FIGS. 6N-6R illustrate examples in which a modified image of a surface is further modified during a live communication session.

Figure 6N:
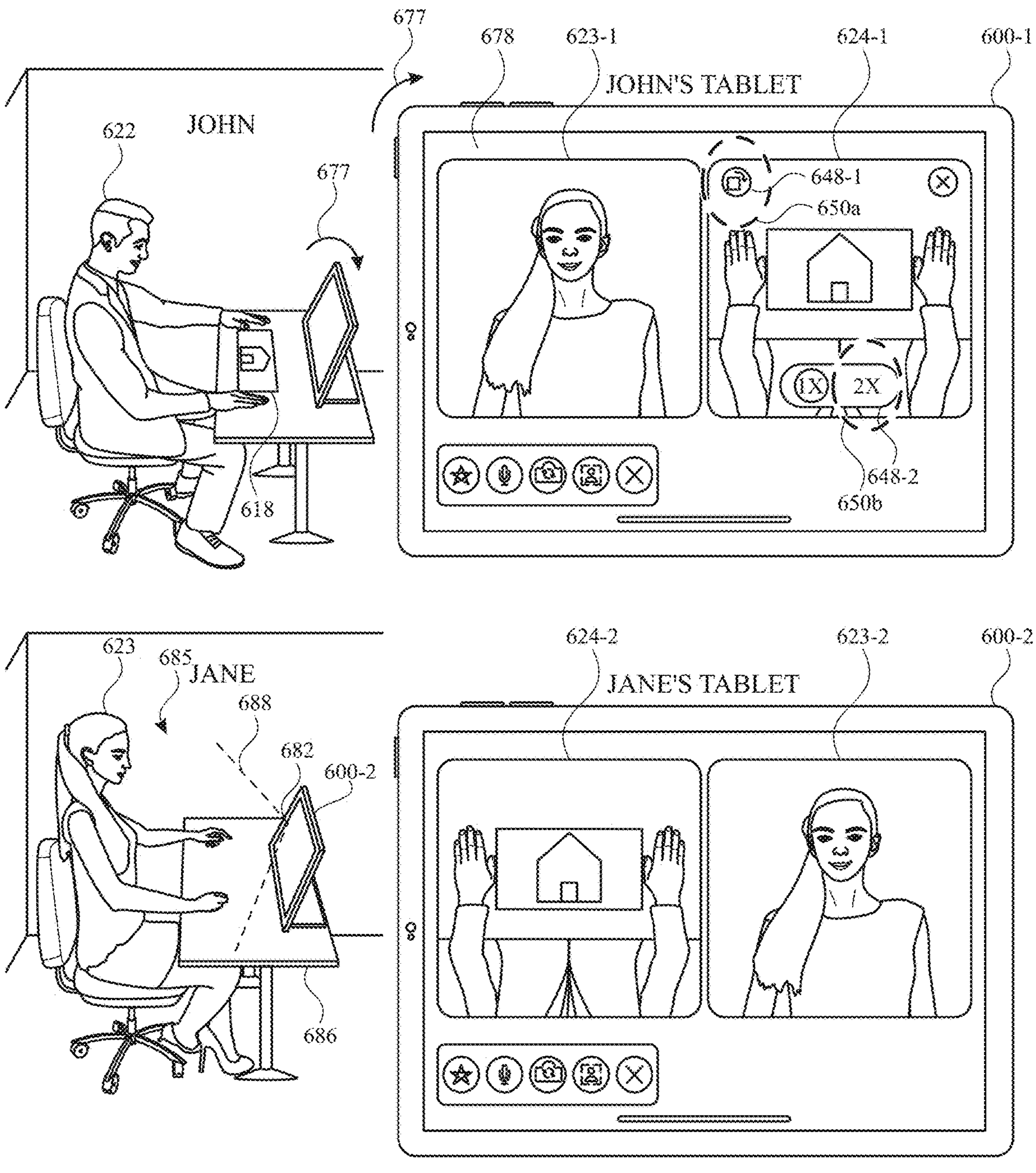
Figure 6O:
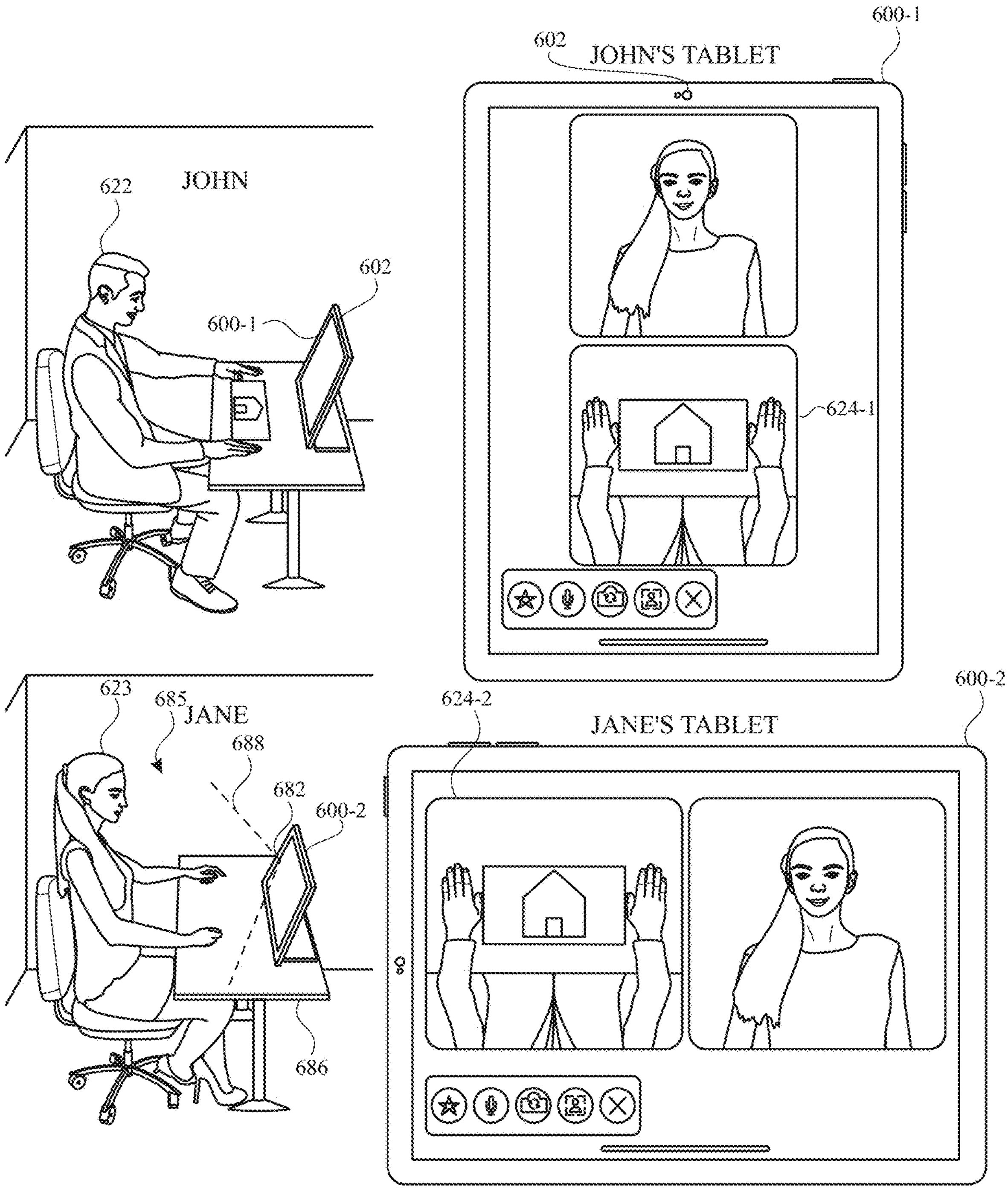

FIG. 6N illustrates an example of a live communication session in which a user provides various inputs. For example, while displaying interface 678, device 600-1 detects an input 677 corresponding to a rotation of device 600-1. As depicted in FIG. 6O, in response to detecting input 677, device 600-1 modifies interface 678 to compensate for the rotation (e.g., of camera 602). As shown in FIG. 6O, device 600-1 arranges representations 623-1 and 624-1 of interface 678 in a vertical configuration. Additionally, representation 624-1 is rotated according to the rotation of device 600-1 such that the perspective of representation 624-1 is maintained in the same orientation relative to the user 622. Additionally, the perspective of representation 624-2 is maintained in the same orientation relative to the user 623.

With further reference to FIG. 6N, in some examples, device 600-1 displays control affordances 648-1, 648-2 to modify the image of representation 624-1. Control affordances 648-1, 648-2 can be displayed in response to one or more inputs, for instance, corresponding to a selection of an affordance of options menu 608 (e.g., FIG. 6B).

As shown, in some embodiments, device 600-1 displays representation 624-1 including a modified image of a surface. Rotation affordance 648-1, when selected, causes device 600-1 to rotate the image of representation 624-1. For example, while displaying interface 678, device 600-1 detects input 650*a* corresponding to a selection of rotation affordance 648-1. In response to input 650*a*, device 600-1 modifies the orientation of the image of representation 624-1 from a first orientation (shown in FIG. 6N) to a second orientation (shown in FIG. 6O). In some embodiments, the image of representation 624-1 is rotated by a predetermined amount (e.g., 90 degrees).

Zoom affordance 648-2, when selected, modifies the zoom level of the image of representation 624-1. For example, as depicted in FIG. 6N, the image of representation 624-1 is displayed at a first zoom level (e.g., "1×"). While displaying zoom affordance 648-2, device 600-1 detects input 650*b* corresponding to a selection of zoom affordance 648-2. In response to input 650*b*, device 600-1 modifies a zoom level of the image of representation 624-1 from the first zoom level (e.g., "1×") to a second zoom level (e.g., "2×"), as shown in FIG. 6Q.

Figure 6P:
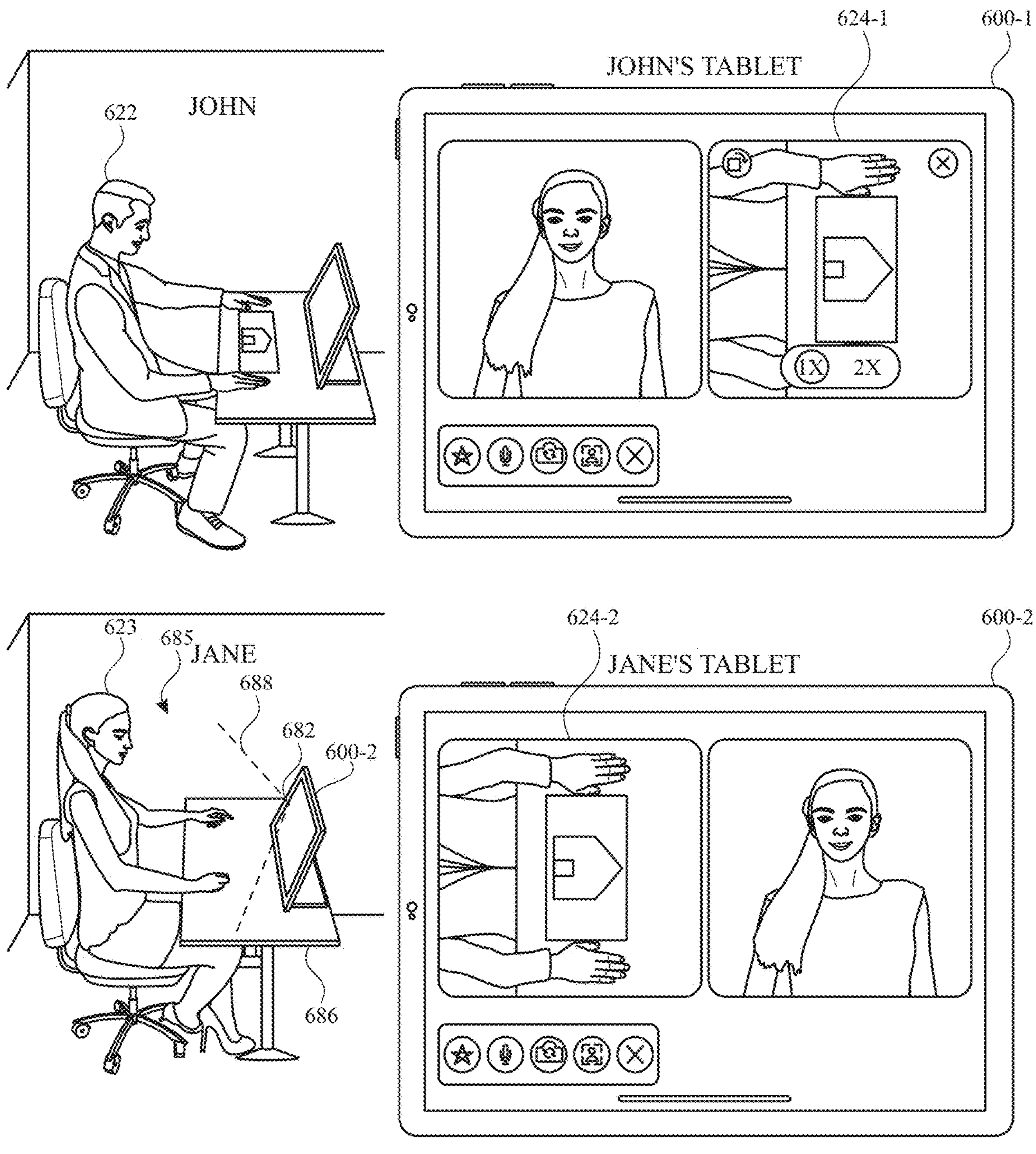
Figure 6Q:
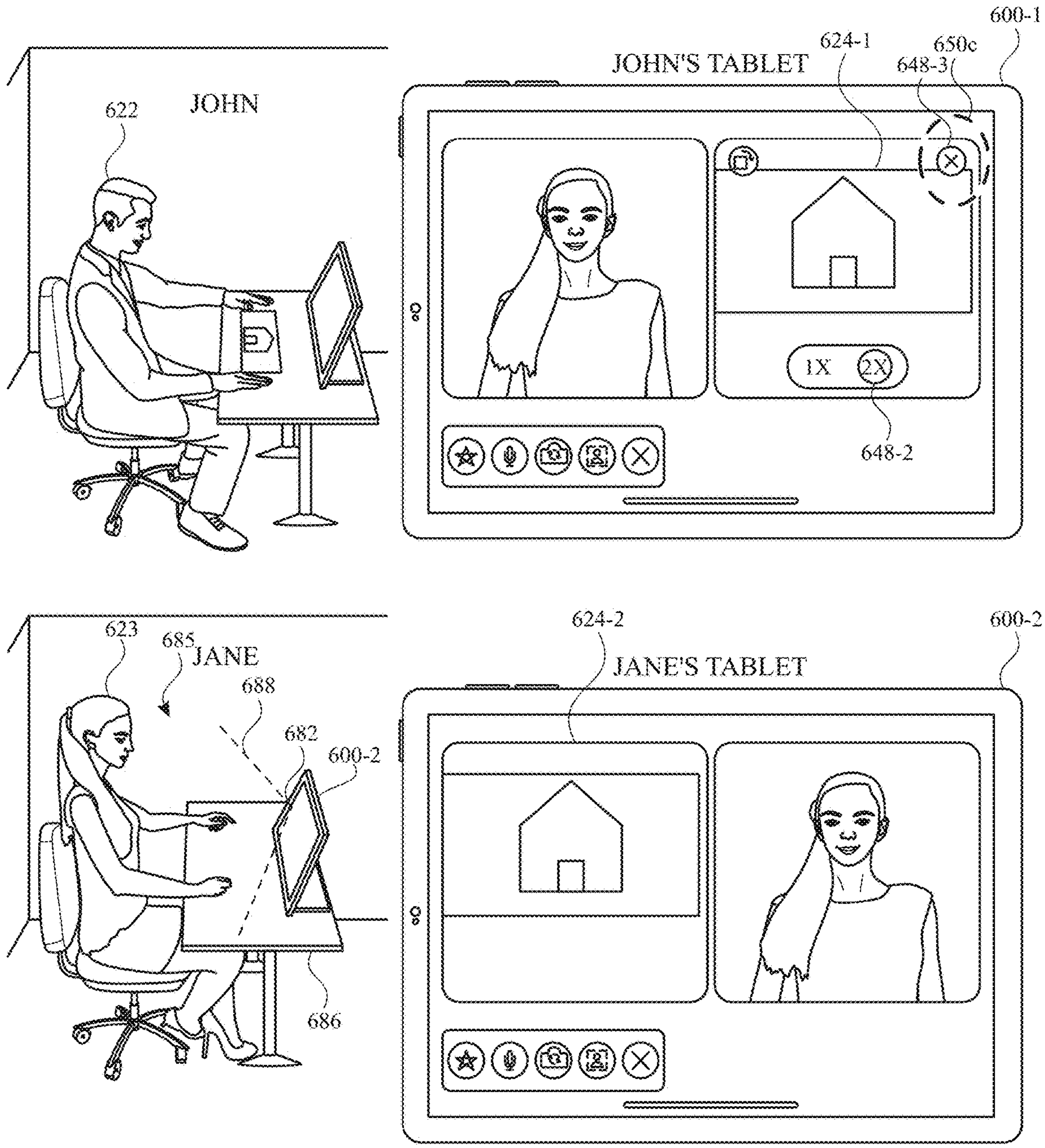
Figure 6R:
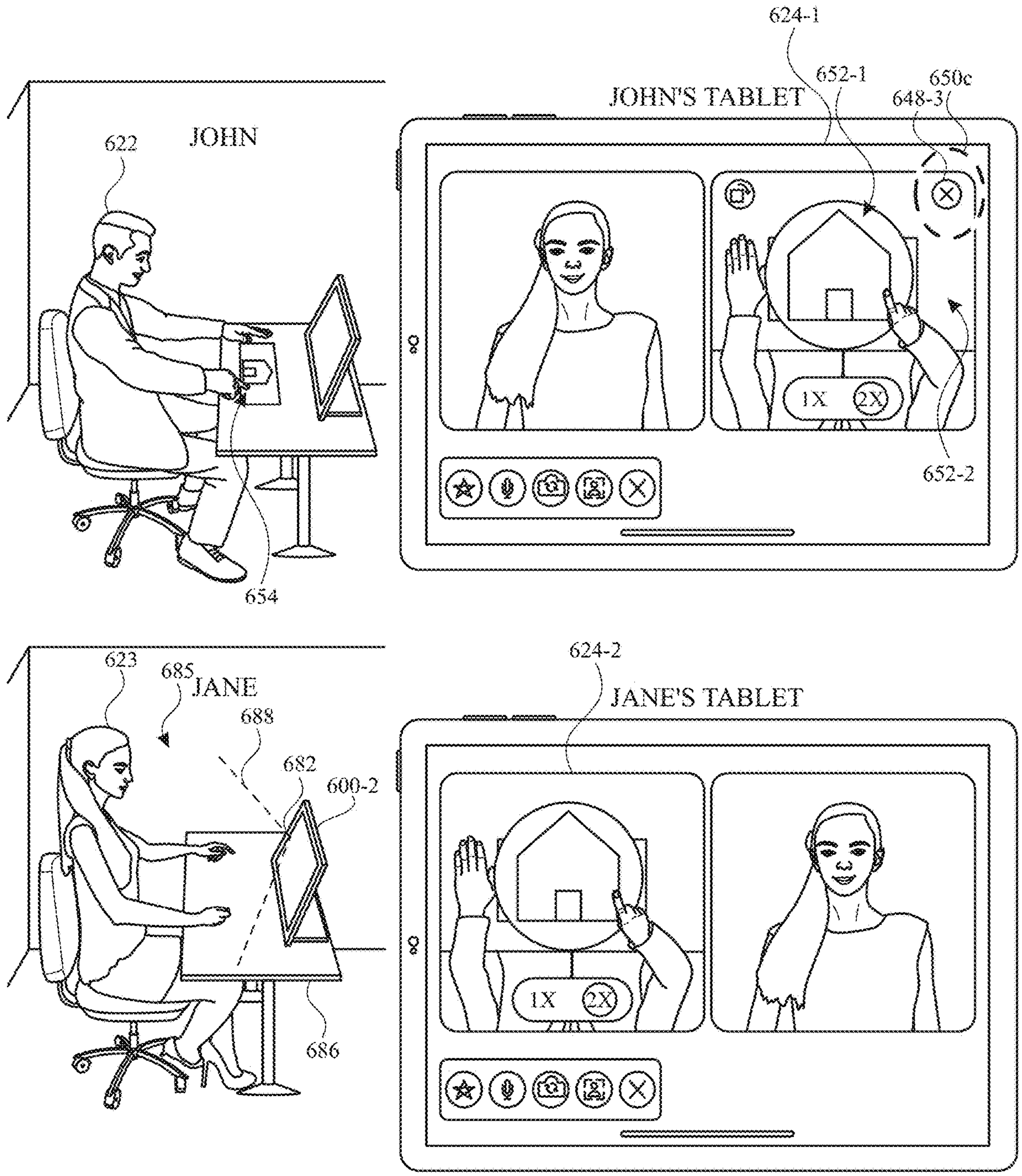

Additionally or alternatively, in some embodiments, video conference interface 604-1 includes an option to display a magnified view of at least a portion of the image of representation 624-1, as shown in FIG. 6R. For instance, while displaying representation 624-1, device 600-1 can detect an input 654 (e.g., a gesture directed to a surface and/or object) corresponding to a request to display a magnified view of a portion of the image of representation 624-1. In response to detecting input 654, device 600-1 displays magnified portion 652-1 at a greater zoom level than second portion 652-2 of representation 624-1. In some embodiments, the portion of the image of representation 624-1 that is magnified is determined based on a location of input 654. In some embodiments, in response to detecting input 650*c* (FIGS. 6R and 6Q), device 600-1 ceases to display control affordances 648-1, 648-2.

Figure 6S:
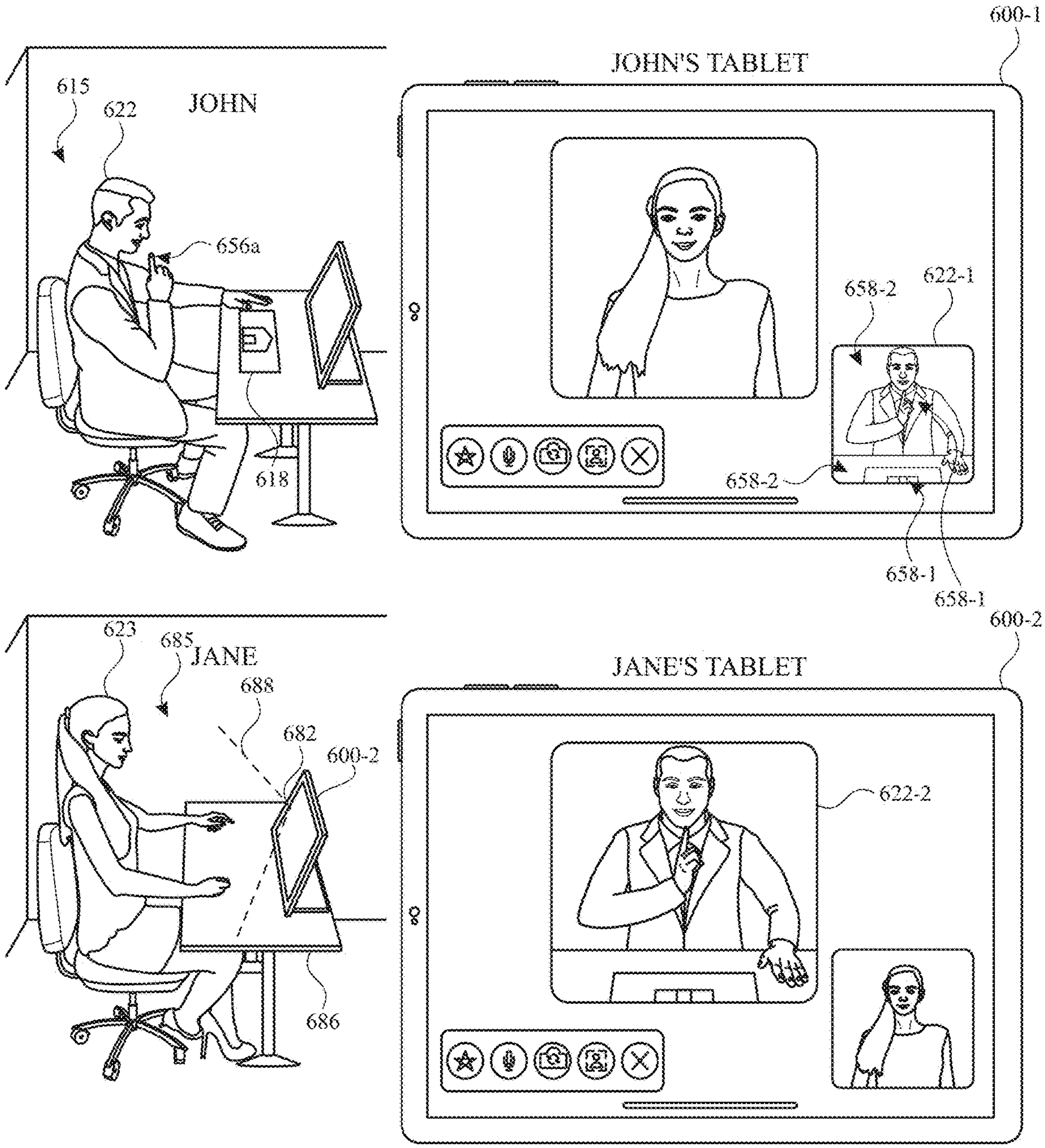

FIGS. 6S-6AC illustrate examples in which a device modifies an image of a representation in response to user input. As described in more detail below, device 600-1 can modify images of representations (e.g., representation 622-1) in video conference interface 604-1 in response to non-touch user input, including gestures and/or audio input, thereby improving the manner in which a user interacts with a device to manage and/or modify representations during a live video communication session.

Figure 6T:
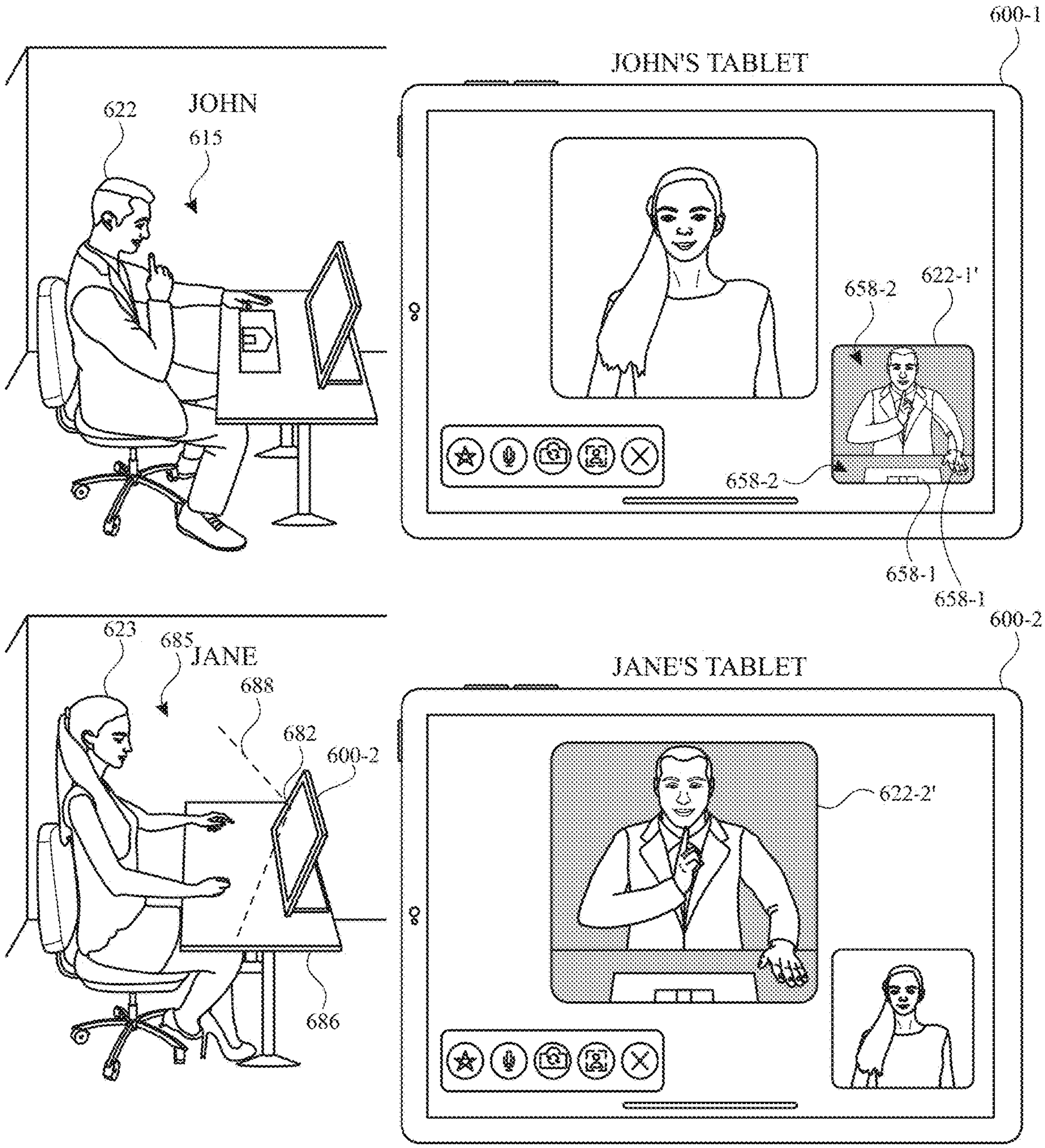

FIGS. 6S-6T illustrate an example in which a device obscures at least a portion of an image of a representation in response to a gesture. As illustrated in FIG. 6S, device 600-1 detects gesture 656*a* corresponding to a request to modify at least a portion of an image of representation 622-1. In some examples, gesture 656*a* is a gesture in which user 622 points in an upward direction near the mouth of user 622 (e.g., a "shh" gesture). As shown in FIG. 6T, in response, device 600-1 replaces representation 622-1 with representation 622-1' that includes a modified image including a modified portion 658-1 (e.g., background of physical environment of user 622). In some examples, modifying portion 658-1 in this manner includes blurring, greying, or otherwise obscuring portion 658-1. In some examples, device 600-1 does not modify portion 658-2 in response to gesture 656*a*.

Figure 6U:
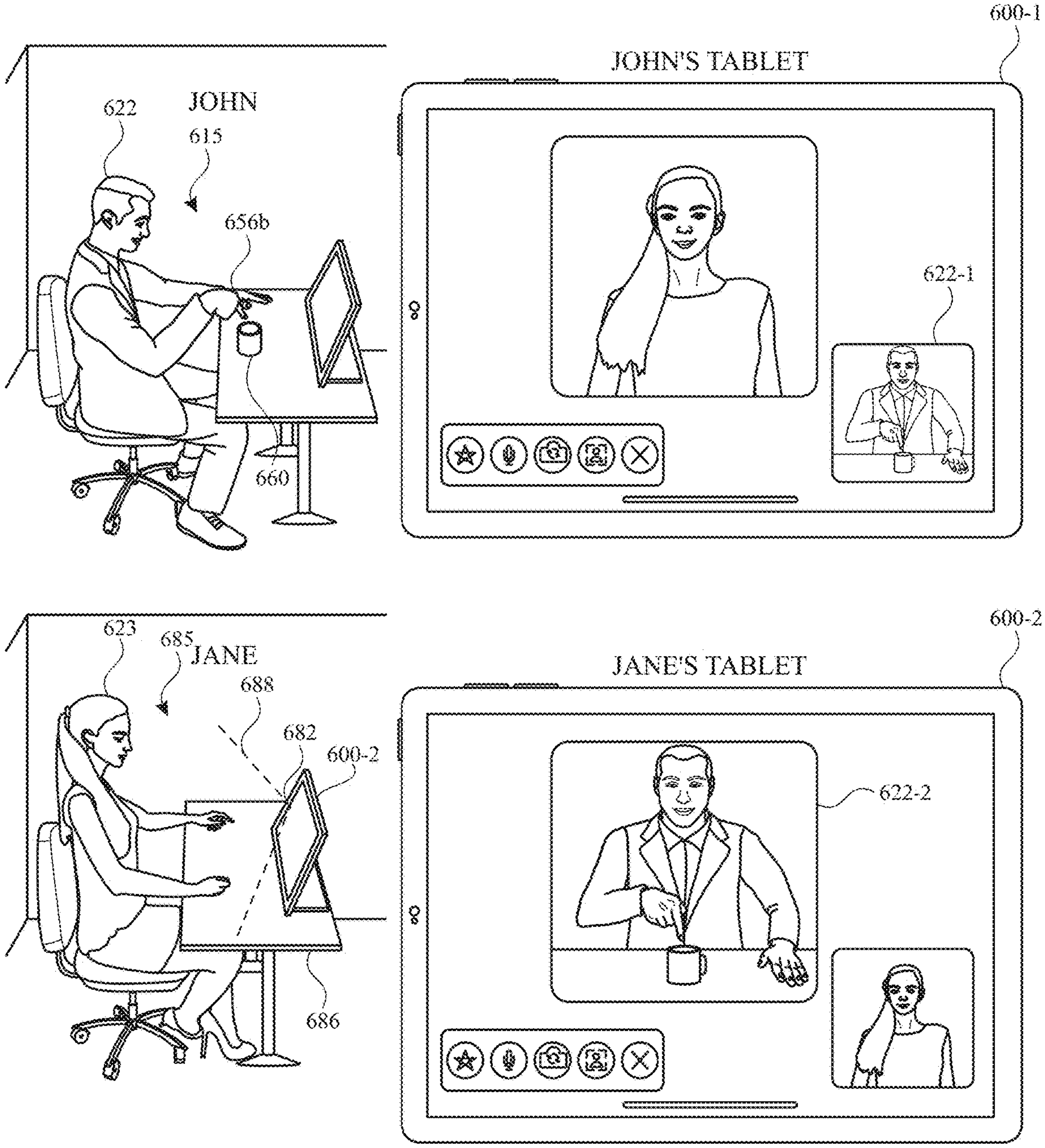
Figure 6V:
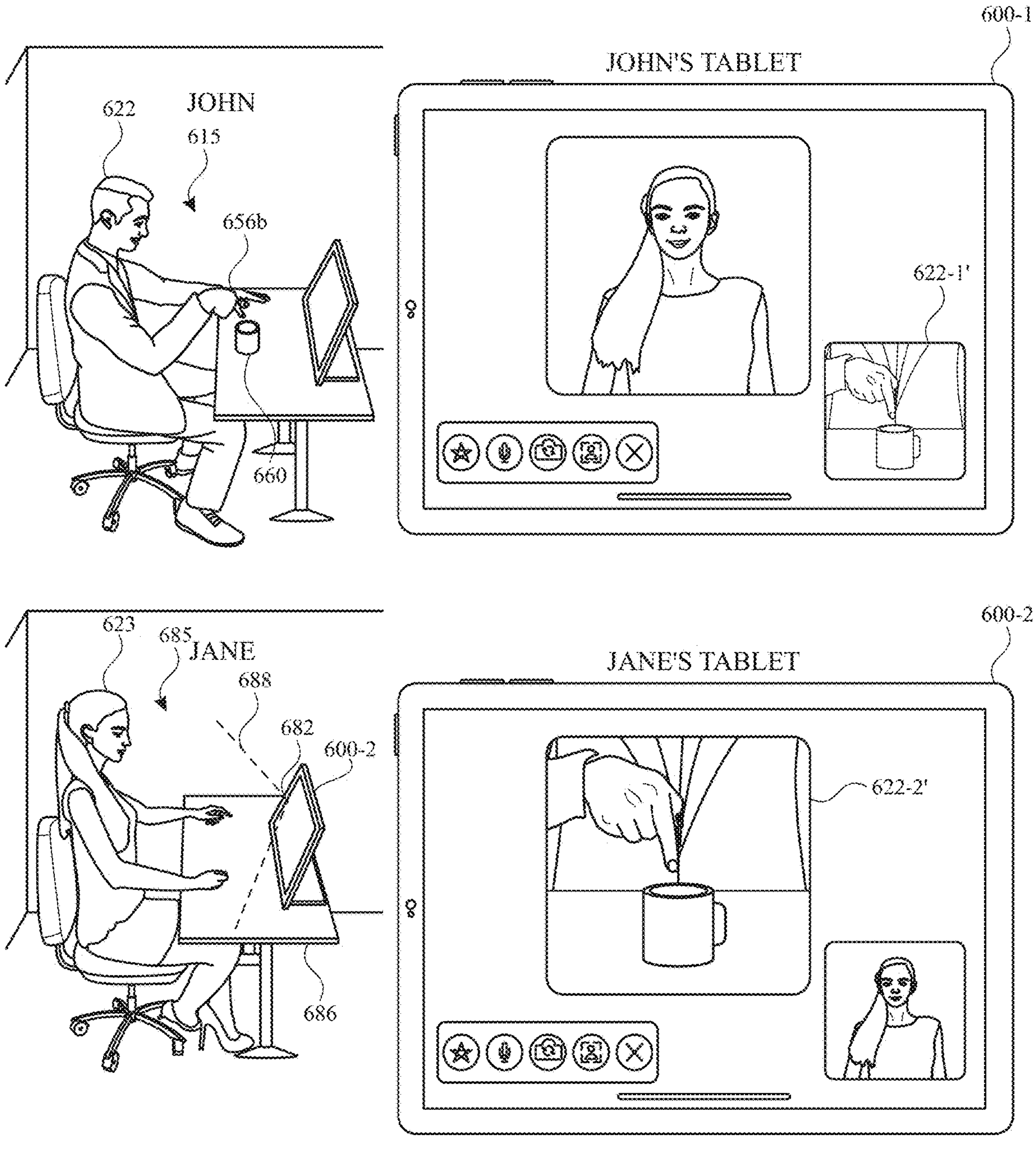

FIGS. 6U-6V illustrate an example in which a device magnifies a portion of the image of a representation in response to detecting a gesture. As shown in FIG. 6U, in some embodiments, device 600-1 detects pointing gesture 656*b* corresponding to a request to magnify at least a portion of representation 622-1. As shown, pointing gesture 656*b* is directed at object 660.

As depicted in FIG. 6V, in response to pointing gesture 656*b*, device 600-1 replaces representation 622-1 with representation 622-1' that includes a modified image by magnifying a portion of the image of representation 622-1 including object 660. In some embodiments, the magnification is based on the location of object 660 (e.g., relative to camera 602) and/or size of object 660.

Figure 6W:
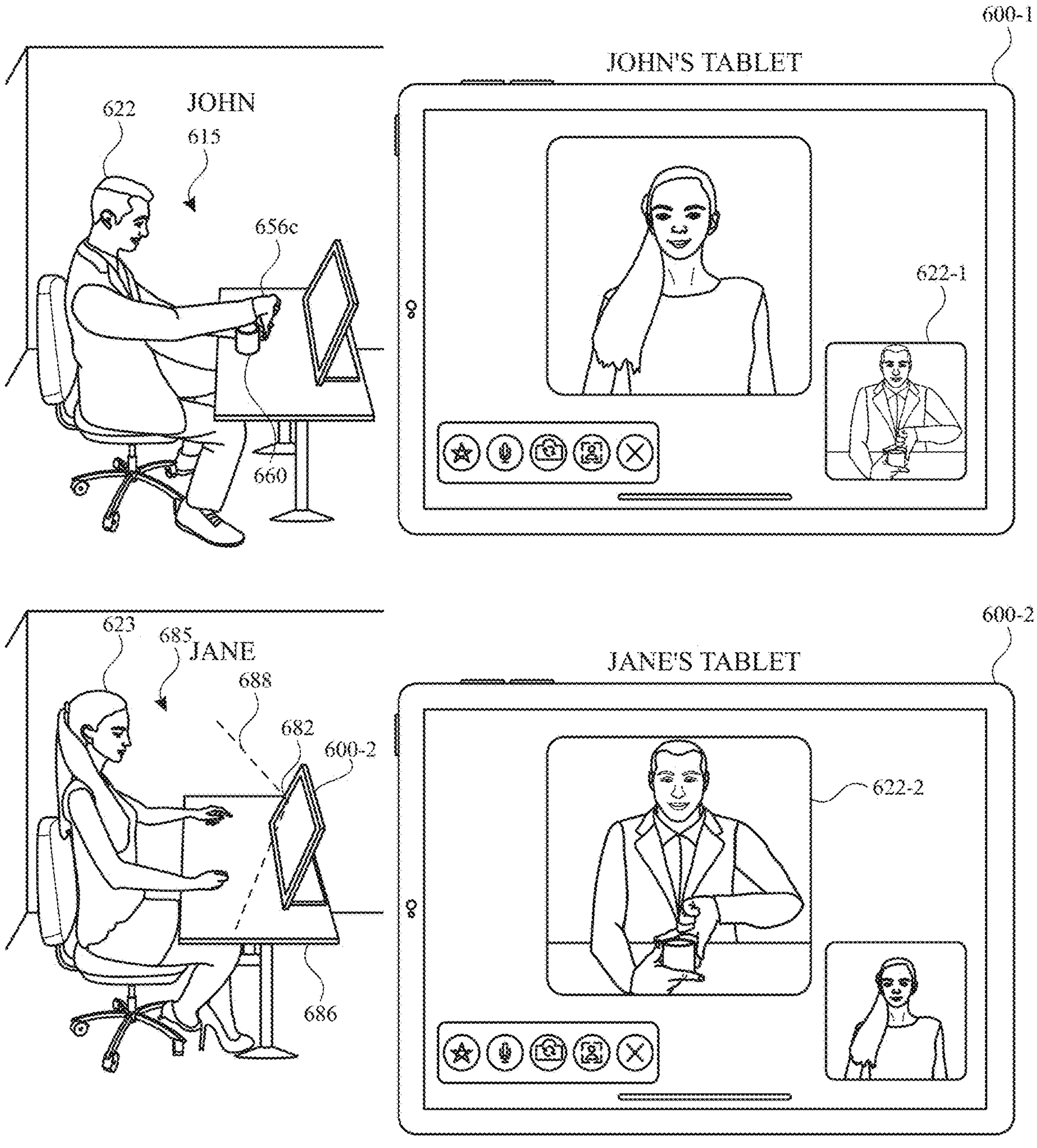
Figure 6X:
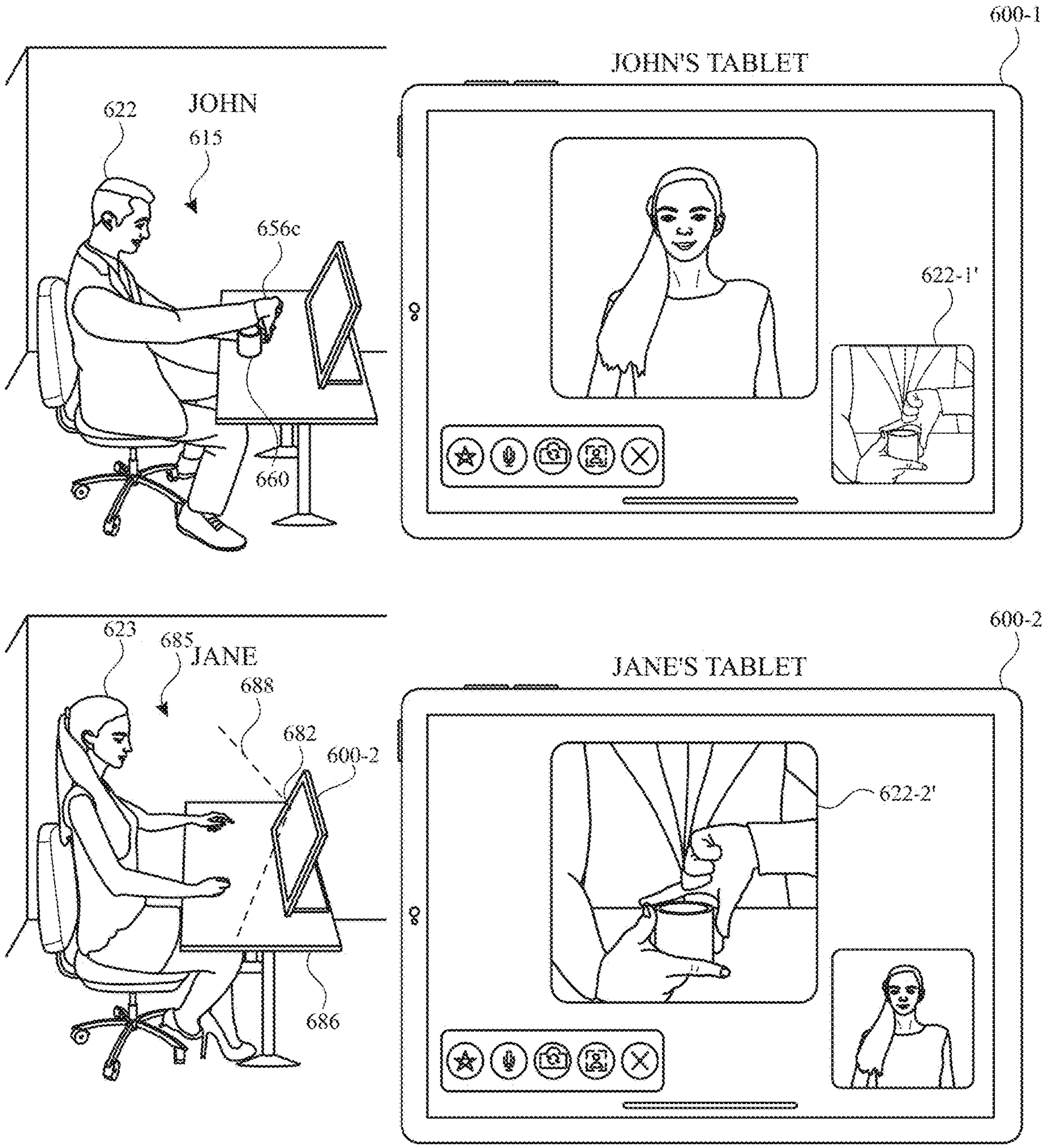

FIGS. 6W-6X illustrate an example in which a device magnifies a portion of a view of a representation in response to detecting a gesture. As shown in FIG. 6W, in some embodiments, device 600-1 detects framing gesture 656*c* corresponding to a request to magnify at least a portion of representation 622-1. As shown, framing gesture 656*c* is directed at object 660 due to framing gesture 656*c* at least partially framing, surrounding, and/or outlining object 660.

As depicted in FIG. 6X, in response to framing gesture 656*c*, device 600-1 modifies the image of representation 622-1 by magnifying a portion of the image of representation 622-1 including object 660. In some embodiments, the magnification is based on the location of object 660 (e.g., relative to camera 602) and/or size of object 660. Additionally or alternatively, after magnifying a portion of the image of representation 622-1, device 600-1 can track a movement of framing gesture 656*c*. In response, device 600-1 can pan to a different portion of the image.

Figure 6Y:
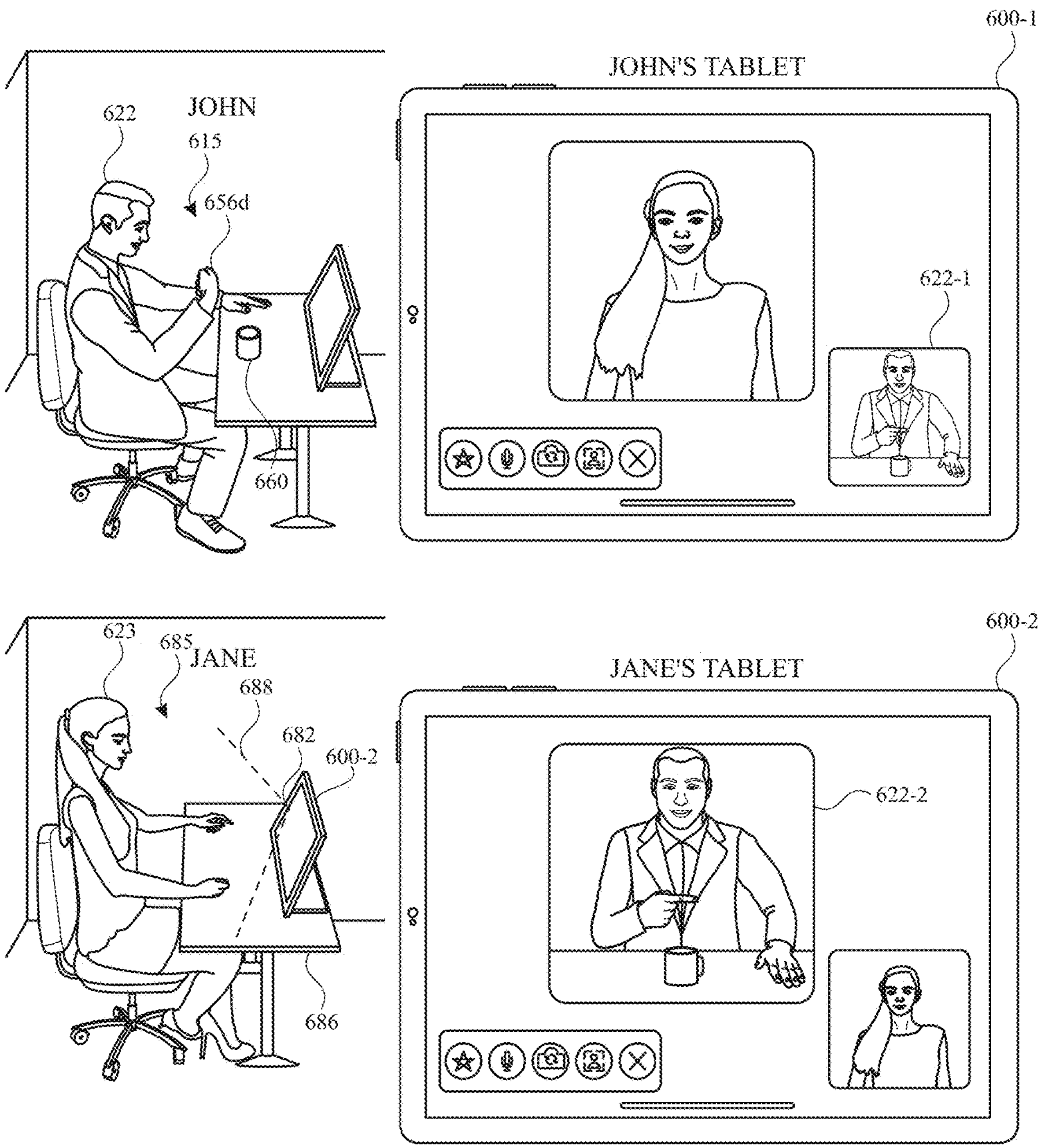
Figure 6Z:
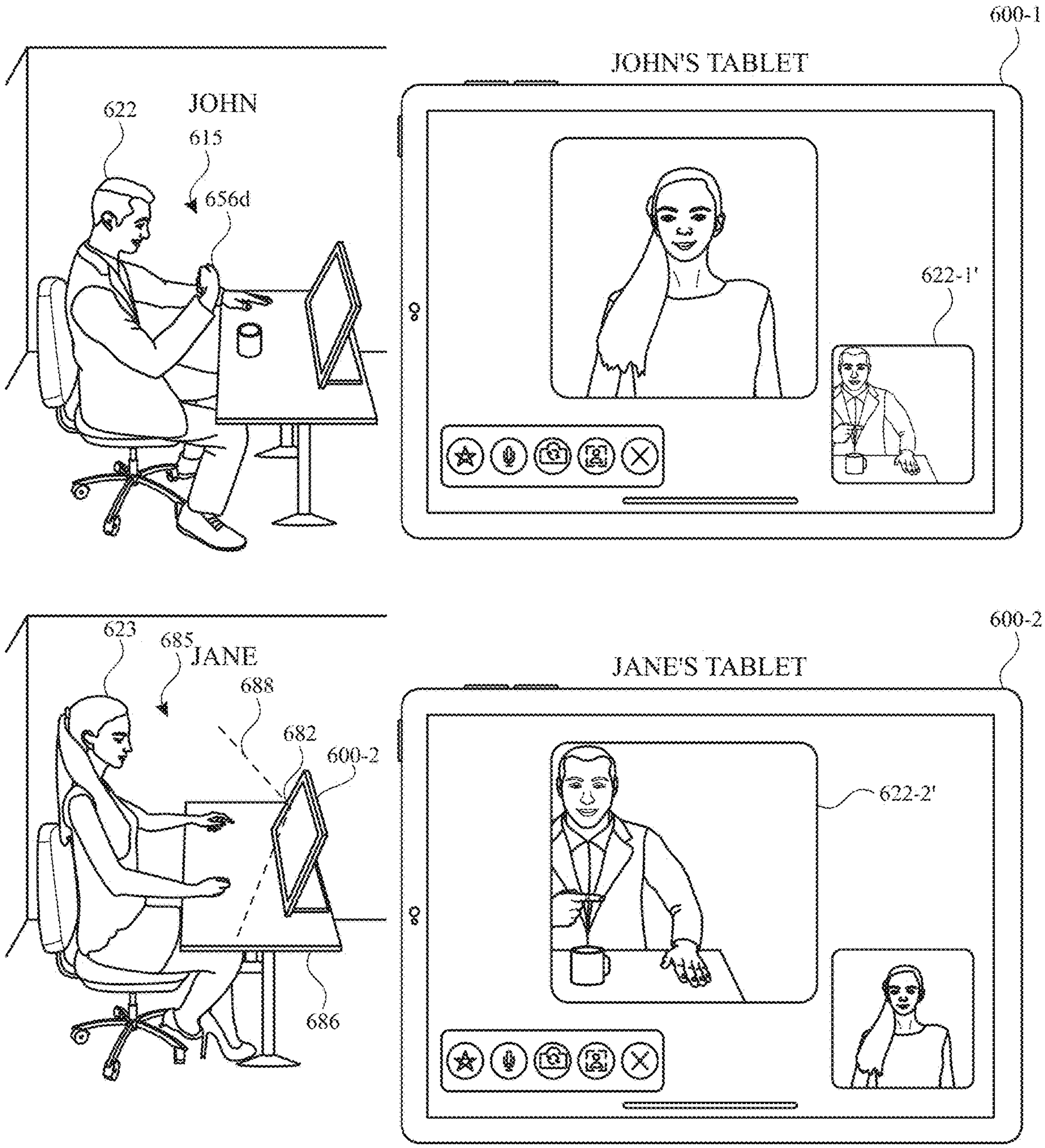
Figure 6A:
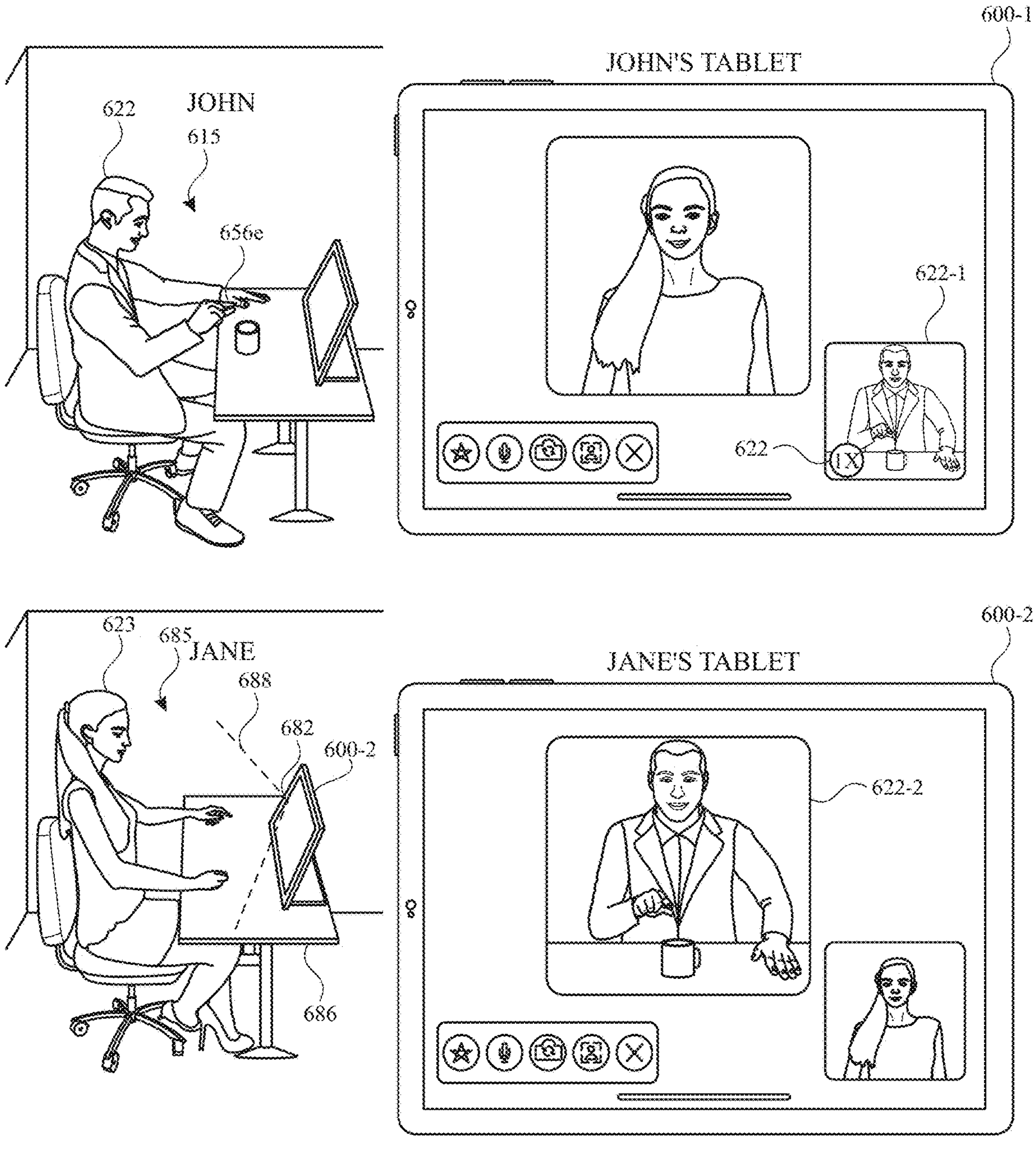
Figure 6A:
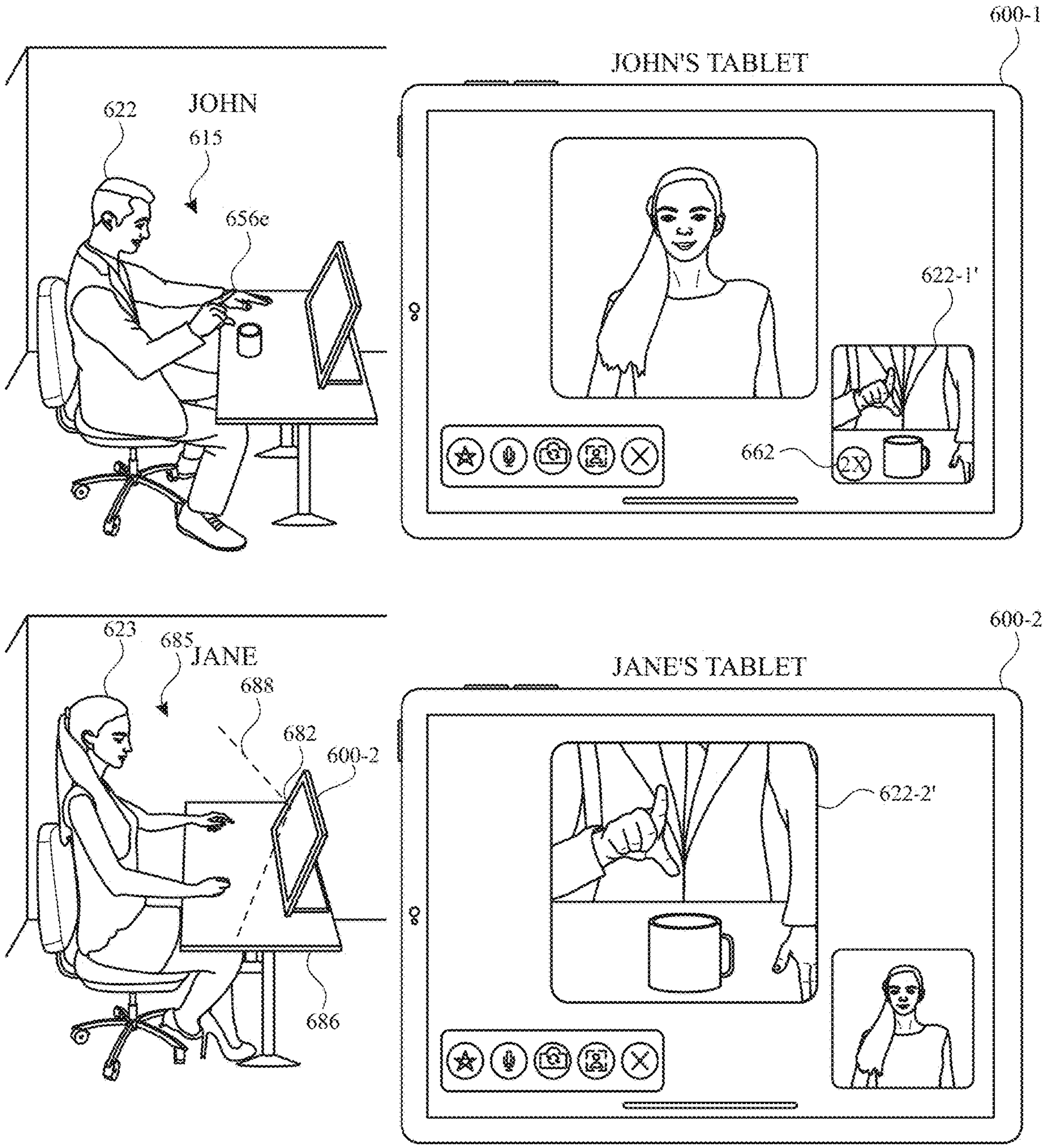
Figure 6A:
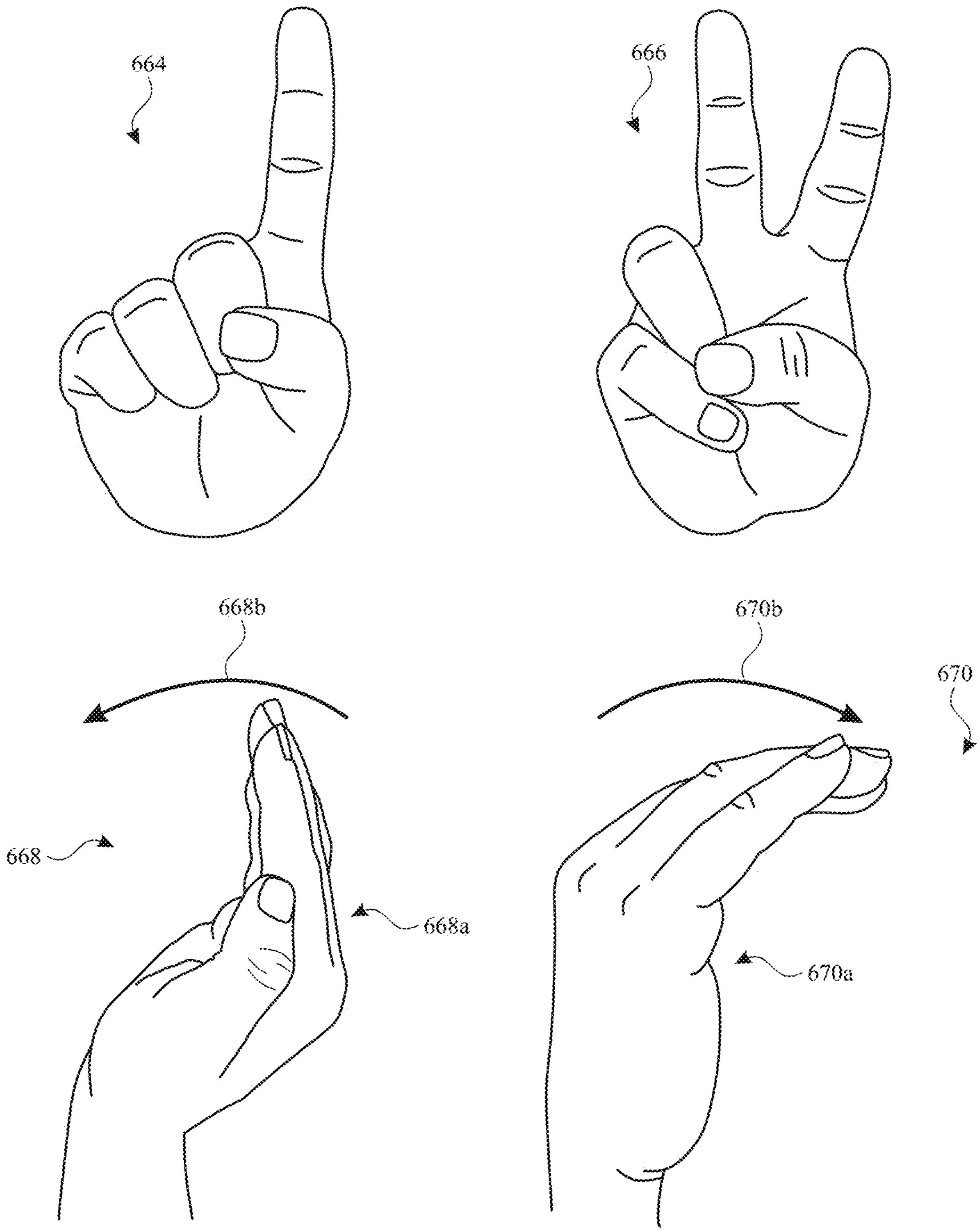
Figure 6A:
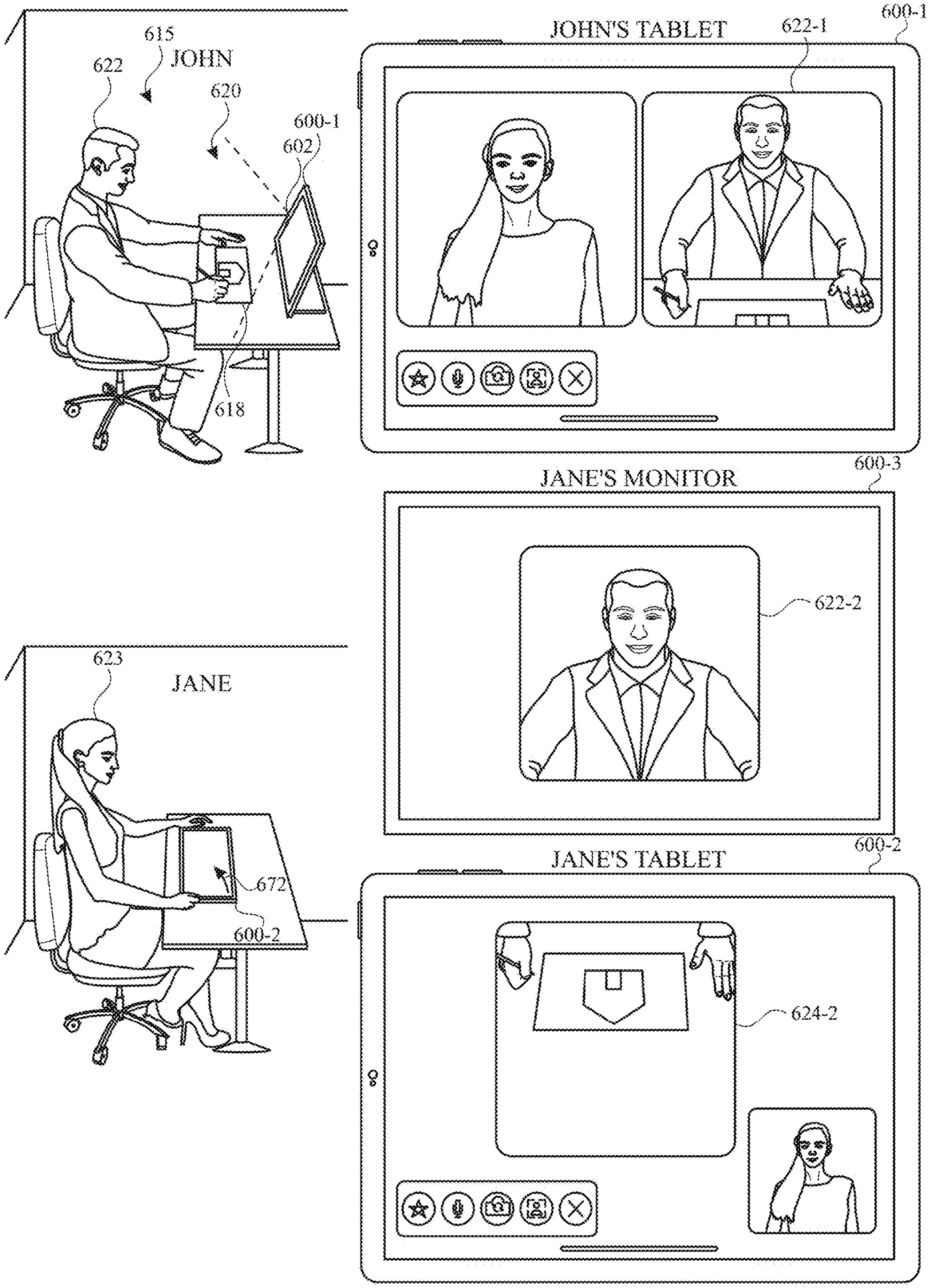
Figure 6A:
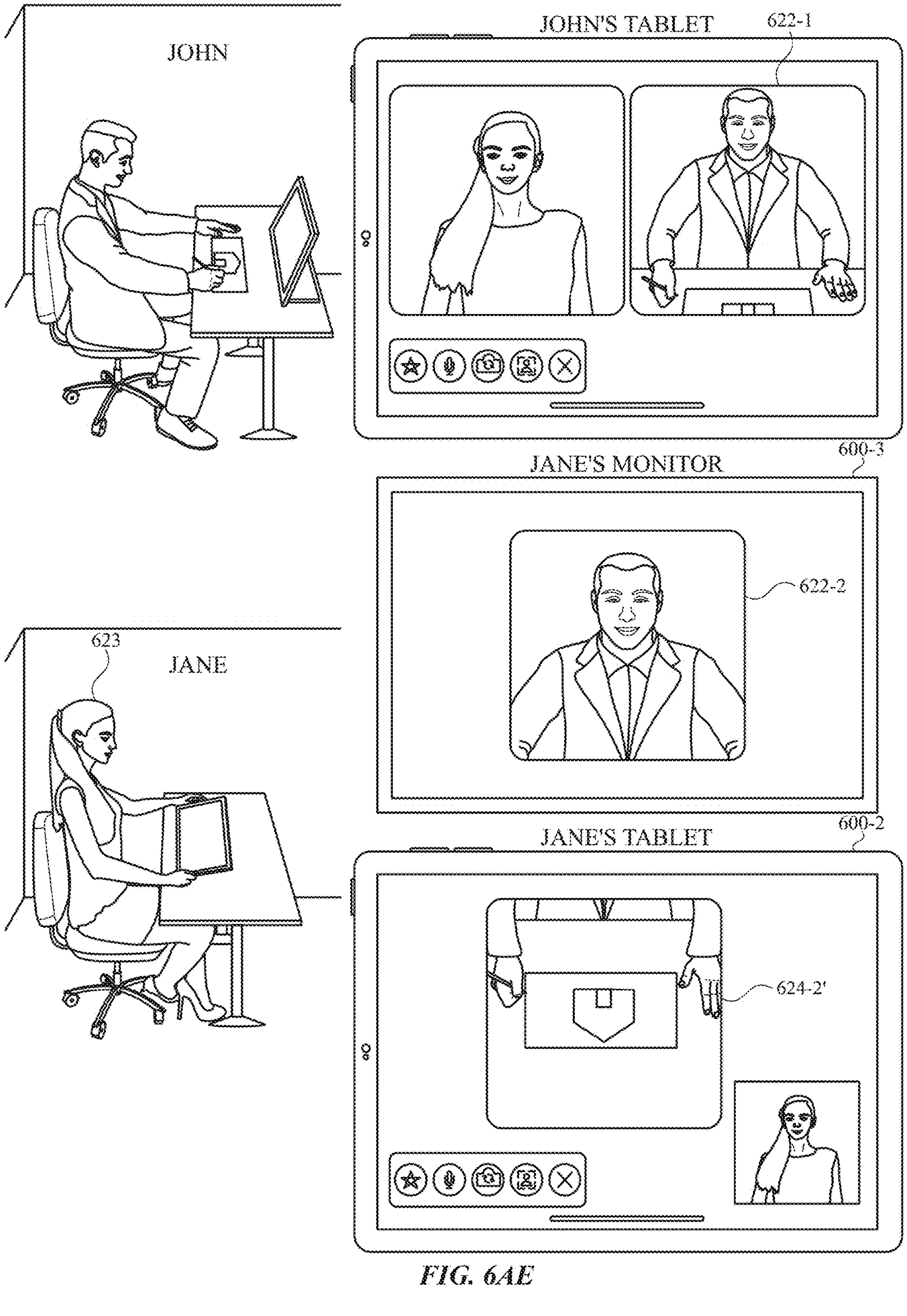
Figure 6A:
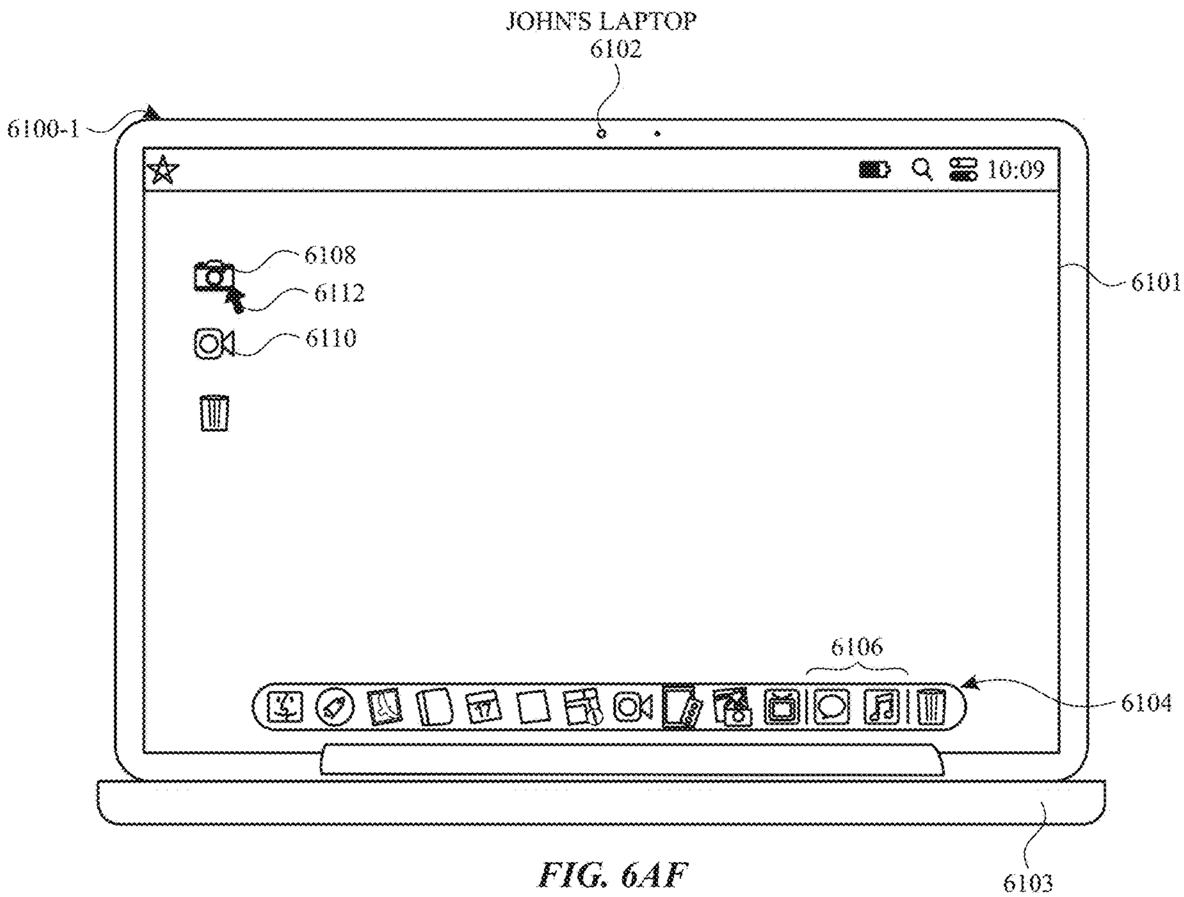
Figure 6A:
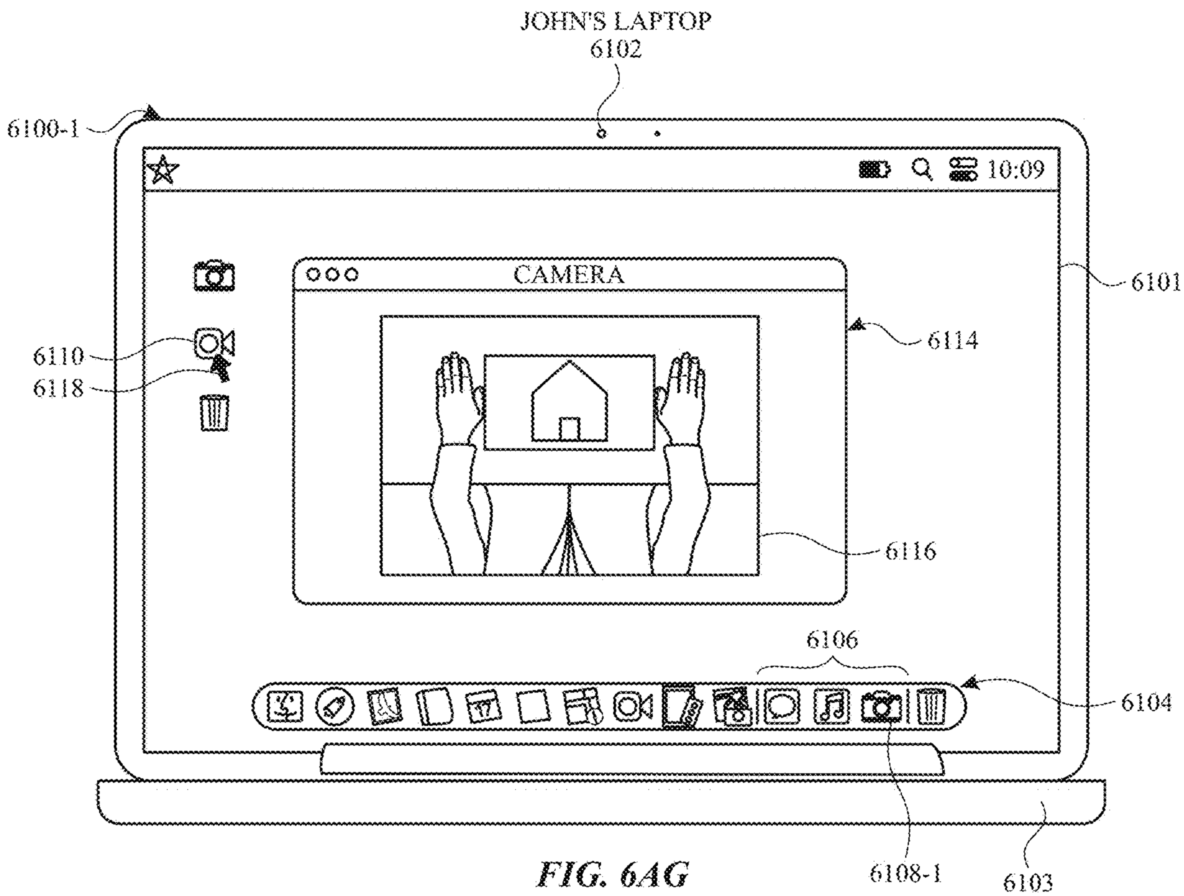
Figure 6A:
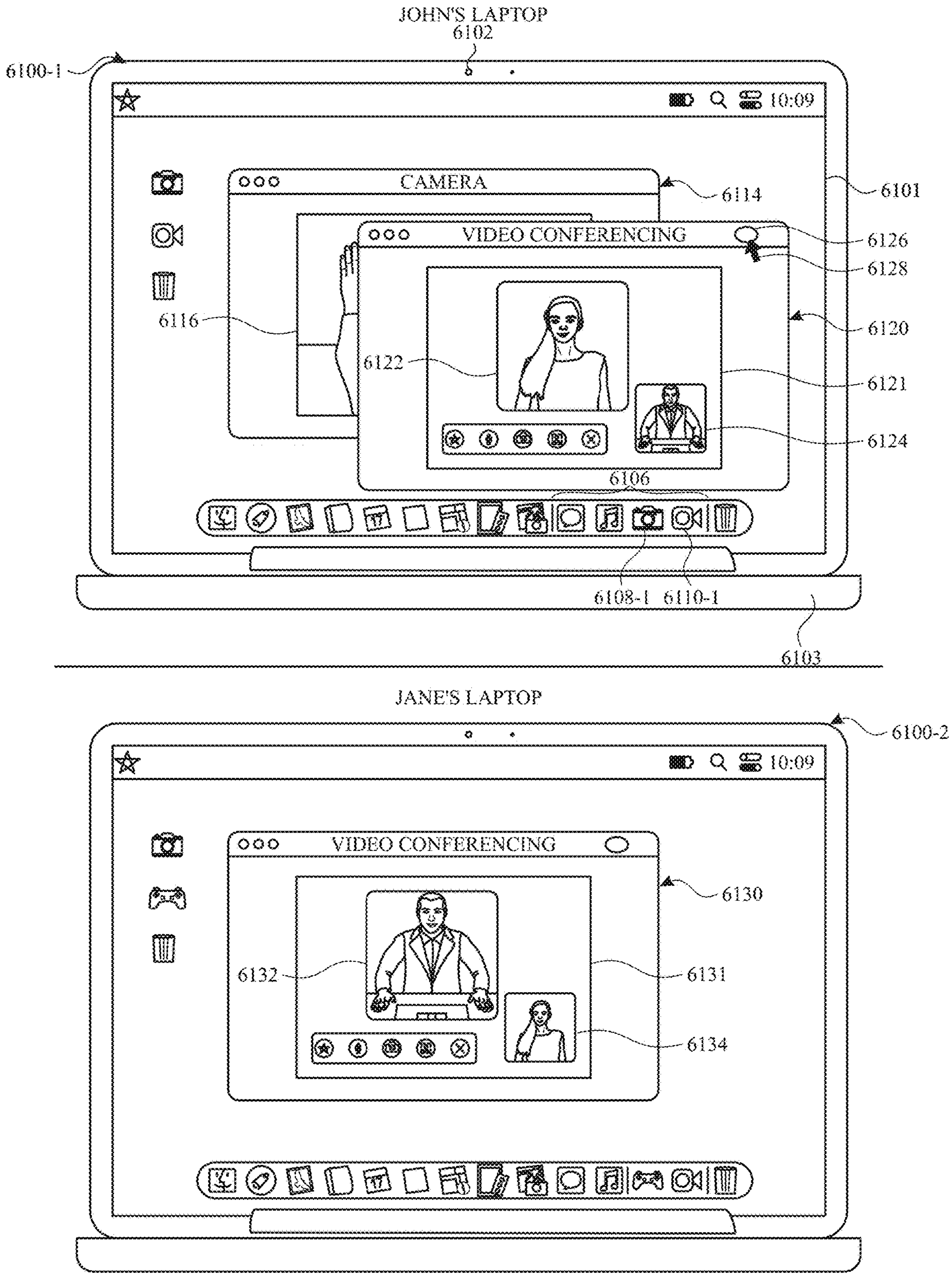
Figure 6A:
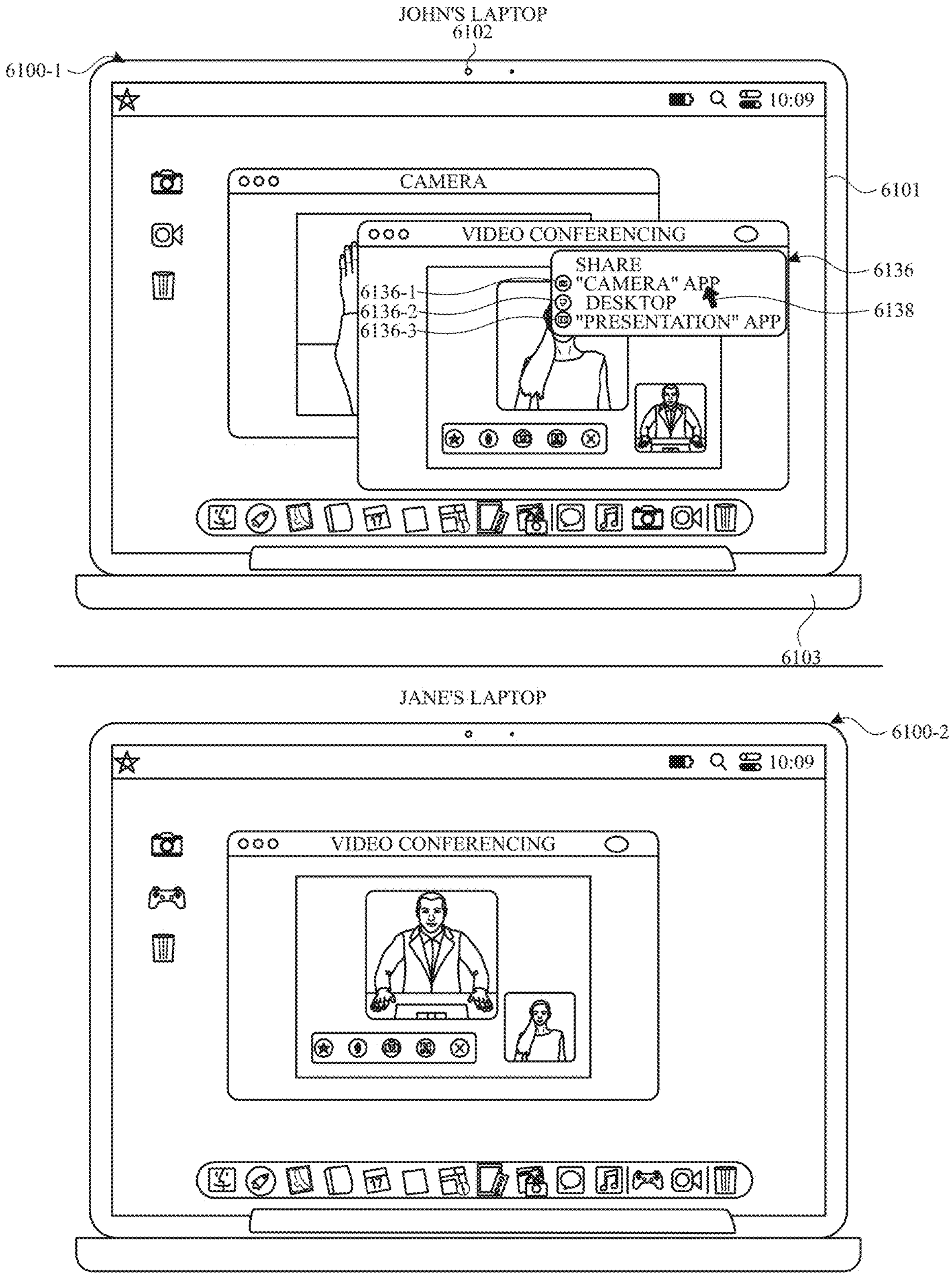
Figure 6A:
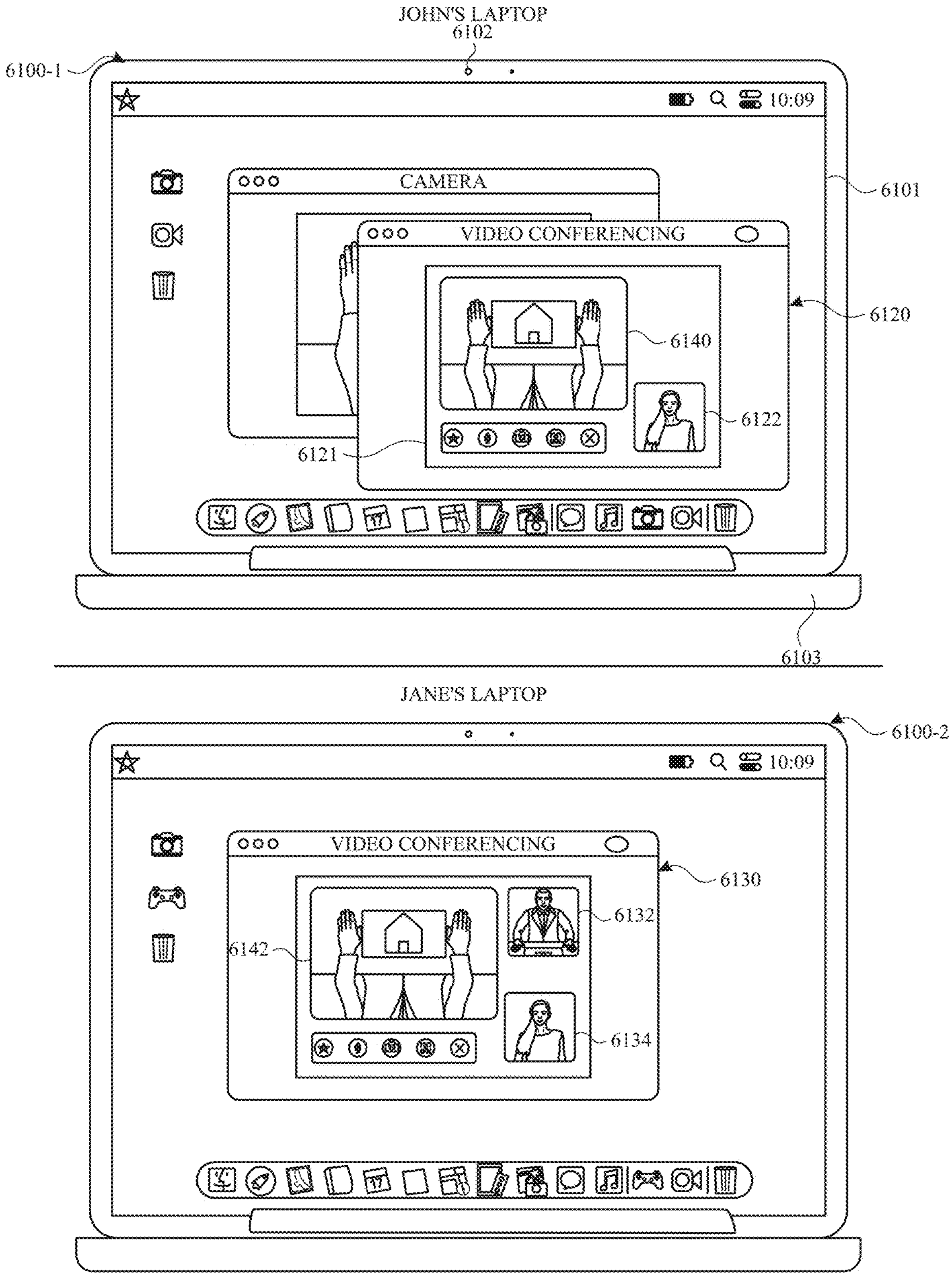
Figure 6A:
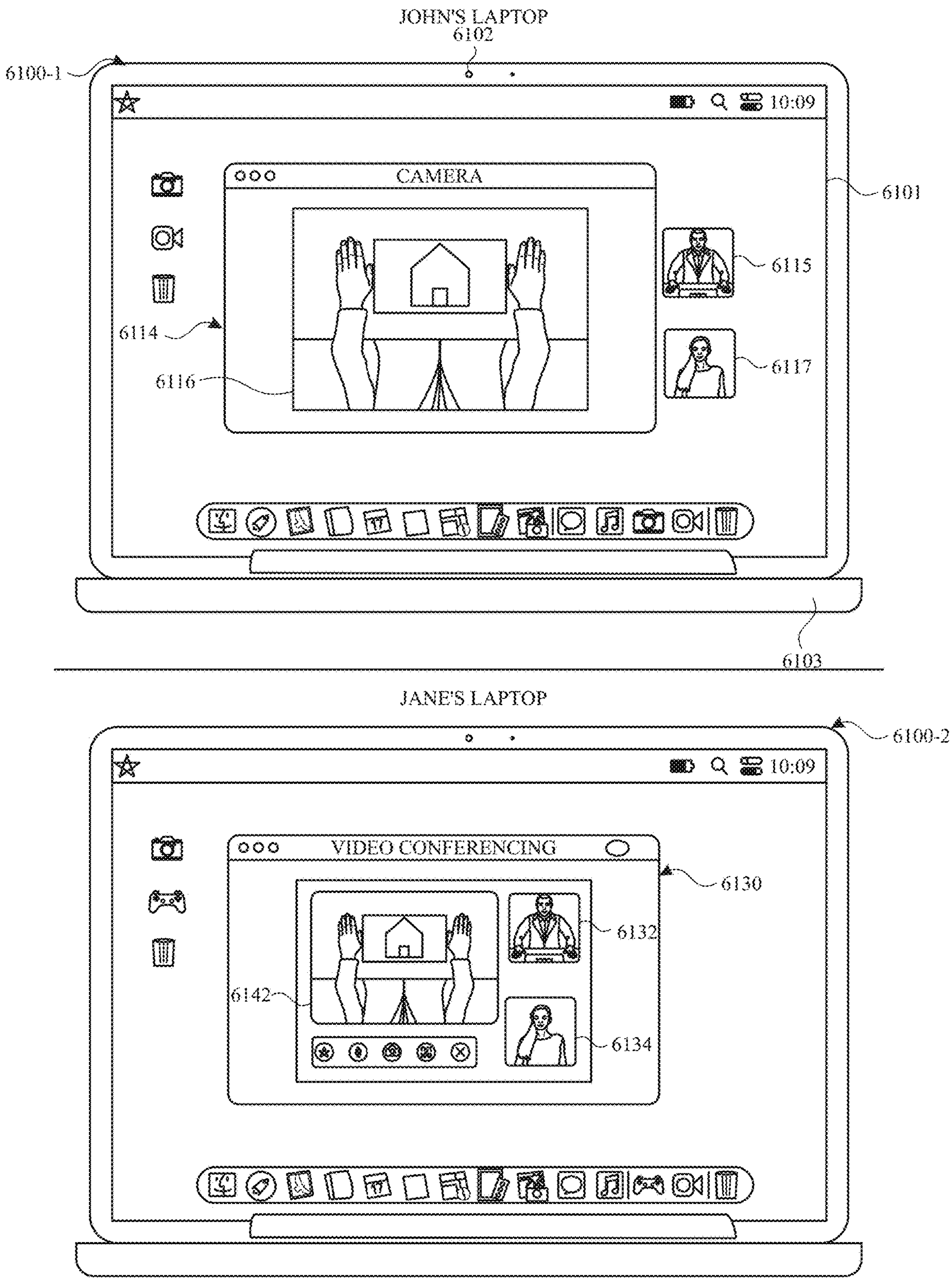
Figure 6A:
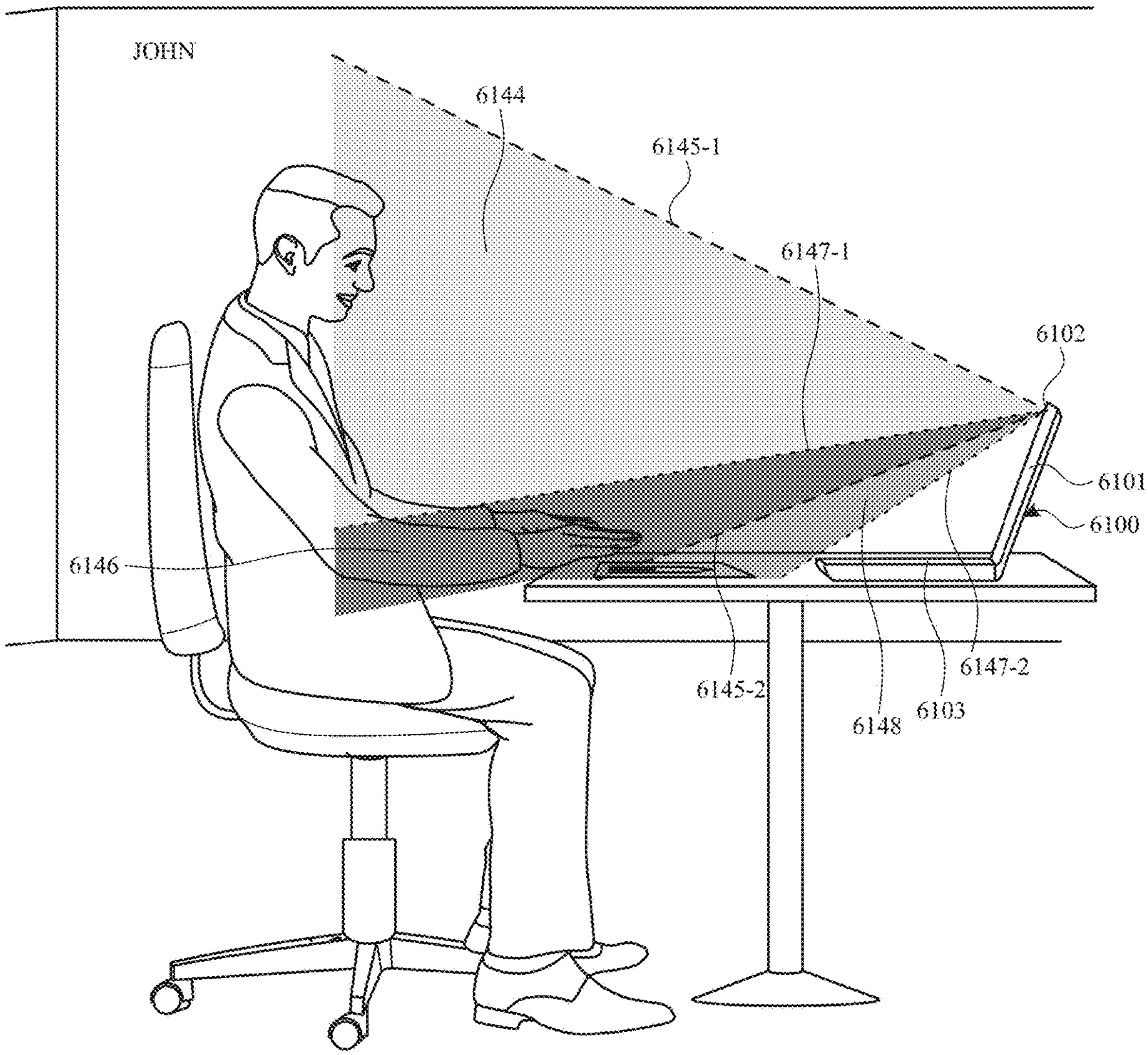
Figure 6A:
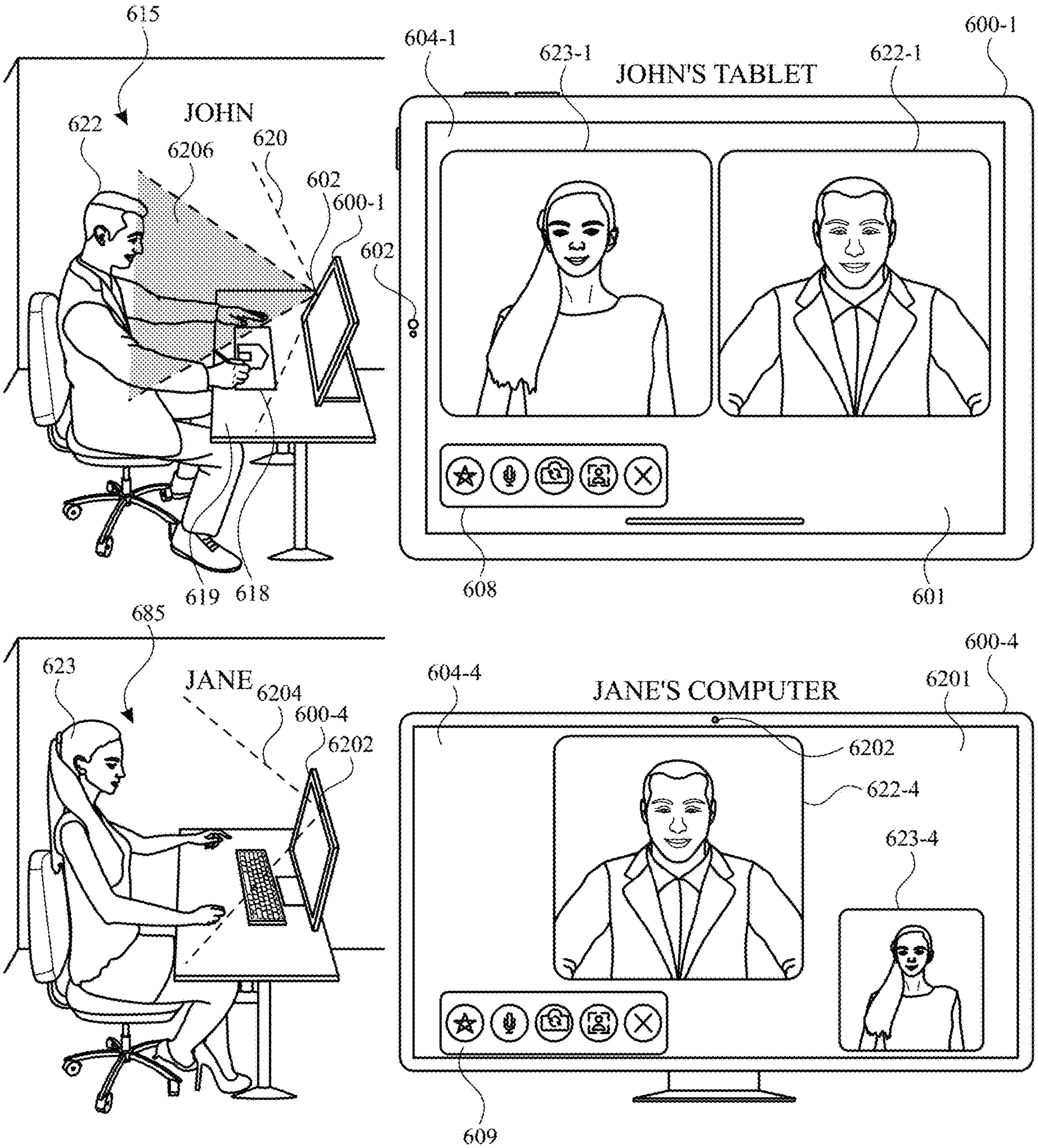
Figure 6A:
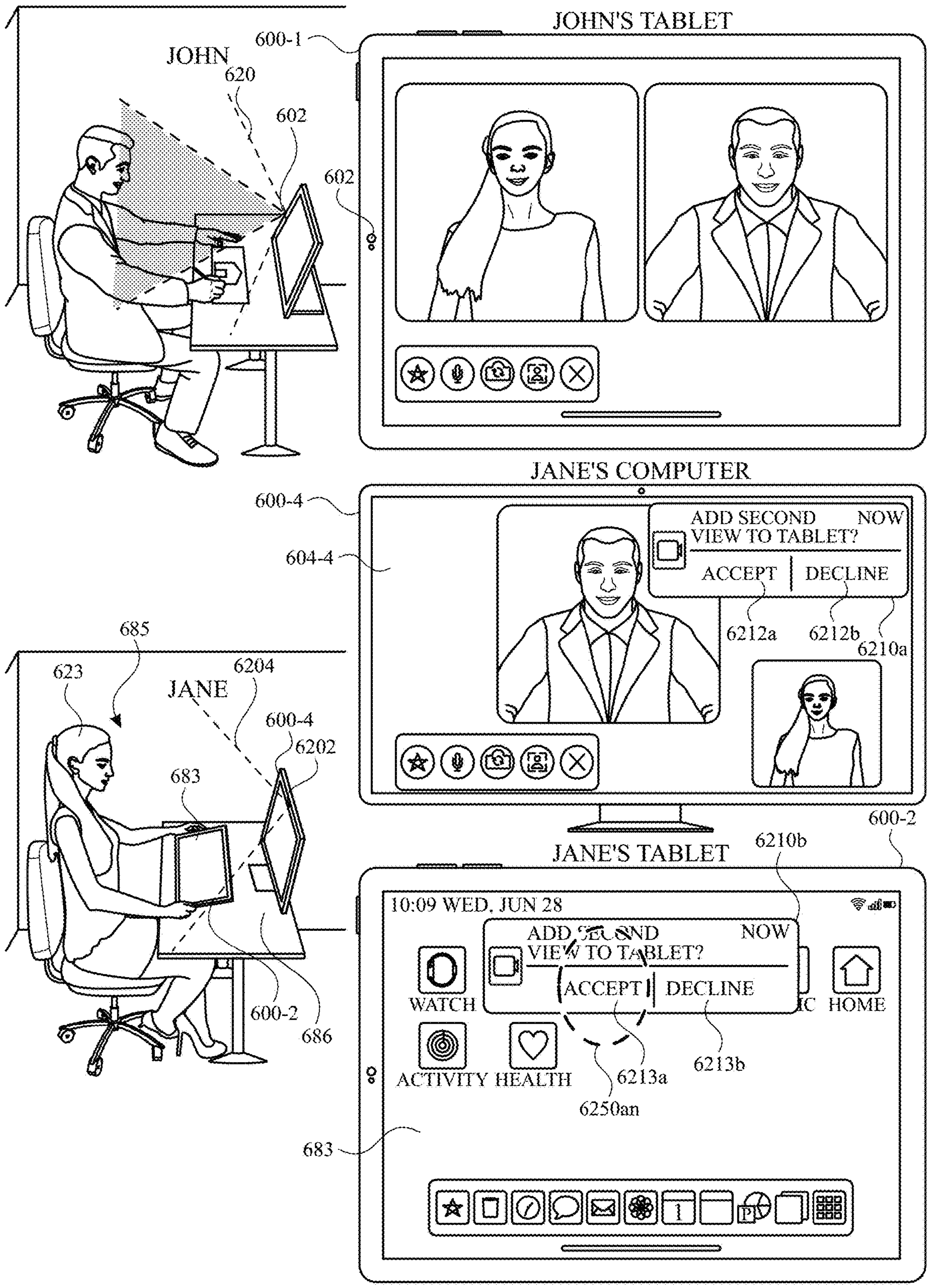
Figure 6A:
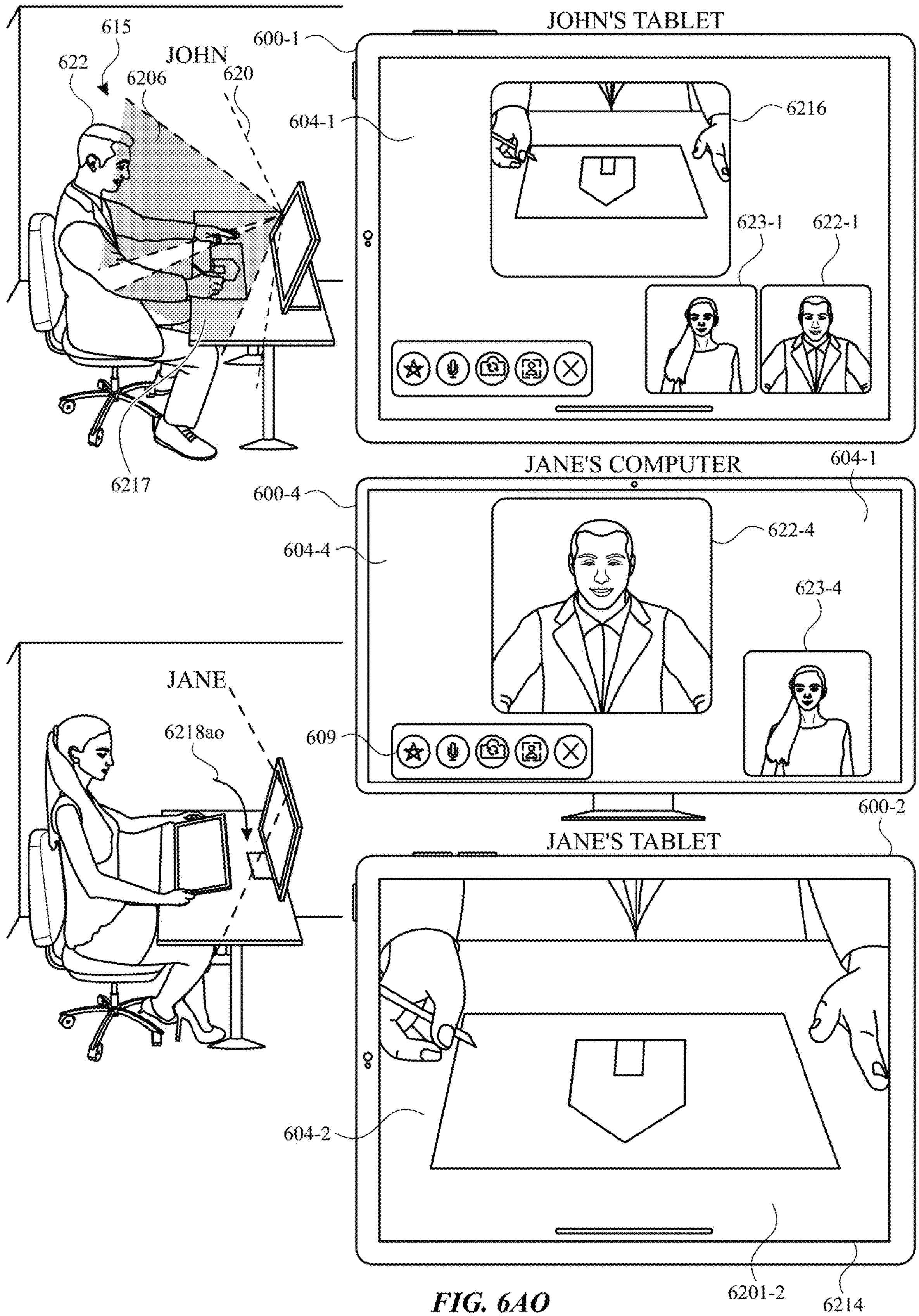
Figure 6A:
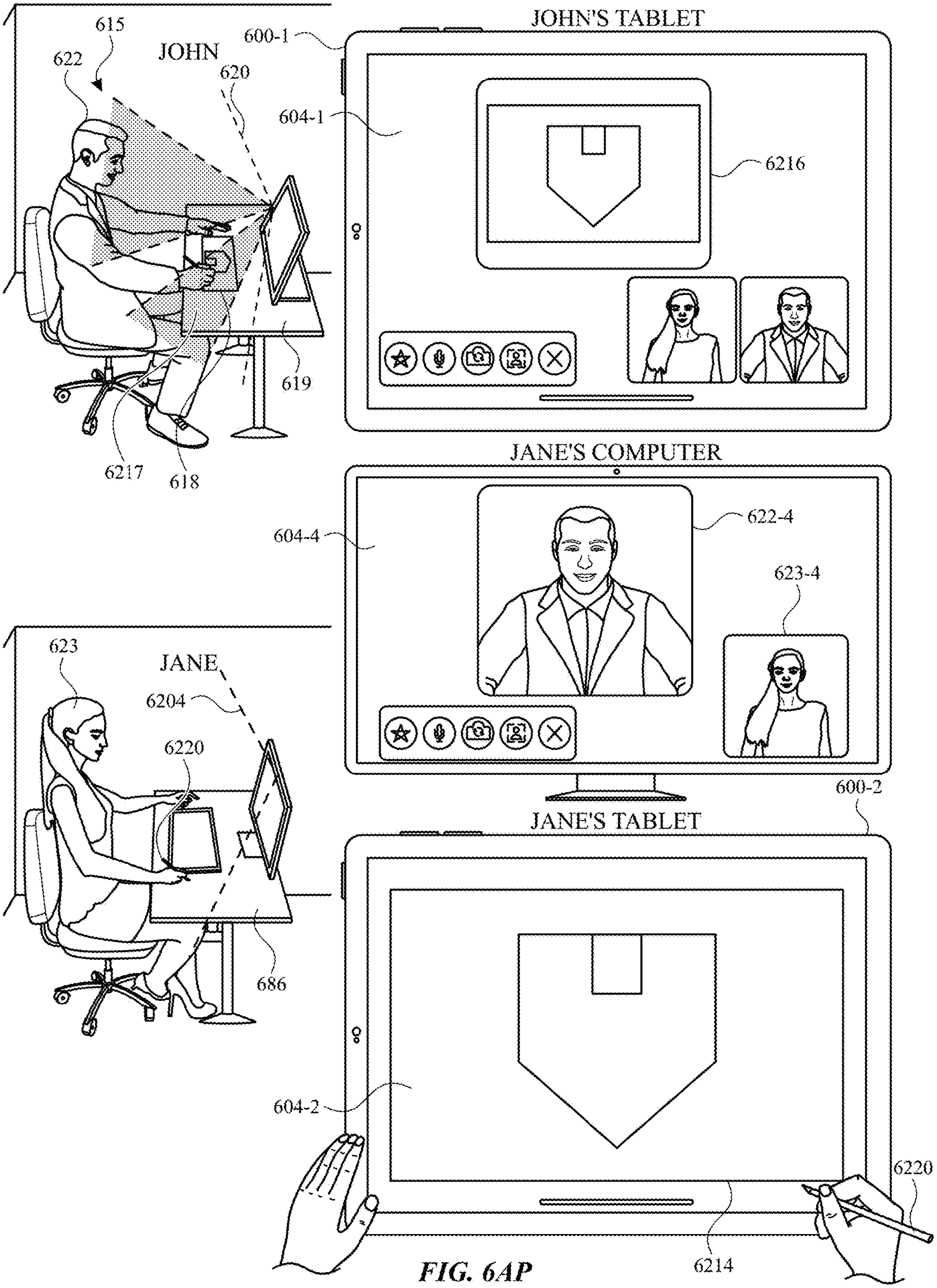
Figure 6A:
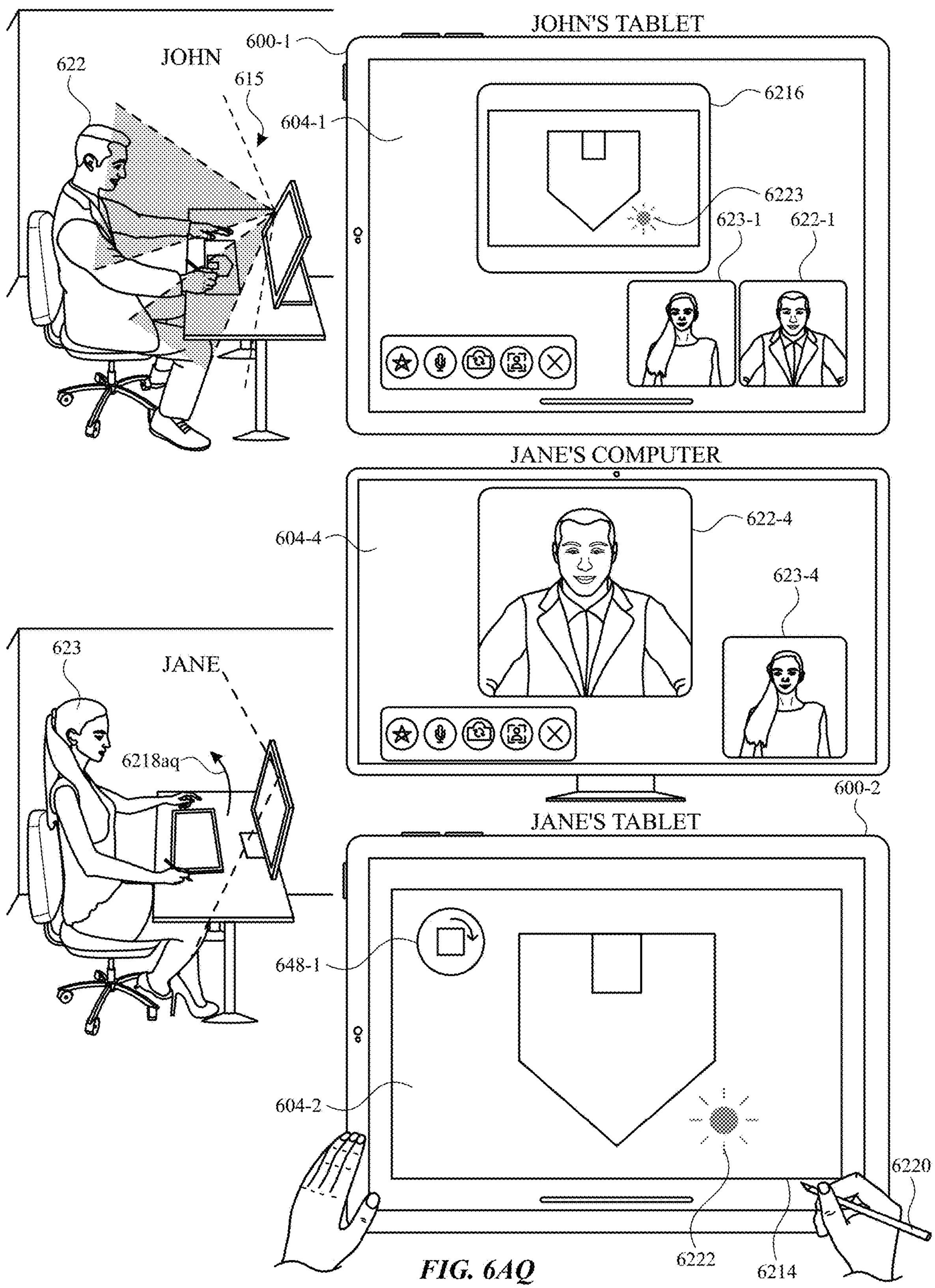
Figure 6A:
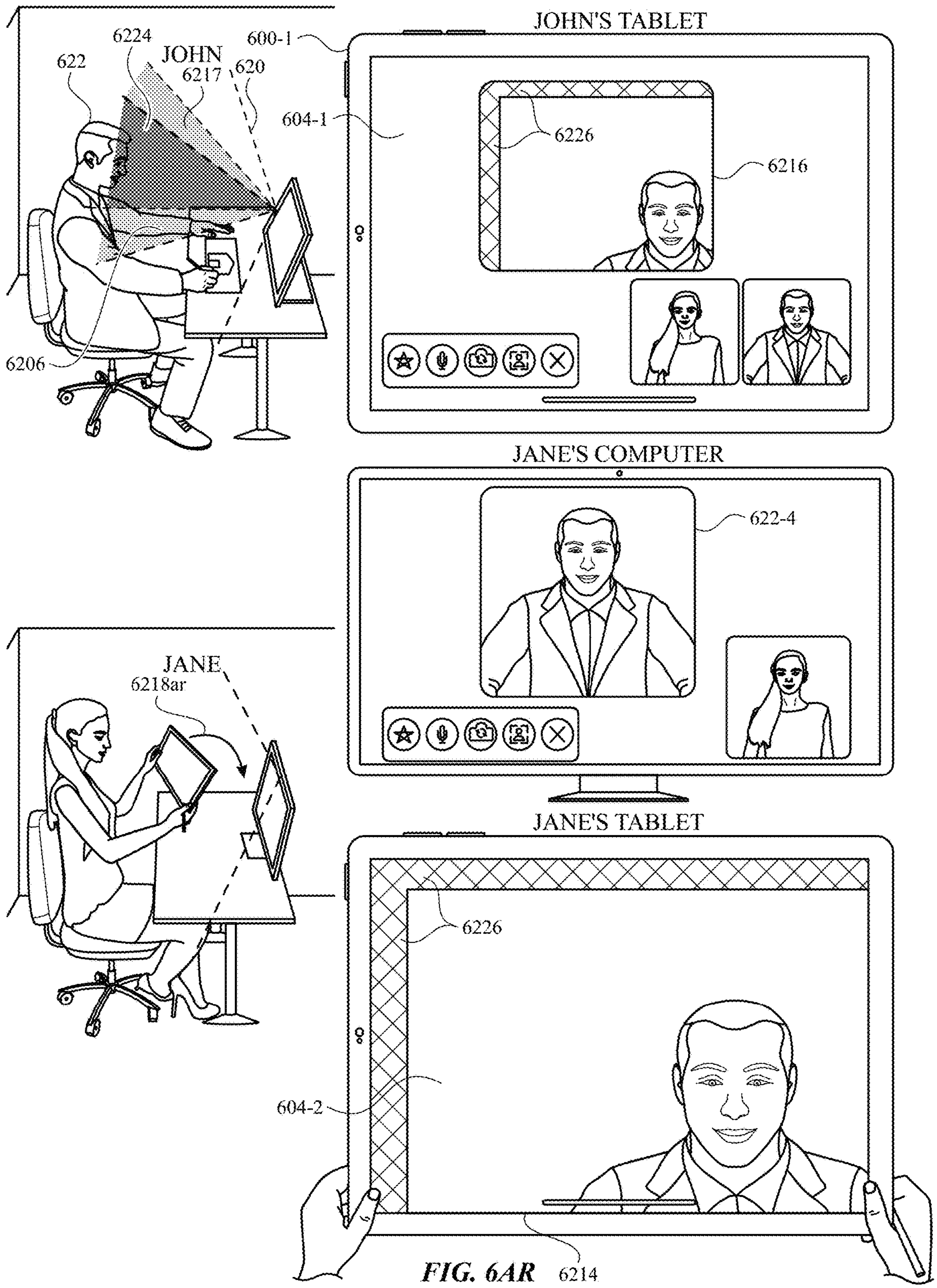
Figure 6A:
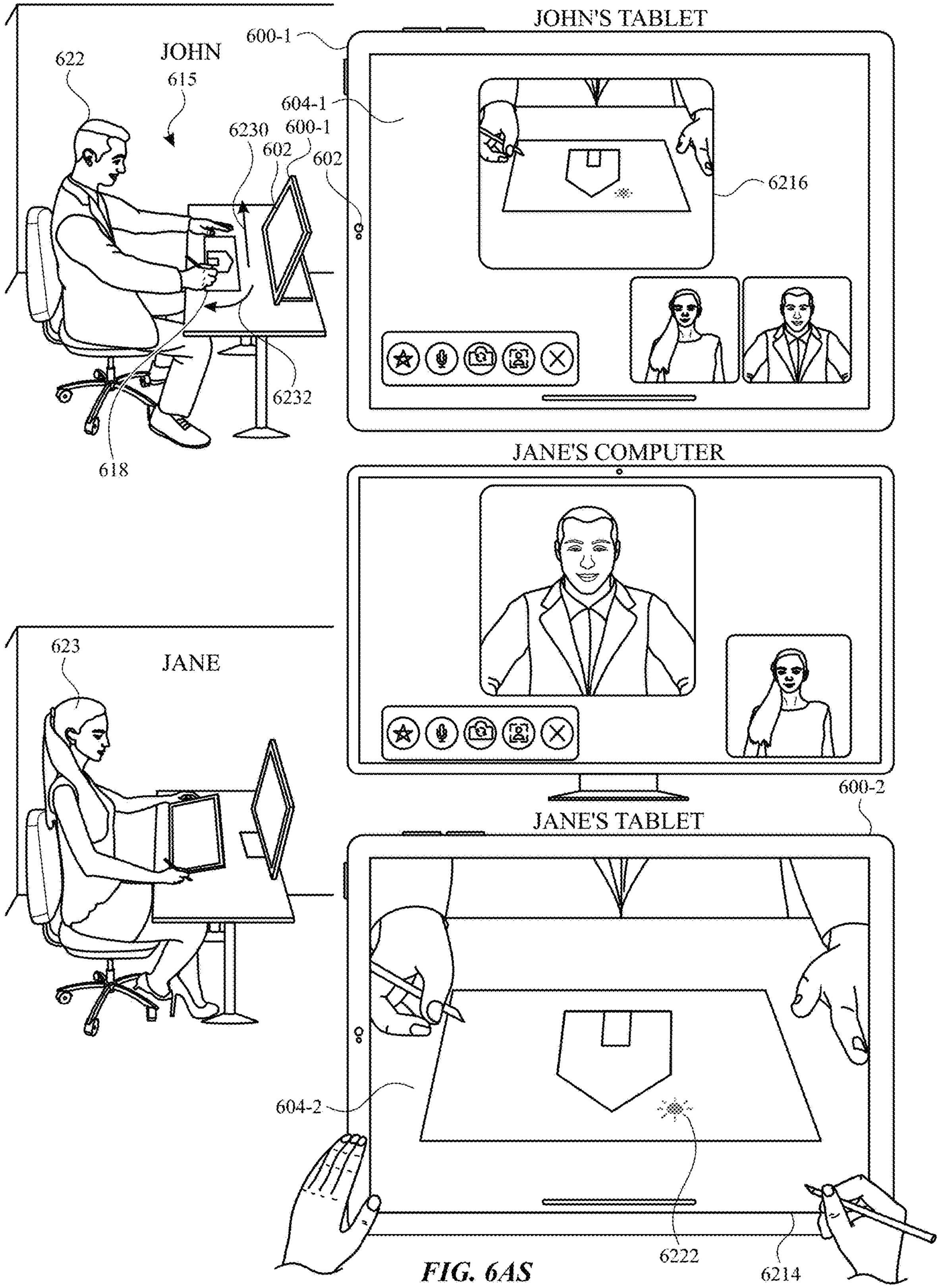
Figure 6A:
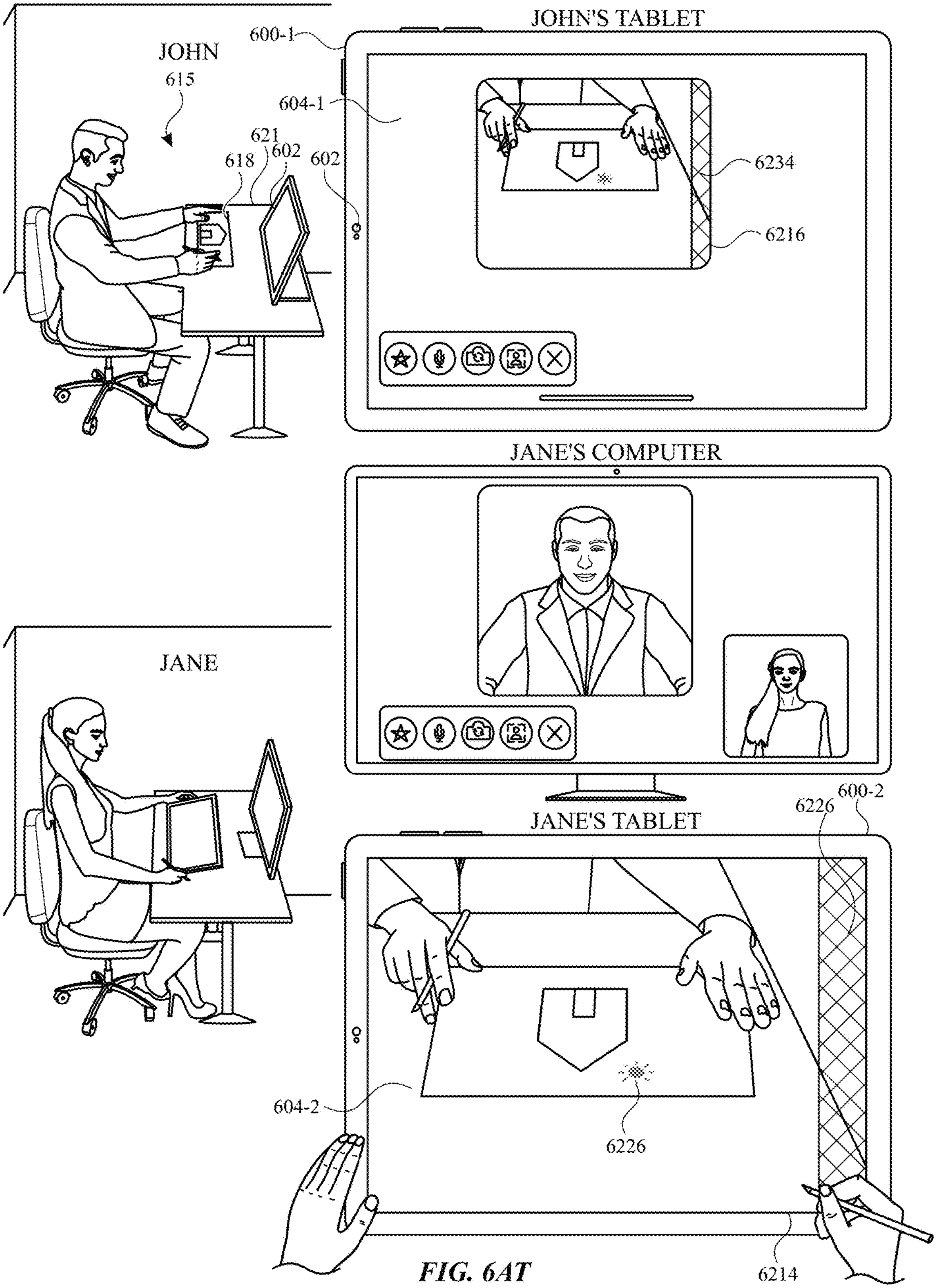
Figure 6A:
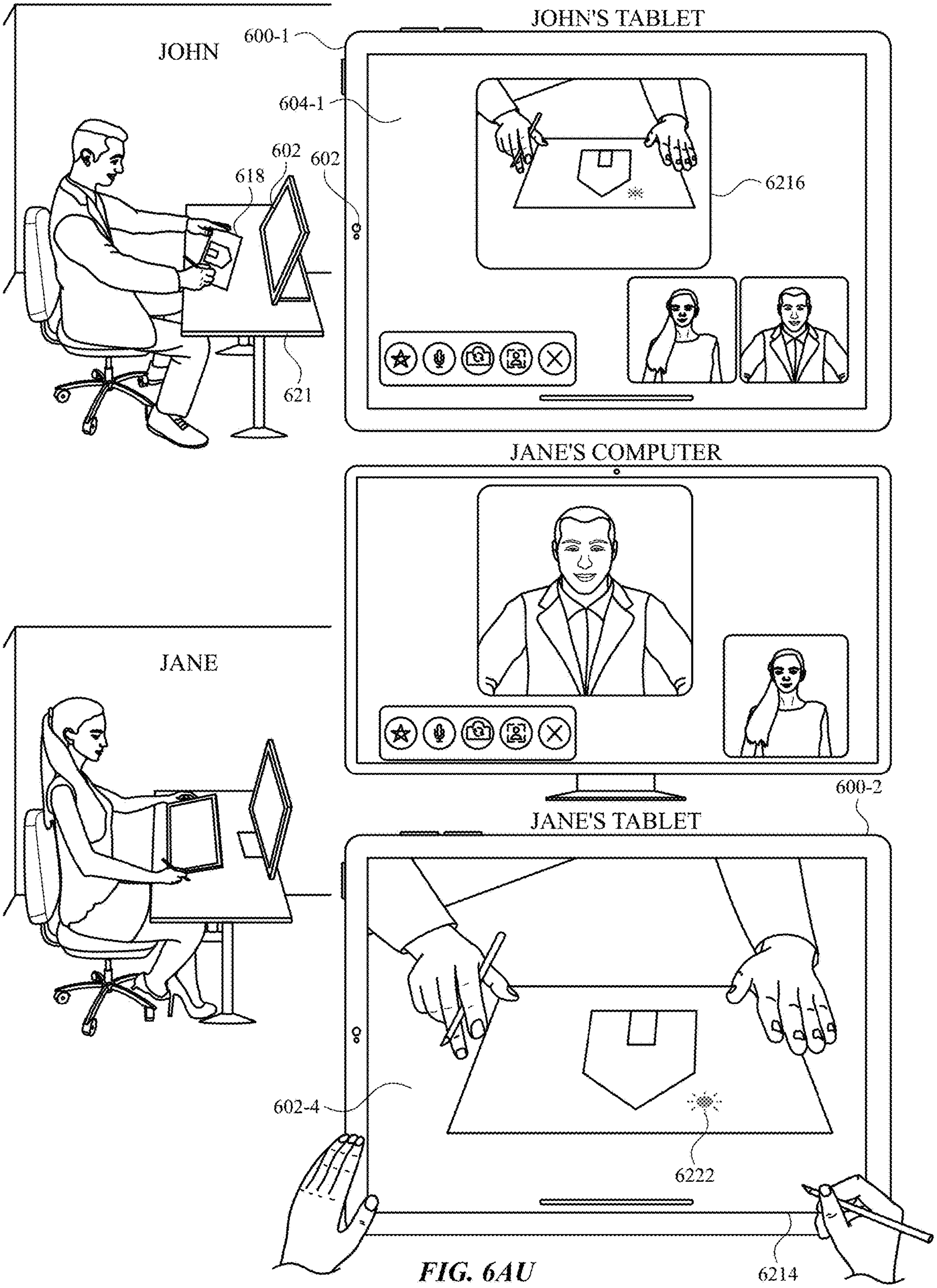
Figure 6A:
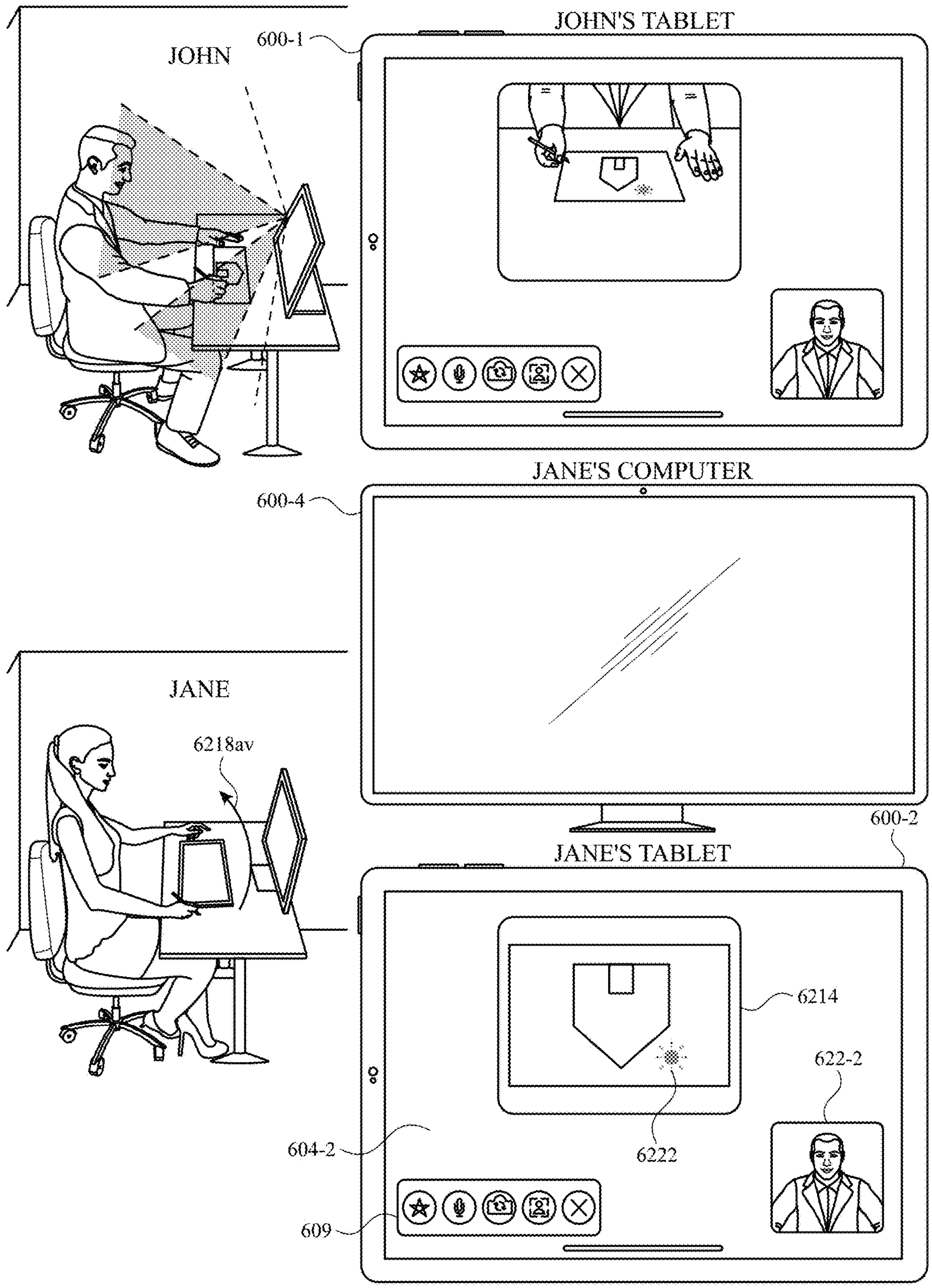
Figure 6A:
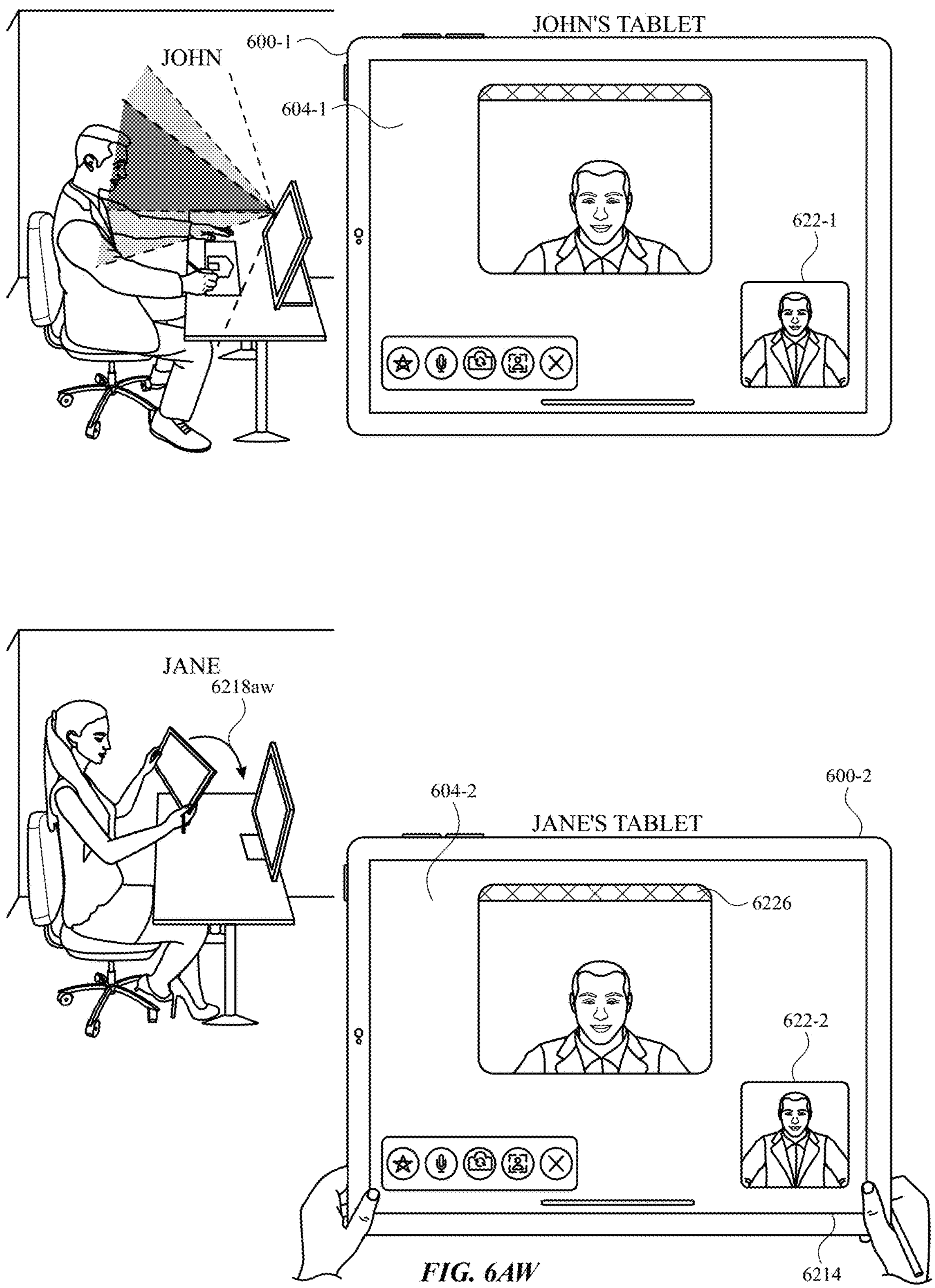
Figure 6A:
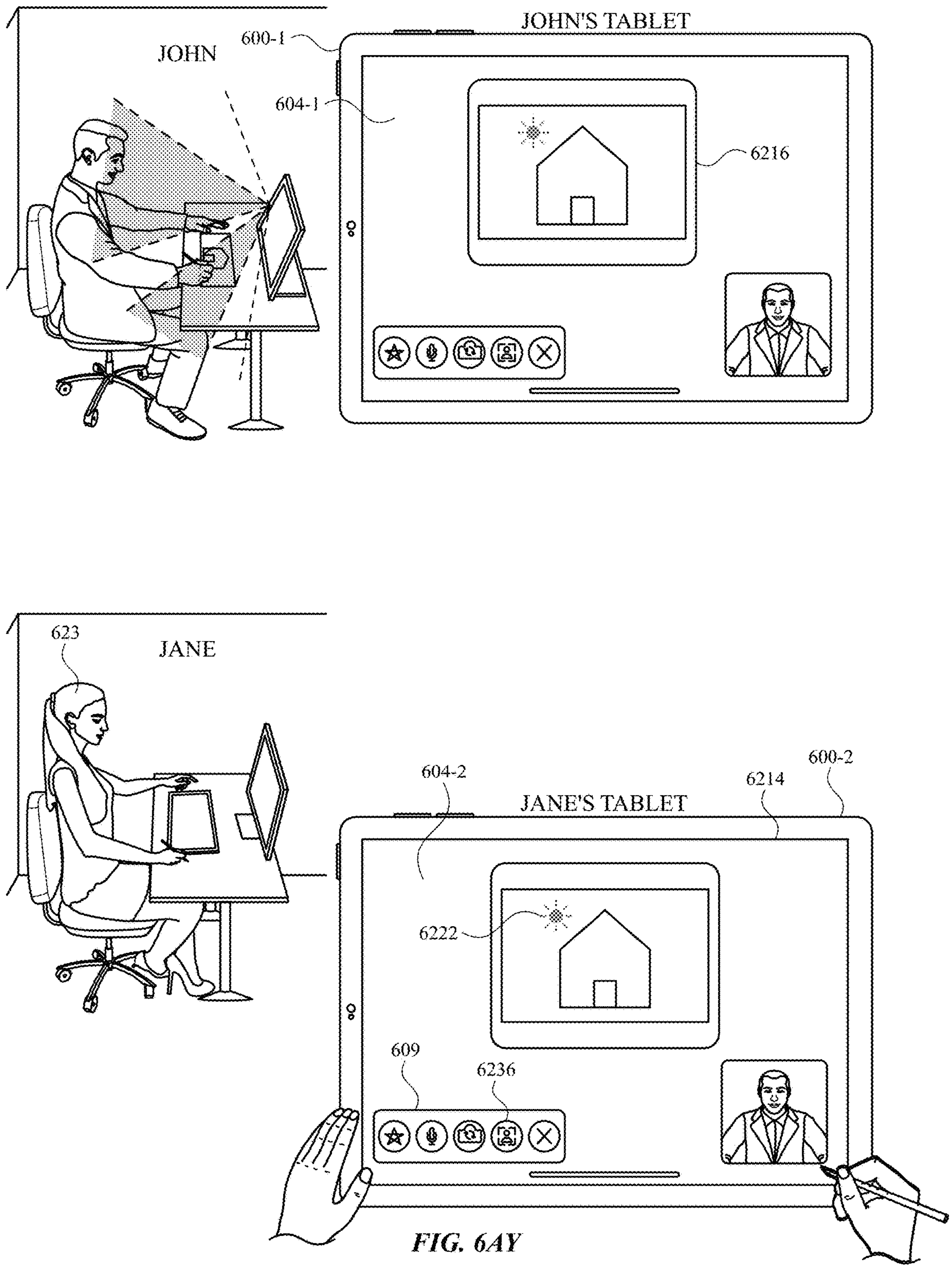

FIGS. 6Y-6Z illustrate an example in which a device pans an image of a representation in response to detecting a gesture. As shown in FIG. 6Y, device 600-1 detects pointing gesture 656*d* corresponding to a request to pan (e.g., horizontally pan) a view of the image of representation 622-1 in a particular direction. As shown, pointing gesture 656*d* is directed to the left of user 622.

As shown in FIG. 6Z, in response to pointing gesture 656*d*, device 600-1 replaces representation 622-1 with representation 622-1' that includes a modified image that is based on panning the image of representation 622-1 in a direction of pointing gesture 656*d* (e.g., to the left of user 622).

While in some embodiments, as shown in FIG. 6Z, a portion of user 622 (e.g., the right shoulder of user 622) can be excluded from the image of representation 622-1' due to a panning operation, in some embodiments, device 600-1 can adjust a zoom level of the image of representation 622-1' when panning so as to ensure user 622 remains fully in the image.

FIGS. 6AA-6AB illustrate an example in which a device modifies a zoom level of a representation in response to detecting a pinch and/or spread gesture. As shown in FIG. 6AA, in some embodiments, device 600-1 detects spread gesture 656*e* in which user 622 increases the distance between the thumb and index finger of the right hand of user 622.

As depicted in FIG. 6AB, in response to spread gesture 656*e*, device 600-1 replaces representations 622-1 with 622-1' by magnifying a portion of the image of representation 622-1. In some embodiments, the magnification is based on a location of spread gesture 656*e* (e.g., relative to camera 602) and/or a magnitude of spread gesture 656*e*. In some embodiments, the portion of the image is magnified according to a predetermined zoom level.

With reference to FIG. 6AA, in some embodiments, in response to detecting spread gesture 656*e*, device 600-1 displays zoom indicator 662 indicating a zoom level of the image of representation 622-1'. Once user 622 has completed the spread gesture 656*e* and device 600-1 has magnified the portion of representation 622-1', device 600-1 updates display of zoom indicator 662 to indicate the current zoom level of the image of representation 622-1'. In some embodiments, zoom indicator 662 is updated dynamically as user 622 performs gesture 656*e*.

While description is made herein with respect to increasing a zoom level of an image in response to a spread gesture 656*e*, in some examples, a zoom level of an image is decreased in response to a gesture (e.g., another type of gesture, such as a pinch gesture).

FIG. 6AC illustrates various gestures that can be used to modify an image of a representation. In some embodiments, for instance, a user can use gestures to indicate a zoom level. By way of example, gesture 664 can be used to indicate that a zoom level of an image of a representation should be at "1×", and in response to detecting gesture 664, device 600-1 can modify an image of a representation to have a "1×" zoom level. Similarly, gesture 666 can be used to indicate that a zoom level of an image of a representation should be at "2×" and in response to detecting gesture 666, device 600-1 can modify an image of a representation to have a "2×" zoom level. While two zoom levels (e.g., a "1×" and a "2×" zoom level) are described for FIG. 6AC, in some embodiments, device 600-1 can modify an image of a representation to other zoom levels (e.g., 0.5×, 3×, 5×, or 10×) using the same gesture or a different gesture. In some embodiments, device 600-1 can modify an image of a representation to three or more different zoom levels. In some embodiments, the zoom levels are discrete or continuous.

As another example, a gesture in which user 622 curls their fingers can be used to adjust a zoom level. For instance, gesture 668 (e.g., a gesture in which fingers of a user's hand are curled in a direction 668*b* away from a camera, for example, when the back of the hand 668*a* is oriented toward the camera) can be used to indicate that a zoom level of an image should be increased (e.g., zoomed in). Gesture 670 (e.g., a gesture in which fingers of a user's hand are curled in a direction 670*b* toward a camera, for example, when the palm of the hand 668*a* is oriented toward the camera) can be used to indicate that a zoom level of an image should be decreased (e.g., zoomed out).

FIGS. 6AD-6AE illustrate examples in which a user participates in a live video communication session using two devices.

As an example, as shown in FIG. 6AD, user 623 is using an additional device 600-3 during the live video communication session. In some embodiments, devices 600-2, 600-3 concurrently display representations including images that have different views. For example, while device 600-3 displays representation 622-2, device 600-2 displays representation 624-2.

In some embodiments, device 600-2 is positioned in front of user 623 on desk 686 in a manner that corresponds to the position of surface 619 relative to user 622. Accordingly, user 623 can view representation 624-2 (including an image of surface 619) in a manner analogous to that of user 622 viewing surface 619 in the physical environment.

As shown in FIG. 6AE, during the live communication session, user 623 can modify the image displayed in representation 624-2 by moving device 600-2. In response to user 623 changing an orientation of device 600-2, device 600-2 modifies an image of representation 624-2, for instance, in a manner corresponding to the change in orientation of device 600-2. For example, in response to user 623 tilting device 600-2, device 600-2 pans upward to display other portions of surface 619. In this manner, user 623 can change an orientation of device 600-2 (in any direction) to view various portions of surface 619 that are not otherwise displayed when device 600-2 is in a different orientation.

FIGS. 6AF-6AL illustrate embodiments for accessing the various user interfaces illustrated and described with reference to FIGS. 6A-6AE. In the embodiments depicted in FIGS. 6AF-6AL, the interfaces are illustrated using a laptop (e.g., John's device 6100-1 and/or Jane's device 6100-2). It should be appreciated that the embodiments illustrated in FIGS. 6AF-6AL can be implemented using a different device, such as a tablet (e.g., John's tablet 600-1 and/or Jane's device 600-2). Similarly, the embodiments illustrated in FIGS. 6A-6AE can be implemented using a different device such as John's device 6100-1 and/or Jane's device 6100-2. Therefore, various operations or features described above with respect to FIGS. 6A-6AE are not repeated below for the sake of brevity. For example, the applications, interfaces (e.g., 604-1 and/or 604-2), and displayed elements (e.g., 622-1, 622-2, 623-1, 623-2, 624-1, and/or 624-2) discussed with respect to FIGS. 6A-6AE are similar to the applications, interfaces (e.g., 6121 and/or 6131), and displayed elements (e.g., 6124, 6132, 6122, 6134, 6116, 6140, and/or 6142) discussed with respect to FIGS. 6AF-6AL. Accordingly, details of these applications, interfaces, and displayed elements may not be repeated below for the sake of brevity.

FIG. 6AF depicts John's device 6100-1, which includes display 6101, one or more cameras 6102, and keyboard 6103 (which, in some embodiments, includes a trackpad). John's device 6100-1 displays, via display 6101, a home screen that includes camera application icon 6108 and video conferencing application icon 6110. Camera application icon 6108 corresponds to a camera application operating on John's device 6100-1 that can be used to access camera 6102. Video conferencing application icon 6110 corresponds to a video conferencing application operating on John's device 6100-1 that can be used to initiate and/or participate in a live video communication session (e.g., a video call and/or a video chat) similar to that discussed above with reference to FIGS. 6A-6AE. John's device 6100-1 also displays dock 6104, which includes various application icons, including a subset of icons that are displayed in dynamic region 6106. The icons displayed in dynamic region 6106 represent applications that are active (e.g., launched, open, and/or in use) on John's device 6100-1. In FIG. 6AF, neither the camera application nor the video conferencing application are currently active. Therefore, icons representing the camera application or video conferencing application are not displayed in dynamic region 6106, and John's device 6100-1 is not participating in a live video communication session.

In FIG. 6AF, John's device 6100-1 detects input as indicated by cursor 6112 (e.g., a cursor input caused by clicking a mouse, tapping on a trackpad, and/or other such input) selecting camera application icon 6108. In response, John's device 6100-1 launches the camera application and displays camera application window 6114, as shown in FIG. 6AG. In the embodiment depicted in FIG. 6AG, the camera application is being used to access camera 6102 to generate surface view 6116, which is similar to representation 624-1 depicted in FIG. 6M, for example, and described above. In some embodiments, the camera application can have different modes (e.g., user selectable modes) such as, for example, an expanded field-of-view mode (which provides an expanded field-of-view of camera 6102) and the surface view mode (which provides the surface view illustrated in FIG. 6AG). Accordingly, surface view 6116 represents a view of image data obtained using camera 6102 and modified (e.g., magnified, rotated, cropped, and/or skewed) by the camera application to produce surface view 6116 shown in FIG. 6AG. Additionally, because John's laptop launched the camera application, camera application icon 6108-1 is displayed in dynamic region 6106 of dock 6104, indicating that the camera application is active. In some embodiments, application icons (e.g., 6108-1) are displayed having an animated effect (e.g., bouncing) when they are added to the dynamic region of the dock.

In FIG. 6AG, John's device 6100-1 detects input 6118 selecting video conferencing application icon 6110. In response, John's device 6100-1 launches the video conferencing application, displays video conferencing application icon 6110-1 in dynamic region 6106, and displays video conferencing application window 6120, as shown in FIG. 6AH. Video conferencing application window 6120 includes video conferencing interface 6121, which is similar to interface 604-1, and includes video feed 6122 of Jane (similar to representation 623-1) and video feed 6124 of John (similar to representation 622-1). In some embodiments, John's device 6100-1 displays video conferencing application window 6120 with video conferencing interface 6121 after detecting one or more additional inputs after input 6118. For example, such inputs can be inputs to initiate a video call with Jane's laptop or to accept a request to participate in a video call with Jane's laptop.

In FIG. 6AH, John's device 6100-1 displays video conferencing application window 6120 partially overlaid on camera application window 6114. In some embodiments, John's device 6100-1 can bring camera application window 6114 to the front or foreground (e.g., partially overlaid on video conferencing application window 6120) in response to detecting a selection of camera application icon 6108, a selection of icon 6108-1, and/or an input on camera application window 6114. Similarly, video conferencing application window 6120 can be brought to the front or foreground (e.g., partially overlaying camera application window 6114) in response to detecting a selection of video conferencing application icon 6110, a selection of icon 6110-1, and/or an input on video conferencing application window 6120.

In FIG. 6AH, John's device 6100-1 is shown participating in a live video communication session with Jane's device 6100-2. Accordingly, Jane's device 6100-2 is depicted displaying video conferencing application window 6130, which is similar to video conferencing application window 6120 on John's device 6100-1. Video conferencing application window 6130 includes video conferencing interface 6131, which is similar to interface 604-2, and includes video feed 6132 of John (similar to representation 622-2) and video feed 6134 of Jane (similar to representation 623-2).

In the embodiment depicted in FIG. 6AH, the video conferencing application is being used to access camera 6102 to generate video feed 6124 and video feed 6132. Accordingly, video feeds 6124 and 6132 represent a view of image data obtained using camera 6102 and modified (e.g., magnified and/or cropped) by the video conferencing application to produce the image (e.g., video) shown in video feed 6124 and video feed 6132. In some embodiments, the camera application and the video conferencing application can use different cameras to provide respective video feeds.

Video conferencing application window 6120 includes menu option 6126, which can be selected to display different options for sharing content in the live video communication session. In FIG. 6AH, John's device 6100-1 detects input 6128 selecting menu option 6126 and, in response, displays share menu 6136, as shown in FIG. 6AI. Share menu 6136 includes share options 6136-1, 6136-2, and 6136-3. Share option 6136-1 is an option that can be selected to share content from the camera application. Share option 6136-2 is an option that can be selected to share content from the desktop of John's device 6100-1. Share option 6136-3 is an option that can be selected to share content from a presentation application. In response to detecting input 6138 on share option 6136-1, John's device 6100-1 begins sharing content from the camera application, as shown in FIG. 6AJ and FIG. 6AK.

In FIG. 6AJ, John's device 6100-1 updates video conferencing interface 6121 to include surface view 6140, which is shared with Jane's device 6100-2 in the live video communication session. In the embodiment depicted in FIG. 6AJ, John's device 6100-1 shares the video feed generated using the camera application (shown as surface view 6116 in camera application window 6114), and displays the representation of the video feed as surface view 6140 in the video conferencing application window 6120. Additionally, John's laptop emphasizes the display of surface view 6140 in video conferencing interface 6121 (e.g., by displaying the surface view with a larger size than other video feeds) and reduces the displayed size of Jane's video feed 6122. In FIG. 6AJ, John's device 6100-1 displays surface view 6140 concurrently with John's video feed 6124 and Jane's video feed 6122 in video conferencing application window 6120. In some embodiments, the display of John's video feed 6124 and/or Jane's video feed 6122 in video conferencing application window 6120 is optional. Jane's device 6100-2 updates video conferencing interface 6131 to show surface video feed 6142, which is the surface view (from the camera application) being shared by John's device 6100-1. As shown in FIG. 6AJ, Jane's device 6100-2 adds surface video feed 6142 to video conferencing interface 6131 to show the surface video feed concurrently with Jane's video feed 6134 and John's video feed 6132, which has optionally been resized to accommodate the addition of surface video feed 6142. In some embodiments, Jane's device 6100-2 replaces John's video feed 6132 and/or Jane's video feed 6134 with surface video feed 6142.

FIG. 6AK illustrates an alternate embodiment depicting the sharing of content from the camera application in response to detecting input 6138 on share option 6136-1. In FIG. 6AK, John's laptop displays camera application window 6114 with surface view 6116 (optionally minimizing or hiding video conferencing application window 6120). John's device 6100-1 also displays John's video feed 6115 (similar to John's video feed 6124) and Jane's video feed 6117 (similar to Jane's video feed 6122), indicating that John's laptop is sharing surface view 6116 with Jane's device 6100-2 in a live video communication session (e.g., the video chat provided by the video conferencing application). In some embodiments, the display of John's video feed 6115 and/or Jane's video feed 6117 is optional. Similar to the embodiment shown in FIG. 6AJ, Jane's device 6100-2 shows surface video feed 6142, which is the surface view (from the camera application) being shared by John's device 6100-1.

FIG. 6AL illustrates a schematic view representing the field-of-view of camera 6102, and the portions of the field-of-view that are being used for the video conferencing application and camera application, for the embodiments depicted in FIGS. 6AF-6AK. For example, in FIG. 6AL, a profile view of John's laptop 6100 is shown in John's physical environment. Dashed line 6145-1 and dotted line 6147-2 represent the outer dimensions of the field-of-view of camera 6102, which in some embodiments is a wide angle camera. The collective field-of-view of camera 6102 is indicated by shaded regions 6144, 6146, and 6148. The portion of the camera field-of-view that is being used for the camera application (e.g., for surface view 6116) is indicated by dotted lines 6147-1 and 6147-2 and shaded regions 6146 and 6148. In other words, surface view 6116 (and surface view 6140) is generated by the camera application using the portion of the camera's field-of-view represented by shaded regions 6146 and 6148 that are between dotted lines 6147-1 and 6147-2. The portion of the camera field-of-view that is being used for the video conferencing application (e.g., for John's video feed 6124) is indicated by dashed lines 6145-1 and 6145-2 and shaded regions 6144 and 6146. In other words, John's video feed 6124 is generated by the video conferencing application using the portion of the camera's field-of-view represented by shaded regions 6144 and 6146 that are between dashed lines 6145-1 and 6145-2. Shaded region 6146 represents an overlap of the portion of the camera field-of-view that is being used to generate the video feeds for the respective camera and video conferencing applications.

FIGS. 6AM-6AY illustrate embodiments for controlling and/or interacting with the various user interfaces and views illustrated and described with reference to FIGS. 6A-6AL. In the embodiments depicted in FIGS. 6AM-6AY, the interfaces are illustrated using a tablet (e.g., John's tablet 600-1 and/or Jane's device 600-2) and computer (e.g., Jane's computer 600-4). The embodiments illustrated in FIGS. 6AM-6AY are optionally implemented using a different device, such as a laptop (e.g., John's device 6100-1 and/or Jane's device 6100-2). Similarly, the embodiments illustrated in FIGS. 6A-6AL are optionally implemented using a different device, such as Jane's computer 6100-2. Therefore, various operations or features described above with respect to FIGS. 6A-6AL are not repeated below for the sake of brevity.

Additionally, the applications, interfaces (e.g., 604-1, 604-2, 6121, and/or 6131) and field-of-views (e.g., 620, 688, 6145-1, and 6147-2) provided by one or more cameras (e.g., 602, 682, and/or 6102) discussed with respect to FIGS. 6A-6AL are similar to the applications, interfaces (e.g., 604-4) and field-of-views (e.g., 620) provided by camera (e.g., 602) discussed with respect to FIGS. 6AM-6AY. Accordingly, details of these applications, interfaces, and field-of-views may not be repeated below for the sake of brevity. Additionally, the options and requests (e.g., inputs and/or hand gestures) detected by device 600-1 to control the views associated with displayed elements (e.g., 622-1, 622-2, 623-1, 623-2, 624-1, 624-2, 6121, and/or 6131) discussed with respect to FIGS. 6A-6AL are optionally detected by device 600-2 and/or device 600-4 to control the views associated with displayed elements (e.g., 622-1, 622-4, 623-1, 623-4, 6214, and/or 6216) discussed with respect to FIGS. 6AM-6AY (e.g., user 623 optionally provides the input to cause device 600-1 and/or device 600-2 to provide representation 624-1 including a modified image of a surface). Additionally, devices 600-1 and 600-2 in FIGS. 6AM-6AY are described and depicted as being in a landscape orientation. In some embodiments, device 600-1 and/or device 600-2 are in a portrait orientation, similar to device 600-1 in FIG. 6O. Accordingly, details of these the options and requests detected by device 600-2 may not be repeated below for the sake of brevity.

FIGS. 6AM-6AJ illustrate and describe exemplary user interfaces for controlling a view of a physical environment. The user interfaces in these figures are used to illustrate the processes described below, including the processes in FIG. 15. At FIG. 6AM, device 600-1 and device 600-4 display interfaces 604-1 and 604-4, respectively. Interface 604-1 includes representation 622-1 and interface 604-4 includes representation 622-4. Representations 622-1 and 622-4 include images of image data from a portion of field-of-view 620, specifically shaded region 6206. As illustrated, representations 622-1 and 622-4 include an image of a head and upper torso of user 622 and do not include an image of drawing 618 on desk 621. Interfaces 604-1 and 604-4 include representations 623-1 and 623-4, respectively, that include an image of user 223 that is in the field-of-view 6204 of camera 6202. Interfaces 604-1 and 604-4 further include options menu 609 (similar to options menu 608 discussed with respect to FIGS. 6A-6AE to control image data captured by 602 and/or captured by camera 6202, including FIGS. 6F-6G) allowing devices 600-1 and 600-4 to manage how image data is displayed.

At FIG. 6AN, user 623 brings device 600-2 near device 600-4 during a live video communication session. As depicted, in response to detecting device 600-2 (e.g., via wireless communication), device 600-4 displays add notification **6210*a*. Similarly, in response to detecting device 600-4, device 600-2, via display 683 (e.g., a touch-sensitive display), displays add notification 6210*b*. In some embodiments, devices 600-2 and 600-4 use specific device criteria to trigger the display of add notifications 6210*a* and 6210*b*. In some embodiments, the specific device criteria includes a criterion for a specific position (e.g., location, orientation, and/or angle) of device 600-2 that, when satisfied, triggers the display of add notifications 6210*a* and/or 6210*b*. In such embodiments, the specific position (e.g., location, orientation, and/or angle) of device 600-2 includes a criterion that device 600-2 has a specific angle or is within a range of angles (e.g., an angle or range of angles that indicate that the device is horizontal and/or lying flat on desk 686) and/or display 683 facing up (e.g., as opposed to facing down toward desk 686). In some embodiments, the specific device criteria include a criterion that device 600-2 is near device 600-4 (e.g., is within a threshold distance of device 600-4). In some embodiments, device 600-2 is in wireless communication with device 600-4 to communicate a location and/or proximity of device 600-2 (e.g., using location data and/or short-range wireless communications, such as Bluetooth and/or NFC). In some embodiments, the specific device criteria includes a criterion that device 600-2 and device 600-4 are associated with (e.g., are being used by and/or are logged into by) the same user. In some embodiments, the specific device criteria includes a criterion that device 600-2** has a particular state (e.g., unlocked and/or the display is powered on, as opposed to locked and/or the display is powered off).

At FIG. 6AN, connect notifications **6210*a*-6210*b* includes an indication of including device 600-4 in the live video communication session. For instance, add notifications 6210*a*-6210*b* includes an indication of adding a representation, for display on device 600-2, that includes an image of field-of-view 620 captured by camera 602. In some embodiments, the add notifications 6210*a*-6210*b* includes an indication of adding a representation, for display on device 600-1, that includes an image that is of field-of-view 6204 captured by camera 6202**.

At FIG. 6AN, add notifications **6210*a* and 6210*b* include accept affordances 6212*a* and 6212*b* that, when selected, add (e.g., connect) device 600-2 to the live video communication session. Notifications 6210*a* and 6210*b* include decline affordances 6213*a* and 6213*b* that, when selected, dismiss notifications 6210*a* and 6210*b*, respectively, without adding device 600-2 to the live video communication session. While displaying accept affordance 6212*b*, device 600-2 detects input 6250*an* (e.g., tap, mouse click, or other selection input) directed at accept affordance 6212*b*. In response to detecting input 6250*an*, device 600-2 displays interface 604-2, as depicted in FIG. 6**AO.

At FIG. 6AO, interface 604-2 is similar to interface 604-2 described herein (e.g., in reference to FIGS. 6A-6AE) and video conferencing interface 6131 as described herein (e.g., in reference to FIGS. 6AH-6AK) but has a different state. For example, interface 604-2 of FIG. 6AO does not include representations 622-2 and 623-2, John's video feed 6132 and Jane's video feed 6134, and options menu 609. In some embodiments, interface 604-2 of FIG. 6AO includes one or more of representations 622-2 and 623-2, John's video feed 6132 and Jane's video feed 6134, and/or options menu 609.

At FIG. 6AO, interface 604-2 includes adjustable view 6214 of a video feed captured by camera 602 (similar to John's video feed 6132 and representation 622-2, but including a different portion of the field of view 620). Adjustable view 6214 is associated with a portion of the field-of-view 620 corresponding to shaded region 6217. In some embodiments, interface 604-2 of FIG. 6AO includes representations 622-4 and 623-4 and/or option menu 609. In some embodiments, representations 622-4 and 623-4 and/or option menu 609 are moved from interface 604-4 to interface 604-2 in response to input detected at device 600-2 and/or device 600-4 so as to be concurrently displayed with adjustable view 6214. In such embodiments, display 6201 acts as a secondary display (e.g., extended display) of display 604-1 and/or vice versa.

At FIG. 6AO, in response to detection of input **6250*an* at FIG. 6AN, device 600-1 displays (and/or device 600-2 causes device 600-1 to display) interface 604-1, as depicted in FIG. 6AO. Interface 604-1 of FIG. 6AO is similar to interface 604-1 of FIG. 6AN but has a different state (e.g., representations 623-1 and 622-1 are smaller in size and in different positions). Interface 604-1 includes adjustable view 6216, which is similar to adjustable view 6214 displayed at device 600-2 (e.g., adjustable view 6216 is associated with a portion of the field-of-view 620 corresponding to shaded region 6217). Adjustable view 6216 is updated to include similar images as adjustable view 6214 when inputs (e.g., movements of device 600-2) described herein are detected by device 600-2. Displaying adjustable view 6216 allows user 622 to see what portion of field-of-view 620 user 624 is currently viewing since, as described in greater detail below, user 623 optionally controls what view within field-of-view 620** is displayed.

At FIG. 6AO, while displaying interface 604-2, device 600-2 detects movement **6218*ao* of device 600-2. In response to detecting movement 6218*ao*, device 600-2 displays interface 602-4 of FIG. 6AP. Additionally, in response to detecting movement 6218*ao*, device 600-2 causes device 600-1 to display interface 604-1 of FIG. 6**AP.

At FIG. 6AP, interface 602-4 includes an updated adjustable view 6214. Adjustable view 6214 of FIG. 6AP is a different view within field-of-view 620 as compared to adjustable view 6214 of FIG. 6AO. For example, shaded region 6217 of FIG. 6AP has moved with respect to shaded region 6217 of FIG. 6AO. Notably, camera 602 has not moved. In some embodiments, movement **6218*ao* of device 600-2 corresponds to (e.g., is proportional to) the amount of change in adjustable view 6214. For example, in some embodiments, the magnitude of the angle in which device 600-2 rotates (e.g., with respect to gravity) corresponds to the amount of change in adjustable view 6214 (e.g., the amount the image data is panned to include a new angle of view). In some embodiments, the direction of a movement (e.g., movement 6218***ao*) of device 600-2 (e.g., tilting down and/or rotating down) corresponds to the direction of change in adjustable view 6214 (e.g., pans down). In some embodiments, the acceleration and/or speed of a movement (e.g., movement 6218) corresponds to the speed in which adjustable view 6214 changes. In some embodiments, device 600-2 (and/or device 600-1) displays a gradual transition (e.g., a series views) from adjustable view 6214 in FIG. 6AO to adjustable view 6214 in FIG. 6AP. Additionally or alternatively, as depicted in FIG. 6AP, device 600-2 is lying flat on desk 686. In some embodiments, in response to detecting a specific position or a position within a predefined range of positions (e.g., horizontal and/or display up), device 600-2 displays the adjustable view 6214 of FIG. 6AP. As depicted, movement 6218*ao* in FIG. 6AO does not cause device 600-2 to update representations 622-4 and 623-4 (and/or representations 623-1 and 622-1 on device 600-1) in FIG. 6AP.

At FIG. 6AP, image of drawing 618 in adjustable view 6214 is at a different perspective than the perspective of the image of drawing 618 in adjustable view 6214 of FIG. 6AO. For example, adjustable view 6214 of FIG. 6AP includes a top-view perspective whereas adjustable view 6214 of FIG. 6AO includes a perspective that includes a combination of a side view and a top view. In some embodiments, the image of the drawing included in adjustable view 6214 of FIG. 6AP is based on image data that has been modified (e.g., skewed and/or magnified) using similar techniques described in reference to FIGS. 6A-6AL. In some embodiments, the image of drawing included in adjustable view 6214 of FIG. 6AO is based on image data that has not been modified (e.g., skewed and/or magnified) and/or has been modified in a different manner (e.g., at a lesser degree) than image of drawing 618 in adjustable view 6214 of FIG. 6AP (e.g., less skewed and/or less magnified as compared to the amount of skew and/or amount of magnification applied in FIG. 6AP). Providing a top-view perspective provides greater ease in collaborating and sharing content as it gives user 623 a view of the drawing that would be similar to the view user 623 would have if user 623 was sitting across from user 622 looking down at surface 619 of desk 621.

At FIG. 6AP, adjustable view 6216 of interface 604-1 has also been updated in a similar manner. In some embodiments, the images of adjustable view 6216 and/or adjustable view 6214 are modified based on a position of surface 619 relative to camera 602, as described in reference to FIGS. 6A-6AL. In such embodiments, device 600-1 and/or device 600-2 rotate the image of adjustable view 6214 by an amount (e.g., 45 degrees, 90 degrees, or 180 degrees) such that the image of drawing 618 can be more intuitively viewed in adjustable view 6216 and/or adjustable view 6214 (e.g., the image of drawing 618 is displayed such that the house is right-side up as opposed to upside down).

At FIG. 6AP, user 623 applies digit marks to adjustable view 6214 using stylist 6220. For example, while displaying adjustable view 6214 of FIG. 6AP, device 600-2 detects an input corresponding to a request to add digital marks to adjustable view 6214 (e.g., using stylist 6220). In response to detecting the input corresponding to the request to add digital marks to adjustable view 6214, device 600-2 displays interface 604-2, as depicted in FIG. 6AO. Additionally or alternatively, in response to detecting the input corresponding to the request to add digital marks to adjustable view 6214, device 600-1 displays (and/or device 600-2 causes device 600-1 to display) interface 604-1, as depicted in FIG. 6AQ.

At FIG. 6AQ, interface 602-4 includes digital sun 6222 in adjustable view 6214 and interface 602-1 includes digital sun 6223 in adjustable view 6214. Displaying a digital sun at both devices allow users 623 and 622 to collaborate over the video communication session. Additionally, as depicted, digital sun 6222 has a position with respect to image of drawing 618. As described in greater detail below, digital sun 6222 maintains its position with respect to image of drawing 618 even if device 600-1 detects further movement and/or if drawing 618 moves on surface 619. In some embodiments, device 600-2 stores data corresponding to the relationship between digital marks (e.g., digital sun 6223) and objects (e.g., the house) detected in image data so as to determine where (and/or if) digital sun 6222 should be displayed. In some embodiments, device 600-2 stores data corresponding to the relationship between digital marks (e.g., digital sun 6223) and the position of device 600-2 so as to determine where (and/or if) digital sun 6222 should be displayed. In some embodiments, device 600-2 detects digital marks applied to other views in field-of-view 620. For example, digital marks can be applied in an image of a head of a user, such as the image of the head of user 622 in adjustable view 6214 of FIG. 6AR.

At FIG. 6AQ, interface 604-2 includes control affordance 648-1 (similar to control affordance 648-1 in FIG. 6N) to modify the image in adjustable view 6214. Rotation affordance 648-1, when selected, causes device 600-1 (and/or device 600-2) to rotate the image of adjustable view 6214, similar to how control affordance 648-1 modifies the image of representation 624-1 in FIG. 6N.

At FIG. 6AQ, in some embodiments, interface 604-2 includes a zoom affordance similar to zoom affordance 648-2 in FIG. 6N. In such embodiments, the zoom affordance modifies the image in adjustable view 6214, similar to how zoom affordance 648-2 modifies the image of representation 624-1 in FIG. 6N. Control affordances 648-1, 648-2 can be displayed in response to one or more inputs, for instance, corresponding to a selection of an affordance of options menu 609 (e.g., FIG. 6AM).

At FIG. 6AQ, in some embodiments, digital sun 6222 is projected onto a physical surface of drawing 618, similar to how markup 956 is projected onto surface 908*b* that is described in FIGS. 9K-9N. In such embodiments, an electronic device (e.g., a projector and/or a light emitting projector) is used to project an image and/or rendering of digital sun 6222 within physical environment 915. For example, an electronic device can cause a projection of a digital sun to be displayed next to drawing 618 based on the relative location of digital sun 6222 with respect to drawing 618 using the techniques described with respect to FIGS. 9K-9N.

At FIG. 6AQ, while displaying digital sun 6222 in adjustable view 6214, device 600-2 detects movement 6218*aq* (e.g., rotation and/or lifting). In response to detecting movement 6218*aq*, device 600-2 displays interface 604-2, as depicted in FIG. 6AR. In response to detecting movement 6218*aq*, device 600-1 displays (and/or device 600-2 causes device 600-1 to display) interface 604-1, as depicted in FIG. 6AR.

At FIG. 6AR, interface 604-2 includes an updated adjustable view 6214 (which corresponds to the updated adjustable view 6216 in interface 606-1). Adjustable view 6214 of FIG. 6AR is a different view within field-of-view 620 as compared to adjustable view 6214 of FIG. 6AQ. For example, shaded region 6217 of FIG. 6AP has moved with respect to shaded region 6217 of FIG. 6AQ. In some embodiments, the direction of movement 6218*aq* (e.g., tilting up) corresponds to the direction of the change in view (e.g., pan up). Additionally, shaded region 6217 overlaps with shaded region 6206, as depicted by darker shaded region 6224. Darker shaded region 6224 is a schematic representation that updated adjustable view 6214 is based on a portion of image data that is used for representation 622-4. Because movement 6218*aq* has resulted in changing the view (e.g., to the face of user 622 and/or not a view of drawing 618), device 600-2 no longer displays digital sun 6222 in adjustable view 6214.

At FIG. 6AR, adjustable view 6214 includes boundary indicator 6226. Boundary indicator 6226 indicates that a boundary has been reached. In some embodiments, the boundary is configured (e.g., by a user) to set a limit on what portion of field-of-view 620 (or the environment captured by camera 602) is provided for display. For example, user 622 can limit what portion is available to user 623. In some embodiments, the boundary is defined by physical limitations of camera 602 (e.g., image sensors and/or lenses) that provide field-of-view 620. At FIG. 6AR, shaded region 6217 has not reached the limits of field-of-view 620. As such, boundary indicator 6226 is based on a configurable setting that limits what portion of field-of-view 620 is provided for display. Turning briefly to FIG. 6AT, boundary indicator 6226 is displayed in response to a determination that the perspective provided in adjustable view 6214 has reached the edge of field-of-view 620.

At FIG. 6AR, boundary indicator 6226 is depicted with cross-hatching. In some embodiments, security boundary indicator 6226 is a visual effect (e.g., a blur and/or fade) applied to adjustable view 6214 (and/or adjustable view 6216). In some embodiments, boundary indicator 6226 is displayed along an edge of adjustable view 6214 (and/or 6216) to indicate the position of boundary. At FIG. 6AR, boundary indicator 6226 is displayed along the top and side edge to indicate that the user cannot see above and/or further to the side of boundary indicators 6226. While displaying interface 604-2 at FIG. 6AR, device 600-2 detects movement 6218*ar* (e.g., rotation and/or lowering). In response to detecting movement 6218*ar*, device 600-2 displays interface 604-2, as depicted in FIG. 6AS. In response to detecting movement 6218*ar*, device 600-1 displays (and/or device 600-2 causes device 600-1 to display) interface 604-2, as depicted in FIG. 6AS.

At FIG. 6AS, interface 604-2 includes an updated adjustable view 6214, which includes the image of drawing 618. At FIG. 6AS, device 600-2 is in a similar position as device 600-2 was in FIG. 6AO. As such, adjustable view 6214 of FIG. 6AS includes the same perspective of the image of drawing 618 in adjustable view 6214 as the perspective of the image of drawing 618 in adjustable view 6214 in FIG. 6AO. Notably, device 600-2 displays digital sun 6222 in adjustable view 6214 of FIG. 6AS. The position of digital sun 6222 with respect to the house of drawing 618 in FIG. 6AS is similar to the position of digital sun 6222 with respect to the house of drawing 618 in FIG. 6AQ, except with slight differences based on the different view. As such, digital sun 6222 appears to be fixed in physical space, as if it were drawn next to drawing 618. Fixing the position of a digital mark in physical space facilitates better collaboration between the users, since a user can digitally draw or write in one view, move the device to see a different view, and then move the device back so as to re-display the digital drawings or writings and the context in which they were made.

For the sake of clarity, shaded regions 6217 and 6206 and field-of-view 620 have been omitted from FIGS. 6AS-6AU. In some embodiments, representations 622-1 and adjustable views 6214 and 6216 correspond to views associated with shaded regions 6217 and 6206 and field-of-view 620 of FIG. 6AO.

At FIG. 6AS, device 600-2 (and/or device 600-1) detects movement of drawing 618 and maintains display of the image of drawing 618 in adjustable view 6214. In some embodiments, device 600-2 (and/or device 600-1) uses image correction software to modify (e.g., zoom, skew, and/or rotate) image data so as to maintain display of the image of drawing 618 in adjustable view 6214. While displaying interface 604-2, device 600-2 (and/or device 600-1) detects horizontal movement 6230 of drawing 618. In response to detecting horizontal movement 6230 of drawing 618, device 600-2 displays interface 604-2, as depicted in FIG. 6AT. In some embodiments, in response to detecting horizontal movement 6230 of drawing 618, device 600-1 displays (and/or device 600-2 causes device 600-1 to display) interface 604-2, as depicted in FIG. 6AT. In some embodiments, in response to device 600-1 detecting horizontal movement 6230 of drawing 618, device 600-2 displays (and/or device 600-1 causes device 600-2 to display) interface 602-4, as depicted in FIG. 6AT.

At FIG. 6AT, drawing 618 has been moved to the edge of desk 621, which is further away from (e.g., and to the side) of camera 602. Despite the change in position, interface 602-4 of FIG. 6AT includes image of drawing 618 in adjustable view 6214 that appears mostly unchanged from the image of drawing 618 in adjustable view 6214 of interface 602-4 of FIG. 6AS. For example, adjustable view 6214 provides a perspective that makes it appear that drawing 618 is still straight in front of camera 602, similar to the position of drawing 618 in FIG. 6AS. In some embodiments, device 600-2 (and/or device 600-1) uses image correction software to correct (e.g., by skewing and/or magnifying) the image of drawing 618 based on a new position with respect to camera 602. In some embodiments, device 600-2 (and/or device 600-1) uses object detection software to track drawing 618 as it moves with respect to camera 602. In some embodiments, adjustable view 6214 of interface 604-2 of FIG. 6AT is provided without any change in position (e.g., location, orientation, and/or rotation) of camera 602.

At FIG. 6AT, device 600-2 displays boundary indicator 6226 in adjustable view 6214 (similar to adjustable view 6214 displayed by device 600-1 in adjustable view 6216). As discussed above with respect to FIG. 6AR, boundary indicator 6226 indicates that a limit of the field-of-view or physical space has been reached. At FIG. 6AT, device 600-2 displays boundary indicator 6226 in adjustable view 6214 to indicate that an edge of field-of-view 620 has been reached. Boundary indicator 6226 is along the right edge of adjustable view 6214 (and adjustable view 6216) indicating that views to the right of the current view exceed the field-of-view of camera 602.

At FIG. 6AT, digital sun 6222 maintains a similar respective position in relation to the house in the image of drawing 618 in adjustable view 6214 as the respective position of digital sun 6222 in relationship to the house in the image of drawing 618 in adjustable view 6214 of FIG. 6AS. In some embodiments, device 600-2 (and/or device 600-1) displays digital sun 6222 overlaid on the image of drawing 618 that has been corrected based on the new position of drawing 618.

Returning briefly to FIG. 6AS, while displaying interface 602-4, device 600-2 (and/or device 600-1) detects rotation 6232 of drawing 618. In response to detecting rotation 6232 of drawing 618, device 600-2 displays interface 604-2, as depicted in FIG. 6AU. In some embodiments, in response to detecting rotation 6232 of drawing 618, device 600-2 causes device 600-1 to display interface 601-4, as depicted in FIG. 6AU. In some embodiments, in response to device 600-1 detecting rotation 6232 of drawing 618, device 600-2 displays (or device 600-1 causes device 600-2 to display) interface 602-4, as depicted in FIG. 6AU.

At FIG. 6AU, drawing 618 has been rotated with respect to edge of desk 621. Despite the change in position, interface 602-4 in FIG. 6AU includes image of drawing 618 in adjustable view 6214 that appears mostly unchanged from the image of drawing 618 in adjustable view 6214 of interface 604-2 in FIG. 6AS. That is, adjustable view 6214 of FIG. 6AU provides a perspective that makes it appear as if drawing 618 was not rotated, similar to the position of drawing 618 in FIG. 6AS. In some embodiments, device 600-2 (and/or device 600-1) uses image correction software to correct (e.g., by skewing and/or rotating) the image of drawing 618 based on the new position with respect to camera 602. In some embodiments, device 600-2 (and/or device 600-1) uses object detection software to track drawing 618 as it rotates with respect to camera 602. In some embodiments, adjustable view 6214 of interface 604-2 of FIG. 6AU is provided without any change in position (e.g., location, orientation, and/or rotation) of camera 602. Adjustable view 6216 is updated in a similar manner as adjustable view 6214.

At FIG. 6AU, digital sun 6222 maintains a similar position in relation to the house in the image of drawing 618 in adjustable view 6214 as the position of digital sun 6222 in relationship to the house in the image of drawing 618 in adjustable view 6214 of FIG. 6AS. In some embodiments, device 600-2 (and/or device 600-1) displays digital sun 6222 overlaid on the image of drawing 618 that has been corrected based on the rotation of drawing 618.

At FIG. 6AV, device 600-2 displays interface 604-2, which is similar to interface 604-2 of FIG. 6AU but having a different state (e.g., representation 622-2 of John and options menu 609 have been added to user interface 604-2). Device 600-4 is no longer being used in the live communication session. Additionally, device 600-2 has been moved from its position in FIG. 6AU to the same position device 600-2 had in FIG. 6AQ. As such, device 600-2 updates adjustable view 6214 of FIG. 6AV to include the same perspective as adjustable view 6214 of FIG. 6AQ. As illustrated, adjustable view 6214 includes a top-view perspective. Additionally, digital sun 6222 is displayed as having the same position of digital sun 6222 in relationship to the house in the image of drawing 618 in adjustable view 6214 of FIG. 6AQ.

At FIG. 6AV, while displaying digital sun 6222 in adjustable view 6214, device 600-2 detects movement 6218*av* (e.g., rotation and/or lifting). In response to detecting movement 6218*av*, device 600-2 displays interface 604-2, as depicted in FIG. 6AW. In response to detecting movement 6218*aw*, device 600-1 displays (and/or device 600-2 causes device 600-1 to display) interface 604-1, as depicted in FIG. 6AW.

At FIG. 6AW, interface 604-2 includes an updated adjustable view 6214 (which corresponds to the updated adjustable view 6216 in interface 606-1) similar to adjustable view 6214 of FIG. 6AR. Notably, device does not update representation 622-2 in response to detecting movement 6218*aw*. Accordingly, in some embodiments, device 600-2 displays a dynamic representation that is updated based on the position of device 600-2 and a static representation that is not updated based on the position of device 600-2. Interface 604-2 also includes boundary indicator 6226 in adjustable view 6214, similar to boundary indicator 6226 of FIG. 6AR.

At FIG. 6AW, while displaying interface 604-2, device 600-2 detects movement 6218*aw* (e.g., rotation and/or lowering). In response to detecting movement 6218*aw*, device 600-2 displays interface 604-2, as depicted in FIG. 6AX. In response to detecting movement 6218*aw*, device 600-1 displays (and/or device 600-2 causes device 600-1 to display) interface 604-1, as depicted in FIG. 6AX.

At FIG. 6AX, interface 604-2 includes an updated adjustable view 6214 (which corresponds to the updated adjustable view 6216 in interface 606-1). Because adjustable view 6214 is substantially the same view provided by representation 622-2, shaded region 6206 overlaps shaded region 6217. Because movement 6218*aq* results in changing the view to the face of user 622 and/or not a view of drawing 618, device 600-2 no longer displays digital sun 6222 in adjustable view 6214. While displaying interface 604-2 at FIG. 6AX, device 600-2 (and/or device 600-1) detects a set of one or more inputs (e.g., similar to the inputs and/or hand gestures described in reference to FIGS. 6A-6AL) corresponding to a request to display a surface view. In some such embodiments, 616-1 of FIG. 6C, 616-2 of FIG. 6G, preview mode 674-1 of FIG. 6H, representation 676 of preview mode 674-2 in FIG. 6I, representation 676 of preview mode interface 674-3 in FIG. 6J, affordances 648-1, 648-2, 648-3 of FIGS. 6N-6Q are displayed at device 600-2 so as to allow device 600-2 to control the representation of the modified image of drawing 618 in the same manner as the detected inputs at device 600-1. In response to detecting the set of one or more inputs corresponding to a request to display a surface view, device 600-2 displays interface 604-2, as depicted in FIG. 6AY. Additionally or alternatively, in response to detecting the set of one or more inputs, device 600-1 displays interface 604-2, as depicted in FIG. 6AY. In some embodiments, device 600-1 detects the set of one or more inputs, as described in reference to FIGS. 6A-6AL. In some embodiments, device 600-2 detects the set of one or more inputs. In such embodiments, device 600-2 detects a selection of view affordance 6236 of options menu 609, which is similar to view affordance 607-2 of option menu 608 described in reference to FIG. 6F. In response, a view menu similar to view menu 616-2 as described with reference to FIG. 6G includes an affordance to request display of a surface view of a remote participant.

At FIG. 6AY, adjustable view 6214 includes a surface view, which is similar to representation 624-1 depicted in FIG. 6M, for example, and described above. As depicted in FIG. 6AY, adjustable view 6214 includes an image that is modified such that user 623 has a similar perspective looking down at the image of drawing 618 displayed on device 600-2 as the perspective user 622 has when looking down at drawing 618 in the physical environment, as described in greater detail with respect to FIGS. 6A-6AL. Notably, digital sun 6222 of FIG. 6AY is displayed as having the same position in relationship to the house in the image of drawing 618 in adjustable view 6214 as does digital sun 6222 of FIG. 6AQ.

FIG. 7 is a flow diagram illustrating a method for managing a live video communication session using a computer system, in accordance with some embodiments. Method 700 is performed at a computer system (e.g., 600-1, 600-2, 600-3, 600-4, 906*a*, 906*b*, 906*c*, 906*d*, 6100-1, 6100-2,

1100*a*, 1100*b*, 1100*c*, and/or 1100*d*) (e.g., a smartphone, a tablet, a laptop computer, and/or a desktop computer) (e.g., 100, 300, or 500) that is in communication with a display generation component (e.g., 601, 683, and/or 6101) (e.g., a display controller, a touch-sensitive display system, and/or a monitor), one or more cameras (e.g., 602, 682, and/or 6102) (e.g., an infrared camera, a depth camera, and/or a visible light camera), and one or more input devices (e.g., 601, 683, and/or 6103) (e.g., a touch-sensitive surface, a keyboard, a controller, and/or a mouse). Some operations in method 700 are, optionally, combined, the orders of some operations are, optionally, changed, and some operations are, optionally, omitted.

As described below, method 700 provides an intuitive way for managing a live video communication session. The method reduces the cognitive burden on a user for managing a live video communication session, thereby creating a more efficient human-machine interface. For battery-operated computing devices, enabling a user to manage a live video communication session faster and more efficiently conserves power and increases the time between battery charges.

In method 700, computer system (e.g., 600-1, 600-2, 6100-1, and/or 6100-2) displays (702), via the display generation component, a live video communication interface (e.g., 604-1, 604-2, 6120, 6121, 6130, and/or 6131) for a live video communication session (e.g., an interface for an incoming and/or outgoing live audio/video communication session). In some embodiments, the live communication session is between at least the computer system (e.g., a first computer system) and a second computer system.

The live video communication interface includes a representation (e.g., 622-1, 622-2, 6124, and/or 6132) of at least a portion of a field-of-view (e.g., 620, 688, 6144, 6146, and/or 6148) of the one or more cameras (e.g., a first representation). In some embodiments, the first representation includes images of a physical environment (e.g., a scene and/or area of the physical environment that is within the field-of-view of the one or more cameras). In some embodiments, the representation includes a portion (e.g., a first cropped portion) of the field-of-view of the one or more cameras. In some embodiments, the representation includes a static image. In some embodiments, the representation includes series of images (e.g., a video). In some embodiments, the representation includes a live (e.g., real-time) video feed of the field-of-view (or a portion thereof) of the one or more cameras. In some embodiments, the field-of-view is based on physical characteristics (e.g., orientation, lens, focal length of the lens, and/or sensor size) of the one or more cameras. In some embodiments, the representation is displayed in a window (e.g., a first window). In some embodiments, the representation of at least the portion of the field-of-view includes an image of a first user (e.g., a face of a first user). In some embodiments, the representation of at least the portion of the field-of-view is provided by an application (e.g., 6110) providing the live video communication session. In some embodiments, the representation of at least the portion of the field-of-view is provided by an application (e.g., 6108) that is different from the application providing the live video communication session (e.g., 6110).

While displaying the live video communication interface, the computer system (e.g., 600-1, 600-2, 6100-1, and/or 6100-2) detects (704), via the one or more input devices (e.g., 601, 683, and/or 6103), one or more user inputs including a user input (e.g., 612*c*, 612*d*, 614, 612*g*, 612*i*, 612*j*, 6112, 6118, 6128, and/or 6138) (e.g., a tap on a touch-sensitive surface, a keyboard input, a mouse input, a trackpad input, a gesture (e.g., a hand gesture), and/or an audio input (e.g., a voice command)) directed to a surface (e.g., 619) (e.g., a physical surface; a surface of a desk and/or a surface of an object (e.g., book, paper, tablet) resting on the desk; or a surface of a wall and/or a surface of an object (e.g., a whiteboard or blackboard) on a wall; or other surface (e.g., a freestanding whiteboard or blackboard)) in a scene (e.g., physical environment) that is in the field-of-view of the one or more cameras. In some embodiments, the user input corresponds to a request to display a view of the surface. In some embodiments, detecting user input via the one or more input devices includes obtaining image data of the field-of-view of the one or more cameras that includes a gesture (e.g., a hand gesture, eye gesture, or other body gesture). In some embodiments, the computer system determines, from the image data, that the gesture satisfies predetermined criteria.

In response to detecting the one or more user inputs, the computer system (e.g., 600-1, 600-2, 6100-1, and/or 6100-2) displays, via the display generation component (e.g., 601, 683, and/or 6101), a representation (e.g., image and/or video) of the surface (e.g., 624-1, 624-2, 6140, and/or 6142) (e.g., a second representation). In some embodiments, the representation of the surface is obtained by digitally zooming and/or panning the field-of-view captured by the one or more cameras. In some embodiments, the representation of the surface is obtained by moving (e.g., translating and/or rotating) the one or more cameras. In some embodiments, the second representation is displayed in a window (e.g., a second window, the same window in which the first representation is displayed, or a different window than a window in which the first representation is displayed). In some embodiments, the second window is different from the first window. In some embodiments, the second window (e.g., 6140 and/or 6142) is provided by the application (e.g., 6110) providing the live video communication session (e.g., as shown in FIG. 6AJ). In some embodiments, the second window (e.g., 6114) is provided by an application (e.g., 6108) different from the application providing the live video communication session (e.g., as shown in FIG. 6AK). In some embodiments, the second representation includes a cropped portion (e.g., a second cropped portion) of the field-of-view of the one or more cameras. In some embodiments, the second representation is different from the first representation. In some embodiments, the second representation is different from the first representation because the second representation displays a portion (e.g., a second cropped portion) of the field-of-view that is different from a portion (e.g., the first cropped portion) that is displayed in the first representation (e.g., a panned view, a zoomed out view, and/or a zoomed in view). In some embodiments, the second representation includes images of a portion of the scene that is not included in the first representation and/or the first representation includes images of a portion of the scene that is not included in the second representation. In some embodiments, the surface is not displayed in the first representation.

The representation (e.g., 624-1, 624-2, 6140, and/or 6142) of the surface includes an image (e.g., photo, video, and/or live video feed) of the surface (e.g., 619) captured by the one or more cameras (e.g., 602, 682, and/or 6102) that is (or has been) modified (e.g., to correct distortion of the image of the surface) (e.g., adjusted, manipulated, corrected) based on a position (e.g., location and/or orientation) of the surface relative to the one or more cameras (sometimes referred to as the representation of the modified image of the surface). In some embodiments, the image of the surface displayed in the second representation is based on image data that is modified using image processing software (e.g., skewing, rotating, flipping, and/or otherwise manipulating image data captured by the one or more cameras). In some embodiments, the image of the surface displayed in the second representation is modified without physically adjusting the camera (e.g., without rotating the camera, without lifting the camera, without lowering the camera, without adjusting an angle of the camera, and/or without adjusting a physical component (e.g., lens and/or sensor) of the camera). In some embodiments, the image of the surface displayed in the second representation is modified such that the camera appears to be pointed at the surface (e.g., facing the surface, aimed at the surface, pointed along an axis that is normal to the surface). In some embodiments, the image of the surface displayed in the second representation is corrected such that the line of sight of the camera appears to be perpendicular to the surface. In some embodiments, an image of the scene displayed in the first representation is not modified based on the location of the surface relative to the one or more cameras. In some embodiments, the representation of the surface is concurrently displayed with the first representation (e.g., the first representation (e.g., of a user of the computer system) is maintained and an image of the surface is displayed in a separate window). In some embodiments, the image of the surface is automatically modified in real time (e.g., during the live video communication session). In some embodiments, the image of the surface is automatically modified (e.g., without user input) based on the position of the surface relative to the one or more first cameras. Displaying a representation of a surface including an image of the surface that is modified based on a position of the surface relative to the one or more cameras enhances the video communication session experience by providing a clearer view of the surface despite its position relative to the camera without requiring further input from the user, which provides improved visual feedback and reduces the number of inputs needed to perform an operation.

In some embodiments, the computer system (e.g., 600-1 and/or 600-2) receives, during the live video communication session, image data captured by a camera (e.g., 602) (e.g., a wide angle camera) of the one or more cameras. The computer system displays, via the display generation component, the representation of the at least a portion of the field-of-view (e.g., 622-1 and/or 622-2) (e.g., the first representation) based on the image data captured by the camera. The computer system displays, via the display generation component, the representation of the surface (e.g., 624-1 and/or 624-2) (e.g., the second representation) based on the image data captured by the camera (e.g., the representation of at least a portion of the field-of view of the one or more cameras and the representation of the surface are based on image data captured by a single (e.g. only one) camera of the one or more cameras). Displaying the representation of the at least a portion of the field-of-view and the representation of the surface captured from the same camera enhances the video communication session experience by displaying content captured by the same camera at different perspectives without requiring input from the user, which reduces the number of inputs (and/or devices) needed to perform an operation.

In some embodiments, the image of the surface is modified (e.g., by the computer system) by rotating the image of the surface relative to the representation of at least a portion of the field-of-view-of the one or more cameras (e.g., the image of the surface in 624-2 is rotated 180 degrees relative to representation 622-2). In some embodiments, the representation of the surface is rotated 180 degrees relative to the representation of at least a portion of the field-of-view of the one or more cameras. Rotating the image of the surface relative to the representation of at least a portion of the field-of-view of the one or more cameras enhances the video communication session experience as content associated with the surface can be viewed from a different perspective that other portions of the field-of-view without requiring input from the user, which provides improved visual feedback and reduces the number of inputs needed to perform an operation.

In some embodiments, the image of the surface is rotated based on a position (e.g., location and/or orientation) of the surface (e.g., 619) relative to a user (e.g., 622) (e.g., a position of a user) in the field-of-view of the one or more cameras. In some embodiments, a representation of the user is displayed at a first angle and the image of the surface is rotated to a second angle that is different from the first angle (e.g., even though the image of the user and the image of the surface are captured at the same camera angle). Rotating the image of the surface based on a position of the surface relative to a user in the field-of-view of the one or more cameras enhances the video communication session experience as content associated with the surface can be viewed from a perspective that is based on the position of the surface without requiring input from the user, which provides improved visual feedback and reduces the number of inputs needed to perform an operation.

In some embodiments, in accordance with a determination that the surface is in a first position (e.g., surface 619 is positioned in front of user 622 on desk 621 in FIG. 6A) (e.g., a predefined position) relative to a user in the field-of-view of the one or more cameras (e.g., in front of the user, between the user and the one or more cameras, and/or in a substantially horizontal plane), the image of the surface is rotated by at least 45 degrees relative to a representation of the user in the field-of-view of the one or more cameras (e.g., the image of surface 619 in representation 624-1 is rotated 180 degrees relative to representation 622-1 in FIG. 6M). In some embodiments, the image of the surface is rotated in the range of 160 degrees to 200 degrees (e.g., 180 degrees). In some embodiments, in accordance with a determination that the surface is in a first position relative to a user in the field-of-view of the one or more cameras (e.g., in front of the user, between the user and the one or more cameras, and/or in a substantially horizontal plane), the image of the surface is rotated by a first amount. In some embodiments, the first amount is in the range of 160 degrees to 200 degrees (e.g., 180 degrees). In some embodiments, in accordance with a determination that the surface is in a second position relative to a user in the field-of-view of the one or more cameras (e.g., to a side of the user, between the user and the one or more cameras, and/or in a substantially horizontal plane), the image of the surface is rotated by a second amount. In some embodiments, the second amount is in the range of 45 degrees to 120 degrees (e.g., 90 degrees). Rotating the image of the surface by at least 45 degrees relative to a representation of the user captured in the field-of-view of the one or more cameras when the surface is in a first position relative to the user enhances the video communication session experience by adjusting an image to provide a more natural, intuitive image without requiring further input from the user, which provides improved visual feedback and performs an operation when a set of conditions has been met without requiring further user input.

In some embodiments, the representation of the at least a portion of the field-of-view includes a user and is concurrently displayed with the representation of the surface (e.g., representations 622-1 and 624-1 or representations 622-2 and 624-2 in FIG. 6M). In some embodiments, the representation of the at least a portion of the field-of-view and the representation of the surface are captured by the same camera (e.g., a single camera of the one or more cameras) and are displayed concurrently. In some embodiments, the representation of the at least a portion of the field-of-view and the representation of the surface are displayed in separate windows that are concurrently displayed. Including a user in the representation of the at least a portion of the field-of-view and concurrently displaying the representation with the representation of the surface enhances the video communication session experience by allowing a user to view a reaction of participant while the representation of the surface is displayed without requiring further input from the user, which provides improved visual feedback and performs an operation when a set of conditions has been met without requiring further user input.

In some embodiments, in response to detecting the one or more user inputs and prior to displaying the representation of the surface, the computer system displays a preview of image data for the field-of-view of the one or more cameras (e.g., as depicted in FIGS. 6H-6J) (e.g., in a preview mode of the live video communication interface), the preview including an image of the surface that is not modified based on the position of the surface relative to the one or more cameras (sometimes referred to as the representation of the unmodified image of the surface). In some embodiments, the preview of the field-of-view is displayed after displaying the representation of the image of the surface (e.g., in response to detecting user input corresponding to selection of the representation of the surface). Displaying a preview including an image of the surface that is not modified based on the position of the surface relative to the one or more cameras allows the user to quickly identify the surface within the preview as no distortion correction has been applied, which provides improved visual feedback.

In some embodiments, displaying the preview of image data for the field-of-view of the one or more cameras includes displaying a plurality of selectable options (e.g., 636-1 and/or 636-2 of FIG. 6I, or 636*a-i* of FIG. 6J) corresponding to respective portions of (e.g., surfaces within) the field-of-view of the one or more cameras. In some embodiments, the computer system detects an input (e.g., 612*i* or 612*j*) selecting one of the plurality of options corresponding to respective portions of the field-of-view of the one or more cameras. In response to detecting the input selecting one of the plurality of options corresponding to respective portions of the field-of-view of the one or more cameras and in accordance with a determination that the input selecting one of the plurality of options corresponding to respective portions of the field-of-view of the one or more cameras is directed to a first option corresponding to a first portion of the field-of-view of the one or more cameras, the computer system displays the representation of the surface based on the first portion of the field-of-view of the one or more cameras (e.g., selection of 636*h* in FIG. 6J causes display of the corresponding portion) (e.g., the computer system displays a modified version of an image of the first portion of the field-of-view, optionally with a first distortion correction). In response to detecting the input selecting one of the plurality of options corresponding to respective portions of the field-of-view of the one or more cameras and in accordance with a determination that the input selecting one of the plurality of options corresponding to respective portions of the field-of-view of the one or more cameras is directed to a second option corresponding to a second portion of the field-of-view of the one or more cameras, the computer system displays the representation of the surface based on the second portion of the field-of-view of the one or more cameras (e.g., selection of 636*g* in FIG. 6J causes display of the corresponding portion) (e.g., the computer system displays a modified version of an image of the second portion of the field-of-view, optionally with a second distortion correction that is different from the first distortion correction), wherein the second option is different from the first option. Displaying a plurality of selectable options corresponding to respective portions of the field-of-view of the one or more cameras in the preview of image data allows a user to identify portions of the field-of-view that are capable of being displayed as a representation in the video conference interface, which provides improved visual feedback.

In some embodiments, displaying the preview of image data for the field-of-view of the one or more cameras includes displaying a plurality of regions (e.g., distinct regions, non-overlapping regions, rectangular regions, square regions, and/or quadrants) of the preview (e.g., 636-1, 636-2 of FIGS. 6I, and/or 636*a-i* of FIG. 6J) (e.g., the one or more regions may correspond to distinct portions of the image data for the field-of-view.). In some embodiments, the computer system detects a user input (e.g., 612*i* and/or 612*j*) corresponding to one or more regions of the plurality of regions. In response to detecting the user input corresponding to the one or more regions and in accordance with a determination that the user input corresponding to the one or more regions corresponds to a first region of the one or more regions, the computer system displays a representation of the first region in the live video communication interface (e.g., as described with reference to FIGS. 6I-6J) (e.g., with a distortion correction based on the first region). In response to detecting the user input corresponding to the one or more regions and in accordance with a determination that the user input corresponding to the one or more regions corresponds to a second region of the one or more regions, the computer system displays a representation of the second region as a representation in the live video communication interface (e.g., with a distortion correction based on the second region that is different from the distortion correction based on the first region). Displaying a representation of the first region or a representation of the second region in the live video communication interface enhances the video communication session experience by allowing a user to efficiently manage what is displayed in the live video communication interface, which provides improved visual feedback and reduces the number of inputs needed to perform an operation.

In some embodiments, the one or more user inputs include a gesture (e.g., 612*d*) (e.g., a body gesture, a hand gesture, a head gesture, an arm gesture, and/or an eye gesture) in the field-of-view of the one or more cameras (e.g., a gesture performed in the field-of-view of the one or more cameras that is directed to the physical position surface). Utilizing a gesture in the field-of-view of the one or more cameras as an input enhances the video communication session experience by allowing a user to control what is displayed without physically touching a device, which provides additional control options without cluttering the user interface.

In some embodiments, the computer system displays a surface-view option (e.g., 610) (e.g., icon, button, affordance, and/or user-interactive graphical interface object), wherein the one or more user inputs include an input (e.g., 612*c* and/or 612*g*) directed to the surface-view option (e.g., a tap input on a touch-sensitive surface, a click with a mouse while a cursor is over the surface-view option, or an air gesture while gaze is directed to the surface-view option). In some embodiments, the surface-view option is displayed in the representation of at least a portion of a field-of-view of the one or more cameras. Displaying a surface-view option enhances the video communication session experience by allowing a user to efficiently manage what is displayed in the live video communication interface, which provides additional control options without cluttering the user interface.

In some embodiments, the computer system detects a user input corresponding to selection of the surface-view option. In response to detecting the user input corresponding to selection of the surface-view option, the computer system displays a preview of image data for the field-of-view of the one or more cameras (e.g., as depicted in FIGS. 6H-6J) (e.g., in a preview mode of the live video communication interface), the preview including a plurality of portions of the field-of-view of the one or more cameras including the at least a portion of the field-of-view of the one or more cameras (e.g., 636-1, 636-2 of FIG. 6I, and/or 636*a-i* of FIG. 6J), wherein the preview includes a visual indication (e.g., text, a graphic, an icon, and/or a color) of an active portion of the field-of-view (e.g., 641-1 of FIG. 6I, and/or 640*a-f* of FIG. 6J) (e.g., the portion of the field-of-view that is being transmitted to and/or displayed by other participants of the live video communication session). In some embodiments, the visual indication indicates that a single portion (e.g., only one) portion of the plurality of portions of the field-of-view is active. In some embodiments, the visual indication indicates that two or more portions of the plurality of portions of the field-of-view are active. Displaying a preview of a plurality of portions of the field-of-view of the one or more cameras, where the preview includes a visual indication of an active portion of the field-of-view, enhances the video communication session experience by providing feedback to a user as to which portion of the field-of-view is active, which provides improved visual feedback.

In some embodiments, the computer system detects a user input corresponding to selection of the surface-view option (e.g., 612*c*, 612*d*, 614, 612*g*, 612*i*, and/or 612*j*). In response to detecting the user input corresponding to selection of the surface-view option, the computer system displays a preview (e.g., 674-2 and/or 674-3) of image data for the field-of-view of the one or more cameras (e.g., as described in FIGS. 6I-6J) (e.g., in a preview mode of the live video communication interface), the preview including a plurality of selectable visually distinguished portions overlaid on a representation of the field-of-view of the one or more cameras (e.g., as described in FIGS. 6I-6J). Displaying a preview including a plurality of selectable visually distinguished portions overlaid on a representation of the field-of-view of the one or more cameras, enhances the video communication session experience by providing feedback to a user as to which portions of the field-of-view are selectable for display as a representation during the video communication session, which provides improved visual feedback.

In some embodiments, the surface is a vertical surface (e.g., as depicted in FIG. 6J) (e.g., wall, easel, and/or whiteboard) in the scene (e.g., the surface is within a predetermined angle (e.g., 5 degrees, 10 degrees, or 20 degrees) of the direction of gravity). Displaying a representation of a vertical surface that includes an image of the vertical surface that is modified based on a position of the vertical surface relative to the one or more cameras enhances the video communication session experience by providing a clearer view of the vertical surface despite its position relative to the camera without requiring further input from the user, which provides improved visual feedback and reduces the number of inputs needed to perform an operation.

In some embodiments, the surface is a horizontal surface (e.g., 619) (e.g., table, floor, and/or desk) in the scene (e.g., the surface is within a predetermined angle (e.g., 5 degrees, 10 degrees, or 20 degrees of a plane that is perpendicular to the direction of gravity)). Displaying a representation of a horizontal surface that includes an image of the horizontal surface that is modified based on a position of the horizontal surface relative to the one or more cameras enhances the video communication session experience by providing a clearer view of the horizontal surface despite its position relative to the camera without requiring further input from the user, which provides improved visual feedback and reduces the number of inputs needed to perform an operation.

In some embodiments, displaying the representation of the surface includes displaying a first view of the surface (e.g., 624-1 in FIG. 6N) (e.g., at a first angle of rotation and/or a first zoom level). In some embodiments, while displaying the first view of the surface, the computer system displays one or more shift-view options (e.g., 648-1 and/or 648-2) (e.g., buttons, icons, affordances, and/or user-interactive graphical user interface objects). The computer system detects a user input (e.g., 650*a* and/or 650*b*) directed to a respective shift-view option of the one or more shift-view options. In response to detecting the user input directed to the respective shift-view option, the computer system displays a second view of the surface (e.g., 624-1 in FIG. 6P and/or 624-1 in FIG. 6Q) (e.g., a second angle of rotation that is different from the first angle of rotation and/or a second zoom level that is different than the first zoom level) that is different from the first view of the surface (e.g., shifting the view of the surface from the first view to the second view). Providing a shift-view option to display the second view of the surface that is currently being displayed at the first view of the surface enhances the video communication session experience by allowing a user to view content associated with the surface at a different perspective, which provides additional control options without cluttering the user interface.

In some embodiments, displaying the first view of the surface includes displaying an image of the surface that is modified in a first manner (e.g., as depicted in FIG. 6N) (e.g., with a first distortion correction applied), and wherein displaying the second view of the surface includes displaying an image of the surface that is modified in a second manner (e.g., as depicted in FIG. 6P and/or FIG. 6Q) (e.g., with a second distortion correction applied) that is different from the first manner (e.g., the computer system changes (e.g., shifts) the distortion correction applied to the image of the surface based on the view (e.g., orientation and/or zoom) of the surface that is to be displayed). Displaying an image of the surface that is modified in a first manner and displaying the second view of the surface includes displaying an image of the surface that is modified in a second manner enhances the video communication session experience by allowing a user to automatically view content that is modified without requiring further input from the user, which provides improved visual feedback and reduces the number of inputs needed to perform an operation.

In some embodiments, the representation of the surface is displayed at a first zoom level (e.g., as depicted in FIG. 6N). In some embodiments, while displaying the representation of the surface at the first zoom level, the computer system detects a user input (e.g., 650*b* and/or 654) corresponding to a request to change a zoom level of the representation of the surface (e.g., selection of a zoom option (e.g., button, icon, affordance, and/or user-interactive user interface element)). In response detecting the user input corresponding to a request to change a zoom level of the representation of the surface, the computer system displays the representation of the surface at a second zoom level that is different from the first zoom level (e.g., as depicted in FIG. 6Q and/or FIG. 6R) (e.g., zooming in or zooming out). Displaying the representation of the surface at a second zoom level that is different from the first zoom level when user input corresponding to a request to change a zoom level of the representation of the surface is detected enhances the video communication session experience by allowing a user to view content associated with the surface at a different level of granularity without further input, which provides improved visual feedback and additional control options without cluttering the user interface.

In some embodiments, while displaying the live video communication interface, the computer system displays (e.g., in a user interface (e.g., a menu, a dock region, a home screen, and/or a control center) that includes a plurality of selectable control options that, when selected, perform a function and/or set a parameter of the computer system, in the representation of at least a portion of the field-of-view of the one or more cameras, and/or in the live video communication interface) a selectable control option (e.g., 610, 6126, and/or 6136-1) (e.g., a button, icon, affordance, and/or user-interactive graphical user interface object) that, when selected, causes the representation of the surface to be displayed. In some embodiments, the one or more inputs include a user input corresponding to selection of the control option (e.g., 612c and/or 612g). In some embodiments, the computer system displays (e.g., in the live video communication interface and/or in a user interface of a different application) a second control option that, when selected, causes a representation of a user to be displayed in the live video communication session and causes the representation of the surface to cease being displayed. Displaying the control option that, when selected, displays the representation of the surface enhances the video communication session experience by allowing a user to modify what content is displayed, which provides additional control options without cluttering the user interface.

In some embodiments, the live video communication session is provided by a first application (e.g., 6110) (e.g., a video conferencing application and/or an application for providing an incoming and/or outgoing live audio/video communication session) operating at the computer system (e.g., 600-1, 600-2, 6100-1, and/or 6100-2). In some embodiments, the selectable control option (e.g., 610, 6126, 6136-1, and/or 6136-3) is associated with a second application (e.g., 6108) (e.g., a camera application and/or a presentation application) that is different from the first application.

In some embodiments, in response to detecting the one or more inputs, wherein the one or more inputs include the user input (e.g., 6128 and/or 6138) corresponding to selection of the control option (e.g., 6126 and/or 6136-3), the computer system (e.g., 600-1, 600-2, 6100-1, and/or 6100-2) displays a user interface (e.g., 6140) of the second application (e.g., 6108) (e.g., a first user interface of the second application). Displaying a user interface of the second application in response to detecting the one or more inputs, wherein the one or more inputs include the user input corresponding to selection of the control option, provides access to the second application without having to navigate various menu options, which reduces the number of inputs needed to perform an operation. In some embodiments, displaying the user interface of the second application includes launching, activating, opening, and/or bringing to the foreground the second application. In some embodiments, displaying the user interface of the second application includes displaying the representation of the surface using the second application.

In some embodiments, prior to displaying the live video communication interface (e.g., 6121 and/or 6131) for the live video communication session (e.g., and before the first application (e.g., 6110) is launched), the computer system (e.g., 600-1, 600-2, 6100-1, and/or 6100-2) displays a user interface (e.g., 6114 and/or 6116) of the second application (e.g., 6108) (e.g., a second user interface of the second application). Displaying a user interface of the second application prior to displaying the live video communication interface for the live video communication session, provides access to the second application without having to access the live video communication interface, which provides additional control options without cluttering the user interface. In some embodiments, the second application is launched before the first application is launched. In some embodiments, the first application is launched before the second application is launched.

In some embodiments, the live video communication session (e.g., 6120, 6121, 6130, and/or 6131) is provided using a third application (e.g., 6110) (e.g., a video conferencing application) operating at the computer system (e.g., 600-1, 600-2, 6100-1, and/or 6100-2). In some embodiments, the representation of the surface (e.g., 6116 and/or 6140) is provided by (e.g., displayed using a user interface of) a fourth application (e.g., 6108) that is different from the third application.

In some embodiments, the representation of the surface (e.g., 6116 and/or 6140) is displayed using a user interface (e.g., 6114) of the fourth application (e.g., 6108) (e.g., an application window of the fourth application) that is displayed in the live video communication session (e.g., 6120 and/or 6121) (e.g., the application window of the fourth application is displayed with the live video communication interface that is being displayed using the third application (e.g., 6110)). Displaying the representation of the surface using a user interface of the fourth application that is displayed in the live video communication session provides access to the fourth application, which provides additional control options without cluttering the user interface. In some embodiments, the user interface of the fourth application (e.g., the application window of the fourth application) is separate and distinct from the live video communication interface.

In some embodiments, the computer system (e.g., 600-1, 600-2, 6100-1, and/or 6100-2) displays, via the display generation component (e.g., 601, 683, and/or 6101) a graphical element (e.g., 6108, 6108-1, 6126, and/or 6136-1) corresponding to the fourth application (e.g., a camera application associated with camera application icon 6108) (e.g., a selectable icon, button, affordance, and/or user-interactive graphical user interface object that, when selected, launches, opens, and/or brings to the foreground the fourth application), including displaying the graphical element in a region (e.g., 6104 and/or 6106) that includes (e.g., is configurable to display) a set of one or more graphical elements (e.g., 6110-1) corresponding to an application other than the fourth application (e.g., a set of application icons each corresponding to different applications). Displaying a graphical element corresponding to the fourth application in a region that includes a set of one or more graphical elements corresponding to an application other than the fourth application, provides controls for accessing the fourth application without having to navigate various menu options, which provides additional control options without cluttering the user interface. In some embodiments, the graphical element corresponding to the fourth application is displayed in, added to, and/or displayed adjacent to an application dock (e.g., 6104 and/or 6106) (e.g., a region of a display that includes a plurality of application icons for launching respective applications). In some embodiments, the set of one or more graphical elements includes a graphical element (e.g., 6110-1) that corresponds to the third application (e.g., video conferencing application associated with video conferencing application icon 6110) that provides the live video communication session. In some embodiments, in response to detecting the one or more user inputs (e.g., 6112 and/or 6118) (e.g., including an input on the graphical element corresponding to the fourth application), the computer system displays an animation of the graphical element corresponding to the fourth application, e.g., bouncing in the application dock.

In some embodiments, displaying the representation of the surface includes displaying, via the display generation component, an animation of a transition (e.g., a transition that gradually progresses through a plurality of intermediate states over time including one or more of a pan transition, a zoom transition, and/or a rotation transition) from the display of the representation of at least a portion of a field-of-view of the one or more cameras to the display of the representation of the surface (e.g., as depicted in FIGS. 6K-6L). In some embodiments, the animated transition includes a modification to image data of the field-of-view from the one or more cameras (e.g., where the modification includes panning, zooming, and/or rotating the image data) until the image data is modified so as to display the representation of the modified image of the surface. Displaying an animated transition from the display of the representation of at least a portion of a field-of-view of the one or more cameras to the display of the representation of the surface enhances the video communication session experience by creating an effect that a user is moving the one or more cameras to a different orientation, which reduces the number of inputs needed to perform an operation.

In some embodiments, the computer system is in communication (e.g., via the live communication session) with a second computer system (e.g., 600-1 and/or 600-2) (e.g., desktop computer and/or laptop computer) that is in communication with a second display generation component (e.g., 683). In some embodiments, the second computer system displays the representation of at least a portion of the field-of-view of the one or more cameras on the display generation component (e.g., as depicted in FIG. 6M). The second computer system also causes display of (e.g., concurrently with the representation of at least a portion of the field-of-view of the one or more cameras displayed on the display generation component) the representation of the surface on the second display generation component (e.g., as depicted in FIG. 6M). Displaying the representation of at least a portion of the field-of-view of the one or more cameras on the display generation component and causing display of the representation of the surface on the second display generation component enhances the video communication session experience by allowing a user to utilize two displays so as to maximize the view of each representation, which provides improved visual feedback.

In some embodiments, in response to detecting a change in an orientation of the second computer system (or receiving an indication of a change in an orientation of the second computer system) (e.g., the second computer system is tilted), the second computer system updates the display of the representation of the surface that is displayed at the second display generation component from displaying a first view of the surface to displaying a second view of the surface that is different from the first view (e.g., as depicted in FIG. 6AE). In some embodiments, the position (e.g., location and/or orientation) of the second computing system controls what view of the surface is displayed at the second display generation component. Updating the display of the representation of the surface that is displayed at the second display generation component from displaying a first view of the surface to displaying a second view of the surface that is different from the first view in response to detecting a change in an orientation of the second computer system enhances the video communication session experience by allowing a user to utilize a second device to modify the view of the surface by moving the second computer system, which provides additional control options without cluttering the user interface.

In some embodiments, displaying the representation of the surface includes displaying an animation of a transition from the display of the representation of the at least a portion of the field-of-view of the one or more cameras to the display of the representation of the surface, wherein the animation includes panning a view of the field-of-view of the one or more cameras and rotating the view of the field-of-view of the one or more cameras (e.g., as depicted in FIG. 6K) (e.g., concurrently panning and rotating the view of the field-of-view of the one or more cameras from a view of a user in a first position and a first orientation to a view of the surface in a second position and a second orientation). Displaying an animation that includes panning a view of the field-of-view of the one or more cameras and rotating the view of the field-of-view of the one or more cameras enhances the video communication session experience by allowing a user view how an image of a surface is modified, which provides improved visual feedback.

In some embodiments, displaying the representation of the surface includes displaying an animation of a transition from the display of the representation of the at least a portion of the field-of-view of the one or more cameras to the display of the representation of the surface, wherein the animation includes zooming (e.g., zooming in or zooming out) a view of the field-of-view of the one or more cameras and rotating the view of the field-of-view of the one or more cameras (e.g., as depicted in FIG. 6L) (e.g., concurrently zooming and rotating the view of the field-of-view of the one or more cameras from a view of a user at a first zoom level and a first orientation to a view of the surface at a second zoom level and a second orientation). Displaying an animation that includes zooming a view of the field-of-view of the one or more cameras and rotating the view of the field-of-view of the one or more cameras enhances the video communication session experience by allowing a user view how an image of a surface is modified, which provides improved visual feedback.

Note that details of the processes described above with respect to method 700 (e.g., FIG. 7) are also applicable in an analogous manner to the methods described herein. For example, methods 800, 1000, 1200, 1400, 1500, 1700, and 1900 optionally include one or more of the characteristics of the various methods described above with reference to method 700. For example, the methods 800, 1000, 1200,

1400, 1500, 1700, and 1900 can include characteristics of method 700 to manage a live video communication session, modify image data captured by a camera of a local computer (e.g., associated with a user) or a remote computer (e.g., associated with a different user), assist in displaying the physical marks in and/or adding to a digital document, facilitate better collaboration and sharing of content, and/or manage what portions of a surface view are shared (e.g., prior to sharing the surface view and/or while the surface view is being shared). For brevity, these details are not repeated herein.

FIG. 8 is a flow diagram illustrating a method for managing a live video communication session using a computer system, in accordance with some embodiments. Method 800 is performed at a computer system (e.g., a smartphone, a tablet, a laptop computer, and/or a desktop computer) (e.g., 100, 300, 500, 600-1, 600-2, 600-3, 600-4, 906*a*, 906*b*, 906*c*, 906*d*, 6100-1, 6100-2, 1100*a*, 1100*b*, 1100*c*, and/or 1100*d*) that is in communication with a display generation component (e.g., 601, 683, 6201, and/or 1101) (e.g., a display controller, a touch-sensitive display system, and/or a monitor). one or more cameras (e.g., 602, 682, 6202, and/or 1102*a*-1102*d*) (e.g., an infrared camera, a depth camera, and/or a visible light camera), and one or more input devices (e.g., a touch-sensitive surface, a keyboard, a controller, and/or a mouse). Some operations in method 800 are, optionally, combined, the orders of some operations are, optionally, changed, and some operations are, optionally, omitted.

As described below, method 800 provides an intuitive way for managing a live video communication session. The method reduces the cognitive burden on a user for managing a live video communication session, thereby creating a more efficient human-machine interface. For battery-operated computing devices, enabling a user to manage a live video communication session faster and more efficiently conserves power and increases the time between battery charges.

In method 800, the computer system displays (802), via the display generation component, a live video communication interface (e.g., 604-1) for a live video communication session (e.g., an interface for an incoming and/or outgoing live audio/video communication session). In some embodiments, the live communication session is between at least the computer system (e.g., a first computer system) and a second computer system. The live video communication interface includes a representation (e.g., 622-1) (e.g., a first representation) of a first portion of a scene (e.g., a portion (e.g., area) of a physical environment) that is in a field-of-view captured by the one or more cameras. In some embodiments, the first representation is displayed in a window (e.g., a first window). In some embodiments, the first portion of the scene corresponds to a first portion (e.g., a cropped portion (e.g., a first cropped portion)) of the field-of-view captured by the one or more cameras.

While displaying the live video communication interface, the computer system obtains (804), via the one or more cameras, image data for the field-of-view of the one or more cameras, the image data including a first gesture (e.g., 656*b*) (e.g., a hand gesture). In some embodiments, the gesture is performed within the field-of-view of the one or more cameras. In some embodiments, the image data is for the field-of-view of the one or more cameras. In some embodiments, the gesture is displayed in the representation of the scene. In some embodiments, the gesture is not displayed in the representation of the first scene (e.g., because the gesture is detected in a portion of the field-of-view of the one or more cameras that is not currently being displayed). In some embodiments, while displaying the live video communication interface, audio input is obtained via the one or more input devices. a determination that the audio input satisfies a set of audio criteria input may take the place of (e.g., is in lieu of) the determination that the gesture satisfies the first set of criteria.

In response to obtaining the image data for the field-of-view of the one or more cameras (and/or in response to obtaining the audio input) and in accordance with a determination that the first gesture satisfies a first set of criteria, the computer system displays, via the display generation component, a representation (e.g., 622-2') (e.g., a second representation) of a second portion of the scene that is in the field-of-view of the one or more cameras, the representation of the second portion of the scene including different visual content from the representation of the first portion of the scene. In some embodiments, the second representation is displayed in a window (e.g., a second window). In some embodiments, the second window is different than the first widow. In some embodiments, the first set of criteria is a predetermined set of criteria for recognizing the gesture. In some embodiments, the first set of criteria includes a criterion for a gesture (e.g., movement and/or static pose) of one or more hands of a user (e.g., a single-hand gesture and/or two-hand gesture). In some embodiments, the first set of criteria includes a criterion for position (e.g., location and/or orientation) of the one or more hands (e.g., position of one or more fingers and/or one or more palms) of the user. In some embodiments, the criteria includes a criterion for a gesture of a portion of a user's body other than the user's hand(s) (e.g., face, eyes, head, and/or shoulders). In some embodiments, the computer system displays the representation of the second portion of the scene by digitally panning and/or zooming without physically adjusting the one or more cameras. In some embodiments, the representation of the second portion includes visual content that is not included in the representation of the first portion. In some embodiments, the representation of the second portion does not include at least a portion of the visual content that is included in the representation of the first portion. In some embodiments, the representation of the second portion includes at least a portion (but not all) of the visual content included in the first portion (e.g., the second portion and the first portion include some overlapping visual content). In some embodiments, displaying the representation of the second portion includes displaying a portion (e.g., a cropped portion) of the field-of-view of the one or more cameras. In some embodiments, the representation of the first portion and the representation of the second portion are based on the same field-of-view of the one or more cameras (e.g., a single camera). In some embodiments, displaying the representation of the second portion includes transitioning from displaying the representation of the first portion to displaying the representation of the second portion in the same window. In some embodiments, in accordance with a determination that the audio input satisfies a set of audio criteria, the representation of the second portion of the scene is displayed.

In response to obtaining the image data for the field-of-view of the one or more cameras (and/or in response to obtaining the audio input) and in accordance with a determination that the first gesture satisfies a second set of criteria (e.g., does not satisfy the first set of criteria) different from the first set of criteria, the computer system continues to display (810) (e.g., maintain the display of), via the display generation component, the representation (e.g., the first representation) of the first portion of the scene (e.g., representations 622-1, 622-2 in FIGS. 6D-6E continue to be displayed if gesture 612*d* satisfies a second set of criteria (e.g., does not satisfy the first set of criteria)). In some embodiments, in accordance with a determination that the audio input does not satisfy the set of audio criteria, continuing to display, via the display generation component, the representation of the first portion of the scene. Displaying a representation of a second portion of the scene including different visual content from the representation of the first portion of the scene when the first gesture satisfies the first set of criteria enhances the user interface by controlling visual content based on a gesture performed in the field-of-view of a camera, which provides additional control options without cluttering the user interface.

In some embodiments, the representation of the first portion of the scene is concurrently displayed with the representation of the second portion of the scene (e.g., representations 622-1, 624-1 in FIG. 6M) (e.g., the representation of the first portion of the scene is displayed in a first window and the representation of the second portion of the scene is displayed in a second window). In some embodiments, after displaying the representation of the second portion of the scene, user input is detected. In response to detecting the user input, the representation of the first portion of the scene is displayed (e.g., re-displayed) so as to be concurrently displayed with the second portion of the scene. Concurrently displaying the representation of the first portion of the scene with the representation of the second portion of the scene enhances the video communication session experience by allowing a user to see different visual content at the same time, which provides improved visual feedback.

In some embodiments, in response to obtaining the image data for the field-of-view of the one or more cameras and in accordance with a determination that the first gesture satisfies a third set of criteria different from the first set of criteria and the second set of criteria, the computer system displays, via the display generation component, a representation of a third portion of the scene that is in the field-of-view of the one or more cameras, the representation of the third portion of the scene including different visual content from the representation of the first portion of the scene and different visual content from the representation of the second portion of the scene (e.g., as depicted in FIGS. 6Y-6Z). In some embodiments, displaying the third portion of the scene including different visual content from the representation of the first portion of the scene and different visual content from the representation of the second portion of the scene includes changing a distortion correction applied to image data captured by the one or more cameras (e.g., applying a different distortion correction to the representation of the third portion of the scene compared to a distortion correction applied to the representation of the first portion of the scene and/or a distortion correction applied to the representation of the second portion of the scene). Displaying a representation of the third portion of the scene including different visual content from the representation of the first portion of the scene and different visual content from the representation of the second portion of the scene when the first gesture satisfies a third set of criteria different from the first set of criteria and the second set of criteria enhances the user interface by allowing a user to use different gestures in the field-of-view of a camera to display different visual content, which provides additional control options without cluttering the user interface.

In some embodiments, while displaying the representation of the second portion of the scene, the computer system obtains image data including movement of a hand of a user (e.g., a movement of frame gesture 656*c* in FIG. 6X to a different portion of the scene). In response to obtaining image data including the movement of the hand of the user the computer system displays a representation of a fourth portion of the scene that is different from the second portion of the scene and that includes the hand of the user, including tracking the movement of the hand of the user from the second portion of the scene to the fourth portion of the scene (e.g., as described in reference to FIG. 6X). In some embodiments, a first distortion correction (e.g., a first amount and/or manner of distortion correction) is applied to the representation of the second portion of the scene. In some embodiments, a second distortion correction (e.g., a second amount and/or manner of distortion correction), different from the first distortion correction, is applied to the representation of the fourth portion of the scene. In some embodiments, an amount of shift (e.g., an amount of panning) corresponds (e.g., is proportional) to the amount of movement of the hand of the user (e.g., the amount of pan is based on the amount of movement of a user's gesture). In some embodiments, the second portion of the scene and the fourth portion of the scene are cropped portions from the same image data. In some embodiments, the transition from the second portion of the scene to the fourth portion of the scene is achieved without modifying the orientation of the one or more cameras. Displaying a representation of a fourth portion of the scene that is different from the second portion of the scene and that includes the hand of the user, including tracking the movement of the hand of the user from the second portion of the scene to the fourth portion of the scene in response to obtaining image data including the movement of the hand of the user enhances the user interface by allowing a user to use a movement of his or her hand in the field-of-view of a camera to display different portions of the scene, which provides additional control options without cluttering the user interface.

In some embodiments, the computer system obtains (e.g., while displaying the representation of the first portion of the scene or the representation of the second portion of the scene) image data including a third gesture (e.g., 612*d*, 654, 656*b*, 656*c*, 656*e*, 664, 666, 668, and/or 670). In response to obtaining the image data including the third gesture and in accordance with a determination that the third gesture satisfies zooming criteria, the computer system changes a zoom level (e.g., zooming in and/or zooming out) of a respective representation of a portion of the scene (e.g., the representation of the first portion of the scene and/or a zoom level of the representation of the second portion of the scene) from a first zoom level to a second zoom level that is different from the first zoom level (e.g., as depicted in FIGS. 6R, 6V, 6X, and/or 6AB). In some embodiments, in accordance with a determination that the third gesture does not satisfy the zooming criteria, the computer system maintains (e.g., at the first zoom level) the zoom level of the respective representation of the portion of the scene (e.g., the computer system does not change the zoom level of the respective representation of the portion of the scene). In some embodiments, changing the zoom level of the respective representation of a portion of the scene from the first zoom level to the second zoom level includes changing a distortion correction applied to image data captured by the one or more cameras (e.g., applying a different distortion correction to the respective representation of the portion of the scene compared to a distortion correction applied to the respective representation of the portion of the scene prior to changing the zoom level). Changing a zoom level of a respective representation of a portion of the scene from a first zoom level to a second zoom level that is different from the first zoom level when the third gesture satisfies zooming criteria enhances the user interface by allowing a user to use a gesture that is performed in the field-of-view of a camera to modify a zoom level, which provides additional control options without cluttering the user interface.

In some embodiments, the third gesture includes a pointing gesture (e.g., 656*b*), and wherein changing the zoom level includes zooming into an area of the scene corresponding to the pointing gesture (e.g., as depicted in FIG. 6V) (e.g., the area of the scene to which the user is physically pointing). Zooming into an area of the scene corresponding to a pointing gesture enhances the user interface by allowing a user to use a gesture that is performed in the field-of-view of a camera to specify a specific area of a scene to zoom into, which provides additional control options without cluttering the user interface.

In some embodiments, the respective representation displayed at the first zoom level is centered on a first position of the scene, and wherein the respective representation displayed at the second zoom level is centered on the first position of the scene (e.g., in response to gestures 664, 666, 668, or 670 in FIG. 6AC, representations 624-1, 622-2 of FIG. 6M are zoomed and remains centered on drawing 618). Displaying respective representation at the first zoom level as being centered on a first position of the scene and the respective representation displayed at the second zoom level as being centered on the first position of the scene enhances the user interface by allowing a user to use a gesture that is performed in the field-of-view of a camera to change the zoom level without designating a center for the representation after the zoom is applied, which provides improve visual feedback and additional control options without cluttering the user interface.

In some embodiments, changing the zoom level of the respective representation includes changing a zoom level of a first portion the respective representation from the first zoom level to the second zoom level and displaying (e.g., maintaining display of) a second portion of the respective representation, the second portion different from the first portion, at the first zoom level (e.g., as depicted in FIG. 6R). Displaying a zoom level of a first portion the respective representation from the first zoom level to the second zoom level and a second portion of the respective representation at the first zoom level enhances the video communication session experience by allowing a user to use a gesture that is performed in the field-of-view of a camera to change the zoom level of a specific portion of a representation without changing the zoom level of other portions of a representation, which provides improve visual feedback and additional control options without cluttering the user interface.

In some embodiments, in response to obtaining the image data for the field-of-view of the one or more cameras and in accordance with the determination that the first gesture satisfies the first set of criteria, displaying a first graphical indication (e.g., 626) (e.g., text, a graphic, a color, and/or an animation) that a gesture (e.g., a predefined gesture) has been detected. Displaying a first graphical indication that a gesture has been detected in response to obtaining the image data for the field-of-view of the one or more cameras enhances the user interface by providing an indication of when a gesture is detected, which provides improved visual feedback.

In some embodiments, displaying the first graphical indication includes in accordance with a determination that the first gesture includes (e.g., is) a first type of gesture (e.g., framing gesture 656*c* of FIG. 6W is a zooming gesture) (e.g., a zoom gesture, a pan gesture, and/or a gesture to rotate the image), displaying the first graphical indication with a first appearance. In some embodiments, displaying the first graphical indication also includes in accordance with a determination that the first gesture includes (e.g., is) a second type of gesture (e.g., pointing gesture 656*d* of FIG. 6Y is a panning gesture) (e.g., a zoom gesture, a pan gesture, and/or a gesture to rotate the image), displaying the first graphical indication with a second appearance different from the first appearance (e.g., the appearance of the first graphical indication might indicate what type of operation is going to be performed). Displaying the first graphical indication with a first appearance when the first gesture includes a first type of gesture and displaying the first graphical indication with a second appearance different from the first appearance when the first gesture includes a second type of gesture enhances the user interface by providing an indication of the type of gesture that is detected, which provides improved visual feedback.

In some embodiments, in response to obtaining the image data for the field-of-view of the one or more cameras and in accordance with the determination that the first gesture satisfies a fourth set of criteria, displaying (e.g., before displaying the representation of the second portion of the scene) a second graphical object (e.g., 626) (e.g., a countdown timer, a ring that is filled in over time, and/or a bar that is filled in over time) indicating a progress toward satisfying a threshold amount of time (e.g., a progress toward transitioning to displaying the representation of the second portion of the scene and/or a countdown of an amount of time until the representation of the second portion of the scene will be displayed). In some embodiments, the first set of criteria includes a criterion that is met if the first gesture is maintained for the threshold amount of time. Displaying a second graphical object indicating a progress toward satisfying a threshold amount of time when the first gesture satisfies a fourth set of criteria enhances the user interface by providing an indication of how long a gesture should be performed before the device executes a requested function, which provides improved visual feedback.

In some embodiments, the first set of criteria includes a criterion that is met if the first gesture is maintained for the threshold amount of time (e.g., as described with reference to FIGS. 6D-6E) (e.g., the computer system displays the representation of the second portion if the first gesture is maintained for the threshold amount of time). Including a criterion in the first set of criteria that is met if the first gesture is maintained for the threshold amount of time enhances the user interface by reducing the number of unwanted operations based on brief, accidental gestures, which reduces the number of inputs needed to cure an unwanted operation.

In some embodiments, the second graphical object is a timer (e.g., as described with reference to FIGS. 6D-6E) (e.g., a numeric timer, an analog timer, and/or a digital timer). Displaying the second graphical object as including a timer enhances the user interface allowing user to efficiently identify how long a gesture should be performed before the device executes a requested function, which provides improved visual feedback.

In some embodiments, the second graphical object includes an outline of a representation of a gesture (e.g., as described with reference to FIGS. 6D-6E) (e.g., the first gesture and/or a hand gesture). Displaying the second graphical object as including an outline of a representation of a gesture enhances the user interface by allowing user to efficiently identify what type of a gesture needs to be performed before the device executes a requested function, which provides improved visual feedback.

In some embodiments, the second graphical object indicates a zoom level (e.g., 662) (e.g., a graphical indication of "1×" and/or "2×" and/or a graphical indication of a zoom level at which the representation of the second portion of the scene is or will be displayed). In some embodiments, the second graphical object is selectable (e.g., a switch, a button, and/or a toggle) that, when selected, selects (e.g., changes) a zoom level of the representation of the second portion of the scene. Displaying the second graphical object as indicating a zoom level enhances the user interface by providing an indication of a current and/or future zoom level, which provides improved visual feedback.

In some embodiments, prior to displaying the representation of the second portion of the scene, the computer system detects an audio input (e.g., 614), wherein the first set of criteria includes a criterion that is based on the audio input (e.g., the first gesture is detected concurrently with the audio input and/or that the audio input meets audio input criteria (e.g., includes a voice command that matches the first gesture)). In some embodiments, in response to detecting the audio input and in accordance with a determination that the audio input satisfies an audio input criteria, the computer system displays the representation of the second portion of the scene (e.g., even if the first gesture does not satisfy the first set of criteria, without detecting the first gesture, the audio input is sufficient (by itself) to cause the computer system to display the representation of the second portion of the scene (e.g., in lieu of detecting the first gesture and a determination that the first gesture satisfies the first set of criteria)). In some embodiments, the criterion based on the audio input must be met in order to satisfy the first set of criteria (e.g., both the first gesture and the audio input are required to cause the computer system to display the representation of the second portion of the scene). Detecting an audio input prior to displaying the representation of the second portion of the scene and utilizing a criterion that is based on the audio input enhances the user interface as a user can control visual content that is displayed by speaking a request, which provides additional control options without cluttering the user interface.

In some embodiments, the first gesture includes a pointing gesture (e.g., 656*b*). In some embodiments, the representation of the first portion of the scene is displayed at a first zoom level. In some embodiments, displaying the representation of the second portion includes, in accordance with a determination that the pointing gesture is directed to an object in the scene (e.g., 660) (e.g., a book, drawing, electronic device, and/or surface), displaying a representation of the object at a second zoom level different from the first zoom level. In some embodiments, the second zoom level is based on a location and/or size of the object (e.g., a distance of the object from the one or more cameras). For example, the second zoom level can be greater (e.g., larger amount of zoom) for smaller objects or objects that are farther away from the one or more cameras than for larger objects or objects that are closer to the one or more cameras. In some embodiments, a distortion correction (e.g., amount and/or manner of distortion correction) applied to the representation of the object is based on a location and/or size of the object. For example, distortion correction applied to the representation of the object can be greater (e.g., more correction) for larger objects or objects that are closer to the one or more cameras than for smaller objects or objects that are farther from the one or more cameras. Displaying a representation of the object at a second zoom level different from the first zoom level when a pointing gesture is directed to an object in the scene enhances the user interface by allowing a user to zoom into an object without touching the device, which provides additional control options without cluttering the user interface.

In some embodiments, the first gesture includes a framing gesture (e.g., 656*c*) (e.g., two hands making a square). In some embodiments, the representation of the first portion of the scene is displayed at a first zoom level. In some embodiments, displaying the representation of the second portion includes, in accordance with a determination that the framing gesture is directed to (e.g., frames, surrounds, and/or outlines) an object in the scene (e.g., 660) (e.g., a book, drawing, electronic device, and/or surface), displaying a representation of the object at a second zoom level different from the first zoom level (e.g., as depicted in FIG. 6X). In some embodiments, the second zoom level is based on a location and/or size of the object (e.g., a distance of the object from the one or more cameras). For example, the second zoom level can be greater (e.g., larger amount of zoom) for smaller objects or objects that are farther away from the one or more cameras than for larger objects or objects that are closer to the one or more cameras. In some embodiments, a distortion correction (e.g., amount and/or manner of distortion correction) applied to the representation of the object is based on a location and/or size of the object. For example, distortion correction applied to the representation of the object can be greater (e.g., more correction) for larger objects or objects that are closer to the one or more cameras than for smaller objects or objects that are farther from the one or more cameras. In some embodiments, the second zoom level is based on a location and/or size of the framing gesture (e.g., a distance between two hands making the framing gesture and/or the distance of the framing gesture from the one or more cameras). For example, the second zoom level can be greater (e.g., larger amount of zoom) for larger framing gestures or framing gestures that are further from the one or more cameras than for smaller framing gestures or framing gestures that are closer to the one or more cameras. In some embodiments, a distortion correction (e.g., amount and/or manner of distortion correction) applied to the representation of the object is based on a location and/or size of the framing gesture. For example, distortion correction applied to the representation of the object can be greater (e.g., more correction) for larger framing gestures or framing gestures that are closer to the one or more cameras than for smaller framing gestures or framing gestures that are farther from the one or more cameras. Displaying a representation of the object at a second zoom level different from the first zoom level when a framing gesture is directed to an object in the scene enhances the user interface by allowing a user to zoom into an object without touching the device, which provides additional control options without cluttering the user interface.

In some embodiments, the first gesture includes a pointing gesture (e.g., 656*d*). In some embodiments, displaying the representation of the second portion includes, in accordance with a determination that the pointing gesture is in a first direction, panning image data (e.g., without physically panning the one or more cameras) in the first direction of the pointing gesture (e.g., as depicted in FIGS. 6Y-6Z). In some embodiments, panning the image data in the first direction of the pointing gesture includes changing a distortion correction applied to image data captured by the one or more cameras (e.g., applying a different distortion correction to the representation of the second portion of the scene compared to a distortion correction applied to the representation of the first portion of the scene). In some embodiments, displaying the representation of the second portion includes, in accordance with a determination that the pointing gesture is in a second direction, panning image data (e.g., without physically panning the one or more cameras) in the second direction of the pointing gesture. In some embodiments, panning the image data in the second direction of the pointing gesture includes changing a distortion correction applied to image data captured by the one or more cameras (e.g., applying a different distortion correction to the representation of the second portion of the scene compared to a distortion correction applied to the representation of the first portion of the scene and/or a distortion correction applied when panning the image data in first direction of the pointing gesture). Panning image data in the respective direction of a pointing gesture enhances the user interface by allowing a user to pan image data without touching the device, which provides additional control options without cluttering the user interface.

In some embodiments, displaying the representation of the first portion of the scene includes displaying a representation of a user. In some embodiments, displaying the representation of the second portion includes maintaining display of the representation of the user (e.g., as depicted in FIG. 6Z) (e.g., while panning the image data in the first direction and/or the second direction of the pointing gesture). Panning image data while maintaining a representation of a user enhances the video communication session experience by ensure that participants can still view a user despite panning image data, which reduces the number of inputs needed to perform an operation.

In some embodiments, the first gesture includes (e.g., is) a hand gesture (e.g., 656*e*). In some embodiments, displaying the representation of the first portion of the scene includes displaying the representation of the first portion of the scene at a first zoom level. In some embodiments, displaying the representation of the second portion of the scene includes displaying the representation of the second portion of the scene at a second zoom level different from the first zoom level (e.g., as depicted in FIGS. 6AA-6AB) (e.g., the computer system zooms the view of the scene captured by the one or more cameras in and/or out in response to detecting the hand gesture and, optionally, in accordance with a determination that the first gesture includes a hand gesture that corresponds to a zoom command (e.g., a pose and/or movement of the hand gesture satisfies a set of criteria corresponding to a zoom command)). In some embodiments, the first set of criteria includes a criterion that is based on a pose of the hand gesture. In some embodiments, displaying the representation of the second portion of the scene at a second zoom level different from the first zoom level includes changing a distortion correction applied to image data captured by the one or more cameras (e.g., applying a different distortion correction to the representation of the second portion of the scene compared to a distortion correction applied to the representation of the first portion of the scene). Changing a zoom level from a first zoom level to a second zoom level when the first gesture is a hand gesture enhances the user interface by allowing a user to use his or her hand(s) modify a zoom level without touching the device, which provides additional control options without cluttering the user interface.

In some embodiments, the hand gesture to display the representation of the second portion of the scene at the second zoom level includes a hand pose holding up two fingers (e.g., 666) corresponding to an amount of zoom. In some embodiments, in accordance with a determination that the hand gesture includes a hand pose holding up two fingers, the computer system displays the representation of the second portion of the scene at a predetermined zoom level (e.g., 2× zoom). In some embodiments, the computer system displays a representation of the scene at a zoom level that is based on how many fingers are being held up (e.g., one finger for 1× zoom, two fingers for 2× zoom, or three fingers for a 0.5× zoom). In some embodiments, the first set of criteria includes a criterion that is based on a number of fingers being held up in the hand gesture. Utilizing a number of fingers to change a zoom level enhances the user interface by allowing a user to switch between zoom levels quickly and efficiently, which performs an operation when a set of conditions has been met without requiring further user input.

In some embodiments, the hand gesture to display the representation of the second portion of the scene at the second zoom level includes movement (e.g., toward and/or away from the one or more cameras) of a hand corresponding to an amount of zoom (e.g., 668 and/or 670 as depicted in FIG. 6AC) (and, optionally, a hand pose with an open palm facing toward or away from the one or more cameras). In some embodiments, in accordance with a determination that the movement of the hand gesture is in a first direction (e.g., toward the one or more cameras or away from the user), the computer system zooms out (e.g., the second zoom level is less than the first zoom level); and in accordance with a determination that the movement of the hand gesture is in a second direction that is different from the first direction (e.g., opposite the first direction, away from the one or more cameras, and/or toward the user), the computer system zooms in (e.g., the second zoom level is less than the first zoom level). In some embodiments, the zoom level is modified based on an amount of the movement (e.g., a greater amount of the movement corresponds to a greater change in the zoom level and a lesser amount of the movement corresponds to a lesser change in zoom). In some embodiments, in accordance with a determination that the movement of the hand gesture includes a first amount of movement, the computer system zooms a first zoom amount (e.g., the second zoom level is greater or less than the first zoom level by a first amount); and in accordance with a determination that the movement of the hand gesture includes a second amount of movement that is different from the first amount of movement, the computer system zooms a second zoom amount that is different from the first zoom amount (e.g., the second zoom level is greater or less than the first zoom level by a second amount). In some embodiments, the first set of criteria includes a criterion that is based on a movement (e.g., direction, speed, and/or magnitude) of movement of a hand gesture. In some embodiments, the computer system displays (e.g., adjusts) a representation of the scene in accordance with movement of the hand gesture. Utilizing a movement of a hand gesture to change a zoom level enhances the user interface by allowing a user to fine tune the level of zoom, which provides additional control options without cluttering the user interface.

In some embodiments, the representation of the first portion of the scene includes a representation of a first area of the scene (e.g., 658-1) (e.g., a foreground and/or a user) and a representation of a second area of the scene (e.g., 658-2) (e.g., a background and/or a portion outside of the user). In some embodiments, displaying the representation of the second portion of the scene includes maintaining an appearance of the representation of the first area of the scene and modifying (e.g., darken, tinting, and/or blurring) an appearance of the representation of the second area of the scene (e.g., as depicted in FIG. 6T) (e.g., the background and/or the portion outside of the user). Maintaining an appearance of the representation of the first area of the scene while modifying an appearance of the representation of the second area of the scene enhances the video communication session experience by allowing a user to manipulate an appearance of a specific area if the user wants to focus participant's attention on specific areas and/or if a user does not like how a specific area appears when it is displayed, which provides additional control options without cluttering the user interface.

Note that details of the processes described above with respect to method 800 (e.g., FIG. 8) are also applicable in an analogous manner to the methods described herein. For example, methods 700, 1000, 1200, 1400, 1500, 1700, and 1900 optionally include one or more of the characteristics of the various methods described above with reference to method 800. For example, the methods 700, 1000, 1200, 1400, 1500, 1700, and 1900 can include a non-touch input to manage the live communication session, modify image data captured by a camera of a local computer (e.g., associated with a user) or a remote computer (e.g., associated with a different user), assist in adding physical marks to a digital document, facilitate better collaboration and sharing of content, and/or manage what portions of a surface view are shared (e.g., prior to sharing the surface view and/or while the surface view is being shared). For brevity, these details are not repeated herein.

FIGS. 9A-9T illustrate exemplary user interfaces for displaying images of multiple different surfaces during a live video communication session, in accordance with some embodiments. The user interfaces in these figures are used to illustrate the processes described below, including the processes in FIG. 10.

At FIG. 9A, first user 902*a* (e.g., "USER 1") is located in first physical environment 904*a*, which includes first electronic device 906*a* positioned on first surface 908*a* (e.g., a desk and/or a table). In addition, second user 902*b* (e.g., "USER 2") is located in second physical environment 904*b* (e.g., a physical environment remote from first physical environment 904*a*), which includes second electronic device 906*b* and book 910 that are each positioned on second surface 908*b*. Similarly, third user 902*c* (e.g., "USER 3") is located in third physical environment 904*c* (e.g., a physical environment that is remote from first physical environment 904*a* and/or second physical environment 904*b*), which includes third electronic device 906*c* and plate 912 that are each positioned on third surface 908*c*. Further still, fourth user 902*d* (e.g., "USER 4") is located in fourth physical environment 904*d* (e.g., a physical environment that is remote from first physical environment 904*a*, second physical environment 904*b*, and/or third physical environment 904*c*), which includes fourth electronic device 906*d* and fifth electronic device 914 that are each positioned on fourth surface 908*d*.

At FIG. 9A, first user 902*a*, second user 902*b*, third user 902*c*, and fourth user 902*d* are each participating in a live video communication session (e.g., a video call and/or a video chat) with one another via first electronic device 906*a*, second electronic device 906*b*, third electronic device 906*c*, and fourth electronic device 906*d*, respectively. In some embodiments, first user 902*a*, second user 902*b*, third user 902*c*, and fourth user 902*d* are located in remote physical environments from one another, such that direct communication (e.g., speaking and/or communicating directly to one another without the use of a phone and/or electronic device) with one another is not possible. As such, first electronic device 906*a*, second electronic device 906*b*, third electronic device 906*c*, and fourth electronic device 906*d* are in communication with one another (e.g., indirect communication via a server) to enable audio data, image data, and/or video data to be captured and transmitted between first electronic device 906*a*, second electronic device 906*b*, third electronic device 906*c*, and fourth electronic device 906*d*. For instance, each of electronic devices 906*a*-906*d* include cameras 909*a*-909*d* (shown at FIG. 9B), respectively, which capture image data and/or video data that is transmitted between electronic devices 906*a*-906*d*. In addition, each of electronic devices 906*a*-906*d* include a microphone that captures audio data, which is transmitted between electronic devices 906*a*-906*d* during operation.

FIGS. 9B-9I, 9L, 9N, 9P, 9S, and 9T illustrate exemplary user interfaces displayed on electronic devices 906*a*-906*d* during the live video communication session. While each of electronic devices 906*a*-906*d* are illustrated, described examples are largely directed to the user interfaces displayed on and/or user inputs detected by first electronic device 906*a*. It should be understood that, in some examples, electronic devices 906*b*-906*d* operate in an analogous manner as electronic device 906*a* during the live video communication session. Accordingly, in some examples, electronic devices 906*b*-906*d* display similar user interfaces (modified based on which user 902*b*-902*d* is associated with the corresponding electronic device 906*b*-906*d*) and/or cause similar operations to be performed as those described below with reference to first electronic device 906*a*.

Figure 9B:
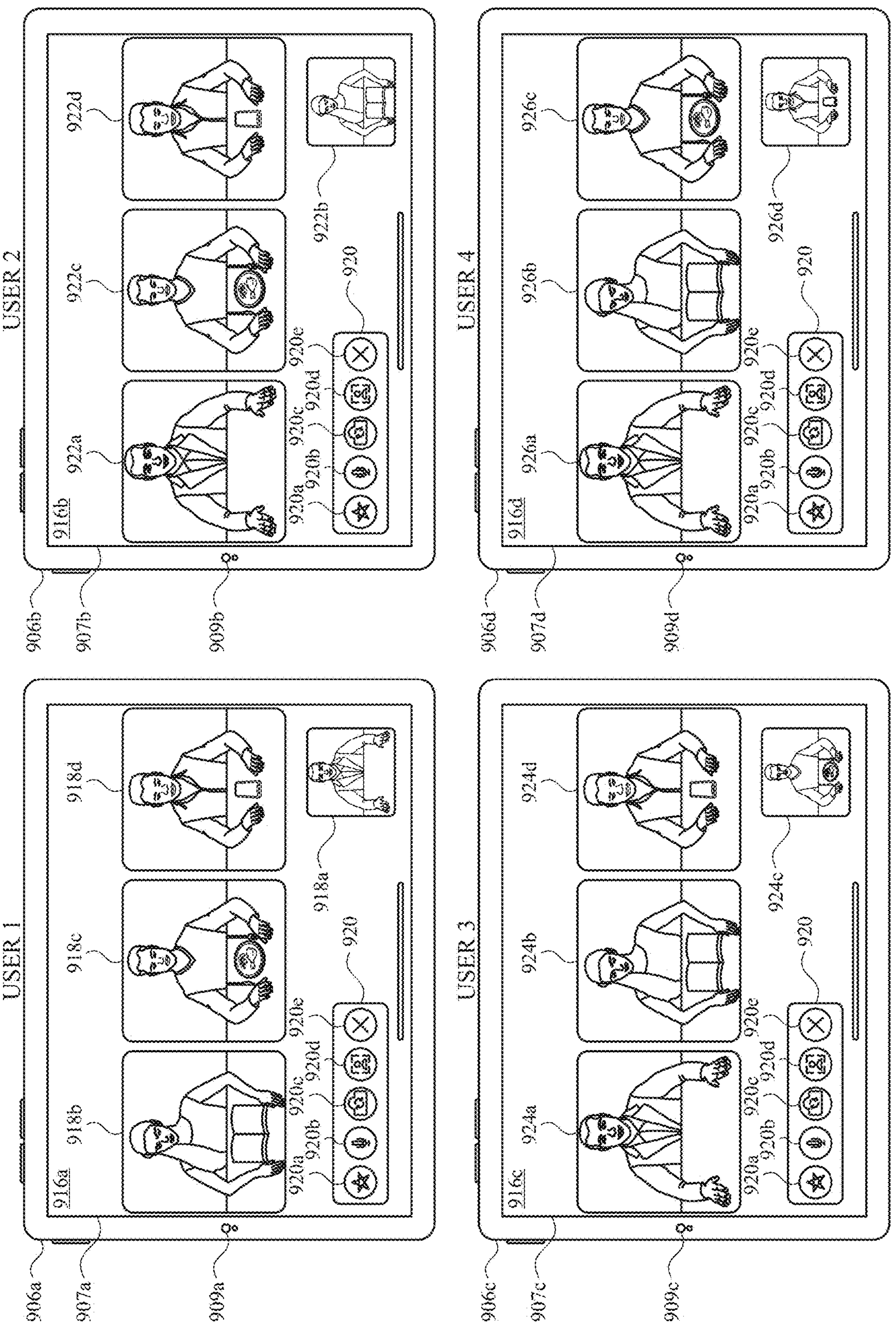
Figure 9C:
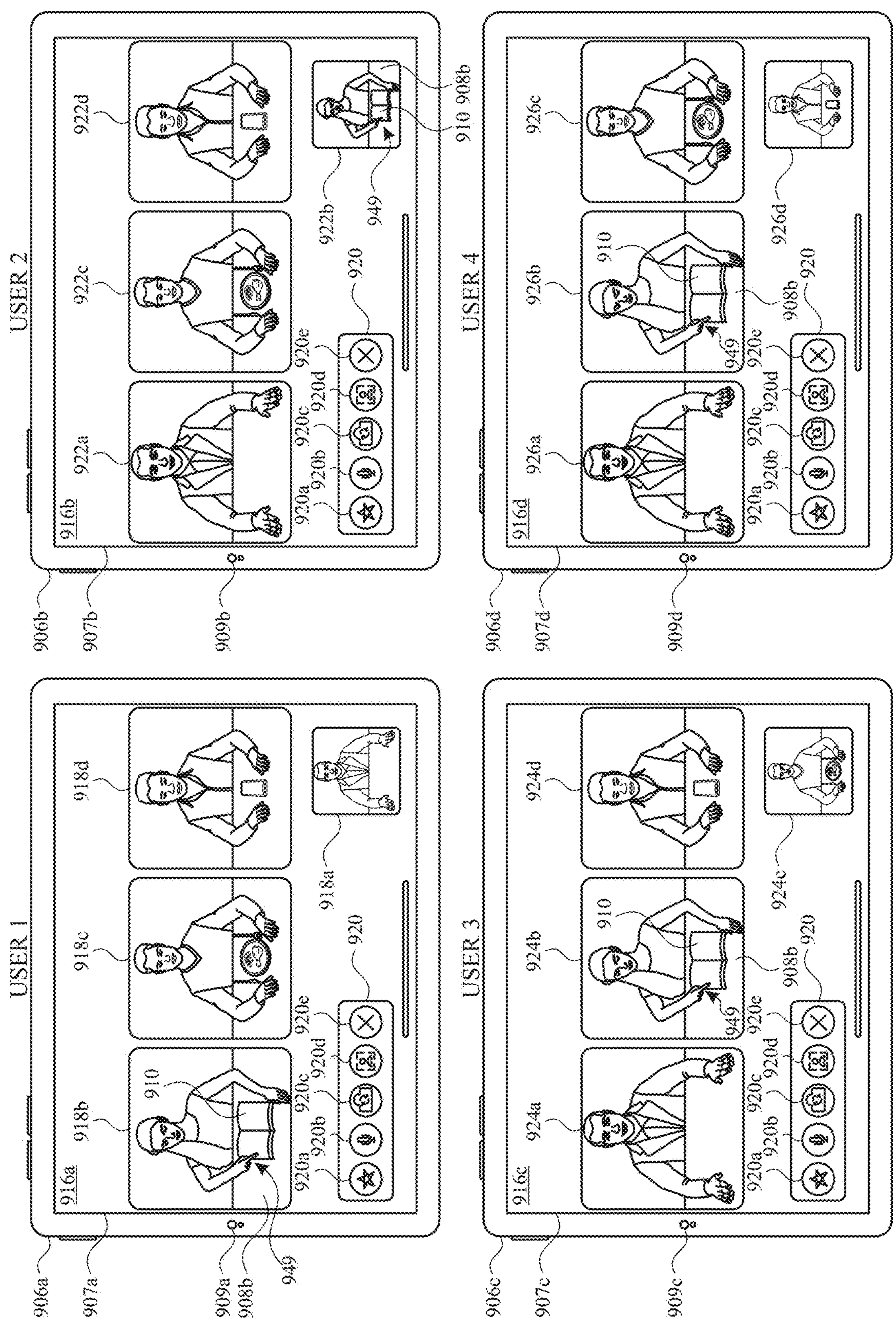

At FIG. 9B, first electronic device 906*a* (e.g., an electronic device associated with first user 902*a*) is displaying, via display 907*a*, first communication user interface 916*a* associated with the live video communication session in which first user 902*a* is participating. First communication user interface 916*a* includes first representation 918*a* including an image corresponding to image data captured via camera 909*a*, second representation 918*b* including an image corresponding to image data captured via camera 909*b o*, third representation 918*c* including an image corresponding to image data captured via camera 909*c*, and fourth representation 918*d* including an image corresponding to image data captured via camera 909*d*. At FIG. 9B, first representation 918*a* is displayed at a smaller size than second representation 918*b*, third representation 918*c*, and fourth representation 918*d* to provide additional space on display 907*a* for representations of users 902*b*-902*d* with whom first user 902*a* is communicating. In some embodiments, first representation 918*a* is displayed at the same size as second representation 918*b*, third representation 918*c*, and fourth representation 918*d*. First communication user interface 916*a* also includes menu 920 having user interface objects 920*a*-920*e* that, when selected via user input, cause first electronic device 906*a* to adjust one or more settings of first communication user interface 916*a* and/or the live video communication session.

Similar to first electronic device 906*a*, at FIG. 9B, second electronic device 906*b* (e.g., an electronic device associated with second user 902*b*) is displaying, via display 907*b*, first communication user interface 916*b* associated with the live video communication session in which second user 902*b* is participating. First communication user interface 916*b* includes first representation 922*a* including an image corresponding to image data captured via camera 909*a*, second representation 922*b* including an image corresponding to image data captured via camera 909*b*, third representation

922*c* including an image corresponding to image data captured via camera 909*c*, and fourth representation 922*d* including an image corresponding to image data captured via camera 909*d*

At FIG. 9B, third electronic device 906*c* (e.g., an electronic device associated with third user 902*c*) is displaying, via display 907*c*, first communication user interface 916*c* associated with the live video communication session in which third user 902*c* is participating. First communication user interface 916*c* includes first representation 924*a* including an image corresponding to image data captured via camera 909*a*, second representation 924*b* including an image corresponding to image data captured via camera 909*b*, third representation 924*c* including an image corresponding to image data captured via camera 909*c*, and fourth representation 924*d* including an image corresponding to image data captured via camera 909*d*.

Further still, at FIG. 9B, fourth electronic device 906*d* (e.g., an electronic device associated with fourth user 902*d*) is displaying, via display 907*d*, first communication user interface 916*d* associated with the live video communication session in which fourth user 902*d* is participating. First communication user interface 916*d* includes first representation 926*a* including an image corresponding to image data captured via camera 909*a*, second representation 926*b* including an image corresponding to image data captured via camera 909*b*, third representation 926*c* including an image corresponding to image data captured via camera 909*c*, and fourth representation 926*d* including an image corresponding to image data captured via camera 909*d*.

In some embodiments, electronic devices 906-906*d* are configured to modify an image of one or more representations. In some embodiments, modifications are made to images in response to detecting user input. During the live video communication session, for example, first electronic device 906*a* receives data (e.g., image data, video data, and/or audio data) from electronic devices 906*b*-906*d* and in response displays representations 918*b*-918*d* based on the received data. In some embodiments, first electronic device 906*a* thereafter adjusts, transforms, and/or manipulates the data received from electronic devices 906*b*-906*d* to modify (e.g., adjust, transform, manipulate, and/or change) an image of representations 918*b*-918*d*. For example, in some embodiments, first electronic device 906*a* applies skew and/or distortion correction to an image received from second electronic device 906*b*, third electronic device 906*c*, and/or fourth electronic device 906*d*. In some examples, modifying an image in this manner allows first electronic device 906*a* to display one or more of physical environments 904*b*-904*d* from a different perspective (e.g., an overhead perspective of surfaces 908*b*-908*d*). In some embodiments, first electronic device 906*a* additionally or alternatively modifies one or more images of representations by applying rotation to the image data received from electronic devices 906*b*-906*d*. In some embodiments, first electronic device 906 receives adjusted, transformed, and/or manipulated data from at least one of electronic devices 906*b*-906*d*, such that first electronic device 906*a* displays representations 918*b*-918*d* without applying skew, distortion correction, and/or rotation to the image data received from at least one of electronic devices 906*b*-906*d*. At FIG. 9C, for instance, first electronic device 906*a* displays first communication user interfaces 916*a*. As shown, second user 902*b* has performed gesture 949 (e.g., second user 902*b* pointing their hand and/or finger) toward book 910 that is positioned on second surface 908*b* within second physical environment 904*b*. Camera 909*b* of second electronic device 906*b* captures image data and/or video data of second user 902*b* making gesture 949. First electronic device 906*a* receives the image data and/or video data captured by second electronic device 906*b* and displays second representations 918*b* showing second user 902*b* making gesture 949 toward book 910 positioned on second surface 908*b*.

Figure 9D:
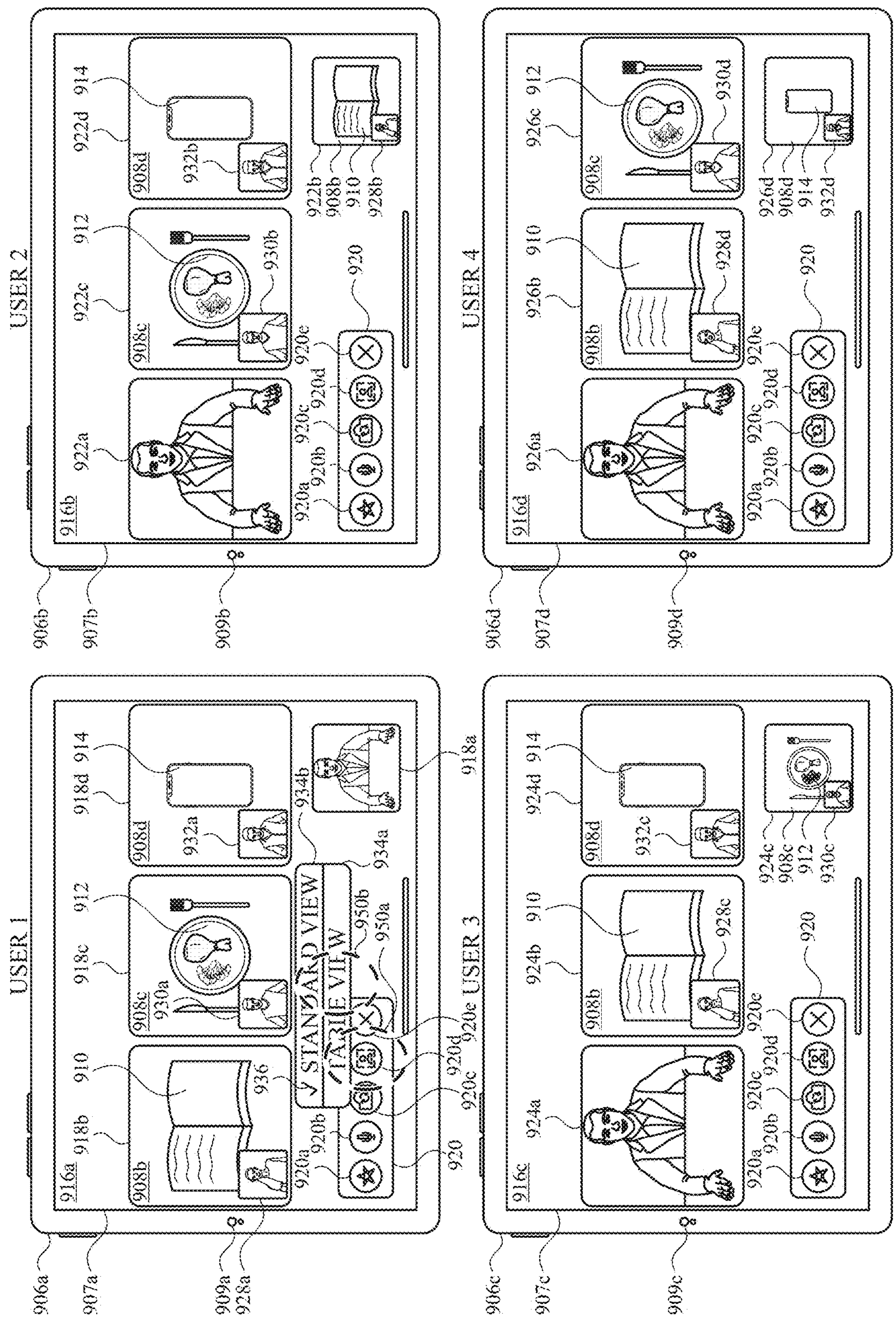
Figure 9E:
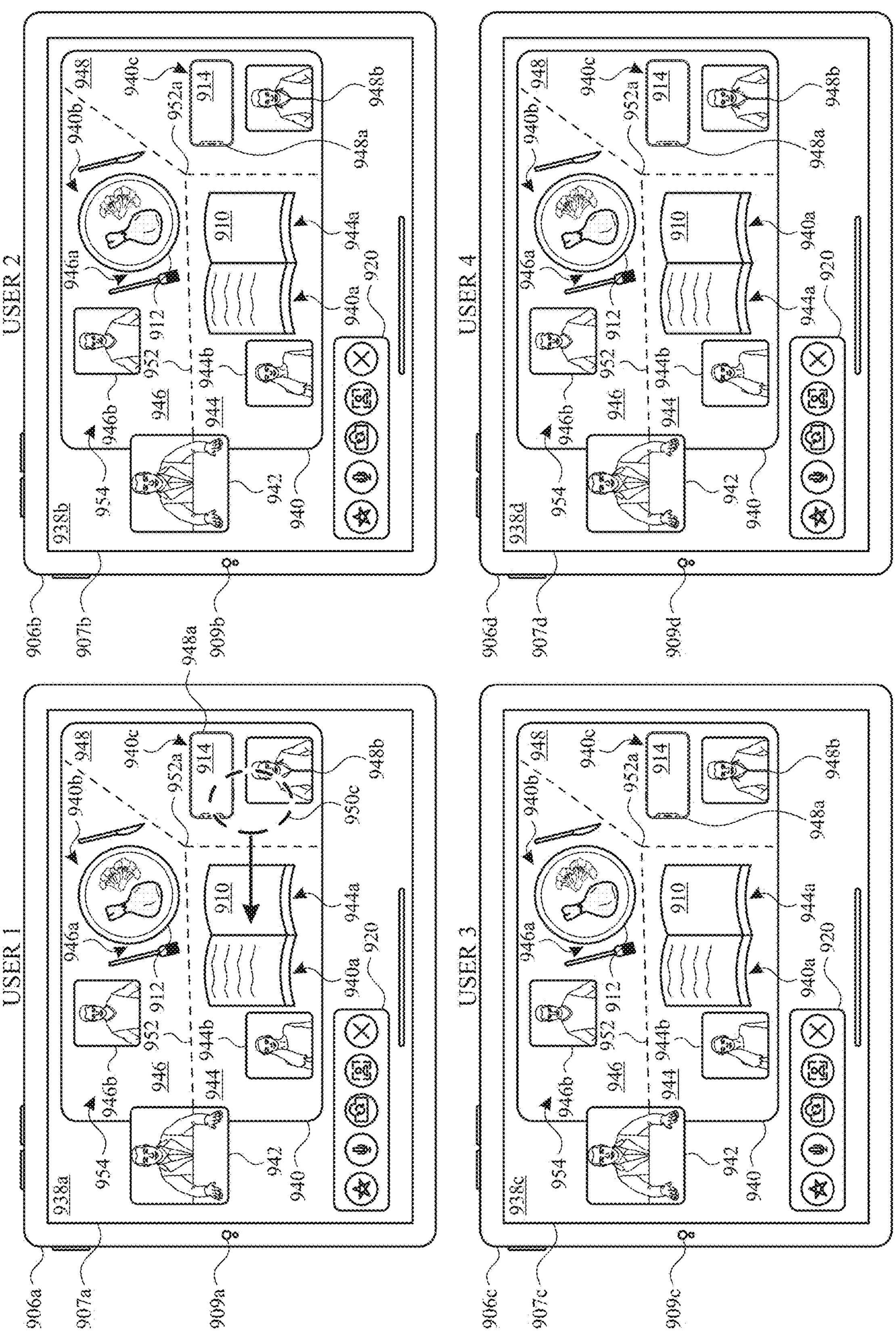

With reference to FIGS. 9D and 9E, first electronic device 906*a* detects gesture 949 (and/or receives data indicative of gesture 949 detected by second electronic device 906*b*) performed by second user 902*b* and recognizes gesture 949 as a request to modify an image of second representation 918*b* corresponding to second user 902*b* (e.g., cause a modification to a perspective and/or a portion of second physical environment 904*b* included in second representation 918*b*). In particular, first electronic device 906*a* recognizes and/or receives an indication that gesture 949 performed by second user 902*b* is a request to modify an image of second representation 918*b* to show an enlarged and/or close-up view of surface 908*b*, which includes book 910. Accordingly, at FIG. 9D, first electronic device 906*a* modifies second representation 918*b* to show an enlarged and/or close-up view of surface 908*b*. Similarly, electronic devices 906*b*-906*d* also modify images of second representations 922*b*, 924*b*, and 926*d* in response to gesture 949.

At FIG. 9D, third user 902*c* and fourth user 902*d* have also performed a gesture and/or provided a user input representing a request to modify an image of the representations corresponding to third user 902*c* (e.g., third representations 918*c*, 922*c*, 924*c*, and 926*c*) and fourth user 902*d* (e.g., fourth representations 918*d*, 922*d*, 924*d*, and 926*d*), respectively. With reference to FIGS. 9A-9G, third user 902*c* can provide gesture 949 (e.g., pointing toward surface 908*c*) and/or provide one or more user inputs (e.g., user inputs 612*b*, 612*c*, 612*f*, and/or 612*g* selecting affordances 607-1, 607-2, and/or 610) that, when detected by one or more of electronic devices 906*a*-906*d*, cause electronic devices 906*a*-906*d* to modify third representations 918*c*, 922*c*, 924*c*, and 926*c*, respectively, to show an enlarged and/or close-up view of third surface 908*c*. Similarly, fourth user 902*d* can provide gesture 949 (e.g., pointing toward surface 908*d*) and/or provide the one or more user inputs (e.g., user inputs 612*b*, 612*c*, 612*f*, and/or 612*g* selecting affordances 607-1, 607-2, and/or 610) that, when detected by one or more of electronic devices 906*a*-906*d*, cause electronic devices 906*a*-906*d* to modify fourth representations 918*d*, 922*d*, 924*d*, and 926*d* to show an enlarged and/or close-up view of fourth surface 908*d*.

In response to receiving an indication of gesture 949 (e.g., via image data and/or video data received from second electronic device 906*b* and/or via data indicative of second electronic device 906*b* detecting gesture 949) and/or the one or more user inputs provided by users 902*b*-902*d*, first electronic device 906*a* modifies image data so that representations 918*b*-918*d* include an enlarged and/or close-up view of surfaces 908*b*-908*d* from a perspective of user 902*b*-902*d* sitting in front of respective surfaces 908*b*-908*d* without moving and/or otherwise changing an orientation of cameras 909*b*-909*d* with respect to surfaces 908*b*-908*d*. In some embodiments, modifying images of representations in this manner includes applying skew, distortion correction and/or rotation to image data corresponding to the representations. In some embodiments the amount of skew and/or distortion correction applied is determined based at least partially on a distance between cameras 909*b*-909*d* and respective surfaces 908*b*-908*d*. In some such embodiments, first electronic device 906*a* applies different amounts of skew and/or distortion correction to the data received from each of second electronic device 906*b*, third electronic device 906*c*, and fourth electronic device 906*d*. In some embodiments, first electronic device 906*a* modifies the data, such that a representation of the physical environment captured via cameras 909*b*-909*d* is rotated relative to an actual position of cameras 909*b*-909*d* (e.g., representations of surfaces 908*b*-908*d* displayed on first communication user interfaces 916*a*-916*d* appear rotated 180 degrees and/or from a different perspective relative to an actual position of cameras 909*b*-909*d* with respect to surfaces 908*b*-908*d*). In some embodiments, first electronic device 906*a* applies an amount of rotation to the data based on a position of cameras 909*b*-909*d* with respect to surfaces 908*b*-908*d*, respectively. As such, in some embodiments, first electronic devices 906*a* applies a different amount of rotation to the data received from second electronic device 906*b*, third electronic device 906*c*, and/or fourth electronic device 906*d*.

Accordingly, at FIG. 9D, first electronic device 906*a* displays second representation 918*b* with a modified image of second physical environment 904*b* that includes an enlarged and/or close-up view of surface 908*b* having book 910, third representation 918*c* with a modified image of third physical environment 904*c* that includes an enlarged and/or close-up view of surface 908*c* having plate 912, and fourth representation 918*d* with a modified image of fourth physical environment 904*d* that includes an enlarged and/or close-up view of surface 908*d* having fifth electronic device 914. Because first electronic device 906*a* does not detect and/or receive an indication of a gesture and/or user input requesting modification of first representation 918*a*, first electronic device 906*a* maintains first representation 918*a* with the view of first user 902*a* and/or first physical environment 904*a* that was shown at FIGS. 9B and 9C.

In some embodiments, first electronic device 906*a* determines (e.g., detects) that an external device (e.g., an electronic device that is not be used to participate in the live video communication session) is displayed and/or included in one or more of the representations. In response, first electronic device 906*a* can, optionally, enable a view of content displayed on the screen of the external device to be shared and/or otherwise included in the one or more representations. For instance, in some such embodiments, fifth electronic device 914 communicates with first electronic device 906*a* (e.g., directly, via fourth electronic device 906*d*, and/or via another external device, such as a server) and provides (e.g., transmits) data related to the user interface and/or other images that are currently being displayed by fifth electronic device 914. Accordingly, first electronic device 906*a* can cause fourth representation 918*d* to include the user interface and/or images displayed by fifth electronic device 914 based on the received data. In some embodiments, first electronic device 906*a* displays fourth representation 918*d* without fifth electronic device 914, and instead only displays fourth representation 918*d* with the user interface and/or images currently displayed on fifth electronic device 914 (e.g., a user interface of fifth electronic device 914 is adapted to substantially fill the entirety of representation 918*d*).

In some embodiments, further in response to modifying an image of a representation, first electronic device 906*a* also displays a representation of the user. In this manner, user 902*a* may still view the user while a modified image is displayed. For example, as shown in FIG. 9D, in response to detecting the gesture requesting a modification of an image of second representation 918*b*, first electronic device 906*a* displays first communication user interface 916*a* having fifth representation 928*a* (e.g., and electronic devices 906*b*-906*d* display fifth representations 928*b*-928*d*) of second user 902*b* within second representation 918*b*. At FIG. 9D, fifth representation 928*a* includes a portion of second physical environment 904*b* that is separate and distinct from surface 908*b* and/or the portion of second physical environment 904*b* included in second representation 918*b*. For instance, while second representation 918*b* includes a view of surface 908*b*, surface 908*b* is not visible in fifth representation 928*a*. While second representation 918*b* and fifth representation 928*a* display distinct portions of second physical environment 904*b*, in some embodiments, the view of second physical environment 904*b* included in second representation 918*b* and the view of second physical environment 904*b* included in fifth representation 928*a* are both captured via the same camera, such as camera 909*b* of second electronic device 906*b*.

Similarly, at FIG. 9D, in response to detecting the gesture requesting to modify an image of third representation 918*c* corresponding to third user 902*c*, first electronic device 906*a* displays sixth representation 930*a* (e.g., and electronic devices 906*b*-906*d* displays sixth representations 930*b*-930*d*) within third representation 918*c*. Further, in response to detecting the gesture requesting to modify an image of fourth representation 918*d*, first electronic device 906*a* displays seventh representation 932*a* (e.g., and electronic devices 906*b*-906*d* display seventh representations 932*b*-932*d*) within fourth representation 918*d*.

While fifth representation 928*a* is shown as being displayed wholly within second representation 918*b*, in some embodiments, fifth representation 928*a* is displayed adjacent to and/or partially within second representation 918*b*. Similarly, in some embodiments, sixth representation 930*a* and seventh representation 932*a* are displayed adjacent to and/or partially within third representation 918*c* and fourth representation 918*d*. In some embodiments, fifth representation 928*a* is displayed within a predetermined distance (e.g., a distance between a center of fifth representation 928*a* and a center of a second representation 918*b*) of second representation 918*b*, sixth representation 930*a* is displayed within a predetermined distance (e.g., a distance between a center of sixth representation 930*a* and a center of third representation 918*c*) of third representation 918*c*, and seventh representation 932*a* is displayed within a predetermined distance (e.g., a distance between a center of seventh representation 932*a* and a center of fourth representation 918*d*) of fourth representation 918*d*. In some embodiments, first communication user interface 916*a* does not include one or more of representations 928*a*, 930*a*, and/or 932*a*.

At FIG. 9D, second representation 918*b*, third representation 918*c*, and fourth representation 918*d* are each displayed on first communication user interface 916*a* as separate representations that do not overlap or otherwise appear overlaid on one another. In other words, second representation 918*b*, third representation 918*c*, and fourth representation 918*d* of first communication user interface 916*a* are arranged side by side within predefined visual areas that do not overlap with one another.

At FIG. 9D, first electronic device 906*a* detects user input 950*a* (e.g., a tap gesture) corresponding to selection of video framing user interface object 920*d* of menu 920. In response to detecting user input 950*a*, first electronic device 906*a* displays table view user interface object 934*a* and standard view user interface object 934*b*, as shown at FIG. 9D. Standard view user interface object 934*b* includes indicator 936 (e.g., a check mark), which indicates that first communication user interface 916*a* is currently in a standard view and/or mode for the live video communication session. The standard view and/or mode for the live video communication session corresponds to the positions and/or layout of representations 918_a_-918_d_ being positioned adjacent to one another (e.g., side by side) and spaced apart. At FIG. 9D, first electronic device 906_a_ detects user input 950_b_ (e.g., a tap gesture) corresponding to selection of table view user interface object 934_a_. In response to detecting user input 950_b_, first electronic device 906_a_ displays second communication user interface 938_a_, as shown at FIG. 9E. In addition, after first electronic device 906_a_ detects user input 950_b_, electronic devices 906_b_-906_d_ receive an indication (e.g., from first electronic device 906_a_ and/or via a server) requesting electronic devices 906_b_-906_d_ display second communication user interfaces 938_b_-938_d_, respectively, as shown at FIG. 9E.

At FIG. 9E, second communication user interface 938_a_ includes table view region 940 and first representation 942. Table view region 940 includes first sub-region 944 corresponding to second physical environment 904_b_ in which second user 902_b_ is located at first position 940_a_ of table view region 940, second sub-region 946 corresponding to third physical environment 904_c_ in which third user 902_c_ is located at second position 940_b_ of table view region 940, and third sub-region 948 corresponding to fourth physical environment 904_d_ in which fourth user 902_d_ is located at third position 940_c_ of table view region 940. At FIG. 9E, first sub-region 944, second sub-region 946, and third sub-region 948 are separated via boundary 952 to highlight positions 940_a_-940_c_ of table view region 940 that correspond to users 902_b_, 902_c_, and 902_d_, respectively. However, in some embodiments, first electronic device 906_a_ does not display boundaries 952 on second communication user interface 938_a_.

In some embodiments, a table view region (e.g., table view region 940) includes sub-regions for each electronic device providing a modified surface view at a time when selection of table view user interface object 934_a_ is detected. For example, as shown in FIG. 9E, table view region 940 includes three sub-regions 944, 946, and 948 corresponding to devices 906_b_-906_d_, respectively.

As shown at FIG. 9E, table view region 940 includes first representation 944_a_ of surface 908_b_, second representation 946_a_ of surface 908_c_, and third representation 948_a_ of surface 908_d_. First representation 944_a_, second representation 946_a_, and third representation 948_a_ are positioned on surface 954 of table view region 940, such that book 910, plate 912, and fifth electronic device 914 each appear to be positioned on a common surface (e.g., surface 954). In some embodiments, surface 954 is a virtual surface (e.g., a background image, a background color, an image representing a surface of a desk and/or table).

In some embodiments, surface 954 is not representative of any surface within physical environments 904_a_-904_d_ in which users 902_a_-902_d_ are located. In some embodiments, surface 954 is a reproduction of (e.g., an extrapolation of, an image of, a visual replica of) an actual surface located in one of physical environments 904_a_-904_d_. For instance, in some embodiments, surface 954 includes a reproduction of surface 908_a_ within first physical environment 904_a_ when first electronic device 906_a_ detects user input 950_b_. In some embodiments, surface 954 includes a reproduction of an actual surface corresponding to a particular position (e.g., first position 640_a_) of table view region 940. For instance, in some embodiments, surface 954 includes a reproduction of surface 908_b_ within second physical environment 904_b_ when first sub-region 944 is at first position 940_a_ of table view region 940 and first sub-region 944 corresponds to surface 908_b_.

In addition, at FIG. 9E, first sub-region 944 includes fourth representation 944_b_ of second user 902_b_, second sub-region 946 includes fifth representation 946_b_ of third user 902_c_, and third sub-region 948 includes sixth representation 948_b_ of fourth user 902_d_. As set forth above, first representation 944_a_ and fourth representation 944_b_ correspond to different portions (e.g., are directed to different views) of second physical environment 904_b_. Similarly, second representation 946_a_ and fifth representation 946_b_ correspond to different portions of third physical environment 904_c_. Further still, third representation 948_a_ and sixth representation 948_b_ correspond to different portions of fourth physical environment 904_d_. In some embodiments, second communication user interfaces 938_a_-938_d_ do not display fourth representation 944_b_, fifth representation 946_b_, and sixth representation 948_b_.

In some embodiments, table view region 940 is displayed by each of devices 906_a_-906_d_ with the same orientation (e.g., sub-regions 944, 946, and 948 are in the same positions on each of second communication user interfaces 938_a_-938_d_).

In some embodiments, user 902_a_ may wish to modify an orientation (e.g., a position of sub-regions 944, 946, and 948 with respect to an axis 952_a_ formed by boundaries 952) of table view region 940 to view one or more representations of surfaces 908_b_-908_d_ from a different perspective. For example, at FIG. 9E, first electronic device 906_a_ detects user input 950_c_ (e.g., a swipe gesture) corresponding to a request to rotate table view region 940. In response to detecting user input 950_c_, first electronic device 906_a_ causes table view region 940 of each of second communication user interfaces 938_a_-938_d_ to rotate sub-regions 944, 946, and 948 (e.g., about axis 952_a_), as shown in FIG. 9G. While FIG. 9E shows first electronic device 906_a_ detecting user input 950_c_, in some embodiments, user input 950_c_ can be detected by any one of electronic devices 906_a_-906_d_ and cause table view region 940 of each of second communication user interfaces 938_a_-938_d_ to rotate.

In some embodiments, when rotating table view region 940, electronic device 906_a_ displays an animation illustrating the rotation of table view region 940. For example, at FIG. 9F, electronic device 906_a_ displays a frame of the animation (e.g., a multi-frame animation). It will be appreciated that while a single frame of animation is shown in FIG. 9F, electronic device 906_a_ can display an animation having any number of frames.

Figure 9F:
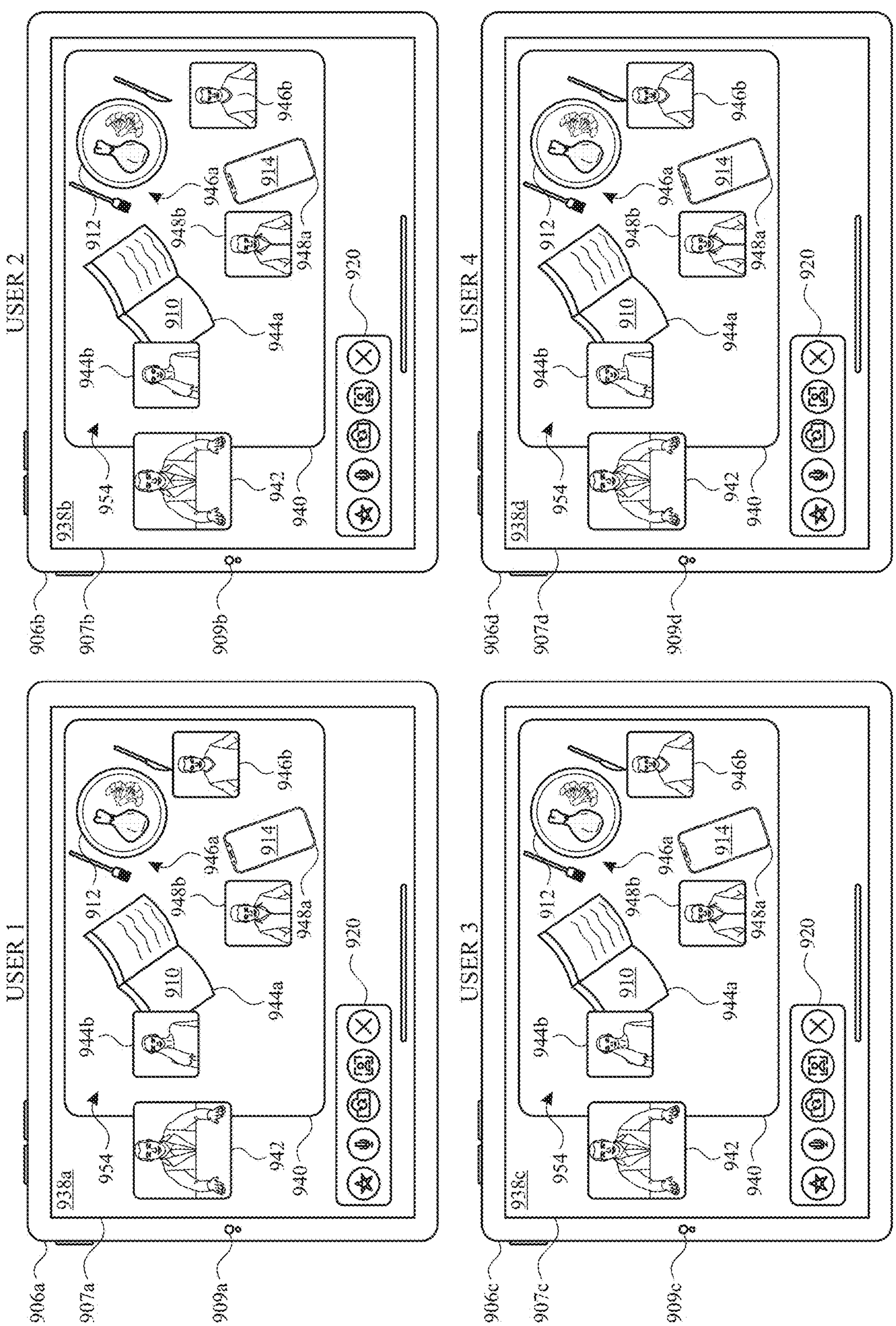
Figure 9G:
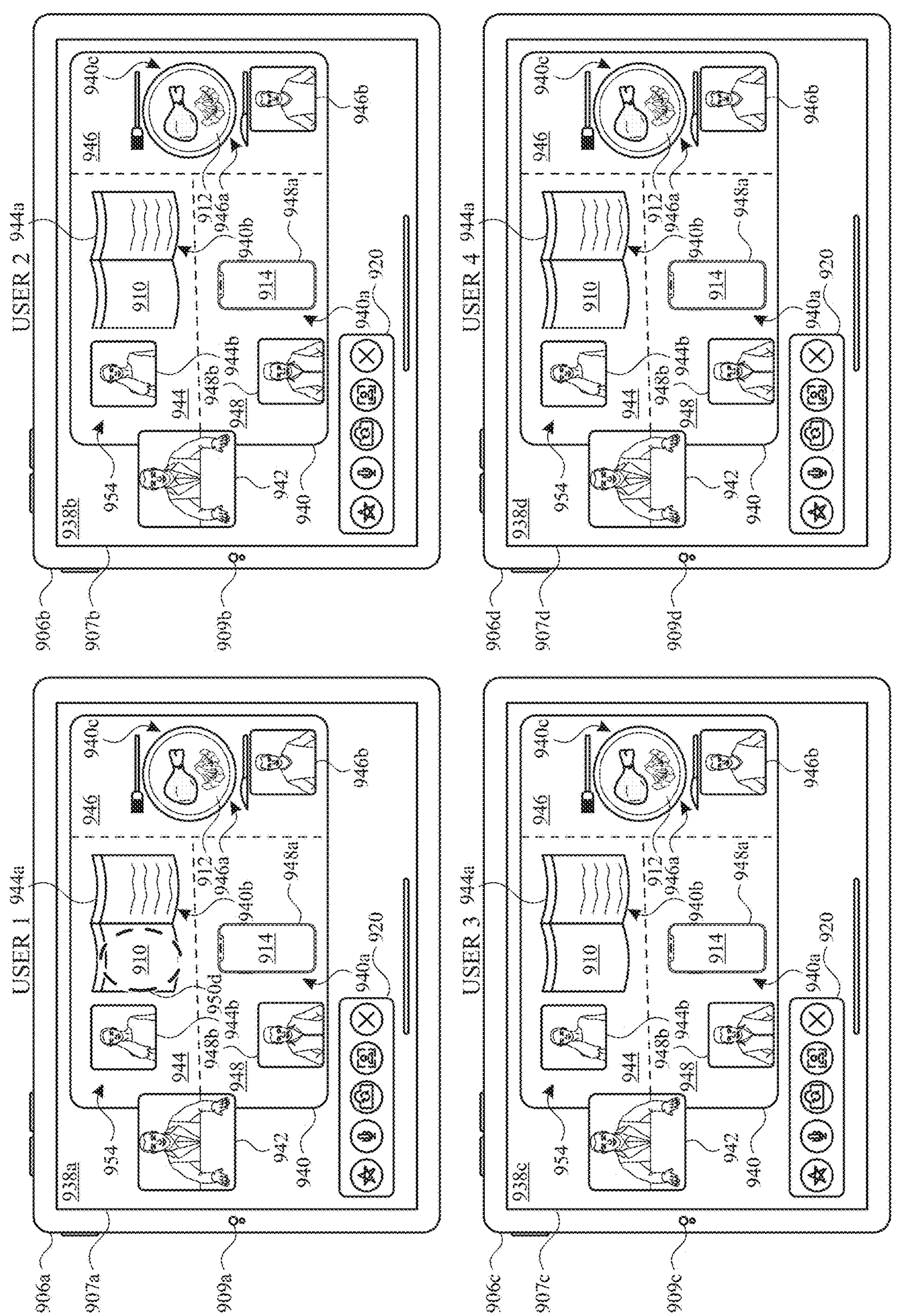

As shown in FIG. 9F, due to the rotation of table view region 940, book 910, plate 912, and fifth electronic device 914 have moved in a clockwise direction as compared to their respective positions on second communication user interfaces 938_a_-938_d_ (FIG. 9E). In some embodiments, book 910, plate 912, and fifth electronic device 914 move in a direction (e.g., a direction about axis 952_a_) based on a directional component of user input 950_c_. For instance, user input 950_c_ includes a left swipe gesture on sub-region 948 of table view region 940, thereby causing sub-region 948 (and sub-regions 944 and 946) to move in a clockwise position about axis 952_a_. In some embodiments, one or more of electronic devices 906_a_-906_d_ do not display one or more frames of the animation (e.g., only first electronic device 906_a_, which detected user input 950_c_, displays the animation).

At FIG. 9G, electronic device 906_a_ displays second communication user interfaces 938_a_-938_d_, respectively, after table view region 940 has been rotated (e.g., after the last frame of the animation is displayed). For instance, table view region 940 includes third sub-region 948 at first position 940*a* of table view region 940, first sub-region 944 at second position 940*b* of table view region 940, and second sub-region 946 at third position 940*c* of table view region 940. At FIG. 9G, first electronic device 906*a* modifies an orientation of each of book 910, plate 912, and fifth electronic device 914 in response to the change in positions of sub-regions 944, 946, and 948 on table view region 940. For instance, the orientation of book 910 has been rotated 180 degrees as compared to the initial orientation of book 910 (FIG. 9E). In some embodiments, representations 944*a*, 946*a*, and/or 948*a* are modified (e.g., in response to user input 950*c*) so that the representations appear to be oriented around surface 954 as if users 902*b*-902*d* were sitting around a table (e.g., and each user 902*a*-902*d* is viewing surface 954 from the perspective of sitting at first position 940*a* of table view region 940).

In some embodiments, electronic devices 906*a*-906*d* do not display table view region 940 in the same orientation (e.g., sub-regions 944, 946, and 948 positioned at the same positions 940*a*-940*c*) as one another. In some such embodiments, table view region 940 includes a sub-region 944, 946, and/or 948 at first position 940*a* that corresponds to a respective electronic device 906*a*-906*d* displaying table view region 940 (e.g., second electronic device 906*b* displays sub-region 944 at first position 940*a*, third electronic device 906*c* displays sub-region 946 at first position 940*a*, and fourth electronic device 906*d* displays sub-region 948 at first position 940*a*). In some embodiments, in response to detecting user input 950*c*, first electronic device 906*a* only causes a modification to the orientation of table view region 940 displayed on first electronic device 906*a* (and not table view region 940 shown on electronic devices 906*b*-906*d*).

Figure 9H:
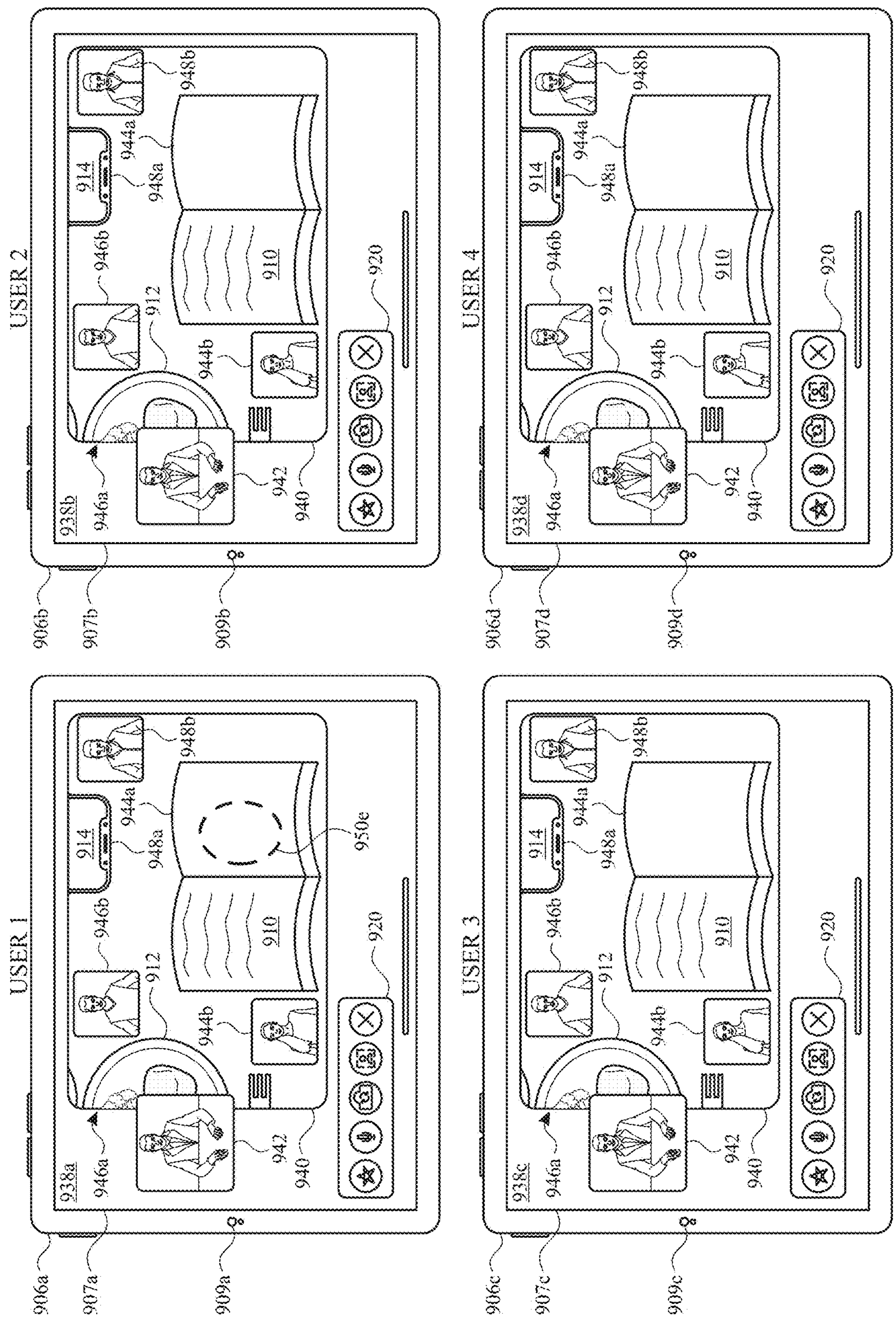

At FIG. 9G, first electronic device 906*a* detects user input 950*d* (e.g., a tap gesture, a double tap gesture, a de-pinch gesture, and/or a long press gesture) at a location corresponding to sub-region 944 of table view region 940. In response to detecting user input 950*d*, first electronic device 906*a* causes second communication user interface 938*a* to modify (e.g., enlarge) display of table view region 940 and/or magnify an appearance of first representation 944*a* of surface 908*b*. In response to detecting user input 950*d*, first electronic device 906*a* causes electronic devices 906*b*-906*d* to modify (e.g., enlarge) and/or magnify the appearance of first representation 944*a*. As shown in FIG. 9H, this includes magnifying book 910 in some examples. In some embodiments, first electronic device 906*a* does not cause electronic devices 906*b*-906*d* to modify (e.g., enlarge) and/or magnify the appearance of first representation 944*a* (e.g., in response to detecting user input 950*d*).

At FIG. 9H, table view region 940 is modified to magnify a view of sub-region 944, and thus, magnify a view of book 910. In addition, in response to detecting user input 950*d*, first electronic device 906*a* modifies table view region 940 to cause an orientation of book 910 (e.g., an orientation of first representation 944*a*) to be rotated 180 degrees when compared to the orientation of book 910 shown at FIG. 9G.

Figure 9I:
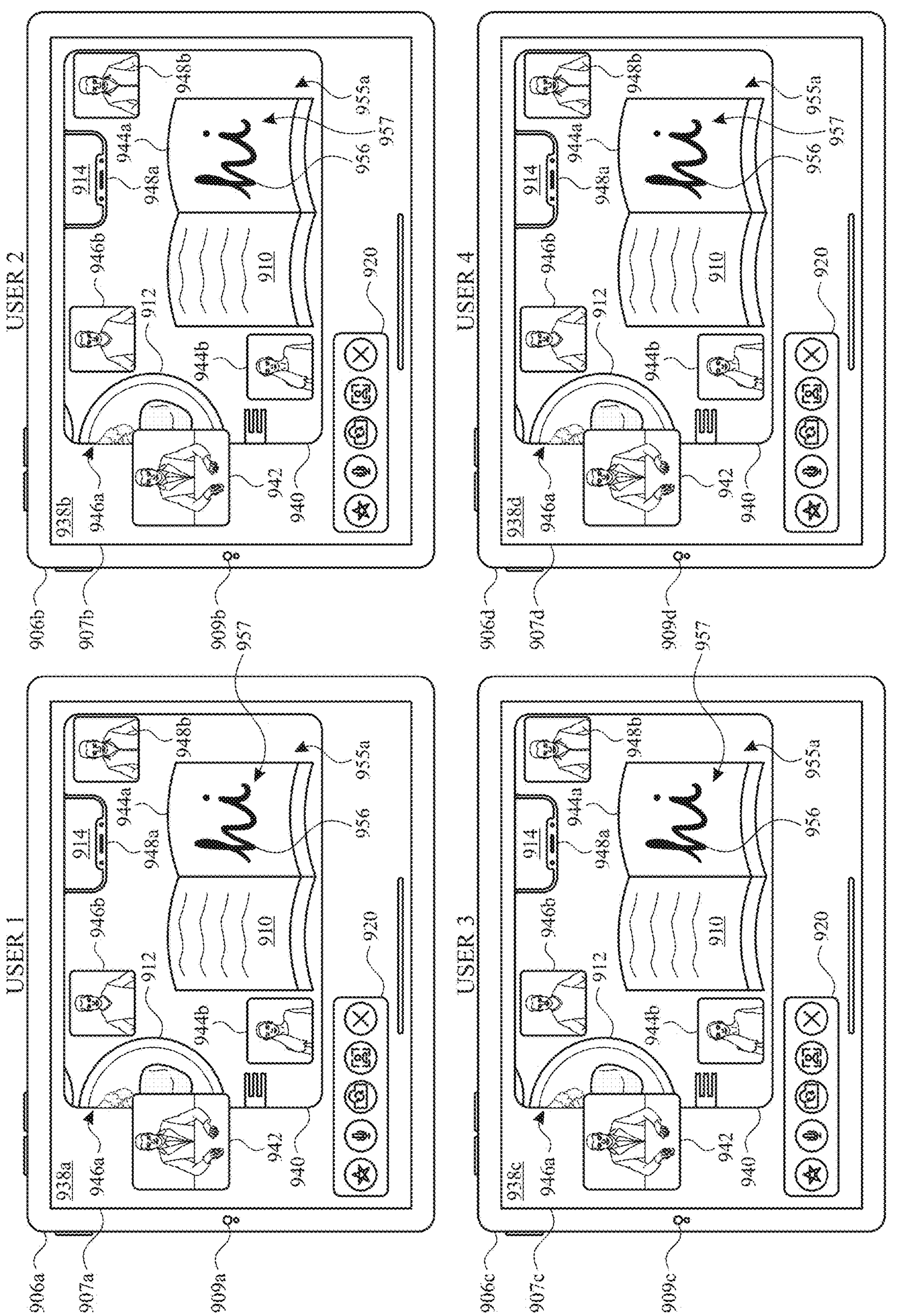

Second communication user interfaces 938*a*-938*d* enable users 902*a*-902*d* to also share digital markups during a live video communication session. Digital markups shared in this manner are, in some instances, displayed by electronic devices 906*a*-906*d*, and optionally, overlaid on one or more representations included on second communication user interfaces 938*a*-938*d*. For instance, while displaying communication user interface 938*a*, first electronic device 906*a* detects user input 950*e* (e.g., a tap gesture, a tap and swipe gesture, and/or a scribble gesture) corresponding to a request to add and/or display a markup (e.g., digital handwriting, a drawing, and/or scribbling) on first representation 944*a* (e.g., overlaid on first representation 944*a* including book 910), as shown at FIG. 9I. In addition, in response to detecting user input 950*e*, first electronic device 906*a* causes electronic devices 906*b*-906*d* to display markup 956 on first representation 944*a*. At FIG. 9I, book 910 is displayed at first position 955*a* within table view region 940.

At FIG. 9I, device 906*a* displays markup 956 (e.g., cursive "hi") on first representation 944*a* so that markup 956 appears to have been written at position 957 of book 910 (e.g., on a page of book 910) included in first representation 944*a*. In some embodiments, electronic device 906*a* ceases to display markup 956 on second communication user interface 938*a* after markup 956 has been displayed for a predetermined period of time (e.g., 10 seconds, 30 seconds, 60 seconds, and/or 2 minutes).

Figure 9J:
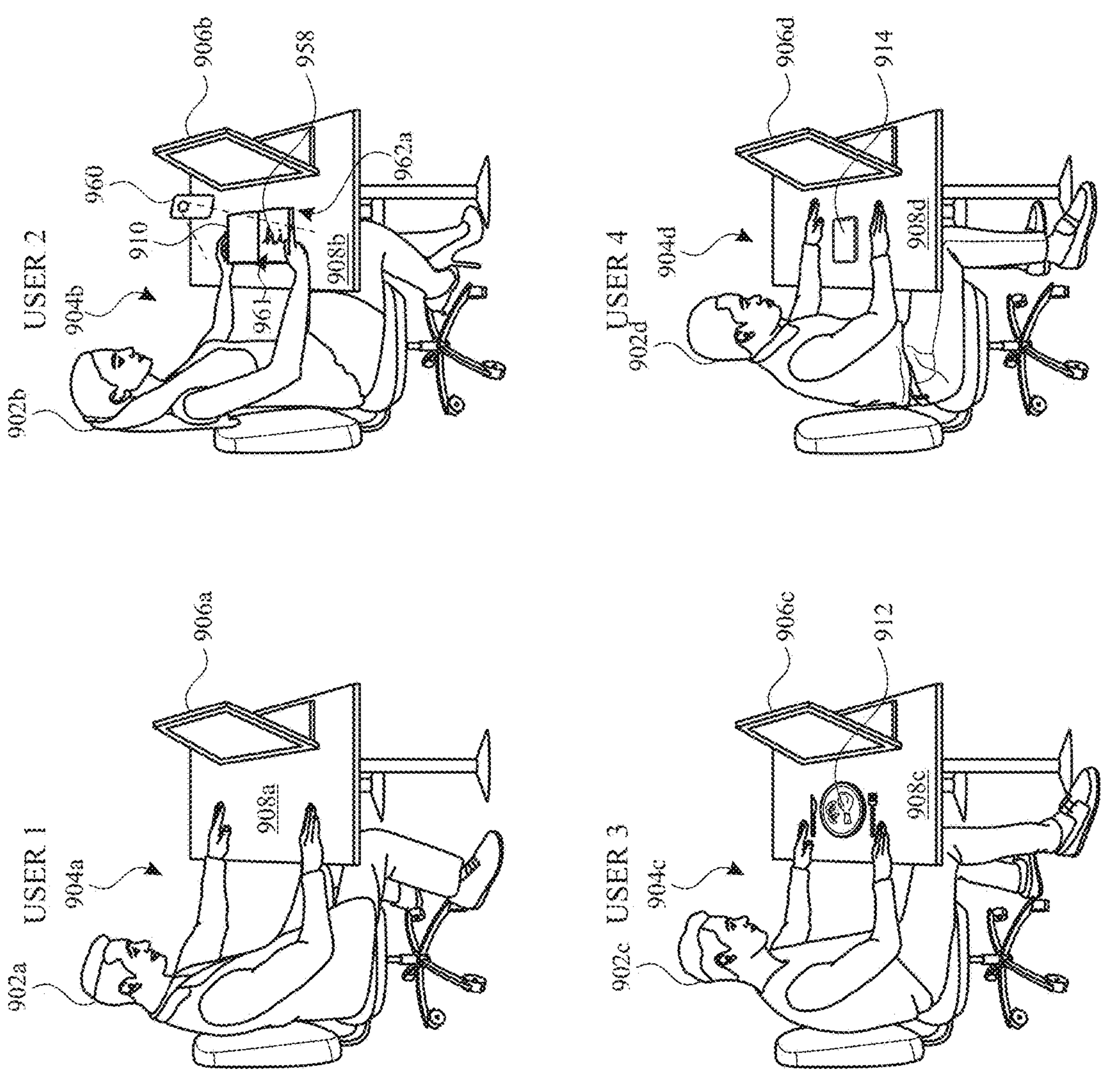

In some embodiments, one or more devices may be used to project an image and/or rendering of markup 956 within a physical environment. For example, as shown in FIG. 9J, second electronic device 906*b* can cause projection 958 to be displayed on book 910 in second physical environment 904*b*. At FIG. 9J, second electronic device 906*b* is in communication with (e.g., wired communication and/or wireless communication) with projector 960 (e.g., a light emitting projector) that is positioned on surface 908*b*. In response to receiving an indication that first electronic device 906*a* detected user input 950*e*, second electronic device 906*b* causes projector 960 to emit projection 958 onto book 910 positioned on surface 908*b*. In some embodiments, projector 960 receives data indicative of a position to project projection 958 on surface 908*b* based on a position of user input 950*e* on first representation 944*a*. In other words, projector 960 is configured to project projection 958 onto position 961 of book 910 that appears to second user 902*b* to be substantially the same as the position and/or appearance of markup 956 on first representation 944*a* displayed on second electronic device 906*b*.

At FIG. 9J, second user 902*b* is holding book 910 at first position 962*a* with respect to surface 908*b* within second physical environment 904*b*. At FIG. 9K, second user 902*b* moves book 910 from first position 962*a* to second position 962*b* with respect to surface 908*b* within second physical environment 904*b*.

Figure 9K:
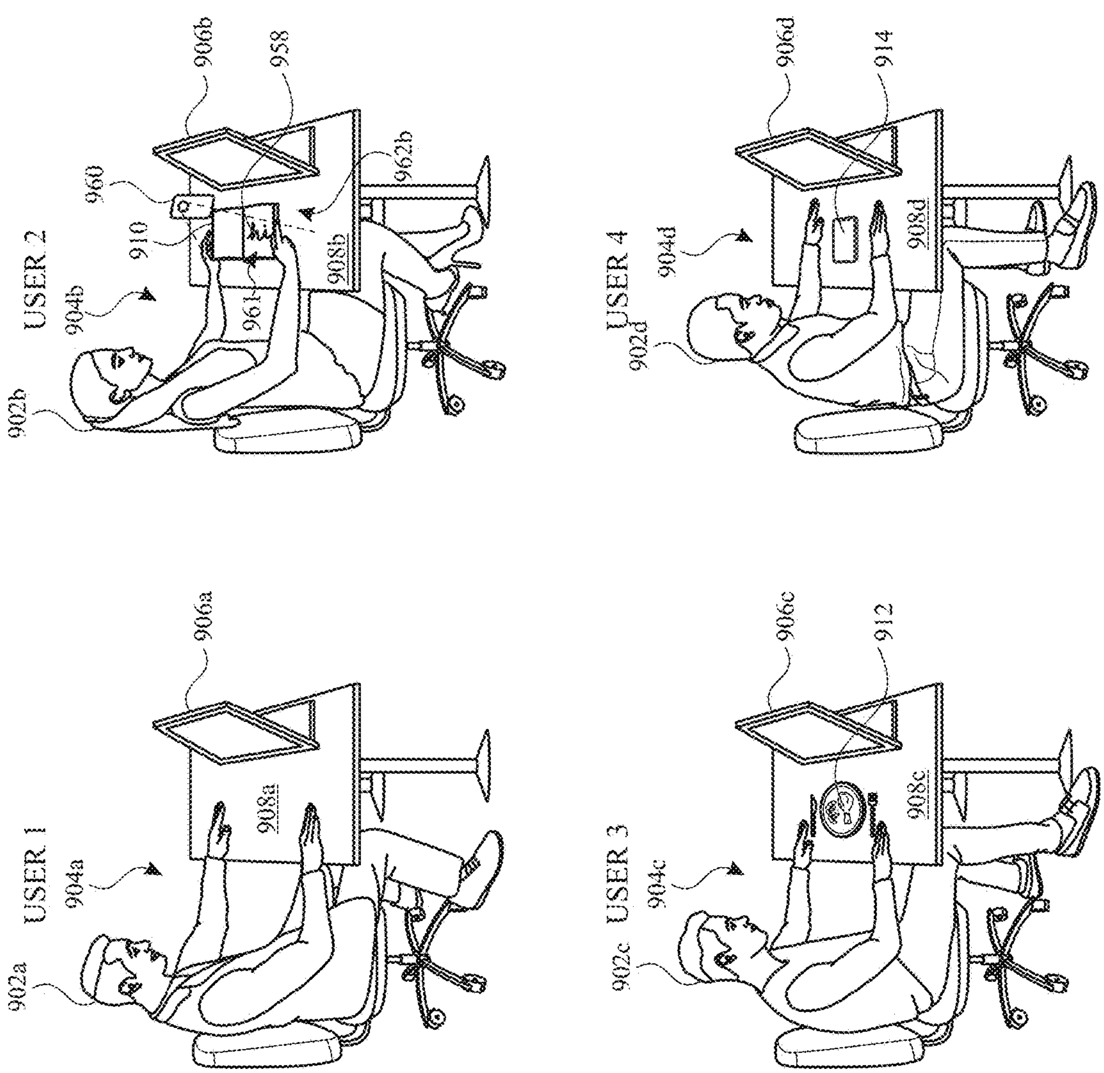

At FIG. 9K, in response to detecting movement of book 910 from first position 962*a* to second position 962*b*, second electronic device 906*b* causes projector 960 to move projection 958 in a manner corresponding to the movement of book 910. For instance, projection 958 is projected by projector 960 so that projection 958 is maintained at a same relative position of book 910, position 961. Therefore, despite second user 902*b* moving book 910 from first position 962*a* to second position 962*b*, projector 960 projects projection 958 at position 961 of book 910, such that projection 958 moves with book 910 and appears to be at the same place (e.g., position 961) and/or have the same orientation with respect to book 910. In some embodiments, second electronic device 906*b* causes projector 960 to modify a position of projection 958 within second physical environment 904*b* in response to detected changes in angle, location, position, and/or orientation of book 910 within second physical environment 904*b*.

Figure 9L:
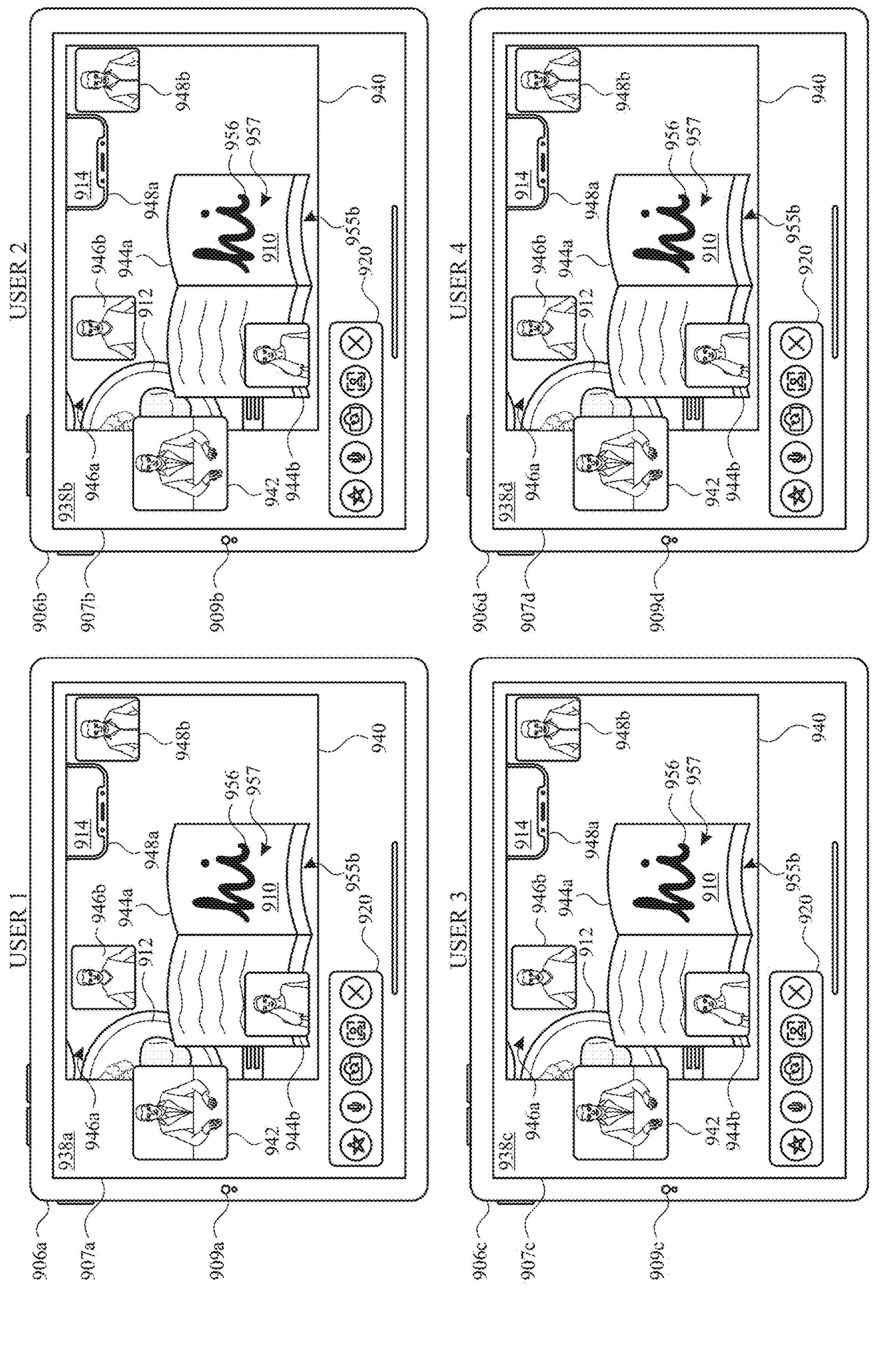
Figure 9M:
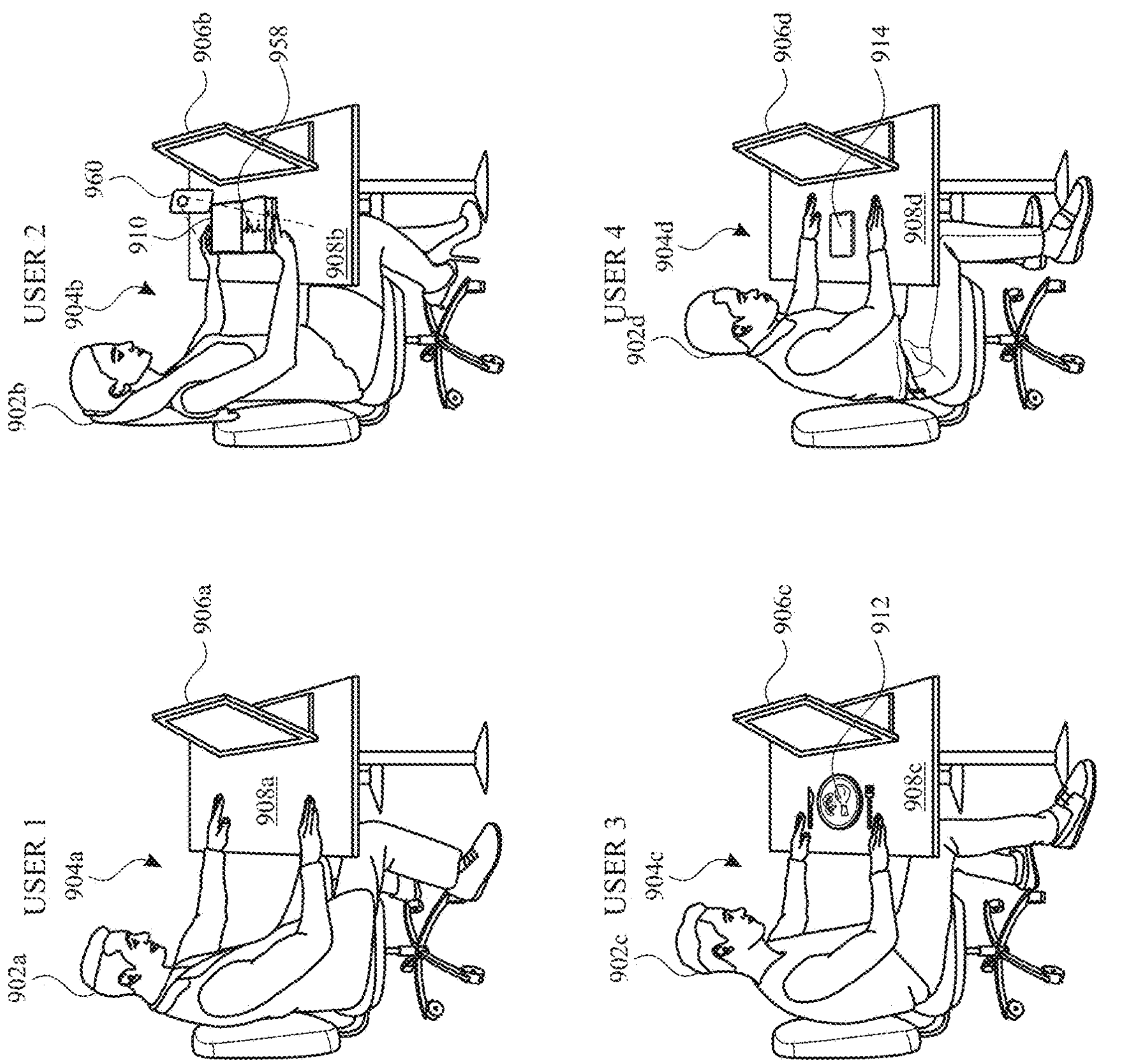

Further, first electronic device 906*a* displays movement of book 910 on second communication user interface 938*a* based on physical movement of book 910 by second user 902*b*. For example, in response to detecting movement of book 910 from first position 962*a* to second position 962*b*, first electronic device 906*a* displays movement of book 910 (e.g., first representation 944*a*) within table view region 940, as shown at FIG. 9L. At FIG. 9L, second communication user interface 938*a* shows book 910 at second position 955*b* within table view region 940, which is to the left of first position 955*a* shown at FIG. 9I. In addition, electronic device 906*a* maintains display of markup 956 at position 957 on book 910 (e.g., the same position of markup 956 relative to book 910). Therefore, first electronic device 906*a* causes second communication user interface 938*a* to maintain a position of markup 956 with respect to book 910 despite movement of book 910 in second physical environment 904*b* and/or within table view region 940 of second communication user interface 938*a*.

Figure 9N:
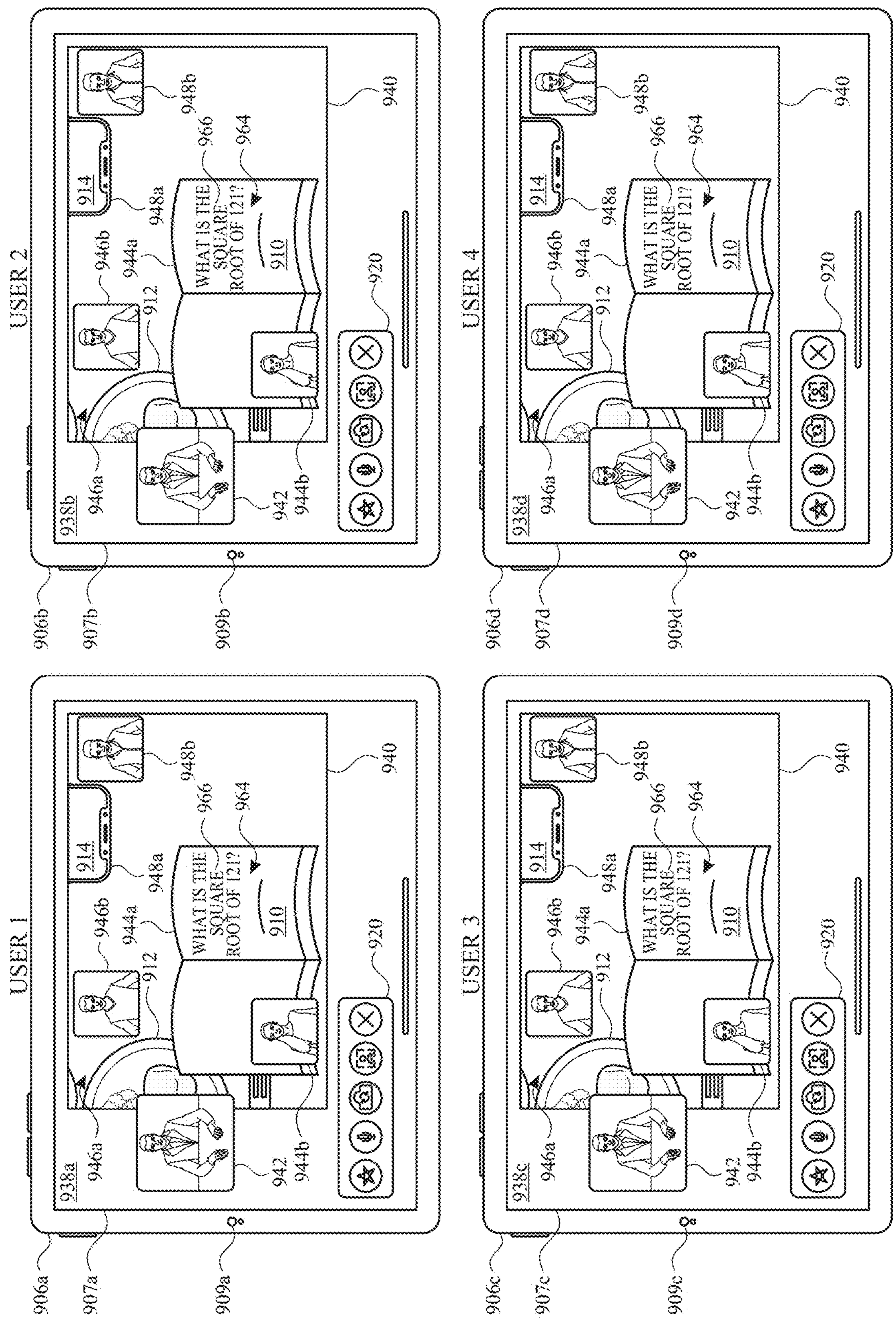
Figure 90:
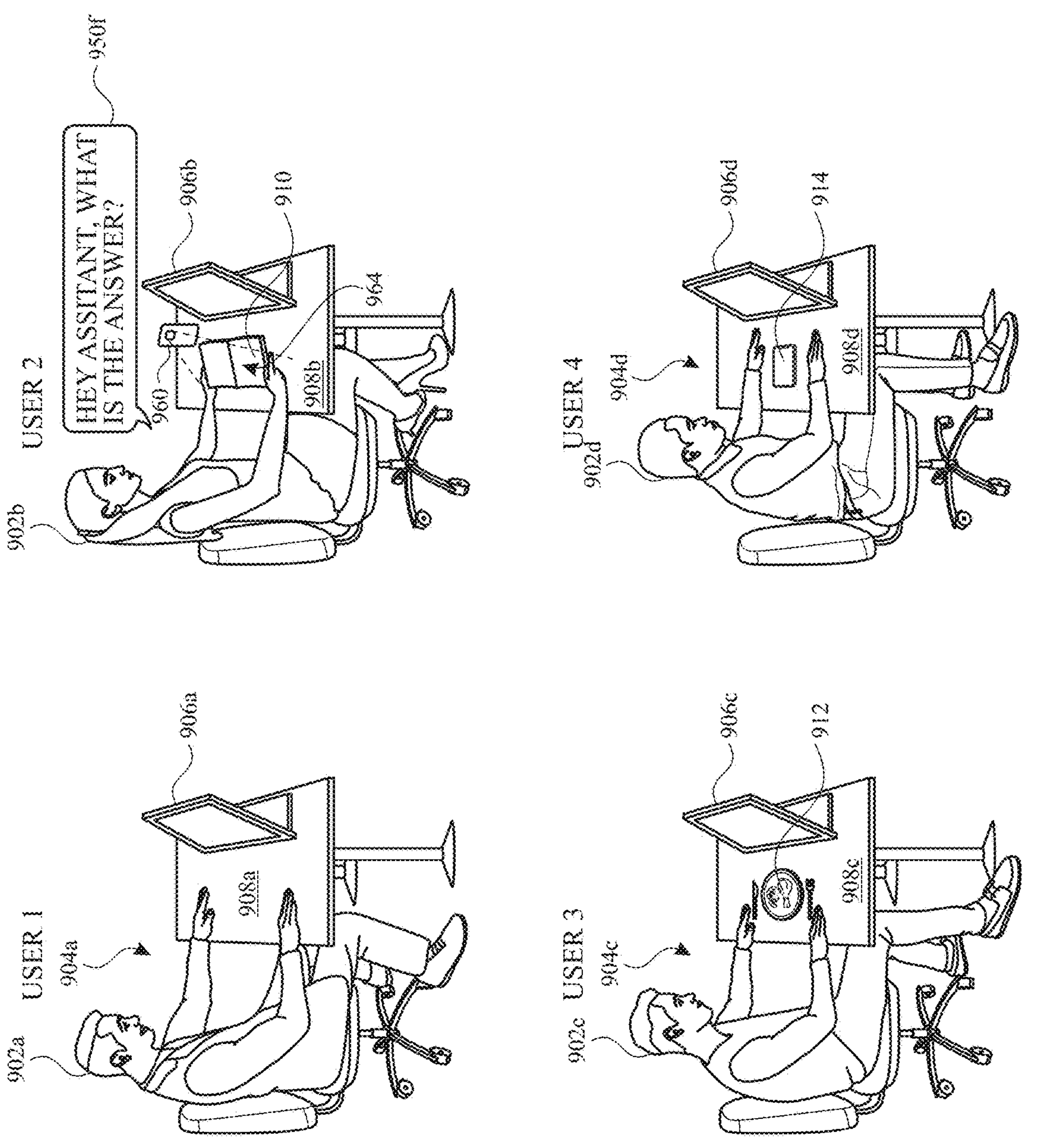

Electronic devices 906*a*-906*d* can also modify markup 956. For instance, in response to detecting one or more user inputs, electronic devices 906*a*-906*d* can add to, change a color of, change a style of, and/or delete all or a portion of markup 956 that is displayed on each of second communication user interfaces 938*a*-938*d*. In some embodiments, electronic devices 906*a*-906*d* can modify markup 956, for instance, based on user 902*b* turning pages of book 910. At FIG. 9M, second user 902*b* turns a page of book 910, such that a new page 964 of book 910 is exposed (e.g., open and in view of second user 902*b*), as shown at FIG. 9N. At FIG. 9N, second electronic device 906*b* detects that second user 902*b* has turned the page of book 910 to page 964 and ceases displaying markup 956. In some embodiments, in response to detecting that second user 902*b* has turned the page of book 910, second electronic device 906*b* also causes projector 960 to cease projecting projection 958 within second physical environment 904*b*. In addition, in some embodiments, in response to detecting that second user 902*b* has turned the page of book back to the previous page (e.g., the page of book 910 shown at FIGS. 9I-9L), second electronic device 906*b* is configured to cause markup 956 and/or projection 958 to be re-displayed (e.g., on second communication user interfaces 938*a*-938*d* and/or on book 910 in second physical environment 904*b*).

In response to detecting one or more user inputs, electronic devices 906*a*-906*d* can further provide one or more outputs (e.g., audio outputs and/or visual outputs, such as notifications) based on an analysis of content included in one or more representations displayed during the live video communication session. At FIG. 9N, page 964 of book 910 includes content 966 (e.g., "What is the square root of 121?"), which is displayed by electronic devices 906*a*-906*d* on second communication user interfaces 938*a*-938*d* in response to second user 902*b* turning the page of book 910. As shown at FIG. 9N, content 966 of book 910 poses a question. In some instances, second user 902*b* (e.g., the user in physical possession of book 910) may not know the answer to the question and wish to obtain an answer to the question.

At FIG. 9O, second electronic device 906*b* receives voice command 950*f* (e.g., "Hey Assistant, what is the answer?") provided by second user 902*b*. In response to receiving voice command 950*f*, second electronic device 906*b* displays voice assistant user interface object 967, as shown at FIG. 9P.

Figure 9P:
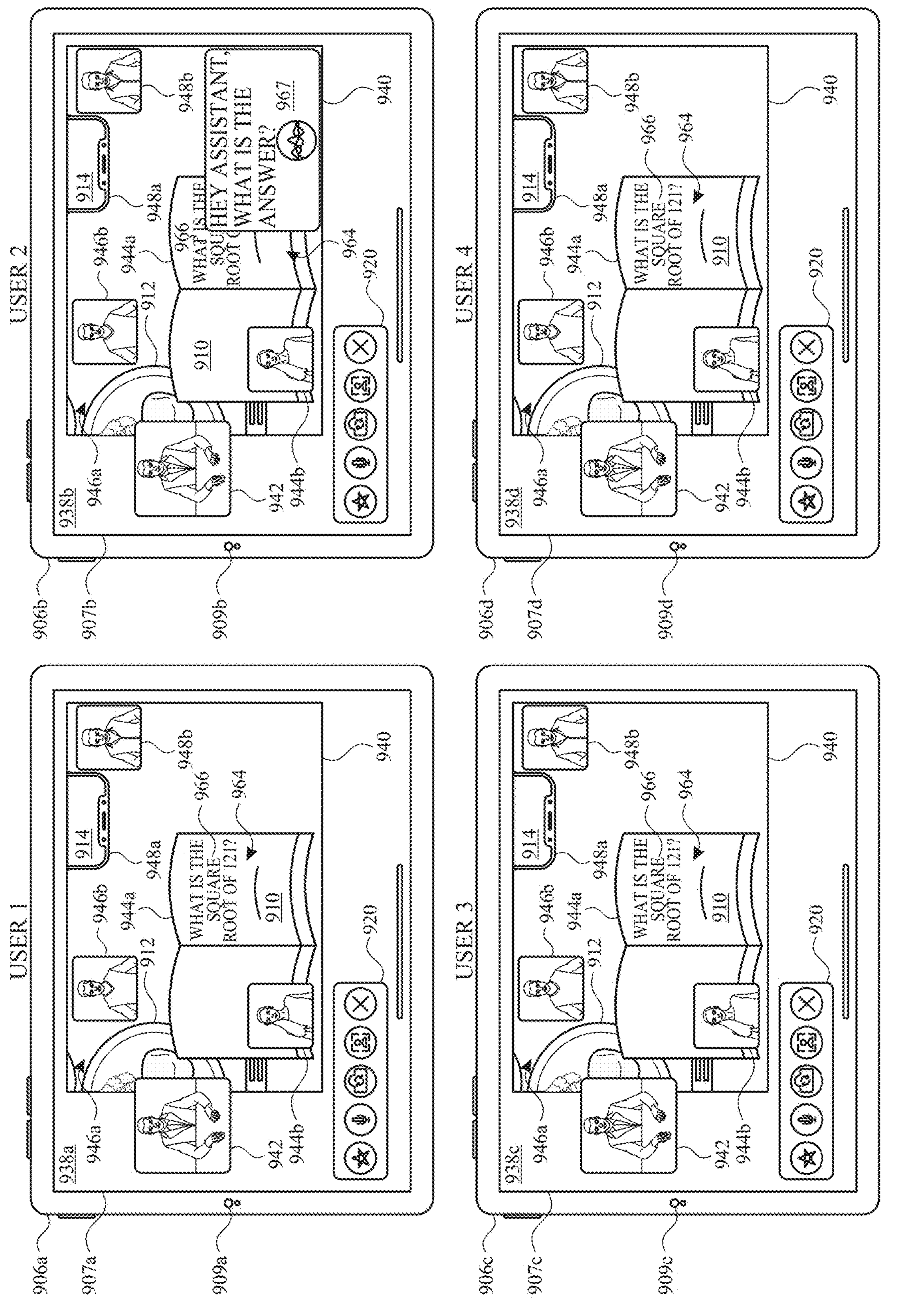

At FIG. 9P, second electronic device 906*b* displays voice assistant user interface object 967 confirming that second electronic device 906*b* received voice command 950*f* (e.g., voice assistant user interface object 967 displays text corresponding to speech of the voice command "Hey Assistant, what is the answer?"). As shown at FIG. 9P, first electronic device 906*a*, third electronic device 906*c*, and fourth electronic device 906*d* do not detect voice command 950*f*, and thus, do not display voice assistant user interface object 967.

At FIG. 9P, in response to receiving voice command 950*f*, second electronic device 906*b* identifies content 966 in second physical environment 904*b* and/or included in second representation 922*b*. In some embodiments, second electronic device 906*b* identifies content 966 by performing an analysis (e.g., text recognition analysis) of table view region 940 to recognize content 966 on page 964 of book 910. In some embodiments, in response to detecting content 966, second electronic device 906*b* determines whether one or more tasks are to be performed based on the detected content 966. If so, device 906*b* identifies and performs the task. For instance, second electronic device 906*b* recognizes content 966 and determines that content 966 poses the question of "What is the square root of 121?" Thereafter, second electronic device 906*b* determines the answer to the question posed by content 966. In some embodiments, second electronic device 906*b* performs the derived task locally (e.g., using software and/or data included and/or stored in memory of second electronic device 906*b*) and/or remotely (e.g., communicating with an external device, such as a server, to perform at least part of the task).

Figure 9Q:
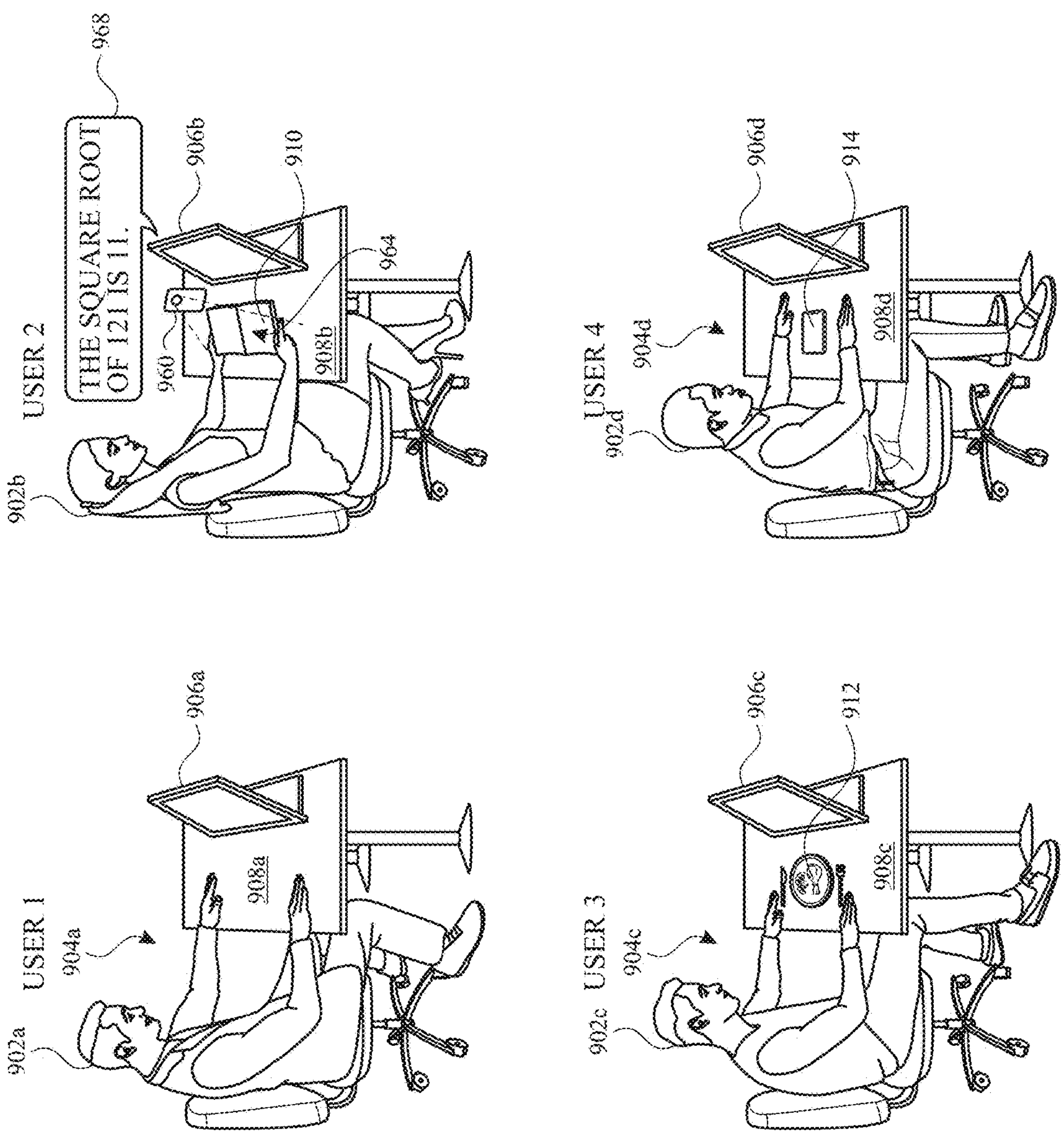

After performing the task (e.g., the calculation of the square root of 121), second electronic device 906*b* provides (e.g., outputs) a response including the answer. In some examples, the response is provided as audio output 968, as shown at FIG. 9Q. At FIG. 9Q, audio output 968 includes speech indicative of the answer posed by content 966.

Figure 9R:
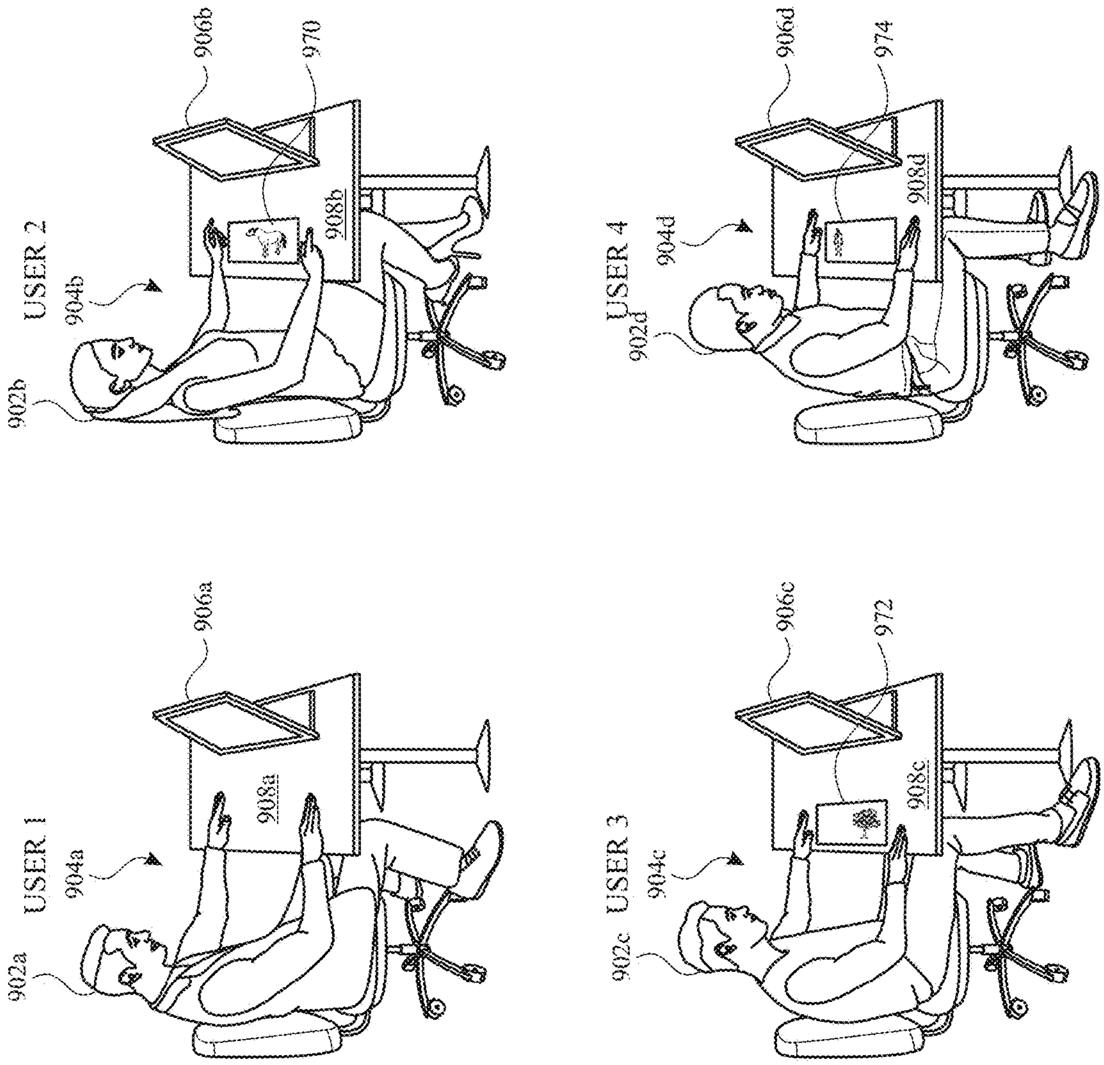
Figure 9S:
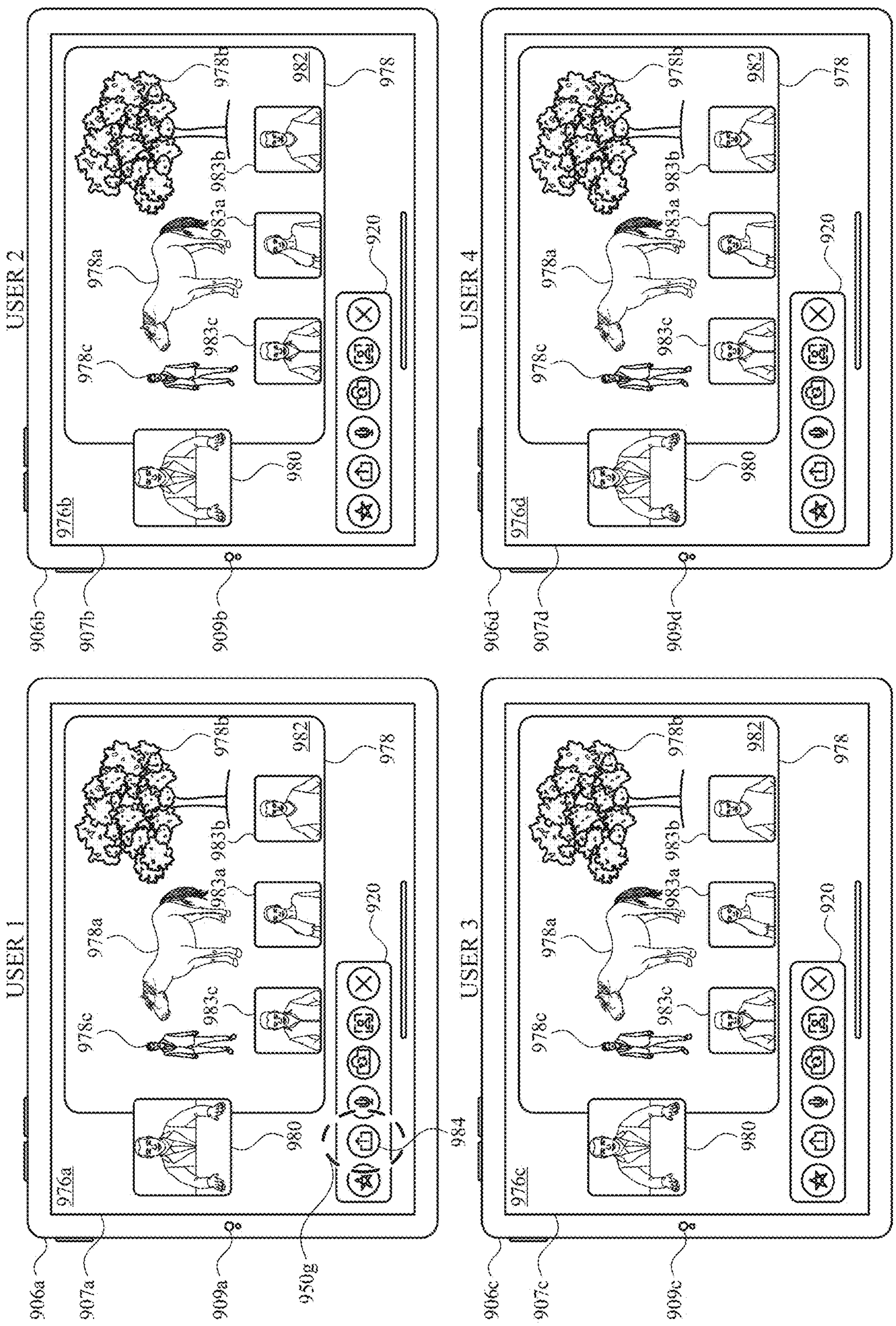
Figure 9T:
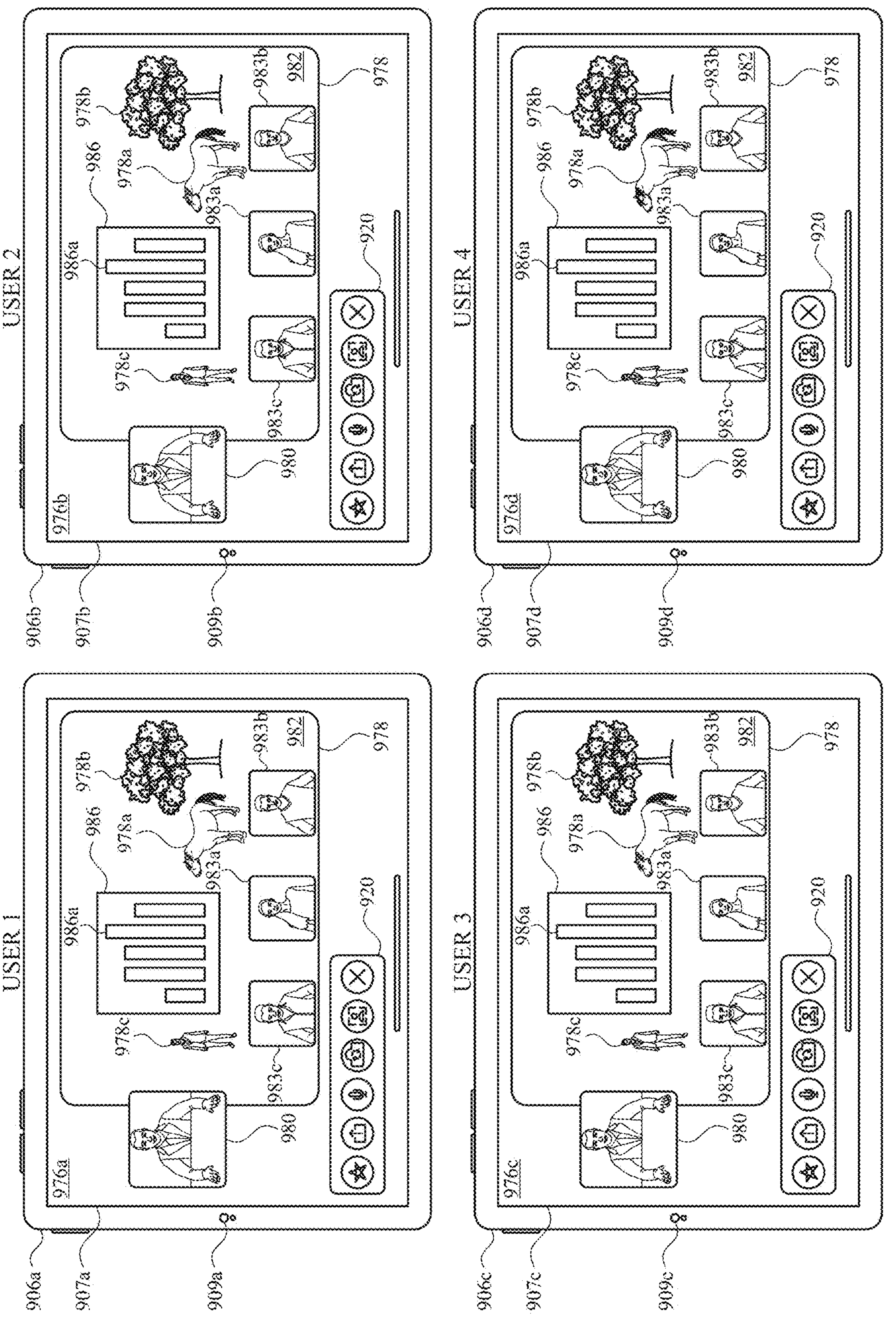

In some embodiments, during a live video communication session, electronic devices 906*a*-906*d* are configured to display different user interfaces based on the type of objects and/or content positioned on surfaces. FIGS. 9R-9S, for instance, illustrate examples in which users 902*b*-902*d* are positioned (e.g., sitting) in front of surfaces 908*b*-908*d*, respectively, during a live video communication session. Surfaces 908*b*-908*d* include first drawing 970 (e.g., a horse), second drawing 972 (e.g., a tree), and third drawing 974 (e.g., a person), respectively.

In response to receiving a request to display representations of multiple drawings, electronic devices 906*a*-906*d* are configured to overlay the drawings 970, 972, and 974 onto one another and/or remove physical objects within physical environments 904*a*-904*d* from the representations (e.g., remove physical objects via modifying data captured via cameras 909*a*-909*d*). At FIG. 9S, in response to detecting user input (e.g., user input 950*b*) requesting to modify representations of physical environments 904*b*-904*d*, electronic devices 906*a*-906*d* display third communication user interfaces 976*a*-976*d*, respectively. At FIG. 9S, first electronic device 906*a* displays third communication user interface 976*a*, which includes drawing region 978 and first representation 980 (e.g., a representation of first user 902*a*). Drawing region 978 includes first drawing representation 978*a* corresponding to first drawing 970, second drawing representation 978*b* corresponding to second drawing 972, and third drawing representation 978*c* corresponding to third drawing 974. At FIG. 9S, first drawing representation 978*a*, second drawing representation 978*b*, and third drawing representation 978*c* are collocated (e.g., overlaid) on a single surface (e.g., piece of paper) so that first drawing 970, second drawing 972, and third drawing 974 appear to be a single, continuous drawing. In other words, first drawing representation 978*a*, second drawing representation 978*b*, and third drawing representation 978*c* are not separated by boundaries and/or displayed as being positioned on surfaces 908b-908d, respectively. Instead, first electronic device 906a (and/or electronic devices 906b-906d) extract first drawing 970, second drawing 972, and third drawing 974 from the physical pieces of paper on which they are drawn and displays first drawing representation 978a, second drawing representation 978b, and third drawing representation 978c without the physical pieces of paper upon which drawings 970, 972, and 974 were created.

In some embodiments, surface 982 is a virtual surface that is not representative of any surface within physical environments 904a-904d in which users 902a-902d are located. In some embodiments, surface 982 is a reproduction of (e.g., an extrapolation of, an image of, a visual replica of) an actual surface and/or object (e.g., piece of paper) located in one of physical environments 904a-904d.

In addition, drawing region 978 includes fourth representation 983a of second user 902b, fifth representation 983b of third user 902c, and sixth representation 983c of fourth user 902d. In some embodiments, first electronic device 906a does not display fourth representation 983a, fifth representation 983b, and sixth representation 983c, and instead, only displays first drawing representation 978a, second drawing representation 978b, and third drawing representation 978c.

Electronic devices 906a-906d can also display and/or overlay content that does not include drawings onto drawing region 978. At FIG. 9S, first electronic device 906a detects user input 950g (e.g., a tap gesture) corresponding to selection of share user interface object 984 of menu 920. In response to detecting user input 950g, first electronic device 906a initiates a process to share content (e.g., audio, video, a document, what is currently displayed on display 907a of first electronic device 906a, and/or other multimedia content) with electronic devices 906b-906d and display content 986 on third communication user interfaces 976a-976d, as shown at FIG. 9T.

At FIG. 9T, first electronic device 906a displays content 986 on third communication user interface 976a (and electronic devices 906b-906d display content 986 on third communication user interfaces 976b-976d, respectively). At FIG. 9T, content 986 is displayed within drawing region 978 between first drawing representation 978a and third drawing representation 978c. Content 986 is illustrated as a presentation including bar graph 986a. In some embodiments, content shared via first electronic device 906a can be audio content, video content, image content, another type of document (e.g., a text document and/or a spreadsheet document), a depiction of what is currently displayed by display 907a of first electronic device 906a, and/or other multimedia content. At FIG. 9T, content 986 is displayed by first electronic device 906a within drawing region 978 of third communication user interface 976a. In some embodiments, content 986 is displayed at another suitable position on third communication user interface 976a. In some embodiments, the position of content 986 can be modified by one or more of electronic devices 906a-906d in response to detecting user input (e.g., a tap and/or swipe gesture corresponding to content 986).

FIG. 10 is a flow diagram for displaying images of multiple different surfaces during a live video communication session using a computer system, in accordance with some embodiments. Method 1000 is performed at a first computer system (e.g., 100, 300, 500, 906a, 906b, 906c, 906d, 600-1, 600-2, 600-3, 600-4, 6100-1, 6100-2, 1100a, 1100b, 1100c, and/or 1100d) (e.g., a smartphone, a tablet, a laptop computer, and/or a desktop computer) that is in communication a display generation component (e.g., 907a, 907b, 907c, and/or 907d) (e.g., a display controller, a touch-sensitive display system, and/or a monitor), one or more first cameras (e.g., 909a, 909b, 909c, and/or 909d) (e.g., an infrared camera, a depth camera, and/or a visible light camera), and one or more input devices (e.g., 907a, 907b, 907c, and/or 907d) (e.g., a touch-sensitive surface, a keyboard, a controller, and/or a mouse). Some operations in method 1000 are, optionally, combined, the orders of some operations are, optionally, changed, and some operations are, optionally, omitted.

As described below, method 1000 provides an intuitive way for displaying images of multiple different surfaces during a live video communication session. The method reduces the cognitive burden on a user for managing a live video communication session, thereby creating a more efficient human-machine interface. For battery-operated computing devices, enabling a user to manage a live video communication session faster and more efficiently conserves power and increases the time between battery charges.

In method 1000, the first computer system detects (1002) a set of one or more user inputs (e.g., 949, 950a, and/or 950b) (e.g., one or more taps on a touch-sensitive surface, one or more gestures (e.g., a hand gesture, head gesture, and/or eye gesture), and/or one or more audio inputs (e.g., a voice command)) corresponding to a request to display a user interface (e.g., 916a-916d, 938a-938d, and/or 976a-976d) of a live video communication session that includes a plurality of participants (e.g., 902a-902d) (In some embodiments, the plurality of participants include a first user and a second user.).

In response to detecting the set of one or more user inputs (e.g., 949, 950a, and/or 950b), the first computer system (e.g., 906a, 906b, 906c, and/or 906d) displays (1004), via the display generation component (e.g., 907a, 907b, 907c, and/or 907d), a live video communication interface (e.g., 916a-916d, 938a-938d, and/or 976a-976d) for a live video communication session (e.g., an interface for an incoming and/or outgoing live audio/video communication session). In some embodiments, the live communication session is between at least the computer system (e.g., a first computer system) and a second computer system. The live video communication interface (e.g., 916a-916d, 938a-938d. and/or 976a-976d) includes (1006) (e.g., concurrently includes) a first representation (e.g., 928a-928d, 930a-930d, 932a-932d, 944a, 946a, 948a, 983a, 983b, and/or 983c) of a field-of-view of the one or more first cameras (e.g., 909a, 909b, 909c, and/or 909d) of the first computer system (e.g., 906a, 906b, 906c, and/or 906d). In some embodiments, the first representation (e.g., 928a-928d, 930a-930d, 932a-932d, 944a, 946a, 948a, 983a, 983b, and/or 983c) of the field-of-view of the one or more first cameras (e.g., 909a, 909b, 909c, and/or 909d) includes a first user (e.g., a face of the first user). In some embodiments, the first representation (e.g., 928a-928d, 930a-930d, 932a-932d, 944a, 946a, 948a, 983a, 983b, and/or 983c) of the field-of-view of the one or more first cameras (e.g., 909a, 909b, 909c, and/or 909d) of the first computer system (e.g., 906a, 906b, 906c, and/or 906d) is a portion (e.g., a cropped portion) of the field-of-view of the one or more first cameras.

The live video communication interface (e.g., 916a-916d, 938a-938d, and/or 976a-976d) includes (1008) (e.g., concurrently includes) a second representation (e.g., 918b-918d, 922b-922d, 924b-924d, 926b-926d, 944a, 946a, 948a, 978a, 978b, and/or 978c) of the field-of-view of the one or more first cameras (e.g., 909a, 909b, 909c, and/or 909d) of the first computer system (e.g., 906a, 906b, 906c, and/or 906d), the second representation (e.g., 918b-918d, 922b-922d, 924b-924d, 926b-926d, 944a, 946a, 948a, 978a, 978b, and/or 978c) of the field-of-view of the one or more first cameras (e.g., 909a, 909b, 909c, and/or 909d) of the first computer system (e.g., 906a, 906b, 906c, and/or 906d) including a representation of a surface (e.g., 908a, 908b, 908c, and/or 908d) (e.g., a first surface) in a first scene that is in the field-of-view of the one or more first cameras (e.g., 909a, 909b, 909c, and/or 909d) of the first computer system (e.g., 906a, 906b, 906c, and/or 906d). In some embodiments, the second representation (e.g., 918b-918d, 922b-922d, 924b-924d, 926b-926d, 944a, 946a, 948a, 978a, 978b, and/or 978c) of the field-of-view of the one or more first cameras (e.g., 909a, 909b, 909c, and/or 909d) of the first computer system (e.g., 906a, 906b, 906c, and/or 906d) is a portion (e.g., a cropped portion) of the field-of-view of the one or more first cameras (e.g., 909a, 909b, 909c, and/or 909d). In some embodiments, the first representation (e.g., 928a-928d, 930a-930d, 932a-932d, 944a, 946a, 948a, 983a, 983b, and/or 983c) and the second representation (e.g., 918b-918d, 922b-922d, 924b-924d, 926b-926d, 944a, 946a, 948a, 978a, 978b, and/or 978c) are based on the same-field-of-view of the one or more first cameras (e.g., 909a, 909b, 909c, and/or 909d). In some embodiments, the one or more first cameras (e.g., 909a, 909b, 909c, and/or 909d) is a single, wide angle camera.

The live video communication interface includes (1010) (e.g., concurrently includes) a first representation (e.g., 928a-928d, 930a-930d, 932a-932d, 944a, 946a, 948a, 983a, 983b, and/or 983c) of a field-of-view of one or more second cameras (e.g., 909a, 909b, 909c, and/or 909d) of a second computer system (e.g., 906a, 906b, 906c, and/or 906d). In some embodiments, the first representation (e.g., 928a-928d, 930a-930d, 932a-932d, 944a, 946a, 948a, 983a, 983b, and/or 983c) of the field-of-view of the one or more second cameras (e.g., 909a, 909b, 909c, and/or 909d) includes a second user (e.g., 902a, 902b, 902c, and/or 902d) (e.g., a face of the second user). In some embodiments, the first representation (e.g., 928a-928d, 930a-930d, 932a-932d, 944a, 946a, 948a, 983a, 983b, and/or 983c) of the field-of-view of the one or more second cameras (e.g., 909a, 909b, 909c, and/or 909d) is a portion (e.g., a cropped portion) of the field-of-view of the one or more second cameras (e.g., 909a, 909b, 909c, and/or 909d).

The live video communication interface (e.g., 916a-916d, 938a-938d, and/or 976a-976d) includes (1012) (e.g., concurrently includes) a second representation (e.g., 918b-918d, 922b-922d, 924b-924d, 926b-926d, 944a, 946a, 948a, 978a, 978b, and/or 978c) of the field-of-view of the one or more second cameras (e.g., 909a, 909b, 909c, and/or 909d) of the second computer system (e.g., 906a, 906b, 906c, and/or 906d), the second representation (e.g., 918b-918d, 922b-922d, 924b-924d, 926b-926d, 944a, 946a, 948a, 978a, 978b, and/or 978c) of the field-of-view of the one or more second cameras (e.g., 909a, 909b, 909c, and/or 909d) of the second computer system (e.g., 906a, 906b, 906c, and/or 906d) including a representation of a surface (e.g., 908a, 908b, 908c, and/or 908d) (e.g., a second surface) in a second scene that is in the field-of-view of the one or more second cameras (e.g., 909a, 909b, 909c, and/or 909d) of the second computer system (e.g., 906a, 906b, 906c, and/or 906d). In some embodiments, the second representation (e.g., 918b-918d, 922b-922d, 924b-924d, 926b-926d, 944a, 946a, 948a, 978a, 978b, and/or 978c) of the field-of-view of the one or more second cameras (e.g., 909a, 909b, 909c, and/or 909d) of the second computer system (e.g., 906a, 906b, 906c, and/or 906d) is a portion (e.g., a cropped portion) of the field-of-view of the one or more second cameras (e.g., 909a, 909b, 909c, and/or 909d). In some embodiments, the first representation (e.g., 928a-928d, 930a-930d, 932a-932d, 944a, 946a, 948a, 983a, 983b, and/or 983c) and the second representation (e.g., 918b-918d, 922b-922d, 924b-924d, 926b-926d, 944a, 946a, 948a, 978a, 978b, and/or 978c) are based on the same-field-of-view of the one or more second cameras (e.g., 909a, 909b, 909c, and/or 909d). In some embodiments, the one or more second cameras (e.g., 909a, 909b, 909c, and/or 909d) is a single, wide angle camera. Displaying a first and second representation of the field-of-view of the one or more first cameras of the first computer system (where the second representation of a surface in a first scene) and a first and second representation of the field-of-view of the one or more second cameras of the second computer system (where the second representation of a surface in a second scene) enhances the video communication session experience by improving how participants collaborate and view each other's shared content, which provides improved visual feedback.

In some embodiments, the first computer system (e.g., 906a, 906b, 906c, and/or 906d) receives, during the live video communication session, image data captured by a first camera (e.g., 909a, 909b, 909c, and/or 909d) (e.g., a wide angle camera) of the one or more first cameras (e.g., 909a, 909b, 909c, and/or 909d). In some embodiments, displaying the live video communication interface (e.g., 916a-916d, 938a-938d, and/or 976a-976d) for the live video communication session includes displaying, via the display generation component, the first representation (e.g., 928a-928d, 930a-930d, 932a-932d, 944a, 946a, 948a, 983a, 983b, and/or 983c) of the field-of-view of the one or more first cameras (e.g., 909a, 909b, 909c, and/or 909d) of the first computer system (e.g., 906a, 906b, 906c, and/or 906d) based on the image data captured by the first camera (e.g., 909a, 909b, 909c, and/or 909d) and displaying, via the display generation component (e.g., 907a, 907b, 907c, and/or 9078d), the second representation (e.g., 918b-918d, 922b-922d, 924b-924d, 926b-926d, 944a, 946a, 948a, 978a, 978b, and/or 978c) of the field-of-view of the one or more first cameras (e.g., 909a, 909b, 909c, and/or 909d) of the first computer system (e.g., 906a, 906b, 906c, and/or 906d) (e.g., including the representation of a surface) based on the image data captured by the first camera (e.g., 909a, 909b, 909c, and/or 909d) (e.g., the first representation of the field-of-view of the one or more first cameras of the first computer system and the second representation of the field-of-view of the one or more first cameras of the first computer system include image data captured by the same camera (e.g., a single camera)). Displaying the first representation of the field-of-view of the one or more first cameras of the first computer system and the second representation of the field-of-view of the one or more first cameras of the first computer system based on the image data captured by the first camera enhances the video communication session experience by displaying multiple representations using the same camera at different perspectives without requiring further input from the user, which reduces the number of inputs (and/or devices) needed to perform an operation.

In some embodiments, displaying the live video communication interface (e.g., 916a-916d, 938a-938d, and/or 976a-976d) for the live video communication session includes displaying the first representation (e.g., 928a-928d, 930a-930d, 932a-932d, 944a, 946a, 948a, 983a, 983b, and/or 983c) of the field-of-view of the one or more first cameras (e.g., 909a, 909b, 909c, and/or 909d) of the first computer system (e.g., 906a, 906b, 906c, and/or 906d) within a predetermined distance (e.g., a distance between a centroid or edge of the first representation and a centroid or edge of the second representation) from the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more first cameras (e.g., 909*a*, 909*b*, 909*c*, and/or 909*d*) of the first computer system (e.g., 906*a*, 906*b*, 906*c*, and/or 906*d*) and displaying the first representation (e.g., 928*a*-928*d*, 930*a*-930*d*, 932*a*-932*d*, 944*a*, 946*a*, 948*a*, 983*a*, 983*b*, and/or 983*c*) of the field-of-view of the one or more second cameras (e.g., 909*a*, 909*b*, 909*c*, and/or 909*d*) of the second computer system (e.g., 906*a*, 906*b*, 906*c*, and/or 906*d*) within the predetermined distance (e.g., a distance between a centroid or edge of the first representation and a centroid or edge of the second representation) from the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more second cameras (e.g., 909*a*, 909*b*, 909*c*, and/or 909*d*) of the second computer system (e.g., 906*a*, 906*b*, 906*c*, and/or 906*d*). Displaying the first representation of the field-of-view of the one or more first cameras of the first computer system within a predetermined distance from the second representation of the field-of-view of the one or more first cameras of the first computer system and the first representation of the field-of-view of the one or more second cameras of the second computer system within the predetermined distance from the second representation of the field-of-view of the one or more second cameras of the second computer system enhances the video communication session experience by allowing a user to easily identify which representation of the surface is associated with (or shared by) which a participant without requiring further input from the user, which provides improved visual feedback.

In some embodiments, displaying the live video communication interface (e.g., 916*a*-916*d*, 938*a*-938*d*, and/or 976*a*-976*d*) for the live video communication session includes displaying the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more first cameras (e.g., 909*a*, 909*b*, 909*c*, and/or 909*d*) of the first computer system (e.g., 906*a*, 906*b*, 906*c*, and/or 906*d*) overlapping (e.g., at least partially overlaid on or at least partially overlaid by) the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more second cameras (e.g., 909*a*, 909*b*, 909*c*, and/or 909*d*) of the second computer system (e.g., 906*a*, 906*b*, 906*c*, and/or 906*d*). In some embodiments, the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more first cameras (e.g., 909*a*, 909*b*, 909*c*, and/or 909*d*) of the first computer system (e.g., 906*a*, 906*b*, 906*c*, and/or 906*d*) and the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more second cameras (e.g., 909*a*, 909*b*, 909*c*, and/or 909*d*) of the second computer system (e.g., 906*a*, 906*b*, 906*c*, and/or 906*d*) are displayed on a common background (e.g., 954 and/or 982) (e.g., a representation of a table, desk, floor, or wall) or within a same visually distinguished area of the live video communication interface (e.g., 916*a*-916*d*, 938*a*-938*d*, and/or 976*a*-976*d*). In some embodiments, overlapping the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more first cameras (e.g., 909*a*, 909*b*, 909*c*, and/or 909*d*) of the first computer system (e.g., 906*a*, 906*b*, 906*c*, and/or 906*d*) with the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more second cameras (e.g., 909*a*, 909*b*, 909*c*, and/or 909*d*) of the second computer system (e.g., 906*a*, 906*b*, 906*c*, and/or 906*d*) enables collaboration between participants (e.g., 902*a*, 902*b*, 902*c*, and/or 902*d*) in the live video communication session (e.g., by allowing users to combine their content). Displaying the second representation of the field-of-view of the one or more first cameras of the first computer system overlapping the second representation of the field-of-view of the one or more second cameras of the second computer system enhances the video communication session experience by allowing participants to integrate representations of different surfaces, which provides improved visual feedback.

In some embodiments, displaying the live video communication interface (e.g., 916*a*-916*d*, 938*a*-938*d*, and/or 976*a*-976*d*) for the live video communication session includes displaying the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more first cameras (e.g., 909*a*, 909*b*, 909*c*, and/or 909*d*) of the first computer system (e.g., 906*a*, 906*b*, 906*c*, and/or 906*d*) in a first visually defined area (e.g., 918*b*-918*d*, 922*b*-922*d*, 924*b*-924*d*, 926*b*-926*d*) of the live video communication interface (e.g., 916*a*-916*d*) and displaying the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more second cameras (e.g., 909*a*, 909*b*, 909*c*, and/or 909*d*) of the second computer system (e.g., 906*a*, 906*b*, 906*c*, and/or 906*d*) in a second visually defined area (e.g., 918*b*-918*d*, 922*b*-922*d*, 924*b*-924*d*, 926*b*-926*d*) of the live video communication interface (e.g., 916*a*-916*d*) (e.g., adjacent to and/or side-by-side with the second representation of the field-of-view of the one or more first cameras of the first computer system). In some embodiments, the first visually defined area (e.g., 918*b*-918*d*, 922*b*-922*d*, 924*b*-924*d*, 926*b*-926*d*) does not overlap the second visually defined area (e.g., 918*b*-918*d*, 922*b*-922*d*, 924*b*-924*d*, 926*b*-926*d*). In some embodiments, the second representation of the field-of-view of the one or more first cameras of the first computer system and the second representation of the field-of-view of the one or more second cameras of the second computer system are displayed in a grid pattern, in a horizontal row, or in a vertical column. Displaying the second representation of the field-of-view of the one or more first cameras of the first computer system and the second representation of the field-of-view of the one or more second cameras of the second computer system in a first and second visually defined area, respectively, enhances the video communication session experience by allowing participants to readily distinguish between representations of different surfaces, which provides improved visual feedback.

In some embodiments, the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more first cameras (e.g., 909*a*, 909*b*, 909*c*, and/or 909*d*) of the first computer system (e.g., 906*a*, 906*b*, 906*c*, and/or 906*d*) is based on image data captured by the one or more first cameras (e.g., 909*a*, 909*b*, 909*c*, and/or 909*d*) of the first computer system (e.g., 906*a*, 906*b*, 906*c*, and/or 906*d*) that is corrected with a first distortion correction (e.g., skew correction) to change a perspective from which the image data captured by the one or more first cameras (e.g., 909*a*, 909*b*, 909*c*, and/or 909*d*) of the first computer system (e.g., 906*a*, 906*b*, 906*c*, and/or 906*d*) appears to be captured. In some embodiments, the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more second cameras (e.g., 909*a*, 909*b*, 909*c*, and/or 909*d*) of the second computer system (e.g., 906*a*, 906*b*, 906*c*, and/or 906*d*) is based image data captured by the one or more second cameras (e.g., 909*a*, 909*b*, 909*c*, and/or 909*d*) of the second computer system (e.g., 906*a*, 906*b*, 906*c*, and/or 906*d*) that is corrected with a second distortion correction (e.g., skew correction) to change a perspective from which the image data captured by the one or more second cameras (e.g., 909*a*, 909*b*, 909*c*, and/or 909*d*) of the second computer system (e.g., 906*a*, 906*b*, 906*c*, and/or 906*d*) appears to be captured. In some embodiments, the distortion correction (e.g., skew correction) is based on a position (e.g., location and/or orientation) of the respective surface (e.g., 908*a*, 908*b*, 908*c*, and/or 908*d*) relative to the one or more respective cameras (e.g., 909*a*, 909*b*, 909*c*, and/or 909*d*). In some embodiments, the first representation (e.g., 928*a*-928*d*, 930*a*-930*d*, 932*a*-932*d*, 944*a*, 946*a*, 948*a*, 983*a*, 983*b*, and/or 983*c*) and the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) are based on image data taken from the same perspective (e.g., a single camera having a single perspective), but the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) is corrected (e.g., skewed or skewed by a different amount) so as to give the effect that the user is using multiple cameras that have different perspectives. Basing the second representations on image data that is corrected using distortion correction to change a perspective from which the image data is captured enhances the video communication session experience by providing a better perspective to view shared content without requiring further input from the user, which reduces the number of inputs needed to perform an operation.

In some embodiments, the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more first cameras (e.g., 909*a*, 909*b*, 909*c*, and/or 909*d*) of the first computer system (e.g., 906*a*, 906*b*, 906*c*, and/or 906*d*) (e.g., the representation of the surface in the first scene) is based on image data captured by the one or more first cameras (e.g., 909*a*, 909*b*, 909*c*, and/or 909*d*) of the first computer system (e.g., 906*a*, 906*b*, 906*c*, and/or 906*d*) that is corrected with a first distortion correction (e.g., a first skew correction) (In some embodiments, the first distortion correction is based on a position (e.g., location and/or orientation) of the surface in the first scene relative to the one or more first cameras). In some embodiments, the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more second cameras (e.g., 909*a*, 909*b*, 909*c*, and/or 909*d*) of the second computer system (e.g., 906*a*, 906*b*, 906*c*, and/or 906*d*) (e.g., the representation of the surface in the second scene) is based on image data captured by the one or more second cameras (e.g., 909*a*, 909*b*, 909*c*, and/or 909*d*) of the second computer system (e.g., 906*a*, 906*b*, 906*c*, and/or 906*d*) that is corrected with a second distortion correction (e.g., second skew correction) different from the first distortion correction (e.g., the second distortion correction is based on a position (e.g., location and/or orientation) of the surface in the second scene relative to the one or more second cameras). Basing the second representation of the field-of-view of the one or more first cameras of the first computer system on image data captured by the one or more first cameras of the first computer system that is corrected by a first distortion correction and basing the second representation of the field-of-view of the one or more second cameras of the second computer system on image data captured by the one or more second cameras of the second computer system that is corrected by a second distortion correction different than the first distortion correction enhances the video communication session experience by providing a non-distorted view of a surface regardless of its location in the respective scene, which provides improved visual feedback.

In some embodiments, the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more first cameras (e.g., 909*a*, 909*b*, 909*c*, and/or 909*d*) of the first computer system (e.g., 906*a*, 906*b*, 906*c*, and/or 906*d*) (e.g., the representation of the surface in the first scene) is based on image data captured by the one or more first cameras (e.g., 909*a*, 909*b*, 909*c*, and/or 909*d*) of the first computer system (e.g., 906*a*, 906*b*, 906*c*, and/or 906*d*) that is rotated relative to a position of the surface (e.g., 908*a*, 908*b*, 908*c*, and/or 908*d*) in the first scene (e.g., the position of the surface in the first scene relative to the position of the one or more first cameras of the first computer system). In some embodiments, the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more second cameras (e.g., 909*a*, 909*b*, 909*c*, and/or 909*d*) of the second computer system (e.g., 906*a*, 906*b*, 906*c*, and/or 906*d*) (e.g., the representation of the surface in the second scene) is based on image data captured by the one or more second cameras (e.g., 909*a*, 909*b*, 909*c*, and/or 909*d*) of the second computer system (e.g., 906*a*, 906*b*, 906*c*, and/or 906*d*) that is rotated relative to a position of the surface (e.g., 908*a*, 908*b*, 908*c*, and/or 908*d*) in the second scene (e.g., the position of the surface in the second scene relative to the position of the one or more second cameras of the second computer system). In some embodiments, the first representation (e.g., 928*a*-928*d*, 930*a*-930*d*, 932*a*-932*d*, 944*a*, 946*a*, 948*a*, 983*a*, 983*b*, and/or 983*c*) of the field-of-view and the representation of the surface (e.g., 918*b*-918*d*, 922*b*-922*d*, 924*b*-924*d*, 926*b*-926*d*, 944*a*, 946*a*, 948*a*, 978*a*, 978*b*, and/or 978*c*) are based on image data taken from the same perspective (e.g., a single camera having a single perspective), but the representation of the surface (e.g., 918*b*-918*d*, 922*b*-922*d*, 924*b*-924*d*, 926*b*-926*d*, 944*a*, 946*a*, 948*a*, 978*a*, 978*b*, and/or 978*c*) is rotated so as to give the effect that the user is using multiple cameras that have different perspectives. Basing the second representation of the field-of-view of the one or more first cameras of the first computer system on image data captured by the one or more first cameras of the first computer system that is rotated relative to a position of the surface in the first scene and/or basing the second representation of the field-of-view of the one or more second cameras of the second computer system on image data captured by the one or more second cameras of the second computer system that is rotated relative to a position of the surface in the second scene enhances the video communication session experience by providing a better view of a surface would have otherwise appeared upside down or turned around, which provides improved visual feedback.

In some embodiments, the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more first cameras (e.g., 909*a*, 909*b*, 909*c*, and/or 909*d*) of the first computer system (e.g., 906*a*, 906*b*, 906*c*, and/or 906*d*) (e.g., the representation of the surface in the first scene) is based on image data captured by the one or more first cameras (e.g., 909*a*, 909*b*, 909*c*, and/or 909*d*) of the first computer system (e.g., 906*a*, 906*b*, 906*c*, and/or 906*d*) that is rotated by a first amount relative to a position of the surface (e.g., 908*a*, 908*b*, 908*c*, and/or 908*d*) in the first scene (e.g., the position of the surface in the first scene relative to the position of the one or more first cameras of the first computer system). In some embodiments, the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more second cameras (e.g., 909*a*, 909*b*, 909*c*, and/or 909*d*) of the second computer system (e.g., 906*a*, 906*b*, 906*c*, and/or 906*d*) (e.g., the representation of the surface in the second scene) is based on image data captured by the one or more second cameras (e.g., 909*a*, 909*b*, 909*c*, and/or 909*d*) of the second computer system (e.g., 906*a*, 906*b*, 906*c*, and/or 906*d*) that is rotated by a second amount relative to a position of the surface (e.g., 908*a*, 908*b*, 908*c*, and/or 908*d*) in the second scene (e.g., the position of the surface in the second scene relative to the position of the one or more second cameras of the second computer system), wherein the first amount is different from the second amount. In some embodiments, the representation of a respective surface (e.g., 918*b*-918*d*, 922*b*-922*d*, 924*b*-924*d*, 926*b*-926*d*, 944*a*, 946*a*, 948*a*, 978*a*, 978*b*, and/or 978*c*) in a respective scene is displayed in the live video communication interface (e.g., 916*a*-916*d*, 938*a*-938*d*, and/or 976*a*-976*d*) at an orientation that is different from the orientation of the respective surface (e.g., 908*a*, 908*b*, 908*c*, and/or 908*d*) in the respective scene (e.g., relative to the position of the one or more respective cameras). In some embodiments, the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more first cameras (e.g., 909*a*, 909*b*, 909*c*, and/or 909*d*) of the first computer system (e.g., 906*a*, 906*b*, 906*c*, and/or 906*d*) (e.g., the representation of the surface in the first scene) is based on image data captured by the one or more first cameras (e.g., 909*a*, 909*b*, 909*c*, and/or 909*d*) of the first computer system (e.g., 906*a*, 906*b*, 906*c*, and/or 906*d*) that is corrected with a first distortion correction. In some embodiments, the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more second cameras (e.g., 909*a*, 909*b*, 909*c*, and/or 909*d*) of the second computer system (e.g., 906*a*, 906*b*, 906*c*, and/or 906*d*) (e.g., the representation of the surface in the second scene) is based on image data captured by the one or more second cameras (e.g., 909*a*, 909*b*, 909*c*, and/or 909*d*) of the second computer system (e.g., 906*a*, 906*b*, 906*c*, and/or 906*d*) that is corrected with a second distortion correction that is different from the first distortion correction. Basing the second representation of the field-of-view of the one or more first cameras of the first computer system on image data captured by the one or more first cameras of the first computer system that is rotated by a first amount and basing the second representation of the field-of-view of the one or more second cameras of the second computer system on image data captured by the one or more second cameras of the second computer system that is rotated by a second amount different than the first distortion correction enhances the video communication session experience by providing a more intuitive, natural view of a surface regardless of its location in the respective scene, which provides improved visual feedback.

In some embodiments, displaying the live video communication interface (e.g., 916*a*-916*d*, 938*a*-938*d*, and/or 976*a*-976*d*) includes displaying, in the live video communication interface (e.g., 916*a*-916*d*, 938*a*-938*d*, and/or 976*a*-976*d*), a graphical object (e.g., 954 and/or 982) (e.g., in a background, a virtual table, or a representation of a table based on captured image data). Displaying the live video communication interface (e.g., 916*a*-916*d*, 938*a*-938*d*, and/or 976*a*-976*d*) includes concurrently displaying, in the live video communication interface (e.g., 916*a*-916*d*, 938*a*-938*d*, and/or 976*a*-976*d*) and via the display generation component (e.g., 907*a*, 907*b*, 907*c*, and/or 907*d*), the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more first cameras (e.g., 909*a*, 909*b*, 909*c*, and/or 909*d*) of the first computer system (e.g., 906*a*, 906*b*, 906*c*, and/or 906*d*) (e.g., the representation of the surface in the first scene) on (e.g., overlaid on) the graphical object (e.g., 954 and/or 982) and the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more second cameras (e.g., 909*a*, 909*b*, 909*c*, and/or 909*d*) of the second computer system (e.g., 906*a*, 906*b*, 906*c*, and/or 906*d*) (e.g., the representation of the surface in the second scene) on (e.g., overlaid on) the graphical object (e.g., 954 and/or 982) (e.g., the representation of the surface in the first scene and the representation of the surface in the second scene are both displayed on a virtual table in the live video communication interface). Displaying both the second representation of the field-of-view of the one or more first cameras of the first computer system and the second representation of the field-of-view of the one or more second cameras of the second computer system on the graphical object enhances the video communication session experience by providing a common background for shared content regardless of what the appearance of surface is in the respective scene, which provides improved visual feedback, reduces visual distraction, and removes the need for the user to manually place different objects on a background.

In some embodiments, while concurrently displaying the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more first cameras (909*a*, 909*b*, 909*c*, and/or 909*d*) of the first computer system (e.g., 906*a*, 906*b*, 906*c*, and/or 906*d*) (e.g., the representation of the surface in the first scene) on the graphical object (e.g., 954 and/or 982) and the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more second cameras (e.g., 909*a*, 909*b*, 909*c*, and/or 909*d*) of the second computer system (e.g., 906*a*, 906*b*, 906*c*, and/or 906*d*) (e.g., the representation of the surface in the second scene) on the graphical object (e.g., 954 and/or 982), the first computer system (e.g., 906*a*, 906*b*, 906*c*, and/or 906*d*) detects, via the one or more input devices (e.g., 907*a*, 907*b*, 907*c*, and/or 907*d*), a first user input (e.g., 950*d*). In response to detecting the first user input (e.g., 950*d*) and in accordance with a determination that the first user input (e.g., 950*d*) corresponds to the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more first cameras (e.g., 909*a*, 909*b*, 909*c*, and/or 909*d*) of the first computer system (e.g., 906*a*, 906*b*, 906*c*, and/or 906*d*) (e.g., the representation of the surface in the first scene), the first computer system (e.g., 906*a*, 906*b*, 906*c*, and/or 906*d*) changes (e.g., increases) a zoom level of (e.g., zooming in) the second representation (e.g., 918_b_-918_d_, 922_b_-922_d_, 924_b_-924_d_, 926_b_-926_d_, 944_a_, 946_a_, 948_a_, 978_a_, 978_b_, and/or 978_c_) of the field-of-view of the one or more first cameras (e.g., 909_a_, 909_b_, 909_c_, and/or 909_d_) of the first computer system (e.g., 906_a_, 906_b_, 906_c_, and/or 906_d_) (e.g., the representation of the surface in the first scene). In some embodiments, the computer system (e.g., 906_a_, 906_b_, 906_c_, and/or 906_d_) changes the zoom level of the second representation (e.g., 918_b_-918_d_, 922_b_-922_d_, 924_b_-924_d_, 926_b_-926_d_, 944_a_, 946_a_, 948_a_, 978_a_, 978_b_, and/or 978_c_) of the field-of-view of the one or more first cameras (e.g., 909_a_, 909_b_, 909_c_, and/or 909_d_) of the first computer system (e.g., 906_a_, 906_b_, 906_c_, and/or 906_d_) without changing a zoom level of other objects in the user interface (e.g., 916_a_-916_d_, 938_a_-938_d_, and/or 976_a_-976_d_) of the live video communication session (e.g., the first representation (e.g., 928_a_-928_d_, 930_a_-930_d_, 932_a_-932_d_, 944_a_, 946_a_, 948_a_, 983_a_, 983_b_, and/or 983_c_) of the field-of-view of the one or more first cameras (e.g., 909_a_, 909_b_, 909_c_, and/or 909_d_) of the first computer system (e.g., 906_a_, 906_b_, 906_c_, and/or 906_d_), the first representation (e.g., 928_a_-928_d_, 930_a_-930_d_, 932_a_-932_d_, 944_a_, 946_a_, 948_a_, 983_a_, 983_b_, and/or 983_c_) of the field-of-view of the one or more second cameras (e.g., 909_a_, 909_b_, 909_c_, and/or 909_d_) of the second computer system (e.g., 906_a_, 906_b_, 906_c_, and/or 906_d_), and/or the second representation (e.g., 918_b_-918_d_, 922_b_-922_d_, 924_b_-924_d_, 926_b_-926_d_, 944_a_, 946_a_, 948_a_, 978_a_, 978_b_, and/or 978_c_) of the field-of-view of the one or more second cameras (e.g., 909_a_, 909_b_, 909_c_, and/or 909_d_) of the second computer system (e.g., 906_a_, 906_b_, 906_c_, and/or 906_c_)). In response to detecting the input (e.g., 950_d_) and in accordance with a determination that the first user input (e.g., 950_d_) corresponds to the second representation (e.g., 918_b_-918_d_, 922_b_-922_d_, 924_b_-924_d_, 926_b_-926_d_, 944_a_, 946_a_, 948_a_, 978_a_, 978_b_, and/or 978_c_) of the field-of-view of the one or more second cameras (e.g., 909_a_, 909_b_, 909_c_, and/or 909_d_) of the second computer system (e.g., 906_a_, 906_b_, 906_c_, and/or 906_d_) (e.g., the representation of the surface in the second scene), the first computer system (e.g., 906_a_, 906_b_, 906_c_, and/or 906_d_) changes (e.g., increases) a zoom level of (e.g., zooming in) the second representation (e.g., 918_b_-918_d_, 922_b_-922_d_, 924_b_-924_d_, 926_b_-926_d_, 944_a_, 946_a_, 948_a_, 978_a_, 978_b_, and/or 978_c_) of the field-of-view of the one or more second cameras (e.g., 909_a_, 909_b_, 909_c_, and/or 909_d_) of the second computer system (e.g., 906_a_, 906_b_, 906_c_, and/or 906_d_) (e.g., the representation of the surface in the second scene). In some embodiments, the computer system (e.g., 906_a_, 906_b_, 906_c_, and/or 906_d_) changes the zoom level of the second representation (e.g., 918_b_-918_d_, 922_b_-922_d_, 924_b_-924_d_, 926_b_-926_d_, 944_a_, 946_a_, 948_a_, 978_a_, 978_b_, and/or 978_c_) of the field-of-view of the one or more second cameras (e.g., 909_a_, 909_b_, 909_c_, and/or 909_d_) of the second computer system (e.g., 906_a_, 906_b_, 906_c_, and/or 906_d_) without changing a zoom level of other objects in the user interface (e.g., 916_a_-916_d_, 938_a_-938_d_, and/or 976_a_-976_d_) of the live video communication session (e.g., the first representation (e.g., 928_a_-928_d_, 930_a_-930_d_, 932_a_-932_d_, 944_a_, 946_a_, 948_a_, 983_a_, 983_b_, and/or 983_c_) of the field-of-view of the one or more first cameras (e.g., 909_a_, 909_b_, 909_c_, and/or 909_d_) of the first computer system (e.g., 906_a_, 906_b_, 906_c_, and/or 906_d_), the second representation (e.g., 918_b_-918_d_, 922_b_-922_d_, 924_b_-924_d_, 926_b_-926_d_, 944_a_, 946_a_, 948_a_, 978_a_, 978_b_, and/or 978_c_) of the field-of-view of the one or more first cameras (e.g., 909_a_, 909_b_, 909_c_, and/or 909_d_) of the first computer system (e.g., 906_a_, 906_b_, 906_c_, and/or 906_d_), and/or the first representation (e.g., 928_a_-928_d_, 930_a_-930_d_, 932_a_-932_d_, 944_b_, 946_b_, and/or 948_b_) of the field-of-view of the one or more second cameras (e.g., 909_a_, 909_b_, 909_c_, and/or 909_d_) of the second computer system (e.g., 906_a_, 906_b_, 906_c_, and/or 906_d_)). Changing a zoom level of the second representation of the field-of-view of the one or more first cameras of the first computer system or the second representation of the field-of-view of the one or more second cameras of the second computer system enhances the live video communication interface by offering an improved input (e.g., gesture) system, which provides an operation when a set of conditions has been met without requiring the user to navigate through complex menus. Additionally, changing a zoom level of the second representation of the field-of-view of the one or more first cameras of the first computer system or the second representation of the field-of-view of the one or more second cameras of the second computer system enhances video communication session experience by allowing a user to view content associated with the surface at different levels of granularity, which provides improved visual feedback.

In some embodiments, the graphical object (e.g., 954 and/or 982) is based on an image of a physical object (e.g., 908_a_, 908_b_, 908_c_, and/or 908_d_) in the first scene or the second scene (e.g., an image of an object captured by the one or more first cameras or the one or more second cameras). Basing the graphical object on an image of a physical object in the first scene or the second scene enhances the video communication session experience by provide a specific and/or customized appearance of the graphical object without requiring further input from the user, which provides improved visual feedback reduces the number of inputs needed to perform an operation.

In some embodiments, while concurrently displaying the second representation (e.g., 918_b_-918_d_, 922_b_-922_d_, 924_b_-924_d_, 926_b_-926_d_, 944_a_, 946_a_, 948_a_, 978_a_, 978_b_, and/or 978_c_) of the field-of-view of the one or more first cameras (e.g., 909_a_, 909_b_, 909_c_, and/or 909_d_) of the first computer system (e.g., 906_a_, 906_b_, 906_c_, and/or 906_d_) (e.g., the representation of the surface in the first scene) on the graphical object (e.g., 954 and/or 982) and the second representation (e.g., 918_b_-918_d_, 922_b_-922_d_, 924_b_-924_d_, 926_b_-926_d_, 944_a_, 946_a_, 948_a_, 978_a_, 978_b_, and/or 978_c_) of the field-of-view of the one or more second cameras (e.g., 909_a_, 909_b_, 909_c_, and/or 909_d_) of the second computer system (e.g., 906_a_, 906_b_, 906_c_, and/or 906_d_) (e.g., the representation of the surface in the second scene) on the graphical object (e.g., 954 and/or 982), the first computer system (e.g., 906_a_, 906_b_, 906_c_, and/or 906_d_) detects, via the one or more input devices (e.g., 907_a_, 907_b_, 907_c_, and/or 907_d_), a second user input (e.g., 950_c_) (e.g., tap, mouse click, and/or drag). In response to detecting the second user input (e.g., 950_c_), the first computer system (e.g., 906_a_, 906_b_, 906_c_, and/or 906_d_) moves (e.g., rotates) the first representation (e.g., 928_a_-928_d_, 930_a_-930_d_, 932_a_-932_d_, 944_a_, 946_a_, 948_a_, 983_a_, 983_b_, and/or 983_c_) of the field-of-view of the one or more first cameras (e.g., 909_a_, 909_b_, 909_c_, and/or 909_d_) of the first computer system (e.g., 906_a_, 906_b_, 906_c_, and/or 906_d_) from a first position (e.g., 940_a_, 940_b_, and/or 940_c_) on the graphical object (e.g., 954 and/or 982) to a second position (e.g., 940_a_, 940_b_, and/or 940_c_) on the graphical object (e.g., 954 and/or 982). In response to detecting the second user input (e.g., 950_c_), the first computer system (e.g., 906_a_, 906_b_, 906_c_, and/or 906_d_) moves (e.g., rotates) the second representation (e.g., 918_b_-918_d_, 922_b_-922_d_, 924_b_-924_d_, 926_b_-926_d_, 944_a_, 946_a_, 948_a_, 978_a_, 978_b_, and/or 978_c_) of the field-of-view of the one or more first cameras (e.g., 909_a_, 909_b_, 909_c_, and/or 909_d_) of the first computer system (e.g., 906_a_, 906_b_, 906_c_, and/or 906_c_)

from a third position (e.g., 940*a*, 940*b*, and/or 940*c*) on the graphical object (e.g., 954 and/or 982) to a fourth position (e.g., 940*a*, 940*b*, 940*c*, and/or 940*d*) on the graphical object (e.g., 954 and/or 982). In response to detecting the second user input (e.g., 950*c*), the first computer system (e.g., 906*a*, 906*b*, 906*c*, and/or 906*d*) moves (e.g., rotates) the first representation (e.g., 928*a*-928*d*, 930*a*-930*d*, 932*a*-932*d*, 944*a*, 946*a*, 948*a*, 983*a*, 983*b*, and/or 983*c*) of the field-of-view of the one or more second cameras (e.g., 909*a*, 909*b*, 909*c*, and/or 909*d*) of the second computer system (e.g., 906*a*, 906*b*, 906*c*, and/or 906*d*) from a fifth position (e.g., 940*a*, 940*b*, and/or 940*c*) on the graphical object (e.g., 954 and/or 982) to a sixth position (e.g., 940*a*, 940*b*, and/or 940*c*) on the graphical object (e.g., 954 and/or 982). In response to detecting the second user input (e.g., 950*c*), the first computer system (e.g., 906*a*, 906*b*, 906*c*, and/or 906*d*) moves (e.g., rotates) the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more second cameras (e.g., 909*a*, 909*b*, 909*c*, and/or 909*d*) of the second computer system (e.g., 906*a*, 906*b*, 906*c*, and/or 906*d*) from a seventh position (e.g., 940*a*, 940*b*, and/or 940*c*) on the graphical object (e.g., 954 and/or 982) to an eighth position (e.g., 940*a*, 940*b*, and/or 940*c*) on the graphical object (e.g., 954 and/or 982). In some embodiments, the representations maintain positions relative to each other. In some embodiments, the representations are moved concurrently. In some embodiments, the representations are rotated around a table (e.g., clockwise or counter-clockwise) while optionally maintaining their positions around the table relative to each other, which can give a participant an impression that he or she has a different position (e.g., seat) at the table. In some embodiments, each representation is moved from an initial position to a previous position of another representation (e.g., a previous position of an adjacent representation). In some embodiments, moving the first representations (e.g., which include a representation of a user (e.g., the user who is sharing a view of his or her drawing) allows a participant to know which surface is associated with which user). In some embodiments, in response to detecting the second user input (e.g., 950*c*), the computer system moves a position of at least two representations of a surface (e.g., the representation of the surface in the first scene and the representation of the surface in the second scene). In some embodiments, in response to detecting the second user input (e.g., 950*c*), the computer system moves a position of at least two representations of a user (e.g., the first representation of the field-of-view of the one or more first cameras and the first representation of the field-of-view of the one or more second cameras). Moving the respective representations in response to the second user input enhances the video communication session experience by allow a user to shift multiple representations without further input, which performs an operation when a set of conditions has been met without requiring further user input.

In some embodiments, moving the first representation (e.g., 928*a*-928*d*, 930*a*-930*d*, 932*a*-932*d*, 944*a*, 946*a*, 948*a*, 983*a*, 983*b*, and/or 983*c*) of the field-of-view of the one or more first cameras (e.g., 909*a*, 909*b*, 909*c*, and/or 909*d*) of the first computer system (e.g., 906*a*, 906*b*, 906*c*, and/or 906*d*) from a first position (e.g., 940*a*, 940*b*, and/or 940*c*) on the graphical object (e.g., 954 and/or 982) to a second position (e.g., 940*a*, 940*b*, and/or 940*c*) on the graphical object (e.g., 954 and/or 982) includes displaying an animation of the first representation (e.g., 928*a*-928*d*, 930*a*-930*d*, 932*a*-932*d*, 944*a*, 946*a*, 948*a*, 983*a*, 983*b*, and/or 983*c*) of the field-of-view of the one or more first cameras (e.g., 909*a*, 909*b*, 909*c*, and/or 909*d*) of the first computer system (e.g., 906*a*, 906*b*, 906*c*, and/or 906*d*) moving from the first position (e.g., 940*a*, 940*b*, and/or 940*c*) on the graphical object (e.g., 954 and/or 982) to the second position (e.g., 940*a*, 940*b*, and/or 940*c*) on the graphical object (e.g., 954 and/or 982). In some embodiments, moving the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more first cameras (e.g., 909*a*, 909*b*, 909*c*, and/or 909*d*) of the first computer system (e.g., 906*a*, 906*b*, 906*c*, and/or 906*d*) from a third position (e.g., 940*a*, 940*b*, and/or 940*c*) on the graphical object (e.g., 954 and/or 982) to a fourth position (e.g., 940*a*, 940*b*, and/or 940*c*) on the graphical object (e.g., 954 and/or 982) includes displaying an animation of the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more first cameras (e.g., 909*a*, 909*b*, 909*c*, and/or 909*d*) of the first computer system (e.g., 906*a*, 906*b*, 906*c*, and/or 906*d*) moving from the third position (e.g., 940*a*, 940*b*, and/or 940*c*) on the graphical object (e.g., 954 and/or 982) to the fourth position (e.g., 940*a*, 940*b*, and/or 940*c*) on the graphical object (e.g., 954 and/or 982). In some embodiments, moving the first representation (e.g., 928*a*-928*d*, 930*a*-930*d*, 932*a*-932*d*, 944*a*, 946*a*, 948*a*, 983*a*, 983*b*, and/or 983*c*) of the field-of-view of the one or more second cameras (e.g., 909*a*, 909*b*, 909*c*, and/or 909*d*) of the second computer system (e.g., 906*a*, 906*b*, 906*c*, and/or 906*d*) from a fifth position (e.g., 940*a*, 940*b*, and/or 940*c*) on the graphical object (e.g., 954 and/or 982) to a sixth position (e.g., 940*a*, 940*b*, and/or 940*c*) on the graphical object (e.g., 954 and/or 982) includes displaying an animation of the first representation (e.g., 928*a*-928*d*, 930*a*-930*d*, 932*a*-932*d*, 944*a*, 946*a*, 948*a*, 983*a*, 983*b*, and/or 983*c*) of the field-of-view of the one or more second cameras (e.g., 909*a*, 909*b*, 909*c*, and/or 909*d*) of the second computer system (e.g., 906*a*, 906*b*, 906*c*, and/or 906*d*) moving from the fifth position (e.g., 940*a*, 940*b*, and/or 940*c*) on the graphical object (e.g., 954 and/or 982) to the sixth position (e.g., 940*a*, 940*b*, and/or 940*c*) on the graphical object (e.g., 954 and/or 982). In some embodiments, moving the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more second cameras (e.g., 909*a*, 909*b*, 909*c*, and/or 909*d*) of the second computer system (e.g., 906*a*, 906*b*, 906*c*, and/or 906*d*) from a seventh position (e.g., 940*a*, 940*b*, and/or 940*c*) on the graphical object (e.g., 954 and/or 982) to an eighth position (e.g., 940*a*, 940*b*, and/or 940*c*) on the graphical object (e.g., 954 and/or 982) includes displaying an animation of the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more second cameras (e.g., 909*a*, 909*b*, 909*c*, and/or 909*d*) of the second computer system (e.g., 906*a*, 906*b*, 906*c*, and/or 906*d*) moving from the seventh position (e.g., 940*a*, 940*b*, and/or 940*c*) on the graphical object (e.g., 954 and/or 982) to the eighth position (e.g., 940*a*, 940*b*, and/or 940*c*) on the graphical object (e.g., 954 and/or 982). In some embodiments, moving the representations includes displaying an animation of the representations rotating (e.g., concurrently or simultaneously) around a table, while optionally maintaining their positions relative to each other. Displaying an animation of the respective movement of the representations enhances the video communication session experience by allow a user to quickly identify how and/or where the multiple representations are moving, which provides improved visual feedback.

In some embodiments, displaying the live video communication interface (e.g., 916*a*-916*d*, 938*a*-938*d*, and/or 976*a*-976*d*) includes displaying the first representation (e.g., 928*a*-928*d*, 930*a*-930*d*, 932*a*-932*d*, 944*a*, 946*a*, 948*a*, 983*a*, 983*b*, and/or 983*c*) of the field-of-view of the one or more first cameras (e.g., 909*a*, 909*b*, 909*c*, and/or 909*d*) with a smaller size than (and, optionally, adjacent to, overlaid on, and/or within a predefined distance from) the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more first cameras (e.g., 909*a*, 909*b*, 909*c*, and/or 909*d*) (e.g., the representation of a user in the first scene is smaller than the representation of the surface in the first scene) and displaying the first representation (e.g., 928*a*-928*d*, 930*a*-930*d*, 932*a*-932*d*, 944*a*, 946*a*, 948*a*, 983*a*, 983*b*, and/or 983*c*) of the field-of-view of the one or more second cameras (e.g., 909*a*, 909*b*, 909*c*, and/or 909*d*) with a smaller size than (and, optionally, adjacent to, overlaid on, and/or within a predefined distance from) the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more second cameras (e.g., 909*a*, 909*b*, 909*c*, and/or 909*d*) (e.g., the representation of a user in the second scene is smaller than the representation of the surface in the second scene). Displaying the first representation of the field-of-view of the one or more first cameras with a smaller size than the second representation of the field-of-view of the one or more first cameras and displaying the first representation of the field-of-view of the one or more second cameras with a smaller size than the second representation of the field-of-view of the one or more second cameras enhances the video communication session experience by allowing a user to quickly identify the context of who is sharing the view of the surface, which provides improved visual feedback.

In some embodiments, while concurrently displaying the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more first cameras (e.g., 909*a*, 909*b*, 909*c*, and/or 909*d*) of the first computer system (e.g., 906*a*, 906*b*, 906*c*, and/or 906*d*) (e.g., the representation of the surface in the first scene) on the graphical object (e.g., 954 and/or 982) and the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more second cameras (e.g., 909*a*, 909*b*, 909*c*, and/or 909*d*) of the second computer system (e.g., 906*a*, 906*b*, 906*c*, and/or 906*d*) (e.g., the representation of the surface in the second scene) on the graphical object (e.g., 954, and/or 982), the first computer system (e.g., 906*a*, 906*b*, 906*c*, and/or 906*d*) displays the first representation (e.g., 928*a*-928*d*, 930*a*-930*d*, 932*a*-932*d*, 944*a*, 946*a*, 948*a*, 983*a*, 983*b*, and/or 983*c*) of the field-of-view of the one or more first cameras (e.g., 909*a*, 909*b*, 909*c*, and/or 909*d*) at an orientation that is based on a position of the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more first cameras (e.g., 909*a*, 909*b*, 909*c*, and/or 909*d*) on the graphical object (e.g., 954 and/or 982) (and/or, optionally, based on a position of the first representation of the field-of-view of the one or more first cameras in the live video communication interface). Further, the first computer system (e.g., 906*a*, 906*b*, 906*c*, and/or 906*d*) displays the first representation (e.g., 928*a*-928*d*, 930*a*-930*d*, 932*a*-932*d*, 944*a*, 946*a*, 948*a*, 983*a*, 983*b*, and/or 983*c*) of the field-of-view of the one or more second cameras (e.g., 909*a*, 909*b*, 909*c*, and/or 909*d*) at an orientation that is based on a position of the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more second cameras (e.g., 909*a*, 909*b*, 909*c*, and/or 909*d*) on the graphical object (e.g., 954 and/or 982) (and/or, optionally, based on a position of the first representation of the field-of-view of the one or more second cameras in the live video communication interface). In some embodiments, in accordance with a determination that a first representation (e.g., 928*a*-928*d*, 930*a*-930*d*, 932*a*-932*d*, 944*a*, 946*a*, 948*a*, 983*a*, 983*b*, and/or 983*c*) of the field-of-view of the one or more respective cameras (e.g., 909*a*, 909*b*, 909*c*, and/or 909*d*) of the respective computer system (e.g., 906*a*, 906*b*, 906*c*, and/or 906*d*) is displayed at a first position in the live video communication interface (e.g., 916*a*-916*d*, 938*a*-938*d*, and/or 976*a*-976*d*), the first computer system (e.g., 906*a*, 906*b*, 906*c*, and/or 906*d*) displays the first representation (e.g., 928*a*-928*d*, 930*a*-930*d*, 932*a*-932*d*, 944*a*, 946*a*, 948*a*, 983*a*, 983*b*, and/or 983*c*) of the field-of-view of the one or more respective cameras (e.g., 909*a*, 909*b*, 909*c*, and/or 909*d*) of the respective computer system (e.g., 906*a*, 906*b*, 906*c*, and/or 906*d*) at a first orientation; and in accordance with a determination that a first representation (e.g., 928*a*-928*d*, 930*a*-930*d*, 932*a*-932*d*, 944*a*, 946*a*, 948*a*, 983*a*, 983*b*, and/or 983*c*) of the field-of-view of the one or more respective cameras (e.g., 909*a*, 909*b*, 909*c*, and/or 909*d*) of the respective computer system (e.g., 906*a*, 906*b*, 906*c*, and/or 906*d*) is displayed at a second position in the live video communication interface (e.g., 9116*a*-916*d*, 938*a*-938*d*, and/or 976*a*-976*d*) different from the first position, the first computer system (e.g., 906*a*, 906*b*, 906*c*, and/or 906*d*) displays the first representation (e.g., 928*a*-928*d*, 930*a*-930*d*, 932*a*-932*d*, 944*a*, 946*a*, 948*a*, 983*a*, 983*b*, and/or 983*c*) of the field-of-view of the one or more respective cameras (e.g., 909*a*, 909*b*, 909*c*, and/or 909*d*) of the respective computer system (e.g., 906*a*, 906*b*, 906*c*, and/or 906*d*) at a second orientation different from the first orientation. Displaying the first representation of the field-of-view of the one or more first cameras at an orientation that is based on a position of the second representation of the field-of-view of the one or more first cameras on the graphical object and displaying the first representation of the field-of-view of the one or more second cameras at an orientation that is based on a position of the second representation of the field-of-view of the one or more second cameras on the graphical object enhances the video communication session experience by improving how representations are displayed on the graphical object, which performs an operation when a set of conditions has been met without requiring further user input.

In some embodiments, the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more first cameras (e.g., 909*a*, 909*b*, 909*c*, and/or 909*d*) of the first computer system (e.g., 906*a*, 906*b*, 906*c*, and/or 906*d*0) (e.g., the representation of the surface in the first scene) includes a representation (e.g., 978*a*, 978*b*, and/or 978*c*) of a drawing (e.g., 970, 972, and/or 974) (e.g., a marking made using a pen, pencil, and/or marker) on the surface (e.g., 908*a*, 908*b*, 908*c*, and/or 908*d*) in the first scene and/or the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more second cameras (e.g., 909*a*, 909*b*, 909*c*, and/or 909*d*) of the second computer system (e.g., 906*a*, 906*b*, 906*c*, and/or 906*d*) (e.g., the representation of the surface in the second scene) includes a representation (e.g., 978*a*, 978*b*, and/or

978*c*) of a drawing (e.g., 970, 972, and/or 974) (e.g., a marking made using a pen, pencil, and/or marker) on the surface (e.g., 908*a*, 908*b*, 908*c*, and/or 908*d*) in the second scene. Including a representation of a drawing on the surface in the first scene as part of the second representation of the field-of-view of the one or more first cameras of the first computer system as and/or including a representation of a drawing on the surface in the second scene as part of the second representation of the field-of-view of the one or more second cameras of the second computer system enhances the video communication session experience by allowing participants to discuss particular content, which provides improved collaboration between participants and improved visual feedback.

In some embodiments, the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more first cameras (e.g., 909*a*, 909*b*, 909*c*, and/or 909*d*) of the first computer system (e.g., 906*a*, 906*b*, 906*c*, and/or 906*d*) (e.g., the representation of the surface in the first scene) includes a representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of a physical object (e.g., 910, 912, 914, 970, 972, and/or 974) on the surface (e.g., 908*a*, 908*b*, 908*c*, and/or 908*d*) (e.g., dinner plate and/or electronic device) in the first scene and/or the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more second cameras (e.g., 909*a*, 909*b*, 909*c*, and/or 909*d*) of the second computer system (e.g., 906*a*, 906*b*, 906*c*, and/or 906*d*) (e.g., the representation of the surface in the second scene) includes a representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of a physical object (e.g., 910, 912, 914, 970, 972, and/or 974) (e.g., dinner plate and/or electronic device) on the surface (e.g., 908*a*, 908*b*, 908*c*, and/or 908*d*) in the second scene. Including a representation of a physical object on the surface in the first scene as part of the second representation of the field-of-view of the one or more first cameras of the first computer system as and/or including a representation of a physical object on the surface in the second scene as part of the second representation of the field-of-view of the one or more second cameras of the second computer system enhances the video communication session experience by allowing participants to view physical objects associated with a particular object, which provides improved collaboration between participants and improved visual feedback.

In some embodiments, while displaying the live video communication interface (e.g., 916*a*-916*d*, 938*a*-938*d*, and/or 976*a*-976*d*), the first computer system (e.g., 906*a*, 906*b*, 906*c*, and/or 906*d*) detects, via the one or more input devices (e.g., 907*a*, 907*b*, 907*c*, and/or 907*d*), a third user input (e.g., 950*e*). In response to detecting the third user input (e.g., 950*e*), the first computer system (e.g., 906*a*, 906*b*, 906*c* and/or 906*d*) displays visual markup content (e.g., 956) (e.g., handwriting) in (e.g., adding visual markup content to) the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more second cameras (e.g., 909*a*, 909*b*, 909*c*, and/or 909*d*) of the second computer system (e.g., 906*a*, 906*b*, 906*c*, and/or 906*d*) in accordance with the third user input (e.g., 950*e*). In some embodiments, the visual markings (e.g., 956) are concurrently displayed at both the first computing system (e.g., 906*a*, 906*b*, 906*c*, and/or 906*d*) and at the second computing system (e.g., 906*a*, 906*b*, 906*c*, and/or 906*d*) using the system's respective display generation component (e.g., 907*a*, 907*b*, 907*c*, and/or 907*d*). Displaying visual markup content in the second representation of the field-of-view of the one or more second cameras of the second computer system in accordance with the third user input enhances the video communication session experience by improving how participants collaborate and share content, which provides improved visual feedback.

In some embodiments, the visual markup content (e.g., 956) is displayed on a representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of an object (e.g., 910, 912, 914, 970, 972, and/or 974) (e.g., a physical object in the second scene or a virtual object) in the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more second cameras (e.g., 909*a*, 909*b*, 909*c*, and/or 909*d*) of the second computer system (e.g., 906*a*, 906*b*, 906*c*, and/or 906*d*). In some embodiments, while displaying the visual markup content (e.g., 956) on the representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the object (e.g., 910, 912, 914, 970, 972, and/or 974) in the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more second cameras (e.g., 909*a*, 909*b*, 909*c*, and/or 909*d*) of the second computer system (e.g., 906*a*, 906*b*, 906*c*, and/or 906*d*), the first computer system (e.g., 906*a*, 906*b*, 906*c*, and/or 906*d*) receives an indication of movement (e.g., detecting movement) of the object (e.g., 910, 912, 914, 970, 972, and/or 974) in the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more second cameras (e.g., 909*a*, 909*b*, 909*c*, and/or 909*d*) of the second computer system (e.g., 906*a*, 906*b*, 906*c*, and/or 906*d*). In response to receiving the indication of movement of the object (e.g., 910, 912, 914, 970, 972, and/or 974) in the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more second cameras (e.g., 909*a*, 909*b*, 909*c*, and/or 909*d*) of the second computer system (e.g., 906*a*, 906*b*, 906*c*, and/or 906*d*), the first computer system (e.g., 906*a*, 906*b*, 906*c*, and/or 906*d*) moves the representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the object (e.g., 910, 912, 914, 970, 972, and/or 974) in the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more second cameras (e.g., 909*a*, 909*b*, 909*c*, and/or 909*d*) of the second computer system (e.g., 906*a*, 906*b*, 906*c*, and/or 906*d*) in accordance with the movement of the object (e.g., 910, 912, 914, 970, 972, and/or 974) and moves the visual markup content (e.g., 956) in the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more second cameras (e.g., 909*a*, 909*b*, 909*c*, and/or 909*d*) of the second computer system (e.g., 906*a*, 906*b*, 906*c*, and/or 906*d*) in accordance with the movement of the object (e.g., 910, 912, 914, 970, 972, and/or 974), including maintaining a position of the visual markup content (e.g., 956) relative to the representation of the object (e.g., 910, 912, 914, 970, 972, and/or 974). Moving the representation of the object in the second representation of the field-of-view of the one or more second cameras of the second computer system in accordance with the movement of the object and moving the visual markup content in the second representation of the field-of-view of the one or more second cameras of the second computer system in accordance with the movement of the object, including maintaining a position of the visual markup content relative to the representation of the object, enhances the video communication session experience by automatically moving representations and visual markup content in response to physical movement of the object in the physical environment without requiring any further input from the user, which reduces the number of inputs needed to perform an operation.

In some embodiments, the visual markup content (e.g., 954) is displayed on a representation of a page (e.g., 910) (e.g., a page of a physical book in the second scene, a sheet of paper in the second scene, a virtual page of a book, or a virtual sheet of paper) in the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more second cameras (e.g., 909*a*, 909*b*, 909*c*, and/or 909*d*) of the second computer system (e.g., 906*a*, 906*b*, 906*c*, and/or 906*d*). In some embodiments, the first computer system (e.g., 906*a*, 906*b*, 906*c*, and/or 906*d*) receives an indication (e.g., detects) that the page has been turned (e.g., the page has been flipped over; the surface of the page upon which the visual markup content is displayed is no longer visible to the one or more second cameras of the second computer system). In response to receiving the indication (e.g., detecting) that the page has been turned, the first computer system (e.g., 906*a*, 906*b*, 906*c*, and/or 906*d*) ceases display of the visual markup content (e.g., 956). Ceasing display of the visual markup content in response to receiving the indication that the page has been turned enhances the video communication session experience by automatically removing content when it is no longer relevant without requiring any further input from the user, which reduces the number of inputs needed to perform an operation.

In some embodiments, after ceasing display of the visual markup content (e.g., 956), the first computer system (e.g., 906*a*, 906*b*, 906*c*, and/or 906*d*) receives an indication (e.g., detecting) that the page is re-displayed (e.g., turned back to; the surface of the page upon which the visual markup content was displayed is again visible to the one or more second cameras of the second computer system). In response to receiving an indication that the page is re-displayed, the first computer system (e.g., 906*a*, 906*b*, 906*c*, and/or 906*d*) displays (e.g., re-displays) the visual markup content (e.g., 956) on the representation of the page (e.g., 910) in the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more second cameras (e.g., 909*a*, 909*b*, 909*c*, and/or 909*d*) of the second computer system (e.g., 906*a*, 906*b*, 906*c*, and/or 906*d*). In some embodiments, the visual markup content (e.g., 956) is displayed (e.g., re-displayed) with the same orientation with respect to page as the visual markup content (e.g., 956) had prior to the page being turned. Displaying the virtual markup content on the representation of the page in the second representation of the field-of-view of the one or more second cameras of the second computer system in response to receiving an indication that the page is re-displayed enhances the video communication session experience by automatically re-displaying content when it is relevant without requiring any further input from the user, which reduces the number of inputs needed to perform an operation.

In some embodiments, while displaying the visual markup content (e.g., 956) in the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more second cameras (e.g., 909*a*, 909*b*, 909*c*, and/or 909*d*) of the second computer system (e.g., 906*a*, 906*b*, 906*c*, and/or 906*d*), the first computer system (e.g., 906*a*, 906*b*, 906*c*, and/or 906*d*) receives an indication of a request detected by the second computer system (e.g., 906*a*, 906*b*, 906*c*, and/or 906*d*) to modify (e.g., remove all or part of and/or add to) the visual markup content (e.g., 956) in the live video communication session. In response to receiving the indication of the request detected by the second computer system (e.g., 906*a*, 906*b*, 906*c*, and/or 906*d*) to modify the visual markup content (e.g., 956) in the live video communication session, the first computer system (e.g., 906*a*, 906*b*, 906*c*, and/or 906*d*) modifies the visual markup content (e.g., 956) in the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more second cameras (e.g., 909*a*, 909*b*, 909*c*, and/or 909*d*) of the second computer system (e.g., 906*a*, 906*b*, 906*c*, and/or 906*d*) in accordance with the request to modify the visual markup content (e.g., 956). Modifying the virtual markup content in the second representation of the field-of-view of the one or more second cameras of the second computer system in accordance with the request to modify the virtual markup content enhances the video communication session experience by allowing participants to modify other participants content without requiring input from the original visual markup content creator, which reduces the number of inputs needed to perform an operation.

In some embodiments, after displaying (e.g., after initially displaying) the visual markup content (e.g., 956) in the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more second cameras (e.g., 909*a*, 909*b*, 909*c*, and/or 909*d*) of the second computer system (e.g., 906*a*, 906*b*, 906*c*, and/or 906*d*), the first computer system (e.g., 906*a*, 906*b*, 906*c*, and/or 906*d*) fades out (e.g., reducing visibility of, blurring out, dissolving, and/or dimming) the display of the visual markup content (e.g., 956) over time (e.g., five seconds, thirty seconds, one minute, and/or five minutes). In some embodiments, the computer system (e.g., 906*a*, 906*b*, 906*c*, and/or 906*d*) begins to fade out the display of the visual markup content (e.g., 956) in accordance with a determination that a threshold time has passed since the third user input (e.g., 950*e*) has been detected (e.g., zero seconds, thirty seconds, one minute, and/or five minutes). In some embodiments, the computer system (e.g., 906*a*, 906*b*, 906*c*, and/or 906*d*) continues to fade out the visual markup content (e.g., 956) until the visual markup content (e.g., 956) ceases to be displayed. Fading out the display of the virtual markup content over time after displaying the visual markup content in the second representation of the field-of-view of the one or more second cameras of the second computer system enhances the video communication session experience by automatically removing content when it is no longer relevant without requiring any further input from the user, which reduces the number of inputs needed to perform an operation.

In some embodiments, while displaying the live video communication interface (e.g., 916*a*-916*d*, 938*a*-938*d*, and/or 976*a*-976*d*) including the representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the surface (e.g., 908*a*, 908*b*, 908*c*, and/or 908*d*) (e.g., a first surface) in the first scene, the first computer system (e.g., 906*a*, 906*b*, 906*c*, and/or 906*d*) detects, via the one or more input devices, a speech input (e.g., **950*f*) that includes a query (e.g., a verbal question). In response to detecting the speech input (e.g., 950*f*), the first computer system (e.g., 906*a*, 906*b*, 906*c*, and/or 906*c*) outputs a response (e.g., 968) to the query (e.g., an audio and/or graphic output) based on visual content (e.g., 966) (e.g., text and/or a graphic) in the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more first cameras (e.g., 909*a*, 909*b*, 909*c*, and/or 909*d*) of the first computer system (e.g., 906*a*, 906*b*, 906*c*, and/or 906*d*) and/or the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more second cameras (e.g., 909*a*, 909*b*, 909*c*, and/or 909*d*) of the second computer system (e.g., 906*a*, 906*b*, 906*c*, and/or 906*d***). Outputting a response to the query based on visual content in the second representation of the field-of-view of the one or more first cameras of the first computer system and/or the second representation of the field-of-view of the one or more second cameras of the second computer system enhances the live video communication user interface by automatically outputting a relevant response based on visual content without the need for further speech input from the user, which reduces the number of inputs needed to perform an operation.

In some embodiments, while displaying the live video communication interface (e.g., **916*a*-916*d*, 938*a*-938*d*, and/or 976*a*-976*d*), the first computer system (e.g., 906*a*, 906*b*, 906*c*, and/or 906*d*) detects that the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more first cameras (e.g., 909*a*, 909*b*, 909*c*, and/or 909*d*) of the first computer system (e.g., 906*a*, 906*b*, 906*c*, and/or 906*d*) (or, optionally, the second representation of the field-of-view of the one or more second cameras of the second computer system) includes a representation (e.g., 918*d*, 922*d*, 924*d*, 926*d*, and/or 948*a*) of a third computer system (e.g., 914) in the first scene (or, optionally, in the second scene, respectively) that is in communication with (e.g., includes) a third display generation component. In response to detecting that the second representation (e.g., 918*b*-918*d*, 922*b*-922*d*, 924*b*-924*d*, 926*b*-926*d*, 944*a*, 946*a*, 948*a*, 978*a*, 978*b*, and/or 978*c*) of the field-of-view of the one or more first cameras (e.g., 909*a*, 909*b*, 909*c*, and/or 909*d*) of the first computer system (e.g., 906*a*, 906*b*, 906*c*, and/or 906*d*) includes the representation (e.g., 918*d*, 922*d*, 924*d*, 926*d*, and/or 948*a*) of the third computer system (e.g., 914) in the first scene is in communication with the third display generation component, the first computer system (e.g., 906*a*, 906*b*, 906*c*, and/or 906*d*) displays, in the live video communication interface (e.g., 916*a*-916*d*, 938*a*-938*d*, and/or 976*a*-976*d*), visual content corresponding to display data received from the third computing system (e.g., 914) that corresponds to visual content displayed on the third display generation component. In some embodiments, the computer system (e.g., 906*a*, 906*b*, 906*c*, and/or 906*d*) receives, from the third computing system (e.g., 914), display data corresponding to the visual content displayed on the third display generation component. In some embodiments, the first computer system (e.g., 906*a*, 906*b*, 906*c*, and/or 906*d*) is in communication with the third computing system (e.g., 914) independent of the live communication session (e.g., via screen share). In some embodiments, displaying visual content corresponding to the display data received from the third computing system (e.g., 914**) enhances the live video communication session by providing a higher resolution, and more accurate, representation of the content displayed on the third display generation component. Displaying visual content corresponding to display data received from the third computing system that corresponds to visual content displayed on the third display generation component enhances the video communication session experience by providing a higher resolution and more accurate representation of what is on the third display component without requiring any further input from the user, which provides improved visual feedback and reduces the number of inputs needed to perform an operation.

In some embodiments, the first computer system (e.g., **906*a*, 906*b*, 906*c*, and/or 906*d*) displays (or, optionally, projects, e.g., via a second display generation component in communication with the first computer system), onto a physical object (e.g., 910, 912, 914, 970, 972, and/or 974) (e.g., a physical object such as, e.g., a table, book, and/or piece of paper in the first scene), content (e.g., 958) that is included in the live video communication session (e.g., virtual markup content and/or visual content in the second scene that is, e.g., represented in the second representation of the field-of-view of the one or more second cameras of the second computer system). In some embodiments, the content (e.g., 958) displayed onto the physical object (e.g., 910, 912, 914, 970, 972, and/or 974) includes the visual markup content (e.g., 956) (e.g., the visual markup content in the second representation of the field-of-view of the one or more second cameras of the second computer system that is received in response to detecting the third user input). In some embodiments, a computer system (e.g., 906*a*, 906*b*, 906*c*, and/or 906*d*) receives an indication of movement (e.g., detecting movement) of the physical object (e.g., 910, 912, 914, 970, 972, and/or 974), and in response, moves the content (e.g., 958) displayed onto the physical object (e.g., 910, 912, 914, 970, 972, and/or 974) in accordance with the movement of the physical object (e.g., 910, 912, 914, 970, 972, and/or 974), including maintaining a position (e.g., 961) of the content (e.g., 958) relative to the physical object (e.g., 910, 912, 914, 970, 972, and/or 974). In some embodiments, the content (e.g., 958) is displayed onto a physical page (e.g., a page of book 910) and, in response to receiving an indication that the page has been turned, a computer system (e.g., 906*a*, 906*b*, 906*c*, and/or 906*d*) ceases display of the content (e.g., 958) onto the page. In some embodiments, after ceasing display of the content (e.g., 958), a computer system (e.g., 906*a*, 906*b*, 906*c*, and/or 906*d*) receives an indication that the page has been turned back to, and in response, displays (e.g., re-displays) the content (e.g., 958) onto the page. In some embodiments, a computer system (e.g., 906*a*, 906*b*, 906*c* and/or 906*d*) modifies the content (e.g., 958) in response to receiving an indication (e.g., from the first and/or second computer system) of a request to modify the content (e.g., 958). In some embodiments, after displaying the content (e.g., 958) onto the physical object (e.g., 910 912, 914, 970, 972, and/or 974), a computer system (e.g., 906*a*, 906*b*, 906*c*, and/or 906*d*) fades out the display of the content (e.g., 958**) over time. Displaying, onto a physical object, content that is included in the live video communication session enhances the video communication session experience by allowing users to collaborate in a mixed reality environment, which provides improved visual feedback.

Note that details of the processes described above with respect to method 1000 (e.g., FIG. 10) are also applicable in an analogous manner to the methods described herein. For example, methods 700, 800, 1200, 1400, 1500, 1700, and 1900 optionally include one or more of the characteristics of the various methods described above with reference to method 1000. For example, the methods 700, 800, 1200, 1400, 1500, 1700, and 1900 can include characteristics of method 1000 to display images of multiple different surfaces during a live video communication session, manage how the multiple different views (e.g., of users and/or surfaces) are arranged in the user interface, provide a collaboration area for adding digital marks corresponding to physical marks, and/or facilitate better collaboration and sharing of content. For brevity, these details are not repeated herein.

FIGS. 11A-11P illustrate example user interfaces for displaying images of a physical mark, in accordance with some embodiments. The user interfaces in these figures are used to illustrate the processes described below, including the processes in FIG. 12. In some embodiments, device 1100*a* includes one or more features of devices 100, 300, and/or 500. In some embodiments, the applications, application icons (e.g., 6110-1 and/or 6108-1), interfaces (e.g., 604-1, 604-2, 604-3, 604-4, 916*a*-916*d*, 6121 and/or 6131), field-of-views (e.g., 620, 688, 6145-1, and 6147-2) provided by one or more cameras (e.g., 602, 682, 6102, and/or 906*a*-906*d*) discussed with respect to FIGS. 6A-6AY and FIGS. 9A-9T are similar to the applications, application icons (e.g., 1110, 1112, and/or 1114) and field-of-view (e.g., 1120) provided by cameras (e.g., 1102*a*) discussed with respect to FIGS. 11A-11P. Accordingly, details of these applications, interfaces, and field-of-views may not be repeated below for the sake of brevity.

At FIG. 11A, camera 1102*a* of device 1100*a* captures an image that includes both a face of user 1104*a* (e.g., John) and a surface 1106*a*. As depicted in a schematic representation of a side view of user 1104*a* and surface 1106*a*, camera 1102*a* includes field of view 1120 that includes a view of user 1104 depicted by shaded region 1108 and a view of surface 1106*a* depicted by shaded region 1109.

At FIG. 11A, device 1100*a* displays a user interface on display 1101. The user interface includes presentation application icon 1114 associated with a presentation application. The user interface also includes video communication application icon 1112 associated with a video communication application. While displaying the user interface of FIG. 11A, device 1100*a* detects mouse click 1115*a* directed at presentation application icon 1114. In response to detecting mouse click 1115*a*, device 1100*a* displays a presentation application interface similar to presentation application interface 1116, as depicted in FIG. 11B.

Figure 11B:
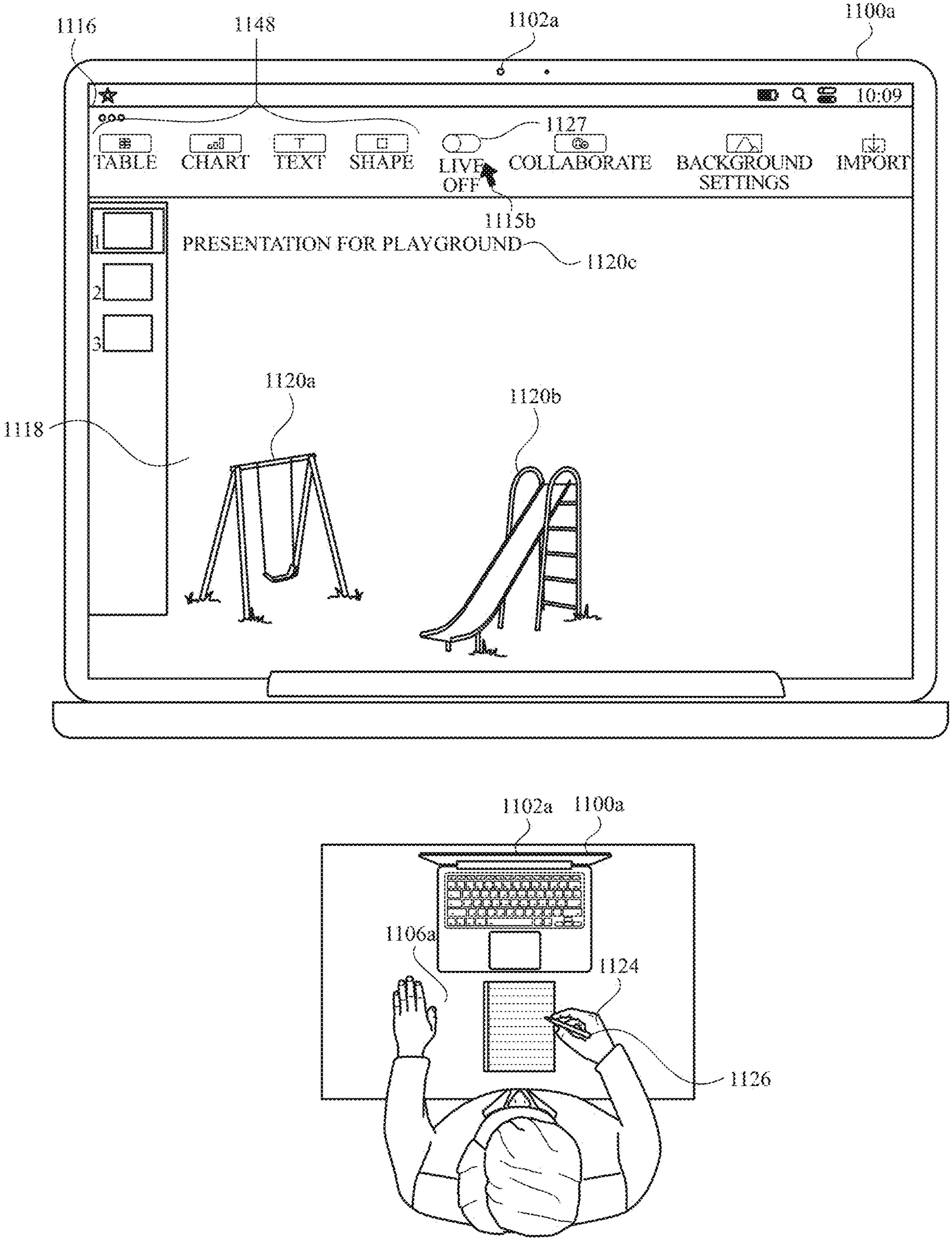

At FIG. 11B, presentation application interface 1116 includes a document having slide 1118. As depicted, slide 1118 includes slide content 1120*a*-1120*c*. In some embodiments, slide content 1120*a*-1120*c* includes digital content. In some embodiments, slide content 1120*a*-1120*c* is saved in association with the document. In some embodiments, slide content 1120*a*-1120*c* includes digital content that has not been added based on image data captured by camera 1102*a*. In some embodiments, slide content 1120*a*-1120*c* was generated based on inputs detected from devices other than camera 1102*a* (e.g., based on an input that selects affordances 1148 associated with objects or images provided by the presentation application, such as charts, tables, and/or shapes). In some embodiments, slide content 1120*c* includes digital text that was added based on receiving input on a keyboard of device 1100.

FIG. 11B also depicts a schematic representation of a top view of surface 1106*a* and hand 1124 of user 1104*a*. The schematic representation depicts a notebook that user 1104*a* optionally draws or writes on using writing utensil 1126.

At FIG. 11B, presentation application interface 1116 includes image capture affordance 1127. Image capture affordance 1127 optionally controls the display of images of physical content in the document and/or presentation application interface 1116 using image data (e.g., a still image, video, and/or images from a live camera feed) captured by camera 1102*a*. In some embodiments, image capture affordance 1127 optionally controls displaying images of physical content in the document and/or the presentation application interface 1116 using image data captured by a camera other than camera 1102*a* (e.g., a camera associated with a device that is in a video communication session with device 1100*a*). While displaying presentation application interface 1116, device 1100*a* detects input (e.g., mouse click 1115*b* and/or other selection input) directed at image capture affordance 1127. In response to detecting mouse click 1115*b*, device 1100*a* displays presentation application interface 1116, as depicted in FIG. 11C.

Figure 11C:
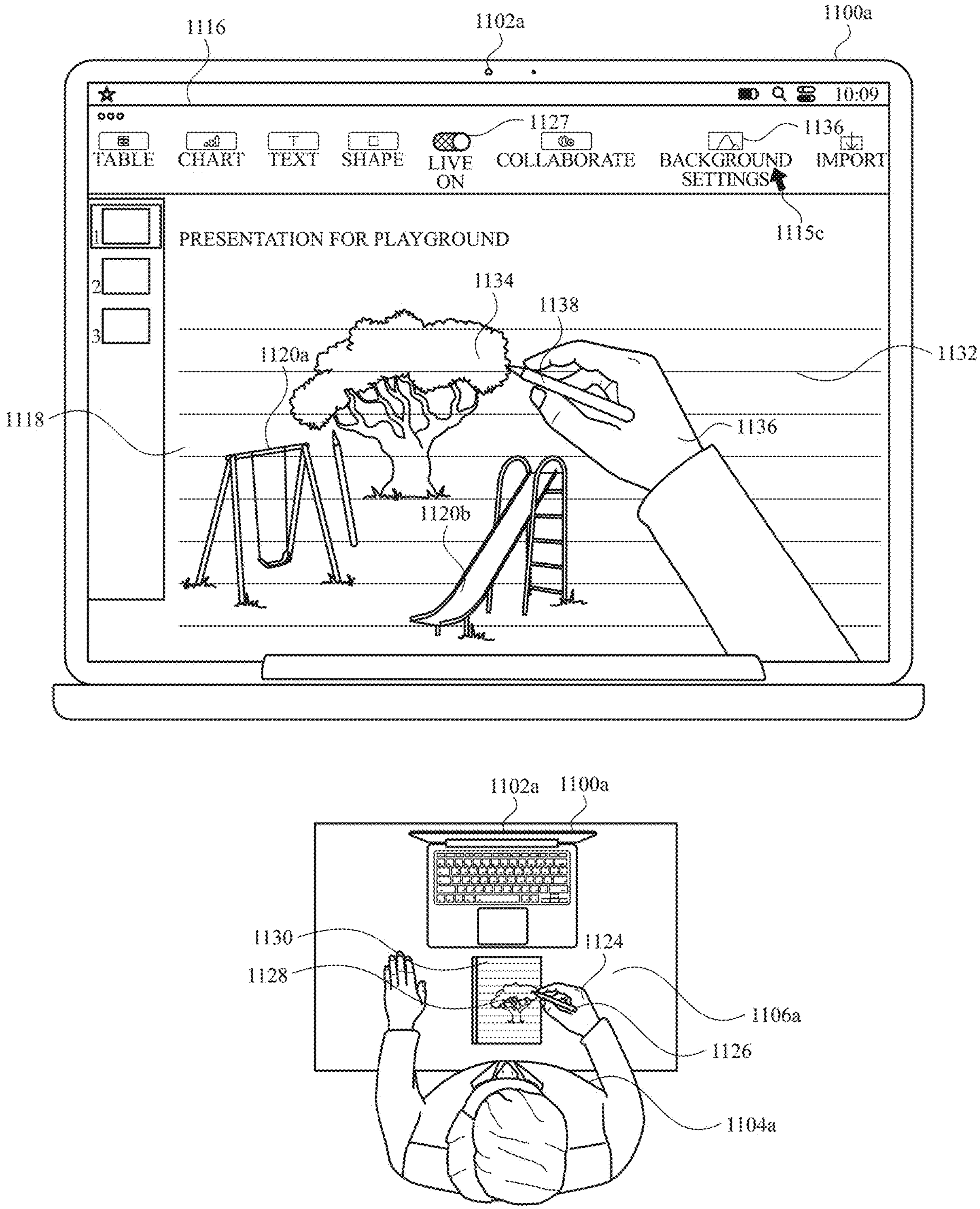

At FIG. 11C, presentation application interface 1116 includes an updated slide 1118 as compared to slide 1118 of FIG. 11B. Slide 1118 of FIG. 11C includes a live video feed image captured by camera 1102*a*. In response to detecting a selection of image capture affordance 1127 (e.g., when capture affordance 1127 is enabled), device 1100*a* continuously updates slide 1118 based on the live video feed image data (e.g., captured by camera 1102*a*). In some embodiments, in response to detecting another selection of image capture affordance 1127, device 1100*a* does not display the live video feed image data (e.g., when image capture affordance 1127 is disabled). As described herein, in some embodiments, content from the live video feed image is optionally displayed when image capture affordance 1127 is disabled (e.g., based on copying and/or importing the image). In such embodiments, the content from the live video feed image continues to be displayed even though the content from the live video feed image is not updated based on new image data captured by camera 1102*a*.

At FIG. 11C, device 1100*a* displays hand image 1336 and tree image 1134, which correspond to capture image data of hand 1124 and tree 1128. As depicted, the hand image 1336 and tree image 1134 are overlaid on slide 1118. Presentation application interface 1116 also includes notebook line image 1132 overlaid on slide 1118, where notebook line image 1132 corresponds to captured image data of notebook lines 1130. In some embodiments, device 1100*a* displays tree image 1134 and/or notebook line image 1132 as being overlaid onto slide content 1120*a*-1120*c*. In some embodiments, device 1100*a* displays slide content 1120*a*-1120*c* as being overlaid onto tree image 1134.

In FIG. 11C, presentation application interface 1116 includes hand image 1136 and writing utensil image 1138. Hand image 1136 is a live video feed image of hand 1124 of user 1104*a*. Writing utensil image 1138 is a live video feed image of writing utensil 1126. In some embodiments, device 1100*a* displays hand image 1136 and/or writing utensil image 1138 as being overlaid onto slide content 1120*a*-1120*c* (e.g., slide content 1120*a*-1120*c*, saved live video feed images, and/or imported live video feed image data).

At FIG. 11C, presentation application interface 1116 includes image settings affordance 1136 to display options for managing image content captured by camera 1102*a*. In some embodiments, image settings affordance 1136 includes options for managing image content captured by other cameras (e.g., cameras associated with image data captured by devices in communication with device 1100*a* during a video conference, as described herein). At FIG. 11C, while displaying presentation application interface 1116, device 1100*a* detects mouse click 1115*c* directed at image settings affordance 1136. In response to detecting mouse click 1115*c*, device 1100*a* displays presentation application interface 1116, as depicted in FIG. 11D.

Figure 11D:
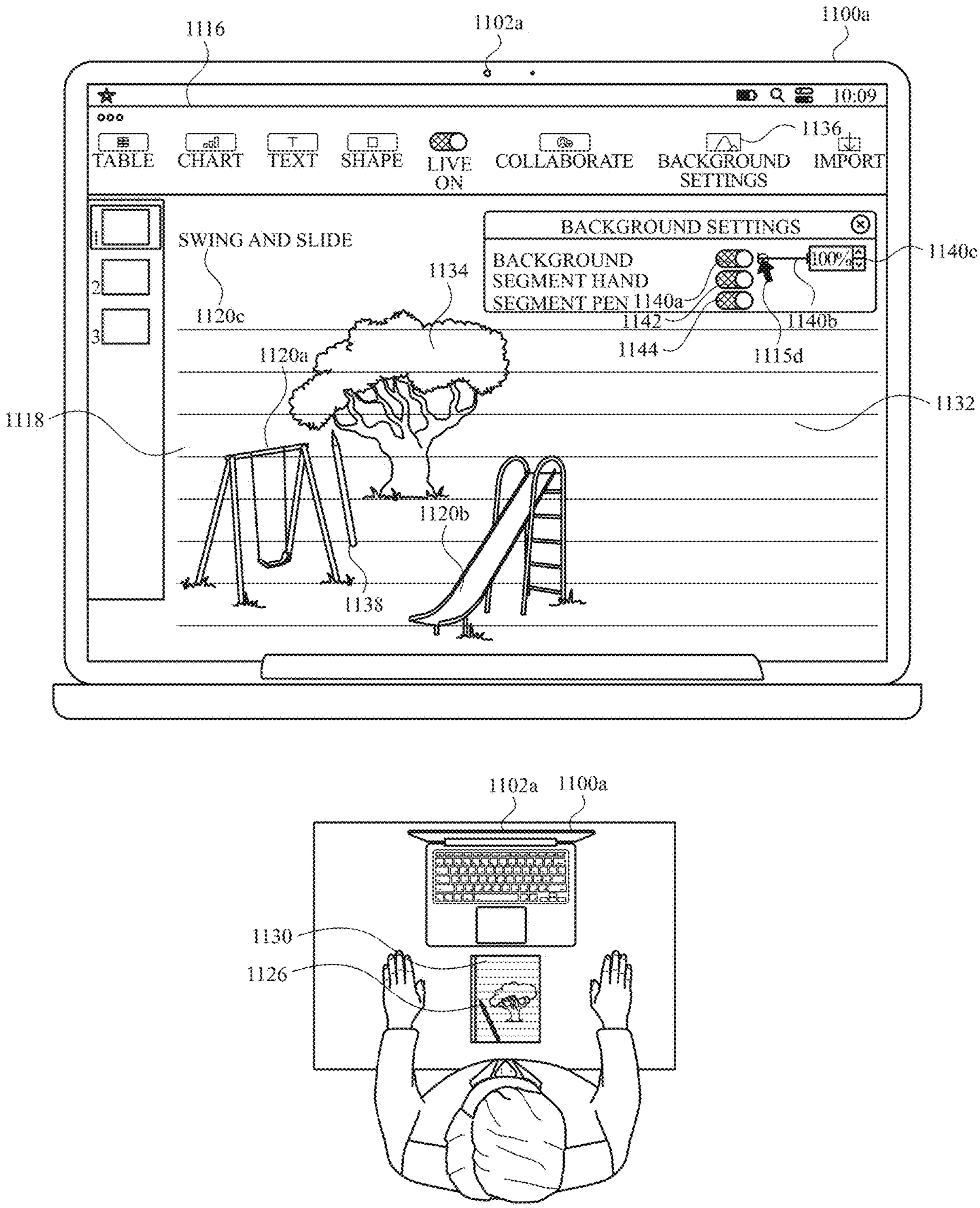

At FIG. 11D, device 1100*a* optionally modifies captured image data on slide 1118. As depicted, presentation application interface 1116 includes background settings affordances 1140*a*-1140*c*, hand setting affordance 1142, and marking utensil affordance 1144. Background settings affordances 1140*a*-1140*c* provide options for modifying a representation of a background of physical drawings and/or handwriting captured by camera 1102. In some embodiments, background settings affordances 1140*a*-1140*c* allow device 1100*a* to change a degree of emphasis of the representation of the background of the physical drawing (e.g., with respect to the representation of handwriting and/or other content on slide 1118). The background is optionally a portion of the surface 1106*a* and/or the notebook. Selecting background settings affordance 1140*a* optionally completely removes display of a background (e.g., by setting an opacity of the image to 0%) or completely displays the background (e.g., by setting the opacity of the image to 100%). Selecting background settings affordances 1140*b*-1140*c* optionally gradually deemphasizes and/or removes display of the background (e.g., by changing the opacity of the image from 100% to 75%, 50%, 25%, or another value greater than 0%) or gradually emphasizes and/or makes the background more visible or prominent (e.g., by increasing the opacity of the image). In some embodiments, device 1100*a* uses object detection software and/or a depth map to identify the background, a surface of physical drawing, and/or handwriting. In some embodiments, background settings affordances 1140*a*-1140*c* provide options for modifying display of a background of physical drawings and/or handwriting captured by cameras associated with devices that are in communication with device 1100*a* during a video communication session, as described herein.

At FIG. 11D, hand setting 1142 provides an option for modifying hand image 1136. In some embodiments, hand setting 1142 provides an option for modifying images of other user's hands that are captured by cameras associated with devices in communication with device 1100*a* during a video communication, as described herein. In some embodiments, device 1100*a* uses object detection software and/or a depth map to identify images of a user hand(s). In some embodiments, in response to detecting a mouse click directed at hand setting affordance 1142, device 1100*a* does not display an image of a user's hand (e.g., hand image 1136).

At FIG. 11D, marking utensil setting 1144 provides an option for modifying writing utensil image 1138 that is captured by camera 1102*a*. In some embodiments, marking utensil setting 1144 provides an option for modifying images of marking utensils captured by a camera associated with a device in communication with device 1100*a* during a video communication session, as described herein. In some embodiments, device 1100*a* uses object detection software and/or a depth map to identify images of a marking utensil. In some embodiments, in response to detecting an input (e.g., a mouse click, tap, and/or other selection input) directed at marking utensil affordance 1144, device 1100*a* does not display an image of a marking utensil (e.g., writing utensil image 1138).

At FIG. 11D, while displaying presentation application interface 1116, device 1100*a* detects an input (e.g., mouse click 1115*d* and/or other selection input) directed at control 1140*b* (e.g., including a mouse click and drag that adjusts a slider of control 1140*b*). In response to detecting mouse click 1115*d*, device 1100*a* displays presentation application interface 1116, as depicted in FIG. 11E.

Figure 11E:
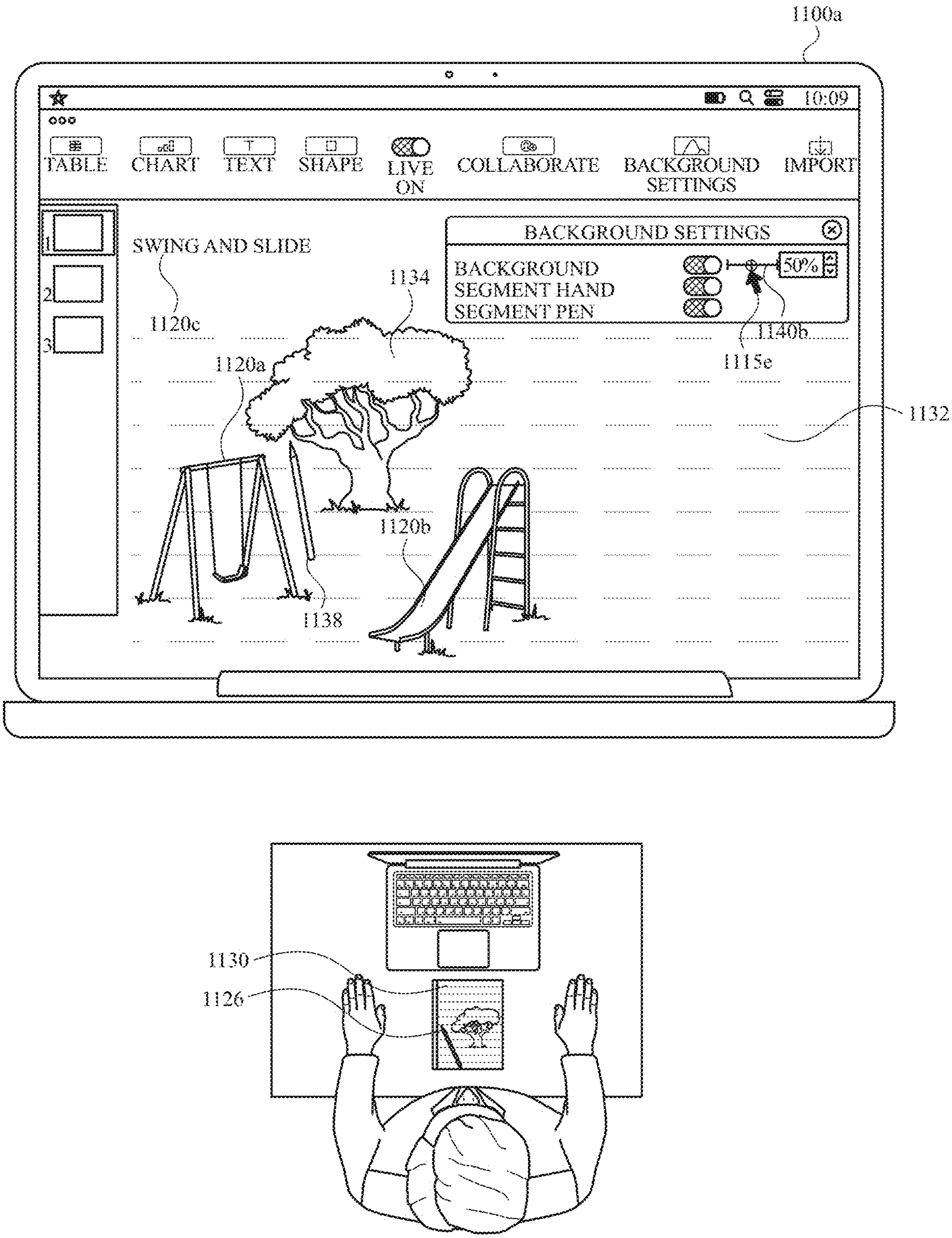

At FIG. 11E, device 1100*a* updates notebook line image 1132 in presentation application interface 1116. Notebook line image 1132 in FIG. 11E is depicted with a dashed line to indicate that it has been modified as compared to notebook line image 1132 in FIG. 11D, which is depicted with a solid line. In some embodiments, the modification is based on decreasing the opacity of notebook line image 1132 in FIG. 11E (and/or increasing the transparency) as compared to the opacity of notebook line image 1132 in FIG. 11D. As depicted in FIG. 11D, the background opacity setting is set to 100%. As depicted in FIG. 11E, the background opacity setting is set to 50%.

At FIG. 11E, device 1100*a* does not modify tree image 1134 when device 1100*a* modifies notebook line image 1132. As depicted, tree image 1134 in FIG. 11E has the same appearance as tree image 1134 in FIG. 11D. Additionally, device 1100*a* does not modify writing utensil image 1138 when device 1100*a* modifies notebook line image 1132. As depicted, writing utensil image 1138 in FIG. 11E has the same appearance as writing utensil image 1138 in FIG. 11D. Further, device 1100*a* does not modify slide content 1120*a*-1120*c* when device 1100*a* modifies notebook line image 1132. As depicted, slide content 1120*a*-1120*c* in FIG. 11E has the same appearance as slide content 1120*a*-1120*c* in FIG. 11D.

At FIG. 11E, while displaying presentation application interface 1116, device 1100*a* detects an input (e.g., mouse click 1115*e* and/or other selection input) directed at control 1140*b* (e.g., including a mouse click and drag that adjusts a slider of control 1140*b*). In response to detecting mouse click 1115*e*, device 1100*a* displays presentation application interface 1116, as depicted in FIG. 11F.

Figure 11F:
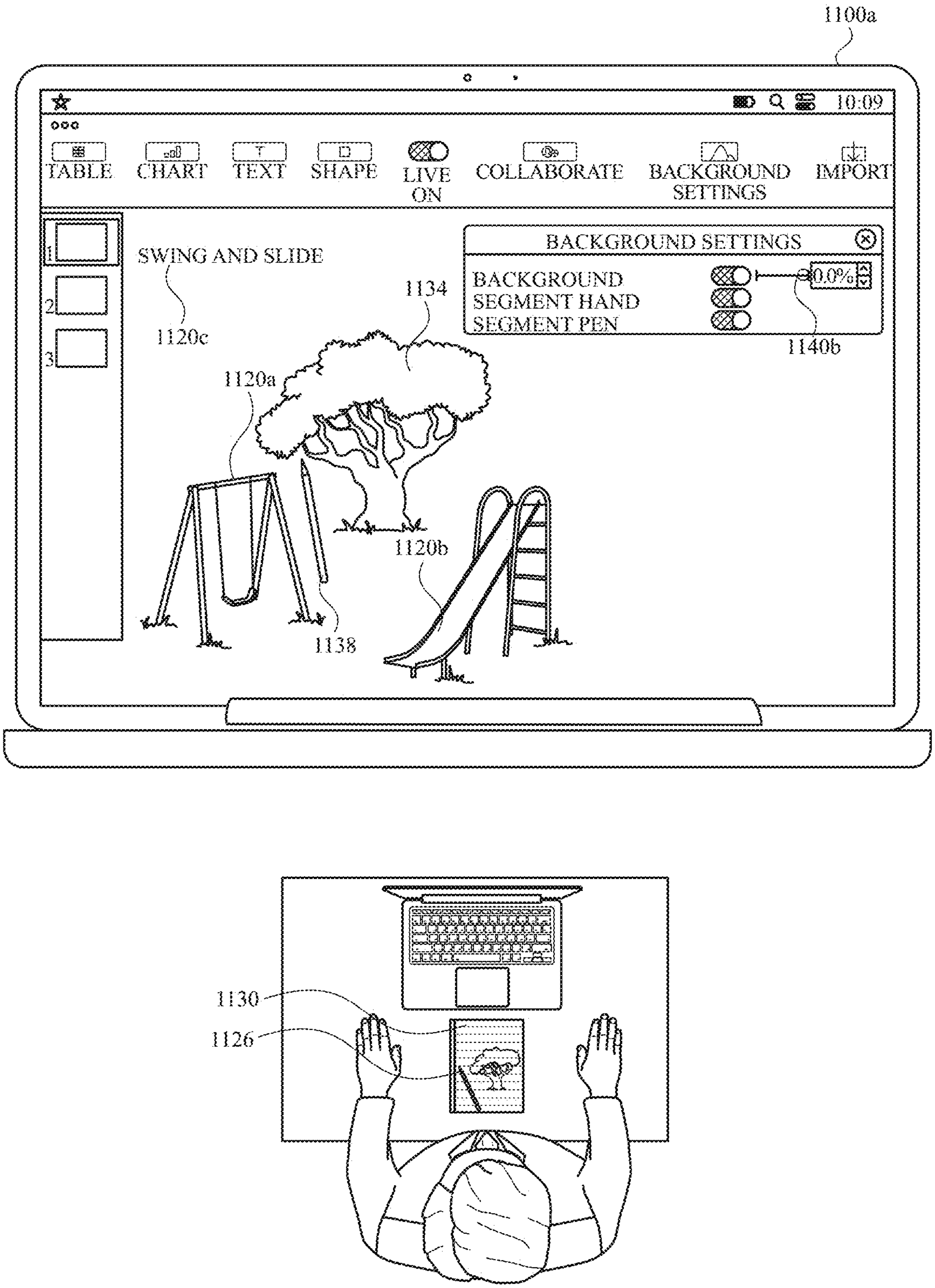

At FIG. 11F, device 1100*a* removes notebook line image 1132 in presentation application interface 1116. Notebook line image 1132 is not depicted in FIG. 11F to indicate that it has been removed. In some embodiments, the notebook line image 1132 is removed based on decreasing the opacity of notebook line image 1132 in FIG. 11F (and/or increasing the transparency). For example, as depicted in FIG. 11F, the background opacity setting is set to 0.0% as compared to the background opacity setting in FIG. 11D, which is set to 50%.

At FIG. 11F, device 1100*a* does not remove tree image 1134 when device 1100*a* removes notebook line image 1132. Device 1100*a* does not remove writing utensil image 1138 when device 1100*a* removes notebook line image 1132. Device 1100*a* does not remove slide content 1120*a*-1120*c* when device 1100*a* removes notebook line image 1132.

Figure 11G:
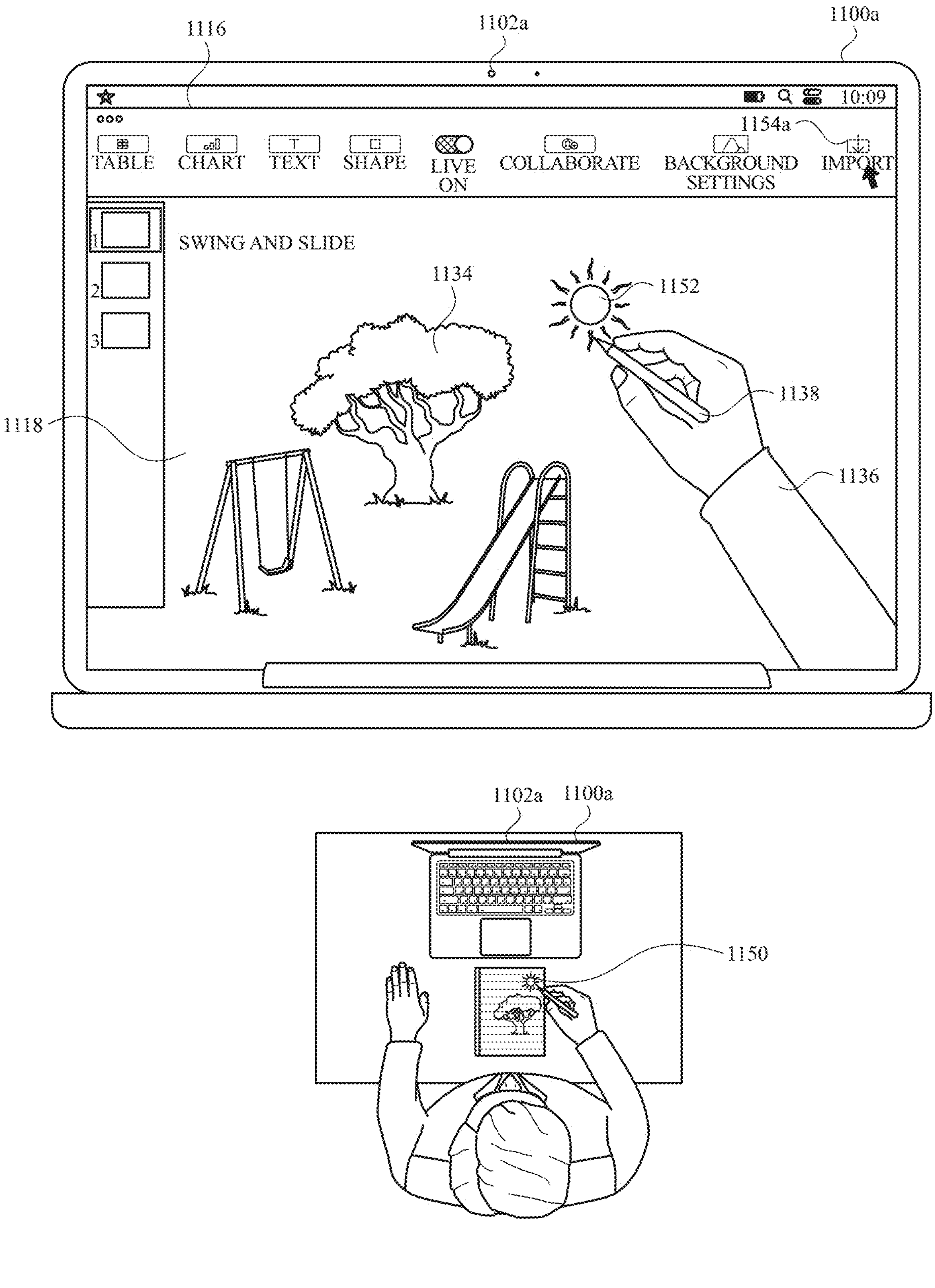

At FIG. 11G, device 1100*a* updates presentation application interface 1116 to include sun image 1152, which includes an image of sun 1150 drawn on the notebook. Notably, device 1100*a* updates presentation application interface 1116 based on the live video feed captured by camera 1102*a*. In some embodiments, device 1100*a* updates presentation application interface 1116 based on a live video feed captured by a different camera (e.g., a camera associated with a device that is in communication with device 1100*a* over a video conference and/or a camera other than camera 1102*a*).

At FIG. 11G, presentation application interface 1116 includes import affordance 1154. Import affordance 1154 provides an option to import tree image 1134 and/or sun image 1152 for live video feed image data to an electronic document such that the images are saved and/or editable. In some embodiments, importing tree image 1134 and/or sun image 1152 allows a user to save and/or edit the image. In some embodiments, importing the tree image 1134 and/or sun image 1152 allows a user to edit the image in manners that would have otherwise been unavailable had the image not been imported. In some embodiments, tree image 1134 and/or sun image 1152 are imported without importing images of the background (e.g., notebook line image 1132) based on the opacity setting of the background.

At FIG. 11G, while displaying presentation application interface 1116, device 1100*a* detects an input (e.g., mouse click 1115*g* and/or other selection input) directed at import affordance 1154. In response to detecting mouse click 1115*g*, device 1100*a* displays presentation application interface 1116, as depicted in FIG. 11H.

Figure 11H:
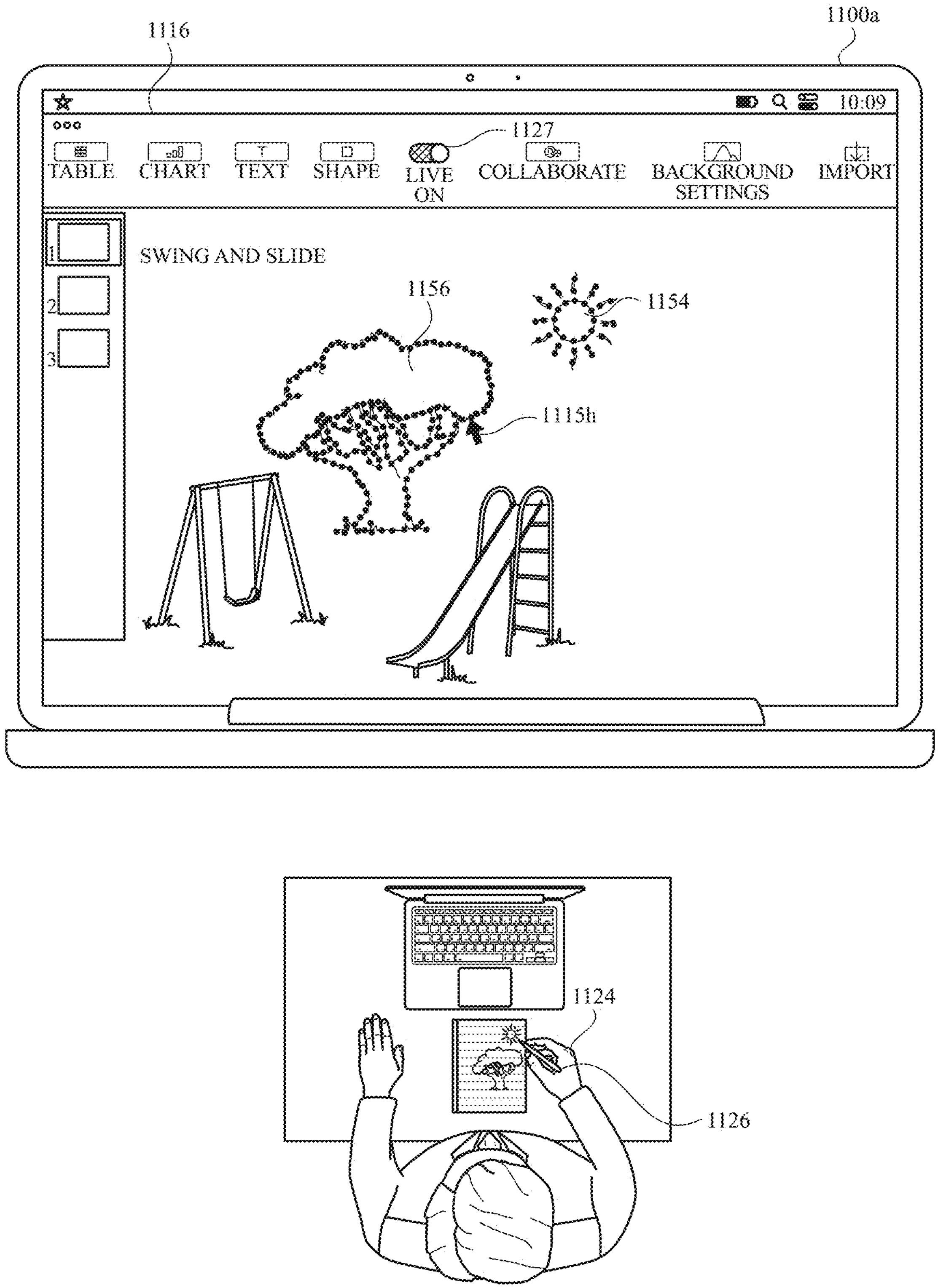

At FIG. 11H, presentation application interface 1116 includes imported tree 1156 and imported sun 1154. In some embodiments, device 1100*a* displays imported tree 1156 (or imported sun 1154) and not imported sun 1154 (and not imported tree 1156) in response to detecting a selection of which image to import (e.g., a user can select whether to import tree image 1134 and/or sun image 1152). Imported tree 1156 and imported sun 1154 are depicted with a different appearance than tree image 1134 and/or sun image 1152 of FIG. 11G to indicate that imported tree 1156 and imported sun 1154 have been imported.

At FIG. 11H, device 1100*a* does not display hand image 1136 and writing utensil image 1138 even though hand 1124 and writing utensil 1126 are in the field of view of camera 1102*a*. In some embodiments, device 1100*a* does not display hand image 1136 and writing utensil image 1138 based on marking utensil setting 1144 and hand setting 1142 being disabled. In such embodiments, device 1100*a* does not display hand image 1136 and writing utensil image 1138 even though device 1100*a* is in live capture mode, as depicted by image capture affordance 1127. In some embodiments, device 1100*a* in FIG. 11H is not in a live capture mode (e.g., based on image capture affordance 1127 being in a disabled state) and, as such, does not display hand image 1136 and writing utensil image 1138.

At FIG. 11H, while displaying presentation application interface 1116, device 1100*a* detects an input (e.g., mouse click 1115*h* and/or other selection input) directed at imported tree 1156. In response to detecting mouse click 1115*h*, device 1100*a* displays presentation application interface 1116, as depicted in FIG. 11I.

At FIG. 11I, device 1100*a* displays edit menu 1158 with options to edit imported tree 1156. Edit menu 1158 includes option 1160*a* to change a color of imported tree 1156 (e.g., without changing the color of imported sun 1154). In some embodiments, option 1160*a* allows device 1100*a* to change a color of imported tree 1156 without changing a color of other elements in images from a live video feed (e.g., other drawings on the notebook that are displayed in presentation application interface 1116).

At FIG. 11I, edit menu 1158 includes option 1160*b* to move imported tree 1156 to a different area of slide 1118 (e.g., without moving imported sun 1154). In some embodiments, option 1160*b* allows device 1100*a* to move imported tree 1156 without moving other elements in images from a live video feed (e.g., other drawings on the notebook that are displayed in presentation application interface 1116).

At FIG. 11I, edit menu 1158 includes option 1160*c* to resize imported tree 1156 to a different size (e.g., without resizing imported sun 1154). In some embodiments, option 1160*c* allows device 1100*a* to resize imported tree 1156 without resizing other elements in images from a live video feed (e.g., other drawings on the notebook that are displayed in presentation application interface 1116).

At FIG. 11I, while displaying presentation application interface 1116, device 1100*a* detects an input (e.g., mouse click 1115*i* and/or other selection input) directed at option 1160*a*. In response to detecting mouse click 1115*i*, device 1100*a* displays presentation application interface 1116, as depicted in FIG. 11J.

At FIG. 11J, device 1100*a* updates the color of imported tree 1156, as depicted by the dashed lines. As depicted in FIG. 11J, device 1100*a* continues to display imported sun 1154 with the same color as imported sun 1154 in FIG. 11I. While displaying presentation application interface 1116, device 1100*a* detects an input (e.g., mouse click 1115*j* and/or other selection input) directed at collaborate affordance 1162. In response to detecting mouse click 1115*j*, device 1100*a* displays collaboration interface 1164, as depicted in FIG. 11K.

Figure 11K:
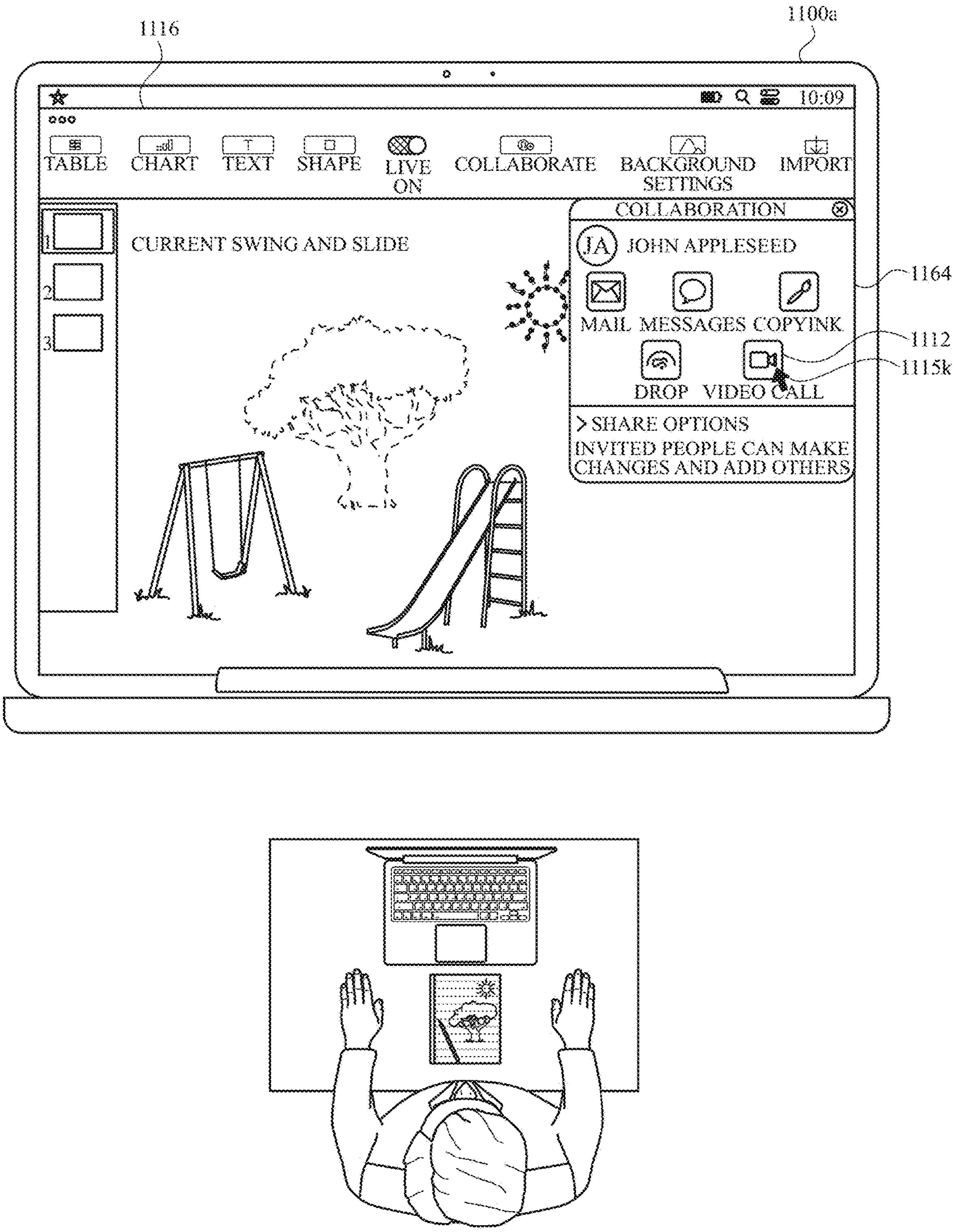

At FIG. 11K, collaboration interface 1164 displays applications in which device 1100*a* can share the presentation document including slide 1118. As depicted, collaboration interface 1164 includes video communication application icon 1112. While displaying collaboration interface 1164, device 1100*a* detects an input (e.g., mouse click 1115*k* and/or other selection input) directed at video communication application icon 1112. In response to detecting mouse click 1115*k*, device 1100*a* initiates a video communication with users 1104*b*-1104*d* (e.g., Jane, Tim, and Sam) associated with devices 1102*b*-1102*d*, as depicted in FIG. 11L.

Figure 11L:
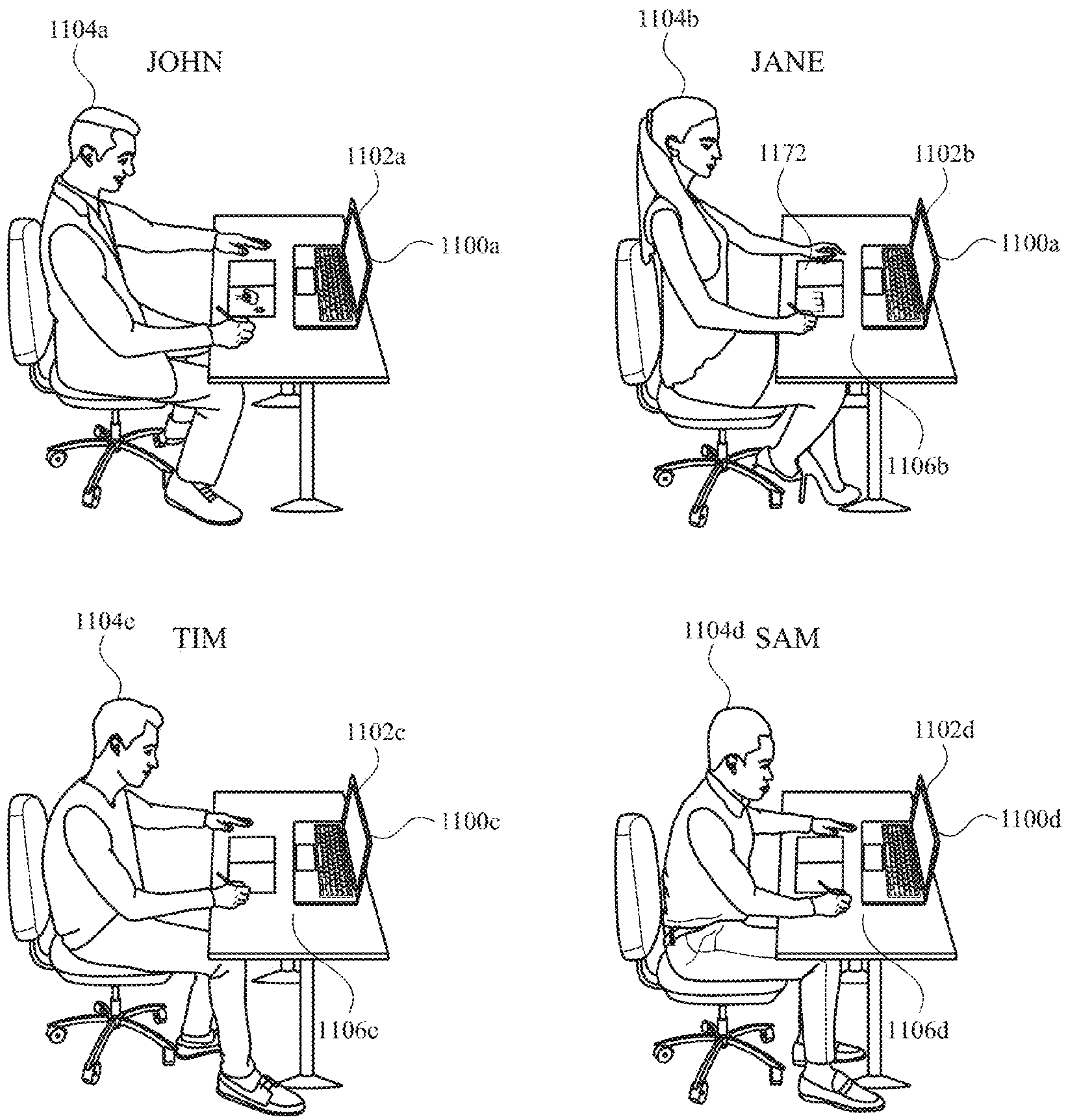

At FIG. 11L, cameras 1102*b*-1102*d* associated with devices 1100*b*-1100*d*, respectively, have a similar field of view as camera 1102*a* (e.g., field of view 1120 in FIG. 6A). Accordingly, cameras 1102*b*-1102*d* associated with devices 1100*b*-1100*d* have respective fields of view that capture a respective desk surface (e.g., surfaces 1106*b*-1106*d*) and a face of the respective user (e.g., users 1104*b*-1104*d*). As depicted, users 1104*b*-1104*d* have drawing surfaces and writing utensils that are captured by cameras 1102*b*-1102*d*. The drawing surface in front of user 1102*b* includes a drawing of monkey bars 1172 on a notebook.

Figure 11M:
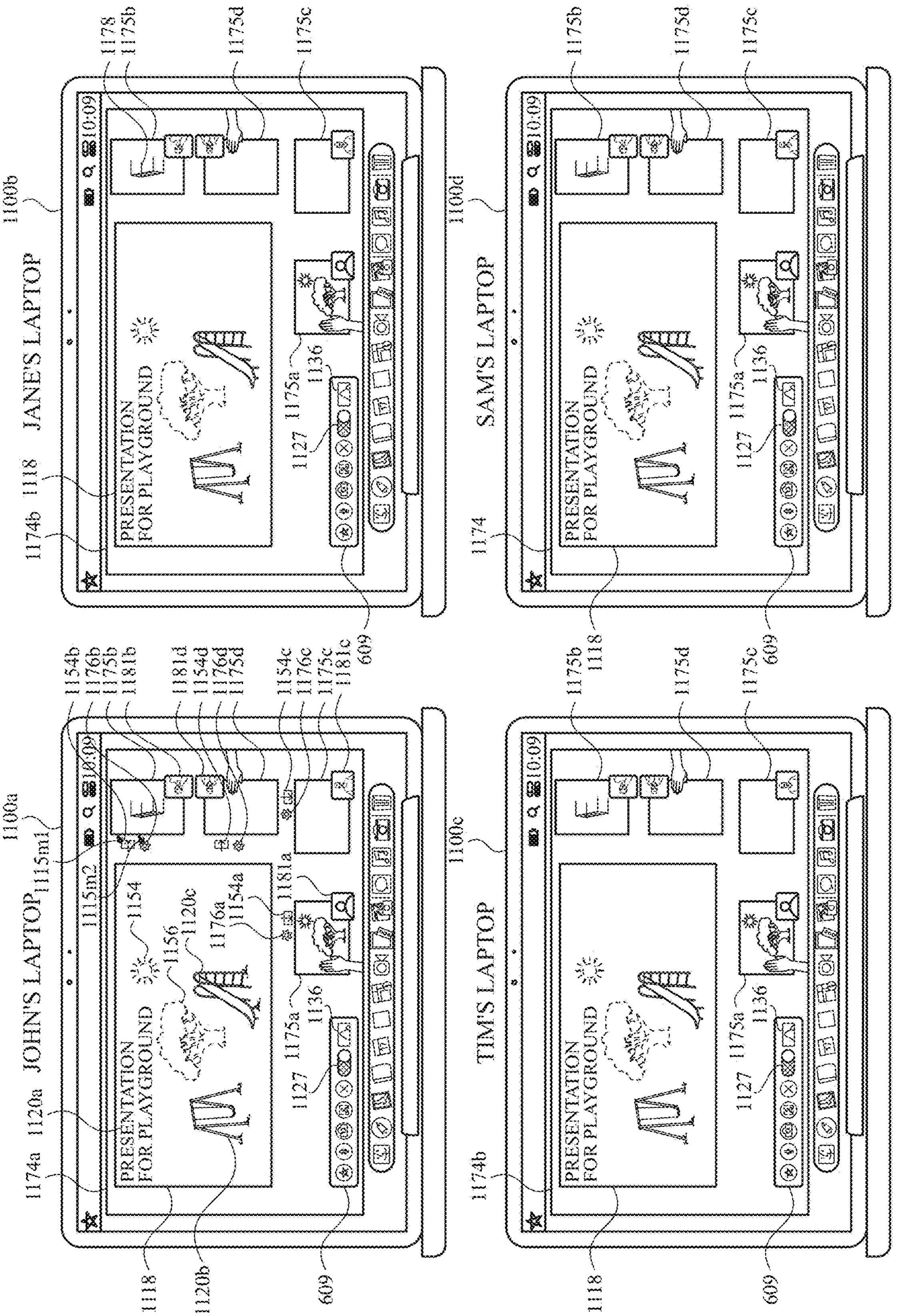

At FIG. 11M, device 1100*a* is in a video communication session with devices 1100*b*-1100*d*. Devices 1100*a-d* display video communication interfaces 1174*a*-1174*d*, respectively, similar to live video communication interfaces 976*a*-976*d* and video communication interfaces 938*a*-938*d* of FIGS. 9A-9T, but have a different state. In some embodiments, live video communication interfaces 976*a*-976*d* are controlled using the techniques described in reference to FIGS. 9A-9T. Video conference interfaces 1174*a*-1174*d* include slide 1118 and the content of slide 1118 (e.g., imported tree 1156, imported sun 1154, and slide content 1120*a*-1120*c*). In some embodiments, video communication interface 1174*a* includes presentation application interface 1116 (e.g., and/or includes functions, affordances, settings, and options of presentation application interface 1116). As depicted, video communication interface 1174*a*-1174*d* includes options menu 608 as described in reference to FIGS. 6A-6AY. In some embodiments, video communication interfaces 1174*a*-1174*d* include functions, affordances, settings, and options described in reference to the interfaces of FIGS. 6A-6AY.

At FIG. 11M, video communication interfaces 1174*a*-1174*d* include representations including images captured by cameras 1102*a*-1102*d*. As depicted, video conference interfaces 1174*a*-1174*d* include representations 1181*a*-1181*d* of the faces of users 1104*a*-1104*d* and representations 1166*a*-1166*d* of surfaces 1106*a*-1106*d*. As depicted, representation 1175*b* includes monkey bar image 1178 of the physical drawing of monkey bars 1172 in FIG. 6L. Video communication interface 1174*a* includes add live feed affordances 1176*a*-1176*d* and import affordances 1154*a*-1154*d*. Add live feed affordances 1176*a*-1176*d* provide an option for device 1100*a* to add an image (e.g., a live video feed image) associated with representations 1174*a*-1174*d* to slide 1118. Import affordances 1154*a*-1154*d* provide an option for device 1100*a* to import an image associated with representations 1174*a*-1174*d* into slide 1118.

Figure 11N:
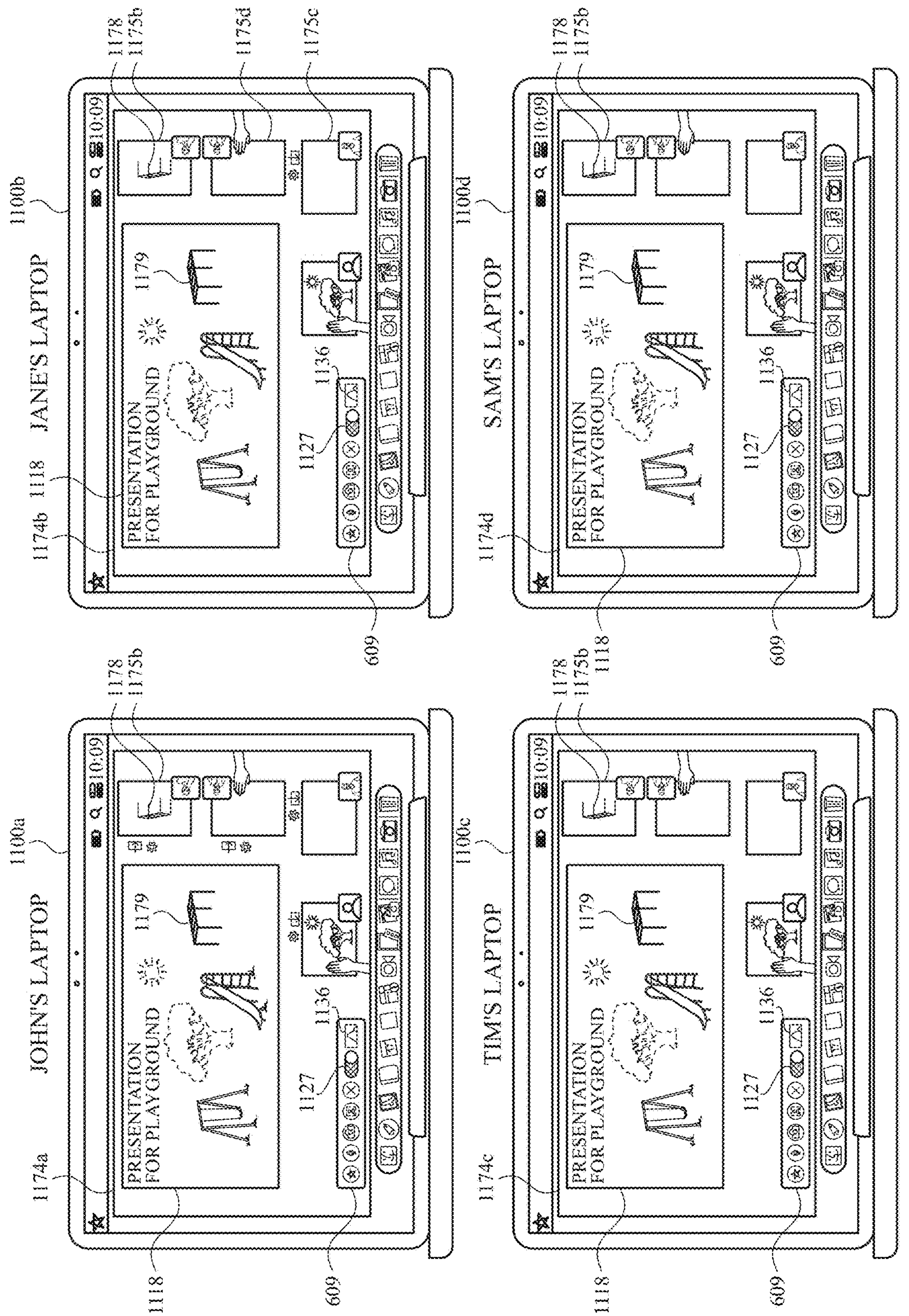

At FIG. 11M, while displaying video communication interface 1174*a*, device 1100*a* detects an input (e.g., mouse click 1115*m*1 and/or other selection input) directed at add live feed affordances 1176*b*. In response to detecting mouse click 1115*m*1, device 1100*a* displays monkey bar image 1179 in slide 1118 of video communication interface 1174*a*, as depicted in FIG. 11N. In some embodiments, monkey bar image 1179 is displayed without notebook lines of the notebook in front of user 1104*b* on surface 1109*b* in FIG. 11L. In some embodiments, video communication interfaces 1174*b*-*d* are updated in the same manner.

Figure 11O:
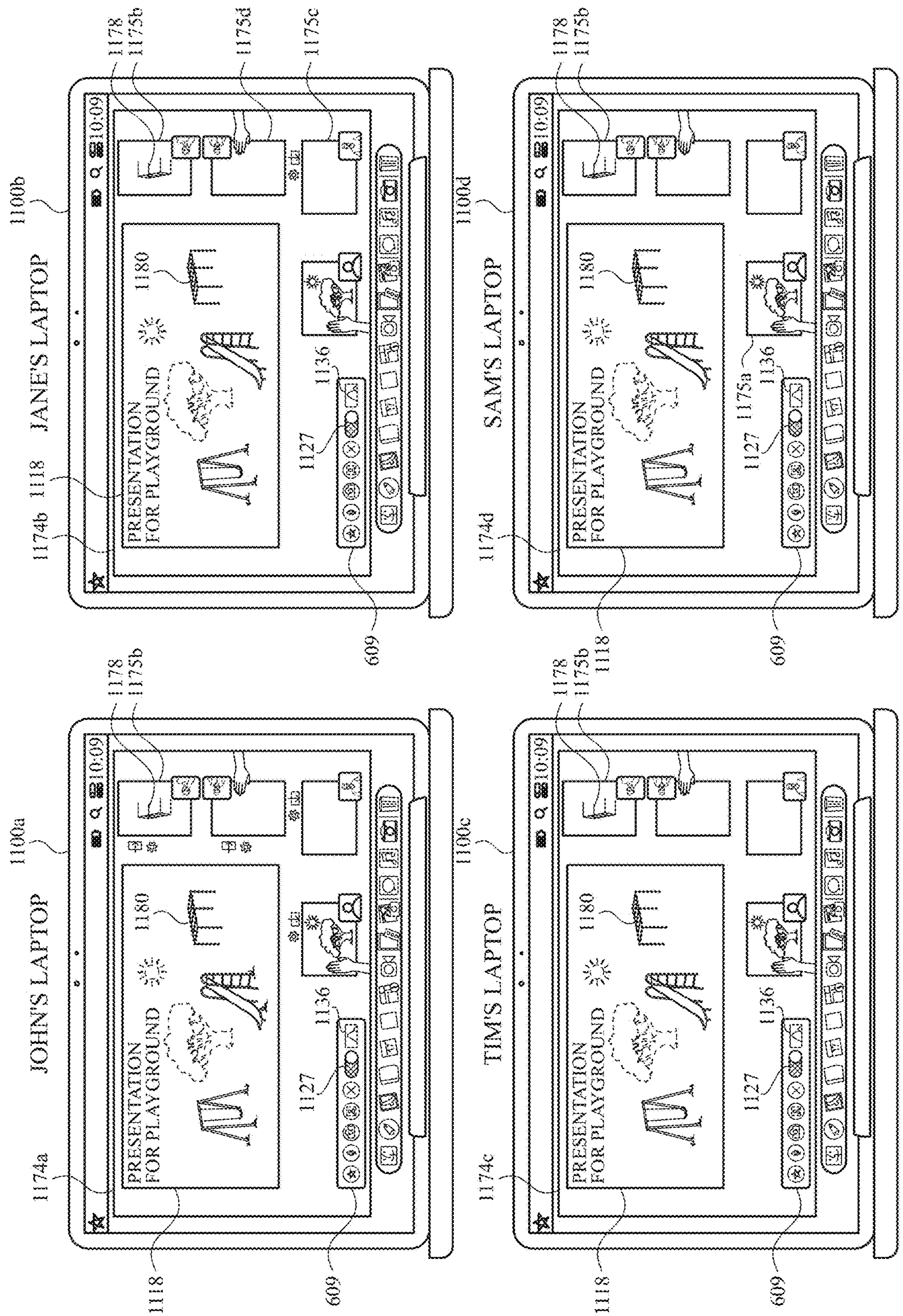
Figure 11P:
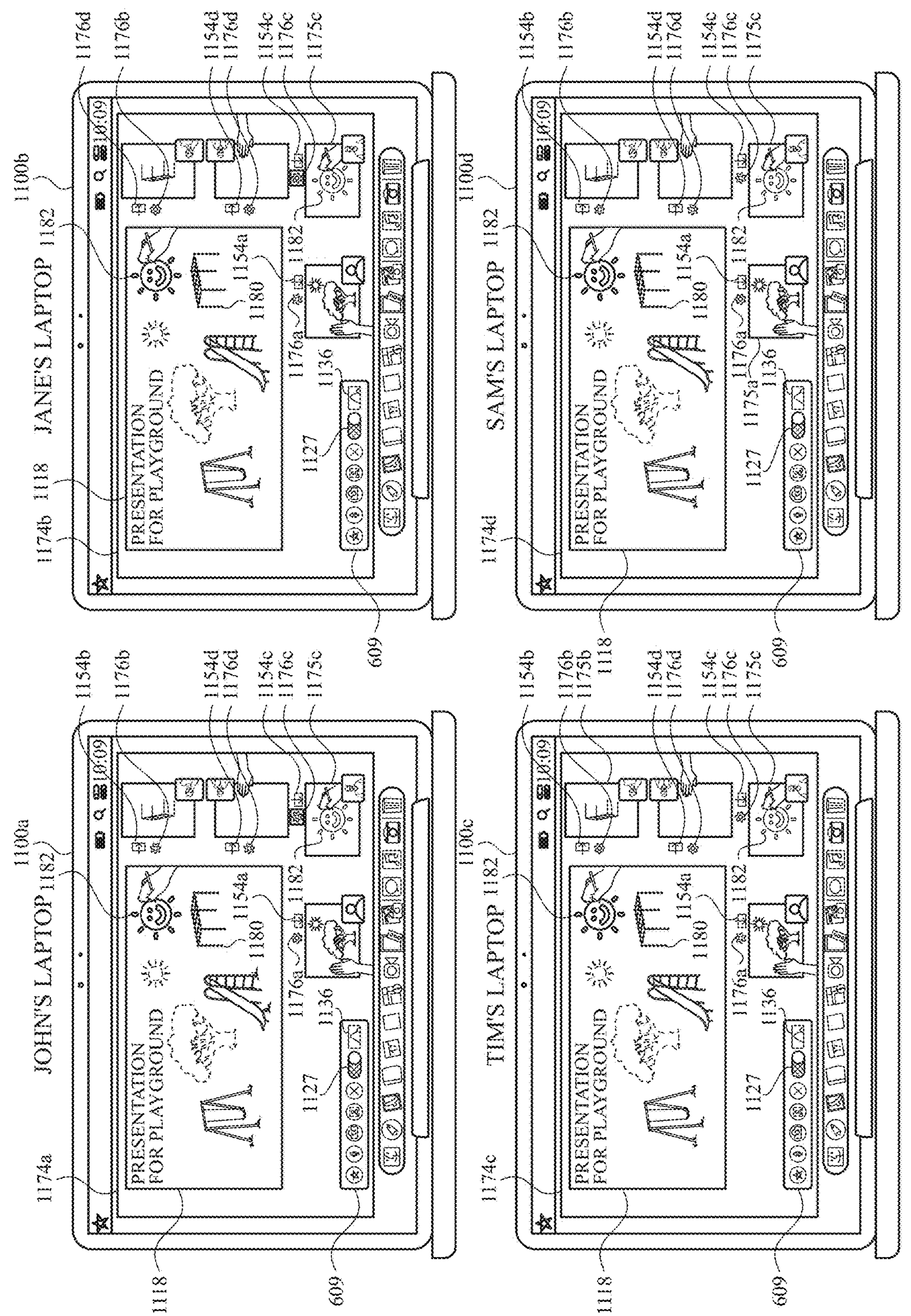

At FIG. 11M, while displaying video communication interface 1174*a*, device 1100*a* detects an input (e.g., mouse click 1115*m*2 and/or other selection input) directed at import affordance 1154*b*. In response to detecting mouse click 1115*m*1, device 1100*a* displays imported monkey bar 1180 in slide 1118 of video communication interface 1174*a*, as depicted in FIG. 11O. In some embodiments, imported monkey bar 1180 is displayed without notebook lines of the notebook in front of user 1104*b* on surface 1109*b* in FIG. 11L. In some embodiments, video communication interfaces 1174*b*-*d* are updated in the same manner.

At FIG. 11P, live capture mode is optionally enabled at device 1100*a* and/or devices 1100*b*-1100*d* (e.g., via image capture affordance 1127). As depicted, video communication interfaces 1174*a*-1174*d* includes a live video feed image (e.g., sun image 1182) of a sun that is drawn by user 1104*c*, for instance, on a piece of paper on surface 1109*c* in FIG. 6L. Sun image 1182 is overlaid on slide 1118. Additionally, sun image 1182 is displayed adjacent to imported monkey bars and other content of slide 1118. In some embodiments, live video feed images of other users' drawings and/or desk surfaces (e.g., surface 1109*a*, 1109*b*, and/or 1109*d*) are displayed on slide 1118 concurrently with the live video feed image of a drawing of user 1104*c* (e.g., as described in greater detail with respect to FIGS. 9A-9T). As depicted, a hand of user 1104*c* and a writing utensil used by user 1104*c* is displayed as being overlaid on slide 1118. In some embodiments, the hand of user 1104*c* and/or the writing utensil used by user 1104*c* is not displayed as being overlaid on slide 1118 (e.g., based on the state of a marking utensil setting or a hand setting similar to marking utensil setting 1144 and/or hand setting 1142). In some embodiments, background of the sun drawn on the piece of paper is optionally displayed as being overlaid on slide 1118 (e.g., based on the state of a background settings affordance similar to background setting affordances 1140*a*-1140*c*).

At FIG. 11O, device 1100*a* detects an input to authorize devices 1100*b*-1100*d* to manage content displayed in slide 1118. As depicted, devices 1100*b*-1100*d* display add live feed affordances 1176*a*-1176*d* and import affordances 1154*a*-1154*d*. Add live feed affordances 1176*a*-1176*d* and import affordances 1154*a*-1154*d* are displayed by representations 1175*a*-1175*d*, indicating that devices 1100*b*-1100*d* optionally add an image in representations 1175*a*-1175*d* to slide 1118 and/or import an image in representations 1175*a*-1175*d* to slide 1118. In some embodiments, add live feed affordances 1176*a*-1176*d* and import affordances 1154*a*-1154*d* are displayed adjacent to a representation of a user's own drawing without being displayed adjacent to drawings of other users. In such embodiments, devices 1100*b*-1100*d* optionally move an image captured by the respective camera of the device (e.g., and not an image captured by a camera of another user's device).

FIG. 12 is a flow diagram illustrating a method of managing digital content in accordance with some embodiments. Method 1200 is performed at a computer system (e.g., 100, 300, 500, 600-1, 600-2, 600-3, 600-4, 906*a*, 906*b*, 906*c*, 906*d*, 6100-1, 6100-2, 1100*a*, 1100*b*, 1100*c*, and/or 1100*d*) (e.g., a smartphone, a tablet computer, a laptop computer, a desktop computer, and/or a head mounted device (e.g., a head mounted augmented reality and/or extended reality device)) that is in communication with a display generation component (e.g., 601, 683, 6201, and/or 1101) (e.g., a display controller, a touch-sensitive display system, a monitor, and/or a head mounted display system) (and, optionally, is in communication with one or more cameras (e.g., 602, 682, 6202, and/or 1102*a*-1102*d*) (e.g., an infrared camera, a depth camera, and/or a visible light camera) and/or one or more input devices (e.g., a touch-sensitive surface, a keyboard, a controller, and/or a mouse)). Some operations in method 1200 are, optionally, combined, the orders of some operations are, optionally, changed, and some operations are, optionally, omitted.

As described below, method 1200 provides an intuitive way for managing digital content. The method reduces the cognitive burden on a user to manage digital content, thereby creating a more efficient human-machine interface. For battery-operated computing devices, enabling a user to manage digital content faster and more efficiently conserves power and increases the time between battery charges.

The computer system displays (1202), via the display generation component (and/or in a virtual environment, in an electronic document, and/or in a user interface of an application, such as a presentation application and/or a live video communication application), a representation of a physical mark (e.g., 1134 and/or 1152) (e.g., a pen, marker, crayon, pencil mark and/or other drawing implement mark) (e.g., drawing and/or writing) in a physical environment (e.g., physical environment of user 1104*a*) (e.g., an environment that is in the field-of-view of one or more cameras and/or an environment that is not a virtual environment) based on a view of the physical environment (e.g., 1108 and/or 1106) in a field of view (e.g., 620) of one or more cameras (e.g., image data, video data, and/or a live camera feed by one or more cameras of the computer system and/or one or more cameras of a remote computer system, such as a computer system associated with a remote participant in a live video communication session). In some embodiments, the view of the physical environment includes (or represents) the physical mark and a physical background (e.g., 1106*a* and/or notebook of FIG. 11B, 1109*c*-1109*d*, and/or 1172 of FIG. 11L) (e.g., a physical surface and/or a planar surface) (e.g., piece paper, a notepad, a white board, and/or a chalk board). In some embodiments, displaying the representation of the physical mark includes displaying the representation of the physical mark without displaying one or more elements of a portion of the physical background that is in the field of view of the one or more cameras (e.g., 1130, 1126, and/or 1124). In some embodiments, the physical mark is not a digital mark created using a computer system. In some embodiments, the representation of the physical mark is shared and/or made during a live communication session (e.g., between a plurality of computing systems). In some embodiments, the live communication session is initiated via a user interface of an application different from the live video communication application (e.g., a presentation application and/or a word processor application). In some embodiments, the live communication session is initiated via a user interface of the live communication application. In some embodiments, the computer system removes at least a portion (e.g., a first portion but not a second portion) of the physical background. In some embodiments, the computer system displays a representation of one or more objects in the foreground (e.g., pen and/or hand). In some embodiments, not displaying the one or more elements of the portion of the physical background that is in the field of view of the one or more cameras includes modifying an opacity value (e.g., by increasing the transparency and/or by decreasing the opacity) of at least a portion of a representation the one or more elements of the portion of the physical background that is in the field of view of the one or more cameras. In some embodiments, not displaying the one or more elements of the portion of the physical background that is in the field of view of the one or more cameras includes copping at least a sub-portion of the physical background (e.g., a portion surrounding the representation of the physical mark and/or a portion in an area adjacent to the representation of the physical mark). In some embodiments, the computer system displays a virtual background that is different than the physical background (e.g., rather than displaying a representation of the physical background). In some embodiments, in accordance with a determination that a respective portion of the physical environment corresponds to a physical mark (e.g., not the physical background of the physical mark), the computer system displays the respective portion as the representation of the physical mark and forgoes display of a representation of the physical background.

While displaying the representation of the physical mark without displaying the one or more elements of the portion of the physical background that is in the field of view of the one or more cameras, the computer system obtains (e.g., 1204) (e.g., receives and/or detects) data (e.g., image data, video data, and/or a live camera feed captured by one or more cameras of the computer system and/or one or more cameras of a remote computer system, such as a computer system associated with a remote participant in a live video communication session) (e.g., in near-real-time and/or in real-time) that includes (or represents) a new physical mark in the physical environment (e.g., 1128 and/or 1150).

In response to obtaining data representing the new physical mark in the physical environment, the computer system displays (1206) a representation of the new physical mark (e.g., 1134 and/or 1152) without displaying the one or more elements of the portion of the physical background that is in the field of view of the one or more cameras (e.g., as depicted in FIG. 11G). In some embodiments, the computer system updates (e.g., in near-real-time and/or in real-time) the representation of the physical mark as a new physical mark is created (e.g., drawn and/or written) (e.g., in the physical environment). In some embodiments, the representation of the new physical mark is live and/or is continuously displayed in a live manner. In some embodiments, the representation of the new physical mark is displayed while the new physical mark is being captured during a live video feed. In some embodiments, the representation of the new physical mark is displayed in a live communication session. In some embodiments, the computer system ceases to display a representation of a virtual environment and displays the representation of the new physical marking. In some embodiments, the physical mark (and/or the one or more elements of the portion of the physical background) is positioned (e.g., on a surface) between the user and the one or more cameras (e.g., on a desk or table). Displaying representation of the new physical mark without a portion of the background of the physical marks improves the computer system because it provides visual feedback of that the camera is on while reducing the number of inputs to edit an image captured by the camera so as to remove unwanted visual content, which provides improved visual feedback and reduces the number of inputs needed to perform an operation.

In some embodiments, the portion of the physical background is adjacent to and/or at least partially (e.g., completely or only partially) surrounds the physical mark (e.g., as depicted in FIGS. 11D-11G, surface 1106*a* and/or the notebook includes portions that are adjacent to and/or at least partially surround tree 1128 and sun 1150). In some embodiments, the portion of the physical background includes a portion of a physical surface (e.g., the notebook of FIGS. 11D-11G) (e.g., paper, notepad, and/or whiteboard) on which the physical mark is made. In some embodiments, the physical mark intersects and/or overlaps the portion of the physical background (e.g., tree 1128 and sun 1150 are drawn on the notebook of FIGS. 11D-11G). In some embodiments, the physical mark is within a threshold distance of the portion of the physical background (e.g., tree 1128 and sun 1150 are drawn within a page of the notebook of FIGS. 11D-11G). In some embodiments, the physical mark is between a first portion of the physical background and a second portion of the physical background. Not displaying a portion of the background that is adjacent to and/or at least partially surrounding the physical marks improves the computer system because it reduces the number of inputs to edit the images so as to remove unwanted visual content that is adjacent to the physical mark, which reduces the number of inputs needed to perform an operation.

In some embodiments, the portion of the physical background is at least partially surrounded by the physical mark (e.g., as depicted in FIGS. 11D-11G, the notebook includes portions that are inside tree 1128 and sun 1150, such as notebook line 1130) (e.g., between a first portion of the physical mark and a second portion of the physical mark) (e.g., a portion of a physical surface on which the physical mark is made is between one or more physical marks). Removing a portion of the background that is at least partially surrounded by the physical mark improves the computer system because it reduces the number of inputs needed to edit the images so as to remove unwanted visual content that is located between (e.g., inside of) the physical mark, which reduces the number of inputs needed to perform an operation.

In some embodiments, the computer system displays (e.g., concurrently with the representation of the physical mark and/or the representation of the new physical mark) a representation of a hand of a user (e.g., 1136) that is in the field of view of the one or more cameras without displaying the one or more elements of the portion of the physical background that is in the field of view of the one or more cameras, wherein the hand of the user is in a foreground of the one or more elements of the portion of the physical background that is in the field of view of the one or more cameras (e.g., as depicted in FIGS. 11C, 11G, and/or 11P). In some embodiments, the computer system foregoes displaying one or more elements of the portion of the physical background that are adjacent to (e.g., next to, and/or within a predefined distance from) the hand of the user (e.g., the one or more elements of the portion of the physical background are not displayed because they are within a predefined distance from the hand of the user). In some embodiments, elements of the physical background that are not within a predefined distance of the user's hand are displayed (e.g., the computer system only foregoes displaying elements of the physical background that are within a predefined distance from the hand of the user). In some embodiments, the computer system modifies (e.g., actively modifies, edits, crops, and/or changes) the image data representing the one or more elements of the portion of the physical background that is in the field of view of the one or more cameras so that the image data representing the hand of the user is displayed without the one or more elements of the portion of the physical background (e.g., to exclude and/or forego display of the one or more elements of the portion of the physical background). In some embodiments, the computer system distinguishes the hand of the user from the one or more elements of the portion of the physical background based on image recognition software and/or a depth map. Displaying images of a user's hand without displaying the background (and while displaying the physical mark) improves the user interface because it provides visual feedback of where the user's hand is with respect to the physical mark so that a user can view the display (e.g., and not the drawing surface) as he or she draws, which provides improved visual feedback.

In some embodiments, the computer system displays (e.g., concurrently with the representation of the physical mark, the representation of the new physical mark, and/or the representation of a hand of a user) a representation of a marking utensil (e.g., 1138) (e.g., a pen, marker, crayon, pencil mark, and/or other drawing tool) without displaying the one or more elements of the portion of the physical background that is in the field of view of the one or more cameras (e.g., as depicted in FIGS. 11C, 11E, 11G, and/or 11P). In some embodiments, the marking utensil is in the foreground of the one or more elements of the portion of the physical background that is in the field of view of the one or more cameras. In some embodiments, elements of the physical background that are not within a predefined distance of the marking utensil are displayed. In some embodiments, the computer system modifies (e.g., actively modifies, edits, crops, and/or changes) the image data representing the one or more elements of the portion of the physical background that is in the field of view of the one or more cameras so that the image data representing the marking utensil is displayed without the one or more elements of the portion of the physical background (e.g., to exclude the one or more elements of the portion of the physical background). Displaying images of a marking utensil without displaying one or more elements of the background (and while displaying the physical mark) improves the user interface because it provides visual feedback of where the marking utensil is with respect to the physical mark so that a user can view the display (e.g., and not the drawing surface) as he or she draws, which prevents the user being distracted and provides improved visual feedback of the position of the marking utensil.

In some embodiments, before displaying the representation of the physical mark without displaying one or more elements of a portion of the physical background that is in the field of view of the one or more cameras (e.g., FIG. 11E and/or FIG. 11F), the computer system concurrently displays the representation of the physical mark with a first degree of emphasis (e.g., 1134 in FIG. 11D and/or FIG. 11E) (e.g., opacity, transparency, translucency, darkness, and/or brightness) relative to a representation of the one or more elements of the portion of the physical background (e.g., 1132 in FIG. 11D and/or FIG. 11E). In some embodiments, while concurrently displaying the representation of the physical mark and the representation of the one or more elements of the portion of the physical background, the computer system detects user input (e.g., 1115*d*, 1115*e*) (e.g., a set of one or more inputs or a sequence of one or more inputs) corresponding to a request to modify (e.g., remove, not display, cease display of, dim, make less visible, reduce the visibility of, grey out, increase a transparency of, increase a translucency of, and/or reduce an opacity of) (or enable modification of) the representation of the one or more elements of the portion of the physical background. In some embodiments, in response to detecting the user input corresponding to the request to modify the representation of the one or more elements of a portion of the physical background, the computer system displays the representation of the physical mark with a second degree of emphasis greater than the first degree of emphasis relative to the representation of the one or more elements of the portion of the physical background (e.g., 1132 in FIG. 11F and/or FIG. 11G) (or enabling an ability to display, in response to further user input, the representation of the one or more elements of the portion of the physical background with a second degree of emphasis that is less than the first degree of emphasis). In some embodiments, a user input corresponding to a request to modify the representation of the one or more elements of a portion of the physical background includes a request to set an opacity value at 100%, which results in the computer system ceasing to display the representation of the one or more elements of a portion of the physical background. In some embodiments, a user input corresponding to a request to modify the representation of the one or more elements of a portion of the physical background includes a request to set an opacity value at an opacity value of less than 100% (e.g., 25%, 50%, or 75%), which results in the computer system at least partially displaying the representation of the one or more elements of a portion of the physical background. Displaying the representation of the physical mark with the second degree of emphasis greater than the first degree of emphasis relative to the representation of the one or more elements of the portion of the physical background in response to detecting an input allows the user to change and/or remove the background, provides additional control options that allow the user to decide whether to change and/or remove the background and provides improved visual feedback that input was detected.

In some embodiments, detecting the user input corresponding to the request to modify the representation of the one or more elements of a portion of the physical background includes detecting a user input (e.g., 1115*d*, 1115*e*) directed at a control (e.g., 1140*b* and/or 1140*c*) (e.g., a selectable control, a slider, and/or option picker) that includes a set (e.g., a continuous set or a discrete set) of emphasis options (e.g., 1140*b* and/or 1140*c* as depicted in FIGS. 11D-11F) (e.g., opacity values, transparency values, translucency values, darkness values, and/or brightness values) for the representation of the one or more elements of the portion of the physical background. In some embodiments, the computer system detects a magnitude of change of the control. In some embodiments, a magnitude of change of the control corresponds to a change in the degree of emphasis. In some embodiments, the control does not modify the degree of emphasis for the representation of the physical mark. Displaying the representation of the physical mark with the second degree of emphasis greater than the first degree of emphasis relative to the representation of the one or more elements of the portion of the physical background in response to detecting an input at a control that includes a set of emphasis options allows the user the option to gradually change the degree of emphasis of the background, which improves the user interface because it provides visual feedback that the camera is on and provides additional control options that allow the user to change (e.g., at least partially remove) the background and provides improved visual feedback was detected.

In some embodiments, the user input corresponding to the request to modify the representation of the one or more elements of a portion of the physical background includes detecting a user input directed at a selectable user interface object (e.g., 1140*a*) (e.g., an affordance and/or button). In some embodiments, the affordance is a toggle that, when enabled, sets the degree of emphasis to 100% and, when disabled, sets the degree of emphasis to 0.0%. In some embodiments, the computer system detects a request (e.g., a number of inputs on a button, such as up and/or down button) to gradually change the degree of emphasis. In some embodiments, the affordance does not modify the degree of emphasis for the representation of the physical mark. Displaying the representation of the physical mark with the second degree of emphasis greater than the first degree of emphasis relative to the representation of the one or more elements of the portion of the physical background in response to detecting an input directed at a selectable user interface object improves the user interface because it provides additional control options that allow the user change an emphasis of the background (e.g., fully and/or partially remove the background), provides visual feedback that the camera is on, and provides visual feedback that input was detected.

In some embodiments, the physical mark in the physical environment is a first physical mark (e.g., 1128 and/or 1150), and the first physical mark is in the field of view of one or more cameras of the computer system (e.g., 1102*a*). In some embodiments, the computer system displays, via the display generation component, a representation (e.g., 1175*b* and/or 1179) of a second physical mark in a physical environment (e.g., the physical marks on 1172 as depicted in FIG. 11L) based on a view of the physical environment in a field of view of one or more cameras (e.g., 1102*b*-1102*c*) of an external computer system (e.g., 1100*c*-1100*d*), wherein the representation of the second physical mark is concurrently displayed with the representation of the first physical mark (e.g., as depicted in FIG. 11M, FIG. 11N, and/or FIG. 11P) (e.g., representations for marks made by different users are concurrently displayed in the live video communication user interface). In some embodiments, the computer system displays the representation of the second physical mark without displaying one or more elements of a portion of the physical background that is in the field of view of the one or more cameras of the external computer system. In some embodiments, the computer system is in a live video communication session (e.g., between a plurality of computing systems and/or between a plurality of users who are participating in the live communication session) with the external computer system associated with a second user. Concurrently displaying physical marks based on a view from one or more cameras associated with a different computer system improves the video communication session experience because users can view each other's physical marks, which improves how users collaborate and/or communicate during a live video communication session.

In some embodiments, the representation of the first physical mark is a first representation (e.g., 1175*a*-1175*c*) of the first physical mark and is displayed in a first portion (e.g., 1175*a*-1175*d*) of a user interface (e.g., 1174*a*-1174*d*). In some embodiments, while displaying the first representation of the first physical mark in the first portion of the user interface, the computer system detects a first set of one or more user inputs (e.g., 1115*m*1 and/or 1115*m*2) including an input directed at a first selectable user interface object (e.g., an input directed at 1154*a*-1154*d*, 1176*a*-1176*d*) (e.g., that is adjacent to, next to, and/or within a predefined distance from the representation of the first physical mark). In some embodiments, the second portion of the user interface is a collaborative area of the user interface and/or a shared area of the user interface. In some embodiments, in response to detecting the first set of one or more user inputs, the computer system displays a second representation (e.g., 1154, 1156, 1179, and/or 1182) of the first physical mark in a second portion (e.g., 1118) of the user interface different from the first portion of the user interface (e.g., while displaying with the representation of the first physical mark in the first portion of the user interface and/or while ceasing to display the representation of the first physical mark in the first portion of the user interface). In some embodiments, the second representation of the first physical mark displayed in the second portion of the user interface is based on image data (e.g., a still image, a video and/or a live camera feed) captured by the one or more cameras of the computer system. In some embodiments, the computer system displays the second representation of the first physical mark in the second portion without displaying the one or more elements of the portion of the physical background that is in the field of view of the one or more cameras of the computer system. In some embodiments, the computer system concurrently displays, in the second portion, the representation of the second physical mark with the second representation of the first physical mark. Displaying the second representation of the first physical mark in the second portion of the user interface different in response to detecting input improves the video communication session experience because a user can move the user's mark and/or another user's physical marks to a shared collaboration space, which improves how users collaborate and/or communicate during a live video communication session and provides improved visual feedback that input was detected.

In some embodiments, the representation of the second physical mark is a first representation (e.g., 1175*a*-1175*d*) of the second physical mark and is displayed in a third portion (e.g., 1175*a*-1175*d*) of the user interface (e.g., 1174*a*-1174*d*) (e.g., different from the first portion and/or second portion). In some embodiments, the computer system detects (e.g., while displaying the second representation of the first physical mark in the third portion) a second set of one or more user inputs (e.g., 1115*m*1 and/or 1115*m*2) corresponding to a request to display a second representation (e.g., 1154, 1156, 1179, or 1182) of the second physical mark in a fourth portion (e.g., 1118) of the user interface different from the third portion of the user interface. In some embodiments, the second set of one or more user inputs includes a user input directed at a second affordance. In some embodiments, the third portion of the user interface is a collaborative area of the user interface and/or a shared area of the user interface. In some embodiments, in response to detecting the set of one or more user inputs corresponding to the request to display the second representation of the second physical mark in the fourth portion of the user interface, the computer system displays the second representation of the second physical mark (e.g., associated with a user different from the user associated with a first physical mark) in the fourth portion of the user interface (e.g., while displaying with the first representation of the second physical mark in the third portion of the user interface and/or while ceasing to display the first representation of the second physical mark in third portion of the user interface). In some embodiments, the computer system displays the second representation of the second physical mark in the fourth portion without displaying one or more elements of the portion of the physical background that is in the field of view of the one or more cameras of the external computer system. Displaying the second representation of the second physical mark in the fourth portion of the user interface in response to detecting user input during a live video communication session improves the video communication session experience because a user can move other participants' physical marks to a shared collaboration space, which improves how users collaborate and/or communicate during a live video communication session and provides improved visual feedback that input was detected.

In some embodiments, the computer system detects a request to display a digital mark (e.g., 1151*g* and/or 1151*m*1) (e.g., a digital representation of a physical mark and/or machine-generated mark) that corresponds to a third physical mark. In some embodiments, in response to detecting the request to display the digital mark, the computer system displays the digital mark that corresponds to the third physical mark (e.g., 1154, 1156, and/or 1180). In some embodiments, in response to detecting the request to display the digital mark, the computer system displays the digital mark and ceases to display the third physical mark. In some embodiments, displaying the digital mark includes obtaining data that includes an image of the third physical mark and generating a digital mark based on the third physical mark. In some embodiments, the digital mark has a different appearance than the representation of the third physical mark based on the physical mark being machine-generated (e.g., as if the physical mark were inputted directly on the computer, for example, using a mouse or stylist as opposed to being made a physical surface). In some embodiments, the representation of the third physical mark is the same as or different from the representation of the physical mark. In some embodiments, the third physical mark is captured by one or more cameras of a computer system that is different from the computer system detecting the request to display the representation of the digital mark. Displaying a digital mark that corresponds to the third physical mark provides additional control options of how physical marks are displayed within the user interface and/or how users collaborate during a live video communication session.

In some embodiments, while displaying the digital mark, the computer system detects a request to modify (e.g., 1115*h* and/or 1115*i*) (e.g., edit and/or change) (e.g., a visual characteristic of and/or visual appearance of) the digital mark corresponding to the third physical mark. In some embodiments, in response to detecting the request to modify the digital mark corresponding to the fourth physical mark, the computer system displays a new digital mark (e.g., 1156 in FIG. 11I as compared to 1156 in FIG. 11J) that is different from the representation of the digital mark corresponding to the third physical mark (e.g., a portion of the digital mark is erased and/or the new digital mark has a different appearance than the digital mark). In some embodiments, the computer system is capable of modifying (e.g., editing and/or changing) (e.g., in whole or in part) the digital mark in a manner that is different from a manner in which the representation of the third physical mark can be modified (e.g., the digital mark can be modified in ways in which the representation of the physical mark cannot be modified). Displaying a new digital mark that is different from the representation of the (original) digital mark allows a user to edit digital representations of physical marks, which provides additional control options of how representations of physical marks are displayed within the user interface and improves how users collaborate and/or communicate during a live video communication session.

In some embodiments, displaying the representation of the physical mark is based on image data captured by a first camera (e.g., a wide angle camera and/or a single camera) having a field of view (e.g., 1120) that includes a face of a user (e.g., shaded region 1108) and the physical mark (e.g., shaded region 1109) (e.g., a surface such as, for example, a desk and/or table, positioned between the user and the first camera in the physical environment that includes the physical mark). In some embodiments, the computer system displays a representation of a face of a user (e.g., a user of the computer system and/or a remote user associated with a remote computer system, such as a different participant in the live video communication session) in the physical environment based on the image data captured by the first camera (e.g., the representation of the physical mark and the representation of the user are based on image data captured by the same camera (e.g., a single camera)). Displaying the representation of the physical mark based on the image data captured by the first camera improves the computer system because a user can view different angles of a physical environment using the same camera, viewing different angles does not require further action from the user (e.g., moving the camera), doing so reduces the number devices needed to perform an operation, the computer system does not need to have two separate cameras to capture different views, and the computer system does not need a camera with moving parts to change angles, which reduces cost, complexity, and wear and tear on the device.

In some embodiments, the computer system displays a representation of the face of the user (e.g., 1104*a*-110*d*) (e.g., a user of the computer system and/or a remote user associated with a remote computer system, such as a different participant in the live video communication session) based on the image data captured by the first camera. In some embodiments, the field of view of the first camera includes (or represents) the face of the user and a physical background of the user (e.g., the physical area in the background of a face of user 1104*a*, 1104*b*, 1104*c*, or 1104*d* in FIG. 11A and/or FIG. 11L) (e.g., behind the face of the user). In some embodiments, the computer system displays the representation of the face of the user includes displaying the representation of the face of the user with a representation of the physical background of the user, wherein the face of the user is in a foreground (e.g., a face of user 1104*a*, 1104*b*, 1104*c*, or 1104*d* in FIG. 11A and/or FIG. 11L is closer to camera 1102*a*-1102*d* than the physical area in the background of the face of the user 1104*a*-1104*d* in FIG. 11A and/or FIG. 11L) of the one or more elements of the portion of the physical background that is in the field of view of the one or more cameras. In some embodiments, elements of the physical background that are not within a predefined distance of the face of the user are displayed. In some embodiments, the computer system modifies (e.g., actively modifies, edits, crops, and/or changes) the image data representing the one or more elements of the portion of the physical background that is in the field of view of the one or more cameras so that the image data representing the representation of the face of the user is displayed without the one or more elements of the portion of the physical background (e.g., to exclude the one or more elements of the portion of the physical background). Displaying the representation of the face of the user (the user of the computer system or a different user) along with the representation of the physical background of the user enhances the video communication session experience because content from the physical background of the user can be displayed while the physical background of the physical mark (and/or new physical mark) is removed and improves how users collaborate and/or communicate during a live video communication session.

Note that details of the processes described above with respect to method 1200 (e.g., FIG. 12) are also applicable in an analogous manner to the methods described below/above. For example, methods 700, 800, 1000, 1400, 1500, 1700, and 1900 optionally includes one or more of the characteristics of the various methods described above with reference to method 1200, such as managing how physical marks are displayed in and/or added to a digital document and improving how users collaborate by sharing physical marks. For brevity, these details are not repeated herein.

FIGS. 13A-13K illustrate exemplary user interfaces for managing digital content, according to some embodiments. The user interfaces in these figures are used to illustrate the processes described below, including the processes in FIG. 14.

Device 1100*a* of FIGS. 13A-13K is the same as device 1100*a* of FIGS. 11A-11P. Accordingly, details of device 1100*a* and its functions may not be repeated below for the sake of brevity. As described in FIGS. 11A-11P, camera 1102*a* of device 1100*a* captures an image of both a face of user 1104*a* and a surface 1106*a*. As depicted in a schematic representation of a side view of user 1104*a* and surface 1106*a*, camera 1102*a* includes field of view 1120 that includes a view of user 1104*a* depicted by shaded region 1108 and a view of desk surface 1106*a* depicted by shaded region 1109. Additionally or alternatively, embodiments of FIGS. 13A-13K are applied to device 1100*a* and camera 1102*a*. In some embodiments, the techniques of FIGS. 13A-13K are optionally applied to detect handwriting from image data captured by a camera other than camera 1102*a*. For example, in some embodiments, the techniques of FIGS. 13A-13K are optionally used to detect handwriting from image data capture by a camera associated with an external device that is in communication with device 1100*a* (e.g., a device that is in communication with device 1100*a* during a video communication session).

Figure 13A:
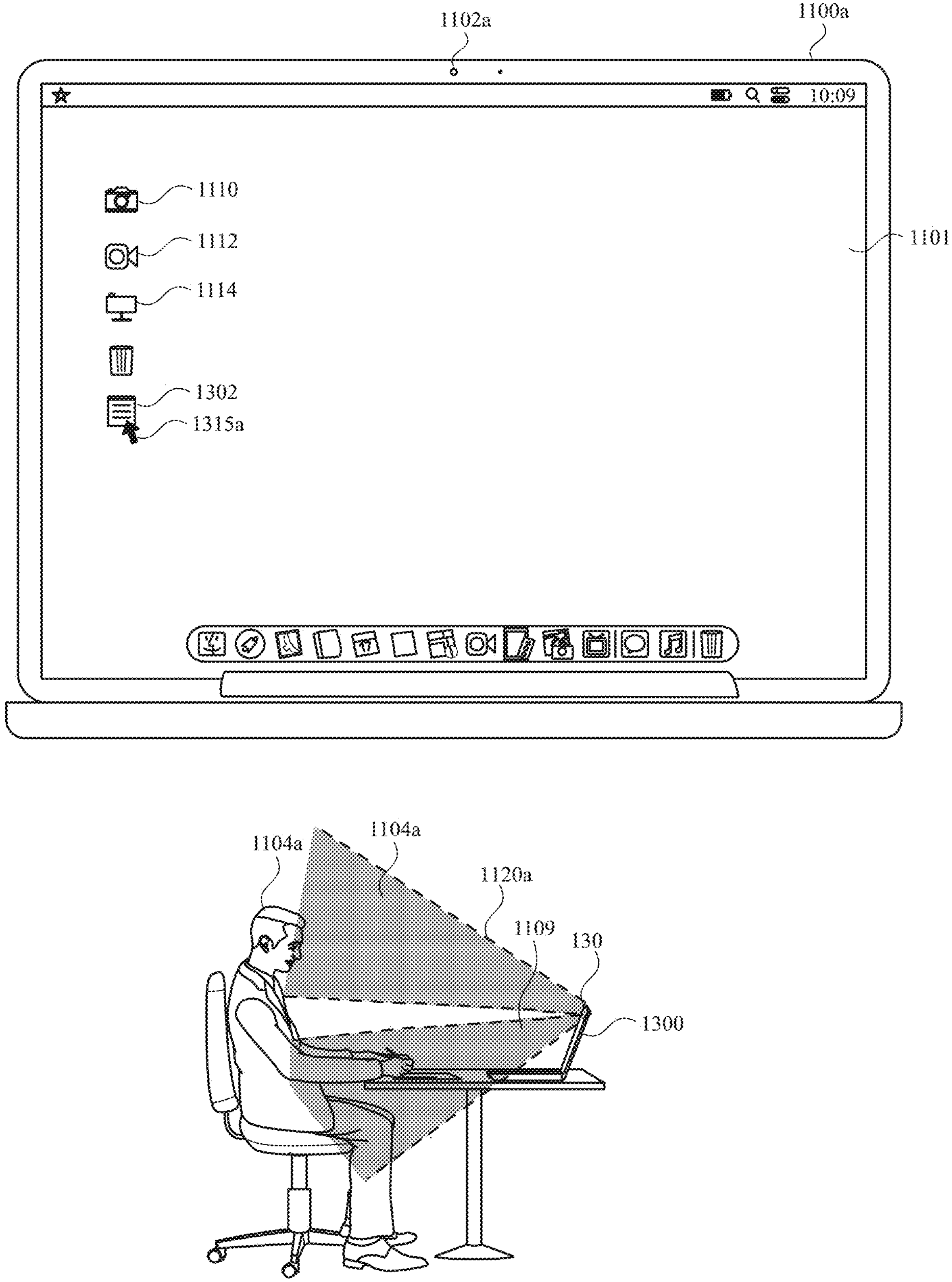
FIGS. 13A-13K illustrate exemplary user interfaces for managing digital content, in accordance with some embodiments.
Figure 13B:
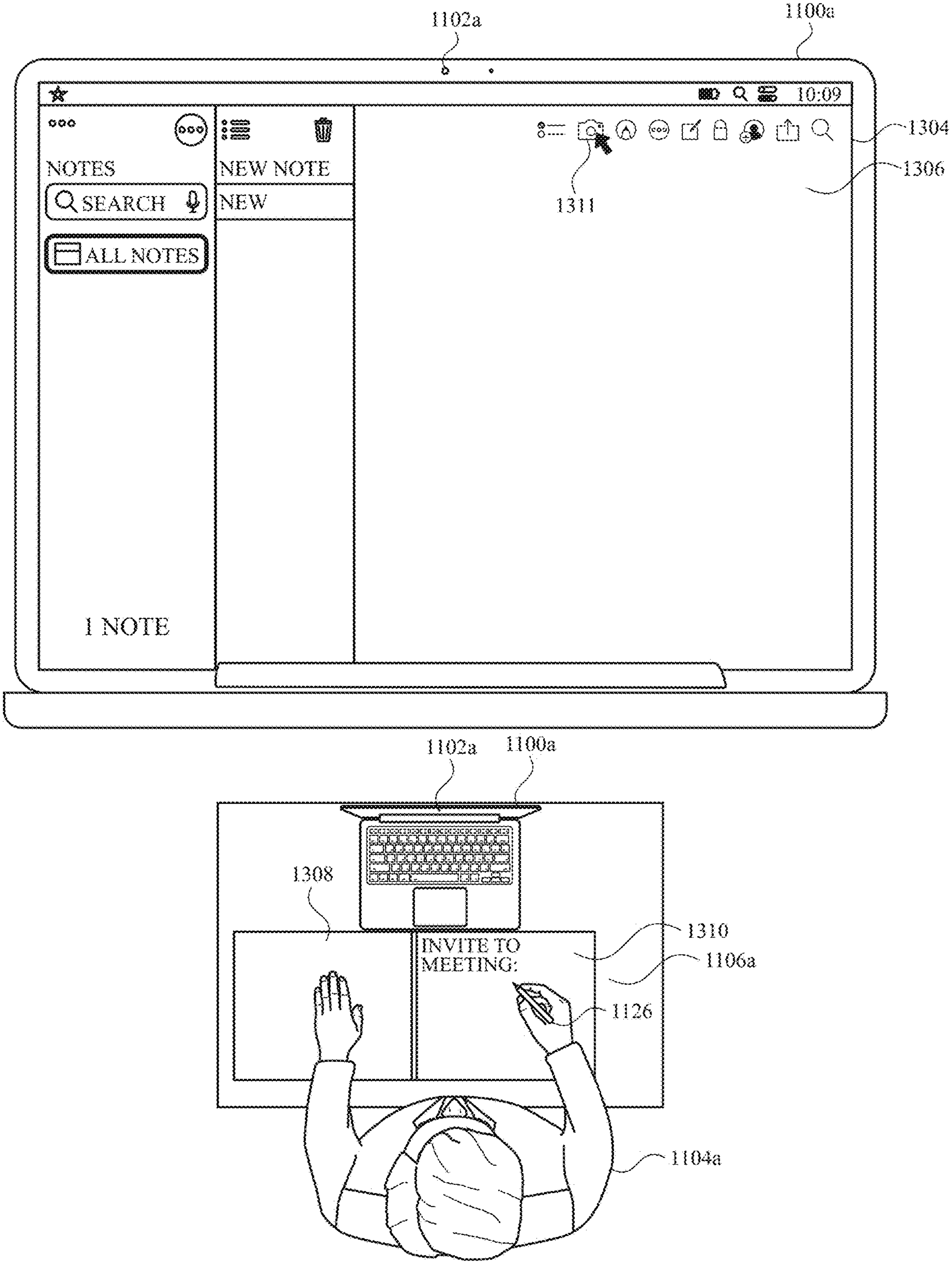

At FIG. 13A, device 1100*a* displays a note application icon 1302 associated with a note application. Device 1100*a* detects an input (e.g., mouse click 1315*a* and/or other selection input) directed at note application icon 1302. In response to detecting mouse click 1315*a*, device 1100*a* displays note application interface 1304, as depicted in FIG. 13B. In some embodiments, note application is optionally a different application (e.g., a word processor application).

At FIG. 13B, note application interface 1304 includes document 1306. As described herein, device 1100*a* adds text to document 1306 in response to detecting handwriting from image data captured by camera 1102*a*.

In some embodiments, device 1100*a* adds digital text to document 1306 in response to an input at device 1100*a* (e.g., at a button, keyboard, or touchscreen of device 1100*a*). In some embodiments, elements other than text are optionally added to document 1306. For example, in some embodiments, device 1100*a* adds images and/or content similar to images and/or slide content of FIGS. 13A-13P to document 1306.

FIG. 13B also depicts a schematic representation of a top view that includes a top view of surface 1106*a* and user 1104*a*. As depicted, desk surface 1106*a* includes notebook 1308 that user 1104 can draw or write on using writing utensil 1126. As depicted, notebook 1308 includes handwriting 1310 on notebook 1308.

At FIG. 13B, note application interface 1304 includes affordance 1311. Selection of affordance 1311 causes device 1100*a* to display graphical elements that allow a user to control adding digital text based on image data from handwriting 1310. While displaying note application interface 1304, device 1100*a* detects an input (e.g., mouse click 1315*b* and/or other selection input) directed at affordance 1311. In response to detecting mouse click 1315*b*, device 1100*a* displays note application interface 1304, as depicted in FIG. 13C.

Figure 13C:
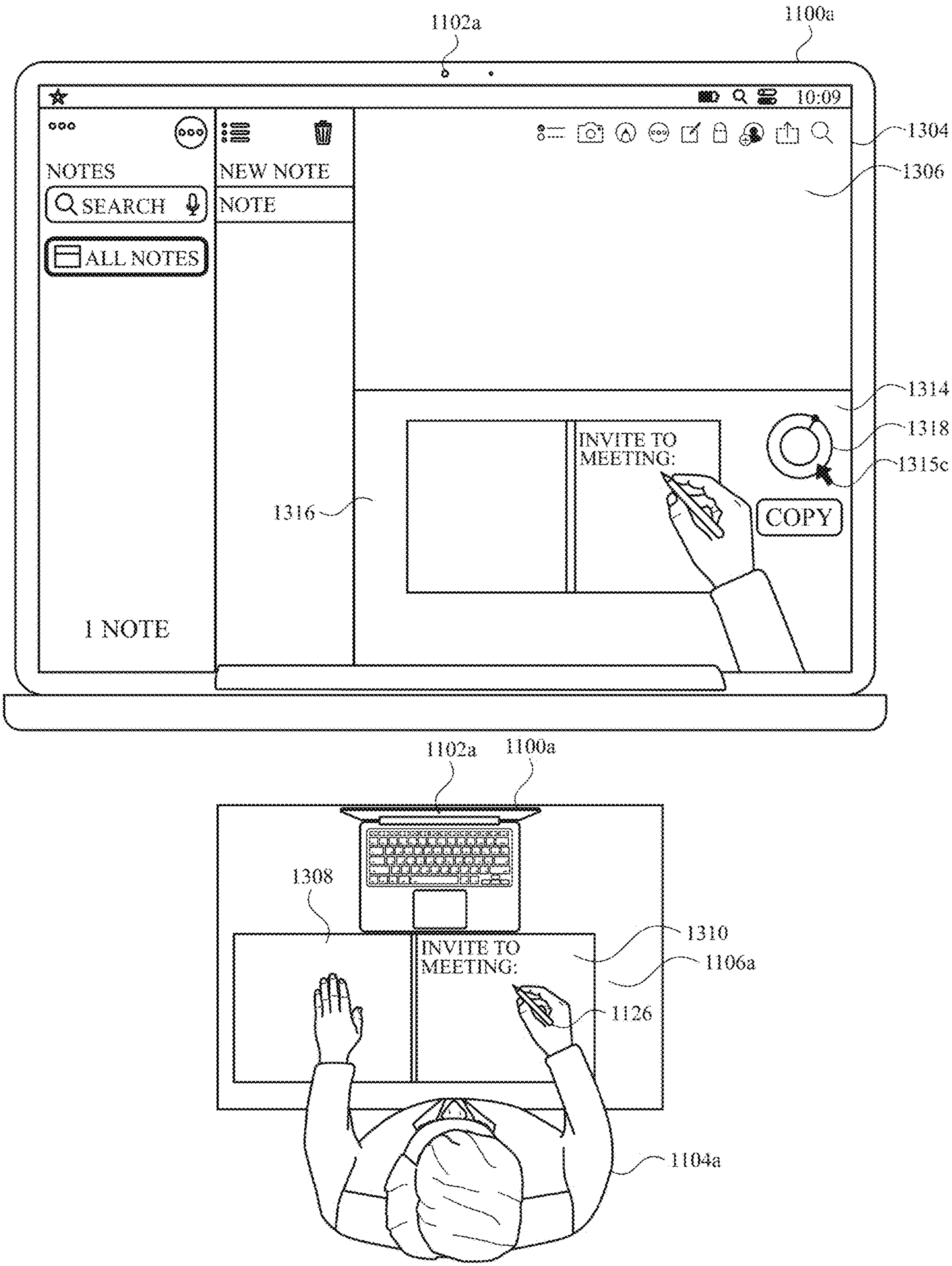

At FIG. 13C, device 1100*a* displays note application interface 1304 with handwriting representation 1316, which corresponds to shaded region 1109 of field of view 1120 of FIG. 13A. Handwriting representation 1316 includes an image of handwriting 1310 captured by camera 1102*a*. In some embodiments, device 1100*a* displays note application interface 1304 with an image captured by a camera other that camera 1102*a* (e.g., such as a camera of a device in communication with device 1100*a* during a video communications session).

At FIG. 13C, note application interface 1304 includes live detection affordance 1318. In some embodiments, when live detection affordance 1318 is enabled, device 1100*a* actively detects whether there is handwriting in handwriting representation 1316 and, if so, adds text to document 1306. As depicted, live detection affordance 1318 is disabled. Accordingly, device 1100*a* does not add text to document 1306 when handwriting 1310 is in view of camera 1102*a* and/or displayed in handwriting representation 1316. In some embodiments, note application interface 1304 includes live detection affordance 1318 and does not include handwriting representation 1316.

At FIG. 13C, while displaying note application interface 1304, device 1100*a* detects an input (e.g., mouse click 1315*c* and/or other selection input) directed at live detection affordance 1318. In response to detecting mouse click 1315*c*, device 1100*a* displays note application interface 1304, as depicted in FIG. 13D.

Figure 13D:
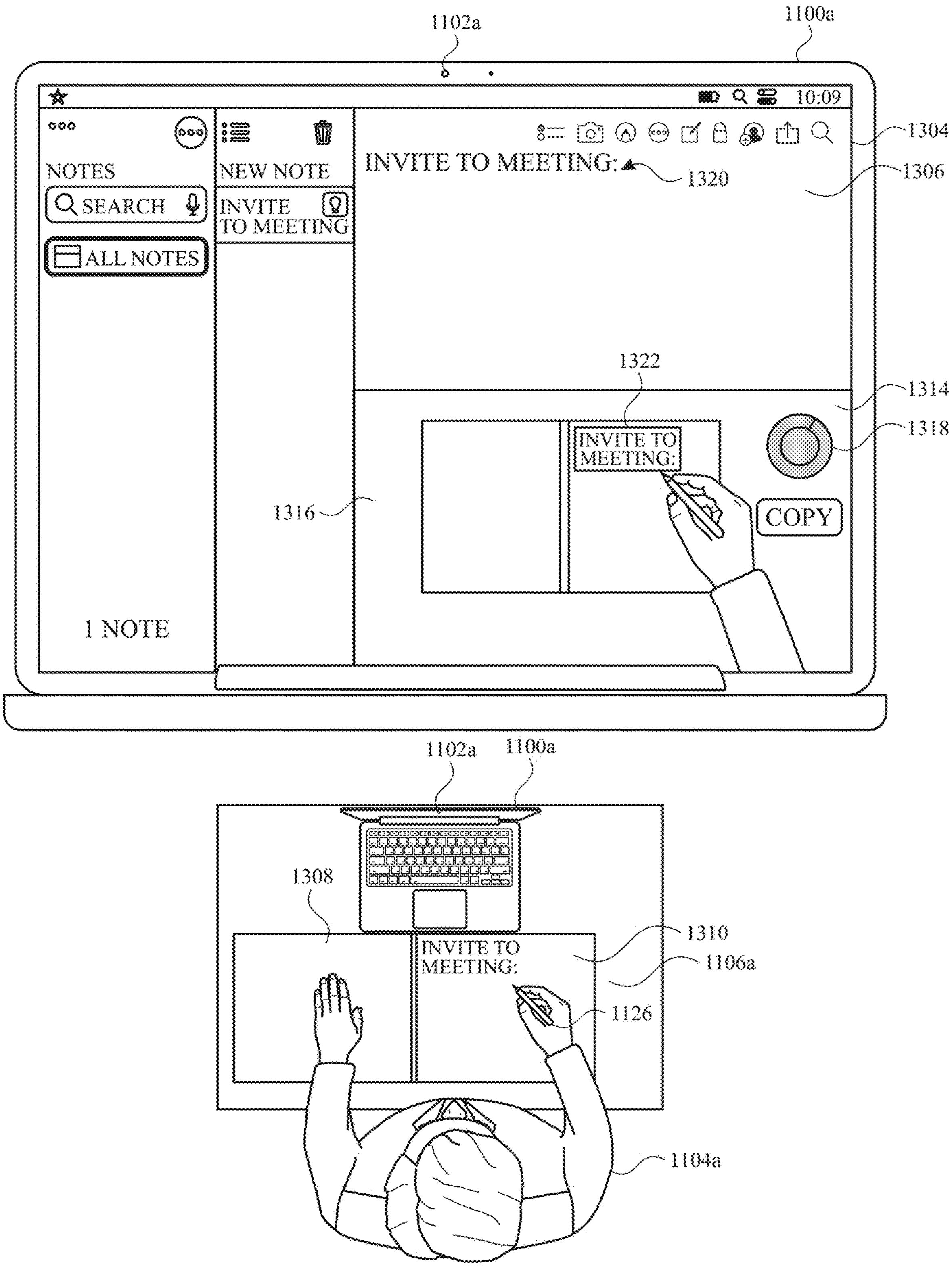

At FIG. 13D, live detection affordance 1318 is enabled. As depicted, device 1100*a* adds, to document 1306, digital text 1320 that corresponds to handwriting 1310. Device 1100*a* also displays added text indicator 1322 to handwriting representation 1316. In some embodiments, added text indicator 1322 indicates what text has been added to document 1306. As depicted, added text indicator 1322 is depicted as a square and/or outline surrounding digital text 1320. In some embodiments, device 1100*a* displays added text indicator 1322 overlaid on digital text 1320 (e.g., highlighting the text), next to digital text 1320, and/or at least partially surrounding digital text 1320.

Figure 13E:
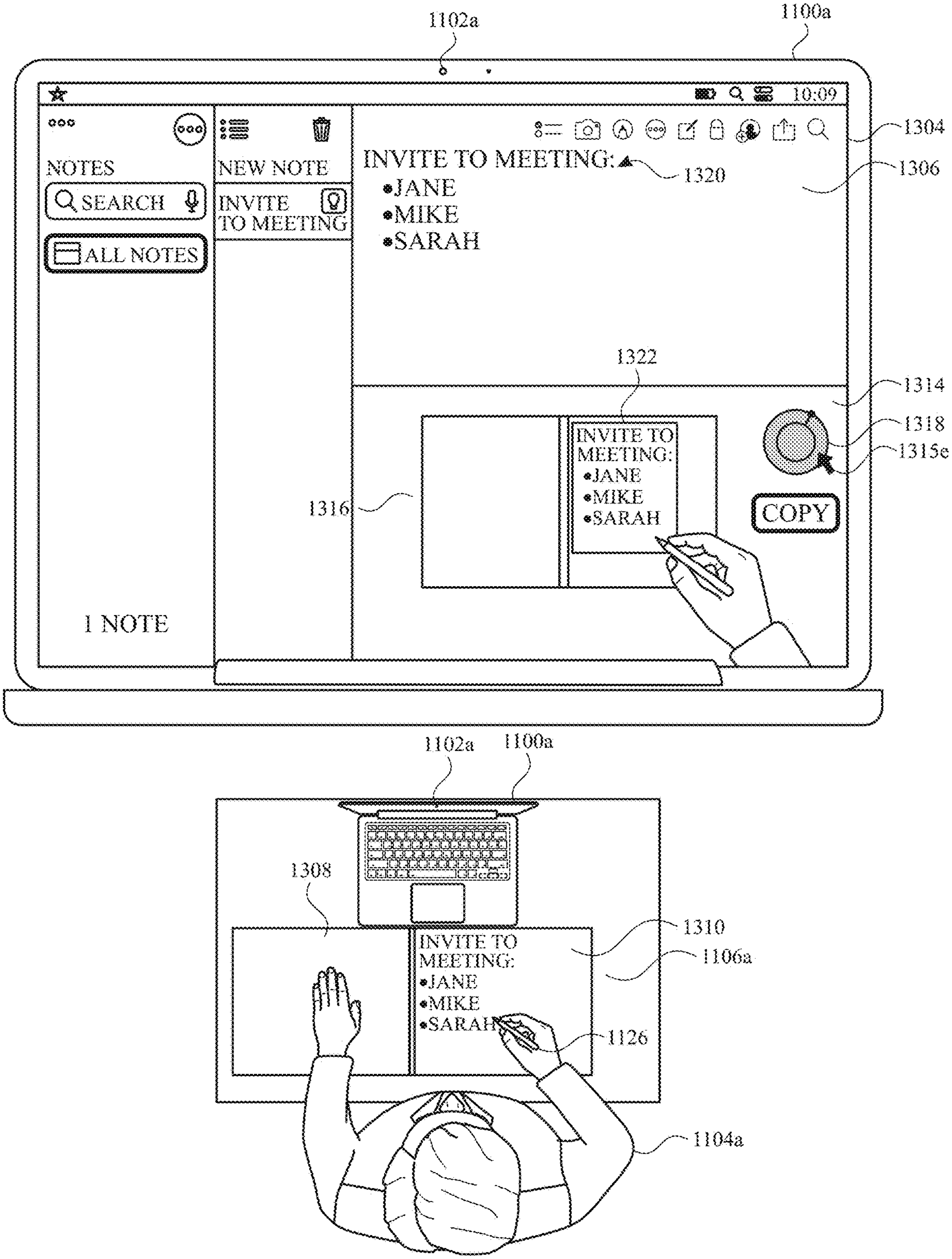

At FIGS. 13D-13E, device 1100*a* detects that new marks are added to handwriting 1310 as is the new marks are being written and adds, to document 1306, digital text 1320 corresponding to the new marks. Additionally, device 1100*a* displays added text indicator 1322 (e.g., around the image of handwriting 1310, including the new marks, in handwriting representation 1316). In some embodiments, digital text 1320 includes a format (e.g., bullet points and/or font format) and/or punctuation that is detected from image data of handwriting 1310.

At FIG. 13E, while displaying note application interface 1304, device 1100*a* detects an input (e.g., mouse click 1315*n* and/or other selection input) directed at live detection affordance 1318. In response to detecting mouse click 1315*e*, device 1100*a* displays note application interface 1304, as depicted in FIG. 13F.

Figure 13F:
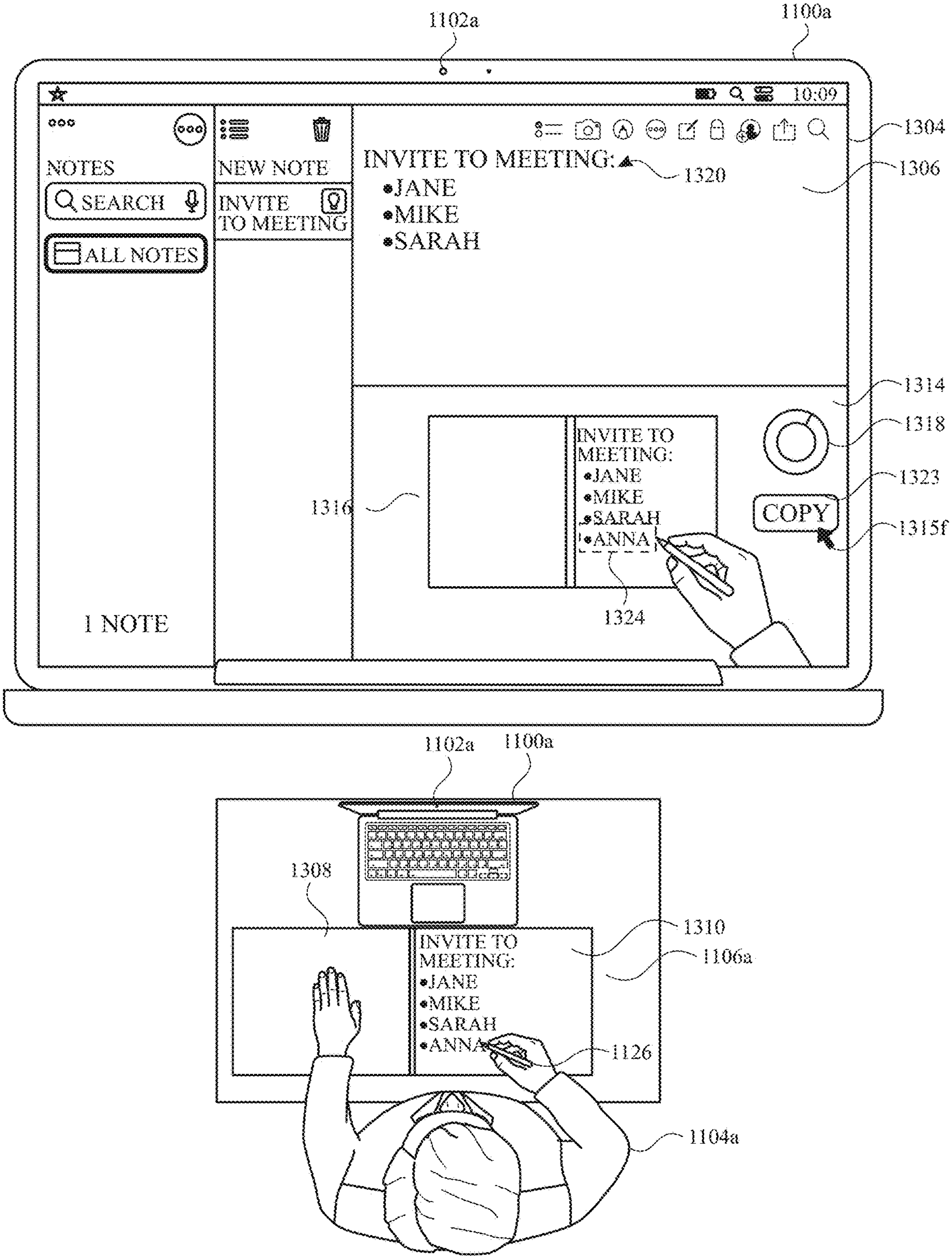

At FIG. 13F, device 1100*a* displays live detection affordance 1318 in a disabled state. As depicted, the word "Anna" is added to handwriting 1310, but device 1100*a* does not add digital text 1320 corresponding to "Anna." Device 1100*a* has also stopped displaying, in handwriting representation 1316, added text indicator 1322 based on live detection affordance 1318 being in a disabled state. In some embodiments, device 1100*a* continues to display added text indicator 1322 around images of handwriting 1310 while live detection affordance 1318 is in a disabled state.

At FIG. 13F, note application interface 1304 includes copy affordance 1323. In some embodiments, copy affordance 1323 allows a user to copy text from handwriting representation 1316. Device 1100*a* also displays selection indicator 1324 around an image of text "Anna" in handwriting representation 1316. Selection indicator 1324 indicates that content from the image of handwriting is selected to be copied. In some embodiments, device 1100*a* detects an input (e.g., a click and drag gesture and/or other selection/navigation input) to select specific content (e.g., Anna) in handwriting representation 1316. At FIG. 13F, while displaying note application interface 1304, device 1100*a* detects a request to copy content from handwriting representation 1316 (e.g., mouse click 1315*f* directed at copy affordance 1323 and selection of Anna and/or other selection input). In response to detecting the request to copy content from handwriting representation 1316, device 1100*a* displays note application interface 1304, as depicted in FIG. 13G.

Figure 13G:
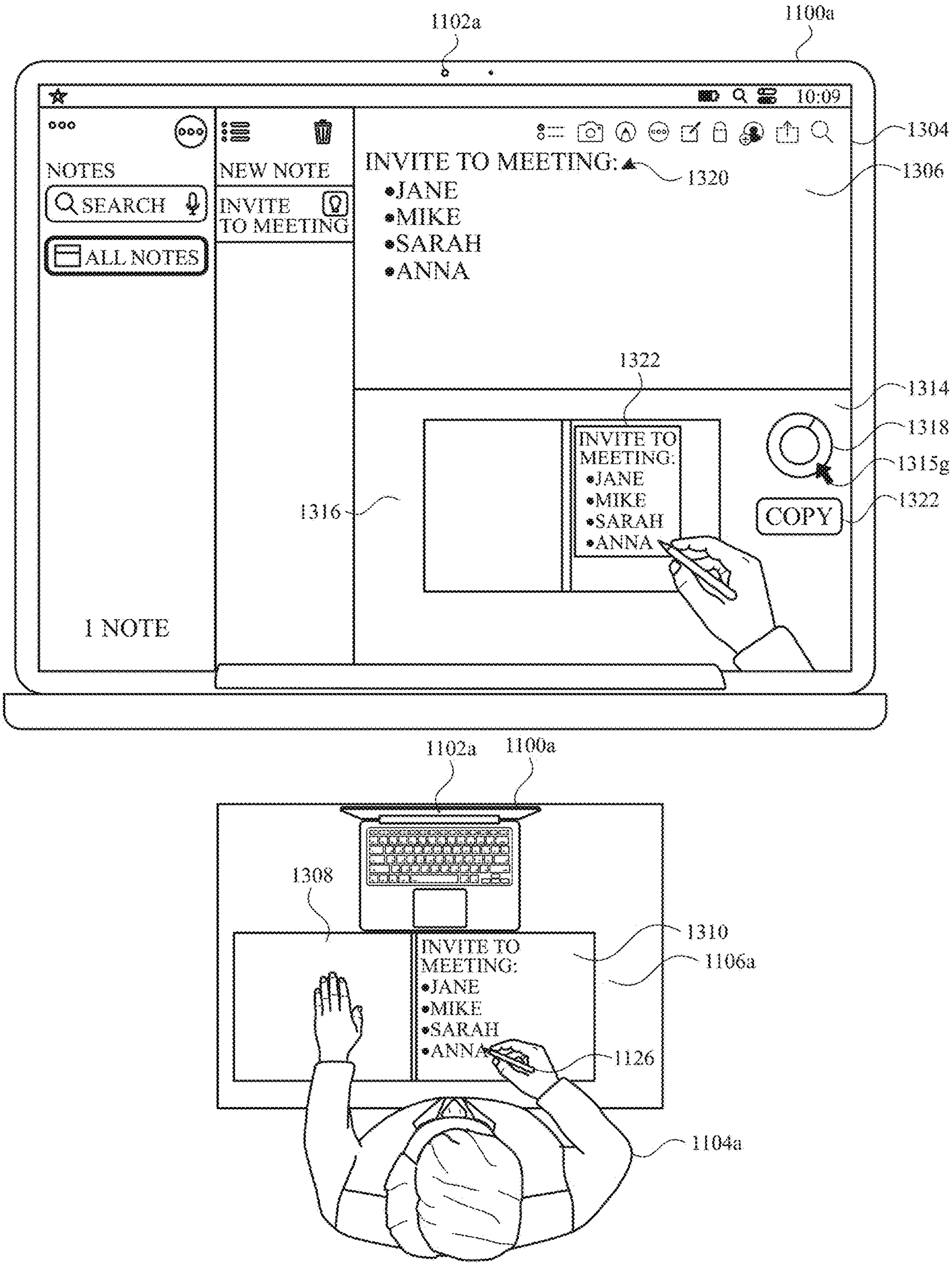

At FIG. 13G, device 1100*a* adds digital text corresponding to the writing "Anna" in document 1306. In some embodiments, device 1100*a* adds digital text corresponding to "Anna" into a document of an application other than the note application (e.g., based on copying "Anna" and detecting an input to paste the content in the document of the other application). While displaying note application interface 1304, device 1100*a* detects an input (e.g., mouse click 1315*g* and/or other selection input) directed at live detection affordance 1318. In response to detecting mouse click 1315*g*, device 1100*a* displays note application interface 1304, as depicted in FIG. 13H.

Figure 13H:
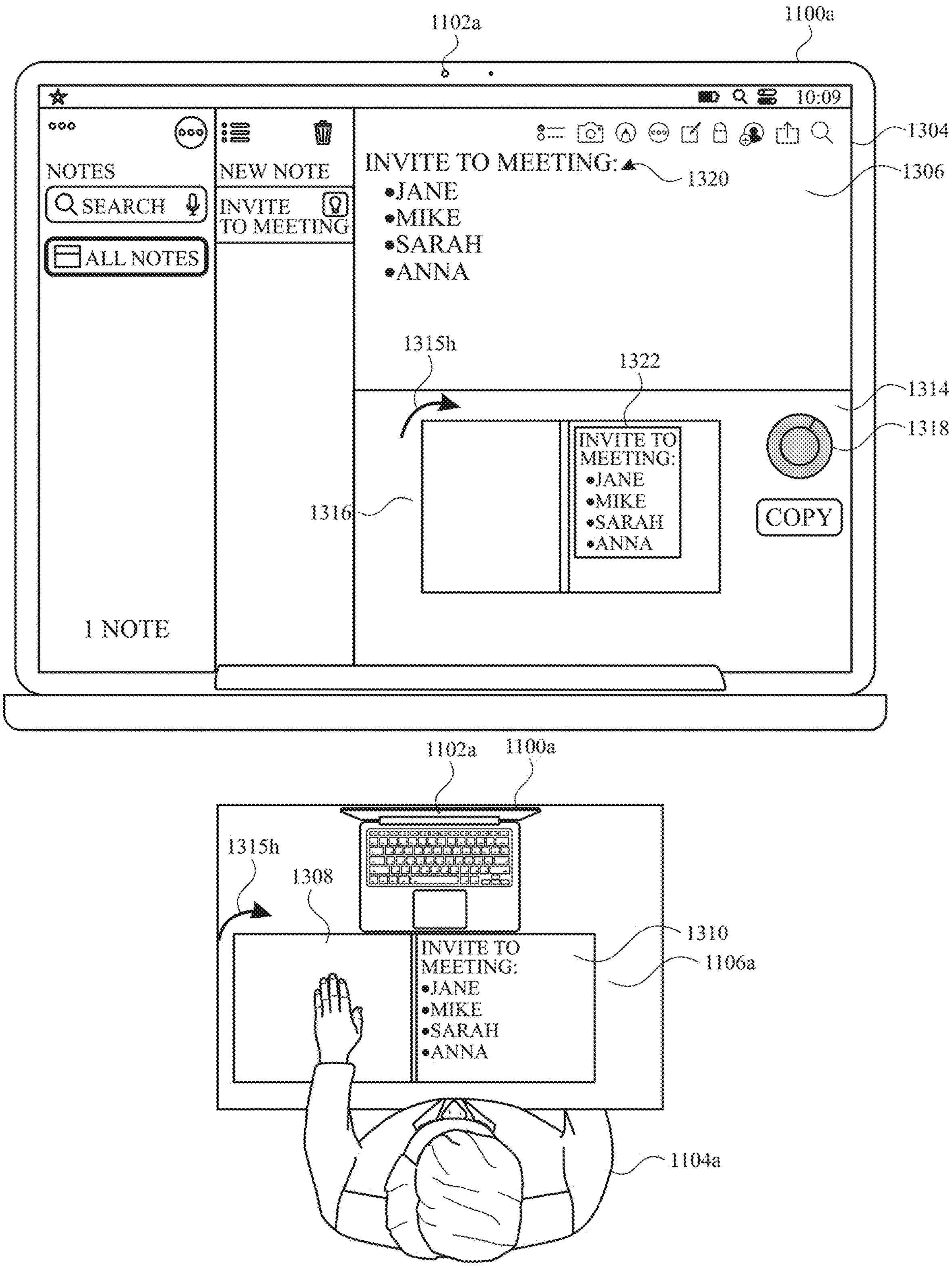

At FIG. 13H, device 1100*a* displays live detection affordance 1318 in an enabled state. As depicted, device 1100*a* displays text indicator 1322 around images of handwriting 1310 that has been pasted to document 1306, including the text "Anna." Notably, device 1100*a* does not add "Anna" as new digital text in document 1306 in FIG. 13H. At FIG. 13H, user 1104*a* turns a page of notebook 1308 to reveal a new page of notebook 1308, as schematically represented by page turn 1315*h*.

Figure 13I:
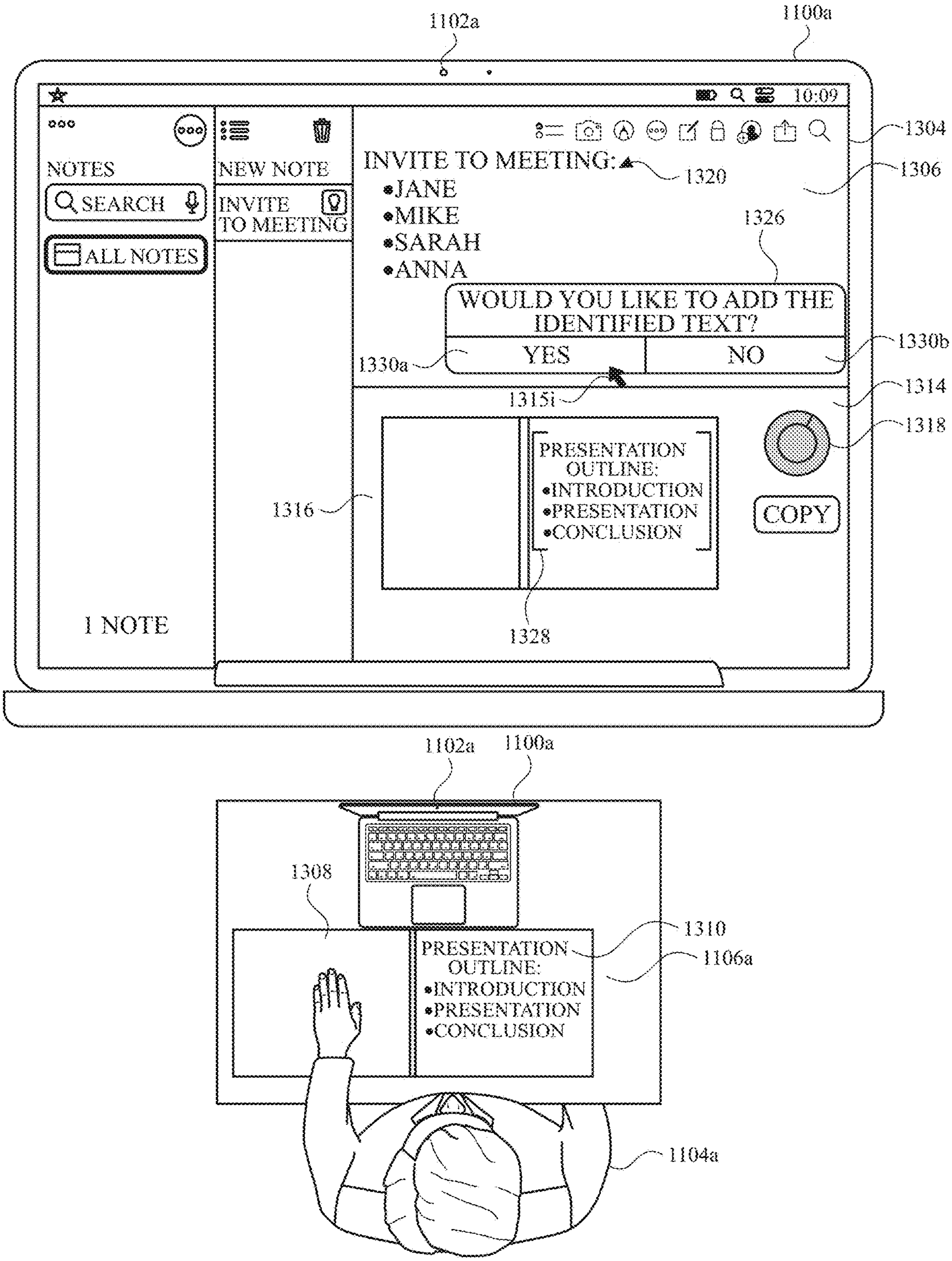

At FIG. 13I, device 1100*a* detects new handwriting on the new page of notebook 1308. As depicted, device 1100*a* displays detected text indicator 1328 (e.g., brackets) corresponding to images of handwriting 1310 that has been detected in handwriting representation 1316. In response to detecting handwriting 1310 of FIG. 13I, device 1100*a* displays add text notification 1326, including yes affordance 1330*a* and no affordance 1330*b*. add text notification 1326 allows a user to decide whether to add detected text to a document. In some embodiments, add text notification 1326 is displayed in response to satisfying a criteria, such as detecting that handwriting 1310 (or, more generally, text that can be added to document 1306) exceeds a threshold amount of text to be added (e.g., a threshold number of characters and/or words). In some embodiments, the threshold amount is based on a threshold amount of text to be added at a specific moment in time (e.g., as opposed to added gradually over a period of time). For instance, in some embodiments, based on the amount of text that is detected when the new page of notebook 1308 is revealed, device 1100*a* displays add text notification 1326. While displaying add text notification 1326, device 1100*a* detects an input (e.g., mouse click 1315*i* and/or other selection input) directed at yes affordance 1330*a*. In response to detecting mouse click 1315*i*, device 1100*a* displays note application interface 1304, as depicted in FIG. 13J.

Figure 13J:
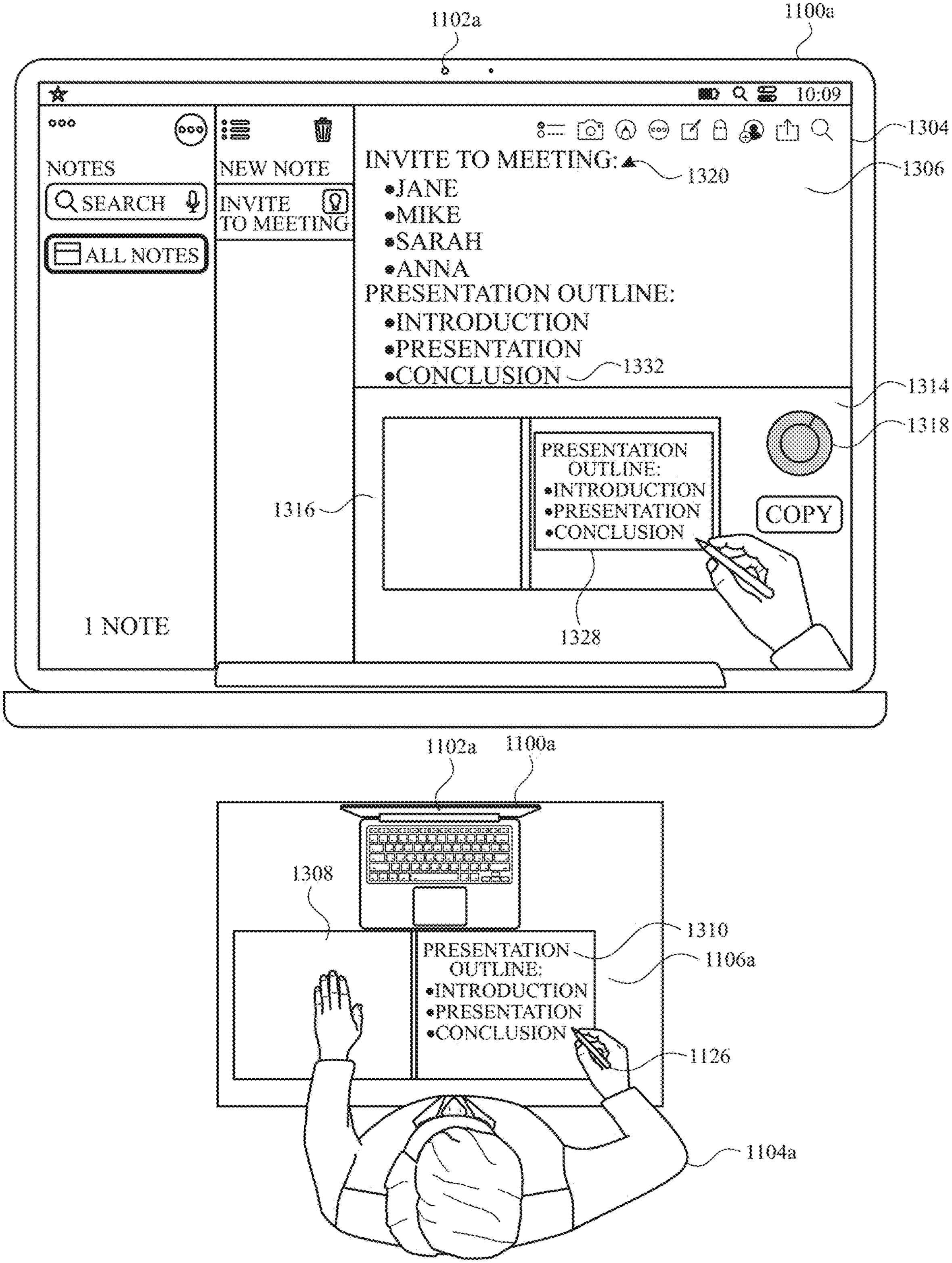

At FIG. 13J, device 1100*a* adds new text to document 1306. As depicted in FIG. 13J, new text corresponding to handwriting 1310 is added to digital text 1320. Additionally, device 1100*a* displays added text indicator 1322 (e.g., around the image of handwriting 1310) in handwriting representation 1316.

Figure 13K:
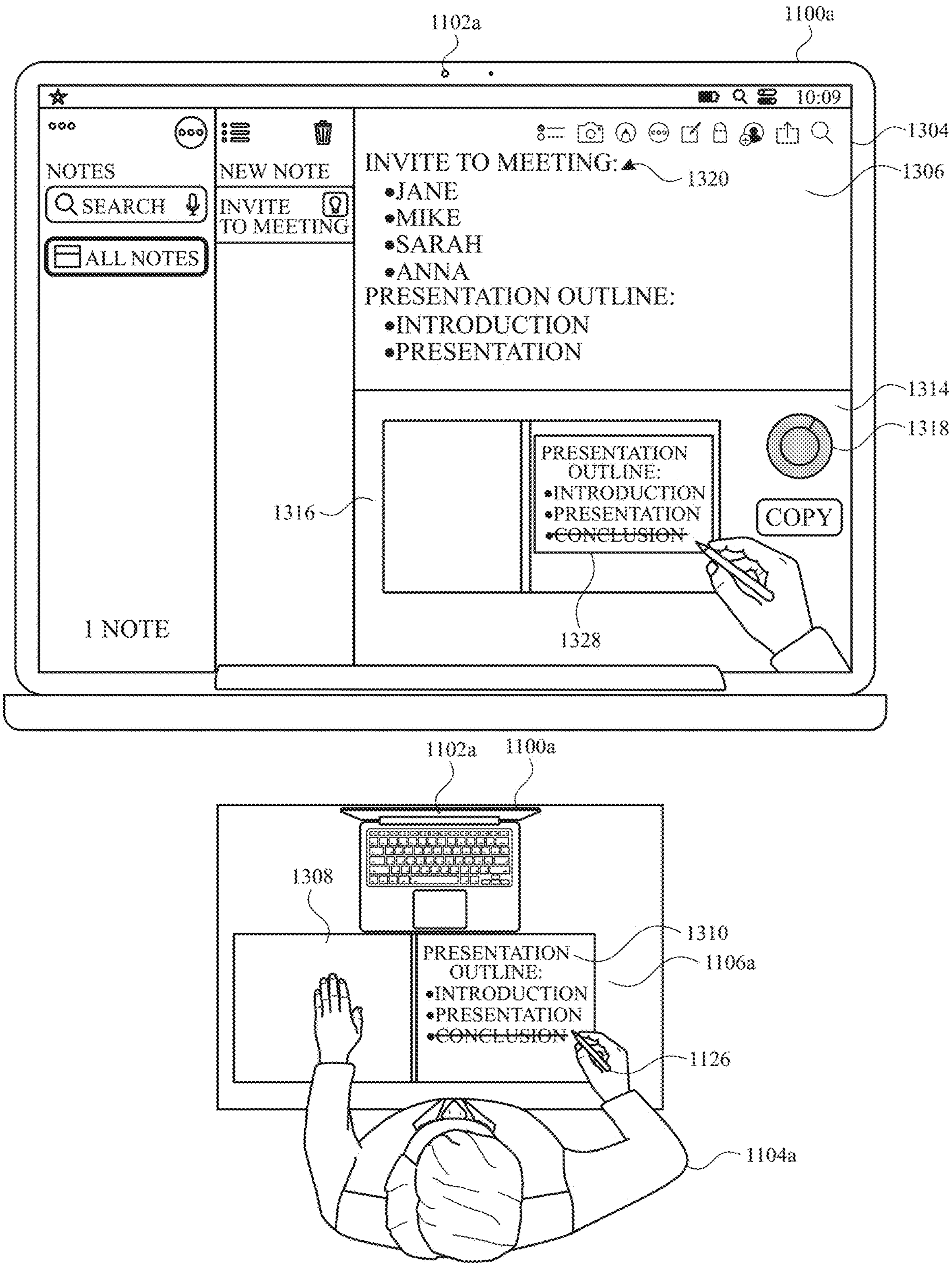

At FIGS. 13J-13K, device 1100*a* edits digital text 1320 in response to detecting new marks. At FIG. 13K, device 1100*a* detects (e.g., via image data) new mark 1334, which scratches out the word "conclusion" on notebook 1308. In response to detecting new mark 1334, device 1100*a* stops displaying text 1332 corresponding to the word "conclusion" in document 1306. Additionally, device 1100*a* displays added text indicator 1322 (e.g., around the image of the word conclusion) in handwriting representation 1316 despite the word "conclusion" being removed from document 1306. In some embodiments, device 1100*a* maintains display of added text indicator 1322 because device 1100*a* added text 1332 in FIG. 13J but subsequently removed text 1332. In some embodiments, device 1100*a* does not display added text indicator 1322 (e.g., around the image of the word "conclusion") in handwriting representation 1316 based the word "conclusion" on being removed from document.

FIG. 14 is a flow diagram illustrating a method for illustrating a method of managing digital content in accordance with some embodiments. Method 1400 is performed at a computer system (e.g., 100, 300, 500, 600-1, 600-2, 600-4, 906*a*, 906*b*, 906*c*, 906*d*, 1100*a*, 1100*b*, 1100*c*, and/or 1100*d*) (e.g., a smartphone, a tablet computer, a laptop computer, a desktop computer, and/or a head mounted device (e.g., a head mounted augmented reality and/or extended reality device)) that is in communication with a display generation component (e.g., 601, 683, 6201, and/or 1101) (e.g., a display controller, a touch-sensitive display system, a monitor, and/or a head mounted display system) and one or more cameras (e.g., 602, 6202, 1102*a*-1102*d*, and/or 682) (e.g., an infrared camera, a depth camera, and/or a visible light camera) (and, optionally, is in communication with one or more input devices (e.g., a touch-sensitive surface, a keyboard, a controller, and/or a mouse)). Some operations in method 1400 are, optionally, combined, the orders of some operations are, optionally, changed, and some operations are, optionally, omitted.

As described below, method 1400 provides an intuitive way for managing digital content. The method reduces the cognitive burden on a user for manage digital content, thereby creating a more efficient human-machine interface. For battery-operated computing devices, enabling a user to manage digital content faster and more efficiently conserves power and increases the time between battery charges.

In method 1400, the computer system displays (1402), via the display generation component, an electronic document (e.g., 1306 and/or 118) (e.g., a virtual document, an editable electronic document, a document generated by the computer system, and/or a document stored on the computer system). In some embodiments, the electronic document is displayed in a graphical user interface of an application (e.g., a word processor application and/or a note-taking application).

The computer system detects (1404), via the one or more cameras, handwriting (e.g., 1310) (e.g., physical marks such as pen marks, pencil marks, marker marks, and/or crayon marks, handwritten characters, handwritten numbers, handwritten bullet points, handwritten symbols, and/or handwritten punction) that includes physical marks on a physical surface (e.g., 1106*a* and/or 1308) (e.g., piece of paper, a notepad, a white board, and/or a chalk board) that is in a field of view (e.g., 1120*a*, 620, 6204, and/or 688) of the one or more cameras and is separate from the computer system. In some embodiments, the handwriting (and/or the physical surface) is within a field-of-view of the one or more cameras. In some embodiments, the physical surface is not an electronic surface such as a touch-sensitive surface. In some embodiments, the physical surface is in a designated position relative to a user (e.g., in front of the user, between the user and the one or more cameras, and/or in a horizontal plane). In some embodiments, the computer system does not add (e.g., foregoes adding) digital text for handwriting that is not on the physical surface. In some embodiments, the computer system only adds digital text for handwriting that is on the physical surface (e.g., the handwriting has to be in a designated area and/or physical surface).

In response to detecting the handwriting that includes physical marks on the physical surface that is in the field of view of the one or more cameras and is separate from the computer system, the computer system displays (1406) (e.g., automatically and/or manually (e.g., in response to user input)), in the electronic document (or, optionally, adds to the electronic document), digital text (e.g., 1320) (e.g., letters, numbers, bullet points, symbols, and/or punction) corresponding to the handwriting that is in the field of view of the one or more cameras (e.g., the detected handwriting). In some embodiments, the digital text is generated by the computer system (and/or is not a captured image of the handwriting). In some embodiments, the handwriting has a first appearance (e.g., font style, color, and/or font size) and the digital text has a second appearance (e.g., font style, color, and/or font size) different from the first appearance. In some embodiments, the physical surface is positioned between the user and the one or more cameras. Displaying digital text corresponding to the handwriting that is in the field of view of one or more cameras enhances the computer system because it allows a user to add digital text without typing, which reduces the number of inputs needed to perform an operation and provides additional control options without cluttering the user interface and improves how a user can add digital text to an electronic document.

In some embodiments, while (or after) displaying the digital text, the computer system obtains (e.g., receives or detects) data representing new handwriting that includes a first new physical mark (e.g., 1310 as depicted in FIG. 13E) on the physical surface that is in the field of view of the one or more cameras. In some embodiments, in response to obtaining data representing the new handwriting, the computer system displays new digital (e.g., 1320 in FIG. 13E) text corresponding to the new handwriting. In some embodiments, in response to obtaining data representing the new handwriting, the computer system maintains display of the (original) digital text. In some embodiments, in response to obtaining data representing the new handwriting, the computer system concurrently displays the (original) digital text and the new digital text. Displaying new digital text as new handwriting is detected enhances the computer system because digital text can be added automatically and as it is detected, which performs an operation when a set of conditions has been met without requiring further user input and provides visual feedback that new physical marks have been detected and improves how digital text is added to an electronic document.

In some embodiments, obtaining data representing the new handwriting includes the computer system detecting (e.g., capturing an image and/or video of) the new physical marks while the new physical marks are being applied to the physical surface (e.g., "Jane," "Mike," and "Sarah" of 1320 are added to document 1306 while the names are being written on notebook 1308, as described in reference to FIGS. 13D-13E) (e.g., as the user is writing). In some embodiments, the new physical marks are detected in real time, in a live manner, and/or based on a live feed from the one or more cameras (e.g., 1318 is enabled). In some embodiments, the computer system displays a first portion of the new digital text in response to detecting a first portion of the new physical marks are being applied to the physical surface (e.g., at FIGS. 13D-13E, "Jane" of 1320 is added to document 1306 while "Jane" is written on notebook 1308). In some embodiments, the computer system displays a second portion of the new digital text in response to detecting a second portion of the new physical marks that are being applied to the physical surface (e.g., at FIGS. 13D-13E, "Mike" of 1320 is added to document 1306 while "Mike" is written on notebook 1308). In some embodiments, the computer system displays the new digital text letter by letter (e.g., as the letter has been written). In some embodiments, the computer system displays the new digital text word by word (e.g., after the word has been written). In some embodiments, the computer system displays the new digital text line by line (e.g., referring to FIG. 13E, "invite to" of 1320 is added after the line has been written on notebook 1308) (e.g., after the line has been written). Displaying new digital text while the new physical marks are being applied to the physical surface enhances the computer system because digital text is added in a live manner while the user is writing, which performs an operation when a set of conditions has been met without requiring further user input, provides visual feedback that new physical marks have been detected, and improves how digital text is added to an electronic document.

In some embodiments, obtaining data representing the new handwriting includes detecting the new physical marks when the physical surface including the new physical marks is brought into the field of view of the one or more cameras (e.g., page turn 1315*h* brings a new page having new handwriting 1310 into the field of view of camera 1102*a*, as depicted in FIGS. 13H-13I) (e.g., the surface is brought into the field of view when a user brings a surface with existing handwriting into the camera's field of view and/or a user turns a page of a document). In some embodiments, the new physical marks are detected in real time, in a live manner, and/or based on a live feed from the one or more cameras. Displaying new digital text when the physical surface is brought into the field of view of a camera improves the computer system because large portions of digital text can be added without further input from the user, which performs an operation when a set of conditions has been met without requiring further user input and provides visual feedback that new physical marks have been detected and improves how digital text is added to an electronic document.

In some embodiments, while (or after) displaying the digital text, the computer system obtains (e.g., receiving or detecting) data representing new handwriting that includes a second new physical mark (e.g., 1334) (e.g., the same or different from the first new physical mark) (e.g., a change to a portion of the handwriting that includes the physical marks; in some embodiments, the change to the portion of the handwriting includes a change to a first portion of the handwriting without a change a second portion of the handwriting) (e.g., the second new physical mark includes adding a letter in an existing word, adding punctuation to an existing sentence, and/or crossing out an existing word) on the physical surface that is in the field of view of the one or more cameras. In some embodiments, in response to obtaining data representing the new handwriting, the computer system displays updated digital text (e.g., 1320 in FIG. 13K) (e.g., a modified version of the existing digital text) corresponding to the new handwriting. In some embodiments, in response to obtaining data representing the new handwriting, the computer system modifies the digital text based on the second new physical mark. In some embodiments, the updated digital text includes a change in format of the digital text (e.g., the original digital text) (e.g., a change in indentation and/or a change in font format, such as bold, underline, and/or italicize). In some embodiments, the updated digital text does not include a portion of the digital text (e.g., the original digital text) (e.g., based on deleting a portion of the digital text). In some embodiments, in response to obtaining data representing the new handwriting, the computer system maintains display of the digital text (e.g., the original digital text). In some embodiments, in response to obtaining data representing the new handwriting, the computer system concurrently displays the digital text (e.g., the original digital text) and the new digital text. Updating the digital text as new handwriting is detected improves the computer system because existing digital text can be modified automatically in response to detecting new marks, which performs an operation when a set of conditions has been met without requiring further user input, provides visual feedback that new physical marks have been detected, and improves how digital text is added to an electronic document.

In some embodiments, displaying the updated digital text includes modifying the digital text corresponding to the handwriting (e.g., with reference to FIG. 13K, device 600 optionally updates a format of "conclusion" in 1320, such as adding an underline, in response to detecting a user drawing a line under the word "conclusion" in 1310, and/or device 600 stops displaying the word "conclusion" in response to detecting a user drawing a line through the word "conclusion" in 1310 as depicted in FIG. 13K). In some embodiments, the computer system adds digital text (e.g., letter, punctuation mark, and/or symbol) between a first portion of digital text and a second portion of digital text (e.g., with reference to FIG. 13K, device 600 optionally adds a comma between "presentation" and "outline" in 1320 in response to detecting a user adding a comma between "presentation" and "outline" in 1320) (e.g., as opposed to at the end of the digital text). In some embodiments, the computer system modifies a format (e.g., font, underline, bold, indentation, and/or font color) of the digital text. In some embodiments, a location of a digital mark added to the digital text (e.g., a location relative to the other digital marks and/or a location relative to the order of the digital marks) corresponds to a location of a mark (e.g., letter, punctuation mark, and/or symbol) added to the handwriting (e.g., with reference to FIG. 13K, device 600 optionally adds a letter and/or word between "presentation" and "outline" in 1320 in response to detecting a user adding a letter and/or word between "presentation" and "outline" in 1320) (e.g., a location relative to the other physical marks on the physical surface and/or a location relative to the order of the physical marks on the physical surface). Modifying the digital text as new handwriting is detected improves the computer system because existing digital text can be modified automatically and as new handwriting is detected, which performs an operation when a set of conditions has been met without requiring further user input, provides visual feedback that new physical marks have been detected, and improves how digital text is added to an electronic document.

In some embodiments, displaying the updated digital text includes ceasing to display a portion (e.g., a letter, punctuation mark, and/or symbol) of the digital text (e.g., "conclusion" is no longer displayed in 1320, as depicted in FIG. 13K). In some embodiments, displaying the updated digital text includes ceasing to display a first portion of the digital text while maintaining display of a second portion of the digital text. In some embodiments, a location of a digital mark deleted in the digital text (e.g., a location relative to the other digital marks and/or a location relative to the order of the digital marks) corresponds to a location of a deletion mark (e.g., crossing out a portion of the handwriting and/or writing "X" over a portion of the handwriting) added to the handwriting (e.g., a location relative to the other physical marks on the physical surface and/or a location relative to the order of the physical marks on the physical surface). Ceasing to display a portion of the digital text as new handwriting is detected improves the computer system because existing digital text can be deleted automatically and as new handwriting is detected, which performs an operation when a set of conditions has been met without requiring further user input, provides visual feedback that new physical marks have been detected, and improves how digital text is added to an electronic document.

In some embodiments, displaying the updated digital text includes: in accordance with a determination that the second new physical mark meets first criteria (e.g., 1310 in FIGS. 13C-13J) (e.g., the physical mark includes one or more new written characters, for example one or more letters, numbers, and/or words), the computer system displays new digital text (e.g., 1320 in FIGS. 13C-13J) corresponding to the one or more new written characters (e.g., letters, numbers, and/or punctuation). In some embodiments, displaying the updated digital text includes: in accordance with a determination that the second new physical mark meets second criteria (e.g., 1334 as described in reference to FIG. 13K) (e.g., different from the first criteria) (e.g., the physical mark has a shape and/or location that indicates that it is an editing mark rather than a mark that includes new written characters for example, the second new physical mark includes a strikethrough or a mark over an existing written character), the computer system ceases display of a portion of the digital text corresponding to one or more previously written characters (e.g., "conclusion" in 1320 is no longer displayed in FIG. 13K). In some embodiments, the second new physical mark is detected and, in response, the computer system either deletes digital text or adds digital text corresponding to the second new mark based on analysis of the new physical mark, such as, e.g., whether the mark is a new written character or whether the mark crosses out a previously written characters. Conditionally displaying new digital text corresponding to the one or more written characters or ceasing display of the portion of the digital text corresponding to the one or more written characters based on meeting respective criteria improves the computer system because digital text is either added or deleted automatically and as new marks are detected, which performs an operation when a set of conditions has been met without requiring further user input, provides visual feedback that new physical marks have been detected, and improves how digital text is added to or removed from an electronic document.

In some embodiments, while displaying a representation (e.g., 1316) (e.g., still image, video, and/or live video feed) of respective handwriting that includes respective physical marks on the physical surface, the computer system detects an input corresponding to a request to display digital text corresponding to the respective physical marks (e.g., 1315*c*, 1315*f*, and/or 1315*g*) (e.g., physical marks that have been detected, identified, and/or recognized as including text) in the electronic document. In some embodiments, the request includes a request to add (e.g., copy and paste) a detected portion of the respective handwriting to the electronic document. In some embodiments, in response to detecting the input corresponding to a request to display digital text corresponding to the respective physical marks, the computer system displays, in the electronic document, digital text (e.g., 1320) corresponding to the respective physical marks (e.g., as depicted in FIG. 13D-13F) (e.g., adding text corresponding to the detected portion of the respective handwriting to the electronic document). Displaying, in the electronic document, digital text corresponding to the respective physical marks in response to detecting an input improves the computer system because displayed handwritten marks can be copied and pasted into the electronic document and/or to other electronic documents, which performs an operation when a set of conditions has been met without requiring further user input and improves how digital text is added to an electronic document.

In some embodiments, the computer system detects a user input (e.g., 1315*c* or 1315*g*) directed to a selectable user interface object (e.g., 1318). In some embodiments, in response to detecting the user input directed to a selectable user interface object and in accordance with a determination that the second new physical mark meets first criteria (e.g., as depicted in FIGS. 13D-13E) (e.g., the physical mark includes one or more new written characters, for example one or more letter, number, and/or words), displaying new digital text (e.g., 1320 in FIGS. 13D-13E) corresponding to the one or more new written characters (e.g., letters, numbers, and/or punctuation). In some embodiments, in response to detecting the user input directed to a selectable user interface object and in accordance with a determination that the second new physical mark meets second criteria (e.g., as depicted in FIG. 13K) (e.g., the physical mark has a shape and/or location that indicates that the physical mark is an editing mark rather than a mark that includes new written characters for example, the second new physical mark includes a strikethrough or a mark over an existing written characters), the computer system ceases display of a portion of the digital text corresponding to one or more previously written characters (e.g., "conclusion" is not displayed in 1320). In some embodiments, the second new physical mark is detected and, in response, the computer system either deletes digital text or adds digital text corresponding to the second new mark based on analysis of the new physical mark, such as, e.g., whether the mark is a new written character or whether the mark crosses out a previously written characters. Conditionally displaying digital text based on the mode of the computer system improves the computer system because it provides an option to the user to enable or disable automatic display of digital text when handwriting is detected, which performs an operation when a set of conditions has been met without requiring further user input and improves how digital text is added to an electronic document.

In some embodiments, the computer system displays, via the display generation component, a representation (e.g., 1316) (e.g., still image, video, and/or live video feed) of the handwriting that includes the physical marks. In some embodiments, the representation of the handwriting that includes physical marks is concurrently displayed with the digital text (e.g., as depicted in FIGS. 13D-13F). Displaying a representation of the physical handwriting improves the computer system because it provides the user feedback of whether the handwriting that is in the field of view of the camera so as to be detected by the computer system and added to the electronic document, which provides improved visual feedback and improves how digital text is added to an electronic document.

In some embodiments, the computer system displays, via the display generation component, a graphical element (e.g., 1322) (e.g., a highlight, a shape, and/or a symbol) overlaid on a respective representation of a physical mark that corresponds to respective digital text of the electronic document. In some embodiments, the computer system visually distinguishes (e.g., highlights and/or outlines) portions of handwriting (e.g., detected text) from other portions of the handwriting and/or the physical surface. In some embodiments, the graphical element is not overlaid on a respective representation of a physical mark that does not correspond to respective digital text of the electronic document. In some embodiments, in accordance with a determination that the computer system is in a first mode (e.g., a live text capture mode is enabled and/or a live text detection mode is enabled), the computer system displays the graphical element. In some embodiments, in accordance with a determination that the computer system is in a second mode (e.g., a live text capture mode is disabled and/or a live text detection mode is disabled), the computer system does not display the graphical element. Displaying a graphical element overlaid on a representation of a physical mark when it has been added as digital text improves the computer system because it provides visual feedback of what portions of the physical handwriting have been added as digital text, which provides improved visual feedback and improves how digital text is added to an electronic document.

In some embodiments, detecting the handwriting is based on image data captured by a first camera (e.g., 602, 682, 6102, and/or 906*a*-906*d*) (e.g., a wide angle camera and/or a single camera) having a field of view (e.g., 620, 688, 1120*a*, 6145-1, and 6147-2) that includes a face of a user (e.g., face of 1104*a*, face of 622, and/or face of 623) and the physical surface (e.g., 619, 1106*a*, 1130, and/or 618). In some embodiments, the computer system displays a representation of the handwriting (e.g., 1316) based on the image data captured by the first camera. In some embodiments, the computer system displays a representation of the face of the user (e.g., a user of the computer system) based on the image data captured by the first camera (e.g., the representation of the physical mark and the representation of the user are based on image data captured by the same camera (e.g., a single camera)). In some embodiments, the computer system concurrently displays the representation of the handwriting and representation of the face of the user. Displaying the representation of the handwriting and the representation of the face of the user based on the image data captured by the first camera improves the computer system because a user can view different angles of a physical environment using the same camera, viewing different angles does not require further action from the user (e.g., moving the camera), doing so reduces the number devices needed to perform an operation, the computer system does not need to have two separate cameras to capture different views, and the computer system does not need a camera with moving parts to change angles, which reduces cost, complexity, and wear and tear on the device.

Note that details of the processes described above with respect to method 1400 (e.g., FIG. 14) are also applicable in an analogous manner to the methods described below/above. For example, methods 700, 800, 1000, 1200, 1500, 1700, an 1900 optionally include one or more of the characteristics of the various methods described above with reference to method 1400. For example, methods 700, 800, 1000, 1200, 1500, 1700, an 1900 can include techniques of displaying digital text in response to detecting physical marks and/or updating displayed digital text in response to detecting new physical marks (e.g., either captured by a camera at a local device associated with one user or a camera of a remote device associated with a different user) to improve a live communication session and improve how users collaborate and/or share content. As a further example, methods 700, 800, and 1500 of modifying a view can be used to bring physical marks into view. For brevity, these details are not repeated herein.

FIG. 15 is a flow diagram illustrating a method for managing a live video communication session in accordance with some embodiments. Method 1500 is performed at a first computer system (e.g., 100, 300, 500, 600-1, 600-2, 600-3, 600-4, 906*a*, 906*b*, 906*c*, 906*d*, 6100-1, 6100-2, 1100*a*, 1100*b*, 1100*c*, and/or 1100*d*) (e.g., a smartphone, a tablet computer, a laptop computer, a desktop computer, and/or a head mounted device (e.g., a head mounted augmented reality and/or extended reality device)) that is in communication with a first display generation component (e.g., 601, 683, and/or 6201) (e.g., a display controller, a touch-sensitive display system, a monitor, and/or a head mounted display system) and one or more sensors (e.g., one or more sensors of 100, 300, 500, 600-1, and/or 600-2) (e.g., gyroscope, accelerometer, and/or motion sensor). Some operations in method 1500 are, optionally, combined, the orders of some operations are, optionally, changed, and some operations are, optionally, omitted.

As described below, method 1500 provides an intuitive way for managing a live video communication session. The method reduces the cognitive burden on a user for manage a live communication session, thereby creating a more efficient human-machine interface. For battery-operated computing devices, enabling a user to manage a live communication session faster and more efficiently conserves power and increases the time between battery charges.

In method 1500, while (1502) the first computer system is in a live video communication session (e.g., live video communication session of FIGS. 6A-6AY) with a second computer system (e.g., 100, 300, 500, 600-1, and/or 600-2) (e.g., a remote computer system, an external computer system, a computer system associated with a user different from a user associated with the first computer system, a smartphone, a tablet computer, a laptop computer, desktop computer, and/or a head mounted device), the first computer system displays (1504), via the first display generation component, a representation (e.g., 622-1, 622-4, and/or 623-4) (e.g., a static image and/or series of images such as, for example, a video) of a first view (e.g., a view of the face of user 622, a view of the face of user 623, surface 619, and/or a surface of desk 686) (or a first portion) of a physical environment (e.g., 615 and/or 685) that is in a field of view (e.g., 620 and/or 6204) of one or more cameras (e.g., 602 and/or 6202) of the second computer system. In some embodiments, the representation of the first view includes a live (e.g., real-time) video feed of the field-of-view (or a portion thereof) of the one or more cameras of the second computer system. In some embodiments, the field-of-view is based on physical characteristics (e.g., orientation, lens, focal length of the lens, and/or sensor size) of the one or more cameras of the second computer system. In some embodiments, the representation is provided by an application providing the live video communication session (e.g., a live video communication application and/or a video conference application). In some embodiments, the representation is provided by an application that is different from the application providing the live video communication session (e.g., a presentation application and/or a word processor application).

While (1502) the first computer system is in a live video communication session (e.g., live video communication session of FIGS. 6A-6AY) with a second computer system (e.g., 100, 300, 500, 600-1, and/or 600-2) (e.g., a remote computer system, an external computer system, a computer system associated with a user different from a user associated with the first computer system, a smartphone, a tablet computer, a laptop computer, desktop computer, and/or a head mounted device) and while displaying the representation of the first view of the physical environment, the first computer system (e.g., 100, 300, 500, 600-1, and/or 600-2) detects (1506), via the one or more sensors, a change in a position (e.g., 6218*ao*, 6218*aq*, 6218*ar*, 6218*av*, and/or 6218*aw*) (e.g., a change in location in space, a change in orientation (such as angular orientation), a translation, and/or a change of a horizontal and/or vertical angle) of the first computer system (e.g., the first computer system is tilted).

While (1502) the first computer system is in a live video communication session (e.g., live video communication session of FIGS. 6A-6AY) with a second computer system (e.g., 100, 300, 500, 600-1, and/or 600-2) (e.g., a remote computer system, an external computer system, a computer system associated with a user different from a user associated with the first computer system, a smartphone, a tablet computer, a laptop computer, desktop computer, and/or a head mounted device) and in response to detecting the change in the position of the first computer system, the first computer system (e.g., 100, 300, 500, 600-1, and/or 600-2) displays (1508), via the first display generation component, a representation of a second view (e.g., a view of the face of user 622, a view of the face of user 623, surface 619, and/or a surface of desk 686) (or a second portion) of the physical environment in the field of view of the one or more cameras of the second computer system that is different from the first view (or first portion) of the physical environment in the field of view of the one or more cameras of the second computer system. In some embodiments, displaying the representation of the second view includes panning image data (e.g., a live-video feed and/or a static image). In some embodiments, the first view corresponds to a first cropped portion of the field-of-view of the one or more cameras of the second computer system and the second view corresponds to a second cropped portion of the field-of-view of the one or more cameras different from the first cropped portion. In some embodiments, the physical characteristics (e.g., orientation, position, angle, lens, focal length of the lens, and/or sensor size) of the one or more cameras of the second computer system does not change even though a different view is displayed on the first computer system. In some embodiments, the representation of the second view of the physical environment in the field of view of the one or more cameras of the second computer system is based on an amount (e.g., magnitude) (and/or direction) of the detected change in position of the first computer system.

Changing a view of a physical space in the field of view of a second computer system in response to detecting a change in position of the first computer system enhances the video communication session experience because it provides different views without displaying additional user interface objects and provides visual feedback about a detected change in position of the first computer system, which provides additional control options without cluttering the user interface and provides improved visual feedback about of the detected change of position of the first computer system.

In some embodiments, while the first computer system (e.g., 100, 300, 500, 600-1, and/or 600-2) is in the live video communication session with the second computer system: the first computer system detects, from image data (e.g., image data captured by camera 602 in FIG. 6AO) (e.g., image data associated with the first view of the physical environment and/or image data associated with second view of the physical environment), handwriting (e.g., 1310) (e.g., physical marks such as pen marks, pencil marks, marker marks, and/or crayon marks, handwritten characters, handwritten numbers, handwritten bullet points, handwritten symbols, and/or handwritten punction) that includes physical marks on a physical surface (e.g., 1308, 619, and/or 686) (e.g., a piece of paper, a notepad, a white board, and/or a chalk board) that is in a field of view (e.g., 620 and/or 6204) of the one or more cameras of the second computer system and that is separate from the second computer system (e.g., device 600-2 and/or display 683 of device 600-2). In some embodiments, while the first computer system (e.g., 100, 300, 500, 600-1, and/or 600-2) is in the live video communication session with the second computer system: in response to detecting the handwriting that includes physical marks on the physical surface that is in the field of view of the one or more cameras of the second computer system and that is separate from the second computer system, the first computer system detects (e.g., automatically and/or manually (e.g., in response to user input)) digital text (e.g., 1320) (e.g., letters, numbers, bullet points, symbols, and/or punction) (e.g., in an electronic document in the representation of the first view and/or in the representation of the second view) corresponding to the handwriting that is in the field of view of the one or more cameras of the second computer system. In some embodiments, the first computer system displays new digital text as additional handwriting is detected. In some embodiments, the first computer system maintains display of the digital text (e.g., original digital text) as new digital text is added. In some embodiments, the first computer system concurrently displays the digital text (e.g., original digital text) with the new digital text. Displaying digital text corresponding to handwriting that is in the field of view of the one or more cameras of the second computer system enhances the computer system because it allows a user to add digital text without further inputs to the computer system (e.g., typing), which reduces the number of inputs needed to perform an operation and provides additional control options without cluttering the user interface.

In some embodiments, displaying the representation of the second view of the physical environment in the field of view of the one or more cameras of the second computer system includes: in accordance with a determination that the change in the position of the first computer system includes a first amount of change in angle of the first computer system (e.g., the change amount of change in angle caused by 6218*ao*, 6218*aq*, 6218*ar*, 6218*av*, and/or 6218*aw*), the second view of the physical environment is different from the first view of the physical environment by a first angular amount (e.g., as schematically depicted by the change of the position of shaded region 6217 in FIGS. 6AO-6AY). In some embodiments, displaying the representation of the second view of the physical environment in the field of view of the one or more cameras of the second computer system includes: in accordance with a determination that the change in the position of the first computer system includes a second amount of change in angle of the first computer system that is different from the first amount of change in angle of the first computer system (e.g., the change amount of change in angle caused by 6218*ao*, 6218*aq*, 6218*ar*, 6218*av*, and/or 6218*aw*), the second view of the physical environment is different from the first view of the physical environment by a second angular amount that is different from the first angular amount (e.g., as schematically depicted by the change of the position of shaded region 6217 in FIGS. 6AO-6AY) (e.g., the amount of angle change of the first computer system determines the amount of angle change of a displayed view that is within of the field of view of the one or more cameras of the second computer system). In some embodiments, the second view is provided without changing the field of view of the one or more cameras of the second computer system (e.g., without changing a position and/or angle of the one or more cameras of the second computer system). In some embodiments, the first view and the second view are based on different portions (e.g., cropped portions) of the field of view (e.g., the same field of view) of the one or more cameras of the second computer system. Changing the view that is displayed based on the change in the angle of the first computer system improves the computer system because it gives the user visual feedback as to the degree of change in position and that the change in position of the first computer system was detected, which provides improved visual feedback.

In some embodiments, displaying the representation of the second view of the physical environment in the field of view of the one or more cameras of the second computer system includes: in accordance with a determination that the change in the position of the first computer system includes (e.g., is in) a first direction (e.g., the direction of change caused by 6218*ao*, 6218*aq*, 6218*ar*, 6218*av*, and/or 6218*aw*) (e.g., tilts up and/or rotates a respective edge of the first device toward the user) of change in position of the first computer system (e.g., based on a user tilting the first computer system), the second view of the physical environment is in a first direction in the physical environment from the first view of the physical environment (e.g., as schematically depicted by the direction of change in the position of shaded region 6217 in FIGS. 6AO-6AY) (e.g., the view pans up and/or the view shifts up). In some embodiments, displaying the representation of the second view of the physical environment in the field of view of the one or more cameras of the second computer system includes: in accordance with a determination that the change in the position of the first computer system includes a second direction (e.g., the direction of change caused by 6218*ao*, 6218*aq*, 6218*ar*, 6218*av*, and/or 6218*aw*) (e.g., tilts down and/or rotates the respective edge of the first device away from the user) that is different from the first direction of change in position of the first computer system (e.g., based on a user tilting the first computer system), wherein the second direction of change in position of the first computer system is different from the first direction of change in position of the first computer system, the second view of the physical environment is in a second direction in the physical environment from the first view of the physical environment (e.g., as schematically depicted by the direction of the second view of shaded region 6217 in FIGS. 6AO-6AY), wherein the second direction in the physical environment is different from the first direction in the physical environment (e.g., the view pans down and/or the view shifts down) (e.g., the direction of change in angle of the first computer system determines the direction of change in angle of a displayed view that is within of the field of view of the one or more cameras of the second computer system). Changing the view that is displayed based on the direction in which the first computer system changes improves the computer system because it gives the user visual feedback as to the direction in which the first computer system has changed and the that the change in position of the first computer system has been detected, which provides improved visual feedback.

In some embodiments, the change in the position of the first computer system includes a change in angle of the first computer system (e.g., 6218*ao*, 6218*aq*, 6218*ar*, 6218*av*, and/or 6218*aw*). In some embodiments, displaying the representation of the second view of the physical environment in the field of view of the one or more cameras of the second computer system includes: displaying a gradual transition (e.g., as depicted in FIGS. 6AO-6AR, 6AV-6AX) (e.g., a transition that gradually progresses through a plurality of intermediate views over time) from the representation of the first view of the physical environment to the representation of the second view of the physical environment based on the change in angle of the first computer system. Displaying a gradual transition from the first view to the second view based on the change in angle improves the computer system because it gives the user visual feedback that a change in position of the first computer system is being detected, which provides improved visual feedback.

In some embodiments, the representation of the first view includes a representation of a face of a user in the field of view of the one or more cameras of the second computer system (e.g., 6214 in FIG. 6AW). In some embodiments, the representation of the second view includes a representation of a physical mark (e.g., a pen, marker, crayon, pencil mark and/or pencil other drawing implement mark) in the field of view of the one or more cameras of the second computer system (e.g., 6214 in FIG. 6AV, FIG. 6AS). Switching between a view of a user's face and a view of marks made by the user in the field of view of the second computer system in response to a change in position of the first computer system enhances the video communication session experience as it allows different views of the physical environment to be displayed without displaying additional user interface objects, which provides additional control options without cluttering the user interface. Additionally, it allows the user of the first computer system to control what part of the physical environment the user would like to view, which provides additional control options without cluttering the user interface.

In some embodiments, while displaying the representation of the physical mark, the first computer system detects, via one or more input devices (e.g., a touch-sensitive surface, a keyboard, a controller, and/or a mouse), a user input (e.g., a set of one or more user inputs) corresponding to a digital mark (e.g., 6222 and/or 6223) (e.g., a drawing, text, a virtual mark, and/or a mark made in a virtual environment). In some embodiments, in response to detecting the user input, the first computer system displays (e.g., via the first display generation component and/or a display generation component of the second computer system) a representation of the digital mark concurrently with the representation of the physical mark (e.g., as depicted in FIGS. 6AQ, 6AS, 6AV, and/or 6AY). In some embodiments, the user input corresponds to a location relative to the representation of the physical mark (e.g., a location in the physical environment). In some embodiments, the computer system displays the digital mark at the location relative to the representation of the physical mark after detecting a change in position of the first computer system. In some embodiments, the computer system displays the digital mark at the location relative to the representation of the physical mark while a representation of a respective view of the physical environment changes in response to detecting a change in position of the first computer system (e.g., the digital mark maintains its location relative to the physical mark when the view changes). In some embodiments, while displaying the representation of the digital mark, the first computer system detects a change in position of the first computer system from a first position to a second position different from the first position. In some embodiments, in response to detecting the change in position of the first computer system, the first computer system ceases to display of the representation of the digital mark (e.g., the digital mark is no longer displayed based on the change in position of the first computer). In some embodiments, while first computer system is in the second position and while the representation of the digital mark ceases to be displayed, the first computer system detects a change from the second position to a third position (e.g., close to the first position). In response to detecting the change from the second position to the third position, the first computer system displays (e.g., re-displays) the digital mark. Displaying a digital mark in response to detecting user input improves the computer system by providing visual feedback that user input was detected, which improves visual feedback. Additionally, displaying a digital mark in response to detecting user input enhances the video communication session experience as a user can add digital marks to another user's physical marks, which improves how users collaborate and/or communicate during a live video communication session.

In some embodiments, the representation of the digital mark is displayed via the first display generation component (e.g., 683 and/or as depicted in FIGS. 6AQ, 6AS, 6AV, and/or 6AY) (e.g., at the device that detected the input). Displaying a digital mark on the computer system in which the input was detected improves the computer system by providing visual feedback to the user who is providing the input, which improves visual feedback. Additionally, displaying a digital mark in response to detecting the second user input enhances the video communication session experience as the user providing the input can mark up another user's physical marks, which improves how users collaborate and/or communicate during a live video communication session.

In some embodiments, in response to detecting the digital mark, the first computer system causes (e.g., transmits and/or communicates) a representation of the digital mark to be displayed at the second computer system (e.g., 6216 and/or as depicted in FIGS. 6AQ, 6AS, 6AV, and/or 6AY). In some embodiments, the second computer is in communication with a second display generation component (e.g., a display controller, a touch-sensitive display system, a monitor, and/or a head mounted display system) that displays the representation of the digital mark with the representation of the physical mark (e.g., superimposed on an image of the physical mark). Displaying the digital mark on the second computer system improves the computer system by providing visual feedback that input is being detected at first computer system, which improves visual feedback. Additionally, displaying a digital mark in response to detecting the user input enhances the video communication session experience because the user making the physical marks can view the additional digital marks made by the user of the first computer system, which improves how users collaborate and/or communicate during a live video communication session.

In some embodiments, the representation of the digital mark is displayed on (e.g., concurrently with) the representation of the physical mark at the second computer system (e.g., 6216 and/or as depicted in FIGS. 6AQ, 6AS, 6AV, and/or 6AY). Displaying the digital mark on a representation of the physical mark enhances the video communication session by allowing a user to view the digital mark with respect to the representation of the physical mark and provides visual feedback that input was detected at first computer system, which improves visual feedback.

In some embodiments, the representation of the digital mark is displayed on (or, optionally, projected onto) a physical object (e.g., 619 and/or 618) (e.g., a table, book, and/or piece of paper) in the physical environment of the second computer system. In some embodiments, the second computer is in communication with a second display generation component (e.g., a projector) that displays the representation of the digital mark onto a surface (e.g., paper, book, and/or whiteboard) that includes the physical mark. In some embodiments, the representation of the digital mark is displayed adjacent to the physical mark in the physical environment of the second computer system. Displaying the digital mark by projecting the digital mark onto a physical object (e.g., the surface on which the physical marks are made) enhances the video communication session by allowing a user to view the digital mark with respect to the physical mark and provides visual feedback that input was detected at first computer system, which improves visual feedback.

In some embodiments, while the first computer system is in the live video communication session with the second computer system: the first computer system displays, via the first display generation component, a representation of a third view of the physical environment in the field of view of the one or more cameras of the second computer system (e.g., as depicted in 6214 of FIG. 6AV and/or 6216 in FIG. 6AO), wherein the third view includes a face of a user in the field of view of the one or more cameras of the second computer system (e.g., 622-2 in FIG. 6AV, and/or 622-1), wherein the representation of the face of the user is concurrently displayed with the representation of the second view of the physical environment (e.g., as depicted in FIG. 6AV). In some embodiments, the representation of the third view that includes the face of the user does not change in response to detecting a change in position of the first computer system. In some embodiments, the computer system displays the representation of the third view that includes the face of the user in a first portion of a user interface and the representation of the first view and/or the second view in a second portion of the user interface, different from the first portion. Displaying a view of a face of the user of the second computer system enhances the video communication session experience because it provides views of different portions of the physical environment that the user of the first computer wishes to see, which improves how users collaborate and/or communicate during a live communication session.

In some embodiments, displaying the representation of the first view of the physical environment includes displaying the representation of the first view of the physical environment based on the image data captured by a first camera (e.g., 602 and/or 6202) of the one or more cameras of the second computer system. In some embodiments, displaying the representation of the second view of the physical environment includes displaying the representation of the second view (e.g., shaded regions 6206 and/or 6217) of the physical environment based on the image data captured by the first camera of the one or more cameras of the second computer system (e.g., the representation of the first view of the physical environment and the representation of the first view of the physical environment are based on image data captured by the same camera (e.g., a single camera)). Displaying the first view and the second view based on the image data captured by the first camera enhances the video communication session experience because different perspectives can be displayed based on image data from the same camera without requiring further input from the user, which improves how users collaborate and/or communicate during a live communication session and reduces the number of inputs (and/or devices) needed to perform an operation. Displaying the first view and the second view based on the image data captured by the first camera improves the computer system because a user can view different angles of a physical environment using the same camera, viewing different angles does not require further action from the user (e.g., moving the camera), and doing so reduces the number devices needed to perform an operation, the computer system does not need to have two separate cameras to capture different views, and/or the computer system does not need a camera with moving parts to change angles, which reduces cost, complexity, and wear and tear on the device.

In some embodiments, displaying the representation of the second view of the physical environment in the field of view of the one or more cameras of the second computer system is performed in accordance with a determination that authorization has been provided (e.g., user 622 and/or device 600-1 grants permission for user 623 and/or device 600-4 to change the view) (e.g., granted or authorized at the second computer system and/or by a user of the second computer system) for the first computer system to change the view of the physical environment that is displayed at the first computer system. In some embodiments, in response to detecting the change in the position of the first computer system, and in accordance with a determination that authorization has been provided for the first computer system to change the view, the first computer system displays the representation of the second view of the physical environment in the field of view of the one or more cameras of the second computer system. In some embodiments, in response to detecting the change in the position of the first computer system, and in accordance with a determination that authorization has not been provided for the first computer system to change the view, the first computer system foregoes displaying the representation of the second view of the physical environment in the field of view of the one or more cameras of the second computer system. In some embodiments, authorization can be provided by enabling an authorization affordance (e.g., a user interface object and/or a setting) at the second computer system (e.g., a user of the second computer system grants permission to the user of the first computer system to view different portions of the physical environment based on movement of the first computer system). In some embodiments, the authorization affordance is disabled (e.g., automatically) in response to detecting a termination of the live video communication session. Displaying the representation of the second view based on a determination that authorization has been provided for the first computer system to change the view enhances the video communication session by providing additional security, which improves how users collaborate and/or communicate during a live communication session.

In some embodiments, while displaying a representation of a third view of the physical environment (e.g., 6214 and/or 6216 in FIG. 6AQ) (e.g., the first view, the second view, or a different view before and/or after displaying the second or first view of the physical environment), the first computer system detects, via the one or more sensors, a respective change in a position of the first computer system (e.g., 6218*aq*). In some embodiments, in response to detecting the respective change in the position of the first computer system: in accordance with a determination that the respective change in the position of the first computer corresponds to a respective view that is within a defined portion of the physical environment (e.g., 6216 and/or 6214 in FIG. 6AX) (e.g., based on another user's authorization and/or based on the view being within the field of view of the one or more cameras), the first computer system displays, via the first display generation component, a representation (e.g., an image and/or video) of the respective view of the physical environment in the field of view of the one or more cameras of the second computer system (e.g., as described in reference to FIG. 6AR). In some embodiments, in response to detecting the respective change in the position of the first computer system: in accordance with a determination that the respective change in the position of the first computer corresponds to a respective view that is not within the defined portion of the physical environment (e.g., 6216 and/or 6214 in FIG. 6AX) (e.g., based on another user's authorization and/or based on the view being outside the field of view of the one or more cameras), the first computer system forgoes display of the representation (e.g., an image and/or video) of the respective view of the physical environment in the field of view of the one or more cameras of the second computer system (e.g., as described in reference to FIG. 6AR) (e.g., a user is prevented to view more than a threshold amount of the physical environment that is in the field of view of the one or more cameras). Conditionally displaying the respective view based on whether the respective view is within the defined portion of the physical environment enhances the video communication session by providing additional security and improves how users collaborate and/or communicate during a live communication session.

In some embodiments, in response to detecting the respective change in the position of the first computer system: in accordance with the determination that the respective change in the position of the first computer corresponds to the view that is not within the defined portion of the physical environment, the first computer system displays, via the first display generation component, an obscured (e.g., blurred and/or greyed out) representation (e.g., 6226) of the portion of the physical environment that is not within the defined portion of the physical environment (e.g., as described in reference to FIG. 6AR). In some embodiments, in accordance with the determination that the respective change in the position of the first computer corresponds to the view that is within the defined portion of the physical environment, the first computer system forgoes displaying the obscured representation of the portion of the physical environment that is not within the defined portion. In some embodiments, the computer system modifies at least a portion along a first edge and forgoes modifying at least a portion along a second edge. In some embodiments, at least a portion of an edge that reaches the defined portion is modified. Conditionally displaying the obscured representation of the portion of the physical environment if it is not within the defined portion enhances the computer system because it provides visual feedback that the computer system cannot display the requested view (since it is beyond the defined portion of viewable space).

In some embodiments, the second view of the physical environment includes a physical object in the physical environment. In some embodiments, while displaying the representation of the second view of the physical environment, the first computer system obtains image data that includes movement of the physical object in the physical environment (e.g., 6230 and/or 6232) (e.g., movement of the physical mark, movement of a piece of paper, and/or movement of a hand of a user). In some embodiments, in response to obtaining image data that includes the movement of the physical object: the first computer system displays a representation of a fourth view of the physical environment that is different from the second view and that includes the physical object (e.g., 6214 and/or 6216 in FIG. 6AT and/or FIG. 6AS). In some embodiments, the physical object is tracked (e.g., by the first computer system, the second computer system, or a remote server). In some embodiments, the physical object has the same relative position in the second view as in the fourth view (e.g., the physical object is in a center of the first view and a center of the fourth view). In some embodiments, an amount of change in view from the second view to the fourth view (e.g., an amount of panning) corresponds (e.g., is proportional) to the amount of movement of the physical object. In some embodiments, the second view and the fourth view are cropped portions of the same image data. In some embodiments, the fourth view is displayed without modifying an orientation of the one or more cameras of the second computer system. Displaying the representation of the fourth view of the physical environment that includes the physical object improves the computer system because a view of the physical object is displayed as it moves through the physical environment and provides additional control options without cluttering the user interface.

In some embodiments, the first computer system is in communication (e.g., via a local area network, via short-range wireless Bluetooth connection, and/or the live communication session) with a second display generation component (e.g., 6201) (e.g., via another computer system such as a tablet computer, a smartphone, a laptop computer, and/or a desktop computer). In some embodiments, the first computer system displays, via the second display generation component, a representation of a user (e.g., 622) in the field of view of the one or more cameras of the second computer system (e.g., 622-4), wherein the representation of the user is concurrently displayed with the representation of the second view of the physical environment that is displayed via the first display generation component (e.g., 6214 in FIGS. 6AQ-6AU) (e.g., the representation of the user and the representation of the second view are concurrently displayed at different devices). Concurrently displaying the representation of the user on one display and the representation of the second view on another display enhances the video communication session experience by allowing a user to utilize two displays so as to maximize the view of each representation and improves how users collaborate and/or communicate during a live communication session.

In some embodiments, while the first computer system is in the live video communication session with the second computer system, and in accordance with a determination that a third computer system (e.g., 600-2) (e.g., a smartphone, a tablet computer, a laptop computer, a desktop computer, and/or a head mounted device (e.g., a head mounted augmented reality and/or extended reality device)) satisfies a first set of criteria (e.g., as described in reference to FIG. 6AN), the first computer system causes an affordance (e.g., 6212*a*, 6212*b*, 6213*a*, and/or 6213*b*) to be displayed (e.g., at the third computer system and/or the first computer system), wherein selection of the affordance causes the representation of the second view to be displayed at the third computer system (e.g., 6212*a* and/or 6213*a*) (e.g., via a display generation component of the third computer system), wherein the first set of criteria includes a location criterion that the third computer system is within a threshold distance (e.g., as described in reference to FIG. 6AN) (e.g., a physical distance or a communication distance determined based on wireless signal strength or pattern) of the first computer system. In some embodiments, in accordance with a determination that the third computer system does not satisfy the set of criteria, the first computer system forgoes causing the affordance to be displayed (e.g., at the respective computer system and/or the first computer system). In some embodiments, while displaying the affordance at the first computer system (or, optionally, the third computer system), the first computer system (or, optionally, the third computer system) detects a user input corresponding to a selection of the affordance. In some embodiments, in response to detecting the user input corresponding to the selection of the affordance, the first computer system ceases to display the representation of the second view. In some embodiments, in response to detecting the user input corresponding to the selection of the affordance, the third computer system displays the representation of the second view. In some embodiments, the first computer system and third computer system communicate an indication of the selection of the affordance that is detected. In some embodiments, the first computer system and third computer system communicate a location of the respective computer systems. In some embodiments, the criterion that respective computer system is within a threshold distance is satisfied based on an indication (e.g., strength and/or presence) of a short-range wireless communication (e.g., Bluetooth and/or local area network) between the respective computer systems. Displaying an affordance to use the third computer system to display the second view when the third computer system is near enhances the computer system because it limits the number of inputs to needed to utilize two displays and identifies the most relevant computer systems that are likely to be used, which reduces the number of inputs needed to perform an operation and performs an operation when a set of conditions has been met without requiring further user input.

In some embodiments, the first set of criteria includes a second set of criteria (e.g., a subset of the first set of criteria) that is different from the location criterion (e.g., the set of criteria includes at least one criterion other than the location criterion) and that is based on a characteristic (e.g., an orientation and/or user account) of the third computer system (e.g., as described in reference to FIG. 6AN). Conditionally displaying the affordance to use the third computer system to display the second view based on a characteristic of the third computer system enhances the computer system because it surfaces relevant computer systems that are likely to be used to display the second view and/or limits the number of computer systems that are proposed, which reduces the number of inputs needed to perform an operation and performs an operation when a set of conditions has been met without requiring further user input and declutters the user interface.

In some embodiments, the second set of criteria includes an orientation criterion that is satisfied when the third computer system is in a predetermined orientation (e.g., as described in reference to FIG. 6AN). In some embodiments, the predetermined orientation is an orientation in which the third computer system is horizontal or flat (e.g., resting on a table) and/or an orientation in which the display of the third computer system is facing up. In some embodiments, the orientation criterion includes a condition that an orientation of the third computer system includes an angle that is within a predetermined range (e.g., such that a display of the third computer system is on a substantially horizontal plane). In some embodiments, the orientation criterion includes a condition that a display generation component of the third computer system is facing a predetermined direction (e.g., facing up and/or not facing down). Conditionally displaying the affordance to use the third computer system to display the second view based on whether the third computer system is in a predetermined orientation enhances the computer system because it surfaces relevant computer systems that are likely to be used to display the second view and/or limits the number of computer systems that are proposed, which reduces the number of inputs needed to perform an operation and performs an operation when a set of conditions has been met without requiring further user input and declutters the user interface.

In some embodiments, the second set of criteria includes a user account criterion that is satisfied when the first computer system and the third computer system are associated with (e.g., logged into or otherwise connected to) a same user account (e.g., as described in reference to FIG. 6AN) (e.g., a user account having a user ID and a password). In some embodiments, the first computer system is logged into a user account associated with a user ID and a password. In some embodiments, the third computer system is logged into the user account associated with the user ID and the password. Conditionally displaying the affordance to use the third computer system to display the second view based on whether the third computer system is logged into the same account enhances the computer system because it surfaces relevant computer systems that are likely to be used to display the second view and/or limits the number of computer systems that are proposed, which reduces the number of inputs needed to perform an operation and performs an operation when a set of conditions has been met without requiring further user input and declutters the user interface.

Note that details of the processes described above with respect to method 1500 (e.g., FIG. 15) are also applicable in an analogous manner to the methods described above. For example, methods 700, 800, 1000, 1200, 1400, 1700, and 1900 optionally include one or more of the characteristics of the various methods described above with reference to method 1500. For example, methods 700, 800, 1000, 1200, 1400, 1700, and 1900 optionally include a representation of a view captured by one computer system that is updated based on a change in a position of another computer system and/or apply a digital mark over a representation of a physical mark so as to improve how content is managed and user collaborate during a video communication session. For brevity, these details are not repeated herein.

FIGS. 16A-16Q illustrate exemplary user interfaces for managing a surface view, according to some embodiments.

The user interfaces in these figures are used to illustrate the processes described below, including the processes in FIG. 17.

John's device 6100-1 of FIGS. 16A-16Q is the same as John's device 6100-1 of FIGS. 6AF-6AL. Accordingly, details of John's device 6100-1 and its functions may not be repeated below for the sake of brevity. For example, John's device 6100-1 optionally includes one or more features of devices 100, 300, 500, and/or 600-1. As depicted in a schematic representation of a side view of user 622 and surface 619, camera 6102 includes a field of view between dashed line 6145-1 and dashed line 6145-2 that includes a view of user 622 and a view of desk surface 619. In some embodiments, the techniques of FIGS. 16A-16Q are optionally applied to image data captured by a camera other than camera 6102. For example, in some embodiments, the techniques of FIGS. 16A-16Q optionally use image data captured by a camera associated with an external device that is in communication with John's device 6100-1 (e.g., a device that is in communication with John's device 6100-1 during a video communication session).

It should be appreciated that the embodiments illustrated in FIGS. 16A-16Q are optionally implemented using a different device, such as a tablet (e.g., device 600-1 and/or Jane's device 600-2) and/or Jane's device 6100-2. Therefore, various operations or features described above with respect to FIGS. 6A-6AY are not repeated below for the sake of brevity. For example, the applications, interfaces (e.g., 604-1, 604-2, 604-4, 6121 and/or 6131), and displayed elements (e.g., 608, 609, 622-1, 622-2, 623-1, 623-2, 624-1, 624-2, 6214, 6216, 6124, 6132, 6122, 6134, 6116, 6140, and/or 6142) discussed with respect to FIGS. 6A-6AY are similar to the applications, interfaces (e.g., 1602 and/or 1604), and displayed elements (e.g., 1602, 6122, 6214, 1606, 1618-1, 623-2, 622-2, 1618-2, 6104, 6106, 6126, 6120, and/or 6114) discussed with respect to FIGS. 16A-16Q. Accordingly, details of these applications, interfaces, and displayed elements may not be repeated below for the sake of brevity.

FIG. 16A depicts John's device 6100-1, which includes display 6101, one or more cameras 6102, and keyboard 6103 (which, in some embodiments, includes a trackpad). John's device 6100-1 includes similar applications as described above. As depicted, John's device 6100-1 displays, via display 6101, camera application icon 6108 and video conferencing application icon 6110. For example, camera application icon 6108 corresponds to a camera application operable on John's device 6100-1 that can be used to access camera 6102. As a further example, video conferencing application icon 6110 corresponds to a video conferencing application operable on John's device 6100-1 that can be used to initiate and/or participate in a live video communication session (e.g., a video call and/or a video chat) similar to that discussed above with reference to FIGS. 6A-6AY. John's device 6100-1 also displays, via display 6101, presentation application icon 1114 corresponding to the presentation application of FIGS. 11A-11P and note application icon 1302 corresponding to the note application of FIGS. 13A-13K. While FIGS. 16A-16Q are described with respect to accessing the camera application through the video conferencing application, the camera application is accessed through other applications. For example, in some embodiments, the camera application is accessed through the presentation application of FIGS. 11A-11P and/or the note application of FIGS. 13A-13K. For the sake of brevity, the details of managing a surface view through the presentation application and/or the note application are not repeated below for the sake of brevity.

John's device 6100-1 also displays dock 6104, which includes various application icons, including a subset of icons that are displayed in dynamic region 6106. The icons displayed in dynamic region 6106 represent applications that are active (e.g., launched, open, and/or in use) on John's device 6100-1. In FIG. 16A, the video conferencing application is currently active and the camera application is not active. Therefore, icon 6110-1 representing video conferencing application icon 6110 is displayed in dynamic region 6106 while an icon for camera application icon 6108 is not displayed in dynamic region 6106. In some embodiments, the camera application is active while the video conferencing application is active. For example, the camera application optionally includes a preview interface for a surface view that will be displayed (e.g., even while the surface view is not being shared) as described herein. As a further example, the camera application optionally displays a surface view as described in FIGS. 6AF-6AL.

Figure 16H:
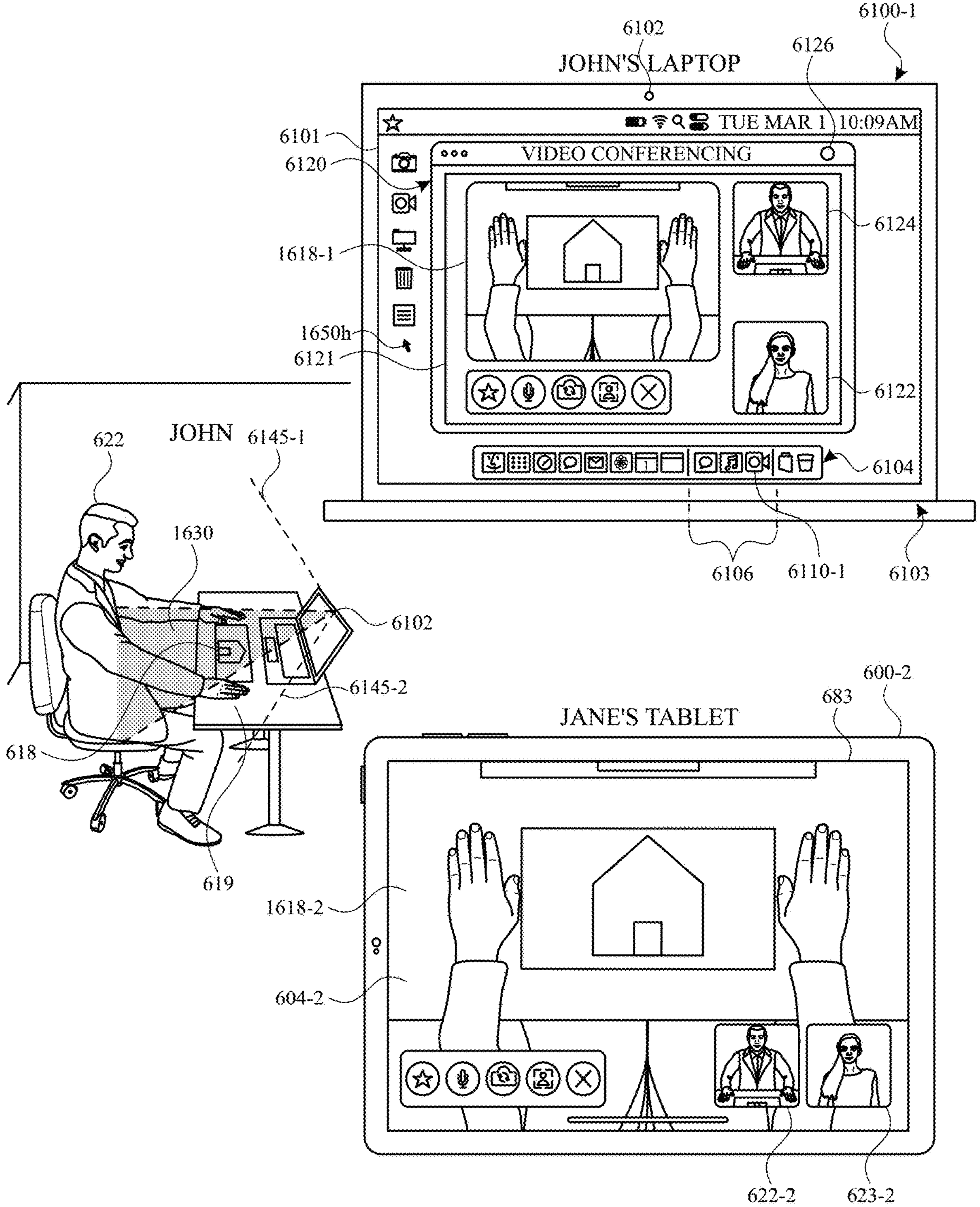

At FIG. 16A, John's device 6100-1 is participating in a live video communication session with device 600-2 (e.g., "Jane's tablet," as depicted in FIG. 16H). Video conferencing application window 6120 includes video conference interface 6121, which is similar to interface 604-1 and is described in greater detail with reference to FIGS. 6A-6AY. Video conference interface 6121 includes video feed 6122 of Jane (e.g., similar to representation 623-1) and video feed 6124 of John (e.g., similar to representation 622-1). Video conference interface 6121 also includes menu option 6126, which can be selected to display different options for sharing content in the live video communication session. While displaying video conference interface 6121, John's device 6100-1 detects input 1650*a* (e.g., a cursor input caused by clicking a mouse, tapping on a trackpad, and/or other selection input) directed at menu option 6126. In response to detecting input 1650*a*, John's device 6100-1 displays share menu 6136, as shown in FIG. 16B.

At FIG. 16B, share menu 6136 includes share options 6136-1, 6136-2, and 6136-3. Share option 6136-1 can be selected to share content from the camera application. Share option 6136-2 can be selected to share content from the desktop of John's device 6100-1. Share option 6136-3 can be selected to share content from a presentation application, such as the presentation application of FIGS. 11A-11P. In some embodiments, share menu 6136 includes an option to share content from a note application, such as the note application of FIGS. 13A-13K. While FIGS. 16A-16C depict initiating the sharing of content in camera application in response detecting to user inputs directed at displayed elements of video conference interface 6121, sharing of content from the camera application is optionally initiated in response to detecting user inputs directed at displayed elements of the camera application. For example, in some embodiments, the camera application includes a share menu, similar to share menu 6136, which includes an option to share camera application content with the video conference application. In such embodiments, a preview user interface similar to preview user interface 1604 (as described in greater detail herein) is displayed. Accordingly, in some embodiments, the request to share a surface view (and/or the request to display a preview user interface similar to preview user interface 1604) is optionally detected prior to launching the video communication application. Additionally and/or alternatively, in some embodiments, the request to share a surface view (and/or the request to display a preview user interface similar to preview user interface 1604) is optionally detected prior the video communication session. For example, in such embodiments, prior to initiating a video communication session with Jane's device 600-2, John's device 6100-1 detects the request to share a surface view (and/or the request to display a preview user interface similar to preview user interface 1604) and, in response, launches a preview user interface similar to preview user interface 1604.

At FIG. 16B, while displaying share menu 6136, John's device 6100-1 detects input 1650*b* (e.g., a cursor input caused by clicking a mouse, tapping on a trackpad, and/or other such input) directed at share option 6136-1. In response to detecting input 1650*b*, John's device 6100-1 launches the camera application, as shown in FIG. 16C.

At FIG. 16C, John's device 6100-1 displays camera application window 6114 partially overlaid on video conferencing application window 6120. John's device 6100-1 also displays preview user interface 1604 within camera application window 6114. Preview user interface 1604 provides a capability to adjust a portion of preview 1606 to be displayed and/or shared as a surface view (e.g., similar to representation 624-1 depicted in FIG. 6M and as described in greater detail with respect to FIGS. 6A-6R). As depicted, preview user interface 1604 includes preview 1604 of a video feed captured by camera 6102. Preview 1606 includes an image of user 622 ("John") and an image of drawing 618 on surface 619. Preview 1606 corresponds to shaded region 1608, which is a portion of the field of view that is captured by camera 6102 (e.g., as depicted by dashed lines 6145-1 and 6145-2). As depicted in FIG. 16C, an image of drawing 618 in preview 160 is displayed with a different perspective than the perspective described in greater detail with respect to FIG. 6M. For example, the image of drawing 618 in preview 1606 is displayed as having a side perspective view as opposed to a top-down perspective view that is described with respect to FIG. 6M. In the embodiment illustrated in FIG. 16C, John's device 6100-1 displays top-down preview 1613 within camera application window 6114. Top-down preview 1613 displays a top-down perspective view (e.g., such as 624-1 described in greater detail with respect to FIG. 6M) of the portion of preview 1606 indicated by region indicator 1610 described below. In some embodiments, top-down preview 1613 is an interactive element or a window that can be moved to a different position within camera application window 6114 via user input (e.g., a select and drag input). In some embodiments, top-down preview 1613 can be resized in response to a user input (e.g., a click, a tap, a drag input on a corner of top-down preview 1613, selection of an expand or reduce button, a pinch gesture, and/or a de-pinch gesture). For example, in some embodiments, in response to detecting a first input (e.g., a first click, dragging a corner away from the interior of top-down preview 1613, or a de-pinch gesture), device 6100-1 increases the size of (e.g., enlarges and/or expands) top-down preview 1613 in one or more dimensions; and in response to detecting a second input (e.g., a second click, dragging a corner toward the interior of top-down preview 1613, or a pinch gesture) different from the first gesture, device 6100-1 decreases the size of (e.g., shrinks) top-down preview 1613 in one or more dimensions.

At FIG. 16C, preview user interface 1604 includes region indicator 1610 and region control 1612, which is used to adjust region indicator 1610. Region indicator 1610 generally provides an indication of region 1616, which will be provided to an external device as a surface view. Region indicator 1610 has edges that surround (or at least partially surrounds) region 1616. As depicted, region indicator 1610 includes an appearance (e.g., shape) that corresponds to the portion of the preview that will be provided as a surface view. For example, the appearance of region indicator 1610 corresponds to a correction (e.g., skew correction) that will be applied to region 1616 so as to provide a surface view, such as surface views 1618-1 and 1618-2 depicted in FIG. 16J. In some embodiments, additionally or alternatively to using region indicator 1610 to define region 1616, region 1616 is defined based on a shading (and/or dimming) of one region as compared to another region. For example, in such embodiments, John's device 6100-1 applies a shading to a region that will not be provided as a surface view (e.g., a region outside of region indicator 1610) while John's device 6100-1 does not apply shading to a region that will be provided as a surface view (e.g., a region inside of region indicator 1610).

At FIG. 16C, as described, region control 1612 generally allows a user to adjust region indicator 1610 and/or region 1616. Region control 1612 optionally adjusts region indicator 1610 and/or region 1616 so as to increase and/or decrease a region (e.g., region 1616) of the field of view that is provided as a surface view. As described in greater detail herein, portions of region indicator 1610 and/or region 1616 remained in a fixed position (e.g., with respect to the field of view of camera 6102) while a position of other portions of region indicator 1610 and/or region 1616 are moved. For example, lower edge 1614 of region indicator 1610 remains fixed as other edges (e.g., edge 1620 and/or side edges 1622) of region indicator 1610 move, thereby allowing a user to expand or shrink portions of the field of view that are shared as a surface view (and, for example, limit the sharing of portions of the field of view that are beyond the edge of surface 619). In some embodiments, as depicted in FIG. 16C, preview user interface 1604 includes indication 1642 that is overlaid on preview 1606 that indicates how to adjust region indicator 1610.

In some embodiments, as depicted in FIG. 16C, preview user interface 1604 includes target area indicator 1611. Target area indicator 1611 indicates a recommended (e.g., optimal) position for region indicator 1610. In some embodiments, the position of target area indicator 1611 is selected to be aligned with (e.g., centered on or within a threshold distance of) a surface in preview 1606 (e.g., a drawing surface such as a book or piece of paper). In some embodiments, the position of target area indicator 1611 is selected to be aligned with (e.g., within a threshold distance of) an edge of a surface in preview 1606 (e.g., an edge of a table or a drawing surface). In some embodiments, the position of target area indicator 1611 is selected to be aligned with (e.g., within a threshold distance of a center position of) a user in preview 1606. In FIG. 16C, target area indicator 1611 is aligned horizontally or laterally with the images of user 622 and drawing 618 in preview 1606, and is positioned vertically such that a top edge of target area indicator 1611 is aligned with an edge of surface 619. In some embodiments, as depicted in FIG. 16C, target area indicator 1611 has the same shape, proportions, and/or aspect ratio as region indicator 1610, such that region indicator 1610 can be adjusted to match target area indicator 1611.

At FIG. 16C, in some embodiments, John's device 6100-1 displays a preview user interface 1604 for a surface view other than surface 619. In some embodiments, region indicator 1610 is overlaid an image of a vertical surface, such as a wall, whiteboard, and/or easel, that is in the field of view of camera 6102. Additionally or alternatively, while FIGS. 16A-16Q are described with respect to the camera application being used to generate preview user interface 1604, an application other than the camera application is optionally used to generate preview user interface 1604. For example, in some embodiments, preview user interface 1604 is displayed in a preview mode of the video conferencing application, such as the preview mode described in reference to FIGS. 6H-6J and/or method 700 of FIG. 7. In such embodiments, for example, the video conferencing application operates in a preview mode in response to device 1600-1 detecting a request to share a surface view, such as detecting user inputs directed at options menu 1602 (e.g., similar to user inputs directed at options menu 608 described in greater detail with respect to FIGS. 6H-6J).

At FIG. 16C, in some embodiments, John's device 6100-1 can bring video conferencing application window 6120 to the front or foreground (e.g., partially overlaid on camera application window 6114) in response to detecting a selection of video conferencing application window 6120, a selection of icon 6110-1, and/or an input on video conferencing application window 6120. In some embodiments, at FIG. 6C, in response to detecting user inputs requesting to display video conferencing application window 6120, John's device 6100-1 displays a video conferencing application window similar to video conferencing application window 6120 that is depicted in FIG. 6A (e.g., where video conference interface 6121 does not include a surface view). Similarly, John's device 6100-1 can bring camera application window 6114 to the front or foreground (e.g., partially overlaid on video conferencing application window 6120) in response to detecting a selection of camera application icon 6108, a selection of icon 6108-1, and/or an input on camera application window 6114. Additionally, because John's device 6100-1 launched the camera application, camera application icon 6108-1 is displayed in dynamic region 6106 of dock 6104, indicating that the camera application is active.

At FIG. 16C, while displaying preview user interface 1604, John's device 6100-1 detects input 1650*c* (e.g., a cursor input caused by clicking a mouse, tapping on a trackpad, and/or other such input) directed at region control 1612. In response to detecting input 1650*c*, John's device 6100-1 displays preview user interface 1604 with an updated region 1616, as depicted in FIG. 16D.

At FIG. 16D, John's device 6100-1 updates region 1616 and/or region indicator 1610 to indicate that a new portion of preview 1606 will be included as a surface view. Notably, region 1616 in FIG. 16D is larger than region 1616 in FIG. 16C. Additionally, some portions of the region 1616 and/or region indicator 1610 have moved while other portions have remained fixed (e.g., at a respective position within the field of view). For example, the position of edge 1614 of region indicator 1610 in FIG. 16D is the same as the position of edge 1614 of region indicator 1610 in FIG. 16C. Meanwhile, edge 1620 and side edges 1622 have moved. For example, edge 1620 of region indicator 1610 in FIG. 16D is closer to an edge of surface 619 (e.g., an edge of desk) as compared to edge 1620 of region indicator 1610 in FIG. 16C. As a further example, side edges 1622 of region indicator 1610 in FIG. 16D are further from each other as compared to side edges 1622 of region indicator 1610 in FIG. 16C. At FIG. 16D, the appearance of region indicator 1610 corresponds to a perspective that will be (and/or is) provided by a surface view, such as surface views 1618-1 and 1618-2 depicted in FIG. 16H. Top-down preview 1613 is updated (e.g., compared to FIG. 16C) to display a top-down view of region 1616 in FIG. 16D.

In FIG. 16D, the portion of preview 1606 indicated by region indicator 1610 matches the portion indicated by target area indicator 1611 shown in FIG. 16C. As a result, the appearance of region indicator 1610 is emphasized (e.g., bolded, highlighted, and/or filled in) in FIG. 16D compared to the appearance of region indicator 1610 when region indicator 1610 is not aligned with target area indicator 1611 (e.g., the appearance of region indicator 1610 in FIG. 16C).

At FIG. 16D, while displaying preview user interface 1604, John's device 6100-1 detects input 1650*d* (e.g., a cursor input caused by clicking a mouse, tapping on a trackpad, and/or other such input) directed at region control 1612. In response to detecting input 1650*d*, John's device 6100-1 displays preview user interface 1604 with an updated region 1616, as depicted in FIG. 16E.

At FIG. 16E, John's device 6100-1 updates region 1616 and/or region indicator 1610 to indicate that a new portion of preview 1606 will be included as a surface view. Notably, region 1616 in FIG. 16E is larger than region 1616 in FIG. 16D. Additionally, some portions of the region 1616 and/or region indicator 1610 have moved while other portions have remained fixed (e.g., at a respective position within the field of view). For example, the position of edge 1614 of region indicator 1610 in FIG. 16E is the same as the position of edge 1614 of region indicator 1610 in FIG. 16D. Meanwhile, edge 1620 and side edges 1622 have moved. For example, edge 1620 of region indicator 1610 in FIG. 16E has moved past the edge of surface 619 (e.g., and over a portion of the image that includes an image of a torso of user 622) as compared to edge 1620 of region indicator 1610 in FIG. 16D. As a further example, side edges 1622 of region indicator 1610 in FIG. 16E are further from each other as compared to side edges 1622 of region indicator 1610 in FIG. 16D. At FIG. 16E, the appearance of region indicator 1610 corresponds to a perspective that will be (and/or is) provided by a surface view, such as surface views 1618-1 and 1618-2 depicted in FIG. 16H.

Top-down preview 1613 is updated (e.g., compared to FIG. 16D) to display a top-down view of region 1616 in FIG. 16E. In FIG. 16E, the portion of preview 1606 indicated by region indicator 1610 does not match the portion indicated by target area indicator 1611. As a result, the appearance of region indicator 1610 is not emphasized.

At FIG. 16E, while displaying preview user interface 1604, camera 6102 is moved in response to movement 1650*e* of John's device 6100-1. In response to movement 1650*e*, John's device 6100-1 displays preview user interface 1604, as depicted in FIG. 16F. In some embodiments, while displaying preview user interface 1604 in FIG. 16E, John's device 6100-1 detects an input (e.g., a gesture described in reference to FIGS. 6S-6AC and/or a cursor input caused by clicking a mouse, tapping on a trackpad, and/or other such input) corresponding to a request to display a different portion of the field of view of camera 6102, such as by panning and/or zooming. In such embodiments, in response to detecting the input (e.g., and without physical movement of camera 6102 and/or John's device 6100-1), John's device 6100-1 displays preview user interface with an updated preview that includes a new portion of the field of view (e.g., based on panning and/or zooming image data).

At FIG. 16F, as a result of movement 1650*e* in FIG. 16E, camera 6102 captures a new portion of a physical environment. As such, preview 1606 includes an image of the new portion of the physical environment. As depicted, John's device 6100-1 displays region indicator 1610 over preview 1606 that includes an image of the new portion of the physical environment. Additionally, at least a portion of region indicator 1610 (and/or region 1616) remains fixed within preview user interface 1604 and/or with respect to the field of view of the camera. For example, a portion of region indicator 1610 (and/or region 1616), such as edge 1614, remains fixed within preview user interface 1604. Other portions of region indicator 1610 (and/or region 1616) optionally remain fixed as well. As depicted, region indicator 1610 (and/or region 1616), including edge 1620 and/or side edges 1622, is in the same position with respect to the preview user interface 1604 in FIG. 16F as the position of region indicator 1610 (and/or region 1616) in FIG. 16E. In some embodiments, region indicator 1610 (and/or region 1616), including edge 1614, edge 1620 and/or side edges 1622, does not remain fixed within preview user interface 1604 and/or with respect to the field of view of the camera. Top-down preview 1613 is updated (e.g., compared to FIG. 16E) to display a top-down view of region 1616 in FIG. 16F.

Additionally or alternatively, in some embodiments, John's device 6100-1 modifies a size of region indicator 1610 (and/or region 1616) based on a change in visual content that is displayed in preview 1606 and/or the change in the physical environment in the field of view (e.g., a difference in the size and/or length of surface 619 and/or a difference in objects detected on surface 619). In some embodiments, John's device 6100-1 does not modify the size of region indicator 1610 (and/or region 1616) based on a change in visual content that is displayed in preview 1606 and/or the change in the physical environment in the field of view (e.g., the size of region indicator 1610 and/or region 1616 is independent of the visual content that is displayed in preview 1606 and/or the change in the physical environment in the field of view).

In some embodiments, during movement 1650*e* in FIG. 16E, the target area indicator remains fixed relative to the physical environment, drawing 618, and/or surface 619 represented by preview 1606 (e.g., moves within preview user interface 1604 and/or relative to region indicator 1610), as represented by target area indicator 1611*a*. In some embodiments, as a result of movement 1650*e* in FIG. 16E, the target area indicator moves relative to the physical environment represented by preview 1606 (e.g., moves with region indicator 1610) and maintains the same position relative to preview user interface 1604, as represented by target area indicator 1611*b*. In some embodiments, either target area indicator 1611*a* is displayed or target area indicator 1611*b* is displayed, but not both.

At FIG. 16F, while displaying preview user interface 1604, camera 6102 is moved in response to movement 1650*f* of John's device 6100-1. In response to movement 1650*f*, John's device 6100-1 displays preview user interface 1604, as depicted in FIG. 16G. In some embodiments, while displaying preview user interface 1604 of FIG. 16F, John's device 6100-1 detects an input (e.g., a gesture described in reference to FIGS. 6S-6AC and/or a cursor input caused by clicking a mouse, tapping on a trackpad, and/or other such input) corresponding to a request to display a different portion of the field of view of camera 6102. In such embodiments, in response to detecting the input (e.g., and without physical movement of camera 6102 and/or John's device 6100-1), John's device 6100-1 displays a preview user interface similar to preview interface 1604 as depicted in FIG. 16G.

At FIG. 16G, camera 6102 is in the same position as in FIG. 16E. As such, the displayed elements of preview user interface 1604 (e.g., preview 1606, region indicator 1610, target area indicator 1611, top-down preview 1613, and/or region 1616) in FIG. 16G are the same to the displayed elements of preview user interface 1604 in FIG. 16E.

At FIG. 16G, preview user interface 1604 includes surface view affordance 1624. Surface view affordance 1624 generally initiates the sharing (or, optionally, display) of the portion of the field of view included in region 1616 and/or defined by region indicator 1610. While surface view affordance 1624 is depicted as being positioned in a corner of preview user interface 1604, surface view affordance 1624 is optionally positioned in another portion of preview user interface 1604. For example, in some embodiments, surface view affordance 1624 is displayed between indication 1642 and edge 1614 of region indicator 1610 and/or region 1616 (e.g., surface view affordance 1624 is displayed in a portion of preview 1606 that is below indication 1642 and/or substantially centered in preview user interface 1604). In such embodiments, surface view affordance 1624 is optionally overlaid on a portion of edge 1620 and/or region 1616 based on a size of region indicator 1610 and/or region 1616. While displaying preview user interface 1604, John's device 6100-1 detects input 1650*g* (e.g., a cursor input caused by clicking a mouse, tapping on a trackpad, and/or other such input) directed at surface view affordance 1624. In response to detecting input 1650*g*, John's device 6100-1 displays surface view 1618-1, as depicted in FIG. 16H. Additionally, John's device 6100-1 causes Jane's device 600-2 to display, via display 683, surface view 1618-2 (e.g., based on communicating image data corresponding to the surface view).

At FIG. 16H, John's device 6100-1 and Jane's device 600-2 display surface views 1618-1 and 1618-2, respectively. Specifically, surface view 1618-1 is included in video conference interface 6121 of video conferencing application window 6120 and surface view 1618-2 is included in video conference interface 604-2 (which is similar to interface 604-2 of FIGS. 6A-6AE and/or FIGS. 6AO-6AY). Surface views 1618-1 and 1618-2 correspond to the same portion of the field of view included in region 1616 and/or defined by region indicator 1610 in FIG. 16G, though the portion included in region 1616 and/or defined by region indicator 1610 has been corrected (e.g., based on a rotation and/or a skew and, for example, as described in greater detail with respect to FIGS. 6A-6R) so as to provide a different perspective than the perspective provided by preview 1606 in FIG. 16G. Additionally, surface views 1618-1 and 1618-2 include images that correspond to shaded region 1630 of the field of view of camera 6102, as described in greater detail below.

At FIG. 16H, preview user interface 1604 and camera application window 6114 are closed, as depicted by application icon 6108-1 no longer being displayed in dynamic region 6106. In some embodiments, in response to input 1650*g* in FIG. 16G, John's device 6100-1 closes preview user interface 1604 and/or camera application window 6114. In some embodiments, preview user interface 1604 and/or camera application window 6114 remains active in response to detecting input 1650*g* of FIG. 16G. Additionally or alternatively, in some embodiments, in response to detecting one or more inputs (e.g., directed at menu option 6126 and/or camera application icon 6108), John's device 6100-1 displays (and/or re-displays) preview user interface 1604 and/or camera application window 6114 after being closed so as to manage surface views 1618-1 and 1618-2.

At FIG. 16H, surface view 1618-1 is concurrently displayed with John's video feed 6124 and Jane's video feed 6122 while surface view 1618-2 is concurrently displayed with representations 622-2 and 623-2 (which are described in greater detail with respect to FIGS. 6A-6AE and/or FIGS.

6AO-6AY). In some embodiments, surface view 1618-1 is not concurrently displayed with John's video feed 6124 and Jane's video feed 6122 (e.g., in response to displaying surface view 1618-1 and/or in response to detecting one or more user inputs to remove John's video feed 6124 and Jane's video feed 6122). Similarly, in some embodiments, surface view 1618-2 is not concurrently displayed with representations 622-2 and 623-2 (e.g., in response to displaying surface view 1618-2 and/or in response to detecting one or more user inputs to remove representation 622-2 and representation 623-2).

Figure 16I:
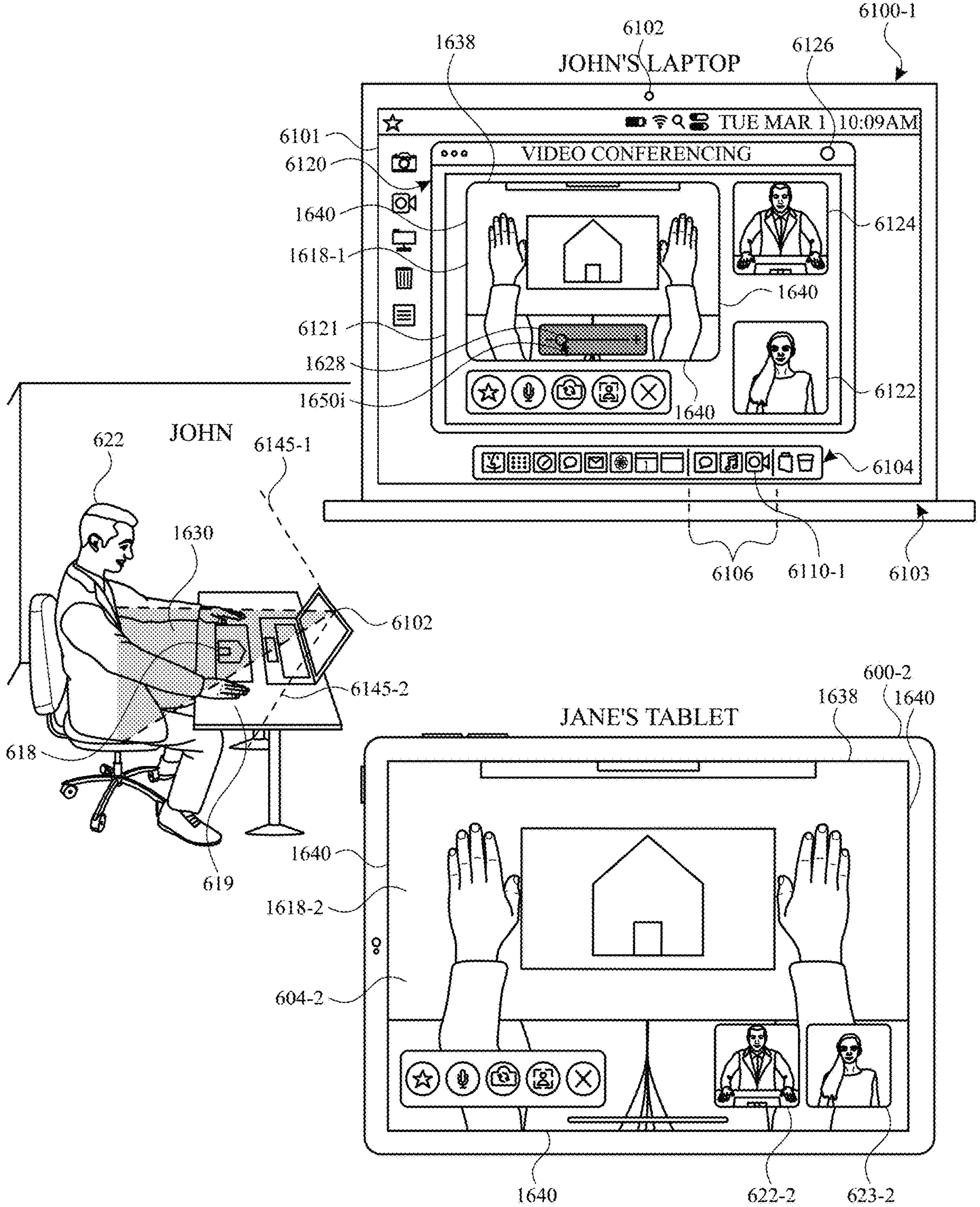

At FIG. 16H, while displaying video conference interface 6121, John's device 6100-1 detects input 1650*h* (e.g., a cursor input caused by clicking a mouse, tapping on a trackpad, and/or other such input) that changes a position of a cursor. In some embodiments, input 1650*h* corresponds to a movement of the cursor from not being over surface view 1618-1 (e.g., having a position not corresponding to a position of surface view 1618-1, as depicted in FIG. 16H) to being over surface view 1618-1 (e.g., having a position corresponding to the position of surface view 1618-1, as depicted in FIG. 16I). In response to detecting input 1650*h* (and/or based on the position of the cursor corresponding to the position of surface view 1618-1), John's device 6100-1 displays region control 1628, e.g., in video conference interface 6121, as depicted in FIG. 16I.

At FIG. 6I, video conference interface 6121 includes region control 1628, which is similar to region control 1612 of FIGS. 16C-16G but having a different state. Region control 1628 is generally displayed in video conference interface 6121 (e.g., as opposed to preview user interface 1604) and allows a user is modify what portion of the field of view is displayed while surface view 1618-1 is being displayed. In some embodiments, region control 1628 gives the user an ability to update the surface view in a live manner and/or in real time (e.g., as opposed to a change in region control 1612 in preview user interface 1604, which, in some embodiments, does not update surface view 1618-1 in real time).

At FIG. 16I, shaded region 1630 of the field of view of camera 6102 schematically depicts the portion of the physical environment included in surface views 1618-1 and 1618-2. As depicted in FIG. 16I, shaded region 1630 extends past the edge of surface 619 and extends to the torso of user 622. Accordingly, surface views 1618-1 and 1618-2 include an image of the edge of surface 619 and the torso of user 622 (also depicted in FIG. 16H). At FIG. 16I, while displaying video conference interface 6121, John's device 6100-1 detects input 1650*i* (e.g., a cursor input caused by clicking a mouse, tapping on a trackpad, and/or other such input) directed at region control 1628. In response to detecting input 1650*i*, John's device 6100-1 displays video conference interface 6121 that includes an updated surface view, as depicted in FIG. 16J.

Figure 16J:
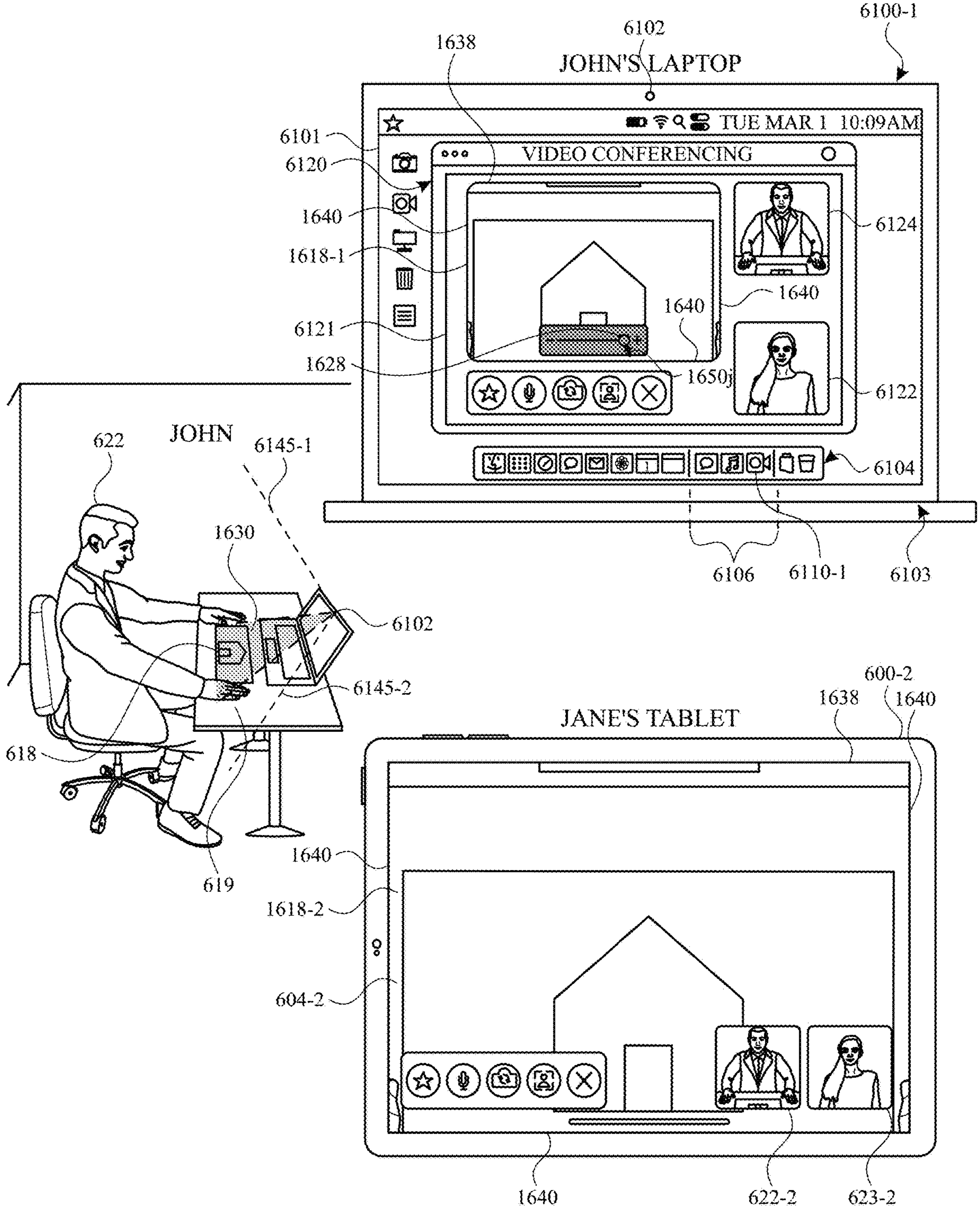

At FIG. 16J, John's device 6100-1 has updated surface view 1618-1 and has caused surface view 1618-2 to be updated. As compared to surface views 1618-1 and 1618-2 of FIG. 16I, surface views 1618-1 and 1618-2 include an image of drawing 618 and do not include an image of a portion of surface 619 positioned between the edge of surface 619 and an edge of the drawing surface of drawing 618. Additionally, surface views 1618-1 and 1618-2 of FIG. 16I no longer include an image of the torso of user 622. The updates to surface views 1618-1 and 1618-2 are also depicted by the change in shaded region 1630. For example, an area of shaded region 1630 in FIG. 16I has changed with respect to the area of shaded region 1630 in FIG. 16J. As depicted, shaded region 1630 in FIG. 16J extends to the edge of the drawing surface of drawing 618 (e.g., as opposed to past the edge of surface 619, as depicted in FIG. 16I).

At FIG. 16J, specific boundaries of surface views 1618-1 and 1618-2 have been expanded while other boundaries have remained fixed (e.g., at a respective position within the field of view). For example, the position of boundary 1638 of surface views 1618-1 and 1618-2 in FIG. 16J are the same as the position of boundary 1638 of surface views 1618-1 and 1618-2 in FIG. 16I. However, the position of boundaries 1640 of surface views 1618-1 and 1618-2 in FIG. 16J have changed as compared to the position of boundaries 1640 of surface views 1618-1 and 1618-2 in FIG. 16I. While displaying video conference interface 6121, John's device 6100-1 detects input 1650*j* (e.g., a cursor input caused by clicking a mouse, tapping on a trackpad, and/or other such input) directed at region control 1628. In response to detecting input 1650*j*, John's device 6100-1 displays video conference interface 6121 that includes an updated surface view, as depicted in FIG. 16K.

Figure 16K:
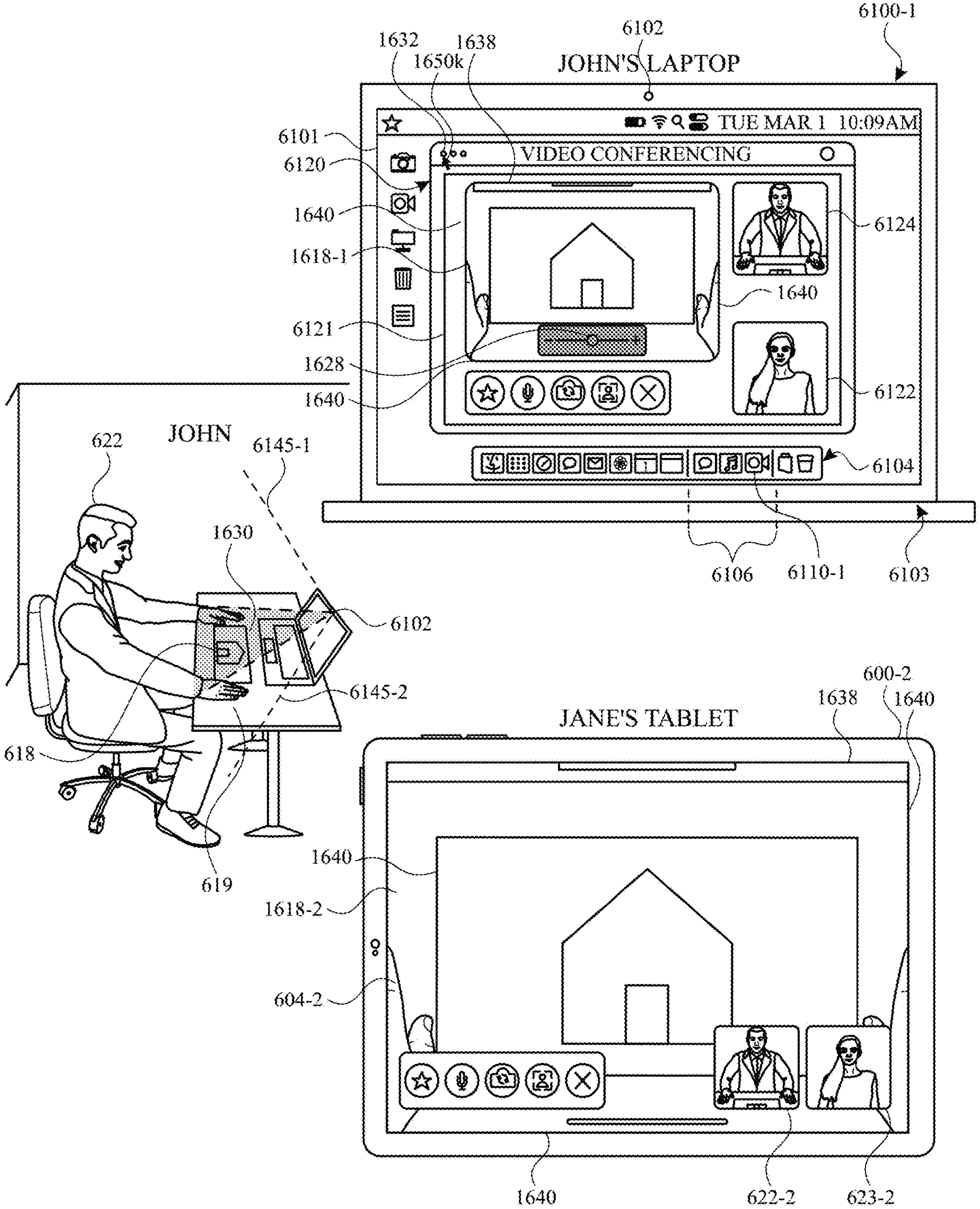

At FIG. 16K, John's device 6100-1 has updated surface view 1618-1 and has caused surface view 1618-2 to be updated. As compared to surface views 1618-1 and 1618-2 of FIG. 16L, surface views 1618-1 and 1618-2 include an image of drawing 618 and includes an image of the portion of surface 619 positioned between the edge of surface 619 and an edge of the drawing surface of drawing 618. The updates surface views 1618-1 and 1618-2 is also depicted by the change in shaded region 1630. For example, an area of shaded region 1630 in FIG. 16K has changed with respect the area of shaded region 1630 in FIG. 16J. As depicted, shaded region 1630 in FIG. 16K extends to the edge of surface 619 (e.g., as opposed to the edge of the drawing surface of drawing 618, as depicted in FIG. 16J).

At FIG. 16K, specific boundaries of surface views 1618-1 and 1618-2 have been expanded while other boundaries have remained fixed (e.g., at a respective position within the field of view). For example, the position of boundary 1638 of surface views 1618-1 and 1618-2 in FIG. 16K are the same as the position of boundary 1638 of surface views 1618-1 and 1618-2 in FIG. 16J. However, the position of boundaries 1640 of surface views 1618-1 and 1618-2 in FIG. 16K have changed as compared to the position of boundaries 1640 of surface views 1618-1 and 1618-2 in FIG. 16J.

At FIG. 16K, while displaying video conference interface 6121, John's device 6100-1 detects input 1650*k* (e.g., a cursor input caused by clicking a mouse, tapping on a trackpad, and/or other such input) directed at close affordance 1632. In response to detecting input 1650*k*, John's device 6100-1 closes video conference interface 6121 (and/or terminates the video conference session with Jane's device 600-2 and/or closes the video conference application).

Figure 16L:
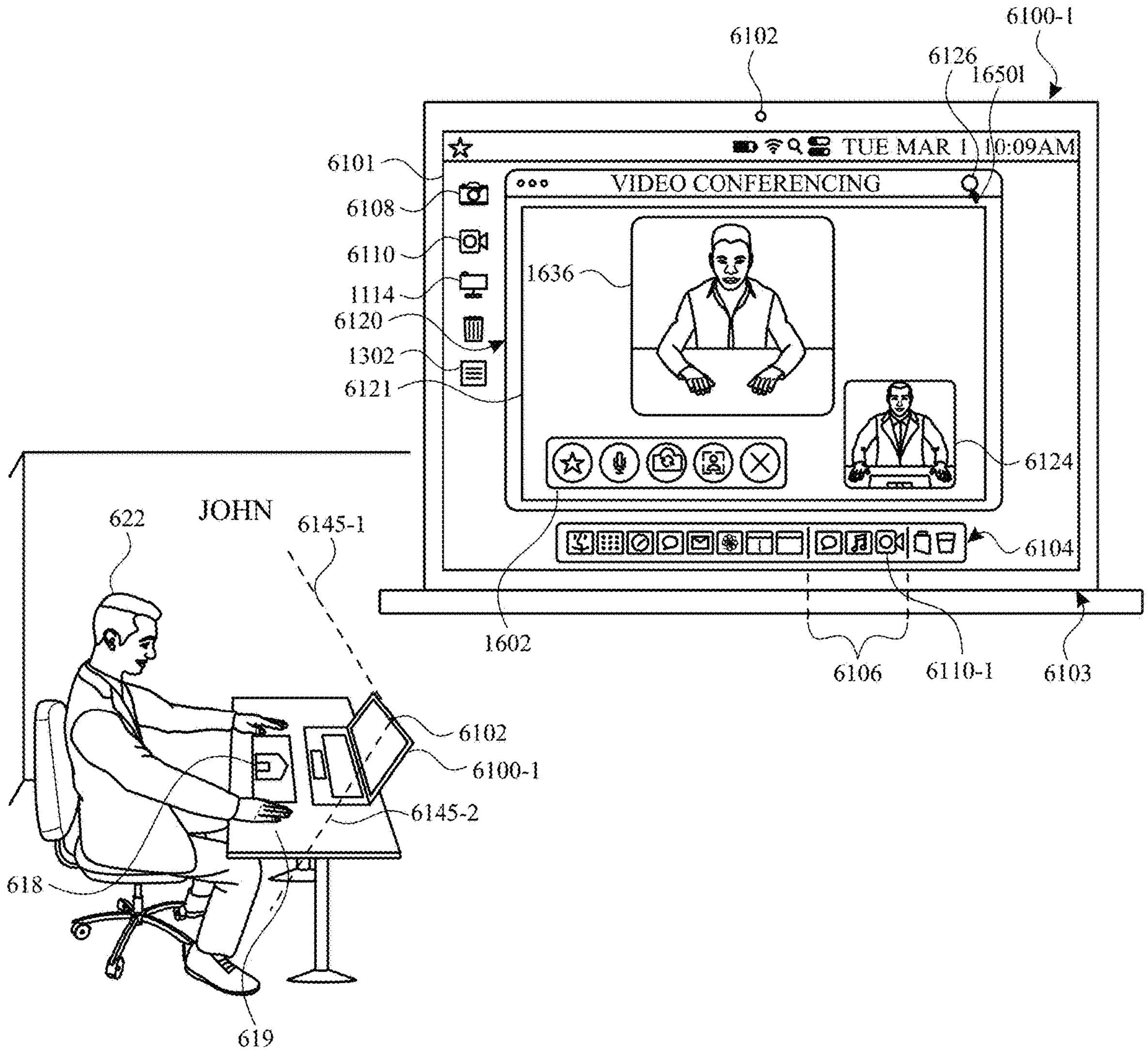

At FIG. 16L, John's device 6100-1 is in a new video communication session. John's device 6100-1 is in a video communication session with Sam's device 1634 (e.g., "Sam's tablet," depicted in FIG. 16O), which includes one or more features of devices 100, 300, 500, and/or 600-2. Video conference interface 6121 includes video feed 1636 of the user of Sam's device 1634. While displaying video conference interface 6121, John's device 6100-1 detects input 16501 (e.g., a cursor input caused by clicking a mouse, tapping on a trackpad, and/or other such input) directed at menu option 6126. In response to detecting input 16501, John's device 6100-1 displays share menu 6136, as shown in FIG. 16M.

Figure 16M:
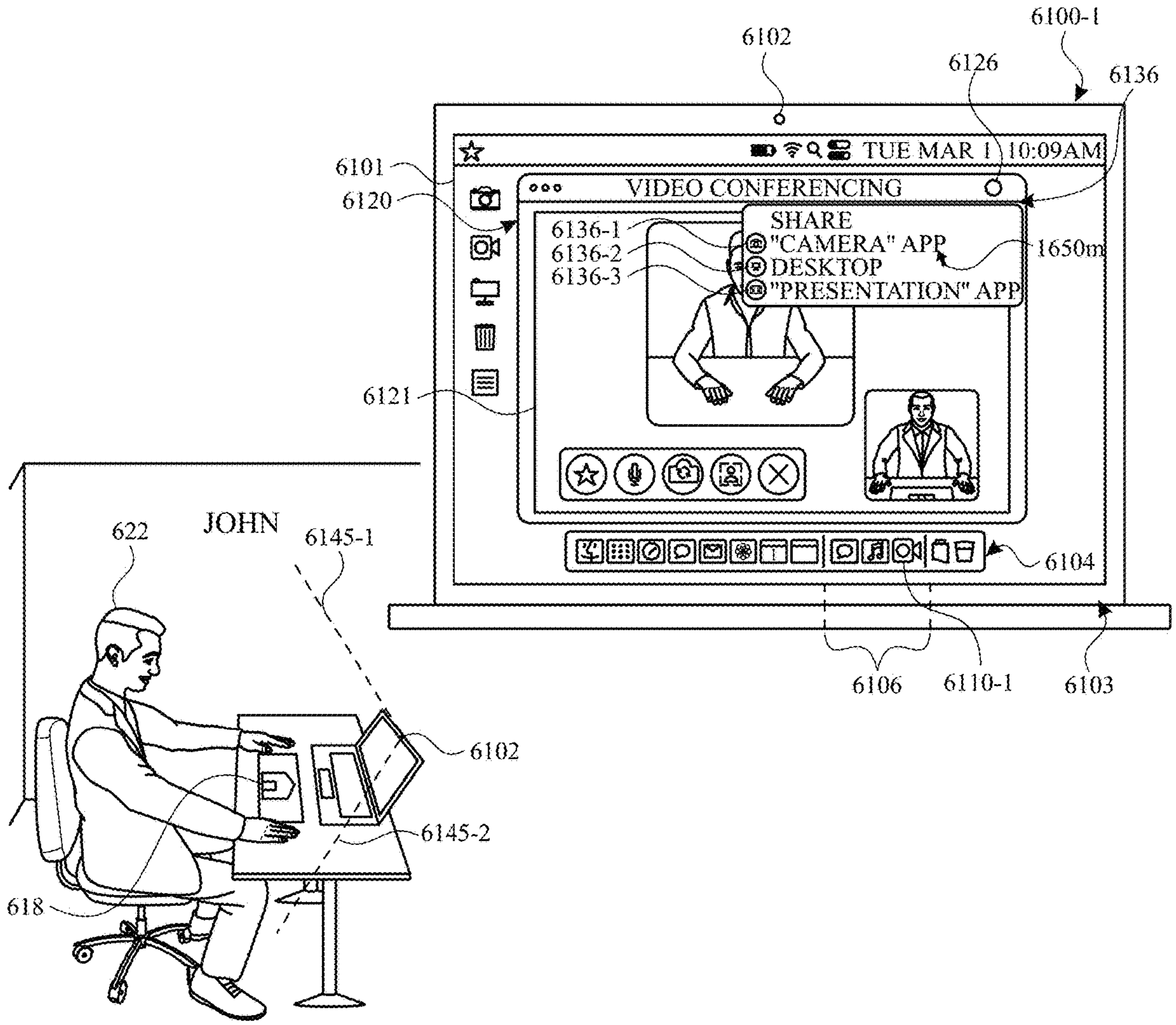

At FIG. 16M, share menu 6136 is similar to share menu 6136 in FIG. 16B. While displaying share menu 6136, John's device 6100-1 detects 1650*m* (e.g., a cursor input caused by clicking a mouse, tapping on a trackpad, and/or other such input) directed at share option 6136-1. In response to detecting input 1650*b*, John's device 6100-1 activates (e.g., re-activates) the camera application and/or preview user interface 1604, as shown in FIG. 16N.

Figure 16N:
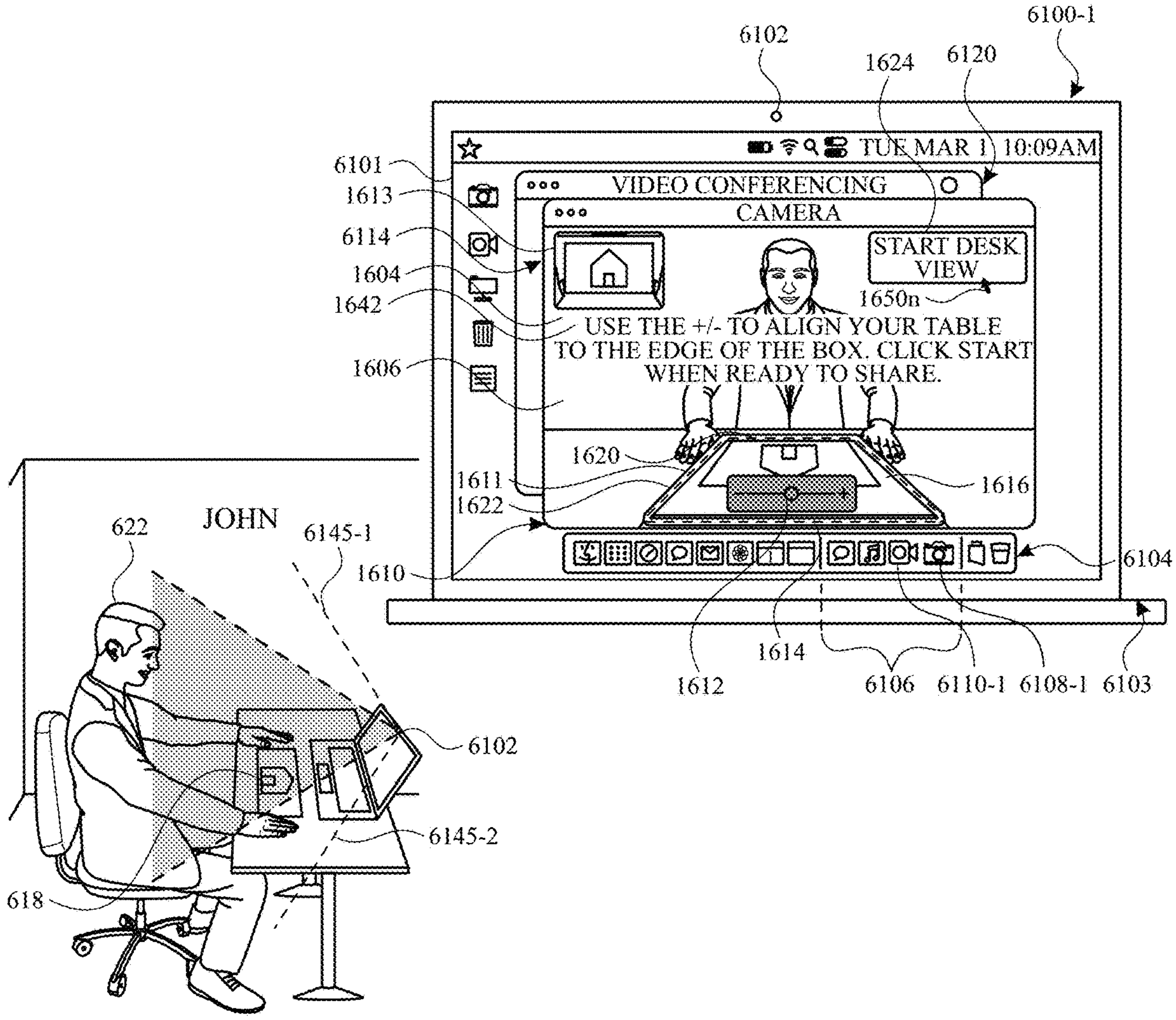
Figure 16O:
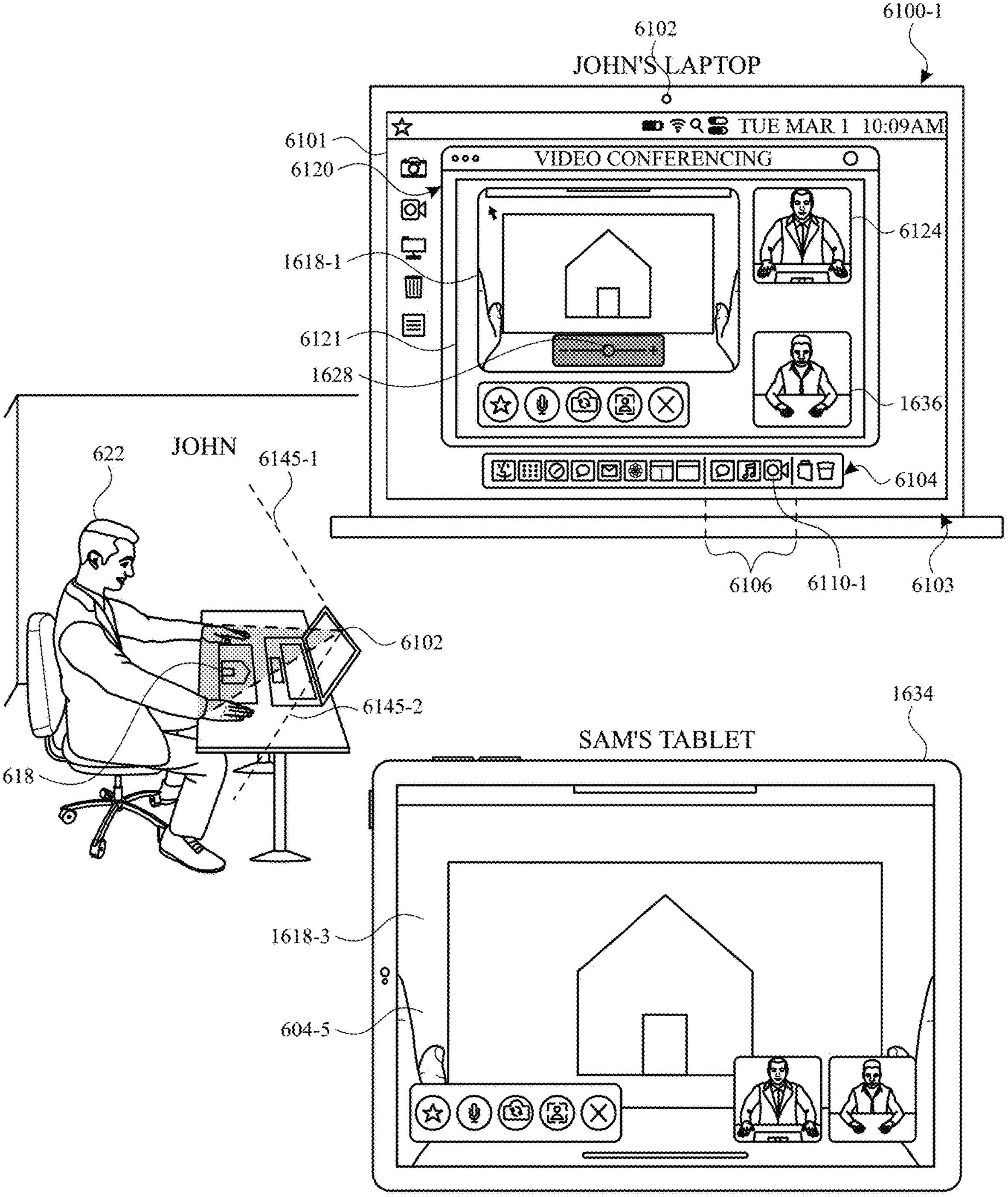

At FIG. 16N, John's device 6100-1 activates (e.g., re-activates) the camera application and/or preview user interface 1604 with recently used settings, such as settings for region control 1628 that were configured in response to input 1650*j* in FIG. 16J. Specifically, region 1616 and/or region indicator 1610 define the same portion of the field of view that was displayed in surface view 1618-1 as depicted in FIG. 16K (e.g., though surface view 1618-1 has been corrected to account for the position of surface 619 and/or drawing 618). For example, edge 1620 of region indicator 1610 is positioned at the edge of surface 619 so as to indicate that drawing 618 and the portion of surface 619 between the edge of surface 619 and the edge of the drawing surface of drawing 618 will be provided as a surface view. Notably, the portion of preview 1606 indicated by region indicator 1610 matches the portion indicated by target area indicator 1611. In some embodiments, as depicted in FIG. 16N (and in contrast to the embodiment illustrated in FIG. 16D), the appearance of region indicator 1610 is not emphasized (e.g., does not change) when region indicator 1610 is aligned with target area indicator 1611 (e.g., the appearance of region indicator 1610 is the same regardless of whether or not region indicator 1610 is aligned with target area indicator 1611).

In some embodiments, the communication session between John's device 6100-1 and Jane's tablet 600-2 was a communication session that was most recent in time to the communication session between John's device 6100-1 and Sam's device 1634 (e.g., there were not intervening communication sessions that included a sharing of a surface view and/or change in a surface view). As such, in some embodiments, John's device 6100-1 activates the settings for region control 1628 (and/or region control 1612 of preview user interface 1604) based on most recent settings for region control 1628 (and/or most recent settings for region control 1612 of preview user interface 1604) that was used for the communication session between John's device 6100-1 and Jane's device 600-2. In some embodiments, John's device 6100-1 detects that there has been no significant change in position, such as a translation, rotation, and/or change in orientation, of camera 6102 and/or John's device 6100-1 (e.g., there has been no change and/or the changes are within a threshold amount of change). In such embodiments, John's device 6100-1 activates the settings for region control 1628 (and/or region control 1612 of preview user interface 1604) based on most recent settings for region control 1628 (and/or most recent settings for region control 1612 of preview user interface 1604) that were used for the communication session between John's device 6100-1 and Jane's device 600-2. Additionally or alternatively, in embodiments where there has been no significant change in position of camera 6102 and/or John's device 6100-1, John's device 6100-1 optionally does not display preview user interface 1604 and, instead, displays a surface view based on the most recent settings for region control 1628 (and/or region control 1612 of preview user interface 1604).

At FIG. 16N, while displaying preview user interface 1604, John's device 6100-1 detects input 1650*n* (e.g., a cursor input caused by clicking a mouse, tapping on a trackpad, and/or other such input) directed at surface view affordance 1624. In response to detecting input 1650*n*, John's device 6100-1 displays surface view 1618-1, as depicted in FIG. 16O. Additionally, John's device 6100-1 causes Sam's device 1634 to display surface view 1618-2 via display 683 (e.g., by communicating image data corresponding to the surface view).

At FIG. 16O, John's device 6100-1 and Sam's device 1634 display surface views 1618-1 and 1618-3, respectively. Surface view 1618-3 is included in video conference interface 604-5 (which is similar to video conference interface 604-2). Additionally, surface views 1618-1 and 1618-3 correspond to the same portion of the field of view included in region 1616 and/or defined by region indicator 1610 in FIG. 16N, though the portion of the field of view has been corrected (e.g., based on a rotation and/or a skew) so as to provide a different perspective than the perspective provided by preview 1606 in FIG. 16N. Additionally, surface views 1618-1 and 1618-3 in FIG. 16O include the same images as surface views 1618-1 and 1618-2 in FIG. 16H based on John's device 6100-1 applying the most recent settings for region control 1628 that were used from the communication session with Jane's device 600-2.

Figure 16P:
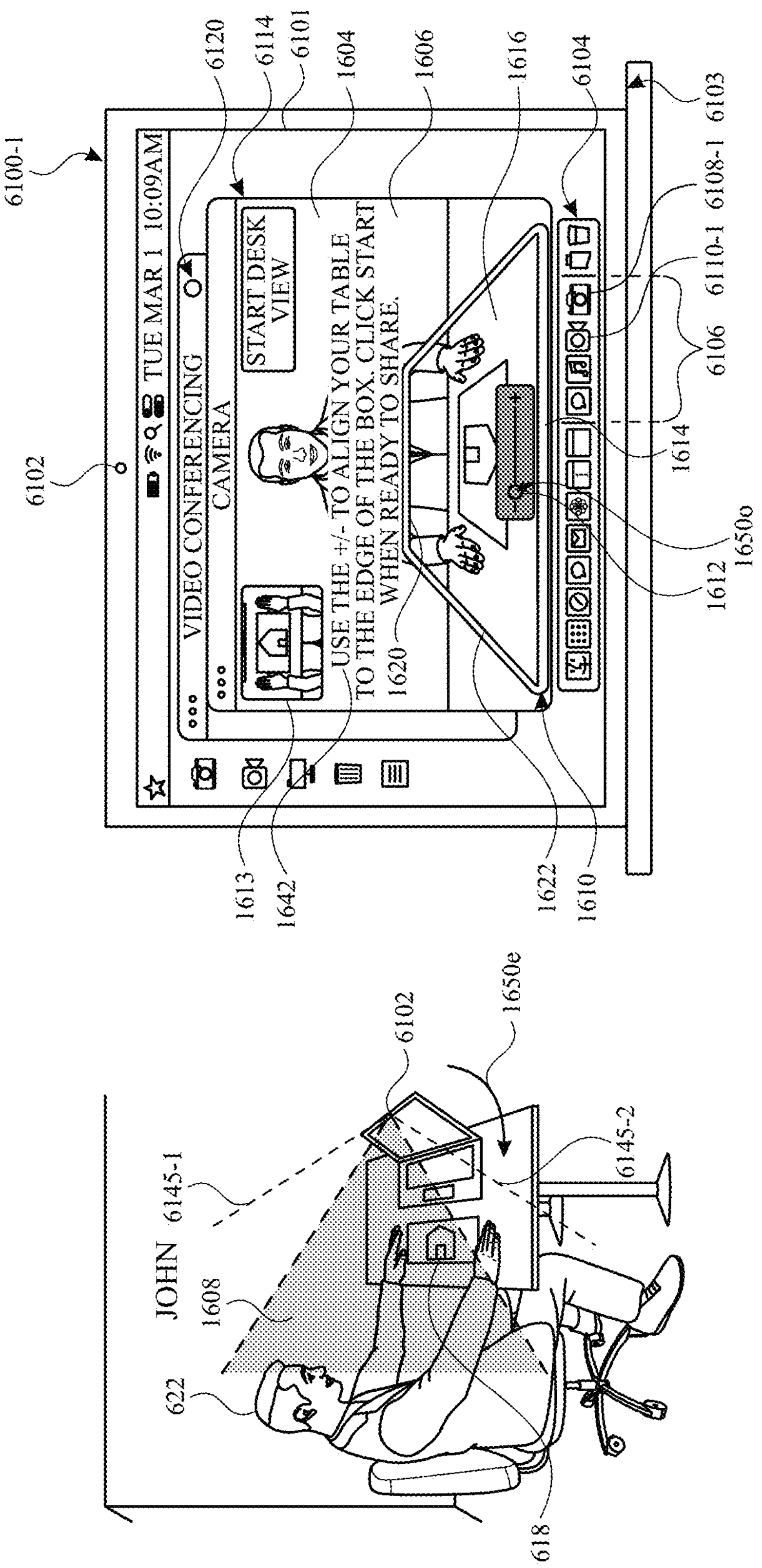
Figure 16Q:
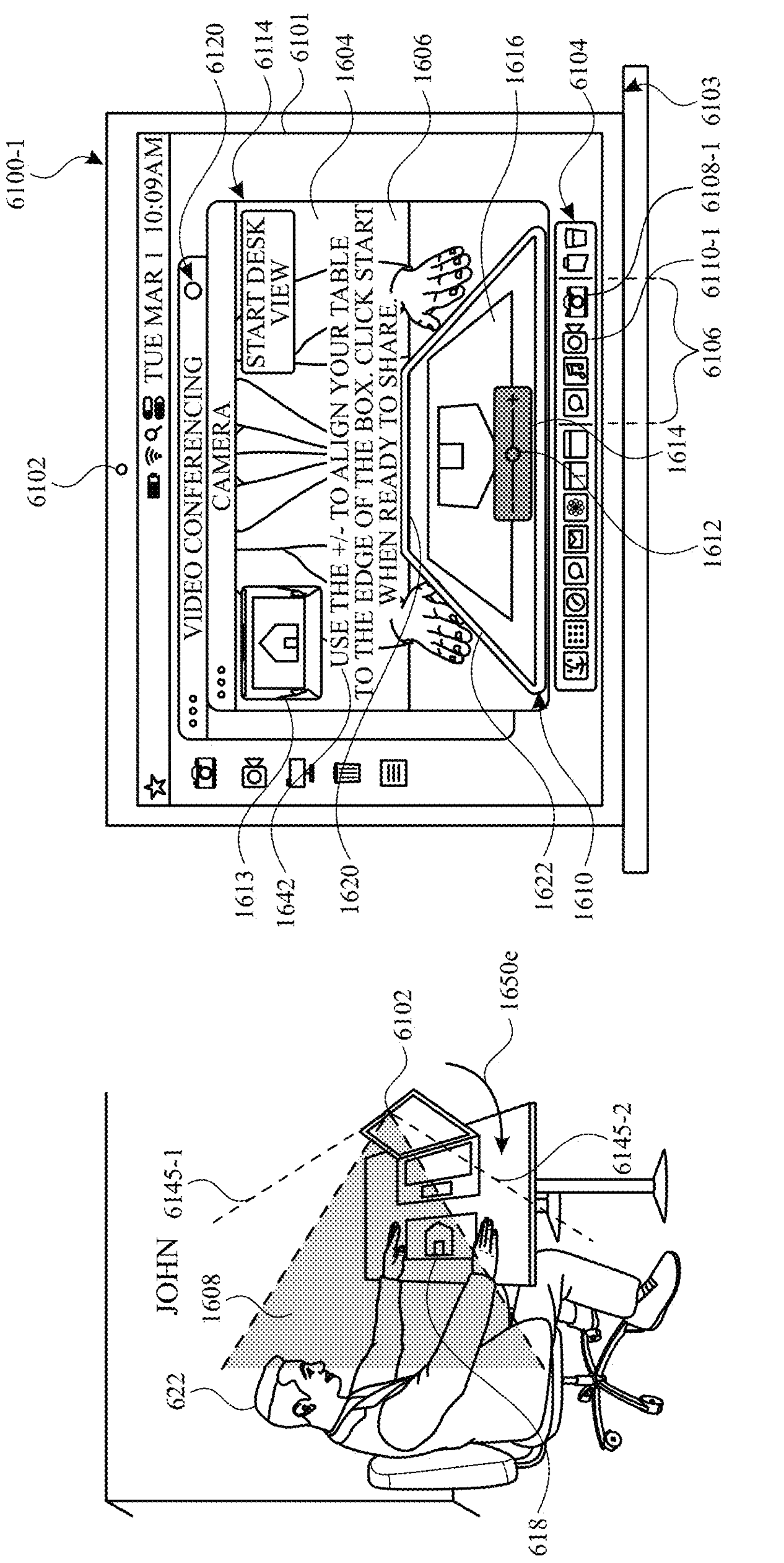

FIG. 16P illustrates the same conditions and preview user interface 1604 depicted in FIG. 16E (except without movement 1650*e* of John's device 6100-1). At FIG. 16P, while displaying preview user interface 1604, John's device 6100-1 detects input 1650*o* (e.g., a cursor input caused by clicking a mouse, tapping on a trackpad, and/or other such input) directed at region control 1612. In some embodiments, in response to detecting input 1650*o*, John's device 6100-1 displays preview user interface 1604 as depicted in FIG. 16Q.

At FIG. 16Q, John's device 6100-1 zooms in preview 1606 while maintaining the position (e.g., location and size) of region indicator 1610 relative to preview user interface 1604. For example, the face of user 622 is no longer included in preview 1606, compared to preview 1606 in FIG. 16P, while region indicator 1610 is the same size relative to preview user interface 1604. As a result, region indicator 1610 indicates that a new portion of the physical environment represented in preview 1606 will be included as a surface view. In some embodiments, as depicted in FIG. 16Q, John's device 6100-1 zooms around a center point of preview 1606 (e.g., preview 1606 is centered on the same point of the physical environment before and after zooming). In some embodiments, John's device 6100-1 zooms relative to an edge or line of preview 1606 (e.g., the same portion of the physical environment is at the bottom edge of preview 1606 before and after zooming). Notably, zooming preview 1606 in and out while maintaining the size of region indicator 1610 is an alternative method to changing the size of region indicator 1610 while maintaining the zoom level of preview 1606 for adjusting the portion of the physical environment represented in preview 1606 that will be included as a surface view.

FIG. 17 is a flow diagram illustrating a method for managing a live video communication session in accordance with some embodiments. Method 1700 is performed at a first computer system (e.g., 100, 300, 500, 600-1, 600-2, 600-3, 600-4, 906*a*, 906*b*, 906*c*, 906*d*, 6100-1, 6100-2, 1100*a*, 1100*b*, 1100*c*, and/or 1100*d*) (e.g., a smartphone, a tablet computer, a laptop computer, a desktop computer, and/or a head mounted device (e.g., a head mounted augmented reality and/or extended reality device)) that is in communication with a display generation component (e.g., 601, 683, and/or 6101) (e.g., a display controller, a touch-sensitive display system, a monitor, and/or a head mounted display system), one or more cameras (e.g., 602, 682, 6102, and/or 6202) (e.g., an infrared camera, a depth camera, and/or a visible light camera), and one or more input devices (e.g., 6103, 601, and/or 683) (e.g., a touch-sensitive surface, a keyboard, a controller, and/or a mouse). Some operations in method 1700 are, optionally, combined, the orders of some operations are, optionally, changed, and some operations are, optionally, omitted.

As described below, method 1700 provides an intuitive way for managing a live video communication session. The method reduces the cognitive burden on a user to manage a live video communication session, thereby creating a more efficient human-machine interface. For battery-operated computing devices, enabling a user to manage a live video communication session faster and more efficiently conserves power and increases the time between battery charges.

In method 1700, the first computer system detects (1702), via the one or more input devices, one or more first user inputs (e.g., 1650*a* and/or 1650*b*) (e.g., a tap on a touch-sensitive surface, a keyboard input, a mouse input, a trackpad input, a gesture (e.g., a hand gesture), and/or an audio input (e.g., a voice command)) corresponding to a request (e.g., a first request) to display a user interface (e.g., 1606) of an application (e.g., the camera application associated with camera application icon 6136-1 and/or the video conferencing application associated with video conferencing application icon 6110) for displaying a visual representation (e.g., 1606) (e.g., a still image, a video, and/or a live camera feed captured by the one or more cameras) of a surface (e.g., 619 and/or 618) that is in a field of view of the one or more cameras (e.g., a physical surface; a horizontal surface, such as a surface of a table, floor, and/or desk; a vertical surface, such as a wall, whiteboard, and/or blackboard; a surface of an object, such as a book, a piece of paper, a display of tablet; and/or other surfaces). In some embodiments, the application (e.g., a camera application and/or a surface view application) provides the image of the surface to be shared in a separate application (e.g., a presentation application, a video communications application, and/or an application for providing an incoming and/or outgoing live audio/video communication session). In some embodiments, the application that displays the image of the surface is capable of sharing the image of the surface (e.g., without a separate video communication application).

In response (1704) to detecting the one or more first user inputs and in accordance with a determination that a first set of one or more criteria is met (e.g., 6100-1 and/or 6102 has moved; 1610 and/or 1616 has not been previously defined; a request to display 6100-1 and/or 6102 is detected; and/or 1610 and/or 1616 are automatically displayed unless one or more conditions are satisfied, including a condition that a setting corresponding to a request not to display 1610 and/or 1616 has been enabled), the first computer system concurrently displays (1706), via the display generation component, a visual representation (1708) (e.g., 1616) of a first portion of the field of view of the one or more cameras and a visual indication (1710) (e.g., 1606 and/or visual emphasis of 1616) (e.g., a highlight, a shape, and/or a symbol) (e.g., a first indication) that indicates a first region (e.g., 1616) of the field of view of the one or more cameras that is a subset of the first portion of the field of view of the one or more cameras, wherein the first region indicates a second portion (e.g., portion of the field of view in region 1616) of the field of view of the one or more cameras that will be presented as a view of the surface (e.g., 1618-1, 1618-2, and/or 1618-3) by a second computer system (e.g., 100, 300, 500, 600-1, 600-2, 600-4, 1100*a*, 1634, 6100-1, and/or 6100-2) (e.g., a remote computer system, an external computer system, a computer system associated with a user different from a user associated with the first computer system, a smartphone, a tablet computer, a laptop computer, desktop computer, and/or a head mounted device). In some embodiments, the first set of one or more criteria includes a criterion that the user has not previously defined a region of the field of view that will be presented as a view of a surface by an external computer system. In some embodiments, the first set of one or more criteria includes a criterion that the one or more cameras has exceeded a threshold amount of change in position (e.g., a change in location in space, a change in orientation, a translation, and/or a change of a horizontal and/or vertical angle). In some embodiments, the first computer system displays the portion of the image data that will be displayed by the second computer system with a first degree of emphasis (e.g., opacity, transparency, translucency, darkness, and/or brightness) relative to at least a portion the image data that will not by the second computer system. In some embodiments, in response to detecting one or more inputs, the first computer system displays a second indication of a second portion of the image data different from the first portion of the image data will be displayed by the second computer system. In some embodiments, the indication is overlaid on the displayed image data. In some embodiments, the indication is displayed over at least a portion of the displayed image data that includes the surface. In some embodiments, the surface is positioned between the user and the one or more cameras. In some embodiments, the surface is positioned to beside (e.g., to the left or right) the user. In some embodiments, in accordance with a determination that the first set of one or more criteria is not met, the first computer system forgoes displaying the user interface of the application for sharing the image of the surface that is in the field of view of the one or more cameras, including not displaying (e.g., within the user interface) the image data captured by the one or more cameras and the indication of the portion of the image data that will be displayed by the second computer system. Concurrently displaying the visual representation of the first portion of the field of view and the visual indication that indicates the first region of the field of view that is a subset of the first portion of the field of view, where the first region indicates the second portion of the field of view will be presented as a view of the surface by the second computer system, enhances a video communication session experience because it provides visual feedback of what portion of the field of view will be shared and improves security of what content is shared in a video communication session since a user can view what area of a physical environment will be shared as visual content.

In some embodiments, the visual representation of the first portion of the field of view of the one or more cameras and the visual indication of the first region of the field of view is concurrently displayed while the first computer system is not sharing (e.g., not providing for display, not transmitting, and/or not communicating to an external device) the second portion of the field of view of the one or more cameras with the second computer system (e.g., 6100-1 is not sharing 1616, 1618-1, 1618-2, and/or 1618-3). Concurrently displaying the visual representation of the first portion of field of view of the one or more cameras and the visual indication of the first region of the field of view enhances a video communication session experience because it provides a preview of what portion of the field of view that will be shared as a surface view, which provides improved security regarding what area of a physical environment will be shared in a video communication session prior to sharing the surface view and provides improved visual feedback about what will be presented by the second computer system.

In some embodiments, the second portion of the field of view of the one or more cameras includes an image of a surface (e.g., image of 619) (e.g., a substantially horizontal surface and/or a surface of a desk or table) that is positioned between the one or more cameras and a user (e.g., 622 and/or 623) in the field of view of the one or more cameras. In some embodiments, the surface is in front of the user. In some embodiments, the surface is within a predetermined angle (e.g., 70 degrees, 80 degrees, 90 degrees, 100 degrees, or 110 degrees) of the direction of gravity. Because the second portion of the field of view of the one or more cameras includes an image of a surface that is positioned between the one or more cameras and a user in the field of view of the one or more cameras, a user can share a surface view of a table or desk, which improves a video communication session experience since it offers a view of particular surfaces in specific locations and/or improves how users communicate, collaborate, or interact in a video communication session.

In some embodiments, the surface includes (e.g., is) a vertical surface (e.g., as described in reference to FIG. 16C) (e.g., a wall, easel, and/or whiteboard) (e.g., the surface is within a predetermined angle (e.g., 5 degrees, 10 degrees, or 20 degrees) of being parallel to the direction of gravity). Because the surface includes a vertical surface, a user can share a surface view of different vertical surfaces, such as a wall, easel, or whiteboard, which improves a video communication session experience by offering a view of surfaces having a specific orientations and/or improves how users communicate, collaborate, or interact in a video communication session.

In some embodiments, the view of the surface that will be presented by the second computer system includes an image (e.g., photo, video, and/or live video feed) of the surface that is (or has been) modified (e.g., to correct distortion of the image of the surface) (e.g., adjusted, manipulated, and/or corrected) based on a position (e.g., location and/or orientation) of the surface relative to the one or more cameras (e.g., as described in greater detail with reference to FIGS. 6A-6AY and FIG. 7) (e.g., surface views 1618-1, 1618-2, and 1618-3 have been modified based on a position of drawing 618). In some embodiments, the image of the surface is based on image data that is modified using image processing software (e.g., skewing, rotating, flipping, and/or otherwise manipulating image data captured by the one or more cameras). In some embodiments, the image of the surface is modified without physically adjusting the camera (e.g., without rotating the camera, without lifting the camera, without lowering the camera, without adjusting an angle of the camera, and/or without adjusting a physical component (e.g., lens and/or sensor) of the camera). In some embodiments, the image of the surface is modified such that the one or more cameras appear to be pointed at the surface (e.g., facing the surface, aimed at the surface, pointed along an axis that is normal to the surface). In some embodiments, the image of the surface displayed in the second representation is corrected such that the line of sight of the camera appears to be perpendicular to the surface. In some embodiments, the image of the surface is automatically modified in real time (e.g., during a live video communication session). Including an image of the surface that is modified based on a position of the surface relative to the one or more cameras in the view of the surface that will be presented by the second computer system improves a video communication session experience by providing a clearer view of the surface despite its position relative to the camera without requiring further input from the user, reducing the number of inputs needed to perform an operation that provides a corrected view of a surface, and/or improves how users communicate, collaborate, or interact in a video communication session.

In some embodiments, the first portion of the field of view of the one or more cameras includes an image (e.g., 1616) of a user (e.g., 622 and/or 623) in the field of view of the one or more cameras. Including an image of a user in the first portion of field of view of the one or more cameras improves a video communication session experience by providing improved feedback of portions of the field of view are captured by the one or more cameras.

In some embodiments, after detecting a change in position of the one or more cameras (e.g., 1650*e* and/or 1650*f*), the first computer system concurrently displays, via the display generation component (and, optionally, based on the change in position of the one or more cameras) (e.g., before or after concurrently displaying the visual representation of the first portion of the field of view of the one or more cameras and the visual indication): a visual representation of a third portion (e.g., 1606 of FIG. 16E and/or 1606 of FIG. 16F) (e.g., the first portion or a portion different from the first portion) of the field of view of the one or more cameras and the visual indication, wherein the visual indication indicates a second region (e.g., 1616 of FIG. 16E and/or 1616 of FIG. 16F) (e.g., the first region or a region different from the first region) of the field of view of the one or more cameras that is a subset of the third portion of the field of view of the one or more cameras, wherein the second region indicates a fourth portion (e.g., 1616 of FIG. 16E and/or 1616 of FIG. 16F) (e.g., the second portion or a portion different from the second portion) of the field of view of the one or more cameras that will be presented as a view of the surface by the second computer system. In some embodiments, based on a change in position of the one or more cameras, the one or more cameras captures a different portion of a physical environment that is not captured while displaying the visual representation of the first portion of field of view of the one or more cameras. In some embodiments, the third portion (and/or the fourth portion) of the field of view includes an image of the different portion of the physical environment. In some embodiments, the first computer system ceases to display the visual representation of the first portion of the field of view while the visual representation of the third portion is displayed. Concurrently displaying a visual representation of a third portion of the field of view of the one or more cameras and the visual indication, where the visual indication indicates a second region of the field of view of the one or more cameras that is a subset of the third portion of the field of view of the one or more cameras, and where the second region indicates a fourth portion of the field of view of the one or more cameras that will be presented as a view of the surface by the second computer system, improves a video communication session experience because it provides a visual indication of what portion of the field of view will be shared in response to detecting a change in position of the one or more cameras is detected and improves security of what content is shared in a video communication session since a user can view what area of a physical environment will be shared as visual content.

In some embodiments, while the one or more cameras are substantially stationary (e.g., stationary or having moved less than a threshold amount) and while displaying the visual representation of the first portion of the field of view of the one or more cameras and the visual indication (e.g., and/or before or after concurrently displaying the visual representation of the third portion of the field of view of the one or more cameras and the visual indication), the first computer system detects, via the one or more user input devices, one or more second user inputs (e.g., 1650*c* and/or 1650*d*) (e.g., corresponding to a request to change the portion of the field of view of the one or more cameras that is indicated by the visual indication). In some embodiments, in response to detecting the one or more second user inputs and while the one or more cameras remain substantially stationary, the first computer system concurrently displays, via the display generation component the visual representation of the first portion of the field of view and the visual indication, wherein the visual indication indicates a third region (e.g., 1616 of FIG. 16D and/or 1616 of FIG. 16E) of the field of view of the one or more cameras that is a subset of the first portion of the field of view of the one or more cameras, wherein the third region indicates a fifth portion (e.g., 1616 of FIG. 16D and/or 1616 of FIG. 16E) of the field of view, different from (e.g., larger than or smaller than) the second portion (and/or the fourth portion), that will be presented as a view of the surface by the second computer system. In some embodiments, the first computer system changes the portion of the field of view that is indicated by the visual indication in response to user input. In some embodiments, the visual representation of the first portion of the field of view is displayed without a change in position of the one or more cameras. Concurrently displaying the visual representation of the first portion of the field of view and the visual indication in response to detecting the one or more second user inputs, where the visual indication indicates a third region of the field of view of the one or more cameras that is a subset of the first portion of the field of view of the one or more cameras, where the third region indicates a fifth portion, different from the second portion, of the field of view that will be presented as a view of the surface by the second computer system improves a video communication session experience because it provides a visual indication of what portion of the field of view will be shared and improves security of what content is shared in a video communication session since a user can adjust what area of a physical environment will be shared as visual content.

In some embodiments, while displaying the visual representation of the first portion of the field of view of the one or more cameras and the visual indication, the first computer system detects, via the one or more user input devices, a user input (e.g., 1650*c* and/or 1650*d*) directed at a control (e.g., 1612) (e.g., a selectable control, a slider, and/or option picker) that includes a set (e.g., a continuous set or a discrete set) of options (e.g., sizes, dimensions, and/or magnitude) for the visual indication. In some embodiments, in response to detecting the user input directed at the control, the first computer system displays (e.g., changes, updates, and/or modifies) the visual indication to indicate a fourth region (e.g., 1616 of FIG. 16D and/or 1616 of FIG. 16E) of the field of view of the one or more cameras that includes a sixth portion (e.g., 1616 of FIG. 16D and/or 1616 of FIG. 16E) of the field of view, different from (e.g., larger or smaller than) the second portion, that will be presented as a view of the surface by the second computer system. In some embodiments, at least a portion of fourth region is included in (e.g., overlaps with) at least a portion of the second region. In some embodiments, at least a portion of the fourth region is not included in (e.g., does not overlap with) at least a portion of the second region. In some embodiments, the fourth region is larger (or, optionally, smaller) than the second region. In some embodiments, in response to detecting the user input directed at the control, a dimension of the visual indication is updated to indicate that the fourth region includes the sixth portion of the field of view. In some embodiments, the set of options for the visual indication corresponds to a set of dimensions for the visual indication. In some embodiments, the set of dimensions correspond discrete regions of a portion of the field of view that will be presented as a view of the surface. Displaying, responsive to detecting user input directed at the control, the visual indication to indicate a fourth region of the field of view of the one or more cameras that includes a sixth portion of the field of view, different from the second portion, that will be presented as a view of the surface by the second computer system improves a video communication session experience because it provides a visual indication of what portion of the field of view will be shared and improves security of what content is shared in a video communication session since a user can adjust what area of a physical environment will be shared as visual content.

In some embodiments, in response to detecting the user input directed at the control, the first computer system maintains a position (e.g., relative to the field of view of the one or more cameras) of a first portion (e.g., 1614, and as described in reference to FIG. 16D and/or 1606 of FIG. 16E) (e.g., edge and/or boundary) of a boundary of the sixth portion of the field of view that will be presented as a view of the surface by the second computer system (or, optionally, in response to detecting the user input directed at the control, the first computer system maintains a position of a first edge of a region indicated by the visual indication). In some embodiments, in response to detecting the user input directed at the control, the first computer system modifies a position (e.g., relative to the field of view of the one or more cameras) of a second portion (e.g., 1622 and/or 1620, and as described in reference to FIG. 16D and/or 1606 of FIG. 16E) (e.g., edge and/or boundary) of the boundary of the sixth portion of the field of view that will be presented as a view of the surface by the second computer system (or, optionally, in response to detecting the user input directed at the control, the first computer system modifies a position of a second edge (e.g., different from the first edge) of the region indicated by the visual indication). In some embodiments, the first computer system modifies (e.g., enlarges and/or shrinks) the portion of the field of view that will be presented as a view of the surface by the second computer system while the first computer system maintains the position of the first portion of the boundary and modifies the position of the second portion of the boundary. In some embodiments, a first boundary for the sixth portion of the field of view is in the same and/or similar position as (e.g., with respect to the field of view) (e.g., and/or is within a threshold distance of) a first boundary for the second portion of the field of view. In some embodiments, a second boundary for the sixth portion of the field of view is in a different position (e.g., with respect to the field of view) than a second boundary for the second portion of the field of view. In some embodiments, in response to detecting the user input directed at the control, the first computer system maintains a position of a first portion of the visual indication and modifies a position of a second portion of the visual indication. In some embodiments, the first computer system expands (e.g., enlarges and/or increases a size of) the first portion of the visual indication while the position of the first portion of the visual indication is maintained (e.g., the visual indication maintains the same shape while changing size, and an edge of the visual indication remains in a fixed position relative to the field of view of the one or more cameras). In some embodiments, the first computer system expands (e.g., enlarges and/or increases a size of) the second portion of the visual indication while the position of the second portion of the visual indication is modified (e.g., the visual indication maintains the same shape while changing size, and a position of an edge of the visual indication is modified relative to the field of view of the one or more cameras). In some embodiments, the first computer system maintains the position of the first portion of the visual indication relative to visual content of the visual representation of the first portion of field of view of the one or more cameras. In some embodiments, the first computer system modifies the position of the second portion of the visual indication relative to the visual content of the visual representation of the first portion of field of view of the one or more cameras. Maintaining a position of a first portion of the visual indication and modifying a position of a second portion of the visual indication in response to detecting user input directed at the control improves a video communication session experience and provides additional control options because it allows at least one portion of the visual indication to remain fixed as a user adjusts what portion of the field of view will be shared in the communication session.

In some embodiments, the first portion of the visual indication corresponds to an upper most edge (e.g., 1614) of the second portion of the field of view that will be presented as the view of the surface by the second computer system. In some embodiments, the first portion of visual indication corresponds to a lower most edge of the visual indication. When the first portion of the visual indication corresponds to an upper most edge of the second portion of the field of view that will be presented as the view of the surface by the second computer system, it improves a video communication session experience and provides additional control options because it allows at least the upper most edge of the visual indication to remain fixed as a user adjusts what portion of the field of view will be shared in the communication session.

In some embodiments, the first portion of the field of view of the one or more cameras and the second portion of the field of view of the one or more cameras that will be presented as the view of the surface by the second computer system is based on image data captured by a first camera (e.g., 6102 is a wide angle camera) (e.g., a wide angle camera and/or a single camera). In some embodiments, the field of view of the first camera includes the surface and a face of a user. Basing the first portion of the field of view of the one or more cameras and the second portion of the field of view of the one or more cameras that will be presented as the view of the surface by the second computer system on the image data captured by the first camera enhances the video communication session experience because different portions of the field of view can be displayed based on image data from the same camera without requiring further input from the user, which improves how users collaborate and/or communicate during a live communication session and reduces the number of inputs (and/or devices) needed to perform an operation. Basing the first portion of the field of view of the one or more cameras and the second portion of the field of view of the one or more cameras that will be presented as the view of the surface by the second computer system on the image data captured by the first camera improves the computer system because a user can view which portions of the field of view of a single will can be presented at a different angle without requiring further action from the user (e.g., moving the camera), and doing so reduces the number devices needed to perform an operation, the computer system does not need to have two separate cameras to capture different views, and/or the computer system does not need a camera with moving parts to change angles, which reduces cost, complexity, and wear and tear on the device.

In some embodiments, the first computer system detects, via the one or more user input devices, one or more third user inputs (e.g., 16501 and/or 1650*b*) corresponding to a request (e.g., a second request) to display (e.g., re-display) the user interface of the application for displaying a visual representation (e.g., 1606) of a surface (e.g., 619) that is in the field of view of the one or more cameras. In some embodiments, in response to detecting the one or more third user inputs and in accordance with a determination that the first set of one or more criteria is met, the first computer system concurrently displays, via the display generation component, a visual representation of a seventh portion (e.g., 1606 in FIG. 16N) of the field of view of the one or more cameras (e.g., the same and/or different from the first portion of the field of view) and a visual indication (e.g., 1606 and/or visual emphasis of 1616 in FIG. 16N) that indicates a fifth region (e.g., 1610 and/or 1616 in FIG. 16N) of the field of view of the one or more cameras that is a subset of the seventh portion of the field of view of the one or more cameras, wherein the fifth region indicates an eighth portion (e.g., 1616 in FIG. 16N) (e.g., the same and/or different from the second portion) of the field of view of the one or more cameras that will be presented as a view of the surface by a third computer system (e.g., 1634) different from the second computer system (e.g., a remote computer system, an external computer system, a computer system associated with a user different from a user associated with the first computer system, a smartphone, a tablet computer, a laptop computer, desktop computer, and/or a head mounted device). In some embodiments, the first computer system detects the one or more third user inputs after ceasing to display the visual representation of the first portion of field of view and the visual indication. In some embodiments, the first computer system ceases to display the first portion of field of view and the visual indication in response to detecting one or more user inputs corresponding to a request to close the application. In some embodiments, the second request to display the user interface is detected after the first computer system ceases to provide the second region for display at the second computer system. Concurrently displaying a visual representation of the seventh portion of the field of view and the visual indication that indicates the fifth region of the field of view that is a subset of the seventh portion of the field of view, where the fifth region indicates the eighth portion of the field of view will be presented as a view of the surface by the third computer system, enhances a video communication session experience because it provides visual feedback of what portion of the field of view will be shared for multiple different invocations the user interface of the application and improves security of what content is shared in a video communication session since a user can view what area of a physical environment will be shared as visual content.

In some embodiments, a visual characteristic (e.g., a scale, a size, a dimension, and/or a magnitude) of the visual indication is user-configurable (e.g., 1616 and/or 1610 is user-configurable) (e.g., adjustable and/or modifiable) (e.g., when a user desires to change what region of the field of view will be (e.g., is) presented as a surface view by a remote computer system), and wherein the first computer system displays the visual indication that indicates the fifth region as having a visual characteristic that is based on a visual characteristic of the visual indication that was used during a recent use (e.g., a most recent use and/or a recent use that corresponds to a use during a most recent communication session to a current communication session) of the one or more cameras to present as a view of the surface by a remote computer system (e.g., 1616 and/or 1610 in FIG. 16N is based on 1628 of FIG. 16K) (e.g., a most recently configured visual characteristic of the visual indication) (or, optionally, a region provided) (e.g., the region (e.g., the size of the region) indicated by the visual indication is based on a previous characteristic of the region) (e.g., a preview is displayed with a first zoom setting; a user changes the zoom to a second zoom setting; the user closes the preview; and the preview is relaunched with the second zoom setting as opposed to the first zoom setting). In some embodiments, in accordance with a determination that a most recently configured visual characteristic of the visual indication (or, optionally a visual characteristic of a region that indicates a portion of the field of view that will be presented as a view of the surface by an external computer system) corresponds to a first visual characteristic, display the visual indication that indicates the fourth region with the first visual characteristic. In some embodiments, in accordance with a determination that a most recently configured visual characteristic of the visual indication (or, optionally a visual characteristic of a region that indicates a portion of the field of view that will be presented as a view of the surface by an external computer system) corresponds to a second visual characteristic, display the visual indication that indicates the fourth region with the second visual characteristic. When a visual characteristic of the visual indication is user-configurable and when the visual indication that indicates the fourth region as having a visual characteristic that is based on a most recently configured visual characteristic of the visual indication, it enhances a video communication session experience and reduces the number of user inputs because the visual characteristic of the visual indication will be remembered between multiple different invocations the user interface of the application for displaying a visual representation of a surface.

In some embodiments, while displaying the visual representation of the first portion of the field of view of the one or more cameras and the visual indication, the first computer system detects, via the one or more user input devices, one or more fourth user inputs (e.g., 1650*c* and/or 1650*d*) corresponding to a request to modify a visual characteristic (e.g., a scale, a size, a dimension, and/or a magnitude) of the visual indication. In some embodiments, in response to detecting the one or more fourth user inputs, the first computer system displays (e.g., changes, updates, and/or modifies) the visual indication to indicate a sixth region (e.g., 1616 of FIG. 16D and/or 1616 of FIG. 16E) of the field of view of the one or more cameras that includes a ninth portion (e.g., 1616 of FIG. 16D and/or 1616 of FIG. 16E), different from (e.g., larger or smaller than) the second portion, of the field of view that will be presented as a view of the surface by the second computer system. In some embodiments, while displaying the visual indication to indicate the sixth region of the field of view of the one or more cameras that includes the ninth portion of the field of view will be presented as a view of the surface by the second computer system, the first computer system detects one or more user inputs (e.g., 1650*g*) corresponding to a request to share (e.g., communicate and/or transmit) a view of the surface. In some embodiments, in response to detecting the one or more user inputs corresponding to a request to share a view of the surface, the first computer system shares the ninth portion of the field of view for presentation by the second computer system (e.g., 1618-1 and/or 1618-2). Displaying the visual indication to indicate a sixth region of the field of view of the one or more cameras that includes a ninth portion, different from the second portion, of the field of view that will be presented as a view of the surface by the second computer system and sharing the ninth portion of the field of view for presentation by the second computer system in response to detecting user inputs improves security of what content is shared in a video communication session since a user can view what area of a physical environment will be shared as visual content and improves how users communicate, collaborate, or interact in a video communication session.

In some embodiments, in response to detecting the one or more first user inputs and in accordance with a determination that a second set of one or more criteria is met (e.g., as described in 16N, preview user interface 1604 is optionally not displayed if movement of camera 6102 and/or John's laptop 6100-1 is less than a threshold amount) (e.g., in accordance with a determination that the first set of one or more criteria is not met), wherein the second set of one or more criteria is different from the first set of one or more criteria, the first computer system displays the second portion of the field of view as a view of the surface that will be presented by the second computer system (e.g., 1618-1 and/or 1618-3 are displayed instead of displaying preview user interface 1604). In some embodiments, the second portion of the field of view includes an image of the surface that is modified based on a position of the surface relative to the one or more cameras (e.g., 1618-1 and/or 1618-3). In some embodiments, displaying the second portion of the field of view as a view of the surface that will be presented by the second computer system includes providing (e.g., sharing, communicating and/or transmitting) the second portion of the field of view for presentation by second computer system. In some embodiments, the second set of one or more criteria includes a criterion that the user has previously defined a region of the field of view that will be presented as a view of a surface by an external computer system. In some embodiments, the second set of one or more criteria includes a criterion that at least a portion of the first computer system (e.g., the one or more cameras) has not exceeded a threshold amount of change in position (e.g., a change in location in space, a change in orientation, a translation, and/or a change of a horizontal and/or vertical angle). Conditionally displaying the second portion of the field of view as a view of the surface that will be presented by the second computer system, where the second portion of the field of view includes an image of the surface that is modified based on a position of the surface relative to the one or more cameras, reduces the number of inputs to configure the visual indicator to configure a visual indication and/or reduce the number of inputs to request to display an image of the surface that has a corrected view.

In some embodiments, while providing (e.g., communicating and/or transmitting) the second portion of the field of view as a view of the surface for presentation by the second computer system, the first computer system displays, via the display generation component, a control (e.g., 1628) to modify (e.g., expand or shrink) a portion (e.g., the portion displayed in 1618-1, 1618-2, and/or 1618-3) of the field of view of the one or more cameras that is to be presented as a view of the surface by the second computer system. In some embodiments, the first computer system displays, via the display generation component, the second portion of the field of view as a view of the surface (e.g., while the second computer system displays the second portion of the field of view as a view of the surface). In some embodiments, the first computer system detects, via the one or more input devices, one or more inputs directed at the control to modify (e.g., expand or shrink) the portion of the field of view of the one or more cameras that is to be presented as a view of the surface by the second computer system. In some embodiments, in response to detecting the one or more inputs directed at the control to modify a portion of the field of view that is provided a surface view, the first computer system provides a tenth portion of the field of view, different from the second portion, as a view of the surface for presentation by the second computer system. Displaying a control to modify a portion of the field of view of the one or more cameras that is to be presented as a view of the surface by the second computer system improves security of what content is shared in a video communication session since a user can adjust what area of a physical environment is being shared as visual content and improves how users communicate, collaborate, or interact in a video communication session.

In some embodiments, in accordance with a determination that focus (e.g., mouse, pointer, gaze and/or other indication of user attention) is directed to a region (e.g., of a user interface) corresponding to the view of the surface (e.g., cursor in FIG. 16I is over 1618-1), the first computer system displays, via the display generation component, the control to modify the portion of the field of view of the one or more cameras that is to be presented as the view of the surface by the second computer system. In some embodiments, in accordance with a determination that the focus is not directed to the region corresponding to the view of the surface (e.g., cursor in FIG. 16H is not over 1618-1), the first computer system forgoes displaying the control to modify the portion of the field of view of the one or more cameras that is to be presented as the view of the surface by the second computer system. In some embodiments, the control to modify the portion of the field of view is displayed based on the position of a cursor with respect to the region corresponding to the view of the surface. In some embodiments, while displaying the control to modify the portion of the field of view of the one or more cameras that is to be presented as the view of the surface by the second computer system, the first computer system detects that focus is not directed to (or has ceased to be directed to) the region corresponding to the view of the surface (e.g., focus is directed to a different portion of the display generation component, a different application, and/or a different portion of the user interface that does not correspond to the region corresponding to the view of the surface). In some embodiments, in response to detecting that focus is not directed to the region corresponding to the view of the surface, the first computer system ceases to display the control to modify the portion of the field of view of the one or more cameras that is to be presented as the view of the surface by the second computer system. In some embodiments, while the control is not displayed and in response to detecting that focus is directed to (or has started to be directed to) the region corresponding to the view of the surface, the first computer system displays the control. In some embodiments, while the control is displayed and in response to detecting that focus is directed away from the region corresponding to the view of the surface, the first computer system ceases to display the control. Conditionally displaying the control to modify the portion of the field of view of the one or more cameras that is to be presented as the view of the surface by the second computer system performs an operation when a set of conditions has been met without requiring further user input.

In some embodiments, the second portion of the field of view includes a first boundary (e.g., boundary along a top of 1618-1 and/or 1618-2, such as the boundary that is cutting off a view of John's laptop in FIGS. 16H-16K) (e.g., edge and/or limit) (in some embodiments, the first boundary is along an upper most portion of the second portion and/or is an upper most boundary of visual content of the second portion). In some embodiments, the first computer system detects one or more fifth user inputs directed at the control to modify a portion of the field of view of the one or more cameras that is to be presented as a view of the surface by the second computer system. In some embodiments, in response to detecting the one or more fifth user inputs, the first computer system maintains a position of the first boundary of the second portion of the field of view (e.g., boundary along a top of 1618-1 and/or 1618-2, such as the boundary that is cutting off a view of John's laptop, remains substantially fixed throughout FIGS. 16H-16K). In some embodiments, in response to detecting the one or more fifth user inputs, the first computer system modifies (e.g., expands and/or shrinks) an amount (e.g., an area and/or a size) of a portion of the field of view that is included in the second portion of the field of view (e.g., the portion of the field of view included in 1618-1 and/or 1618-2 changes throughout FIGS. 16H-16K). In some embodiments, modifying the amount of the field of view that is included in the surface view includes modifying a position of a second boundary of the second portion of the field of view. In some embodiments, in response to detecting the one or more fifth user inputs, the first computer system forgoes displaying a portion of the field of view that is in a first direction (e.g., above) of the first boundary. In some embodiments, in response to detecting the one or more fifth user inputs, the first computer system displays a portion of the field of view that is in a second direction different from (e.g., opposite and/or not opposite) the first direction (e.g., below) the first boundary. Maintaining a position of the first boundary of the second portion of the field of view and modifying an amount of a portion of the field of view that is included in the surface view in response to detecting user input directed at the control improves a video communication session experience and provides additional control options because it allows at least one boundary of the second portion to remain fixed as a user adjusts what portion of the field of view is being shared (e.g., in a communication session).

In some embodiments, while the camera is substantially stationary (e.g., stationary or having moved less than a threshold amount) and while displaying the visual representation (e.g., 1606 in FIG. 16P) of the first portion of the field of view of the one or more cameras and the visual indication (e.g., 1610 in FIG. 16P), the first computer system detects, via the one or more user input devices, one or more sixth user inputs (e.g., 1650*c*, 1650*d*, and/or 1650*o*) (e.g., corresponding to a request to change the portion of the field of view of the one or more cameras that is indicated by the visual indication); and in response to detecting the one or more sixth user inputs and while the camera remains substantially stationary, the first computer system concurrently displays, via the display generation component: a visual representation (e.g., 1606 in FIG. 16Q) of an eleventh portion of the field of view of the one or more cameras that is different from the first portion of the field of view of the one or more cameras (e.g., a zoomed in or zoomed out portion of the field of view of the one or more cameras); and the visual indication (e.g., 1610 in FIG. 16Q), wherein the visual indication indicates a seventh region of the field of view of the one or more cameras that is a subset of the eleventh portion of the field of view of the one or more cameras, wherein the seventh region indicates a twelfth portion of the field of view, different from (e.g., larger than or smaller than) the second portion, that will be presented as a view of the surface by the second computer system. Changing the visual representation to display a different portion of the field of view of the one or more cameras in response to detecting the user inputs and while the camera remains substantially stationary provides the user with an efficient technique for adjusting the portion of the field of view that will be presented as a view of the surface by the second computer system, which provides improved visual feedback to the user and reduces the number of inputs needed to perform an operation.

In some embodiments, displaying the visual indication in response to detecting the one or more sixth user inputs and while the camera remains substantially stationary includes maintaining the position (e.g., including the size and shape) of the visual indication relative to the user interface of the application (e.g., the first computer system changes a zoom level of the visual representation of the field of view of the one or more cameras, while the visual indication remains unchanged). In some embodiments, changing the portion of the field of view in the visual representation, without changing the visual indication, changes the region of the field of view that is indicated by the visual indication, and thus changes the portion of the field of view of the one or more cameras that will be presented as a view of the surface by a second computer system.

In some embodiments, displaying the visual indication includes: in accordance with a determination that a set of one or more alignment criteria are met, wherein the set of one or more alignment criteria include an alignment criterion that is based on an alignment between a current region of the field of view of the one or more cameras indicated by the visual indication and a designated portion (e.g., a target, suggested, and/or recommended portion) of the field of view of the one or more cameras, displaying the visual indication having a first appearance (e.g., the appearance of 1610 in FIG. 16C) (e.g., highlighted, bolded, a first color, a first style, a first width, a first brightness, a first fill style, and/or a first thickness); and in accordance with a determination that the alignment criteria are not met, displaying the visual indication having a second appearance (e.g., the appearance of 1610 in FIG. 16C) (e.g., not highlighted compared to the first appearance, not bolded compared to the first appearance, a second color different from the first color, a second style different from the first style, a second width thinner than the first width, a second brightness less than the first brightness, a second fill style different from the first fill style, and/or a second thickness less than the first thickness) that is different from the first appearance. In some embodiments, the alignment criterion is met when the current region of the field of view of the one or more cameras indicated by the visual indication is the same as or is within a threshold distance of the designated portion of the field of view of the one or more cameras.

Displaying the visual indication having an appearance that is based on whether or not an alignment criteria is met, where the alignment criteria is based on an alignment between a current region of the field of view of the one or more cameras indicated by the visual indication and a designated portion of the field of view of the one or more cameras enables the computer system to indicate when a recommended (e.g., optimal) portion of the field of view is indicated by the visual indication and reduces the number of inputs needed to properly adjust the visual indication, which provides improved visual feedback to the user and reduces the number of inputs needed to perform an operation.

In some embodiments, while the visual indication indicates an eighth region of the field of view of the one or more cameras, the first computer system displays, concurrently with a visual representation of a thirteenth portion of the field of view of the one or more cameras and the visual indication (e.g., in response to detecting the one or more first user inputs and in accordance with a determination that a first set of one or more criteria is met), a target area indication (e.g., 1611) (e.g., that is visually distinct and different from the visual indication) that indicates a first designated region (e.g., a target, suggested, and/or recommended region) of the field of view of the one or more cameras (e.g., that is different from the eighth region of the field of view of the one or more cameras indicated by the visual indication), wherein the first designated region indicates a determined portion (e.g., a target, suggested, selected, and/or recommended portion) of the field of view of the one or more cameras that is based on a position of the surface in the field of view of the one or more cameras. Displaying a target area indication concurrently with the visual indication provides additional information to the user about how to adjust the visual indication to align with a recommended (e.g., optimal) portion of the field of view and reduces the number of inputs needed to properly adjust the visual indication, which provides improved visual feedback to the user and reduces the number of inputs needed to perform an operation.

In some embodiments, the target area indication (e.g., 1611) (e.g., the position, size, and/or shape of the target area indication) is stationary (e.g., does not move, is locked, or is fixed) relative to the surface (e.g., 619) (or the visual representation of the surface) (e.g., 1611*a* in FIG. 16F). Keeping the target area indication stationary relative to the surface enables the user to more easily align the visual indication with the target area indication and reduces the number of inputs needed to align the visual indication with the target area indication because the portion of the field of view indicated by the target area indication is not moving around (e.g., the user does not have to "chase" the target area indication), which provides improved visual feedback to the user and reduces the number of inputs needed to perform an operation.

In some embodiments, the portion of the physical environment in the field of view of the one or more cameras indicated by the target area indication remains constant as the portion of the field of view of the one or more cameras represented by the visual representation changes (e.g., due to a change in the position of the one or more cameras and/or in response to user input corresponding to a request to change the portion of the field of view of the one or more cameras represented by the visual representation, such as a request to zoom in or zoom out). In some embodiments, the target area indication moves within the visual representation of the field of view to remain locked to the determined portion of the field of view of the one or more cameras.

In some embodiments, after detecting a change in position of the one or more cameras, the first computer system displays the target area indication, where the target area indication indicates the first designated region (e.g., the same designated region) of the field of view of the one or more cameras after the change in position of the one or more cameras (e.g., the target area indication indicates the same portion of the surface after the one or more cameras is moved). In some embodiments, when the one or more cameras are moved, the target area indication does not move with the field of view of the one or more cameras (e.g., maintains the same position relative to the surface).

In some embodiments, the target area indication (e.g., the position, size, and/or shape of the target area indication) is selected (e.g., automatically selected, without detecting user input selecting the target area indication) based on an edge of the surface (e.g., 619) (e.g., a position such as a location and/or orientation of an edge of the surface that is, optionally, automatically detected by the device based on one or more sensor inputs such as a camera or other sensor that acquires information about the physical environment that can be used to detect edges of surfaces). Selecting the target area indication based on an edge of the surface enables the computer system to select a relevant target area without requiring a user to provide inputs to select the criteria for selecting the target area indication, which provides improved visual feedback to the user and reduces the number of inputs needed to perform an operation.

In some embodiments, in accordance with a determination that the edge of the surface is in a first position in the field of view of the one or more cameras, the first computer system displays the target area indication in a first position (e.g., relative to the visual representation of the field of view of the one or more cameras); and in accordance with a determination that the edge of the surface is in a second position in the field of view of the one or more cameras that is different from the first position of the edge of the surface in the field of view of the one or more cameras, the first computer system displays the target area indication in a second position (e.g., relative to the visual representation of the field of view of the one or more cameras) that is different from the first position relative to the visual representation of the field of view of the one or more cameras.

In some embodiments, the target area indication (e.g., the position, size, and/or shape of the target area indication) is selected (e.g., automatically selected, without detecting user input selecting the target area indication) based on a position of a person (e.g., 622) (e.g., a user of the first computer system) in the field of view of the one or more cameras (or a position of a representation of a person in the visual representation of the field of view of the one or more cameras that is, optionally, automatically detected by the device based on one or more sensor inputs such as a camera or other sensor that acquires information about the physical environment that can be used to detect a position of a person). Selecting the target area indication based on a position of a user in the field of view of the one or more cameras enables the computer system to select a relevant target area without requiring a user to provide inputs to select the criteria for selecting the target area indication, which provides improved visual feedback to the user and reduces the number of inputs needed to perform an operation.

In some embodiments, in accordance with a determination that the user is in a first position in the field of view of the one or more cameras, the first computer system displays the target area indication in a first position (e.g., relative to the visual representation of the field of view of the one or more cameras); and in accordance with a determination that the person is in a second position in the field of view of the one or more cameras that is different from the first position of the person in the field of view of the one or more cameras, the first computer system displays the target area indication in a second position (e.g., relative to the visual representation of the field of view of the one or more cameras) that is different from the first position relative to the visual representation of the field of view of the one or more cameras.

In some embodiments, after detecting a change in position of the one or more cameras (e.g., movement 1650*e*), the first computer system displays, via the display generation component, the target area indication (e.g., 1611 or 1611*b*), wherein the target area indication indicates a second designated region (e.g., the region indicated by 1611*b* in FIG. 16F) of the field of view of the one or more cameras (e.g., that is different from the first designated region of the field of view of the one or more cameras), wherein the second designated region indicates a second determined portion of the field of view of the one or more cameras that is based on a position of the surface in the field of view of the one or more cameras (e.g., the position of the surface relative to the one or more cameras) after the change in position of the one or more cameras (e.g., the target area indication indicates a different portion of the surface after the one or more cameras is moved). In some embodiments, when the one or more cameras are moved, the target area indication moves with the field of view of the one or more cameras (e.g., maintains the same position in the user interface). Changing the designated region of the target area indication after detecting a change in position of the one or more cameras enables the computer system to designate an appropriate target area based on the current position of the one or more cameras and to update the target area indication when a previously designated region is no longer recommended without the user having to provide additional inputs to manually update the target area indication, which provides improved visual feedback to the user and reduces the number of inputs needed to perform an operation.

In some embodiments, the first computer system displays, concurrently with the visual representation of the field of view of the one or more cameras and the visual indication (e.g., in response to detecting the one or more first user inputs and in accordance with a determination that a first set of one or more criteria is met), a surface view representation (e.g., 1613) (e.g., image and/or video) of the surface in a ninth region of the field of view of the one or more cameras indicated by the visual indication that will be presented as a view of the surface by a second computer system, wherein the surface view representation includes an image (e.g., photo, video, and/or live video feed) of the surface captured by the one or more cameras that is (or has been) modified based on a position of the surface relative to the one or more cameras to correct a perspective of the surface (e.g., as described in greater detail with respect to methods 700 and 1700). Displaying a surface view representation of the region indicated by the visual indication that includes an image of the surface captured by the one or more cameras that is modified based on a position of the surface relative to the one or more cameras provides the user with additional information about the view that will be presented as a view of the surface by the second computer system based on the current state (e.g., position and/or size) of the visual indication and reduces the number of inputs required for the user to adjust the visual indication, which provides improved visual feedback to the user and reduces the number of inputs needed to perform an operation.

In some embodiments, displaying the surface view representation (e.g., 1613) includes displaying the surface view representation in (e.g., within, on, overlaid on, and/or in a portion of) a visual representation (e.g., 1606) of a portion of the field of view of the one or more cameras that includes a person (e.g., 622). In some embodiments, displaying the surface view representation includes displaying the surface view preview representation as a window within the user interface of the application and/or as a picture-in-picture in the user interface of the application. Displaying the surface view representation in a visual representation of a portion of the field of view of the one or more cameras that includes a user provides the user with additional contextual information about the state (e.g., position) of the user relative to the view that will be presented as a view of the surface by the second computer system (e.g., proximity of the user to the view that will be presented by the second computer system) without requiring the user to provide additional inputs to adjust the one or more cameras and/or the visual indication, which provides improved visual feedback to the user and reduces the number of inputs needed to perform an operation.

In some embodiments, after displaying the surface view representation of the surface in the ninth region of the field of view of the one or more cameras indicated by the visual indication, the first computer system detects a change in the field of view of the one or more cameras indicated by the visual indication (e.g., due to a change in the position of the one or more cameras and/or in response to user input corresponding to a request to change the portion of the field of view of the one or more cameras represented by the visual representation, such as a request to zoom in or zoom out); and in response to detecting the change in the field of view of the one or more cameras indicated by the visual indication, the first computer system displays (e.g., updates and/or updates in real-time) the surface view representation, wherein the surface view representation includes the surface in the ninth region of the field of view of the one or more cameras indicated by the visual indication after the change in the field of view of the one or more cameras indicated by the visual indication (e.g., the first computer system updates the surface view representation to display the current portion of the field of view of the one or more cameras indicated by the visual indication) (e.g., 1613 updates from: FIG. 16C to FIG. 16D; FIG. 16D to FIG. 16E; and FIG. 16E to FIG. 16F). Displaying the surface view representation including the surface in the region of the field of view of the one or more cameras indicated by the visual indication after the change in the field of view of the one or more cameras indicated by the visual indication enables the computer system to update the surface view representation as the region indicated by the visual indication changes and presents more relevant information to the user and reduces the number of inputs needed to adjust the visual indication, which provides improved visual feedback an reduces the number of inputs needed to perform an operation.

Note that details of the processes described above with respect to method 1700 (e.g., FIG. 17) are also applicable in an analogous manner to the methods described above. For example, methods 700, 800, 1000, 1200, 1400, 1500, and 1900 optionally include one or more of the characteristics of the various methods described herein with reference to method 1700. For example, methods 700, 800, 1000, 1200, 1400, 1500, and 1900 optionally include a sharing options to share image data between different applications, displaying controls and/or user interfaces for managing what portions of a field of view are shared (including a preview interface), techniques for how or when to display controls and/or user interfaces that modify a portion of a field of view that is or will be shared. For brevity, these details are not repeated herein.

FIGS. 18A-18N illustrate exemplary user interfaces for displaying a tutorial for a feature on a computer system, according to some embodiments. The user interfaces in these figures are used to illustrate the processes described below, including the processes in FIG. 19.

FIG. 18A illustrates computer system 1800*a*, which includes display 1801*a* and camera 1802*a*. Computer system 1800*a* is a desktop computer that is coupled to external device 1850*a*, which includes camera 1852*a*. External device 1850*a* can capture an image of a physical surface for display on computer system 1800*a* using a portion of the field of view of camera 1852*a*.

In FIG. 18A, computer system 1800*a* displays video conferencing application window 6120 of a video conferencing application running on computer system 1800*a*. Video conferencing application window 6120 and the video conferencing application are described in greater detail above. Computer system 1800*a* detects selection of camera application icon 6108. In response to selection of camera application icon 6108, computer system 1800*a* displays camera application window 6114, as shown in FIG. 18B. Embodiments and features of camera application window 6114 and the corresponding camera application are described in detail above. Alternatively, camera application window 6114 can be displayed via video conferencing application window 6120 as described, for example, with respect to FIGS. 16A-16C.

In the embodiment illustrated in FIG. 18B, camera application window 6114 includes tutorial user interface 1806. In some embodiments, tutorial user interface 1806 is overlaid on a representation of an image captured by camera 1852*a* of external device 1850*a*. Tutorial user interface 1806 includes virtual demonstration portion 1806*a*, feature description portion 1806*b*, learn more option 1806*c*, and continue option 1806*d*.

In FIG. 18B, virtual demonstration portion 1806*a* includes graphical representation 1808*a* of computer system 1800*a*, graphical representation 1810*a* of external device 1850*a*, and graphical representation 1812 of a surface. In some embodiments, graphical representations 1808*a*, 1810*a*, and 1812 are virtual representations of computer system 1800*a*, external device 1850*a*, and a piece of paper, respectively. Graphical representation 1808*a* of computer system 1800*a* is also referred to herein as virtual computer system 1808*a*; graphical representation 1810*a* of external device 1850*a* is also referred to herein as virtual external device 1810*a*; and graphical representation 1812 of the surface is also referred to herein as virtual surface 1812.

Feature description portion 1806*b* includes text and/or graphics with information describing the feature of the camera application corresponding to camera application window 6114. The information describes that a surface view can be shared, and that the camera application will automatically show a top down view of the surface in front of computer system 1800*a* using camera 1852*a* of external device 1850*a*.

Computer system 1800*a* displays a virtual demonstration in virtual demonstration portion 1806*a* in which a virtual writing implement creates a simulated mark on a virtual surface. FIGS. 18B-18K describe various states of the virtual demonstration. In some embodiments, computer system 1800*a* displays an animation that transitions (e.g., gradually transitions over time) from one state to the next. In some embodiments, computer system 1800*a* displays one or more intermediate images between the states illustrated in FIGS. 18B-18K. In some embodiments, the virtual demonstration includes an animation in which the contents of the animation (e.g., virtual computer system 1808*a*, virtual external device 1810*a*, and virtual surface 1812) appear to rotate and/or change orientation such that the contents of the animation are displayed from different perspectives over time. In some embodiments, the contents of the animation appear to rotate while simulated input and/or simulated output concurrently progress over time (e.g., to show virtual computer system 1808*a*, virtual external device 1810*a*, and virtual surface 1812 from different perspectives as simulated input and/or simulated output progress).

FIG. 18B illustrates a first (e.g., initial) state of the virtual demonstration, prior to a simulated mark being made. The first state shown in FIG. 18B shows the virtual demonstration from a first perspective (e.g., a top perspective, an overhead perspective, a perspective looking directly down on the surface, and/or a top down perspective of the surface).

Figure 18C:
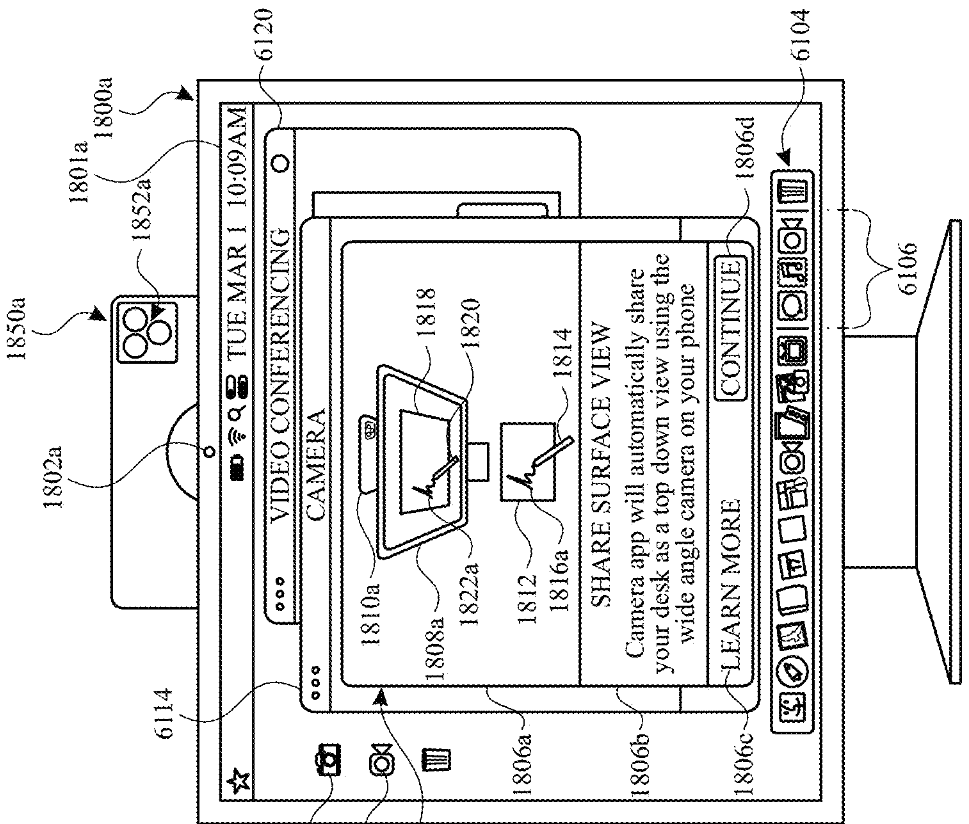
Figure 18B:
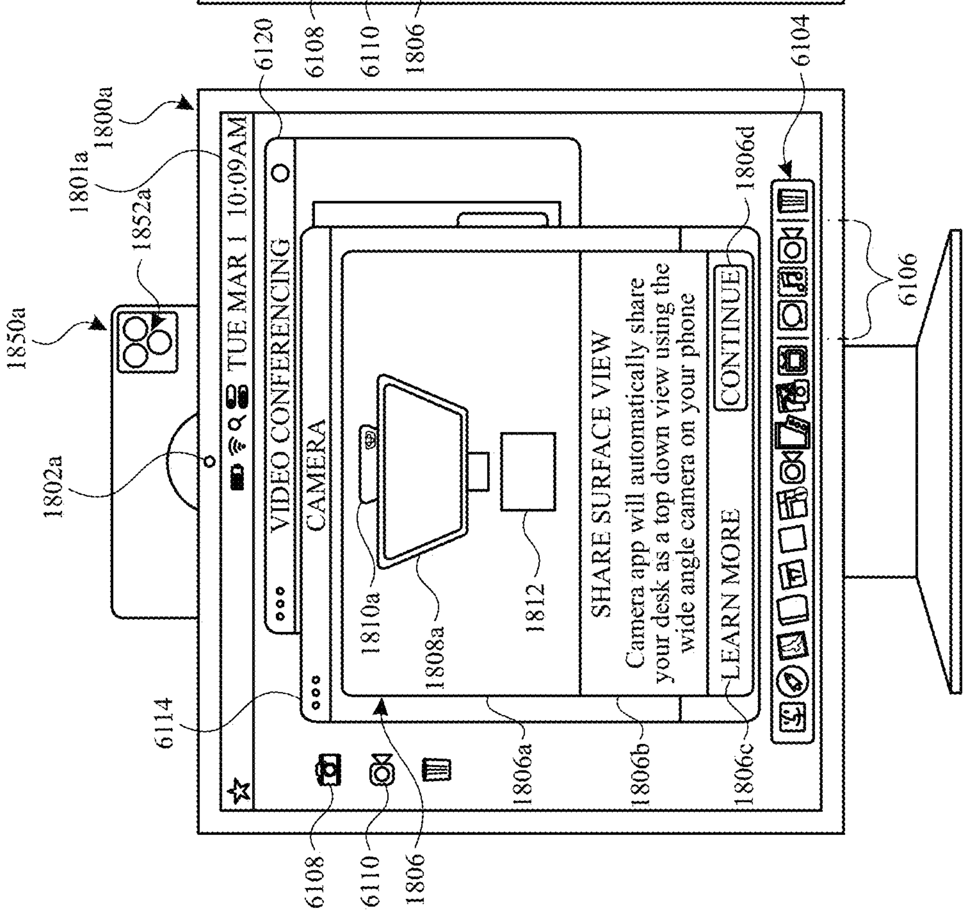
Figure 18E:
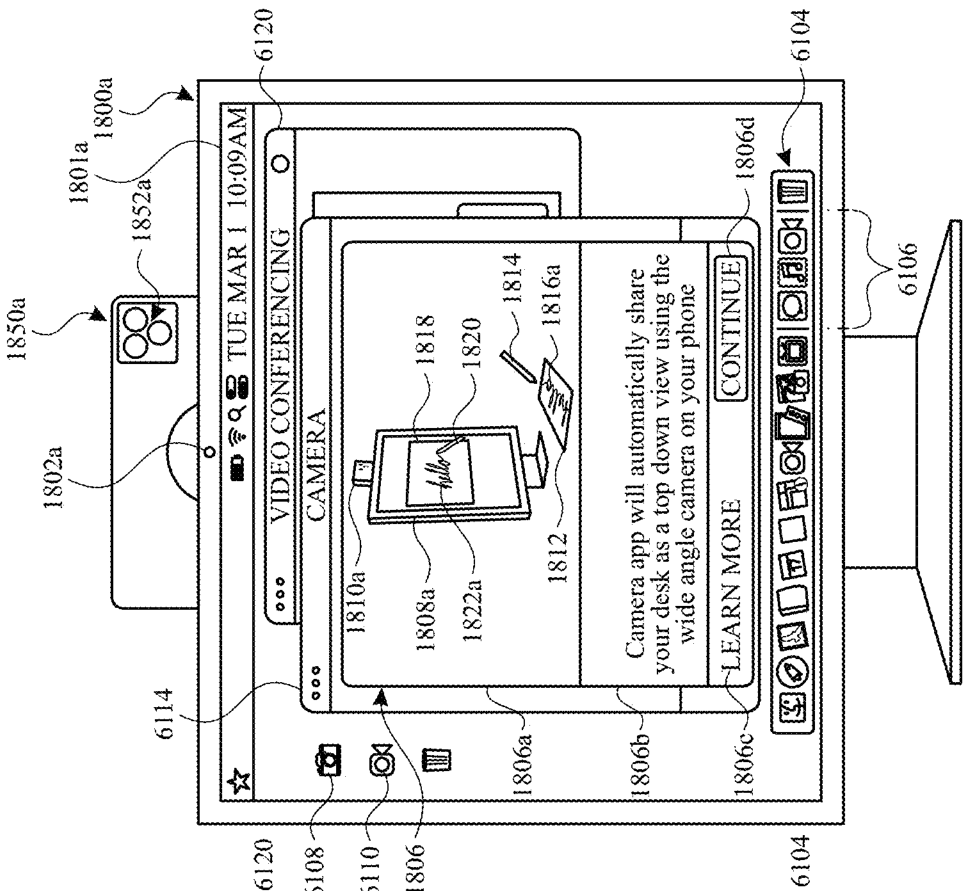

FIG. 18C illustrates a second state of the virtual demonstration. In some embodiments, computer system 1800*a* displays a transition (e.g., a gradual transition and/or an animation of a transition) from the first state of the virtual demonstration shown in FIG. 18B to the second state of the virtual demonstration shown in FIG. 18C. The second state shown in FIG. 18C shows the virtual demonstration from a perspective that is the same as or similar to the perspective of the first state of the virtual demonstration shown in FIG. 18B.

In the second state, virtual writing implement 1814 has made a simulated mark 1816*a* (e.g., written the letter "h") on virtual surface 1812. Concurrently, a simulated image is displayed on virtual computer system 1808*a* of an image of virtual surface 1812 captured by a camera of virtual external device 1810. The simulated image includes simulated image 1818 of virtual surface 1812, simulated image 1820 of virtual writing implement 1814, and simulated mark image 1822*a* of simulated mark 1816*a*. Simulated image 1818 of virtual surface 1812 is also referred to as simulated surface image 1818; simulated image 1820 of virtual writing implement 1814 is also referred to as simulated writing implement image 1820; and simulated mark image 1822*a* of simulated mark 1816*a* is also referred to as simulated mark image 1822*a*. FIG. 18C thus shows a virtual demonstration of a feature in which a view of the surface is displayed to show marks made on the surface as the marks are made (e.g., in real-time).

Figure 18D:
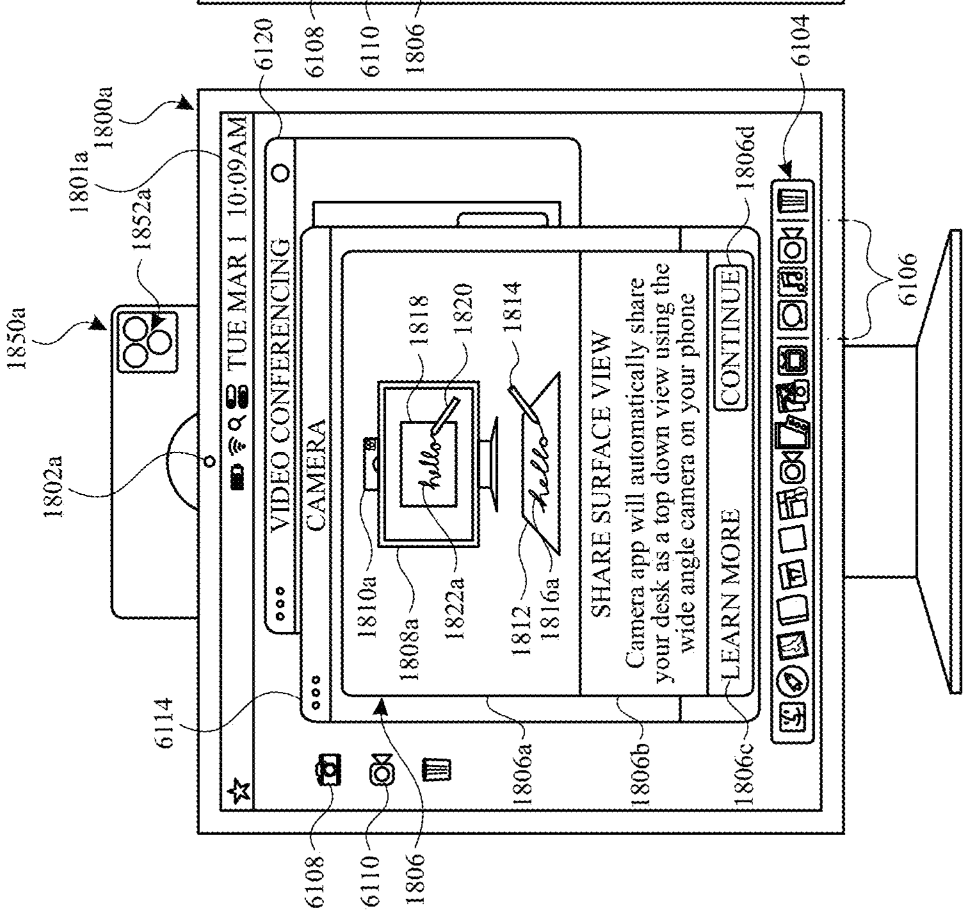
Figure 18G:
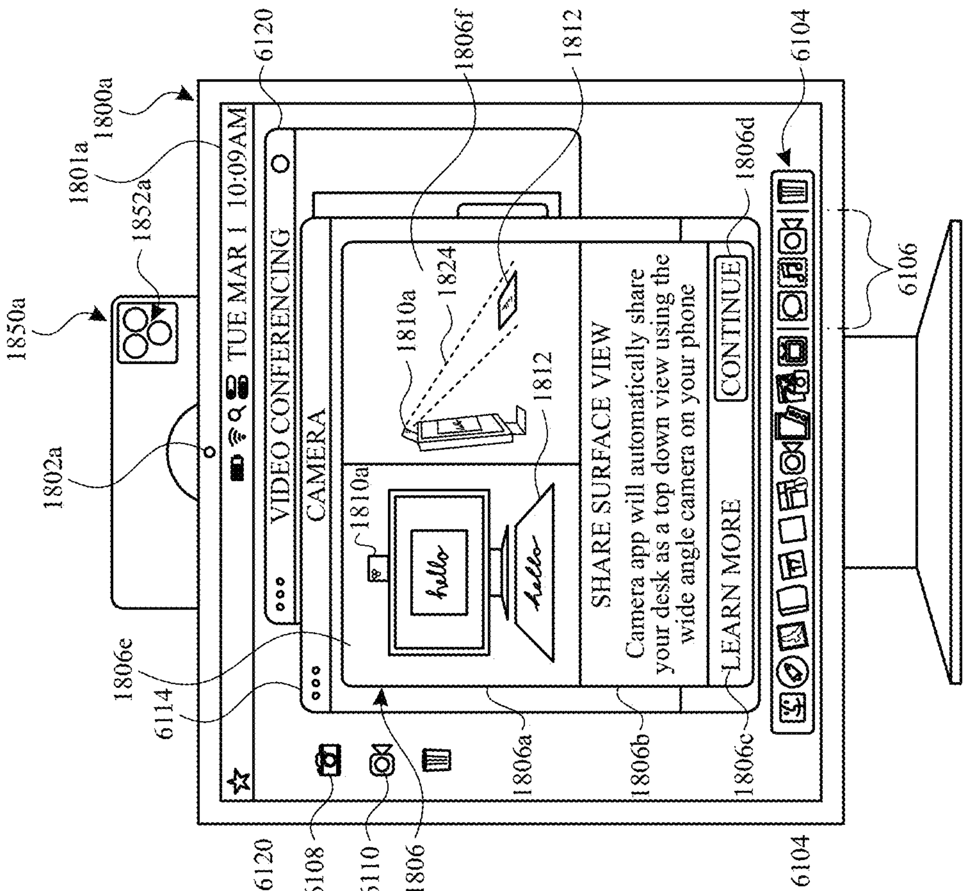

FIG. 18D illustrates a third state of the virtual demonstration. The third state shown in FIG. 18D shows the virtual demonstration from a second perspective (e.g., a front perspective and/or a perspective looking directly at the display of virtual computer system 1808*a*). In some embodiments, computer system 1800*a* displays a transition (e.g., a gradual transition and/or an animation of a transition) from the second state of the virtual demonstration shown in FIG. 18C to the third state of the virtual demonstration shown in FIG. 18D. Compared to the second state illustrated in FIG. 18C, virtual writing implement 1814 has written the letters "ello" to complete the word "hello", as indicated by the state of simulated mark 1816*a* in FIG. 18D. Concurrently, the simulated image displayed on virtual computer system 1808*a* displays simulated writing implement image 1820 and simulated mark image 1822*a* to reflect (e.g., match) the state of virtual writing implement 1814 and simulated mark 1816*a* (e.g., "ello" is included (in addition to "h") in simulated mark image 1822*a* and simulated writing implement image 1820 is at the end of the "o" in simulated mark image 1822*a*).

FIG. 18E illustrates a fourth state of the virtual demonstration. The fourth state shown in FIG. 18E shows the virtual demonstration from a third perspective (e.g., a front-side perspective and/or a perspective from in front and off to a left side of virtual computer system 1808*a* and looking towards the left side of virtual computer system 1808*a*; a perspective in which the virtual demonstration appears to be rotating toward the perspective shown in FIG. 18F describe below). In some embodiments, computer system 1800*a* displays a transition (e.g., a gradual transition and/or an animation of a transition) from the third state of the virtual demonstration shown in FIG. 18D to the fourth state of the virtual demonstration shown in FIG. 18E. Compared to the third state illustrated in FIG. 18D, simulated mark 1816*a* is complete and virtual writing implement 1814 is off to the side of virtual surface 1812. Concurrently, the simulated image displayed on virtual computer system 1808*a* displays simulated writing implement image 1820 and simulated mark image 1822*a* to reflect (e.g., match) the state of virtual writing implement 1814 and simulated mark 1816*a* (e.g., "hello" is complete in simulated mark image 1822*a* and simulated writing implement image 1820 is off to the side of simulated surface image 1818).

Figure 18F:
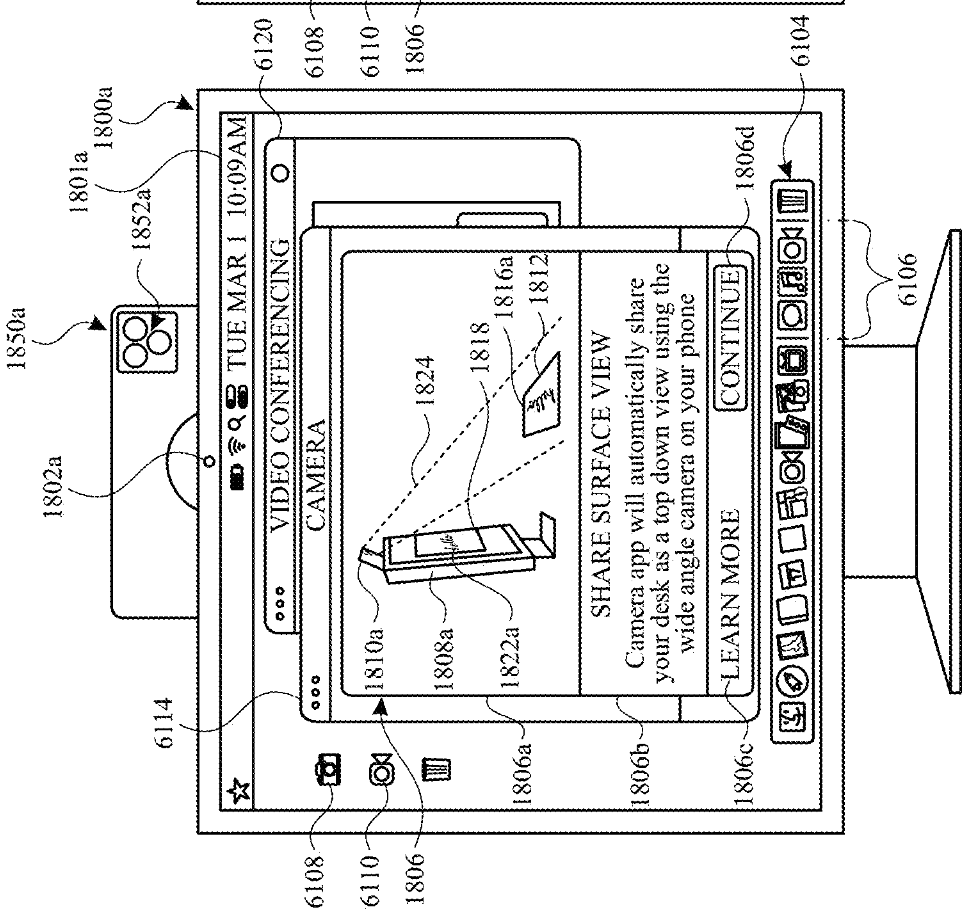
Figure 18I:
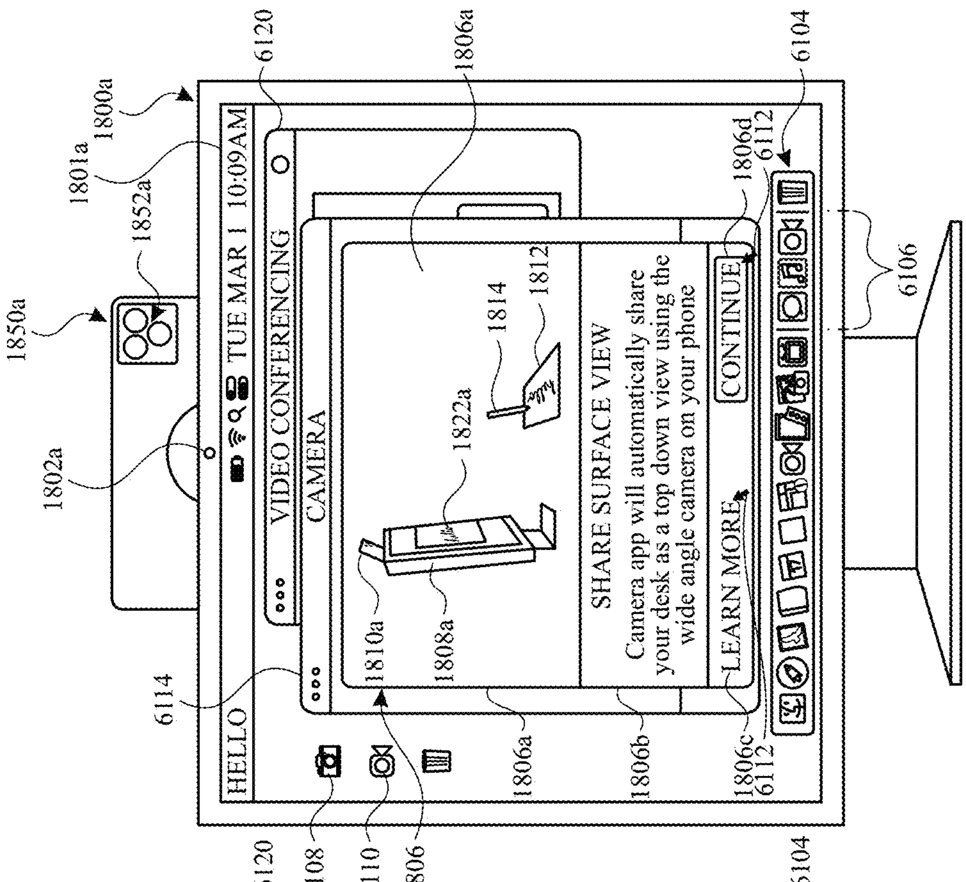

FIG. 18F illustrates a fifth state of the virtual demonstration. The fifth state shown in FIG. 18F shows the virtual demonstration from a fourth perspective (e.g., a side perspective and/or a perspective from off to a left side of virtual computer system 1808*a* and looking towards the left side of virtual computer system 1808*a*). In some embodiments, computer system 1800*a* displays a transition (e.g., a gradual transition and/or an animation of a transition) from the fourth state of the virtual demonstration shown in FIG. 18E to the fifth state of the virtual demonstration shown in FIG. 18F. Compared to the fourth state illustrated in FIG. 18E, in addition to the different perspective, the virtual demonstration includes field of view indicator 1824, which indicates the field of view (or portion thereof) of camera 1852*a* of external device 1850*a* that is displayed by the feature demonstrated by the virtual demonstration (e.g., by the camera application). Field of view indicator 1824 indicates to the user that camera 1852*a* of external device 1850*a* is used to capture an image of a surface in front of computer system 1800*a*.

FIG. 18G illustrates a sixth state of the virtual demonstration in which two perspectives of the virtual demonstration are shown. In some embodiments, computer system 1800*a* displays a transition (e.g., a gradual transition and/or an animation of a transition) from the fifth state of the virtual demonstration shown in FIG. 18F to the state of the virtual demonstration shown in FIG. 18G. Virtual demonstration portion 1806*a* concurrently includes first sub-portion 1806*e* and second sub-portion 1806*f* Second sub-portion 1806*f* displays a state similar to or the same as the state of the virtual demonstration that is illustrated in FIG. 18F. First sub-portion 1806*e* displays a state (e.g., perspective) similar to or the same as the state illustrated in FIG. 18D, but more centered (e.g., focused) on virtual external device 1810.

Figure 18H:
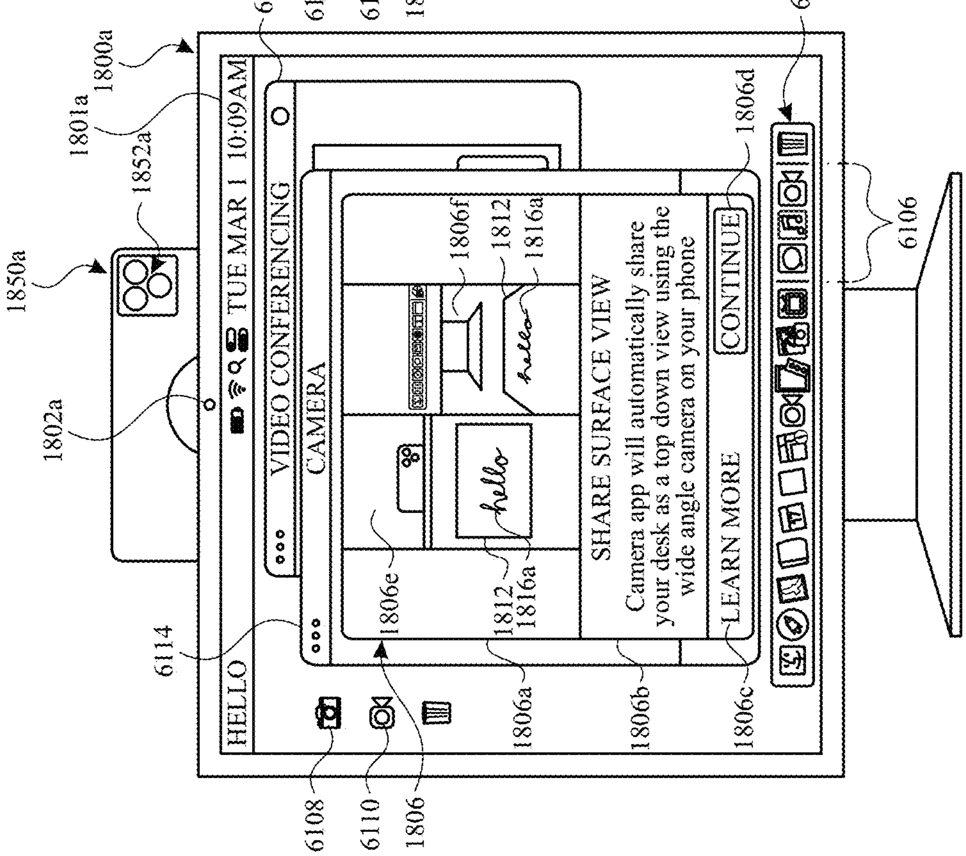

FIG. 18H illustrates a seventh state of the virtual demonstration. Similar to the sixth state of the virtual demonstration illustrated in FIG. 18G, the seventh state includes first sub-portion 1806*e* and second sub-portion 1806*f* In some embodiments, computer system 1800*a* displays a transition (e.g., a gradual transition and/or an animation of a transition) from the sixth state of the virtual demonstration shown in FIG. 18G to the seventh state of the virtual demonstration shown in FIG. 18H. Compared to FIG. 18G, the view displayed in first sub-portion 1806*e* is zoomed in on virtual external device 1810. Displaying a view that is zoomed in on virtual external device 1810 emphasizes the orientation of virtual external device 1810, which indicates to a user in what orientation external device 1850*a* should be mounted when using the feature demonstrated by the tutorial. Sub-portion **1806*f* displays a view from a perspective in front of virtual computer system 1808*a* and zoomed in on a position between virtual surface 1812 and a bottom of virtual computer system 1808*a*. Displaying a view that is zoomed in on a position between virtual surface 1812 and a bottom of virtual computer system 1808*a* emphasizes to a user that the feature demonstrated by the tutorial displays an image of a surface in front of the computer system 1800*a***.

FIG. 18I illustrates an eighth state of the virtual demonstration. The eighth state shown in FIG. 18I is similar to or the same as the fifth state illustrated in FIG. 18F. In some embodiments, computer system **1800*a* displays a transition (e.g., a gradual transition and/or an animation of a transition) from the seventh state of the virtual demonstration shown in FIG. 18H to the eighth state of the virtual demonstration shown in FIG. 18I. In FIG. 18I, computer system 1800*a* detects selection of learn more option 1806*c* and, additionally or alternatively, selection of continue option 1806*d*, as indicated by cursor 6112 on learn more option 1806*c* and cursor 6112 on continue option 1806*d*, respectively. It should be recognized that, in some embodiments, computer system 1800*a* displays only one instance of cursor 6112 at a particular time, and that two instances of cursor 6112 are illustrated in FIG. 18I to describe the ability to select learn more option 1806*c* or continue option 1806*d***.

Figure 18J:
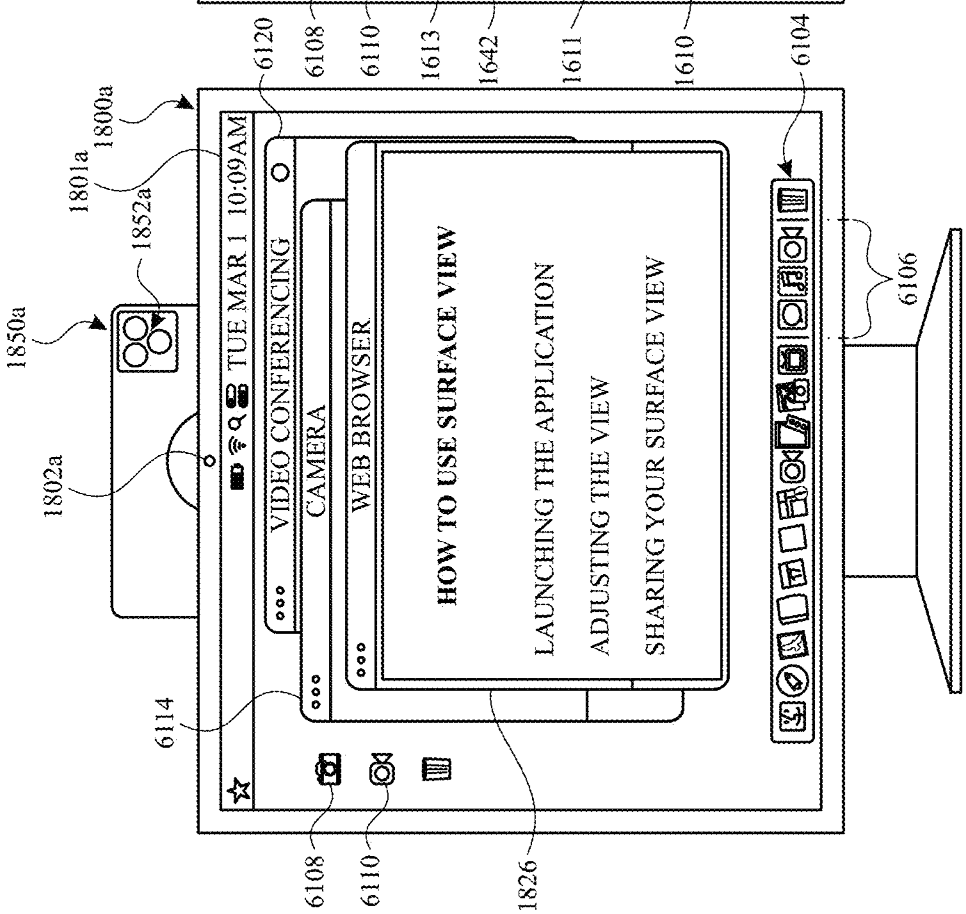

In response to detecting selection of learn more option **1806*c*, computer system 1800*a* displays information, or a user interface that provides access to information, for using the feature of the camera application demonstrated by the tutorial. In FIG. 18J, in response to detecting selection of learn more option 1806*c*, computer system 1800*a* displays web browser window 1826**, which includes information and/or links to information about how to use the surface view feature of the camera application.

Figure 18K:
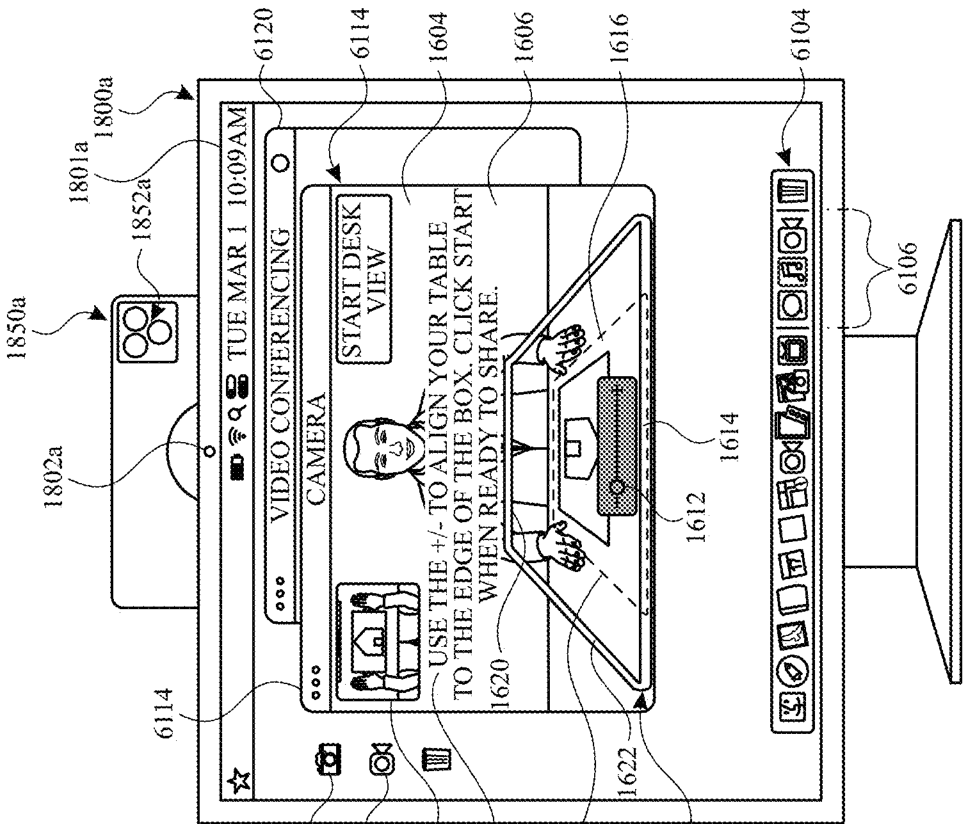

In response to detecting selection of continue option **1806*d*, computer system 1800*a* initiates the feature demonstrated by the tutorial. In FIG. 18K, in response to detecting selection of continue option 1806*c*, computer system 1800*a* displays preview user interface 1604 in camera application window 6114. Preview user interface 1604 and the features thereof are described in greater detail with reference to FIGS. 16C-16G, 16N, and 16P-16Q. Alternatively, in some embodiments, in response to detecting selection of continue option 1806*c*, computer system 1800*a* displays, e.g., surface view 6116 described in greater detail with reference to FIG. 6**AG.

In some embodiments, the virtual demonstration is repeated or looped (e.g., one or more times). In some embodiments, the virtual demonstration displays (e.g., transitions through) the states described in FIGS. 18B-18I in a different order than described above. For example, in some embodiments, the virtual demonstration transitions from a front perspective (e.g., as shown in FIG. 18D) to a top perspective (e.g., as shown in FIG. 18B) and then to a side perspective (e.g., as shown in FIG. 18F) as simulated mark **1818*a* and simulated mark image 1822*a* progress; in some embodiments, the virtual demonstration transitions from a multi-perspective view (e.g., as shown in FIG. 18G) to a front perspective (e.g., as shown in FIG. 18D) and then to a side perspective (e.g., as shown in FIG. 18F) as simulated mark 1818*a* and simulated mark image 1822*a* progress; and in some embodiments, the virtual demonstration transitions from a side perspective (e.g., as shown in FIG. 18F) to a front perspective (e.g., as shown in FIG. 18D) and then to a top perspective (e.g., as shown in FIG. 18B) as simulated mark 1818*a* and simulated mark image 1822*a*** progress.

In some embodiments, the virtual demonstration includes additional states or omits one or more of the states described in FIGS. 18B-18I. In some embodiments, the virtual demonstration is the same each time it is repeated. In some embodiments, one or more aspects of the virtual demonstration are different when the virtual demonstration is repeated. For example, in some embodiments, the simulated input (e.g., simulated mark) and corresponding simulated output and/or simulated output image are different when the virtual demonstration is repeated, while the other aspects of the virtual simulation (e.g., the other displayed elements and the perspectives from which they are displayed) are the same.

In some embodiments, the content in feature description portion **1806*b* remains constant throughout the tutorial (e.g., is the same in all of FIGS. 18B-18K). In some embodiments, the content in feature description portion 1806*b* changes over time to, e.g., describe a particular aspect of the feature related to the current state of the virtual demonstration (e.g., to describe the perspective and/or the state of simulated mark 1816*a* and/or simulated mark image 1822*a***).

Figure 18L:
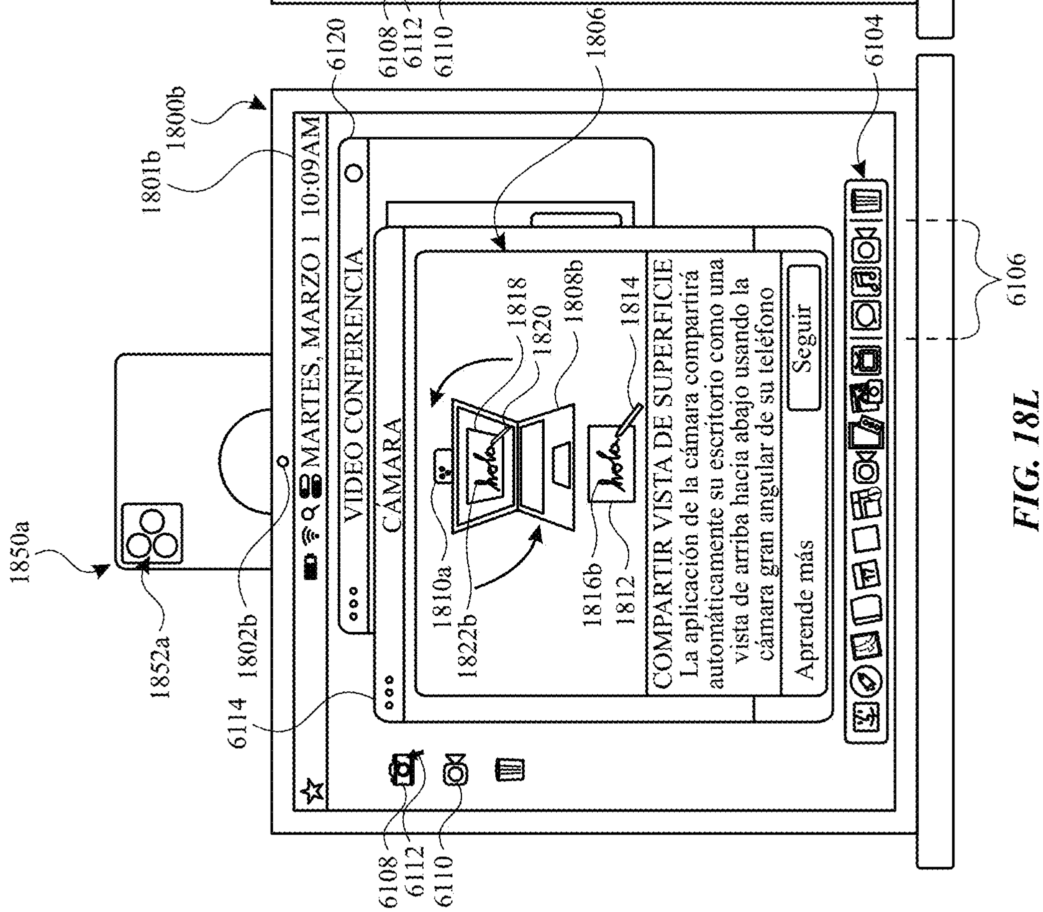

FIG. 18L illustrates computer system **1800*b* and external device 1850*a*. In FIG. 18L, computer system 1800*b* is a laptop computer and is coupled to external device 1850*a*. Computer system 1800*b* is capable of running the camera application described with respect to FIGS. 18A-18K. In response to detection selection of camera application icon 6108 in FIG. 18L, computer system 1800*b* displays camera application window 6114 and tutorial user interface 1806 as shown in FIG. 18L. In FIG. 18L, tutorial user interface 1806 displays a tutorial with a virtual demonstration of the features of the camera application described in FIGS. 18B-18K with reference to computer system 1800*a*. The virtual demonstration in FIG. 18L includes virtual external device 1810*a*, virtual surface 1812, virtual writing implement 1814, virtual surface image 1818, and virtual writing implement image 1820 described above in FIGS. 18B-18K. Because computer system 1800*b* is a laptop computer, the virtual demonstration includes a virtual representation of a laptop (e.g., instead of a desktop computer as shown in FIGS. 18B-18K). In particular, the virtual demonstration displays virtual computer system 1808*b*, which is a virtual representation of computer system 1800*b***.

In FIG. 18L, virtual external device **1810*a* is displayed in a vertical or portrait orientation (e.g., in comparison to the horizontal or landscape orientation of virtual external device 1810*a* in FIGS. 18B-18K). In some embodiments, the orientation of virtual external device 1810*a* is based on (e.g., displayed to match) the orientation of a corresponding physical external device (e.g., 1850*a***) coupled to the computer system.

In some embodiments, virtual external device **1810*a* is displayed in a selected orientation of a plurality of possible orientations. In some embodiments, the selected orientation represents a recommended orientation of the corresponding physical external device (e.g., 1850*a*) for the feature demonstrated by the tutorial (e.g., a recommended orientation of external device 1850*a* when using the camera application). In some embodiments, the selected orientation is based on a property of the computer system and/or the external device. In some embodiments, the selected orientation is selected based on the type of device of the computer system, a height of the camera (e.g., a height of an expected mounting position of the camera), and/or a field of view of the camera. In some embodiments, a portrait orientation is selected when the computer system is a laptop computer because the portrait orientation will result in a greater height of the camera than a landscape orientation when the camera is mounted to the computer system (e.g., as shown in FIGS. 18L and 18**M). In some embodiments, a landscape orientation is selected when the computer system is a desktop computer because the expected mounting position of the camera is higher than, e.g., a laptop. In some embodiments, selected orientation is selected such that the dimension (e.g., vertical or horizontal) of the camera with the largest field of view is aligned vertically (e.g., in order to capture more of the surface).

In FIG. 18L, the virtual demonstration on computer system 1800*b* includes virtual writing implement 1814 making simulated mark 1816*b* on virtual surface 1812. Concurrently, virtual surface image 1818, virtual writing implement image 1820, and simulated mark image 1822*b* are displayed on virtual computer system 1808*b* to demonstrate the feature of displaying the image of surface 1814 captured by camera 1852*a*. The curved arrows around virtual computer system 1808*b* in virtual demonstration portion 1806*a* in FIG. 18L indicate that the virtual demonstration includes multiple different states (e.g., an animation with different perspectives as simulated mark 1818*b* and simulated mark image 1822*b* progress), similar to the different states of the virtual demonstration describe with reference to FIGS. 18B-18K. For example, in some embodiments, the virtual demonstration in FIG. 18L transitions from an overhead perspective (e.g., as shown in FIG. 18B) to a front perspective (e.g., as shown in FIG. 18D) and then to a side perspective (e.g., as shown in FIG. 18F) as simulated mark 1818*b* and simulated mark image 1822*b* progress. Alternatively, the virtual demonstration in FIG. 18L can transition in a different order than that shown in FIGS. 18B-18K. For example, in some embodiments, the virtual demonstration in FIG. 18M transitions from a front perspective (e.g., as shown in FIG. 18D) to a top perspective (e.g., as shown in FIG. 18B) and then to a side perspective (e.g., as shown in FIG. 18F) as simulated mark 1818*b* and simulated mark image 1822*b* progress.

In FIG. 18L, computer system 1800*b* has a language setting in Spanish, as indicated by the header "CAMARA" of camera application window 6114. Because computer system 1800*b* has a language setting in Spanish, simulated mark 1816*b* (e.g., "hola") and corresponding simulated mark image 1822*b* in the tutorial are in Spanish. In comparison, simulated mark 1816*a* in FIGS. 18B-18K is in English because computer system 1800*a* has a language setting in English.

Figure 18M:
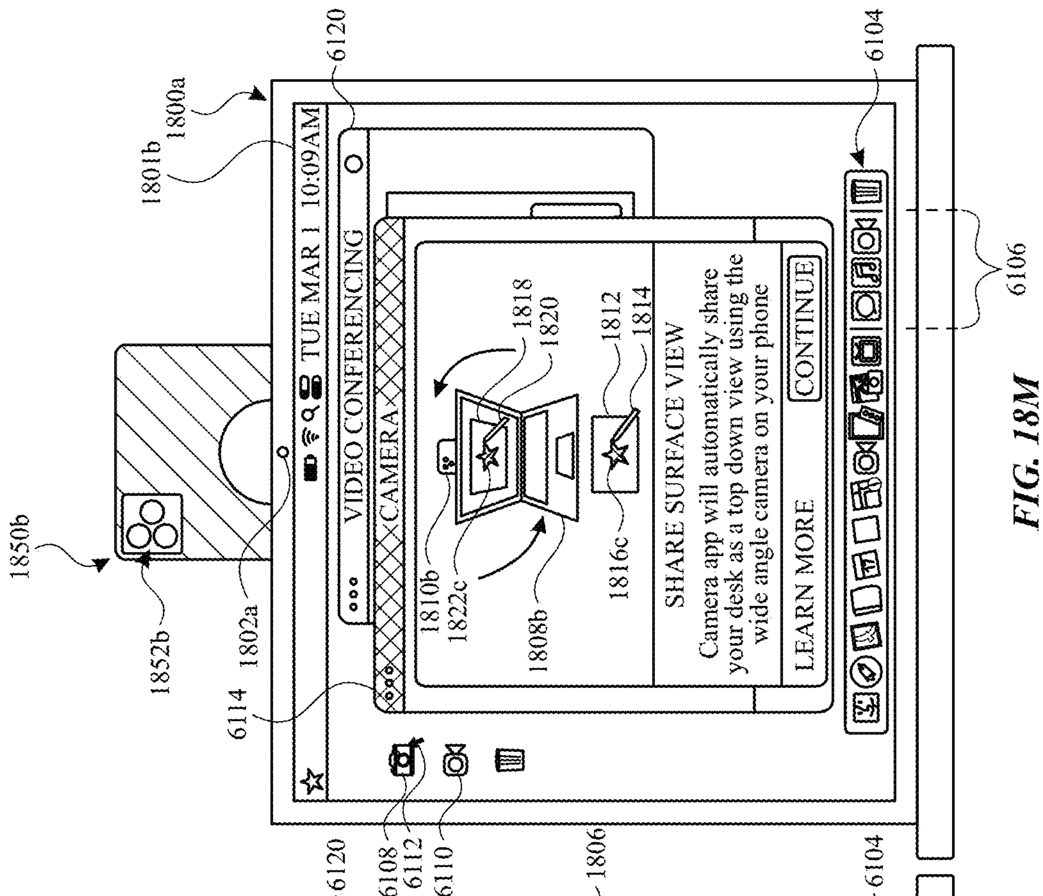

FIG. 18M illustrates computer system 1800*b* (described in FIG. 18L) and external device 1850*b*. External device 1850*b* includes camera 1852*b*. External device 1850*b* is a smartphone that is a different model than external device 1850*a*.

In response to detection selection of camera application icon 6108 in FIG. 18M, computer system 1800*b* displays camera application window 6114 and tutorial user interface 1806 as shown in FIG. 18M. In FIG. 18M, tutorial user interface 1806 displays a tutorial with a virtual demonstration of the features of the camera application described in FIGS. 18B-18K with reference to computer system 1800*a*. The virtual demonstration in FIG. 18M includes virtual computer system 1808*b*, virtual surface 1812, virtual writing implement 1814, virtual surface image 1818, and virtual writing implement image 1820 described above. Because external device 1850*b* is a different model of smartphone than external device 1850*a*, the virtual demonstration includes a virtual representation of a smartphone that is the same model as external device 1850*b*. In particular, the virtual demonstration displays virtual external device 1810*b*, which is a virtual representation of external device 1850*b*, mounted to virtual computer system 1808*b*.

In FIG. 18M, the virtual demonstration on computer system 1800*b* includes virtual writing implement 1814 making simulated mark 1816*c* on virtual surface 1812. Concurrently, virtual surface image 1818, virtual writing implement image 1820, and simulated mark image 1822*c* are displayed on virtual computer system 1808*b* to demonstrate the feature of displaying the image of surface 1814 captured by camera 1852*b*. In the embodiment illustrated in FIG. 18M, simulated mark 1818*c* and corresponding simulated mark image 1822*c* are a symbol (e.g., a star symbol). The curved arrows around virtual computer system 1808*b* in virtual demonstration portion 1806*a* in FIG. 18M indicate that the virtual demonstration includes multiple different states (e.g., an animation with different perspectives as simulated mark 1818*c* and simulated mark image 1822*c* progress), similar to the different states of the virtual demonstration describe with reference to FIGS. 18B-18K. For example, in some embodiments, the virtual demonstration in FIG. 18M transitions from an overhead perspective (e.g., as shown in FIG. 18B) to a front perspective (e.g., as shown in FIG. 18D) and then to a side perspective (e.g., as shown in FIG. 18F) as simulated mark 1818*c* and simulated mark image 1822*c* progress. Alternatively, the virtual demonstration in FIG. 18M can transition in a different order than that shown in FIGS. 18B-18K (or of the virtual demonstration in FIG. 18L). For example, in some embodiments, the virtual demonstration in FIG. 18M transitions from a multi-perspective view (e.g., as shown in FIG. 18G) to a front perspective (e.g., as shown in FIG. 18D) and then to a side perspective (e.g., as shown in FIG. 18F) as simulated mark 1818*c* and simulated mark image 1822*c* progress.

In FIG. 18M, computer system 1800*b* is associated with a color indicated by the hashing in the top border of camera application window 6114. In the embodiment illustrate in FIG. 18M, because computer system 1800*b* is associated with the color indicated by the hashing in the top border of camera application window 6114, simulated mark 1816*c* and corresponding simulated mark image 1822*c* in the tutorial are the color indicated by the hashing in the top border of camera application window 6114.

FIG. 18N illustrates computer system 1800*c*, which includes display 1801*c* and camera 1802*c*. Computer system 1800*c* is a laptop computer of a different make and/or model than computer system 1800*b* (e.g., as indicated by the rounded corners of computer system 1800*c* compared to the sharp corners of computer system 1800*b*). In FIG. 18N, computer system 1800*c* is not coupled to an external device and performs the features of the camera application described with reference to FIGS. 18A-18M using camera 1802*c* of computer system rather than a camera of an external device, such as 1850*a* or 1850*b*.

In response to detection selection of camera application icon 6108 in FIG. 18N, computer system 1800*c* displays camera application window 6114 and tutorial user interface 1806 as shown in FIG. 18N. In FIG. 18N, tutorial user interface 1806 displays a tutorial with a virtual demonstration of the features of the camera application described in FIGS. 18B-18K with reference to computer system 1800*a*. The virtual demonstration in FIG. 18M includes virtual computer system 1808*c*, virtual surface 1812, virtual writing implement 1814, virtual surface image 1818, and virtual writing implement image 1820 described above. The virtual demonstration includes a virtual representation of a laptop that is the same make and/or model as computer system 1800*c*. In particular, the virtual demonstration displays virtual computer system 1808*c*, which is a virtual representation of computer system 1800*c*. Because computer system 1800*c* is not coupled to an external device in FIG. 18N, the virtual demonstration does not include a virtual representation of an external device.

In FIG. 18N, the virtual demonstration on computer system 1800*c* includes virtual writing implement 1814 making simulated mark 1816*a* (described above) on virtual surface 1812. Concurrently, virtual surface image 1818, virtual writing implement image 1820, and simulated mark image 1822*a* are displayed on virtual computer system 1808*c* to demonstrate the feature of displaying the image of surface 1814 captured by camera 1802*c*. The curved arrows around virtual computer system 1808*c* in virtual demonstration portion 1806*a* in FIG. 18N indicate that the virtual demonstration includes multiple different states (e.g., an animation with different perspectives as simulated mark 1818*a* and simulated mark image 1822*a* progress), similar to the different states of the virtual demonstration describe with reference to FIGS. 18B-18K. For example, in some embodiments, the virtual demonstration in FIG. 18N transitions from an overhead perspective (e.g., as shown in FIG. 18B) to a front perspective (e.g., as shown in FIG. 18D) and then to a side perspective (e.g., as shown in FIG. 18F) as simulated mark 1818*a* and simulated mark image 1822*a* progress. Alternatively, the virtual demonstration in FIG. 18N can transition in a different order than that shown in FIGS. 18B-18K (or of the virtual demonstrations in FIGS. 18L and 18M). For example, in some embodiments, the virtual demonstration in FIG. 18M transitions from a side perspective (e.g., as shown in FIG. 18F) to a front perspective (e.g., as shown in FIG. 18D) and then to a top perspective (e.g., as shown in FIG. 18B) as simulated mark 1818*a* and simulated mark image 1822*a* progress.

FIG. 19 is a flow diagram illustrating a method for displaying a tutorial for a feature on a computer system in accordance with some embodiments. Method 1900 is performed at a computer system (e.g., 100, 300, 500, 600-1, 600-2, 600-3, 600-4, 906*a*, 906*b*, 906*c*, 906*d*, 6100-1, 6100-2, 1100*a*, 1100*b*, 1100*c*, 1100*d*, 1800*a*, 1800*b*, and/or 1800*c*) (e.g., a smartphone, a tablet computer, a laptop computer, a desktop computer, and/or a head mounted device (e.g., a head mounted augmented reality and/or extended reality device)) that is in communication with a display generation component (e.g., 601, 683, 6101, 1800*a*, 1801*b*, and/or 1801*c*) (e.g., a display controller, a touch-sensitive display system, a monitor, and/or a head mounted display system), and one or more input devices (e.g., 6103, 601, and/or 683) (e.g., a touch-sensitive surface, a keyboard, a controller, and/or a mouse). Some operations in method 1900 are, optionally, combined, the orders of some operations are, optionally, changed, and some operations are, optionally, omitted.

As described below, method 1900 provides an intuitive way for displaying a tutorial for a feature on a computer system. The method reduces the cognitive burden on a user to display a tutorial for a feature on a computer system, thereby creating a more efficient human-machine interface. For battery-operated computing devices, enabling a user to display a tutorial for a feature on a computer system faster and more efficiently conserves power and increases the time between battery charges.

In method 1900, the computer system detects (1902), via the one or more input devices, a request (e.g., an input, a touch input, a voice input, a button press, a mouse click, a press on a touch-sensitive surface, an air gesture, selection of a user-interactive graphical object, and/or other selection input) (e.g., selection of 6108, selection of 6136-1 in FIG. 16M, selection of 610, or selection of 607-2, 612*d*) to use a feature on the computer system. In some embodiments, the feature includes an application that displays an image of a surface that is in the field of view of a camera and that is modified based on a position of the surface relative to the camera such that the line of sight of the camera appears to be perpendicular to the surface (e.g., as described in greater detail with respect to methods 700 and 1700).

In response to detecting the request to use the feature on the computer system, the computer system displays (1904), via the display generation component, a tutorial (e.g., 1806, 1806*a*, and/or 1806*b*) for using the feature that includes a virtual demonstration of the feature (e.g., the virtual demonstration in 1806*a* described in FIGS. 18B-18N), including: in accordance with a determination (1906) that a property of the computer system has a first value (e.g., a non-numeric value such as a device type (e.g., laptop, desktop, or tablet), device model, device coupling configuration (e.g., coupled or not coupled), device orientation (e.g., landscape or portrait), system language (e.g., English, Spanish, or Chinese), or system color (e.g., blue, green, red, and/or color scheme), or a numeric value such as a model number, serial number, or version number), the computer system displays the virtual demonstration having a first appearance (e.g., first visual characteristic(s) and/or first animation); and in accordance with a determination (1908) that the property of the computer system has a second value (e.g., a non-numeric value such as a device type (e.g., laptop, desktop, or tablet), device model, device coupling configuration (e.g., coupled or not coupled), device orientation (e.g., landscape or portrait), system language (e.g., English, Spanish, or Chinese), or system color (e.g., blue, green, red, and/or color scheme), or a numeric value such as a model number, serial number, or version number), the computer system displays the virtual demonstration having a second appearance that is different from the first appearance (e.g., second visual characteristic(s) different from the first visual characteristic(s) and/or second animation different from the first animation). Displaying an appearance of the virtual demonstration based on a property of the computer system enables the computer system to customize the virtual demonstration to the user's computer system, provides a more realistic and useful demonstration of the feature to the user, and reduces the need for a user to provide additional inputs to select properties of a device for the virtual demonstration, which provides improved visual feedback, performs an operation (e.g., selecting an appearance of the virtual demonstration) when a set of conditions has been met without requiring further user input, and reduces the number of inputs needed to perform an operation.

In some embodiments, the computer system displays the tutorial for using the feature that includes the virtual demonstration of the feature in response to detecting the request to use the feature on the computer system in accordance with a determination that a set of criteria is met (e.g., a set of one or more criteria and/or predetermined criteria); and the computer system forgoes displaying the tutorial for using the feature that includes the virtual demonstration of the feature in response to detecting the request to use the feature on the computer system in accordance with a determination that the set of criteria is not met. In some embodiments, the set of criteria includes a criterion that is met if the feature has been used (e.g., initiated, activated, opened, and/or launched on the computer system or, optionally, on another computer system associated with a same user as the computer system) a number of times that satisfies (e.g., is equal to; is less than or equal to; or is less than) a threshold amount (e.g., zero times, one time, two times, or three times) (e.g., the set of criteria is based on whether the feature has been used by a user at least a threshold amount (e.g., one or more times)). In some embodiments, the computer system displays the tutorial only if the feature has not been used on the computer system (or, optionally, on another computer system associated with a same user as the computer system). In some embodiments, the computer system forgoes displaying the tutorial if the feature has been used one or more times on the computer system.

In some embodiments, the virtual demonstration has an appearance that is based on which type of device is being used to provide access to the feature (e.g., virtual computer system 1808*a* is a desktop computer because computer system 1800*a* is a desktop computer, as shown in FIGS. 18B-18I; virtual computer system 1808*b* is a laptop computer because computer system 1800*b* is a laptop computer, as shown in FIGS. 18L-18M; virtual computer system 1808*c* is a laptop computer because computer system 1800*c* is a laptop computer, as shown in FIG. 18N; virtual external device 1810*a* and virtual external device 1810*b* are phones because external device 1850*a* and external device 1850*b*, respectively, are smartphones, as shown in FIGS. 18B-18M) (e.g., for a wide angle camera, which type of device the camera is housed in and/or which kind of device is displaying the representation of the field of view of the camera, such as a laptop computer, desktop computer, tablet computer, smartphone, or smartwatch). In some embodiments, the virtual demonstration of the feature includes a graphical (e.g., virtual) representation of a device that is the same type of device as the computer system. In some embodiments, the first value is a first type of device and the second value is a second type of device that is different from the first type of device. In some embodiments, in accordance with a determination the computer system is a first type of device, the virtual demonstration (or the first appearance of the virtual demonstration) includes a graphical representation of a device of the first type; and in accordance with a determination the computer system is a second type of device, the virtual demonstration (or the second appearance of the virtual demonstration) includes a graphical representation of a device of the second type. Basing the appearance of the virtual demonstration on which type of device is being used to provide access to the feature enables the computer system to customize the virtual demonstration to the user's computer system, provides a more realistic and useful demonstration of the feature to the user, and reduces the need for a user to provide additional inputs to select a type of device for the virtual demonstration, which provides improved visual feedback to the user and reduces the number of inputs needed to perform an operation.

In some embodiments, the virtual demonstration has an appearance that is based on which model of device is being used to provide access to the feature (e.g., virtual computer system 1808*b* is a model of a laptop computer with sharp corners because computer system 1800*b* is a laptop computer with sharp corners, as shown in FIGS. 18L-18M; virtual computer system 1808*c* is a model of a laptop computer with rounded corners because computer system 1800*c* is a laptop computer with rounded corners, as shown in FIG. 18N) (e.g., a model name of a device and/or model version of a device). In some embodiments, the virtual demonstration includes a virtual representation of a device that is the same model of device as the computer system. In some embodiments, the first value is a first model of device and the second value is a second model of device that is different from the first model of device. In some embodiments, in accordance with a determination the computer system is a first model of device, the virtual demonstration (or the first appearance of the virtual demonstration) includes a graphical representation of a device that is the first model of device; and in accordance with a determination the computer system is a second model of device, the virtual demonstration (or the second appearance of the virtual demonstration) includes a graphical representation of a device that is the second model of device. Basing the appearance of the virtual demonstration on which model of device is being used to provide access to the feature enables the computer system to customize the virtual demonstration to the user's computer system, provides a more realistic and useful demonstration of the feature to the user, and reduces the need for a user to provide additional inputs to select a model of device for the virtual demonstration, which provides improved visual feedback to the user and reduces the number of inputs needed to perform an operation.

In some embodiments, the virtual demonstration has an appearance that is based on whether or not the computer system is coupled to (e.g., in communication with) an external device to provide access to the feature (e.g., the virtual demonstration in FIGS. 18B-18I includes virtual external device 1810*a* because computer system 1800*a* is coupled to external device 1850*a*; the virtual demonstration in FIG. 18L includes virtual external device 1810*a* because computer system 1800*b* is coupled to external device 1850*a*; the virtual demonstration in FIG. 18M includes virtual external device 1810*b* because computer system 1800*b* is coupled to external device 1850*b*; the virtual demonstration in FIG. 18N does not include a virtual external device because computer system 1800*c* is not coupled to an external device) (e.g., a particular type of eternal device, a smartphone, a tablet, and/or a camera) (or whether or not the computer system includes only a single device or two or more devices that are coupled together). In some embodiments, the first value is that the computer system is coupled to an external device, and the second value is that the computer system is not coupled to an external device. In some embodiments, in accordance with a determination the computer system is coupled to an external device, the virtual demonstration (or the first appearance of the virtual demonstration) includes a graphical representation of the computer system and a graphical representation of the external device; and in accordance with a determination the computer system is not coupled to an external device, the virtual demonstration (or the second appearance of the virtual demonstration) includes a graphical representation of the computer system without a graphical representation of an external device. Basing the appearance of the virtual demonstration on whether or not the computer system is coupled to an external device to provide access to the feature enables the computer system to customize the virtual demonstration to the user's computer system, provides a more realistic and useful demonstration of the feature to the user, and reduces the need for a user to provide additional inputs to select a system configuration for the virtual demonstration, which provides improved visual feedback to the user and reduces the number of inputs needed to perform an operation.

In some embodiments, in accordance with a determination that the computer system is coupled to an external device, displaying the tutorial includes displaying a graphical (e.g., virtual) representation of the external device in a selected orientation (e.g., a predetermined orientation, a recommended orientation, a vertical orientation, a horizontal orientation, a landscape orientation, and/or a portrait orientation) of a plurality of possible orientations (e.g., virtual external device 1810*a* is displayed in a horizontal orientation in the virtual demonstration of FIGS. 18B-18I because the computer system is a desktop computer, because camera 1852*a*/1852*b* has a wider vertical field of view when external device 1850*a*/1850*b* is in a horizontal orientation, and/or because of the height of computer system 1800*a*; virtual external device 1810*a* and virtual external device 1850*b* are displayed in a vertical orientation in the virtual demonstration of FIGS. 18L-18M because the computer system is a laptop computer, because camera 1852*a*/1852*b* has a wider vertical field of view when external device 1850*a*/1850*b* is in a vertical orientation, and/or because of the height of computer system 1800*b*). In some embodiments, in accordance with a determination that a property of the computer system and/or the external device has a first value (e.g., the computer system and/or the external device is a first type of device and/or a first model of device), the virtual demonstration displays the graphical representation of the external device in a first orientation of the plurality of possible orientations; and in accordance with a determination that a property of the computer system and/or external device has a second value (e.g., the computer system and/or the external device is a second type of device and/or a second model of device) that is different from the first value, the virtual demonstration displays the graphical representation of the external device in a second orientation of the plurality of possible orientations that is different from the first orientation. In some embodiments, the selected orientation is selected based on the type of device of the computer system, a height of the camera (e.g., a height of an expected mounting position of the camera), and/or a field of view of the camera. In some embodiments, a portrait orientation is selected when the computer system is a laptop computer because the portrait orientation will result in a greater height of the camera than a landscape orientation when the camera is mounted to the computer system. In some embodiments, a landscape orientation is selected when the computer system is a desktop computer because the expected mounting position of the camera is higher than, e.g., a laptop. In some embodiments, selected orientation is selected such that the dimension (e.g., vertical or horizontal) of the camera with the largest field of view is aligned vertically (e.g., in order to capture more of the surface). Displaying a graphical representation of the external device in a selected orientation of a plurality of possible orientations in accordance with a determination that the computer system is coupled to an external device enables the computer system to customize the virtual demonstration to the user's computer system, provides a recommended orientation that can improve operation of the feature (e.g., make the feature more effective for the user), and reduces the need for a user to provide additional inputs to select an orientation of the external device for the virtual demonstration, which provides improved visual feedback to the user, performs an operation when a set of conditions has been met without requiring further user input, and reduces the number of inputs needed to perform an operation.

In some embodiments, the virtual demonstration has an appearance that is based on a system language of the computer system (e.g., a language setting of an operating system of the computer system) (e.g., simulated mark 1816*a* and/or simulated mark image 1822*a* is in English because a system language of computer system 1800*a* is English; simulated mark 1816*b* and/or simulated mark image 1822*b* is in Spanish because a system language of computer system 1800*b* is Spanish). In some embodiments, the first value is a first language, and the second value is a second language that is different from the first language. In some embodiments, in accordance with a determination the system language is the first language, the virtual demonstration (or the first appearance of the virtual demonstration) includes a graphical representation (e.g., writing) in the first language; and in accordance with a determination the system language is the second language, the virtual demonstration (or the first appearance of the virtual demonstration) includes the graphical representation in the second language. Basing the appearance of the virtual demonstration on a system language of the computer system enables the computer system to customize the virtual demonstration to the user's computer system, provides a more realistic and useful demonstration of the feature to the user, and reduces the need for a user to provide additional inputs to select a system language for the virtual demonstration, which provides improved visual feedback to the user and reduces the number of inputs needed to perform an operation.

In some embodiments, the virtual demonstration has an appearance that is based on a color associated with the computer system (e.g., an accent color used in the computer system, a color setting such as for an operating system of the computer system, and/or a color scheme for a user interface of the computer system) (e.g., simulated mark 1816*a* and/or simulated mark image 1822*a* is a first color because the first color is associated with computer system 1800*a*; simulated mark 1816*c* and/or simulated mark image 1822*c* is a second color, different from the first color, because the second color is associated with computer system 1800*b* in FIG. 18M). In some embodiments, the color associated with the computer system is a user-selectable color (e.g., the user can select a first color or a second color from a plurality of available colors for use throughout the operating system as a color for a subset of elements (e.g., a particular type of interactive system element such as buttons, toggles, sliders, or text entry fields and/or a background or wallpaper)). In some embodiments, the first value is a first color, and the second value is a second color that is different from the first color. In some embodiments, in accordance with a determination the color associated with the computer system is the first color, the virtual demonstration (or the first appearance of the virtual demonstration) includes a graphical representation having the first color; and in accordance with a determination the color associated with the computer system is the second color, the virtual demonstration (or the first appearance of the virtual demonstration) includes the graphical representation having the second color. Basing the appearance of the virtual demonstration on a color associated with the computer system enables the computer system to customize the virtual demonstration to the user's computer system, provides a more realistic and useful demonstration of the feature to the user, and reduces the need for a user to provide additional inputs to select a color for the virtual demonstration, which provides improved visual feedback to the user and reduces the number of inputs needed to perform an operation.

In some embodiments, displaying the tutorial includes (e.g., the virtual demonstration includes) displaying a graphical (e.g., virtual) indication (e.g., 1824) of an extent of a field of view of one or more cameras (e.g., 1852) (e.g., one or more cameras of the computer system or of an external device in communication with or coupled to the computer system) in a simulated representation of a physical environment (e.g., the simulated representation of the physical environment shown in virtual demonstration portion 1806*a* in FIG. 18F). In some embodiments, the graphical indication of the extent of the field of view indicates a portion (e.g., a surface) of the physical environment that is displayed by the feature of the computer system. In some embodiments, the graphical indication of the extent of the field of view includes simulated rays, a fan-shaped graphical element, and/or a wedge-shaped graphical element extending out of the camera toward the surface. Displaying a graphical indication of an extent of a field of view of one or more cameras in a simulated representation of a physical environment provides the user with information about an aspect of a feature (e.g., the field of view of the one or more cameras) that cannot be physically and provides a more useful tutorial, which provides improved visual feedback to the user.

In some embodiments, displaying the tutorial includes (e.g., the virtual demonstration includes) displaying a graphical representation (e.g., 1812) of an input area (e.g., a simulated input area) and a graphical representation (e.g., the virtual display of 1808*a*, 1808*b*, and/or 1808*c*) of an output area (e.g., a simulated output area). In some embodiments, the input area includes a surface (e.g., a physical surface; a horizontal surface, such as a surface of a table, floor, and/or desk; a vertical surface, such as a wall, whiteboard, and/or blackboard; a surface of an object, such as a book, a piece of paper, and/or a display of a tablet; and/or other surface). In some embodiments, the output area includes a display and/or a monitor. Displaying a graphical representation of an input area and a graphical representation of an output area provides the user with information about possible areas of user inputs for the feature and expected areas for receiving outputs of the feature, and reduces the need for the user to make additional user input to determine what input areas are possible, which provides improved visual feedback to the user and reduces the number of input needed to perform an operation.

In some embodiments, displaying the tutorial includes (e.g., the virtual demonstration includes) displaying a graphical representation of an input (e.g., virtual writing implement 1814 making a mark on virtual surface 1812) (e.g., a simulated input and/or a user input). In some embodiments, the input includes a marking device (e.g., a pen, marker, pencil, crayon, stylus, or finger) making a mark (e.g., handwriting) on a surface (e.g., a piece of paper or a display of a tablet). In some embodiments, the graphical representation of the input includes movement of a graphical representation of the marking device making the mark on the surface and, optionally, a graphical representation of a user's hand moving and/or holding the marking device. In some embodiments, displaying the graphical representation of the input includes displaying an animation of the input over time (e.g., animating the graphical representation of the input over time; displaying an animation of a graphical representation of a marking device moving over time). In some embodiments, the computer system displays an animation of an output of the input (e.g., a mark made by a marking device), where the output (e.g., marks) appears (e.g., updates) gradually over time as the input progresses. Displaying a graphical representation of an input as part of the tutorial provides the user with information about possible user inputs for the feature and reduces the need for the user to make additional user input to determine what inputs are possible, which provides improved visual feedback to the user and reduces the number of input needed to perform an operation.

In some embodiments, displaying the tutorial includes (e.g., the virtual demonstration includes) displaying (e.g., concurrently displaying) a graphical representation (e.g., 1816*a*, 1816*b*, and/or 1816*c*) of a first output of (or response to) the input (e.g., a simulated physical output, such as a simulated mark on a surface) and a graphical representation (e.g., 1822*a*, 1822*b*, and/or 1822*c*) of a second output of (or response to) the input (e.g., a simulated image of the mark on the surface captured by a camera of the computer system is displayed on a virtual representation of a display of the computer system). Displaying a graphical representation of a first output of the input and a graphical representation of a second output of the input provides the user with additional information about the expected operation and output of the feature, with provides improved visual feedback to the user.

In some embodiments, displaying the graphical representation of the first output includes displaying the graphical representation of the first output on a graphical (e.g., simulated or virtual) representation of a physical (e.g., real-world) surface (e.g., on virtual surface 1812) (e.g., a horizontal surface, such as a surface of a table, floor, and/or desk; a vertical surface, such as a wall, whiteboard, and/or blackboard; a surface of an object, such as a book, a piece of paper, and/or a display of a tablet; and/or other physical surface); and displaying the graphical representation of the second output includes displaying the graphical representation of the second output on a graphical (e.g., simulated or virtual) representation of the computer system (e.g., on 1808*a*, 1808*b*, and/or 1808*c*) (e.g., on a graphical representation of the display generation component). Displaying the graphical representation of the first output on a graphical representation of a physical surface and displaying the graphical representation of the second output on a graphical representation of the computer system provides the user with additional information about where output of the feature occurs and reduces the need for the user to provide additional user inputs to locate an output of the feature, which provides improved visual feedback to the user and reduces the number of inputs needed to perform an operation.

In some embodiments, displaying the graphical representation of the input includes displaying a graphical (e.g., virtual) representation (e.g., 1814) of a writing implement (e.g., a writing utensil, such as a pen, pencil, marker, crayon, and/or stylus) making a mark (e.g., 1816*a*, 1816*b*, and/or 1816*c*); and displaying the tutorial includes (e.g., the virtual demonstration includes) displaying movement of the graphical representation of the writing implement (e.g., away from a surface, from being in contact with a surface to not being in contact with the surface, off to a side of a surface, and/or to a position that does not obscure or overlap a graphical representation of the output) after displaying the graphical representation of the input is complete (e.g., moving 1814 from the position in FIG. 18D to the position in FIG. 18E). Displaying a graphical representation of a writing implement making a mark and displaying movement of the graphical representation of the writing implement after displaying the graphical representation of the input is complete provides the user with additional information about the possible methods of providing input to the feature and allows the computer system to move the graphical representation of the writing implement to a position that does not obscure the input when the input is done, which provides improved visual feedback to the user and reduces cluttering of the user interface.

In some embodiments, displaying the tutorial includes (e.g., the virtual demonstration includes): displaying a graphical representation of a physical object from a first perspective (e.g., an overhead or top perspective, a side perspective, a front perspective, a back or rear perspective, a bottom perspective, a top-side perspective, and/or a bottom-side perspective) at a first time; and displaying the graphical representation of the physical object from a second perspective at a second time, wherein the second perspective is different from the first perspective, and wherein the second time is different from the first time (e.g., displaying 1808*a*, 1808*b*, 1808*c*, 1810*a*, 1812, and/or 1814 from the perspective in FIG. 18B at a first time and displaying 1808*a*, 1808*b*, 1808*c*, 1810*a*, 1812, and/or 1814 from the perspective in FIG. 18D at a second time; displaying 1808*a*, 1808*b*, 1808*c*, 1810*a*, 1812, and/or 1814 from the perspective in FIG. 18D at a first time and displaying 1808*a*, 1808*b*, 1808*c*, 1810*a*, 1812, and/or 1814 from the perspective in FIG. 18F at a second time). In some embodiments, displaying the tutorial includes displaying a graphical representation of the physical object from different perspectives over time (e.g., an animation from the perspective of a virtual camera moving around the physical object or an animation of the physical object (and, optionally, a physical environment surrounding the physical object) changing orientation (e.g., rotating)). In some embodiments, the display of the graphical representation of the physical object changes from the first perspective to the second perspective as a simulated input progresses. For example, in some embodiments, the computer system displays a change in the display of the graphical representation of the physical object from the first perspective to the second perspective concurrently with a progression of a simulated input (e.g., the change in perspective from which the device is displayed gradually occurs as simulated handwriting is being drawn). Displaying a graphical representation of a physical object from a first perspective at a first time and displaying the graphical representation of the physical object from a second perspective at a second time provides the user with information about the feature that is difficult to obtain from a single perspective and provides the user with information about a physical object involved in the feature without requiring the user to provide additional user inputs to view multiple perspectives of the physical object, which provides improved visual feedback and reduces the number of inputs needed to perform an operation.

In some embodiments, displaying the tutorial includes (e.g., the virtual demonstration includes): displaying a graphical representation of the computer system from a first perspective (e.g., an overhead or top perspective, a side perspective, a front perspective, a back or rear perspective, a bottom perspective, a top-side perspective, and/or a bottom-side perspective) at a first time; and displaying the graphical representation of the computer system from a second perspective at a second time, wherein the second perspective is different from the first perspective, and wherein the second time is different from the first time (e.g., displaying 1808*a*, 1808*b*, and/or 1808*c*, from the perspective in FIG. 18B at a first time and displaying 1808*a*, 1808*b*, and/or 1808*c* from the perspective in FIG. 18D at a second time; displaying 1808*a*, 1808*b*, and/or 1808*c* from the perspective in FIG. 18D at a first time and displaying 1808*a*, 1808*b*, and/or 1808*c* from the perspective in FIG. 18F at a second time). In some embodiments, at the first time, the computer system displays the graphical representation of the physical object (e.g., the computer system) from the first perspective while concurrently displaying the graphical representation of the input in a first state and the graphical representation of the output in a state that corresponds to the first state of the graphical representation of the input; and at the second time, the computer system displays the graphical representation of the physical object from the second perspective while concurrently displaying the graphical representation of the input in a second state and the graphical representation of the output in a state that corresponds to the second state of the graphical representation of the input (e.g., the virtual demonstration of the feature includes displaying a simulated input and corresponding simulated output while concurrently changing the perspective from which the graphical representation of the physical object is displayed). Displaying a graphical representation of the computer system from a first perspective at a first time and displaying the graphical representation of the computer system from a second perspective at a second time provides the user with information about the feature that is difficult to obtain from a single perspective and provides the user with information about the computer system involved in the feature without requiring the user to provide additional user inputs to view multiple perspectives of the computer system that are relevant to the feature, which provides improved visual feedback and reduces the number of inputs needed to perform an operation.

In some embodiments, displaying the tutorial includes: displaying a first virtual demonstration of the feature (e.g., an animation of the first virtual demonstration and/or a first occurrence of displaying the first virtual demonstration); and after displaying the first virtual demonstration of the feature, displaying a second virtual demonstration of the feature (e.g., displaying the first virtual demonstration again; displaying a second occurrence of displaying the first virtual demonstration; repeating and/or looping display of the first virtual demonstration; or displaying a second virtual demonstration of the feature that is different from the first virtual demonstration of the feature). In some embodiments, the computer system repeats (or loops) display of the first virtual demonstration automatically (e.g., without detecting user input corresponding to a request to repeat display of the first virtual demonstration). In some embodiments, the computer system continues to repeat display of the first virtual demonstration until detecting an input corresponding to a request to cease display of the first virtual demonstration. In some embodiments, the second virtual demonstration is partially the same as the first virtual demonstration (e.g., includes the same device, simulated writing implement, simulated surface, and/or change in perspective over time) and partially different from the first virtual demonstration (e.g., includes different simulated input such as different handwriting). Displaying a first virtual demonstration of the feature and, after displaying the first virtual demonstration of the feature, displaying a second virtual demonstration of the feature provides the user with the ability to view the demonstration multiple times and observe aspects of the demonstration that are difficult to observe in a single instance of the demonstration without having to provide additional input to replay, pause, and/or rewind the demonstration, which provides improved visual feedback to the user and reduces the number of inputs needed to perform an operation.

In some embodiments, the computer system detects a second request to use the feature on the computer system; and in response to detecting the second request to use the feature on the computer system: in accordance with a determination that a set of criteria is met (e.g., a set of one or more criteria and/or predetermined criteria), the computer system displays the tutorial for using the feature that includes the virtual demonstration of the feature (e.g., display 1806 and the tutorial described in FIGS. 18B-18I); and in accordance with a determination that the set of criteria is not met, the computer system forgoes displaying the tutorial for using the feature that includes the virtual demonstration of the feature (e.g., do not display 1806 and do not display the tutorial described in FIGS. 18B-18I). Displaying the tutorial for using the feature that includes the virtual demonstration of the feature or not based on whether a set of criteria is met enables the computer system to display the tutorial under relevant conditions or avoids the time and inputs associated with display of the tutorial (e.g., time to display the tutorial and inputs to dismiss the tutorial) when display of the tutorial would be unnecessary or unhelpful, which provides improved visual feedback to the user, reduces the number of inputs needed to perform an operation, and performs an operation when a set of conditions has been met without requiring further user input.

In some embodiments, the set of criteria includes a criterion that is met if the feature has been used (e.g., initiated, activated, opened, and/or launched on the computer system or, optionally, on another computer system associated with a same user as the computer system) a number of times that satisfies (e.g., is equal to; is less than or equal to; or is less than) a threshold amount (e.g., zero times, one time, two times, or three times) (e.g., the set of criteria is based on whether the feature has been used by a user at least a threshold amount (e.g., one or more times)) (e.g., if selection of 6108 in FIG. 18A is the first time that the associated camera application is launched, display 1806 and the tutorial described in FIGS. 18B-18I; if selection of 6108 in FIG. 18A is not the first time that the associated camera application is launched, do not display 1806 and do not display the tutorial described in FIGS. 18B-18I). In some embodiments, the computer system displays the tutorial only if the feature has not been used on the computer system (or, optionally, on another computer system associated with a same user as the computer system). In some embodiments, the computer system forgoes displaying the tutorial if the feature has been used one or more times on the computer system. Basing the set of criteria on a number of times that the feature has been used enables the computer system to display the tutorial when a user is unfamiliar with the feature (e.g., the first time or the first two or three times that a user requests the feature) and avoids the time and inputs associated with display of the tutorial (e.g., time to display the tutorial and inputs to dismiss the tutorial) when the user is familiar with the feature, which provides improved visual feedback to the user, reduces the number of inputs needed to perform an operation, and performs an operation when a set of conditions has been met without requiring further user input.

In some embodiments, after (e.g., in response to) detecting the request to use the feature on the computer system, the computer system: displays a selectable continue option (e.g., 1806*d*) (e.g., an affordance, a button, a selectable icon, and/or a user-interactive graphical user interface object); detects selection of the continue option (e.g., selection of 1806*d*) (e.g., an input, a touch input, a voice input, a button press, a mouse click, a press on a touch-sensitive surface, an air gesture, selection of a user-interactive graphical object, and/or other selection input corresponding and/or directed to the continue option); and in response to detecting selection of the continue option, performs (e.g., initiates or continues) a process for using the feature on the computer system (e.g., displaying 1604 as shown in FIG. 18K). In some embodiments, the computer system concurrently displays the continue option and the tutorial. In some embodiments, the computer system initiates the process for using the feature in response to detecting the request to use the feature on the computer system, and continues the process for using the feature in response detecting selection of the continue option. In some embodiments, the computer system activates the feature in response to detecting selection of the continue option. In some embodiments, in response to detecting selection of the continue option, the computer system displays a user interface for setting up the feature (e.g., activates a setup flow for the feature). In some embodiments, in response to detecting selection of the continue option, the computer system displays the user interfaces and/or performs the operations described in greater detail with respect to FIGS. 16C-16G, 16N, and 16P-16Q and/or method 1700. In some embodiments, in response to detecting selection of the continue option, the computer system displays and/or shares an image of a surface that is in the field of view of a camera and that is modified based on a position of the surface relative to the camera such that the line of sight of the camera appears to be perpendicular to the surface (e.g., as described in greater detail with respect to method 700) (e.g., without displaying preview user interface 1604 described with respect to FIGS. 16C-16G, 16N, and 16P-16Q). Providing a continue option and performing a process for using the feature on the computer system in response to detecting selection of the continue option provides an efficient technique for the user to control whether to remain on the tutorial or continue with using the feature, which provides improved visual feedback to the user and reduces the number of inputs needed to perform an operation.

In some embodiments, after (e.g., in response to) detecting the request to use the feature on the computer system, the computer system: displays a selectable information option (e.g., 1806*c*) (e.g., an affordance, a button, a selectable icon, and/or a user-interactive graphical user interface object); detects selection of the information option (e.g., selection of 1806*c*) (e.g., an input, a touch input, a voice input, a button press, a mouse click, a press on a touch-sensitive surface, an air gesture, selection of a user-interactive graphical object, and/or other selection input corresponding and/or directed to the information option); and in response to detecting selection of the information option, displays a user interface (e.g., 1826) that provides (or provides access to) information (e.g., text, graphics, diagrams, charts, images, and/or animations) for using the feature on the computer system (e.g., instructions for using the feature on the computer system, information about aspects of the feature, and/or examples of the feature). In some embodiments, the computer system concurrently displays the information option, the tutorial, and, optionally, the continue option. In some embodiments, the user interface is a website and/or HTML document displayed in a web browser application. In some embodiments, the user interface is an electronic document (e.g., a PDF document, a text document, and/or a presentation document). Providing an information option and displaying a user interface that provides information for using the feature on the computer system in response to detecting selection of the information option provides an efficient technique for the user to obtain information about the feature without requiring additional inputs to search for the information (e.g., entering the name of the feature in a search field of a web browser application), which provides improved visual feedback to the user and reduces the number of inputs needed to perform an operation.

Note that details of the processes described above with respect to method 1900 (e.g., FIG. 19) are also applicable in an analogous manner to the methods described above. For example, methods 700, 800, 1000, 1200, 1400, 1500, and 1700 optionally include one or more of the characteristics of the various methods described above with reference to method 1900. For example, methods 700, 800, 1000, 1200, 1400, 1500, and 1700 optionally include a tutorial including a virtual demonstration for a feature of the computer system. For brevity, these details are not repeated herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to enhance a user's video conferencing experience. The present disclosure contemplates that in some instances, this gathered data may include personal information data that uniquely identifies or can be used to contact or locate a specific person. Such personal information data can include demographic data, location-based data, telephone numbers, email addresses, social network IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to customize user profiles for a video conference experience. Accordingly, use of such personal information data enables users to have calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of video conference interfaces, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, general user profiles can be created for video conference applications based on non-personal information data or a bare minimum amount of personal information, such as the content being requested by the device associated with a user, other non-personal information available to the video conference provider, or publicly available information.

What is claimed is:

1. A computer system configured to communicate with a display generation component and one or more input devices, the computer system comprising:

one or more processors; and memory storing one or more programs configured to be executed by the one or more processors, the one or more programs including instructions for:

detecting, via the one or more input devices, a request to use a feature on the computer system; and in response to detecting the request to use the feature on the computer system, displaying, via the display generation component, a tutorial for using the feature that includes a virtual demonstration of the feature, including:

in accordance with a determination that a property of the computer system has a first value, displaying the virtual demonstration having a first appearance; and in accordance with a determination that the property of the computer system has a second value, displaying the virtual demonstration having a second appearance that is different from the first appearance.

2. The computer system of claim 1, wherein the virtual demonstration has an appearance that is based on which type of device is being used to provide access to the feature.

3. The computer system of claim 1, wherein the virtual demonstration has an appearance that is based on which model of device is being used to provide access to the feature.

4. The computer system of claim 1, wherein the virtual demonstration has an appearance that is based on whether or not the computer system is coupled to an external device to provide access to the feature.

5. The computer system of claim 4, wherein:

in accordance with a determination that the computer system is coupled to an external device, displaying the tutorial includes displaying a graphical representation of the external device in a selected orientation of a plurality of possible orientations.

6. The computer system of claim 1, wherein the virtual demonstration has an appearance that is based on a system language of the computer system.

7. The computer system of claim 1, wherein displaying the tutorial includes displaying a graphical indication of an extent of a field of view of one or more cameras in a simulated representation of a physical environment.

8. The computer system of claim 1, wherein displaying the tutorial includes displaying a graphical representation of an input area and a graphical representation of an output area.

9. The computer system of claim 1, wherein displaying the tutorial includes displaying a graphical representation of an input, and wherein displaying the tutorial includes displaying a graphical representation of a first output of the input and a graphical representation of a second output of the input.

10. The computer system of claim 1, wherein displaying the tutorial includes:

displaying a graphical representation of a physical object from a first perspective at a first time; and displaying the graphical representation of the physical object from a second perspective at a second time, wherein the second perspective is different from the first perspective, and wherein the second time is different from the first time.

11. The computer system of claim 10, wherein displaying the tutorial includes:

displaying a graphical representation of the computer system from a first perspective at a first time; and displaying the graphical representation of the computer system from a second perspective at a second time, wherein the second perspective is different from the first perspective, and wherein the second time is different from the first time.

12. The computer system of claim 1, the one or more programs further including instructions for:

detecting a second request to use the feature on the computer system; and in response to detecting the second request to use the feature on the computer system:

in accordance with a determination that a set of criteria is met, displaying the tutorial for using the feature that includes the virtual demonstration of the feature; and in accordance with a determination that the set of criteria is not met, forgoing displaying the tutorial for using the feature that includes the virtual demonstration of the feature.

13. The computer system of claim 12, wherein the set of criteria includes a criterion that is met if the feature has been used a number of times that satisfies a threshold amount.

14. The computer system of claim 1, the one or more programs further including instructions for:

after detecting the request to use the feature on the computer system, displaying a selectable continue option;

detecting selection of the selectable continue option; and in response to detecting selection of the selectable continue option, performing a process for using the feature on the computer system.

15. The computer system of claim 1, the one or more programs further including instructions for:

after detecting the request to use the feature on the computer system, displaying a selectable information option;

detecting selection of the selectable information option; and in response to detecting selection of the selectable information option, displaying a user interface that provides information for using the feature on the computer system.

16. A non-transitory computer-readable storage medium storing one or more programs configured to be executed by one or more processors of a computer system that is in communication with a display generation component and one or more input devices, the one or more programs including instructions for:

detecting, via the one or more input devices, a request to use a feature on the computer system; and in response to detecting the request to use the feature on the computer system, displaying, via the display generation component, a tutorial for using the feature that includes a virtual demonstration of the feature, including:

in accordance with a determination that a property of the computer system has a first value, displaying the virtual demonstration having a first appearance; and in accordance with a determination that the property of the computer system has a second value, displaying the virtual demonstration having a second appearance that is different from the first appearance.

17. A method, comprising:

at a computer system that is in communication with a display generation component and one or more input devices:

detecting, via the one or more input devices, a request to use a feature on the computer system; and in response to detecting the request to use the feature on the computer system, displaying, via the display generation component, a tutorial for using the feature that includes a virtual demonstration of the feature, including:

in accordance with a determination that a property of the computer system has a first value, displaying the virtual demonstration having a first appearance; and in accordance with a determination that the property of the computer system has a second value, displaying the virtual demonstration having a second appearance that is different from the first appearance.

18. The non-transitory computer-readable storage medium of claim 16, wherein the virtual demonstration has an appearance that is based on which type of device is being used to provide access to the feature.

19. The non-transitory computer-readable storage medium of claim 16, wherein the virtual demonstration has an appearance that is based on which model of device is being used to provide access to the feature.

20. The non-transitory computer-readable storage medium of claim 16, wherein the virtual demonstration has an appearance that is based on whether or not the computer system is coupled to an external device to provide access to the feature.

21. The non-transitory computer-readable storage medium of claim 20, wherein:

in accordance with a determination that the computer system is coupled to an external device, displaying the tutorial includes displaying a graphical representation of the external device in a selected orientation of a plurality of possible orientations.

22. The non-transitory computer-readable storage medium of claim 16, wherein the virtual demonstration has an appearance that is based on a system language of the computer system.

23. The non-transitory computer-readable storage medium of claim 16, wherein displaying the tutorial includes displaying a graphical indication of an extent of a field of view of one or more cameras in a simulated representation of a physical environment.

24. The non-transitory computer-readable storage medium of claim 16, wherein displaying the tutorial includes displaying a graphical representation of an input area and a graphical representation of an output area.

25. The non-transitory computer-readable storage medium of claim 16, wherein displaying the tutorial includes displaying a graphical representation of an input, and wherein displaying the tutorial includes displaying a graphical representation of a first output of the input and a graphical representation of a second output of the input.

26. The non-transitory computer-readable storage medium of claim 16, wherein displaying the tutorial includes:

displaying a graphical representation of a physical object from a first perspective at a first time; and displaying the graphical representation of the physical object from a second perspective at a second time, wherein the second perspective is different from the first perspective, and wherein the second time is different from the first time.

27. The non-transitory computer-readable storage medium of claim 26, wherein displaying the tutorial includes:

displaying a graphical representation of the computer system from a first perspective at a first time; and displaying the graphical representation of the computer system from a second perspective at a second time, wherein the second perspective is different from the first perspective, and wherein the second time is different from the first time.

28. The non-transitory computer-readable storage medium of claim 16, the one or more programs further including instructions for:

detecting a second request to use the feature on the computer system; and in response to detecting the second request to use the feature on the computer system:

in accordance with a determination that a set of criteria is met, displaying the tutorial for using the feature that includes the virtual demonstration of the feature; and in accordance with a determination that the set of criteria is not met, forgoing displaying the tutorial for using the feature that includes the virtual demonstration of the feature.

29. The non-transitory computer-readable storage medium of claim 28, wherein the set of criteria includes a criterion that is met if the feature has been used a number of times that satisfies a threshold amount.

30. The non-transitory computer-readable storage medium of claim 16, the one or more programs further including instructions for:

after detecting the request to use the feature on the computer system, displaying a selectable continue option;

detecting selection of the selectable continue option; and in response to detecting selection of the selectable continue option, performing a process for using the feature on the computer system.

31. The non-transitory computer-readable storage medium of claim 16, the one or more programs further including instructions for:

after detecting the request to use the feature on the computer system, displaying a selectable information option;

detecting selection of the selectable information option; and in response to detecting selection of the selectable information option, displaying a user interface that provides information for using the feature on the computer system.

32. The method of claim 17, wherein the virtual demonstration has an appearance that is based on which type of device is being used to provide access to the feature.

33. The method of claim 17, wherein the virtual demonstration has an appearance that is based on which model of device is being used to provide access to the feature.

34. The method of claim 17, wherein the virtual demonstration has an appearance that is based on whether or not the computer system is coupled to an external device to provide access to the feature.

35. The method of claim 17, wherein the virtual demonstration has an appearance that is based on a system language of the computer system.

36. The method of claim 17, wherein displaying the tutorial includes displaying a graphical indication of an extent of a field of view of one or more cameras in a simulated representation of a physical environment.

37. The method of claim 17, wherein displaying the tutorial includes displaying a graphical representation of an input area and a graphical representation of an output area.

38. The method of claim 17, wherein displaying the tutorial includes displaying a graphical representation of an input, and wherein displaying the tutorial includes displaying a graphical representation of a first output of the input and a graphical representation of a second output of the input.

39. The method of claim 17, further comprising:

detecting a second request to use the feature on the computer system; and in response to detecting the second request to use the feature on the computer system:

in accordance with a determination that a set of criteria is met, displaying the tutorial for using the feature that includes the virtual demonstration of the feature; and in accordance with a determination that the set of criteria is not met, forgoing displaying the tutorial for using the feature that includes the virtual demonstration of the feature.

40. The method of claim 17, further comprising:

after detecting the request to use the feature on the computer system, displaying a selectable continue option;

detecting selection of the selectable continue option; and in response to detecting selection of the selectable continue option, performing a process for using the feature on the computer system.

41. The method of claim 17, further comprising:

after detecting the request to use the feature on the computer system, displaying a selectable information option;

detecting selection of the selectable information option; and in response to detecting selection of the selectable information option, displaying a user interface that provides information for using the feature on the computer system.

* * * * *